US012195142B2

(12) United States Patent
Sheldon-Coulson et al.

(10) Patent No.: US 12,195,142 B2
(45) Date of Patent: Jan. 14, 2025

(54) SELF-CHARGING AUTONOMOUS SUBMERSIBLE VESSEL

(71) Applicant: LONE GULL HOLDINGS, LTD., Portland, OR (US)

(72) Inventors: Garth Alexander Sheldon-Coulson, Portland, OR (US); Brian Lee Moffat, Portland, OR (US); Daniel William Place, Portland, OR (US); Ivar Lee Thorson, Portland, OR (US)

(73) Assignee: LONE GULL HOLDINGS, LTD., Portland, OR (US)

(*) Notice: Subject to any disclaimer, the term of this patent is extended or adjusted under 35 U.S.C. 154(b) by 79 days.

(21) Appl. No.: 17/767,423

(22) PCT Filed: Nov. 22, 2020

(86) PCT No.: PCT/US2020/061713

§ 371 (c)(1),
(2) Date: Apr. 7, 2022

(87) PCT Pub. No.: WO2021/102396

PCT Pub. Date: May 27, 2021

(65) Prior Publication Data

US 2024/0101229 A1 Mar. 28, 2024

Related U.S. Application Data

(60) Provisional application No. 62/978,299, filed on Feb. 19, 2020, provisional application No. 62/939,576, filed on Nov. 23, 2019.

(51) Int. Cl.

| | |
|---|---|
| ***B63B 22/18*** | (2006.01) |
| ***B63B 35/44*** | (2006.01) |
| ***F03B 13/22*** | (2006.01) |

(52) U.S. Cl.
CPC .............. *B63B 22/18* (2013.01); *B63B 35/44* (2013.01); *F03B 13/22* (2013.01); *B63B 2035/4466* (2013.01)

(58) Field of Classification Search
CPC . B63B 22/18; B63B 35/44; B63B 2035/4466; F03B 13/22; F03B 13/145;
(Continued)

(56) References Cited

U.S. PATENT DOCUMENTS 7,878,734 B2 * 2/2011 Bull ........................ B63B 39/06 60/497
8,628,303 B2 * 1/2014 Smith .................. F03B 13/187 417/337
(Continued)

FOREIGN PATENT DOCUMENTS

GB 2004330 A 3/1979

OTHER PUBLICATIONS

Mar. 29, 2021 International Search Report and Written Opinion—PCT/US2020/061713.

*Primary Examiner* — Hoang M Nguyen
(74) *Attorney, Agent, or Firm* — Fulwider Patton LLP

(57) ABSTRACT

Disclosed is an autonomous vessel comprising a hydrodynamic pump that converts the energy of ocean waves into electrical power when the vessel is floating adjacent to an upper surface of an ocean, and utilizes a portion of the generated electrical power produced to charge an electrical energy storage device. The vessel may submerge itself, and then propel itself beneath the water's surface, after which it may return to the surface and resume its production of electrical energy and recharge its electrical energy storage device.

28 Claims, 233 Drawing Sheets

(58) Field of Classification Search
CPC ................ F03B 13/142; F05B 2250/33; F05B 2270/18; F05B 2240/931; F05B 2260/42; Y02E 10/30
See application file for complete search history.

(56) References Cited

U.S. PATENT DOCUMENTS

| | | | | |
|---|---|---|---|---|
| 8,742,607 | B2 * | 6/2014 | Steelberg | F03G 7/04<br>290/53 |
| 10,099,759 | B1 | 10/2018 | Mehta | |
| 11,680,554 | B2 * | 6/2023 | Sheldon-Coulson | B63B 35/44<br>60/497 |
| 2017/0045027 | A1 | 2/2017 | Moffat | |
| 2017/0295759 | A1 | 10/2017 | Hine | |
| 2018/0073482 | A1 | 3/2018 | Sheldon-Coulson et al. | |
| 2019/0353139 | A1 * | 11/2019 | Sheldon-Coulson | F03B 13/24 |

* cited by examiner

SELF-CHARGING AUTONOMOUS SUBMERSIBLE VESSEL

CROSS-REFERENCES TO RELATED APPLICATIONS

This application claims priority to U.S. Provisional Patent Application Nos. 62/939,576, filed Nov. 23, 2019 and 62/978,299, filed Feb. 19, 2020, the contents of which are incorporated herein by reference in their entireties.

BACKGROUND

Waves traveling across the surface of the sea tend to move relatively slowly. Likewise, their oscillations tend to have relatively long periods, e.g., on the order of eight to twenty seconds. However, despite their relatively slow movement, waves tend to possess and/or manifest substantial amounts of energy. For these reasons, it is both desirable and difficult to extract energy from ocean waves. The device of the current invention efficiently extracts energy from ocean waves with a robust and relatively inexpensive design having few or no moving parts.

A variety of embodiments of the current invention contribute to solving at least two significant limitations and/or drawbacks of large-scale computing.

1) Computers require electrical power in order to operate and perform their calculations. Electrical power is required to energize CPUs. Electrical power is required to energize random-access memory. Electrical power is required to energize shared and/or persistent memory (e.g. hard disks). Electrical power is required to energize switches, routers, and other equipment supporting network connections between computers.
2) Computers generate heat. Most (if not all) of the electrical power used to energize computers is converted to, and/or lost as, heat from the circuits and components that execute the respective computational tasks and/or electronic functions. The heat generated by computers can raise the temperatures of those and/or adjacent computers to levels that can cause those computers to fail, especially when those computers are located in close proximity to one another. Because of this, computers, and/or the environments in which they operate, must be cooled. And, cooling, e.g. through air conditioners and/or air conditioning, requires and/or consumes significant amounts of electrical energy. Favorable historical trends in the miniaturization of computer components (e.g. "Moore's Law") are currently slowing, suggesting that future increases in computational power may require greater investments in cooling than was common in the past.

A variety of embodiments of the current invention also solve at least two significant limitations and/or drawbacks of aquaculture.

1) The raising of fish in reservoirs located on shore, or near shore, can become polluted with the excrement of the fish thereby slowing the growth of those fish, e.g., by encouraging bacteria in the water to consume and thereby reduce the available dissolved oxygen, and by increasing the risk of disease within individual fish and/or within entire populations of fish.
2) The raising of seaweeds and algae within reservoirs located on shore, or in the ocean, is constrained by the amount of sunlight available to shine upon the upper surface of the reservoir water, as well as by the concentration of mineral nutrients available within the water.

SUMMARY OF THE INVENTION

Disclosed are a novel type of buoyant hydrodynamic pump and a novel type of wave engine configured to float adjacent to an upper surface of a body of water over which waves tend to pass. Embodiments incorporate at least one tube (also referred to herein as a liquid pressurizing columnar conduit, water tube, tapered tube, constricted tube, or inertial water tube, inter alia) with an opening, or mouth, at a lower portion and a constriction or narrowing at or near an upper mouth. The tube partially encloses a substantial volume of water that tends to be excited and oscillate within the tube in response to wave action at the device, in particular because of interactions between that water and the tube's constriction, taper, or reduction in cross-sectional area. Embodiments incorporate a buoy (also referred to herein as a flotation module, hollow chamber, buoyant enclosure, buoyant body, flotation capsule, hollow flotation module, or upper hull enclosure, inter alia) to which an upper part of the tube is connected. Wave-driven oscillations of the device, and its attached tapered or constricted tube, result in the periodic ejections of portions of the water inside the tube, at the top and/or from an upper mouth of the tube (referred to as an injection orifice, water discharge mouth, or water discharge spout, inter alia). In some embodiments, portions of said ejected water may be collected in a reservoir (also referred to herein as a liquid collecting chamber, water tank, interior enclosure, or water collection basin, inter alia) that is positioned and configured so that: (1) a surface of water within the reservoir can be maintained at a position above the mean water level of the body of water on which the device floats, i.e., the resting external water surface; and/or (2) the water within the reservoir can be held in state of elevated pressure by compressed air or gas contained in the same enclosure and/or a fluidly communicating enclosure. Water within such an elevated or pressurized reservoir may return to the body of water on which the device floats via an effluent conduit (also referred to herein as an effluent pipe, inter alia) within which is situated a turbine or another power-capture mechanism such as a magnetohydrodynamic generator, thereby permitting the generation of electrical power; or through another type of flow governor, such as an adsorbent filter, configured to regulate and/or govern the flow of water out of the reservoir. In some cases, the flow governor can produce useful work and/or a useful product as a consequence of water flow, such as the capture of dissolved substances in seawater. In other cases the utility of the flow governor is primarily the maintenance of an approximately constant pressurization of the device's reservoir and/or an approximately constant, or controllable, flow of water through the hydrodynamic pump.

A preferred embodiment is characterized by a waterplane area that is at least five times greater than the average horizontal cross-sectional area of the upper surface of the resting water partially enclosed within the tube. A preferred embodiment is characterized by a buoy that is quasi-spherical especially in the region of a resting waterline. A preferred embodiment is free-floating, unmoored, self-propelled, and possessing computing devices that are used to process computational tasks transmitted to it by a satellite, or by other electromagnetically- or optically-encoded signals, so that it can perform computational tasks on demand and/or autonomously, far from any shore and/or in the midst of waves that tend to be more energetic than those found near shore. Another preferred embodiment promotes the growth of fish, macroalgae, microalgae, bivalves, and/or other organisms, within the reservoir of the device, sometimes by using a portion of the energy that it generates to generate light to support their growth and/or to propel the device to locations offering favorable environmental resources. Another preferred embodiment captures minerals dissolved in seawater by using the pumping action of the embodiment to drive water at elevated pressure through or adjacent to an adsorbent or absorbent capture medium. Another preferred embodiment uses the water-pumping action of the embodiment to circulate water to create a hospitable and waste-free environment for fish captive within a reservoir of the embodiment. Finally, another preferred embodiment uses its water-pumping action to propel seawater skywardly to increase the number of cloud nucleation sites in the air above the embodiment.

A downward movement of the tapered tube, relative to the position and/or movement of the water partially enclosed within the tube, such as might occur as the device falls from the crest of a wave toward an approaching trough, tends to cause the tapered walls of the tapered tube to impart an increased pressure to the water inside the tube, particularly at an upper region of that water tube. When such a downward movement of the tube is followed by an upward movement of the tube, such as might occur as the device rises from the trough of a wave toward an approaching crest, the water inside the tapered tube tends to continue moving downward for a period of time due to its substantial inertia and downward momentum, even as the tapered tube moves upward and away from that water. The resulting disparity in the movements of the tapered tube and the water therein tends to cause a reduction in the pressure inside an uppermost portion of the tapered tube, and, in some embodiments, causes air to be drawn into the tube from above.

When the volume of water within the tapered tube has been reduced (e.g., when a transient air pocket has developed at the top of the tube), then the inward and/or upward pressure exerted by the water outside and/or adjacent to the lower mouth of the tapered tube that would tend to push water back into the tube, and restore the tube's nominal volume of water, will tend to exceed the outward and/or downward pressure exerted by the reduced volume of water within the tapered tube at the lower mouth. The resulting net inward and/or upward pressure at the tapered tube's lower mouth will tend to impel water back into the tapered tube from below. And, as the water within the tapered tube moves up the tube, toward the tapered tube's upper mouth, that water tends to accelerate and gain upward momentum.

As the rise of the device and the device's tapered tube slows, and/or the device returns to a downward trajectory, the vertically stalled, and/or now descending, tapered tube will tend to encounter an upward-moving slug of water partially enclosed within the tapered tube that is still moving upward and/or still gaining upward momentum. As the transient air pocket at the top of the tube is reduced, and the upwelling water within the tapered tube again reaches its nominal height within the tapered tube, the narrowing cross-sectional area of the tapered tube, and/or the tube's constricted upper end, tends to cause a portion of the water moving up through the tapered tube to gain additional upward speed (relative to the tube) and to subsequently travel beyond the upper mouth of the tapered tube and to effectively be ejected therefrom. In embodiments having a reservoir (liquid collecting chamber), especially one pressurized by gas, this ejection of water from the tube corresponds to an injection of water into the liquid collecting chamber; the pressure and/or force required to perform this injection is supplied by the sizable momentum and/or inertia of the water moving upwardly (relative to the tube) in the relatively long tube.

An embodiment of the current disclosure traps a portion of the water discharged from the upper mouth of its tapered tube within a raised or elevated water reservoir, i.e., within a reservoir, container, chamber, pool, tank, bath, vat, and/or other full or partial enclosure configured so that in normal operation the reservoir holds a substantial portion of the water therein, and/or a surface of the water therein, at a distance above the mean external water level of the body of water on which the device floats, thereby capturing, preserving, buffering, storing, and/or caching, as gravitational potential energy some of the energy of water ejected from the upper mouth of the device's tapered tube. In embodiments having this kind of elevated or raised reservoir, the embodiment is typically configured to have at least some permanent buoyancy, i.e. structures having a lower density than water positioned so as to reside below a mean waterline of the embodiment during normal operation. An embodiment allows a portion of the water trapped within its raised reservoir to flow back into the body of water on which the device floats through at least one water turbine that is operatively connected to at least one electrical generator, such that water flowing through said turbine, under the influence of the head pressure possessed by the water within the raised reservoir, results in the production of electrical energy. Embodiments of the current disclosure may utilize any type of hydrokinetic, impulse, or reaction turbine, including, but not limited to, those that might be characterized as: Kaplan turbines, Francis turbines, and crossflow turbines.

An embodiment of the current disclosure utilizes and/or incorporates a pressurized accumulator, reservoir, chamber, vessel, container, capsule, tank, and/or other enclosure, containing both air and seawater, into which seawater is injected from the tapered tube. The pressurized reservoir traps a portion of the water discharged from an upper mouth of its tapered tube within a pressurized water reservoir, i.e., within a reservoir, container, chamber, pool, tank, capsule, and/or other enclosure, thereby holding the water alongside a pocket of compressed air, thereby capturing, preserving, buffering, storing, and/or caching, potential energy as an increased gas pressure. The pressurized reservoir stores potential energy in the compressed air inside the accumulator, much like a hydraulic accumulator. An embodiment allows a portion of the water trapped within its pressurized reservoir to flow back into the body of water on which the device floats through at least one water turbine that is operatively connected to at least one electrical generator such that water flowing through said turbine, under the influence of the elevated pressure possessed by the water within the pressurized reservoir, results in the production of electrical energy. Embodiments of the current disclosure may utilize any type of hydrokinetic, impulse, or reaction turbine, including, but not limited to, those that might be characterized as: Kaplan turbines. Francis turbines, and crossflow turbines.

An embodiment of the current disclosure utilizes and/or incorporates at least one water reservoir possessing at least one approximately elliptical or circular (nominally horizontal) cross-section, e.g., within a plane normal to a (nominally vertical) longitudinal axis of the device and/or its tapered tube. And the embodiment introduces a portion of the water discharged from the upper mouth of the tapered tube into the circular water reservoir at a position, and in a direction, that has a component tangential to the periphery of the elliptical or circular cross-section of the reservoir such that a swirling motion tends to be imparted to a portion of the water within the reservoir. One such embodiment utilizes a hydrokinetic turbine that extracts energy from both the gravitational potential energy (e.g., head pressure potential energy) and the (rotational and/or angular) kinetic energy of the water in the reservoir.

An embodiment of the current disclosure incorporates, includes, and/or utilizes a tapered and/or constricted tube, cylinder, channel, conduit, container, canister, object, and/or structure, an upper end of which is nominally positioned adjacent to, or above, a mean exterior waterline of the device, and a lower end of which is nominally positioned at a depth near, adjacent to, and/or below, a wave base of the body of water on which the embodiment floats, e.g. (depending on the scale of the embodiment) 20, 50, 100 meters, 150 meters, or 175 meters below the mean free surface, or in any event, at a depth substantially below the free surface of the body of water. Cross-sectional areas of the tapered tube relative to sectional planes normal to a nominally vertical, longitudinal axis of the embodiment and/or the tube (and hence parallel to a resting and/or average free surface of the body of water), are typically inconstant and preferably greater near a lower extent or portion of the tube, and lesser near an upper extent or portion of the tube, i.e., the tube (liquid pressurizing columnar conduit) narrows and/or contains a constriction or constricting feature near its upper end.

The constricted or tapered tube of a preferred embodiment has a lower portion, e.g., adjacent to a lower mouth of the tube, that is of relatively constant cross-sectional area and an upper portion, e.g., approaching an upper mouth of the tube, that is of a lesser, decreasing, and/or constricted cross-sectional area. An upper portion of the tapered tube of one such preferred embodiment is comprised of a frustoconical segment wherein the upper mouth is defined by the smallest-diameter edge of that frustoconical segment. An upper portion of the tapered tube of a different preferred embodiment has a region of approximately constant (transverse) cross-sectional area above the constricting section, such that an uppermost portion of the tube can be approximately cylindrical and/or prismatic. An upper portion of the tapered tube of another such preferred embodiment is comprised of a conical segment with walls that are curved with respect to cross-sectional planes passing through, and/or including, the longitudinal axis of the lower tube portion, e.g. to cause the constricting part of the tube to have walls completely tangential to the walls of any cylindrical or prismatic regions above or below. A (non-preferred) embodiment has a tapered tube of relatively constant cross-sectional area and an orifice plate near its top, the orifice of which comprises the upper tube mouth.

The tapered tube of another embodiment is smoothly tapered from a bottom of relatively great cross-sectional area to a top of relatively small cross-sectional area. The tapered tube of another embodiment has cross-sectional areas that increase with greater depth within a first depth range and are approximately constant within a second depth range, the second depth range being deeper in the body of water on which the embodiment floats than the first depth range. The tapered tube of another embodiment has cross-sectional areas that are constant with greater depth within a first depth range, are increasing with depth within a second depth range, and are approximately constant with depth in a third depth range, the second depth range being deeper in the body of water than the first depth range and the third depth range being deeper in the body of water than the second depth range.

Tapered tubes of the current disclosure include, but are not limited to, those which have a horizontal cross-section, i.e., a cross-section through a plane normal to a (nominally vertical) longitudinal axis of the tube, that is approximately circular, elliptical, rectangular, hexagonal, and/or octagonal, as well as those which have a horizontal cross-section that is irregular or of some or any other shape.

Tapered tubes of the current disclosure include, but are not limited to, those which have an internal channel, e.g., through which water and/or air may flow, which have horizontal cross-sections, i.e., a cross-sections through a plane normal to a (nominally vertical) longitudinal axis of the tube, that is approximately circular, elliptical, rectangular, hexagonal, and/or octagonal, as well as those which have a horizontal cross-section that is irregular or of some or any other shape.

Tapered tubes of the current disclosure include, but are not limited to, those that are relatively straight, e.g., vertical, and have a straight longitudinal and/or central axis, e.g., parallel to the axis of fluid flow through the tube. Water tubes of the current disclosure also include, but are not limited to, those that ar curved and have a non-linear and/or curved longitudinal and/or central axis or centerline, e.g., parallel to the axis of fluid flow through the tube.

Tapered tubes of the current disclosure include, but are not limited to, those which have an internal channel, e.g., through which water may flow, with variable, inconsistent, and/or changing, cross-sectional areas, i.e., a variable, inconsistent, and/or unequal, area with respect to at least two cross-sections through a plane normal to a longitudinal axis or centerline of the tube.

Tapered tubes of the current disclosure include, but are not limited to, those which have a divided, partitioned, and/or separated internal channel, e.g., through which water may flow, through two or more separated channels within a single tube. For example, an embodiment may incorporate and/or utilize a single tube that, by means of one or more substantially vertical partitions that are approximately parallel to the vertical longitudinal axis of the tube, incorporates two or more separated channels through which water may flow. Such a divided and/or partitioned tube permits the possibility and/or the opportunity to incorporate within a single tube two or more channels, each of which is characterized by a different fundamental and/or resonant frequency at which water will oscillate within that tube in a direction approximately parallel to the longitudinal axis of the partitioned tube and each of which is therefore excited by differing wave amplitudes and/or periods, and/or differing ranges of wave amplitudes and/or periods, which result in optimal, maximal, and/or the most energetic discharges of water from the upper aperture of the respective tubes and/or of the constituent channels therein.

Tapered tubes of the current disclosure include, but are not limited to, those which are comprised of collections of, sets of, pluralities of, and/or two or more, constituent tubes, pipes, channels, and/or conduits. For example, an embodiment of the current disclosure incorporates and/or includes a water tube comprised, at least in part, of many pipes bound, fastened, and/or welded together such that the joined collection of constituent pipes in effect constitutes a partitioned tube of larger diameter.

Embodiments of the current disclosure incorporate, include, and/or utilize one or more tapered tubes, and The present disclosure includes embodiments that incorporate, include, and/or utilize any number of water tubes. Embodiments of the current disclosure may also incorporate, include, and/or utilize two or more water tubes that wherein one or more of those water tubes differs from one or more of the other water tubes with respect to diameter, length, included taper angle, cross-sectional shape, volume, and/or any other parameter, dimension, characteristic, and/or attribute. Each of such an embodiment's two or more unequal water tubes will tend to optimally responsive to different wave climates, wave heights, and/or wave periods. An embodiment's use of two or more tubes of differing lengths, included taper angle, volume, etc., may permit the embodiment to extract optimal amounts of energy from a greater range of waves amplitudes and/or periods than might be possible with only a single tube or multiple tubes of identical geometries.

An embodiment of the current disclosure utilizes and/or incorporates two or more tapered tubes. One such embodiment directs a portion of the water ejected by each tube into a common and/or shared water reservoir from which gravitational potential energy and/or rotational kinetic energy is extracted. Another such embodiment directs a portion of the water ejected by each tube into a dedicated and/or tube-specific water reservoir.

Tapered tubes of the current disclosure include, but are not limited to, those which are fabricated, at least in part, of: steel, and/or other metals; one or more types of plastic; one or more types of fabric (e.g., carbon fiber or fiberglass); one or more types of resin; and/or one or more types of cementitious material.

The current disclosure includes an embodiment in which a water tube is comprised of an internal wall, e.g., made of metal, and an outside wall, e.g., also made of metal, and a gap that is filled, at least in part, with concrete and/or another cementitious material.

The current disclosure includes an embodiment in which a water tube is structurally reinforced and/or strengthened by an exterior truss. Another embodiment includes a tapered tube is structurally reinforced and/or strengthened by an interior truss, e.g., a truss within a gap between interior and exterior tube walls, and/or a truss within the lumen, conduit, aperture, and/or channel, through which water and/or air flow.

The current disclosure includes an embodiment in which a tapered tube has walls or other features that incorporate, include, and/or contain, buoyant material, i.e., material that has a density less than the water on which the embodiment floats, and that tends to reduce the average density of the embodiment.

Tapered tubes of the current disclosure include, but are not limited to, those which are, at least in part, and/or at least to a degree, flexible with respect to at least one axis, as well as those that are, at least in part, rigid and/or not substantially flexible.

The current disclosure includes an embodiment in which a tapered tube is, at least in part, not entirely rigid.

An embodiment has a water tube comprised, at least in part, of at least one of the following:

- a flexible tube;
- two or more rigid tube segments that are conjoined, interconnected, and/or linked, by means of flexible joints, and/or connectors;
- a flexible material utilizing rigid circumferential bands to prevent the collapse of the tube while permitting it to bend with respect to its longitudinal axis or vertical centerline and a limiting maximal bend radius;
- a plurality of telescoping annular sections; and/or
- an accordion-like extensible material that both allows the tube to flex along its longitudinal axis and allows its length to increase and decrease through flexes of the accordion-like pleats that define its walls.

Tapered tubes of the current disclosure include, but are not limited to, those which are comprised of tube walls of approximately constant thickness and/or strength; as well as those which are comprised of tube walls of variable, inconsistent, and/or changing, thicknesses and/or strengths (e.g., tubes having thicker walls nearer the buoy (upper hull enclosure) and thinner walls near the bottom of the water tube, may have the advantage of providing an economy of structural material while successfully resisting structural loads).

The current disclosure includes an embodiment in which a water tube has an airfoil-shaped cross-sectional shape (i.e., with respect to a (nominally horizontal) cross-section in a plane normal to a longitudinal axis of the water tube, i.e. parallel to a resting water surface on which the device floats). Another embodiment has a water tube that is embedded within an airfoil-shaped casing, shroud, and/or cowling.

The current disclosure includes embodiments that minimize their drag, and facilitate their motion, e.g., by means of self-propulsion, through the use of airfoil-shaped water tubes and/or outer tube casings, shrouds, cowlings, and/or enclosures. The current disclosure includes embodiments that incorporate and/or include airfoil-shaped water tubes and/or casings as well as rudders and/or ailerons that allow the airfoil-shaped water tubes to be steered after the manner of a keel, or an airplane wing.

Embodiments of the present disclosure incorporate and/or utilize inertial water tubes through which water tends to oscillate and from the upper mouth of which water is occasionally ejected. The ejection of water from the upper mouths of these tubes is facilitated, promoted, enabled, and/or increased (e.g., in volume and/or frequency), by a reduction in the cross-sectional area of the tube proximate to the upper mouth, which constriction serves to excite water in the tube to oscillate. The present disclosure includes embodiments incorporating and/or utilizing any number of water tubes, wherein at least one of an embodiment's water tubes has an inconstant cross-sectional area with respect to sectional planes normal to the longitudinal axis of the inertial water tube, and/or normal to the axis of flow through the inertial water tube (i.e., inconstant "flow-normal" cross-sectional areas). The present disclosure includes embodiments incorporating and/or utilizing inertial water tubes characterized by variations, changes, differences, and/or alterations, in the flow-normal cross-sectional areas of any magnitude, relative or absolute, and of any form, design, or shape. In a preferred embodiment, a constriction provides an area reduction of approximately eight times from the bottom of a water tube to its upper mouth.

The present disclosure includes embodiments possessing, incorporating, and/or utilizing, constrictions, regions of tube narrowing, and/or tapers, whose walls (i.e., within the region of narrowing) with respect to sectional planes parallel to, and inclusive of, a longitudinal axis of the untapered portion of the inertial water tube, and/or parallel to, and inclusive of, the axis of flow through the untapered portion of the inertial water tube (i.e., "flow-parallel" cross-sectional areas) are straight, linear, curved, irregular, axially concentric with the longitudinal axis of the respective lower, untapered portions of the tubes, and/or not axially concentric with the longitudinal axis of the respective lower, untapered portions of the tubes (e.g., bending and/or curving in a lateral direction).

An embodiment of the present disclosure incorporates a narrowing in its inertial water tube through the use of a frustoconical tube section adjacent to the upper mouth. An embodiment of the present disclosure incorporates an inertial water tube incorporating a single lower mouth and a plurality of upper mouths. Each of the embodiment's upper mouths in such an embodiment is adjacent to a mouth-specific region of constriction within the embodiment's tube.

Embodiments of the current disclosure include, but are not limited to, those that incorporate, include, and/or utilize one or more constricted inertial water tubes. And The present disclosure includes embodiments that incorporate, include, and/or utilize different numbers, and/or any number, of constricted inertial water tubes.

An embodiment of the current disclosure incorporates, includes, and/or utilizes a buoy or flotation module (also referred to as an upper hull enclosure), in order to keep at least a portion of the device adjacent to the surface of a body of water. Buoys of the current disclosure can be positively buoyant objects per se and/or enclose a trapped gas within their interior. Embodiments may be free-floating, drifting, self-propelled, tethered (e.g., by anchor) to a seafloor or tethered (e.g., by mooring cables) to one or more other embodiments. Buoys of the current disclosure can include but are not limited to structures that are or resemble barges, floating platforms, ships, and/or boats.

Buoys of embodiments of the current disclosure can include, but are not limited to, those which are composed, comprised, and/or fabricated of, at least in part, and/or may incorporate, include, and/or contain: air-filled voids, foam, wood, bamboo, steel, aluminum, cement, fiberglass, carbon fiber, and/or plastic.

Buoys of embodiments of the current disclosure can include, but are not limited to, those which are fabricated as a substantially monolithic body, as well as those comprised of interconnected assemblages of parts, e.g., of which individual parts may not be positively buoyant. They may also be fabricated as assemblies of positively buoyant sub-assemblies, e.g., of buoyant canisters, modules, or tiles.

Buoys of embodiments of the current disclosure can include, but are not limited to, those which displace water across and/or over areas of the surface of body of water as small as 2 square meters, and as great as 10,000 square meters.

Buoys of embodiments of the current disclosure can include, but are not limited to, those which have a nominal, resting draft as shallow as 30 cm, and as deep as 50 meters.

Buoys of embodiments of the current disclosure can include, but are not limited to, those which have a horizontal cross-sectional shape (i.e., a shape with respect to a cross-section parallel to the resting surface of a body of water) and/or a waterplane shape that is approximately: circular, elliptical, rectangular, triangular, hexagonal, and/or complex and irregular.

Buoys of embodiments of the current disclosure can include, but are not limited to, those which have a vertical cross-sectional shape (i.e., a shape with respect to a cross-section normal to the resting surface of a body of water) that is approximately: rectangular, frusto-triangular, hemi-circular, semi-circular, and semi-elliptical.

Buoys of embodiments of the current disclosure can have shapes resembling bowls, cylinders, and other shapes conducive to the creation of a water reservoir, water tank, and/or water basin within the buoy.

An embodiment of the current disclosure incorporates, includes, and/or utilizes a pressurized accumulator, reservoir, container, chamber, capsule, vessel, tank, vat, and/or other enclosure, that contains a pocket of air or other gas which allows the pressurized accumulator to behave like a hydraulic accumulator. That pocket of pressurized air can also provide the pressurized accumulator with buoyancy. And an embodiment of the current disclosure utilizes such a pocket of pressurized air as its primary, if not only, source and/or provider of buoyancy. With respect to certain embodiments, the buoyancy of the pressurized accumulator keeps at least a portion of the embodiment floating adjacent to the surface of a body of water, and if a wall of the pressurized accumulator were to be punctured and/or the air within it released to the atmosphere, water could fill the accumulator and the embodiment would sink.

Such a pressurized embodiment is positively buoyant and may be free-floating, drifting, self-propelled, tethered (e.g., by anchor) to a seafloor or tethered (e.g., by mooring cables) to one or more other embodiments and/or floating objects.

The current disclosure includes embodiments with any and every type of water (and/or hydrokinetic) turbine, any number of water turbines, any variety of turbine sizes, power ratings, designs, as well as water turbines comprised of any and every type of material.

An embodiment of the current disclosure incorporates, includes, and/or utilizes a "water turbine," e.g., a device and/or mechanism that causes a shaft or other mechanical feature to rotate in response to the passage of water through a channel in which the water turbine is positioned. An embodiment of the current disclosure incorporates, includes, and/or utilizes a generator, and/or electrical power generating device, that is operationally and/or rotatably connected to the embodiment's water turbine.

Embodiments of the current disclosure include, but are not limited to, those that incorporate, include, and/or utilize "mono-directional water turbines" that cause a shaft to rotate with a first torque and/or a first direction of rotation in response to the passage of fluid through a channel in a first direction of flow, but cause that shaft to rotate with a second torque (or no torque) and/or a second direction of rotation (or no rotation) in response to the passage of fluid through the channel in a second, e.g., opposite, direction of flow.

Embodiments of the current disclosure include, but are not limited to, those that incorporate, include, and/or utilize "bi-directional water turbines" that cause a shaft to rotate with a first torque and/or a first direction of rotation in response to the passage of fluid through a channel in a first direction of flow, and cause that shaft to rotate with that same first torque and/or first direction of rotation in response to the passage of fluid through the channel in a second, e.g., opposite, direction of flow.

Embodiments of the current disclosure include, but are not limited to, those that incorporate, include, and/or utilize water turbines that are of known types, including, but not limited to, water turbines of the following types:

- Impulse turbines
- Pelton wheels
- Turgo wheels
- Crossflow turbines
- Impulse turbines with guide vanes
- Reaction turbines
- Propeller turbines
- Bulb turbines
- Straflo turbines
- Tube turbines
- Kaplan turbines
- Francis turbines
- Kinetic energy and/or free-flow turbines

- Low head turbines
- Axial flow rotor turbines
- Open Center Fan turbines
- Helical Turbines
- Cycloidic turbines
- Hydroplane blades
- FFP turbine generators
- Wells turbines
- Wells turbines with guide vanes
- Contra-rotating Wells turbines
- Savonius turbines In the case of impulse turbines, the turbine would typically if not always be included within a compartment of the embodiment that also contains air, so that the turbine would be made to rotate in the compartment by an absorption of the kinetic energy of the water striking it.

Embodiments of the current disclosure include, but are not limited to, those that incorporate, include, and/or utilize water and/or hydrokinetic turbines that are of unknown, undocumented, and/or unpublished types, designs, and configurations.

Embodiments of the current disclosure incorporate, include, and/or utilize one or more turbines, and The present disclosure includes embodiments that incorporate, include, and/or utilize different numbers, and/or any number, of water turbines: water turbines of any size(s), diameter(s), and/or power rating(s); water turbines fabricated from, comprised of, and/or utilizing any material, substance, and/or combination of materials and/or substances; water turbines of any operational category, design, principle of operation, and/or efficiency.

Embodiments of the current disclosure can incorporate, in the place of a turbine and generator, any device, system, or apparatus that converts water flow into electrical energy. One such class of devices is magnetohydrodynamic generators. In any embodiment of the invention including a turbine, a magnetohydrodynamic generator or any other water-flow-to-electrical-energy conversion machine can be substituted for the turbine.

The current disclosure includes embodiments that include, incorporate, and/or utilize, water and/or hydrokinetic turbines that are directly and/or indirectly connected to power take offs (i.e., "PTOs") including, but not limited to, PTOs comprising:

- an electrical generator
- a pump (e.g., of air or water)
- a gearbox and rotatably connected electrical generator and/or pump (e.g., of air or water)
- a hydraulic ram and/or piston and/or other means of converting linear motion, and,
- a cam shaft that is connected to a hydraulic ram and/or piston and/or other means of converting linear motion:

The current disclosure includes embodiments that include, incorporate, and/or utilize, water and/or hydrokinetic turbines that are directly and/or indirectly connected to linearly extensible components, and/or elements, of extensible PTOs such as hydraulic pistons, rack-and-pinon assemblies, sliding rods/shafts of linear generators, etc.

The present disclosure includes embodiments of different dimensions, areas, volumes, masses, and capacities, including, but not limited to, those possessing any of the following:

- waterplane areas of between 10 and 10,000 square meters,
- drafts of between 10 and 350 meters,
- tubular channels having average cross-sectional areas (with respect to sectional planes normal to longitudinal axes of the respective tubular channels) that are between 3 and 2,000 square meters
- tubular channels having lengths (along axes parallel to longitudinal axes of the respective tubular channels) that are between 10 and 200 meters
- water ballasts and/or water reservoirs having volumes that are between 50 and 40,000 cubic meters
- water ballasts and/or water reservoirs having masses that are between 50 thousand and 40 million kilograms
- water ballasts having relative masses equal to between 100% and 10,000% of the masses of the respective "dry" portions of the respective embodiments (i.e., those parts of the respective embodiments that are rigid and/or not comprised of water, such as structural components)
- the ability to generate between 0.5 kW and 10 MW when buffeted by ocean waves having significant wave heights of 1.5 or more meters, and dominant or significant wave periods of 7 or more seconds.

An embodiment of a device disclosed herein utilizes and/or incorporates at least one propulsion device, means, mechanism, component, system, module, and/or structure, to generate propulsion providing the device with the ability to reposition itself and/or change its geospatial location, e.g., thereby allowing it to seek out, follow, and/or position itself at a location characterized by favorable wave conditions, climates, and/or weather.

One self-propelled embodiment utilizes and/or incorporates a propulsion device and/or propulsive technology that converts ambient energy, e.g., of the wind, waves, currents, and/or tides, into propulsive thrust. Another self-propelled embodiment utilizes and/or incorporates a propulsion device and/or propulsive technology that utilizes a portion of the electrical energy, gravitational potential energy, pressure potential energy, and/or other form or type of energy generated by the embodiment in response to wave action in order to generate a propulsive thrust. The provision of self-propulsion permits devices located far from shore to be positioning, moved, and/or operated at locations in the sea where wave energies are greater than at locations proximate to a shoreline, thereby permitting these devices to achieve greater power-generation efficiencies and higher capacity factors.

The current disclosure includes an embodiment in which the embodiment possesses devices, mechanisms, structures, features, systems, and/or modules, that actively and purposely move the embodiment, primarily laterally, to new geospatial locations and/or positions. Such self-propulsion capabilities allow embodiments to achieve useful objectives, including, but not limited to, the following:

- to seek out optimal wave conditions
- to avoid adverse wave and/or weather conditions
- to avoid other ships, vessels, and/or potential hazards
- to avoid shallow waters, rocks, land masses, islands, and other geological hazards
- to maintain proximity to other embodiments, e.g., so as to exchange data with one another, and/or cooperate in the execution of relatively large computing tasks
- to provide energy to other vessels, and/or disaster areas in time of emergency, and,
- to return to port or areas of quiescent water in order to receive inspection, maintenance, repair, upgrades, and/or in order to be decommissioned.

Embodiments of the current disclosure may achieve self-propulsion by devices, mechanisms, structures, features, systems, and/or modules, that include, but are not limited to, the following:

- rigid sails
- flexible sails

- Flettner rotors
- keel-shaped tube chambers
- rudders
- ducted fans
- propellers
- propeller-driven underwater thrusters
- directed out-flows from water tubes or air tubes supplied with pressurized water or air by a hydrodynamic pumping action or a driven motor of the embodiment
- water jets
- submerged, wave-heave-driven flaps
- submerged, tethered airplane-like kites and/or drones
- inflatable water-filled bags, and
- sea anchors and/or drogues Embodiments of the current disclosure which, following the ejection of water from the upper mouth of a tapered tube, harvest energy from the gravitational and/or rotational-kinetic potential energy of water captured in a raised water reservoir, and/or harvest energy from the pressure potential energy of water captured within a pressurized reservoir that acts as a hydraulic accumulator, and subsequently release that water back into the body of water from which it came (e.g., after directing it to flow through a water turbine or filter or other flow governor) may achieve self-propulsion by directing the outflow and/or effluent from the reservoir and/or water turbine and/or filter and/or flow governor in a direction at least approximately parallel to the resting surface of the body of water on which the embodiment floats, thereby generating lateral thrust that is, at least to a degree, able to propel the those embodiments.

The coupling of such an effluent-generated thrust propulsion system with a device, mechanism, structure, feature, system, and/or module, that rotates the embodiments about their nominally vertical, longitudinal axes, and/or the utilization of two or more points of effluent-generated thrust propulsion which can be differentially controlled, allows such embodiments to not only be propelled, but also to be steered along a specific, adjustable, controllable, and/or desirable direction and/or course. The many devices, mechanisms, structures, features, systems, and/or modules, that permit such embodiments to be rotated about vertical axes, includes, but is not limited to: additional discharges of pressurized water from raised and/or pressurized water reservoirs from apertures, pipes, channels, and/or orifices, that are oriented so as to generate an at least partially tangential thrust to the embodiments: a rudder positioned adjacent to the mouth, aperture, and/or orifice, from which the thrust-generating turbine discharge is returned to the body of water; a rudder positioned at any location on the device in contact with, or beneath the surface of, the body of water on which the embodiments float: and/or a rotatable and/or adjustable sail.

Some embodiments of the present disclosure use one or more antennas, and/or one or more arrays of antennas, to facilitate communication, coordination, and/or the transfer of data, with a land-based receiver, one or more other embodiments and/or instances of the same embodiment, boats, submarines, buoys, airborne drones, surface water drones, submerged drones, satellites, and/or other receivers and/or transmitters utilizing one or more antennas.

Embodiments of the present disclosure utilize one or more types of antennas including, but not limited to, the following:

- parasitic antennas including, but not limited to:
- Yagi-Uda antennas
- Quad antennas
- wire antennas
- loop antennas
- dipole antennas
- half-wave dipole antennas
- odd multiple half-wave dipole antennas
- short dipole antennas
- monopole antennas
- electrically small loop antennas
- electrically large loop antennas
- log periodic antennas
- bow-tie antennas
- travelling wave antennas including, but not limited to:
- helical antennas
- Yagi-Uda antennas
- microwave antennas including, but not limited to:
- rectangular micro-strip antennas
- planar inverted-F antennas
- reflector antennas including, but not limited to:
- corner reflector antennas
- parabolic reflector antennas
- multi-band antennas
- separate transmission and receiving antennas Embodiments of the present disclosure utilize one or more types of antenna arrays including, but not limited to, the following:

- driven arrays including, but not limited to:
- arrays of helical antennas
- broadside arrays including, but not limited to:
- collinear arrays
- planar arrays including, but not limited to:
- those composed of unidirectional antennas
- reflective arrays including, but not limited to:
- half-wave dipole antennas in front of a reflecting screen
- curtain arrays
- microstrip antennas (e.g., comprised of arrays of patch antennas)
- phased arrays including, but not limited to:
- those with analog and/or digital beamforming
- those with crossed dipoles
- passive electronically scanned arrays
- active electronically scanned arrays
- low-profile and/or conformal arrays
- smart antennas, reconfigurable antennas, and/or adaptive arrays in which:
- a receiving array that estimates the direction of arrival of the radio waves and electronically optimizes the radiation pattern adaptively to receive it, synthesizing a main lobe in that direction
- endfire arrays including, but not limited to:
- log periodic dipole arrays
- parasitic arrays including, but not limited to:
- endfire arrays consisting of multiple antenna elements in a line of which only one is a driven element (i.e., connected to a transmitter or receiver)
- log periodic dipole arrays
- Yagi-Uda antennas
- Quad antennas An embodiment of the current disclosure utilizes and/or incorporates at least one phased array antenna (and/or other type of antenna) across and/or over at least one broad area of the embodiment's upper surfaces, walls, and/or decks.

An embodiment of the present disclosure utilizes a phased array of antennas, e.g., dipole antennas, arrayed across an upper exterior surface of the embodiment. Because such a phased array is deployed across such a broad and/or expansive area and/or array, the embodiment is provided with the opportunity to achieve a highly resolved directionality and a significant and/or optimized degree of signal gain.

An embodiment of the present disclosure utilizes a phased array of antennas deployed across a broad, nominally horizontal upper exterior surface of the embodiment, which permits the phased array and/or the embodiment to achieve an optimized signal strength, signal-to-noise ratio, and data exchange rate, with respect to electromagnetically-mediated communications and/or exchanges of signals and/or data with a satellite. Such a capability is useful to a self-propelled embodiment that executes computing tasks received from a remote computer or computing network by satellite, and that returns computing results to a remote computer or computing network by satellite.

An embodiment of the present disclosure utilizes a phased array of antennas deployed across a broad, at least partially vertical lateral exterior surface of the embodiment, e.g., such as one or more sides of the embodiment, and this phased-array deployment facilitates the embodiment's communications and/or to exchanges of data with remote antennas, e.g., those of other devices and/or terrestrial antennas, and with any associated and/or linked computers or computing networks. Such remote antennas might be associated with, and/or integrated within, a variety of systems, stations, and/or locations, including, but not limited to terrestrial stations, airborne drones, ocean-going surface drone vessels, ocean-going submerged drone vessels, piloted aircraft, and satellites.

The current disclosure includes, but is not limited to, embodiments that incorporate, include, and/or utilize, phased arrays comprised of individual antennas with any relative and/or absolute orientation relative to the rest of the embodiment. The scope includes embodiments in incorporating, including, and/or utilizing, phased arrays comprised of individual antennas (of which the phased array is comprised) having any orientation relative to a respective embodiment, and having any orientation with respect to one another (e.g., parallel, normal, radial, random, etc.).

The current disclosure includes, but is not limited to, embodiments that incorporate, include, and/or utilize, phased arrays of any size, phased arrays comprised of any number of individual and/or constituent antennas, and/or phased arrays comprised of constituent antennas of any size. The current disclosure includes, but is not limited to, embodiments that incorporate, include, and/or utilize, phased arrays characterized by, and/or capable of, any transmission power, signal strength, and/or gain, and/or any degree of signal amplification with respect to received signals.

An embodiment of the present disclosure incorporates on an upper exterior deck and/or surface a phased array utilizing digital beamforming, and also utilizing gyroscopes and/or accelerometers to track changes in the orientation of the embodiment in order to reduce the latency between such changes and corresponding corrections to the gain and/or directionality of the phased array's beam, e.g., to preserve an optimal beam orientation with respect to a satellite.

An embodiment of the present disclosure incorporates on an upper exterior deck and/or surface a phased array transmitting and receiving electromagnetic radiation at least two frequencies, wherein the beamwidth of a first frequency is significantly greater than the beamwidth of a second frequency. Such an embodiment uses the relatively broad beam of the first frequency to localize and track a target receiver and/or transmitter, e.g., a satellite, and to adjust the angular orientation and/or beamwidth of the relatively narrow beam of the second frequency so as to optimize the second beam's gain with respect to the target receiver and/or transmitter.

An embodiment of the present disclosure incorporates dipole antennas attached to the periphery of the buoy and oriented approximately radially about the periphery of an exterior deck of the embodiment (with respect to a vertical longitudinal axis of the embodiment and/or its inertial water tube). The embodiment's dipoles benefit from the proximate ground plane created by the sea and its surface, wherein the sea and/or its surface reflect upward any beam lobe that might have otherwise been directed downward, thus increasing the gain of the upward beam.

An embodiment of the present disclosure stores at least a portion of the electrical energy (and/or another form(s) of energy) that it extracts from ambient waves in an energy storage device, component, and/or system. Embodiments of the present disclosure include, incorporate, and/or utilize, energy storage devices, components, and/or systems, including, but not limited to:

- batteries,
- capacitors,
- compressed air energy storage systems, e.g., tanks, pumps, and generators, and
- electrolyzers and fuel cells, e.g., that generate and consume hydrogen as an energy store.

An embodiment of the present disclosure utilizes at least a portion of the energy that it stores in order to provide approximately steady and/or continuous electrical power to at least a portion of the computers and/or computer networks contained therein. An embodiment of the present disclosure responds to a diminution and/or reduction in the rate at which it produces and/or generates electrical power (e.g., in response to suboptimal wave conditions) by incrementally shutting down computers and/or computer networks therein, and/or adjusting the clock frequency of computers or integrated circuits contained therein, and/or by adjusting the duty cycle and/or CPU consumption of computational processes being run on one or more computers of the embodiment, e.g. by periodically pausing and restarting such processes, or by adjusting the scheduling of such processes by the kernel of an operating system of one or more computers of the embodiment. An embodiment of the present disclosure responds to a resumption and/or return of a nominal rate electrical power production and/or generation (e.g., in response to a resumption of optimal wave conditions) by incrementally turning on computers and/or computer networks therein.

An embodiment of the present disclosure activates and deactivates subsets of its computers, and/or changes a clock frequency (clock rate) of an integrated circuit thereof (e.g. a CPU, GPU, or ASIC thereof), thereby changing and/or adjusting the number and/or percentage of its computers that are active at any given time, and/or the percentage of available computational power that is available at any given time, so as to correspondingly change and/or adjust the amount of electrical power required by those computers (i.e., the "electrical load"), in response to changes in wave conditions, and/or changes in the amount of electrical power generated by its power takeoff, so as to match the amount of power being consumed by the computers to the amount being generated (i.e., to match the generation power level to the load).

An embodiment of the present disclosure incorporates, and/or utilizes components and/or mechanisms, including, but not limited to: batteries, capacitors, springs, flywheels, and/or chemical fuel (e.g. hydrogen) generators and storage mechanisms. These energy storage mechanisms permit the embodiment to store, at least for a short time (e.g. 10-20 seconds), at least a portion of the electrical and/or mechanical energy generated by the embodiment in response to wave motion. Such energy storage may have the beneficial effect of permitting the embodiment to integrate and/or smooth the generated electrical power.

An embodiment of the present disclosure, when tethered to other embodiments and/or devices, may further stabilize its own energy supplies, as well as helping to stabilize the energy supplies of the other tethered devices, by sharing electrical energy, batteries, capacitors, and/or other energy storage means, capacities, components, and/or systems, and/or by sharing and/or distributing generated power, across a power bus and/or grid that it shares with the other tethered devices. This capability and deployment scenario will facilitate the ability of some tethered collections and/or farms of embodiments to potentially utilize a smaller total number of batteries, capacitors, and/or other energy storage means, components, and/or systems, since the sharing of such components, systems, and/or reserves will tend to reduce the amount of energy that any one device will need to store in order to achieve a certain level of stability with respect to local stochastic variations in generated power and/or computing requirements.

An embodiment of the present disclosure incorporates, and/or utilizes, sufficient energy storage means, capacities, components, and/or systems, so that a sufficiently great amount of energy may be thus stored, thereby allowing the embodiment to continue powering a greater number of computers than could be powered without energy storage and/or buffering, i.e., by relying only on the utilization of inconstant, fluctuating, instantaneous levels of generated electrical power. For example, the embodiment is able to store enough power to energize all of its computers for a day in the absence of waves, and is therefore able to avoid reducing its number of active computers during a "lull" in the waves, and to continue energizing them until a nominally energetic wave state resumes.

An embodiment of the present disclosure applies, consumes, and/or utilizes, at least 50% of the electrical power that it generates in order to energize, power, and/or operate, its respective computing devices and/or circuitry. An embodiment of the present disclosure applies, consumes, and/or utilizes, at least 90% of the electrical power that it generates in order to energize, power, and/or operate, its respective computing devices and/or circuitry. An embodiment of the present disclosure applies, consumes, and/or utilizes, at least 99% of the electrical power that it generates in order to energize, power, and/or operate, its respective computing devices and/or circuitry (including CPUs, memory, and/or ASICs).

An embodiment of the present disclosure utilizes a portion of the electrical energy that it generates in order to energize computers that perform computational tasks specified by remote operators, computers, and/or networks, and transmitted to the embodiment, e.g., by satellite. The embodiment, and the computers of which it is comprised, operate with a "power usage effectiveness" (PUE) of no more than 1.1. An embodiment of the present disclosure utilizes a portion of the electrical energy that it generates in order to energize computers that perform computational tasks specified by remote operators, computers, and/or networks, and transmitted to the embodiment, e.g., by satellite. The embodiment, and the computers of which it is comprised, operate with a "power usage effectiveness" (PUE) of no more than 1.01. An embodiment of the present disclosure utilizes a portion of the electrical energy that it generates in order to energize computers that perform computational tasks specified by remote operators, computers, and/or networks, and transmitted to the embodiment, e.g., by satellite. The embodiment, and the computers of which it is comprised, operate with a "power usage effectiveness" (PUE) of no more than 1.001.

An embodiment of the present disclosure turns at least a portion of its computing devices and/or integrated circuits on and off (and/or adjusts their clock rate) so as to at least approximately match the amount of electrical power being generated by the embodiment at any given moment, and/or to match the rate at which the embodiment is extracting energy from the waves that buffet it.

The power profile of a wave energy converter can be irregular, i.e. it can generate large amounts of power for a few seconds, followed by a pause of a few seconds when no power is generated. ASIC chips designed to computing hash values for the "mining" of cryptocurrencies can typically compute many millions of hash values per second. An embodiment of the present disclosure, incorporates, and/or utilizes, energy control circuits that turn on and energize ASICs and/or CPUs when the embodiment is generating power, and de-energize ASICs and/or CPUs when the embodiment is not generating power. An embodiment of the present disclosure, incorporates, and/or utilizes, energy control circuits that energize a quantity of ASICs and/or CPUs that corresponds and/or is proportional to the amount of power that the embodiment is generating at any particular time, and/or adjusts the clock rate or processor load of said ASICs and/or CPUs in a manner approximately proportional to the amount of power that the embodiment is generating at any particular time. In this manner, the amount of power storage and/or buffering equipment required of the embodiment can be reduced. An embodiment of the present disclosure, incorporates, and/or utilizes, computing circuitry that is at least partially energized and de-energized on a second-by-second basis. An embodiment of the present disclosure, incorporates, and/or utilizes, computing circuitry that is at least partially energized and de-energized on a millisecond by millisecond basis.

An embodiment of the present disclosure selects those tasks that it will attempt to compute and/or execute in order to at least approximately match the amount of future computing power and/or computing capacity, and/or the amount of time or energy, required to complete those tasks, with the amount of power and/or energy estimated and/or forecast to be generated by the embodiment at a future time.

An embodiment of the present disclosure turns at least a portion of its computing devices on and off as needed in order to at least approximately match the amount of electrical power that its computers forecast and/or estimate that the embodiment's power take off will generate at a future time. An embodiment of the present disclosure turns at least a portion of its computing devices on and off (or adjusts the clock rate or processor load of integrated circuits) as needed in order to at least approximately match the amount of electrical power that has been forecast and/or estimated by a computer on another embodiment or device, and/or on a computer at a remote location (e.g., a land-based facility), that the embodiment's power take off will generate at a future time.

An embodiment of the present disclosure, when deployed within a farm configuration in which the embodiment, and other embodiments and/or devices, are electrically connected to one another and/or to one or more terrestrial and/or other sources of electrical power, may, e.g. when its power generation exceeds its computing power requirements, send excess generated electrical power to another embodiment, e.g., for storage, or to shore (e.g., to an onshore grid connection). Conversely, an embodiment deployed in such a farm configuration, in which the embodiment, and other embodiments and/or devices, are electrically connected to one another and/or to one or more terrestrial and/or other sources of electrical power, may, when its computing demands require more electrical energy than can be provided through its own conversion of wave energy (e.g. when waves are small), draw energy from one or more of the other embodiments and/or devices to which it is electrically connected, and/or from the one or more terrestrial sources of power to which it is electrically connected so as to continue computing and/or recharge its energy reserves.

An embodiment of the present disclosure facilitates its communication, coordination, and/or its transfer of data, with the respective computing devices and/or circuits of one or more other embodiments and/or devices by means of a common distributed network, e.g. Ethernet, Infiniband, or TCP/IP.

An embodiment of the present disclosure facilitates its communication, coordination, and/or its transfer of data, with the respective computers, circuits, and/or internal and/or physical networks on, and/or incorporated within, one or more other embodiments and/or devices by means of virtual and/or electromagnetic network connections and/or links, e.g. WAN, Wi-Fi, satellite-mediated, radio, microwave, and/or modulated light. The embodiment shares data, programs, and/or otherwise cooperates, with the one or more other embodiments and/or devices without the benefit of a physical (wired) network connection.

An embodiment of the present disclosure transmits, receives, transfers, shares, and/or exchanges, data with one or more other embodiments and/or devices by means of acoustic and/or electrical signals transmitted through the body of water and/or seawater on which they float. By inducing localized sounds, acoustic signals, electrical currents, and/or electrical charges, within the seawater that surrounds it, the embodiment creates acoustic and/or electrical signals in the seawater that travel through the seawater, and/or radiate away from the embodiment within the seawater, and can be detected and/or received by the one or more other embodiments and/or devices. In this way, a two-way exchange of data, as well as broadcasts of data from one embodiment to one or many others can be completed, executed, and/or realized.

When other embodiments and/or devices are so distant from an embodiment of the present disclosure that line-of-sight communication options, e.g. modulated light, are not available, possible, feasible, and/or practical, then the embodiment facilitates its sharing, and/or exchange, of data with those other distant embodiments and/or devices by daisy-chaining, through intermediate embodiments and/or devices, inter-device communications, signals, transmissions, and/or data transfers. Data may be exchanged between two widely separated embodiments through the receipt and re-transmission of data by embodiments and/or devices located at intermediate positions from the originating and target embodiments and/or devices.

An embodiment of the present disclosure transmits, receives, transfers, shares, and/or exchanges, data with receivers at distant locations, e.g., with other embodiments and/or devices, and/or with remote objects, facilities, computers, and/or networks, by means of modulated light and/or "flashes" shined on, and/or reflected or refracted by, atmospheric features, elements, particulates, droplets, etc. An embodiment encodes data (with the encoding preferably including an encryption of the data) into a series of modulated light pulses and/or flashes that are projected into the atmosphere in a direction at least an approximately toward a distant receiver, e.g., toward other embodiments and/or devices, and/or toward remote objects, facilities, computers, and/or networks. The receiver, e.g. through the use of wavelength-specific filters, and/or temporally specific frequency filters, will then detect at least a portion of the transmitted light pulses and decode the encoded data. The return of data by the receiver to the embodiment is accomplished in the same or similar manner.

Such a "reflected and/or refracted and light-modulated" data stream can be made specific to at least a particular wavelength, range of wavelengths, pulse frequency, and/or range of pulse frequencies. By such a data communication scheme and/or process, an individual embodiment can be configured to transmit data to one or more individual other embodiments and/or devices (e.g. on separate wavelength-specific channels), and/or to a plurality of other embodiments and/or devices. The embodiment can be configured to receive data from one or more individual other embodiments and/or devices (e.g. on separate wavelength-specific channels), and/or from a plurality of other embodiments and/or devices.

An embodiment of the present disclosure includes a cable that is directly and/or indirectly connected to at least one of the embodiment's computers and/or other electronic devices, components, networks, and/or systems. One end of the cable is suspended from the embodiment adjacent to the surface of the body of water on which the embodiment floats. When a suitably configured vessel, e.g., an unmanned autonomous vessel, approaches the embodiment, it may secure and connect to the free end of that cable, and thereafter may communicate through that cable with the computers and/or other electronic devices, components, and/or systems, on board the embodiment to which the cable is connected. Through the embodiment's "exterior data access cable", another suitably configured vessel can exchange copious amounts of data with computers and/or other electronic devices, components, and/or systems, on the embodiment, e.g., in order to download the results of a calculation and/or simulation performed on the embodiment, and/or to upload a body of data and/or applications to be executed in order to perform a calculation.

Embodiments of the present disclosure achieve this remote data exchange capability by means of exterior data access cables comprising, at least in part, cables of known types, including, but not limited to, the following:

fiber optic cables
LAN cables
RS-232 cables, and
Ethernet cables.

Embodiments of the present disclosure may exchange data with other computers, vessels, networks, data-relay stations, and/or data repositories, by means of communication technologies including, but not limited to, the following types:

Wi-Fi
radio
pulse-modulated underwater sounds, e.g., sonars
pulse-modulated lasers
optical phased arrays
pulse-modulated LEDs, and,
physical semaphores (e.g., 2D arrays of MEMS devices).

Embodiments of the present disclosure may exchange data with other computers, vessels, networks, data-relay stations, and/or data repositories, by means of suitably equipped communication intermediaries and/or relays including, but not limited to, the following types:

- boats and/or other manned surface vessels
- autonomous surface vessels
- submarines
- autonomous underwater vessels
- planes
- unmanned aerial vehicles
- satellites
- balloons
- ground stations, e.g., transmission stations positioned on shore, and,
- other embodiments of the current disclosure.

The current disclosure includes embodiments in which at least one "pitch-inhibiting" weight is suspended beneath and/or from, and/or attached to a lower portion of, one or more of the water tubes of the respective embodiments by flexible cables and/or rigid struts and/or other structures. When the orientation of a nominally vertical longitudinal axis of those embodiments deviates from vertical, and/or from being normal with and/or to the resting, nominal surface of the body of water on which each respective embodiment floats, then the downward gravitational force of the weight is imparted to the bottom of the water tube of the respective embodiments, and/or to the bottom of the buoy and/or pressurized reservoir of the respective embodiments, thereby creating a restoring torque. When a pitch-inhibiting weight is suspended beneath and/or from, and/or attached to a lower portion of, two or more water tubes, then a pitching motion of the respective embodiment causes the pitch-inhibiting weight to impart a downward force to the bottom of the most raised tube (i.e., the tube with the least draft), thereby creating a restoring torque.

The current disclosure includes embodiments in which various "water ballast chambers," compartments, voids, spaces, and/or containers, within the embodiment may be filled with, and/or emptied of, water to a desired degree, thereby altering the average density of the embodiment, and its average depth (i.e., waterline) in the water on which it floats. In many embodiments, the water reservoir into which water is added from ejections from the water tube serves as a water ballast chamber.

By emptying water from one or more of these water ballast chambers, an embodiment can reduce its average density and rise up to a shallower average depth, and/or lower its waterline, thereby projecting its upper portions out of the water and above potentially damaging storm waves and/or surges. In some embodiments, a turbine or flow governor of the embodiment is controlled to change a flow rate of water from the embodiment, to increase or decrease the amount of water in a water reservoir of the embodiment, causing the average density of the embodiment to increase or decrease.

By increasing the volume of water in one or more of these water ballast chambers or water reservoirs, an embodiment can increase its average density and sink down to a greater average depth, and/or raise its waterline, for example, a depth in which it can become more or less responsive to the waves passing beneath and/or around it, thereby increasing the amount of power it is able to extract from those waves, or limiting the amount of energy absorbed from those waves (e.g. to provide additional structural protection).

An embodiment of the current disclosure utilizes an elevated reservoir in which to store water ejected from its inertial water tube. Another embodiment of the current disclosure utilizes a pressurized reservoir in which to store water ejected from its inertial water tube. The reservoirs of both of these embodiments can be equipped with respective valves, that when actuated by the embodiment's control system, directly discharge water from the respective reservoirs and into the body of water on which the embodiment floats, thereby at least partially bypassing each respective embodiment's nominal discharge conduit or tube (i.e. that conduit or tube which contains, and/or incorporates, a water turbine or other flow governor).

An embodiment of the current disclosure utilizes a reservoir in which to store water ejected from its inertial water tube. And, the embodiment utilizes a second reservoir utilized for the creation of ballast. That ballast is comprised, at least in part, of water, and a pump, when appropriately actuated by the embodiment's control system, will pump additional water from the body of water on which the embodiment floats and into the ballast reservoir, thereby increasing the mass and inertia, of the embodiment. That pump (and/or a second pump) when appropriately actuated by the embodiment's control system, will pump additional water out of the ballast reservoir and back into the body of water on which the embodiment floats, thereby decreasing the mass and inertia, of the embodiment.

The current disclosure includes embodiments that are capable of adjusting their included mass and/or inertia and/or average density by any and all means, methods, schemes, technologies, systems, and/or modules, including controlling the amount of water in an included water reservoir fed by ejections from a wave-driven inertial water tube, and/or one or more ballast compartments supplied by water by other means besides ejections from a wave-driven inertial water tube.

The current disclosure includes embodiments in which the effective mass of each embodiment is augmented and/or adjusted, at least in part, through the addition and/or removal of water from within one or more chambers or voids within the embodiments.

An embodiment holds water within the embodiment's buoy or buoyant structure, e.g., in a chamber separate from its water reservoir. An embodiment holds water within the hollow wall of its water tube, e.g., within the gap between the water tube's inner wall and its outer wall wherein the inner wall is a tubular structure approximately coaxial with the tubular outer wall. An embodiment holds water within a chamber, container, and/or void, adjacent to, and/or embedded within, an upper surface of the buoy, the water tube, and/or another part or portion of the embodiment.

The current disclosure includes embodiments in which the inherent mass of each of those embodiments is augmented, at least in part, through the addition of sand, gravel, and/or some other granular or powdered hard materials. This material also includes, but is not limited to, dirt, rocks, crushed cement, bricks, and/or other heavy and/or scrap material, e.g., such as discarded or waste materials that are available for recycling.

The current disclosure includes embodiments in which the inherent mass of each of those embodiments is augmented, at least in part, through the addition of cement and/or cementitious materials.

The current disclosure includes embodiments in which the inherent mass of each of those embodiments is augmented, at least in part, through the addition of a material that is "loose" and/or able to be shoveled, poured, and/or imported to the embodiment. This can include, but is not limited to, aggregate materials.

Some embodiments of the present disclosure float freely, and/or "drift," adjacent to a surface of water in a passive manner which results in their movement in response to wind, waves, currents, tides, etc. Some embodiments are anchored and/or moored so as to retain an approximately constant position relative to an underlying position on the seafloor. And, some embodiments are self-propelled, and/or capable of exploiting natural movements of air and/or water to move in a chosen, deliberate, calculated, and/or selected direction, at least to an approximate degree.

Some embodiments of the present disclosure are self-propelled and/or capable of exploiting natural movements of air and/or water so as to change their positions in at least a somewhat controlled manner. Self-propelled embodiments may achieve their directed motions by means including, but not limited to discharges of captured water (e.g., from their respective reservoirs), rigid sails, ducted fans, propellers, sea anchors, Flettner rotors, sea anchors, and/or drogue anchors.

Some embodiments of the present disclosure are deployed so as to be free-floating and so as to drift with the ambient winds, currents, and/or other environmental influences that will affect and/or alter their geospatial locations.

Some embodiments of the present disclosure are deployed such that individual devices are anchored and/or moored (e.g. to the seafloor) so as to remain approximately stationary and/or to remain at an approximately constant geospatial position. Some embodiments of the present disclosure which are anchored and/or moored are anchored and/or moored proximate to other such devices and may even be moored to one another. These embodiments may be deployed in "farms" and, of those embodiments which utilize a portion of their power to perform calculations, their respective computers may be directly and/or indirectly interconnected and/or networked such that they may interact, e.g. when cooperating to complete various computing tasks. The computing embodiments deployed in such farms may communicate with computers and/or networks on land by means of one or more subsea data transmission cables, including, but not limited to: fiber optic cables, LAN cables, Ethernet cables, and/or other electrical cables. The computing embodiments deployed in such farms may communicate with computers and/or networks on land by means of one or more indirect devices, methods, and/or means, including, but not limited to: Wi-Fi, radio, microwave, pulsed and/or modulated laser light, pulsed and/or modulated LED-generated light, and/or satellite-enabled communication.

Some computing embodiments of the present disclosure which drift and/or are self-propelled, may directly and/or indirectly interconnect their computers so that they may interact, e.g. when cooperating to complete various computing tasks. For example, drifting devices may act as clusters within a larger virtual cluster network so as to cooperatively complete computing tasks that are larger than individual devices can individually complete. Self-propelled devices, regardless of their respective device-specific applications, may travel the seas together in relatively close proximity to one another, exchanging information via radio, satellite, and/or other indirect means and/or channels, though not directly and/or physically connected (except by the water on which they all float).

Drifting, and/or self-propelled, computing embodiments may communicate with computers and/or networks on land, and/or with each other, by means of one or more indirect devices, methods, and/or means, including, but not limited to: radio, microwave, pulsed and/or modulated laser light, pulsed and/or modulated LED-generated light, and/or satellite-enabled communication.

Some embodiments of the present disclosure are deployed so as to be "virtually" interconnected to one or more other devices (e.g. by Wi-Fi, radio, microwave, modulated light, satellite links, etc.), and to drift together as a loosely-coupled group driven by the ambient winds, currents, and/or other environmental influences that will affect and/or alter their respective geolocations.

Some embodiments of the present disclosure are deployed so as to be tethered, and to be directly inter-connected, to one or more other devices, wherein one or more of the tethered devices are anchored and/or moored (e.g. to the seafloor), and wherein one or more of the tethered devices may not be anchored, but only tethered to other devices, such that the tethered group of devices remain approximately stationary, thereby limiting the range of motion and/or position of the entire tethered assembly.

Some embodiments, when directly and/or indirectly inter-connected with one or more other devices, whether drifting or anchored, will link their respective computers and/or computing networks, e.g. by means of satellite-mediated inter-device communications of data, so as to act, behave, cooperate, and/or compute, as subsets of a larger, integrated, and/or inter-connected set of computers. Such inter-connected and/or cooperating devices may utilize, and/or assign to, a single device (or subset of the inter-connected group of devices) to be responsible for a specific portion, part, and/or subset, of the system-level calculations, estimates, scheduling, data transmissions, etc., on which the group of devices depends.

The current disclosure optimizes the harvesting of energy from ocean waves with a technology that has the potential to be highly reliable, long-lived, and cost effective.

Embodiments of the current disclosure offer many advantages over the prior art, including, but not limited to the ability to capture and convert wave energy with a simple and robust device. For example, embodiments capturing water ejected from their respective tapered tubes within respective elevated and/or pressurized reservoirs, can incorporate, as their only moving parts, a water turbine rigidly and rotatably connected to a generator, or can incorporate no moving parts in the case of the use of a magnetohydrodynamic generator or another flow governor that converts water pressure and flow directly to electrical energy with no moving parts. Such embodiments can operate without the need for valves, motors, and/or other components which might require maintenance or replacement.

Embodiments of the current disclosure can operate far from shore where wave resources are more energetic and consistent, thereby providing those embodiments with greater capacity factors and efficiencies, and with relatively lower costs of energy.

Embodiments of the current disclosure can operate far from shore, in the absence of moorings to the seafloor and connections to subsea power cables, thereby avoiding the costs of deploying such seafloor moorings (and the environmental damage that can result during such deployments), the costs of deploying such subsea power cables, and the costly delays associated with the arduous process of gaining the permits, licenses, and/or other permissions required for deployments that are moored to the seafloor and connected to subsea power cables.

If the electrical power generated by a wave-energy converting device is to be transmitted to land, e.g. where it might be added to an electrical grid, then that power must have a channel, method, and/or means, with which to do so. Many developers of wave energy devices choose to use subsea electrical power cables to transmit the power generated by anchored farms of their devices to shore. However, these cables are expensive. Their deployment (e.g. their burial in the seafloor) is also expensive. And, the anchoring and/or mooring of a farm of such wave energy devices close to shore can be difficult and expensive and can disrupt delicate subsea ecosystems.

The current disclosure allows wave energy devices to make good use of the electrical power that they generate without transmitting it to land. And, because disclosed embodiments are free to operate far from land, they are also able to be deployed where waves are most consistent, and of optimal energies.

While the current disclosure does not preclude the anchoring of the disclosed devices, it nevertheless discloses embodiments that make good use of the electrical power that they generate without being anchored and/or moored to the seafloor, and without a connection to an electrical cable able to transmit the power they generate back to shore.

Free-floating embodiments of the current disclosure can be placed in the water (at appropriate locations) immediately following their fabrication, and soon thereafter, if not immediately, begin operating and generating revenues, e.g., consuming their own generated electrical power in order to achieve onboard production of useful products and/or services. Self-propelled embodiments of the current disclosure can be placed in the water at a greater variety of locations, and then propel themselves to optimal energy-harvesting locations, immediately following their fabrication.

An embodiment of the current disclosure utilizes and/or incorporates computing devices that consume at least a portion of the electrical energy generated by the embodiment in response to wave action in order to perform computations transmitted to it from a remote source (i.e., from a source not physically—rigidly or flexibly—connected to the embodiment) such as via encoded electromagnetic transmissions from a satellite or other remote antenna of executable codes and/or data and/or programs and/or instructions. A substantial portion of the electrical power generated by the embodiment in response to wave action is used to energize the embodiment's cluster(s) of computers, at least some of the time.

An embodiment of the current disclosure includes, incorporates, energizes, powers, operates, and/or utilizes, a plurality of computers to perform computational tasks that are not directly related to the operation, navigation, inspection, monitoring, and/or diagnosis, of the embodiment, its power take-off, and/or any other component, feature, attribute, and/or characteristic of its structure, systems, sub-systems, and/or physical embodiment, but is rather supplied by a third-party customer. Such an embodiment may contain computers, computing systems, computational systems, servers, computing networks, data processing systems, and/or information processing systems, that are comprised of, but not limited to, the following modules, components, sub-systems, hardware, circuits, electronics, and/or modules:

graphics processing units (GPUs)
computer processing units (CPUs)
tensor processing units (TPUs)
hard drives
flash drives
solid-state drives (SSDs)
random access memory (RAM)
field programmable gate arrays (FPGAs)
application-specific integrated circuits (ASICs)
network switches, and
network routers.

An embodiment of the current disclosure includes, incorporates, energizes, powers, operates, and/or utilizes, computers, computing systems, computational systems, servers, computing networks, data processing systems, and/or information processing systems, that are powered, at least in part, from electrical energy extracted by the embodiment from the energy of ocean waves.

An embodiment of the current disclosure includes, incorporates, energizes, powers, operates, and/or utilizes, incorporate, utilize, energize, and/or operate, computers incorporating CPUs, CPU-cores, inter-connected logic gates, ASICs, ASICs dedicated to the mining of cryptocurrencies, RAM, flash drives, SSDs, hard disks, GPUs, quantum chips, optoelectronic circuits, analog computing circuits, encryption circuits, and/or decryption circuits.

An embodiment of the current disclosure includes, incorporates, energizes, powers, operates, and/or utilizes, computers specialized and/or optimized with respect to the computation, and/or types of computation, characteristic of, but not limited to: machine learning, neural networks, cryptocurrency mining, graphics processing, graphics rendering, image object recognition and/or classification, image rendering, quantum computing, quantum computing simulation, physics simulation, financial analysis and/or prediction, and/or artificial intelligence.

An embodiment of the current disclosure includes, incorporates, energizes, powers, operates, and/or utilizes, computers that may at least approximately conform to the characteristics typically ascribed to, but not limited to: "blade servers." "rack-mounted computers and/or servers," and/or supercomputers.

An embodiment of the current disclosure includes, incorporates, energizes, powers, operates, and/or utilizes, at least 100 computing circuits and/or CPUs. Another embodiment includes, incorporates, energizes, powers, operates, and/or utilizes, at least 1,000 computing circuits and/or CPUs. Another embodiment includes, incorporates, energizes, powers, operates, and/or utilizes, at least 2,000 computing circuits and/or CPUs. Another embodiment includes, incorporates, energizes, powers, operates, and/or utilizes, at least 5,000 computing circuits and/or CPUs. Another embodiment includes, incorporates, energizes, powers, operates, and/or utilizes, at least 10,000 computing circuits and/or CPUs. Another embodiment includes computers that are part of a cluster composed of computers residing on at least 10 independently floating and independently self-propelled wave energy converters.

An embodiment of the current disclosure includes, incorporates, energizes, powers, operates, and/or utilizes, computing chips and/or circuits that contain two or more CPUs and/or computing "cores" per chip and/or per circuit.

An embodiment of the current disclosure includes, incorporates, energizes, powers, operates, and/or utilizes, computing chips and/or circuits that contain a graphics processing unit (GPU) within the chips and/or within a computing circuit.

At least a portion of the heat generated by the embodiment's computers is transmitted (e.g. passively and/or conductively) to the water on which the embodiment floats, and/or to the air surrounding the embodiment.

Much, if not all, of the energy imparted to computational devices within an embodiment of the present disclosure will become heat. And, excessive levels of heat might damage or impair those computational devices and/or adjacent electronics, systems, structures, modules, and/or parts of the embodiment. Therefore, it is prudent for an embodiment to remove heat from its "active" computational devices as quickly and/or efficiently as possible, and/or at least quickly enough to avoid excessive heating of the computational devices.

An embodiment of the present disclosure facilitates the passive convective cooling of at least some of its computational devices, and/or of the ambient environments of those computation devices. An embodiment of the present disclosure actively removes heat from its computational devices, and/or from the ambient environments of those computational devices.

An embodiment of the present disclosure passively cools its computing devices by facilitating the convective and/or conductive transmission of heat from its computing devices and/or their environment to the water on which the device floats, e.g. through a thermally conductive wall, and/or fins or heat baffles, separating the devices from the water.

In an embodiment, the conduction of heat from computing devices takes place via a conductive and/or metal wall in a conduit through which water flows from a reservoir of the embodiment to a turbine or magnetohydrodynamic generator of the embodiment. In an embodiment, the conduction of heat from computing devices takes place via a conductive and/or metal wall in a conduit through which water flows from a turbine or magnetohydrodynamic generator of the embodiment to the body of water on which the embodiment floats. In either of these cases, heat can be conducted to the conductive and/or metal wall by the evaporation and/or boiling of a liquid substance in which computing circuits of the embodiment are immersed, followed by condensation of said substance on said wall.

An embodiment of the present disclosure passively cools its computing devices by facilitating the convective and/or conductive transmission of heat from its computing devices and/or their environment to the air above the water on which the device floats, e.g. through a thermally conductive wall, and/or fins or heat baffles, separating the devices from the air.

An embodiment of the present disclosure actively cools its computing devices by means of a heat exchanger that absorbs heat from the computing devices and/or their environment, and carries it to a heat exchanger in thermal contact with the water on which the device floats and/or in thermal contact with the air above that water. Such thermal contact may be the result of direct exposure of the exchanger with the water and/or air, or it may be the result of indirect exposure of the exchanger with the water and/or air by means of the exchanger's direct contact with a wall or other surface in direct or indirect contact with the water and/or air.

An embodiment of the present disclosure passively cools its computing devices, and/or of the ambient environment of its computing devices, by providing a thermally conductive connection between the computing devices and the water on which the embodiment floats and/or the air outside the embodiment. An embodiment promotes this conduction of heat from the computing devices to the ambient water and/or air by using "fins" and/or other means of increasing and/or maximizing the surface area of the conductive surface in contact with the water and/or air. An embodiment promotes this conduction of heat from its computing devices to the ambient water by using metallic (e.g., copper and/or copper/nickel) heatsink poles and/or plates extending into the water and/or air outside the embodiments, and/or into the chamber (s) in which at least a portion of the embodiment's computing devices are located.

The computers of an embodiment of the present disclosure are positioned, located, and/or operated, within sealed chambers containing air, nitrogen, and/or another gas or gases. The computers of an embodiment of the present disclosure are positioned, located, and/or operated, within chambers into which air, nitrogen, and/or another gas or gases, are pumped.

Because a computing device operating in an air environment (e.g. inside a compartment or module on and/or within an embodiment of the present disclosure) may not transmit heat with sufficient efficiency to prevent and/or preclude an overheating of the computing device, an embodiment of the present disclosure incorporates, includes, and/or utilizes, a thermally conductive fluid and/or gas to facilitate the passage of heat from the various components (e.g. the CPUs) within its computing devices to the ambient air or water proximate to the embodiment thereby reducing the risk of overheating, damaging, and/or destroying some, if not all, of its computing devices.

An embodiment of the present disclosure promotes the conduction of heat from its computing devices to the ambient air and/or water by immersing, surrounding, bathing, and/or spraying, the computing devices with and/or in a thermally conductive fluid and/or gas. The thermally conductive fluid and/or gas is ideally not electrically conductive, as an electrically conductive might tend to short-circuit, damage, and/or destroy, the computing devices. The thermally conductive fluid and/or gas ideally has a high heat capacity that allows it to absorb substantial heat without experiencing a substantial increase in its own temperature. The thermally conductive fluid and/or gas carries at least a portion of the heat generated and/or produced by at least some of the computing devices to one or more thermally conductive interfaces and/or conduits through which at least a portion of the heat may pass from the fluid and/or gas to the ambient air or water proximate to the embodiment. In some embodiments, said thermally conductive fluid has a boiling point sufficiently low that said fluid boils when it bathes operational computing devices of the embodiment.

An embodiment of the present disclosure may cool its computing systems, and/or other heat-generating components and/or systems, by means, systems, modules, components, and/or devices, the include, but are not limited to, the following:

- closed-circuit heat exchangers that transfer heat from the heat source to a heat sink (e.g., the air or water around an embodiment), wherein at least one end of the closed-circuit heat exchanger
- is in contact with an interior surface of a water-facing wall, especially a wall facing a conduit where water flows at high speed to or from a turbine of the embodiment
- is in contact with an interior surface of an air-facing wall
- incorporates ribs to increase the surface area of a thermally conductive wall
- in contact with the surrounding water and/or air
- is positioned inside a duct, tube, and/or channel, of an embodiment's inertial water tube
- is in contact with a water reservoir within an embodiment
- mounting of computing modules:
- in air and/or in water
- against interior walls facing air and/or water, especially walls facing a conduit where water flows at high speed to or from a turbine of the embodiment
- wherein the mounting chamber or location incorporates heat-dissipating ribs
- within spires projecting into the air outside an embodiment from an embodiment's outer wall, and
- within spires projecting into the water outside an embodiment from an embodiment's outer wall A significant advantage of embodiments of the present disclosure is that a large number of computing devices can be deployed within, among, and/or between a large number of embodiments, such that a relatively large number of computing devices are partitioned into a large number of relatively small embodiment-specific groups, which, in addition to being powered, at least in part, by the energy that each respective embodiment extracts from the environment proximate to the embodiment, are also immediately adjacent, and/or proximate, to a heat sink characterized by a relatively cool temperature and a relatively large heat capacity, i.e. the sea, and the air, atmosphere, and/or wind that flows above it. By deploying relatively small numbers of computing devices in self-powered and passively cooled autonomous units, environmental energy is used with maximal efficiency (e.g. without suffering the losses and costs associated with transmitting the power to shore), and the requisite cooling of those computing devices is accomplished with minimal, if any, expenditure of additional energy. Embodiments of current disclosure permit a graceful and efficient scaling of computing and/or computing networks through the iterative fabrication and deployment of relatively simple and cost-effective self-powered, self-cooling, computing modules.

By contrast, the concentration of larger numbers of computing devices, e.g. the number of computing devices that might be associated with hundreds or thousands of embodiments of the present disclosure, requires that a significant amount of power be generated remotely and transmitted to the concentrated collection(s) of computing devices (e.g., in a server farm or data warehouse), thereby increasing the costs and incidental losses of the energy consumed. Furthermore, the concentration of larger numbers of computing devices, as in a server farm, requires a relatively large and concentrated amount of heat to be actively and energetically removed from the many computing devices co-located in a relatively small space, and/or volume, which typically requires a significant expenditure of capital and additional energy.

An embodiment of the present disclosure interconnects at least some of its computing devices with, and/or within, a network in which each of a plurality of the computing devices are assigned, and/or associated with, a unique internet, and/or "IP" address. An embodiment of the present disclosure interconnects at least some of its computing devices with, and/or within, a network in which a plurality of the computing devices are assigned, and/or associated with, a unique local subnet IP address.

An embodiment of the present disclosure interconnects at least some of its computing devices with, and/or within, a network that incorporates, includes, and/or utilizes, a router.

An embodiment of the present disclosure interconnects at least some of its computing devices with, and/or within, a network that incorporates, includes, and/or utilizes, a modem.

An embodiment of the present disclosure interconnects at least some of its computing devices with, and/or within, a network that incorporates, includes, and/or utilizes, a "storage area network."

The current disclosure includes embodiments in which pluralities of computers, computing systems, computational systems, servers, computing networks, data processing systems, and/or information processing systems, incorporated therein, are cooled by methods, mechanisms, processes, systems, modules, and/or devices, that include, but are not limited to, the following:

- direct conduction of at least a portion of the heat generated by at least some of the computers, generators, inverters, rectifiers, and/or other electronic components comprising the embodiment, to air and/or water outside and/or surrounding the embodiment;
- indirect conduction of at least a portion of the heat generated by at least some of the computers, generators, rectifiers, and/or other electronic components comprising the embodiment, to the air and/or water outside and/or surrounding the embodiment by means of one or more heat exchangers in contact with the air and/or water surrounding the embodiment,
- indirect conduction of at least a portion of the heat generated by at least some of the computers, generators, rectifiers, and/or other electronic components comprising the embodiment, to the air and/or water outside and/or surrounding the embodiment by means of phase-changing material, e.g., a liquid that changes phases to a gas when it has absorbed heat from at least some of the computers, generators, rectifiers, and/or other electronic components comprising the embodiment, and changes phases back to a liquid, e.g., condenses, when it has transferred at least a portion of that heat energy to a surface through which the heat energy is directly or indirectly conducted to the air and/or water outside and/or surrounding the embodiment.

By sequestering clusters of computers within independent self-powered, free-floating, devices, the numbers of computers (i.e. the numbers of clusters) made available for computational work, and/or the processing of computing tasks, can be scaled with relative ease, e.g. there are no obvious barners, costs, and/or consequences, associated with an increase in the numbers of such sequestered clusters.

The energy efficiency of virtually interconnected and/or cooperating sets of collocated computers can be discussed in terms of "power usage effectiveness" or "PUE." PUE=(Total Computing Facility Power)/(Total Computing Equipment Power).

Because large terrestrial and/or land-based clusters of computers require the expenditure of energy not just to energize the computers themselves, but also for requirements such as: cooling, lighting, environmental considerations for staff, etc., their PUEs are typically estimated to be about 1.2. An ideal PUE would be 1.0, which would mean that all electrical power consumed, was consumed by the computers during their execution of their respective computing tasks, and, by extension, no electrical power was "wasted" doing anything else.

Many embodiments of the disclosed device utilize passive conductive cooling of their computers, which, because it is passive, consumes no electrical power. And, because the disclosed devices are typically autonomous and/or unmanned, many embodiments utilize close to 100% of the electrical power that they generate energizing their respective computers and providing them with the energy that they need to complete their respective computing tasks. Thus, many embodiments of the disclosed device will have a PUE approaching 1.0, i.e. a "perfect" power usage effectiveness, at least net of any losses due to temporary buffering or storage of power.

Also, because the computers stored and operated within embodiments of the present disclosure are located on devices that are floating on a body of water (e.g. on the sea far from shore), they provide significant computing power without requiring a concomitant dedication of a significant area of land. This potentially frees land that might otherwise have been used to house such computing clusters, so that it might instead be used for farming, homes, parks, etc.

Some embodiments of the present disclosure, when deployed in anchored farms of devices, will send electricity back to an onshore electrical power grid via a subsea electrical power cable. However, when the electrical demands of that terrestrial grid are not high, and/or the price of electrical power sold into that grid is too low, then some or all of the devices in the farm may perform other tasks such as performing computations, such as Bitcoin mining and/or arbitrary or custom computational tasks for third parties, in order to generate revenue and/or profits.

Some might regard the history of computing as having taught that progress, especially with respect to the scaling of computing, is often a consequence of an underlying progress in the discovery and/or invention of new ways to "decouple" the components, and the constituent tasks, on which large-scale computing relies, from the overhead and/or support requirements needed to support large "monolithic" collections of computers. Embodiments of the present disclosure achieve a decoupling of computing networks from the traditional concentrated land-based deployments which tend to suffer from a number of inefficiencies.

The current disclosure offers many potential benefits, including, but not limited to a decoupling of computing power (e.g. available CPUs and/or instructions per second) from the typically correlated supporting and/or enabling requirements, e.g., such as those associated with the construction, operation, and/or maintenance, of data centers and/or server farms.

These requirements include the need that sufficient electrical power be provided to energize a large number of computers. In order to transmit large amounts of electrical power into concentrated collections of computers, it is typically necessary to bring the power to the collections of computers at a high voltage and/or a high current. However, since individual computers, computing devices, and/or computing circuits, require electrical power that is typically of a lower voltage and/or current, it is often necessary and/or preferred to partition the high-energy electrical power into multiple circuits of lower-energy power. These changes in voltage and/or current can result in some loss of energy and/or efficiency.

These requirements include the need to remove heat, and/or introduce cooling, fast enough to compensate for the significant amounts of heat that are generated by highly concentrated and extensive collections of electrically powered computing devices. Such cooling is relatively energy intensive, e.g. significant electrically powered refrigeration, fans, pumped liquid heat exchangers, etc.

Embodiments of the present disclosure obtain relatively small amounts of electrical power from water, and/or ocean, waves and utilize that electrical power to energize a relatively small number of computing devices. By contrast with large, highly-concentrated, collections of computers, the computers within embodiments of the current disclosure are able to be energized with electrical power that, at least approximately, matches electrical requirements of the computers, i.e. there is no need to transmit highly-energetic electrical power from distant sources before reducing that power down to voltages and/or currents that are compatible with the computers to be energized.

Some embodiments of the present disclosure achieve and/or satisfy all of their cooling requirements through purely passive and convective and/or conductive cooling. Thermally conductive walls and/or pathways facilitate the natural transmission of heat from the computing devices to the air and/or water outside the device. A relatively smaller number of devices means relatively less heat is generated. And, the proximity of a heat sink of significant capacity (i.e. the water on which the device floats) means that the removal of these relatively small amounts of heat conductively and/or convectively is achieved with great efficiency and in the absence of any additional expenditures of energy.

The current disclosure increases the modularity of clusters of computing devices by not only isolating them physically, but also by powering them independently and autonomously, and by cooling them passively. Through the creation and deployment of additional self-powered computing buoys, a computing capability can be scaled in an approximately linear fashion, typically, if not always, without the non-linear and/or exponential support requirements and/or consequences, e.g. cooling, that might otherwise limit an ability to grow a less modular architecture and/or embodiment of computing resources.

The current disclosure provides a useful application for wave-energy conversion devices that requires significantly lower capital expenditures and/or less infrastructure. For instance, a free-floating and/or drifting device of the current disclosure can continuously complete computational tasks, such as calculating Bitcoin block headers and/or nonce values, while floating freely in very deep water (e.g. 3 miles deep) in the middle of an ocean, hundreds or thousands of miles from shore. Such an application does not depend upon, nor require, a subsea power cable to send electrical power to shore. It does not require extensive mooring and/or the deployment of numerous anchors in order to fix the position of a device, e.g. so that it can be linked to a subsea power cable.

Embodiments of the present disclosure support, perform, and/or execute computing tasks of an arbitrary nature. Embodiments of the present disclosure incorporate and/or utilize computing circuits specialized for the execution of specific types of computing tasks, such as the "mining" of cryptocurrencies such as Bitcoin. An embodiment's receipt of a computational task, and its return of a computational result, may be accomplished through the transmission of data across satellite links, fiber optic cables, LAN cables, radio, modulated light, microwaves, and/or any other channel, link, connection, and/or network. Computationally intensive tasks may be shared, and/or cooperatively executed or completed, across multiple embodiments.

An embodiment of the present disclosure incorporates, utilizes, energizes, and/or operates, computers organized, interconnected, controlled, and/or configured, so as to optimize the loading, execution, and reporting of results, related to arbitrary computational tasks, e.g., such as those transmitted to it from remote facilities, networks, computers, and/or persons.

An embodiment of the present disclosure executes arbitrary computational tasks such as might be typical of services that execute programs for others (e.g., "compute as a service"), and/or provide computational resources with which others may execute their own programs, often in exchange for a fee based on attributes of the tasks and/or resources used. An embodiment of the present disclosure generates fees, and/or the owner of an embodiment of the present disclosure calculates fees, for at least some of the "on-demand" computational tasks that the embodiment executes based on attributes that include, but are not limited to: size (e.g. in bytes) of program and/or data executed, size (e.g. in bytes) of data created during program execution and/or returned to the owner of the program, number of computing cycles (number of computational operations)

consumed during program execution, amounts of RAM, and/or hard disk space, utilized during program execution, other computing resources, such as GPUs, required for program execution, and the amount of electrical power consumed during and/or by a program's execution.

An embodiment of the present disclosure performs, completes, and/or executes, arbitrary computational tasks utilizing "disk-free computing devices" in conjunction with "storage area networks" so as to utilize memory and/or data storage components and/or devices more efficiently.

An embodiment of the present disclosure incorporates, utilizes, energizes, and/or operates, computers organized, interconnected, controlled, and/or configured, so as to optimize the loading, execution, and reporting of results, related to "cryptocurrency (e.g. Bitcoin) mining," i.e. to the calculation of cryptocurrency block headers, and the identification of suitable ledger-specific "nonce" values (e.g. the search for a "golden nonce"), and/or related to the loading, execution, and reporting of results, related to other "proof of work" programs. The computers, and/or computing resources, of an embodiment are optimized to perform hash functions so as to calculate "proof of work" values for blockchain-related algorithms.

An embodiment of the present disclosure incorporates, utilizes, energizes, and/or operates, computers organized, interconnected, controlled, and/or configured, so as to optimize the loading, execution, and reporting of results, related to neural networks and/or artificially intelligent programs. An embodiment of the present disclosure facilitates the cooperative execution of programs related to neural networks and/or artificially intelligent programs through the direct, physical, and/or virtual, interconnection of its internal networks and/or computing devices.

An embodiment of the present disclosure incorporates, utilizes, energizes, and/or operates, computers organized, interconnected, controlled, and/or configured, so as to optimize the loading, execution, and reporting of results, related to the serving of web pages and/or search results.

An embodiment of the present disclosure incorporates, utilizes, energizes, and/or operates, computers organized, interconnected, controlled, and/or configured, so as to optimize the loading, execution, and reporting of results, related to the solving of "n-body problems," the simulation of brains, gene matching, and solving "radar cross-section problems."

An embodiment of the present disclosure incorporates, utilizes, energizes, and/or operates, computers organized, interconnected, controlled, and/or configured, so as to optimize the loading, execution, and reporting of results, consistent with the functionality provided by "terminal servers," colocation servers and/or services, and/or to provide offsite backups for enterprises.

An embodiment of the present disclosure receives a task from a remote source and/or server. An embodiment receives a task from a radio and/or electromagnetically encoded transmission broadcast by a satellite (e.g. which a plurality of other devices also receive and/or are able to receive) or other remote antenna. An embodiment receives a task across and/or via a transmission across a fiber-optic cable. An embodiment receives a task across and/or via a transmission across a LAN and/or Ethernet cable.

An embodiment adds a task received via an electromagnetically encoded signal to a task queue of pending tasks if:

- it possesses, incorporates, and/or operates, all of the hardware required to complete and/or execute the task efficiently;
- there is sufficient room in its task queue;
- there is a sufficient likelihood that it will be able to complete the task no later than any deadline associated with the task; and,
- the estimated duration of the task's execution is no more than the likely operational time available to the device (e.g. given current energy reserves, current power generation levels, etc.).

An embodiment of the present disclosure marks the task as "in-progress" and sets a "timeout" value, after which the task will be restarted if not yet complete, when it begins execution of a task.

An embodiment of the present disclosure stops execution of a sufficient number of its most-recently started computational tasks, and/or those tasks with the greatest estimated remaining execution times, and powers down the corresponding computing devices and/or circuits, e.g., to provide, and/or ensure, sufficient power to complete the computation of the remaining tasks using the still-active computing devices and/or circuits, when the embodiment determines that the level of its power generation has decreased, and the continued and/or continuous operation of its currently "active" computing devices and/or circuits can no longer be sustained An embodiment of the present disclosure transmits the results of a completed task to a remote source and/or server (e.g. the remote source and/or server from which the task originated). After receipt and/or validation of the completed-task results, a remote source and/or server broadcasts to every one of a collection, cohort, and/or set of cooperating embodiments, which (would have been expected to have) received the now-completed task, a message and/or signal to indicate that the task has been completed. Each of the embodiments receiving the "task-completed" message and/or signal then removes that task from its task queue and terminates execution of the task if the execution of the task is in progress.

An embodiment of the present disclosure receives the same task received by a plurality of embodiments, and may elect to place the task in its task queue, thereby deferring and/or delaying task execution, and/or it may elect to execute the task when sufficient computing resources and/or energy are available.

In addition to the results of a task, an embodiment also returns to a remote source and/or server, information that is sufficient to allow the benefactor of the task's execution to be charged and/or billed an amount of money consistent with a payment contract. Such "billing-relevant information" might include, but is not limited to, the following:

- size (e.g. in bytes) of the program executed;
- size (e.g. in bytes) of the results generated;
- amount (e.g. in bytes) of RAM required to complete the program's execution;
- number of instruction cycles required to complete the program's execution;
- number of CPUs required to complete the program's execution;
- number and/or cycles required of GPUs to complete the program's execution;
- amount of energy (e.g. kWh) expended to complete the execution of the program;
- degree of requested task priority that influenced priority of task execution;
- degree and/or percentage of available computing resources busy with other tasks at time of task execution (e.g. level of demand at time of task execution);

amount of task-results data (e.g. in bytes) returned to the remote source and/or server;

cost for satellite bandwidth consumed (e.g. bytes) and/or required in order to transmit task and associated data to device; and/or cost for satellite bandwidth consumed (e.g. bytes) and/or required in order to transmit task results to remote source and/or server.

An embodiment of the present disclosure sends task-execution-specific data, messages, and/or signals, to a remote source and/or server which indicate, among other things:

which tasks are waiting in a task queue;

which tasks are being executed;

estimated time remaining to complete execution of tasks being executed;

an estimate of the amount of energy required to complete tasks being executed;

an estimate of the rate of electrical power generation;

an estimate of the amount of shared memory required to complete tasks being executed;

and an estimate of the amount of shared memory currently available.

A global task controlling and/or coordinating computer and/or server may use such task-execution-specific data in order to forecast which tasks are likely to be successfully completed by a future time. And, if the likelihood of a particular task's completion by a future time is sufficiently great then other embodiments of the present disclosure which have been notified of the task at an earlier time, and which are potentially storing the task in their respective task queues, may be notified of that task's likely completion by an embodiment. The notified embodiments may then elect to reduce the priority of the task, or to remove it from their task queues.

An embodiment of the present disclosure executes encrypted programs and/or data for which a decryption key, algorithm, and/or parameter, is not available, nor accessible, to other tasks, programs, and/or computing circuits and/or devices, executing on the embodiment. An embodiment of the present disclosure executes encrypted programs and/or data for which a decryption key, algorithm, and/or parameter, is not available, nor accessible, to any embodiment and/or device, nor to the remote source(s) and/or server(s) which transmitted the encrypted program and/or data to the embodiment.

An embodiment of the present disclosure simultaneously executes two or more encrypted programs that are encrypted with different encryption keys, algorithms, and/or parameters, and must be decrypted with different decryption keys, algorithms, and/or parameters.

An embodiment of the present disclosure utilizes a plurality of CPUs and/or computing circuits to independently, and/or in parallel, execute (copies of) the same program, operating on (copies of) the same data set, wherein each execution will nominally and/or typically produce identical task results.

An embodiment of the present disclosure comprises one element of a multi-embodiment, and/or multi-device collection, cohort, and/or set of devices, wherein each embodiment contains a plurality of CPUs and/or computing circuits, and wherein a plurality of CPUs and/or computing circuits on the embodiment, and a plurality of CPUs and/or computing circuits on a different embodiment, all simultaneously: execute in parallel (copies of) the same program; operate on (copies of) the same data set, search for a "golden nonce" value for the same cryptocurrency block and/or blockchain block; perform in parallel the same computational task; or perform in parallel a divide-and-conquer algorithm pertaining to the same computational task.

An embodiment of the present disclosure utilizes a plurality of CPUs and/or computing circuits to execute the same program, operating on the same data set, in a parallelized fashion wherein each individual CPU and/or computing circuit within the embodiment will execute the program with respect to a portion of the full data set, thereby contributing piecemeal to the complete execution of the task.

An embodiment of the present disclosure communicates data to and from a remote and/or terrestrial digital data network and/or internet, and/or exchanges data with other computers and/or networks remote from the embodiment, and/or not physically attached to, nor incorporated within, the embodiment, by means of "indirect network communication links" which include, but ar not limited to:

satellite, Wi-Fi, radio, microwave, modulated light (e.g. laser, LED), "quantum-data-sharing network" (e.g., in which quantum entangled atoms, photons, atomic particles, quantum particles, etc., are systematically altered so as to transmit data from one point [e.g., the location of one particle] to another point [e.g., the location of another particle]), as well as:

fiber-optic cable(s), LAN cable(s), Ethernet cable(s), and/or other electrical and/or optical cables.

A free-floating embodiment of the present disclosure, as well as an anchored and/or moored embodiment of the present disclosure, neither of which are directly connected to land by means of a cable, utilize one or more indirect network communication links, including, but not limited to: satellite, Wi-Fi, radio, microwave, modulated light (e.g. laser, LED).

An embodiment of the present disclosure communicates with other embodiments, devices, and/or terrestrial data transmission and/or exchange networks, by transmitting data to a remote receiver by means of modulated light (e.g. laser or LED) which is limited to one or more specific wavelengths and/or ranges of wavelengths. The sensitivity of the remote receiver is then improved through the receiver's use of complementary filter(s) to exclude wavelengths of light outside the one or more specific wavelengths and/or ranges of wavelengths used by the embodiment. Another remote receiver with which the embodiment communicates utilizes multiple such wavelength-specific filters, e.g. utilizing a specific filter to communicate with a specific receiver, so as to limit and/or discriminate its receipt of data to that transmitted from one or more specific remote sources at a time and/or from among many such remote sources, each of which, and/or each subset of which, utilizes a specific wavelength(s) and/or range(s) of wavelengths.

An embodiment of the present disclosure exchanges data with neighboring and/or proximate other embodiments, and/or complementary devices, through the use of one or more types and/or channels of data communication and/or transmission, e.g. Wi-Fi, modulated light, radio, and/or microwave, while exchanging data with remote computer(s) and/or network(s) (e.g. the internet) through the use of one or more other and/or different types and/or channels of data communication and/or transmission, e.g. satellite.

An embodiment of the present disclosure exchanges data with neighboring and/or proximate other embodiments, and/or complementary devices, and/or remote and/or terrestrial computers and/or networks, through the transmission and/or exchange of data to, from, through, and/or between, aerial drones, surface water drones, underwater drones, balloon-suspended transmitter/receiver modules, buoy-mounted transmitter/receiver modules, devices, or systems, manned planes, boats, and/or submarines.

An embodiment of the present disclosure exchanges data with neighboring and/or proximate other embodiments, and/or complementary devices, and/or remote and/or terrestrial computers and/or networks, through the transmission and/or exchange of data to, from, through, and/or between, underwater transmitter/receiver modules, devices, or systems drifting on, and/or in, the body of water, and/or modules, devices, or systems resting on, and/or attached to, the seafloor, by means including, but not limited to, the generation, detection, encoding, and/or decoding, of acoustic signals, sounds, and/or data.

An embodiment of the present disclosure receives "global" transmissions of data from a remote and/or terrestrial computer and/or network via one channel, frequency, wavelength, and/or amplitude modulation, broadcast by a satellite, radio, microwave, modulated light, and/or other means of electro-magnetic data transmission. The embodiment transmits device-specific, and/or device-group-specific (e.g. two or more "cooperating" devices, two or more devices whose device-specific computer(s) and/or computer network(s) are linked, e.g. by Wi-Fi), on one or more different channels, frequencies, wavelengths, and/or amplitude modulations, to a compatible and/or complementary receiver on a satellite, and/or other receiver of radio, microwave, modulated light, and/or other means of electro-magnetic data transmissions.

In some deployments of some embodiments of the present disclosure, a satellite will broadcast to a plurality of the deployed devices, on a channel and/or frequency shared by many, if not all, of the devices in a deployment, information including, but not limited to: data, tasks, requests for information (e.g. status of tasks, geolocation of a device or group of devices, amount(s) of energy available for computational tasks and/or for locomotion, amount of electrical power being generated in response to the current wave conditions of a device and/or group of devices, status of computational hardware and/or networks, e.g. how many devices are fully functional and/or how many are non-functional, status of power-generating hardware and/or associated electrical and/or power circuits, e.g. how many power take-off assemblies and/or generators are fully functional and/or how many are non-functional, how many energy storage components (e.g. batteries) are fully functional and/or how many ar non-functional, etc.).

In some deployments of some embodiments of the present disclosure, a satellite will broadcast to a specific deployed device, and/or subset or group of deployed devices, on a channel and/or frequency specific to the device, and/or subset or group of deployed devices, information including, but not limited to: device- or group-specific data (e.g. which range of Bitcoin nonce values to evaluate), device- or group-specific tasks (such as which types of observations to prioritize, e.g. submarines), requests for information (e.g. wave conditions at location(s) of device), etc.

In some deployments of some embodiments of the present disclosure, each device, or subset of devices, will broadcast to a satellite on a channel and/or frequency specific to the device, or subset of devices, (i.e. and not shared by other devices in a deployment) information including, but not limited to: data, task results (e.g. Bitcoin headers and/or header templates and corresponding nonce values), requests for information (e.g. new tasks, weather and/or wave forecasts for a given geolocation, results of self-diagnostics on hardware, software, memory integrity, etc., status of computational hardware and/or networks, e.g. how many devices are fully functional and/or how many are non-functional, status of power-generating hardware and/or associated electrical and/or power circuits, e.g. how many power take-off assemblies and/or generators are fully functional and/or how many are non-functional, how many energy storage components (e.g. batteries) are fully functional and/or how many are non-functional, observations (e.g. visual, audio, radar) of aircraft, observations of other floating vessels, observations of submarines, observations of marine life, observations of weather and/or wave conditions, environmental sensor readings, etc.).

By providing alternate computational resources, that draw their power directly from the environment, and by completing computational tasks currently executed in terrestrial clusters of computers, the amount of electrical power required on land can be reduced. And, thereby, the amount of electrical power generated through the consumption of fossil fuels, and the concomitant generation of greenhouse gases, can be reduced.

All potential variations in sizes, shapes, thicknesses, materials, orientations, methods, mechanisms, procedures, processes, electrical characteristics and/or requirements, and/or other embodiment-specific variations of the general inventive designs, structures, systems, and/or methods disclosed herein are included within The present disclosure.

Embodiments of the current disclosure that incorporate, contain, and/or utilize a water reservoir of substantial volume, are inherently well suited to the raising of fish, shrimp, and other animals, as well as to the growing of seaweeds, other algae, and other aqueous plants. Thus, while they extract energy from the waves about them, these embodiments can utilize at least a portion of that energy to facilitate and/or promote the growth of rich sources of nutrients which may then be harvested.

An embodiment of the present disclosure utilizes at least a portion of the energy that it generates to aerate water stored and/or cached within its reservoir so as to promote the health, growth, and/or wellbeing of the fish living therein. An embodiment of the present disclosure utilizes at least a portion of the energy that it generates to energize and/or illuminate lights, and to thereby illuminate at least a portion of the water stored and/or cached within its reservoir. An embodiment of the present disclosure utilizes at least a portion of the energy that it generates to energize and/or illuminate lights, and to thereby illuminate at least a portion of the water within its inertial water tube. An embodiment of the present disclosure utilizes at least a portion of the energy that it generates to energize and/or illuminate lights, and to thereby illuminate at least a portion of the water outside the embodiment.

Embodiments of the current disclosure that incorporate, contain, and/or utilize a water reservoir of substantial volume, can utilize at least a portion of the energy that they extract from waves to desalinate water and to store at least a portion of that desalinated water within their water reservoirs (e.g., by incremental replacement of the seawater stored within a plurality of reservoir tanks with desalinated water) or other water compartments. Such desalinated water can then be offloaded from such embodiments to ships or port installations, and the respective reservoir tanks refilled with seawater to initiate a new cycle of desalinated water production.

Embodiments of the current disclosure that incorporate, contain, and/or utilize a water reservoir of substantial volume, can utilize at least a portion of the energy that they extract from waves to remove (e.g., boil oft) water from the seawater stored within their respective reservoirs thereby creating brines of high salinity, and also brines rich in minerals. Such mineral-rich brines can then be offloaded from such embodiments to ships or port installations, and desirable minerals can then be extracted from the respective brine solutions with relative efficiency.

Embodiments of the current disclosure can utilize a portion of the energy that they extract from waves to spray or pump seawater into the air, or otherwise aerosolize seawater, so as to promote cloud formation and reduce, at least to a degree, the amount of energy absorbed by the Earth from the Sun.

The current disclosure includes an embodiment in which a portion of the pressurized water within the embodiment's pressurized reservoir is discharged through a nozzle in order to generate a spray, mist, and/or aerosolization of that water.

The current disclosure includes an embodiment in which a portion of the water within the embodiment's elevated reservoir is discharged through a nozzle in order to generate a spray, mist, and/or aerosolization of that water.

The current disclosure includes an embodiment in which an electrically powered pump and/or blower is used to aerosolize seawater and project, propel, and/or spray, it into the atmosphere.

Embodiments of the current disclosure generate power (e.g., electrical, chemical, etc.) far from shore. And, there are many uses for electrical power that is generated and made available far out at sea.

Ocean charging stations for autonomous and/or remotely operated, ocean-going or airborne, "drones," especially military drones, can consume large amounts of power, and the effective ranges of operation of those drones can be limited if the only source of energy available to those drones is from an onshore on nearshore facility. Surveying of the ocean floor and the detection of submarines far from shore can consume large amounts of power and are impractical in the absence of a source of abundant energy far from shore. Communications relays (e.g. for submarines) and radar stations floating on the deep sea can consume large amounts of power and require a source of energy from which they can obtain that power while far from shore. Ocean-floor mining operations can consume large amounts of power over long periods of time. Embodiments of the present disclosure can provide power to such mining operations.

Embodiments of the present disclosure may present tethers, mooring lines, cables, arms, sockets, berths, chutes, hubs, indentations, and/or connectors, to which another vessel may attach, and/or moor, itself. Embodiments of the current disclosure can utilize a portion of the energy that they extract from waves to charge, and/or to provide energy, e.g., transmitting that energy conductively and/or inductively via charging connections and/or pads, to manned vessels and/or aircraft, and/or to autonomous vessels and/or aircraft (i.e. "drones"), including, but not limited to, boats, ships, submarines, aircraft (e.g., helicopters), unmanned surface vessels, unmanned submersible vessels, unmanned aircraft, and/or ocean-going and airborne drones.

Such embodiments, when incorporating appropriate surfaces, enclosures, extensions, connections, and/or interfaces, may provide a suitable docking, landing, resting, and/or staging, location at which certain compatible vessels and/or vehicles can recharge, and subsequently disengage from the respective embodiments and resume their journeys and/or missions. Such embodiments, when incorporating adequate communications channels may also facilitate the exchange of data between docked vessels and/or vehicles and remote computers, networks, facilities, individuals, and/or installations.

Embodiments of the present disclosure may present connectors, protocols, APIs, and/or other devices or components or interfaces, by and/or through which energy may be transferred and/or directed to be transferred from the embodiments to another vessel. The vessels that might receive such energy include, but am not limited to:

- autonomous underwater vehicles, autonomous surface vessels, autonomous aircraft; and/or
- manned underwater vehicles (e.g. submarines), manned surface vessels (e.g. cargo and/or container ships), and manned aircraft (e.g. helicopters).

The deployment of embodiments of the present disclosure for the purpose of charging of drones in the deep sea and/or far from shore may not utilize all of the power generated by those embodiments. Their cost of energy may therefore be relatively high. However, such deployments can be made more economical, and/or the cost of their energy can be reduced, if there is a use to which each embodiment's electrical power can be applied after the power requirements of any charging drones have been satisfied. The execution of computationally intensive tasks using computational circuits incorporated within, and powered by, each embodiment is one of the simplest, most low-capital-cost and low-maintenance ways of using electrical power.

When any connected drones are fully charged and/or a device's energy stores are full, then some embodiments of the present disclosure will consume surplus and/or supplemental generated electrical power performing other useful tasks (e.g., concentrating brine, or performing energy-intensive computations, such as Bitcoin mining and/or arbitrary or custom computational tasks for third parties), and/or creating useful products (e.g., hydrogen), in order to generate (additional) revenue and/or profits. Such a dual purpose and/or application may also facilitate an embodiment's charging of drones (e.g., through the production of hydrogen), and/or may facilitate the concealment and/or hiding of drones when the ratio of embodiment devices to drones is relatively high.

Embodiments of the present disclosure, when deployed in anchored farms of devices, or when free-floating, especially as individual devices, will primarily energize, operate, and monitor various sensors, such as, but not limited to: sonar, radar, cameras, microphones, hydrophones, antennae, gravimeters, magnetometers, and Geiger counters, in order to monitor their environments (air and water) in order to detect, monitor, characterize, identify, and/or track other vessels and/or aircraft, or to survey the ocean floor for minerals and other characteristics.

Embodiments of the present disclosure may detect, monitor, log, track, identify, and/or inspect (e.g. visually, audibly, and/or electromagnetically), other vessels passing within a sufficiently short to distance of a device such that at least some of the device's sensors are able to detect, analyze, monitor, identify, characterize, and/or inspect, such other vessels.

Aircraft operating near embodiments of the present disclosure are detected and/or characterized by means and/or methods that include, but are not limited to:

- visually (e.g. with one or more cameras, detecting one or more wavelengths of light, including, but not limited to visible light and infrared light),
- the detection of specific, e.g. engine-related, noises,
- the detection of electromagnetic emissions and/or radiation (e.g. radio transmissions and heat),
- the detection of gravimetric distortions,
- the detection of magnetic distortions,
- the detection of changes in ambient radioactivity, the detection of gamma-ray emissions, and/or the detection of noise and/or other vibrations induced in the water on which the device floats.

Surface vessels operating near embodiments of the present disclosure are detected and/or characterized by means and/or methods that include, but are not limited to:

visually (e.g. with one or more cameras, detecting one or more wavelengths of light, including, but not limited to visible light and infrared light), the detection of specific, e.g. engine-related, noises and/or vibrations, especially those that might be transmitted through and/or in the water on which the device floats, the detection of electromagnetic emissions and/or radiation (e.g. radio transmissions and heat), the detection of gravimetric distortions, the detection of magnetic distortions, the detection of changes in ambient radioactivity, the detection of gamma-ray emissions, and/or the detection of observed changes in the behavior of local marine organisms (e.g. the direction in which a plurality of fish swim).

Sub-surface vessels operating near embodiments of the present disclosure are detected and/or characterized by means and/or methods that include, but are not limited to:

the detection of specific, e.g. engine-related, noises and/or vibrations, transmitted through and/or in the water on which the device floats, the detection of electromagnetic emissions and/or radiation (e.g. radio transmissions and heat), the detection of gravimetric distortions, the detection of magnetic distortions, the detection of changes in ambient radioactivity, the detection of gamma-ray emissions, the detection of changes in the behavior of local marine organisms (e.g. the direction in which a plurality of fish swim), and/or the detection of changes in the volume and/or clarity of ambient noises nominally and/or typically generated by marine organisms, geological phenomena (e.g. volcanic and/or seismic events), current-induced noises (e.g. water movements around geological formations), and/or reflected noises (e.g. the noise of overpassing planes reflecting in specific patterns off the seafloor).

A plurality of embodiments of the present disclosure are able to exchange data, messages, and/or signals, and/or otherwise operate as a virtually interconnected network of devices, and their diverse locations and perspectives may permit them to obtain high-resolution information about the nature, structure, behavior, direction, altitude and/or depth, speed, condition (e.g. damaged or fully functional), incorporation of weapons, etc., of observed vessels and/or aircraft through their sharing and synthesis of data gathered from the unique perspectives of each individual device.

Embodiments of the present disclosure may present connectors, APIs, and/or other devices or components, by and/or through which data may be exchanged between the embodiment and another vessel. Such other vessels might utilize such a data connection in order to obtain cached data, messages, signals, commands, and/or instructions, preferably encrypted, transmitted to the device from a remote source and/or server, and stored within the device, and/or within a plurality of devices, any one of which may be accessed by another vessel for the purpose of obtaining command and control information.

While the variety of embodiments of the present disclosure that are provided in the illustrations and examples in the invention are limited, the scope of those portions of the disclosure that are not limited or constrained to a particular embodiment, or type of embodiment, of a particular wave energy technology, and/or those portions and/or elements that may be applied to other types of wave energy technologies and/or designs, shall apply and/or extend to all wave energy devices and/or technologies. Those elements of the presently disclosed wave energy technology which may be incorporated within, added to, and/or utilized in conjunction with, other wave energy technologies and/or devices, including, but not limited to, those of a future disclosure, are included within The present disclosure, as are those wave energy devices and/or technologies which include and/or benefit from them. It is to be understood that the disclosed inventive elements of the invention apply to any compatible wave energy converter type, category, variety, species, and/or design.

The current disclosure includes many novel devices, features, elements, components, methods, processes, and systems. It includes devices that are hybrid combinations of those novel devices, features, elements, components, methods, processes, and systems, and variations, modifications, and/or alterations, of those novel devices, features, elements, components, methods, processes, and systems, all of which are included within The invention. All derivative devices, features, elements, components, methods, processes, and systems, combinations of devices, features, elements, components, methods, processes, and systems, and variations thereof, are also included within The invention.

The present disclosure includes embodiments that include, incorporate, and/or utilize, water turbines, valves, and other means of regulating and/or controlling the flow of water, in any combination, and incorporating and/or characterized by any and all embellishments, modifications, variations, and/or changes, that would preserve the function and/or functionality disclosed herein.

The invention, as well as the discussion regarding same, is made in reference to wave energy converters on, at, or below, the surface of an ocean. However, The invention applies with equal force and equal benefit to wave energy converters and/or other devices on, at, or below, the surface of an inland sea, a lake, extraterrestrial ocean and/or any other body of water or liquid.

All potential variations in sizes, shapes, thicknesses, materials, orientations, and/or other embodiment-specific variations of the general inventive designs, structures, systems, and/or methods disclosed herein are included within The present disclosure, and will be obvious to those skilled in the art.

While much of the invention is discussed in terms of a novel variety of wave energy converter, the embodiments of which include both floating and submerged components and/or modules, it will be obvious to those skilled in the art that most, if not all, of the disclosure, and/or of the disclosed methods, devices, and technologies, related to the creation of wave induced ejections of water and the subsequent and/or associated conversion of such ejected waters into alternate forms of energy, is applicable to, and of benefit with regard to, other types of buoyant devices and/or partially or fully submerged devices, and all such applications, uses, and embodiments, are included within The present disclosure.

The embodiments illustrated and discussed in relation to the figures included herein are provided for the purpose of explaining some of the basic principles of the disclosure. However, The invention covers all embodiments, even those differing from the idealized and/or illustrative examples presented. The invention covers even those embodiments which incorporate and/or utilize modern, future, and/or as of the time of this writing unknown, components, devices, systems, etc., as replacements for the functionally equivalent, analogous, and/or similar, components, devices, systems, etc., used in the embodiments illustrated and/or discussed herein for the purpose of explanation, illustration, and example.

The invention includes embodiments that incorporate, include, and/or utilize, a control system, wherein the control system controls valves (e.g., opening and closing valves to regulate the level of water within an embodiment's water reservoir), controls pumps (e.g., to alter, adjust, and/or change the pressure of the air trapped within a pressurized water reservoir), controls lights (e.g., to illuminate seaweeds and/or algae growing within an embodiment's water reservoir), adjusts and/or alters the torque imparted by generators to turbines, adjusts and/or alters the volume of water ballast (e.g., thereby altering, adjusting, and/or changing, an embodiment's draft, waterplane area, and/or waterline), controls the activation and deactivation of computers and/or other electronic devices so as to adjust the embodiment's electrical load to approximately match the amount of power being generated by its power take off, controls the propulsion of the embodiment so as to steer the embodiment in and/or along a desirable course, and/or toward or to a desirable location, controls the communication systems so as to provide data to a remote receiver (e.g., a receiving computer, network, and/or operator) and/or to receive data from a remote receiver (e.g., weather forecasts, shipping data, computational tasks requiring execution, etc.), etc.

Any "generator" mentioned, discussed, and/or specified, in the invention includes, but is not limited to, any device, machine, module, and/or system, that generates electrical power, pressurized hydraulic fluid, compressed air, and/or performs some other useful work or produces some other useful product. Any "generator" mentioned, discussed, and/or specified, in the invention may be a generator, and alternator, or any other mechanism, device, and/or component, that converts energy from one form to another, including, but not limited to, any mechanism, device, and/or component, that converts the rotary motion of a turbine's shaft or the repeated motion of some other component into electrical power.

The invention includes embodiments possessing, incorporating, including, and/or utilizing, any number of inertial water tubes, and inertial water tubes of any and all shapes, sizes, diameters, drafts, tapers, cross-sectional areas, and possessing and/or incorporating any number of constrictions, and constrictions of any all absolute and/or relative cross-sectional areas, shapes, profiles, relative positions within and/or along an inertial water tube. The invention includes embodiments possessing, incorporating, including, and/or utilizing, inertial water tubes made of any and all materials.

The invention includes embodiments possessing, incorporating, including, and/or utilizing, water and/or hydrokinetic turbines of any and all types, any and all diameters, any and all efficiencies, any and all power ratings, and made of any and all materials.

The invention includes embodiments possessing, incorporating, including, and/or utilizing, multiple water turbines in series, e.g., multiple turbines extracting energy from a same flow of water and/or within a same effluent tube.

The invention includes embodiments possessing, incorporating, including, and/or utilizing, any number of water reservoirs, and water reservoirs of any design, size, shape, volume, relative and/or absolute position within an embodiment. The invention includes embodiments possessing, incorporating, including, and/or utilizing, water reservoirs made of any and all materials.

The invention includes generators, alternators, etc., in which the amount, degree, and/or magnitude, of the resistive torque imparted by to the water turbines operatively connected to those generators, alternators, etc., may be actively controlled so as to optimize the extraction of energy from the water flowing through the respective inertial water tubes and/or turbines.

The invention includes the use of adjustable guide vanes, dampers, and/or other flow-control surfaces, and/or other obstructions to flow, that may be used to adjust the rate at which water flows through the respective water turbines, especially so as to optimize the extraction of energy from the water flowing through the turbines and their respective inertial water tubes.

A portion of many embodiments of the present disclosure include, incorporate, and/or utilize, at least one buoyant portion. These buoyant portions may be referred to as hollow flotation modules, upper hull enclosures, buoys, buoyant capsules, buoyant chambers, buoyant compartments, buoyant enclosures, buoyant vessels, hollow balls, and/or hollow spheroids. Many terms, names, descriptors, and/or labels, could adequately distinguish an embodiment's buoyant portion from among its other components, features, and/or elements, and The present disclosure incorporates any naming convention and/or choice, and is not limited by the nomenclature used to describe an embodiment or its parts.

Ways of characterizing certain inventions of the current disclosure include (without implying limitation):

A hydrodynamic pump, comprising:

a hull enclosure adapted to float proximate to a surface of a body of liquid;

a liquid collecting chamber at least partially housed within the hull enclosure, the liquid collecting chamber adapted to confine liquid and gas at an elevated pressure;

a liquid pressurizing columnar conduit extending from and penetrating the hull enclosure, the liquid pressurizing columnar conduit comprising an ingress orifice disposed outside the hull enclosure, an injection orifice disposed inside the liquid collecting chamber, and an interior wall defining a liquid pressurizing surface adapted to pressurize liquid in the liquid pressurizing columnar conduit when the hydrodynamic pump oscillates in a direction approximately parallel to a longitudinal axis of the liquid pressurizing columnar conduit to inject liquid into the liquid collecting chamber;

an effluent conduit penetrating the hull enclosure and having an external effluent port configured to discharge liquid from the hydrodynamic pump;

a flow governor disposed in one of the liquid collecting chamber and the effluent conduit, the flow governor adapted to maintain a pressure gradient between the liquid collecting chamber and the external effluent port.

A hydrodynamic pump, comprising:

a buoyant enclosure adapted to float at a surface of a body of liquid, the buoyant enclosure configured to buoy the hydrodynamic pump in a floating orientation, the floating orientation defining a displacement plane separating a liquid-displacing portion of the buoyant enclosure from a non-liquid displacing portion of the buoyant enclosure;

a liquid collecting chamber at least partially housed within the buoyant enclosure, the liquid collecting chamber adapted to confine liquid and gas at an elevated pressure;

a liquid pressurizing columnar conduit extending from and penetrating the buoyant enclosure, the liquid pressurizing columnar conduit comprising an ingress orifice disposed below the displacement plane and outside the buoyant enclosure, an injection orifice disposed above the displacement plane and inside the liquid collecting chamber, and an interior wall defining a liquid pressurizing surface adapted to pressurize liquid in the liquid pressurizing columnar conduit when the hydrodynamic pump oscillates vertically so as to inject liquid into the liquid collecting chamber;

an effluent conduit penetrating the upper hull enclosure and having an external effluent port configured to discharge liquid from the hydrodynamic pump.

a flow governor disposed in one of the liquid collecting chamber and the effluent conduit, the flow governor adapted to maintain a pressure gradient between the liquid collecting chamber and the external effluent port.

The hydrodynamic pump previously disclosed, further including one of a grating, a plurality of bars, a screen, and a barrier comprised of a porous material, covering the inlet of the effluent conduit and adapted to prevent the passage of one of a macroalgae, a marine animal, a marine plant, and a filter, from flowing into the effluent conduit.

The hydrodynamic pump, wherein the flow governor comprises a turbine configured to rotate when liquid flows through the effluent conduit.

The hydrodynamic pump, wherein the turbine is disposed in the effluent conduit.

The hydrodynamic pump, further comprising an electrical generator coupled the turbine to create an electrical voltage when liquid flows through the effluent conduit.

The hydrodynamic pump, including a lamp comprising one of a lamp configured to illuminate an interior portion of the water tank and a lamp configured to illuminate an interior portion of the hollow tube.

The hydrodynamic pump, wherein the lamp is configured to promote the growth of one of a macroalgae, a microalgae, and a marine plant.

The hydrodynamic pump, wherein the flow governor comprises a filter adapted to remove and store a substance dissolved in liquid.

The hydrodynamic pump, wherein the filter comprises a lithium adsorbent material adapted to remove one of lithium, lithium salts, and lithium ions from seawater.

The hydrodynamic pump, wherein the filter comprises one of an adsorbent material and an absorbent material confined in an interior of the liquid collecting chamber.

The hydrodynamic pump wherein the flow governor comprises a constricting nozzle adapted to increase a velocity of liquid discharged from the hydrodynamic pump.

The hydrodynamic pump wherein the injection orifice is separated from a wall where the liquid pressurizing columnar conduit penetrates the hull enclosure to reduce backflow of liquid from the liquid collecting chamber to the liquid pressurizing columnar conduit.

The hydrodynamic pump, wherein the interior wall defining the liquid pressurizing surface is part of a constricting section of the liquid pressurizing columnar conduit.

A wave energy converter, comprising:

a hollow flotation capsule configured to rise and fall under an influence of a body of water, the flotation capsule including a water collection basin and a pressurized air enclosure, the pressurized air enclosure in fluid communication with the water collection basin;

a hollow tube extending from the hollow flotation capsule, the hollow tube comprising a water inlet mouth spaced from the hollow flotation capsule, and the hollow tube further comprising a water discharge mouth disposed inside the hollow flotation capsule and configured to discharge water from the hollow tube into the pressurized air enclosure, and the hollow tube further comprising a wall defining a constricting surface adapted to increase an elevation reached by water flowing in the hollow tube toward the water discharge mouth during an oscillation of water within the hollow tube;

an effluent conduit having an inlet mouth configured to drain water from the water collection basin and an outlet mouth configured to discharge water from the wave energy converter;

a water turbine positioned proximate to the effluent conduit and configured to receive energy from water flowing through the effluent conduit; and an electrical generator coupled to the water turbine for converting an energy of water flowing through the effluent conduit.

The wave energy converter wherein the water collection basin and the pressurized air enclosure share a common enclosure.

The wave energy converter wherein the wave energy converter is configured to adopt a floating elevation wherein the constricting surface is submerged.

The wave energy converter wherein the effluent conduit outlet mouth is configured to discharge water into the body of water on which the wave energy converter floats.

The wave energy converter wherein the water turbine is one of an impulse turbine and a reaction turbine.

The wave energy converter wherein the water turbine comprises a propeller having rigid blades attached to a propeller hub.

The wave energy converter wherein the water turbine comprises a Kaplan turbine.

The wave energy converter wherein the water turbine comprises a Francis turbine.

The wave energy converter wherein the water turbine comprises a Turgo turbine.

The wave energy converter wherein the water turbine comprises a crossflow turbine.

The wave energy converter wherein the water turbine comprises a rotary machine that converts kinetic energy and potential energy of water into mechanical work and rotates an operatively connected water turbine shaft.

The wave energy converter wherein the water turbine is one of a high-head water turbine, a medium-head water turbine, and a low-head water turbine.

The wave energy converter including one of a grating, a plurality of bars, a screen, and a barrier comprised of a porous material, covering the inlet mouth of the effluent conduit and adapted to prevent the passage of one of a fish, a macroalgae, a marine animal, and a marine plant, from flowing into the effluent conduit.

The wave energy converter including a lamp comprising one of a lamp configured to illuminate an interior portion of the water tank and a lamp configured to illuminate an interior portion of the hollow tube.

The wave energy converter wherein the lamp is configured to promote the growth of one of a macroalgae, a microalgae, and a marine plant.

A hydrodynamic pump, comprising:

a hollow chamber configured to float adjacent to an upper surface of a body of water and to rise and fall in response to waves passing over the body of water;

a water container included within the hollow chamber;

a pressurized air container included within the hollow chamber and in fluid communication with the water container;

a hollow tube comprising a first mouth positioned within the hollow chamber and in fluid communication with the pressurized air container, and further comprising a second mouth positioned outside the hollow chamber, the first mouth having a cross-sectional area lesser than a cross-sectional area of the second mouth;

an effluent conduit traversing a wall of the hollow chamber, the effluent conduit adapted to drain water from the water container;

a water turbine adapted to receive energy from water draining from the water container via the effluent conduit; and an electrical generator coupled to the water turbine to generate electrical power from a rotation of the water turbine.

The hydrodynamic pump wherein the water container and the pressurized air container share one of a common container, a common chamber, a common enclosure, a common wall, and a common space.

The hydrodynamic pump wherein the water container and the pressurized air container are the same container.

The hydrodynamic pump wherein a portion of the water that drains from the water container is discharged into the body of water on which the hydrodynamic pump floats.

The hydrodynamic pump wherein the water turbine is one of a type of impulse turbine, and a type of reaction turbine.

The hydrodynamic pump wherein the water turbine is one of a type of radial-flow turbine, a type of tangential-flow turbine, a type of axial-flow turbine, a type of mixed-flow turbine, and a type of cross-flow turbine.

The hydrodynamic pump wherein the water turbine comprises a propeller with rigid blades attached to a propeller hub.

The hydrodynamic pump wherein the water turbine comprises a type of Kaplan turbine.

The hydrodynamic pump wherein the water turbine comprises a type of Francis turbine.

The hydrodynamic pump wherein the water turbine comprises a type of Turgo turbine.

The hydrodynamic pump wherein the water turbine comprises a type of Pelton turbine.

The hydrodynamic pump wherein the water turbine comprises a type of crossflow turbine.

The hydrodynamic pump wherein the water turbine comprises a rotary machine that converts kinetic energy and potential energy of water into mechanical work and rotates an operatively connected water turbine shaft.

The hydrodynamic pump wherein the water turbine is one of a high-head water turbine, a medium-head water turbine, and a low-head water turbine.

The hydrodynamic pump including one of a grating, a plurality of bars, a screen, and a barrier comprised of a porous material, covering an inlet mouth of the effluent conduit and adapted to prevent the passage of one of a fish, a macroalgae, a marine animal, and a marine plant, from flowing into the effluent conduit.

The hydrodynamic pump including a lamp comprising one of a lamp configured to illuminate an interior portion of the water container and a lamp configured to illuminate an interior portion of the hollow tube.

The hydrodynamic pump wherein the lamp is configured to promote the growth of one of a macroalgae, a microalgae, and a marine plant.

A hydrodynamic pump, comprising:

a buoyant body configured to float adjacent to an upper surface of a body of water and to rise and fall in response to waves passing over the body of water;

a water tank attached to the buoyant body, and defining first and second portions separated by a water tank sectional plane with respective first and second sectional sides, the first water tank portion comprising an aperture in fluid communication with an exterior of the hydrodynamic pump;

a hollow tube having a longitudinal axis approximately normal to the water tank sectional plane, comprising a first mouth positioned on the first sectional side and proximate to the first water tank portion, and further comprising a second mouth positioned on the second sectional side and distal to the water tank, the first mouth having a cross-sectional area lesser than a cross-sectional area of the second mouth, with the first mouth configured to eject water from the hollow tube into the water tank, and the second mouth configured to receive water from outside the hydrodynamic pump;

an effluent conduit with an inlet in fluid communication with an interior of the water tank and an outlet in fluid communication with an exterior of the hydrodynamic pump, with the effluent conduit adapted to drain water from the water tank;

a water turbine adapted to receive energy from water draining from the water tank through the effluent conduit; and an electrical generator coupled to the water turbine to generate electrical power from a rotation of the water turbine.

A hydrodynamic pump, comprising:

a buoyant body configured to float adjacent to an upper surface of a body of water and to rise and fall in response to waves passing across that upper surface, the buoyant body configured to buoy the hydrodynamic pump in a floating orientation, the floating orientation defining a displacement plane separating a liquid-displacing portion of the buoyant body from a non-liquid displacing portion of the buoyant body;

a water tank attached to the buoyant body;

a hollow tube having a longitudinal axis approximately normal to the displacement plane, comprising an upper mouth positioned at an upper side of the pump, and further comprising a lower mouth positioned at a lower side of the pump, the upper mouth having a cross-sectional area lesser than a cross-sectional area of the lower mouth, and the upper mouth configured to eject water from the hollow tube into the water tank, and the lower mouth configured to receive water from below the hydrodynamic pump when the hydrodynamic pump oscillates;

an effluent conduit with an inlet in fluid communication with an interior of the water tank and an outlet in fluid communication with an exterior of the hydrodynamic pump, with the effluent conduit adapted to drain water from the water tank;

a water turbine adapted to receive energy from water draining from the water tank through the effluent conduit; and an electrical generator coupled to the water turbine to generate electrical power from a rotation of the water turbine.

The hydrodynamic pump wherein a portion of the water that drains from the water tank is discharged into the body of water on which the hydrodynamic pump floats.

The hydrodynamic pump wherein the water turbine is one of a type of impulse turbine, and a type of reaction turbine.

The hydrodynamic pump wherein the water turbine is one of a type of radial-flow turbine, a type of tangential-flow turbine, a type of axial-flow turbine, a type of mixed-flow turbine, and a type of cross-flow turbine.

The hydrodynamic pump wherein the water turbine comprises a propeller with rigid blades attached to a propeller hub.

The hydrodynamic pump wherein the water turbine comprises a type of Kaplan turbine.

The hydrodynamic pump wherein the water turbine comprises a type of Francis turbine.

The hydrodynamic pump wherein the water turbine comprises a type of Turgo turbine.

The hydrodynamic pump wherein the water turbine comprises a type of Pelton turbine.

The hydrodynamic pump wherein the water turbine comprises a type of crossflow turbine.

The hydrodynamic pump wherein the water turbine comprises a rotary machine that converts kinetic energy and potential energy of water into mechanical work and rotates an operatively connected water turbine shaft.

The hydrodynamic pump wherein the water turbine is one of a high-head water turbine, a medium-head water turbine, and a low-head water turbine.

The hydrodynamic pump including one of a grating, a plurality of bars, a screen, and a barrier comprised of a porous material, covering the inlet of the effluent conduit and adapted to prevent the passage of one of a fish, a macroalgae, a marine animal, and a marine plant, from flowing into the effluent conduit.

The hydrodynamic pump including a lamp comprising one of a lamp configured to illuminate an interior portion of the water tank and a lamp configured to illuminate an interior portion of the hollow tube.

The hydrodynamic pump wherein the lamp is configured to promote the growth of one of a macroalgae, a microalgae, and a marine plant.

A wave energy converter, comprising:

a buoy configured to rise and fall under an influence of a body of water, with the buoy adapted to define an flotation orientation of the wave energy converter characterized by a displacement plane passing through the buoy and having upper and lower sides when the buoy is floating in a body of water wherein the portion of the wave energy converter on the upper side of the displacement plane and above it does not displace water from the body of water, and the portion of the wave energy converter on the lower side of the displacement plane and below it displaces water from the body of water;

a hollow tube depending from the buoy having a longitudinal axis approximately normal to the displacement plane of the buoy and comprising an upper mouth and a lower mouth with the distance of the upper mouth to the displacement plane being lesser than the distance of the lower mouth to the displacement plane, and wherein the cross-sectional area of the upper mouth is lesser than the cross-sectional area of the lower mouth;

a water collection reservoir in fluid communication with the upper mouth of the hollow tube;

an effluent pipe extending from the water collection reservoir to the body of water for diverting at least a portion of water collected in the water collection reservoir to the body of water; and an electrical energy generator for converting an energy of a portion of water in the water collection reservoir into electrical energy.

The wave energy converter wherein the hollow tube includes an interior wall defining a first water accelerating surface adapted to eject water through the upper mouth of the hollow tube in response to an increasing hydrodynamic pressure within the interior of the hollow tube.

The wave energy converter wherein the hollow tube includes a constricted segment adapted to elevate a portion of water flowing from the lower mouth of the hollow tube to the upper mouth of the hollow through the upper mouth of the hollow tube.

The wave energy converter including a water turbine rotates in response to water diverted from the water collection reservoir through the effluent pipe, and wherein the water turbine is coupled to the electrical energy generator such that a rotation of the water turbine causes electrical energy to be generated.

The wave energy converter wherein the water turbine is one of a type of impulse turbine, and a type of reaction turbine.

The wave energy converter wherein the water turbine is one of a type of radial-flow turbine, a type of tangential-flow turbine, a type of axial-flow turbine, a type of mixed-flow turbine, and a type of cross-flow turbine.

The wave energy converter including one of a grating, a plurality of bars, a screen, and a barrier comprised of a porous material, covering an inlet of the effluent pipe and adapted to prevent the passage of one of a fish, a macroalgae, a marine animal, and a marine plant, from flowing into the effluent pipe.

The wave energy converter including a lamp comprising one of a lamp configured to illuminate an interior portion of the water collection reservoir and a lamp configured to illuminate an interior portion of the hollow tube.

The wave energy converter wherein the lamp is configured to promote the growth of one of a macroalgae, a microalgae, and a marine plant.

A wave energy converter, comprising:

a buoy configured to rise and fall under an influence of a body of water and further configured to define an approximately vertical axis with upper and lower ends when floating in a body of water;

a hollow tube depending from the buoy and having a water ingress mouth closer to a lower end than an upper end of the vertical axis and a water discharge spout closer to an upper end than a lower end of the vertical axis, and further comprising an interior including a wall defining a first water accelerating surface adapted to eject water through the water discharge spout in response to an increasing hydrodynamic pressure within the interior of the hollow tube;

a water collection reservoir in fluid communication with the water discharge spout;

an effluent pipe extending from the water collection reservoir for diverting at least a portion of water collected in the water collection reservoir to an exterior of the wave energy converter;

a water turbine configured to be rotated in response to water diverted through the effluent pipe; and an electrical energy generator coupled to the water turbine and adapted to convert rotations of the water turbine into electrical energy.

The wave energy converter wherein the hollow tube includes a constricted segment adapted to elevate a portion of water flowing from the lower mouth of the hollow tube to the upper mouth of the hollow through the upper mouth of the hollow tube.

The wave energy converter wherein the water turbine is one of a type of impulse turbine, and a type of reaction turbine.

The wave energy converter wherein the water turbine is one of a type of radial-flow turbine, a type of tangential-flow turbine, a type of axial-flow turbine, a type of mixed-flow turbine, and a type of cross-flow turbine.

The wave energy converter including one of a grating, a plurality of bars, a screen, and a barrier comprised of a porous material, covering an inlet of the effluent pipe and adapted to prevent the passage of one of a fish, a macroalgae, a marine animal, and a marine plant, from flowing into the effluent pipe.

The wave energy converter including a lamp comprising one of a lamp configured to illuminate an interior portion of the water collection reservoir and a lamp configured to illuminate an interior portion of the hollow tube.

The wave energy converter wherein the lamp is configured to promote the growth of one of a macroalgae, a microalgae, and a marine plant.

A hydrodynamic pump, comprising:

a buoyant body configured to float adjacent to an upper surface of a body of water and to rise and fall in response to waves passing across that upper surface, the buoyant body configured to adopt a device orientation characterized by a displacement plane when floating adjacent to the upper surface of the body of water where the displacement plane is configured such that the portion of the hydrodynamic pump below the displacement plane displaces water from the body of water and the portion of the hydrodynamic pump above the displacement plane does not displace water from the body of water;

a hollow tube having a longitudinal axis approximately normal to the displacement plane, comprising a first mouth positioned above the displacement plane, and further comprising a second mouth positioned below the displacement plane, the first mouth having a cross-sectional area lesser than a cross-sectional area of the second mouth, with the first mouth configured to eject water from the hollow tube in a direction substantially away from the displacement plane, and the second mouth configured to receive water from outside the hydrodynamic pump.

The hydrodynamic pump wherein the hollow tube includes a constricted segment adapted to elevate a portion of water flowing from the second mouth of the hollow tube to the first mouth of the hollow through the first mouth of the hollow tube.

The hydrodynamic pump including a nozzle attached to the first mouth of the hollow tube and configured to aerosolize at least a portion of the water ejected therethrough.

A hydrodynamic pump, comprising:

a buoyant body configured to float adjacent to an upper surface of a body of water and to rise and fall in response to waves passing over that upper surface and further configured to define an approximately vertical device axis with upper and lower ends when floating in a body of water;

a water collecting reservoir attached to the buoyant body;

a hollow tube having a longitudinal axis approximately parallel to the vertical device axis, comprising a first mouth positioned closer to the upper end than the lower end of the vertical device axis, and further comprising a second mouth positioned closer to the lower end than the upper end of the vertical device axis, the first mouth having a cross-sectional area lesser than a cross-sectional area of the second mouth, with the first mouth configured to eject water from the hollow tube into the water collecting reservoir, and the second mouth configured to receive water from outside the hydrodynamic pump;

an effluent conduit with an inlet in fluid communication with the water collecting reservoir and an outlet in fluid communication with an exterior of the hydrodynamic pump, with the effluent conduit adapted to drain water from the water tank.

The hydrodynamic pump, including one of a grating, a plurality of bars, a screen, and a barrier comprised of a porous material, covering the inlet of effluent conduit and adapted to prevent the passage of one of a fish, a macroalgae, a marine animal, and a marine plant, from flowing into and through the effluent conduit.

These and other objects of the invention will best be understood with reference to the accompanying figures and the detailed description of the preferred embodiments below.

BRIEF DESCRIPTION OF THE DRAWINGS

FIG. 120 is a side sectional view of the embodiment of FIGS. 113-119;

FIG. 121 is a side sectional view of the embodiment of FIGS. 113-120;

FIG. 122 is a side perspective of the same sectional view illustrated in FIG. 121;

FIG. 123 is a top-down sectional view of the embodiment of FIGS. 113-122;

FIG. 124 is a top-down perspective of the same sectional view illustrated in FIG. 123;

FIG. 125 is a side perspective view of another embodiment of the present invention;

FIG. 126 is a side view of the embodiment of FIG. 125;

FIG. 127 is a side view of the embodiment of FIGS. 125 and 126;

FIG. 128 is a side view of the embodiment of FIGS. 125-127;

FIG. 129 is a top-down view of the embodiment of FIGS. 125-128;

FIG. 130 is a bottoms-up view of the embodiment of FIGS. 125-129:

FIG. 131 is a top-down sectional view of the embodiment of FIGS. 125-130:

Figure 131:
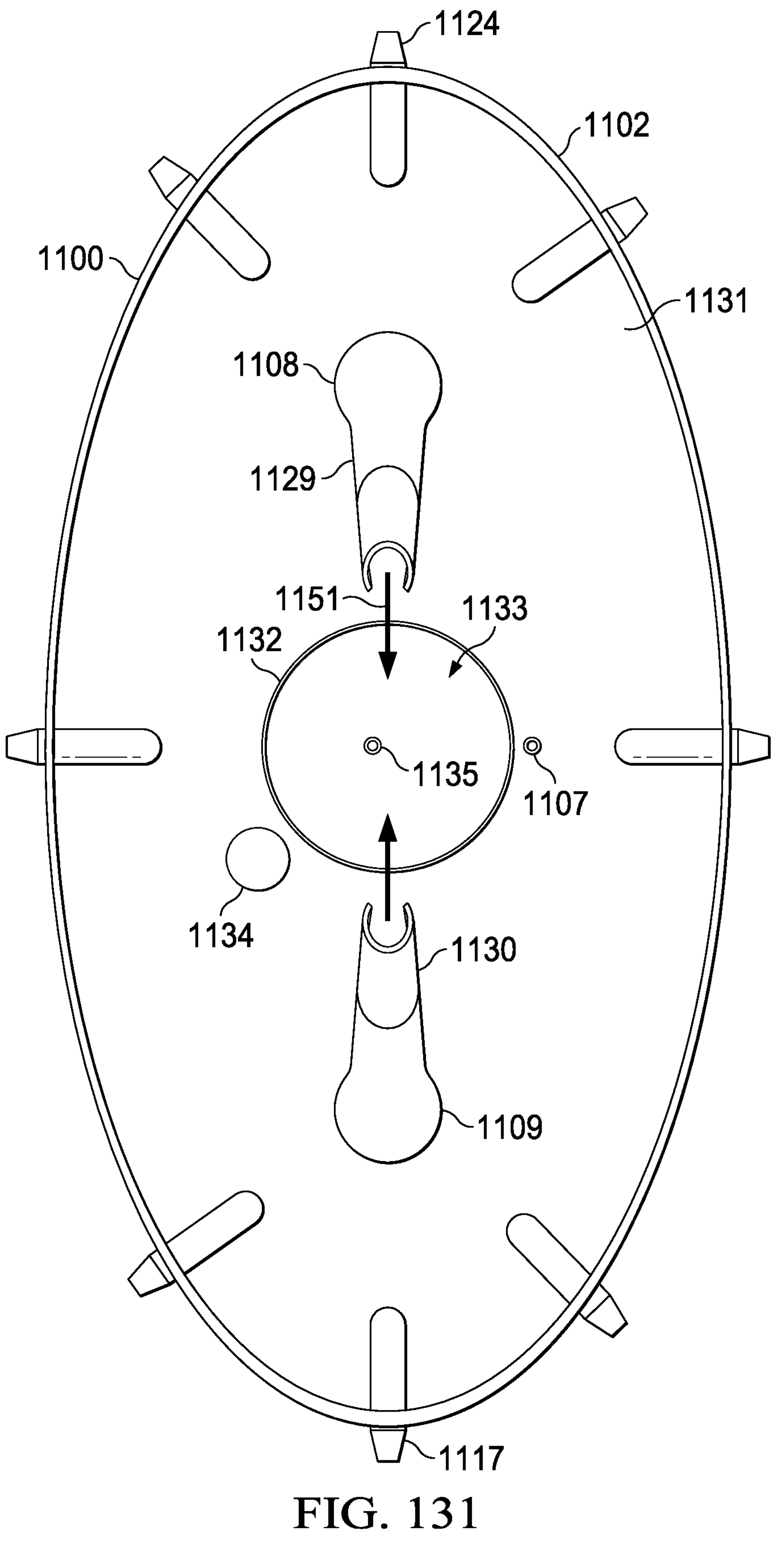
Figure 132:
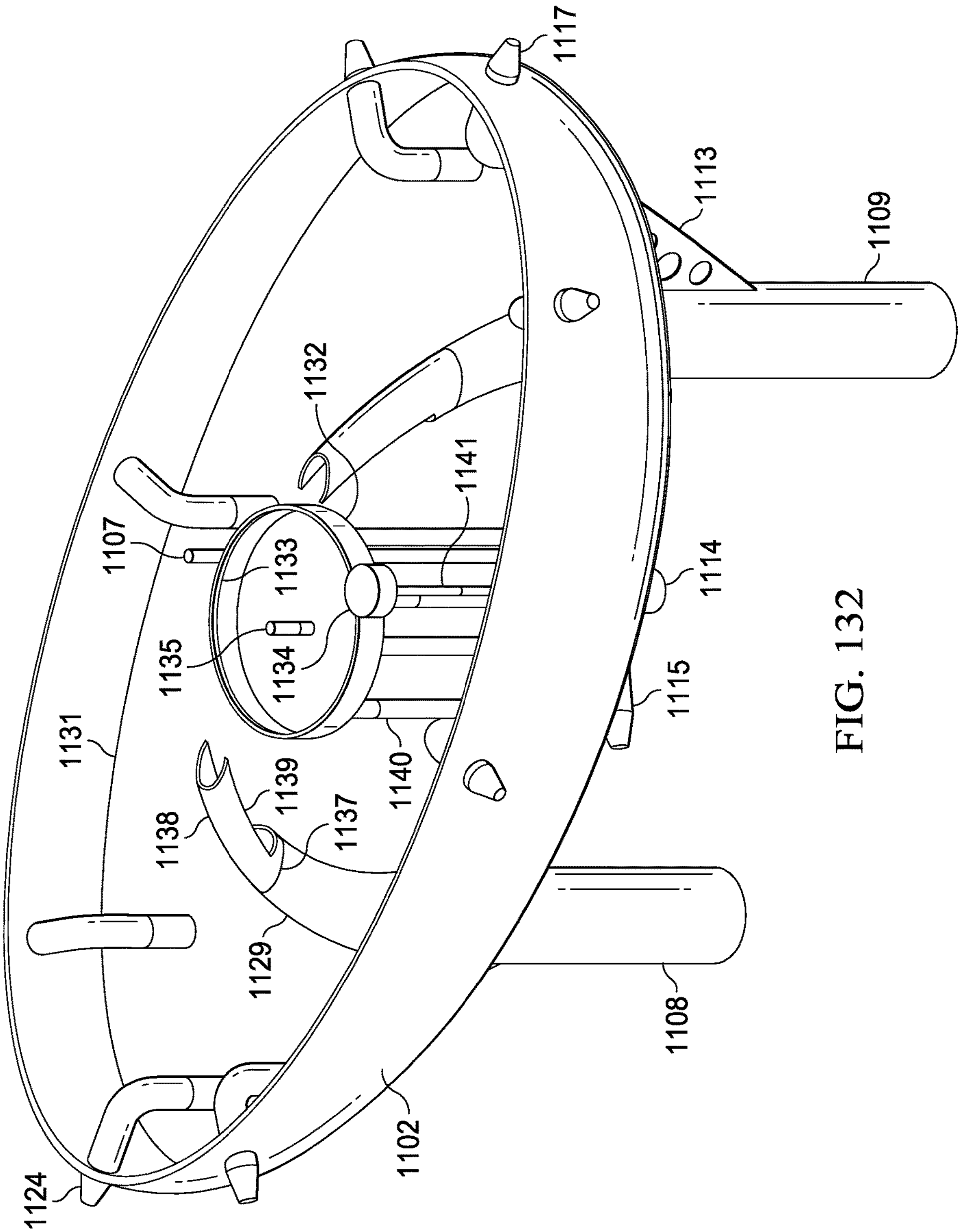
Figure 133:
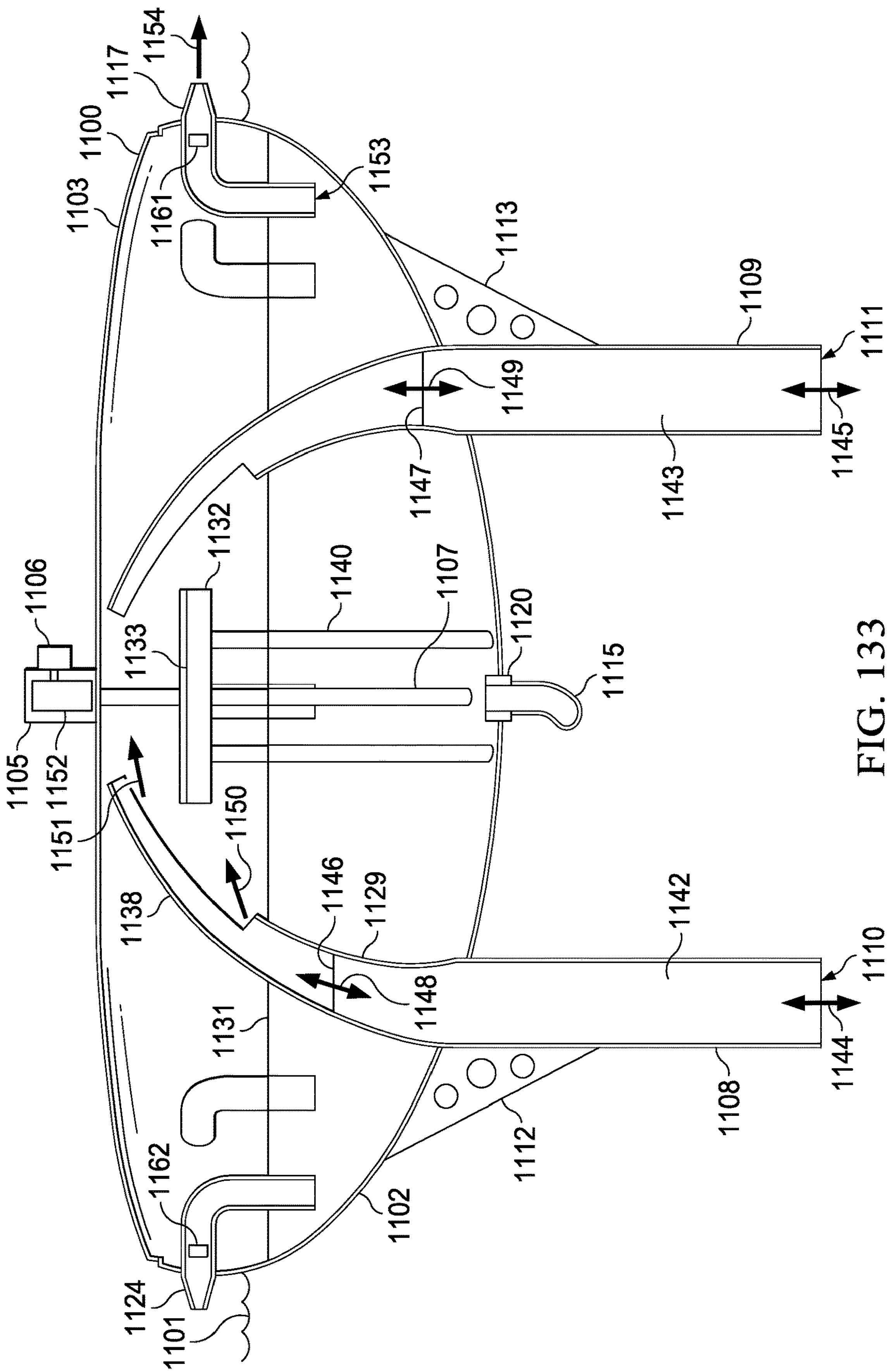
Figure 134:
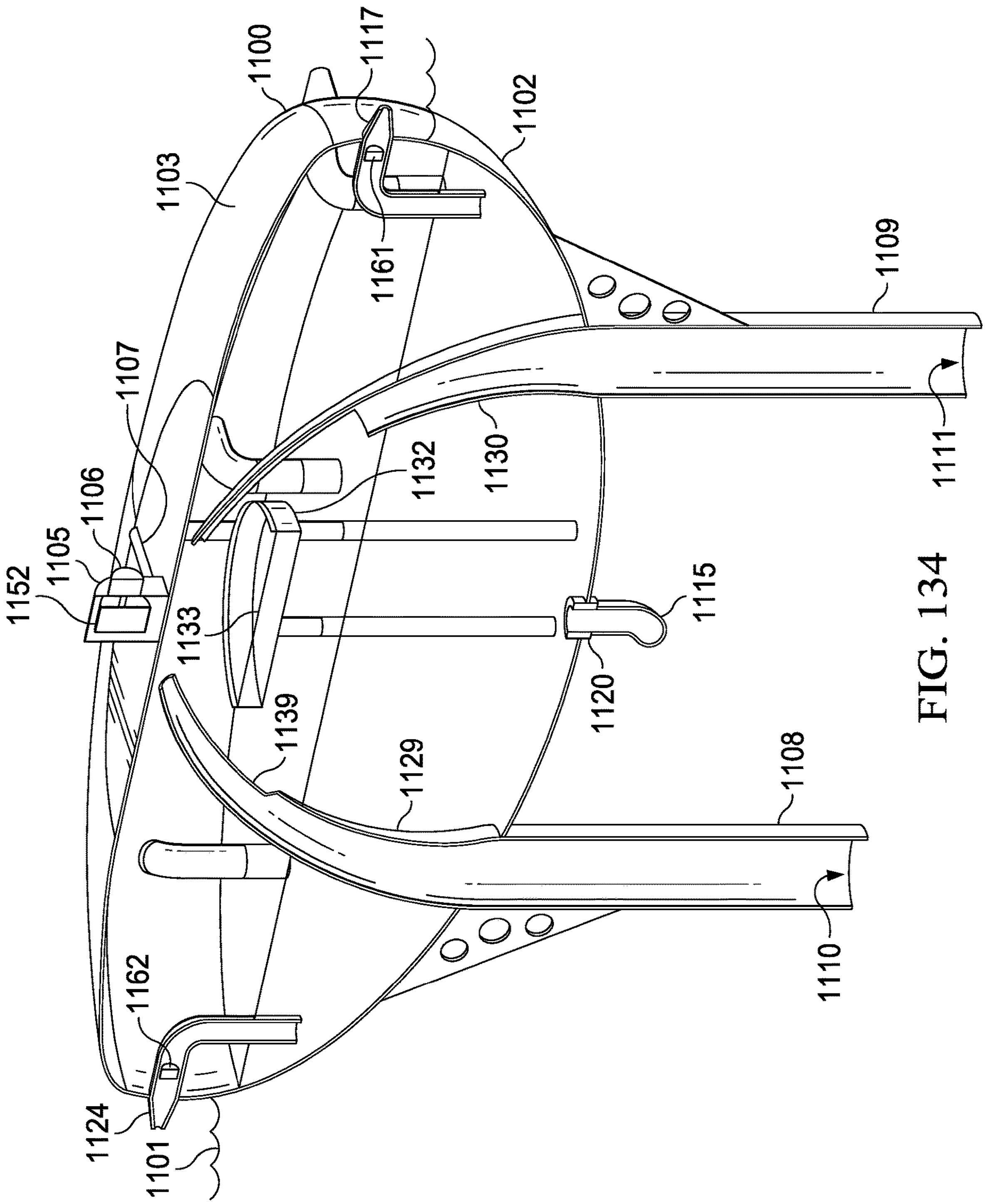
Figure 135:
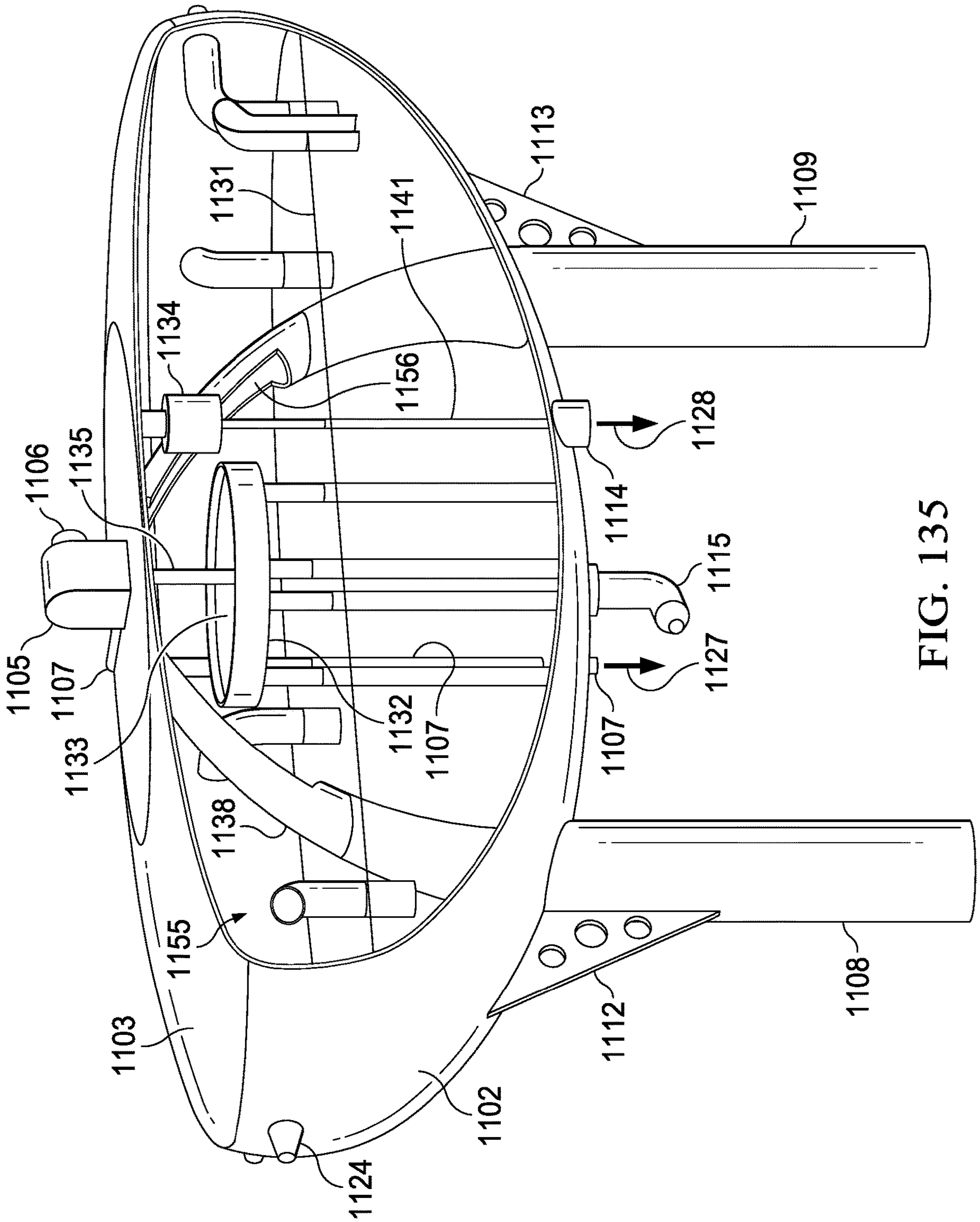
Figure 136:
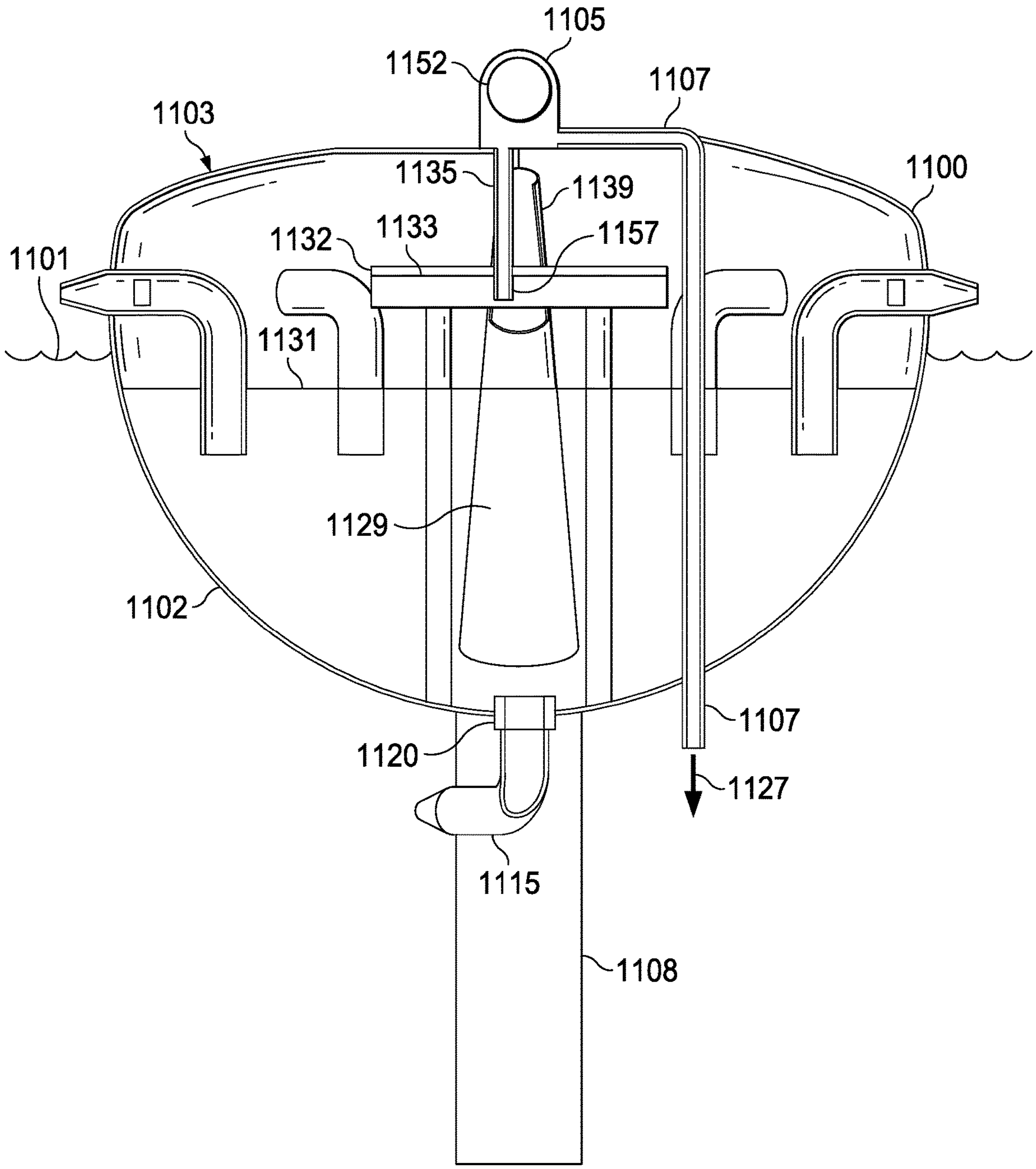
Figure 137:
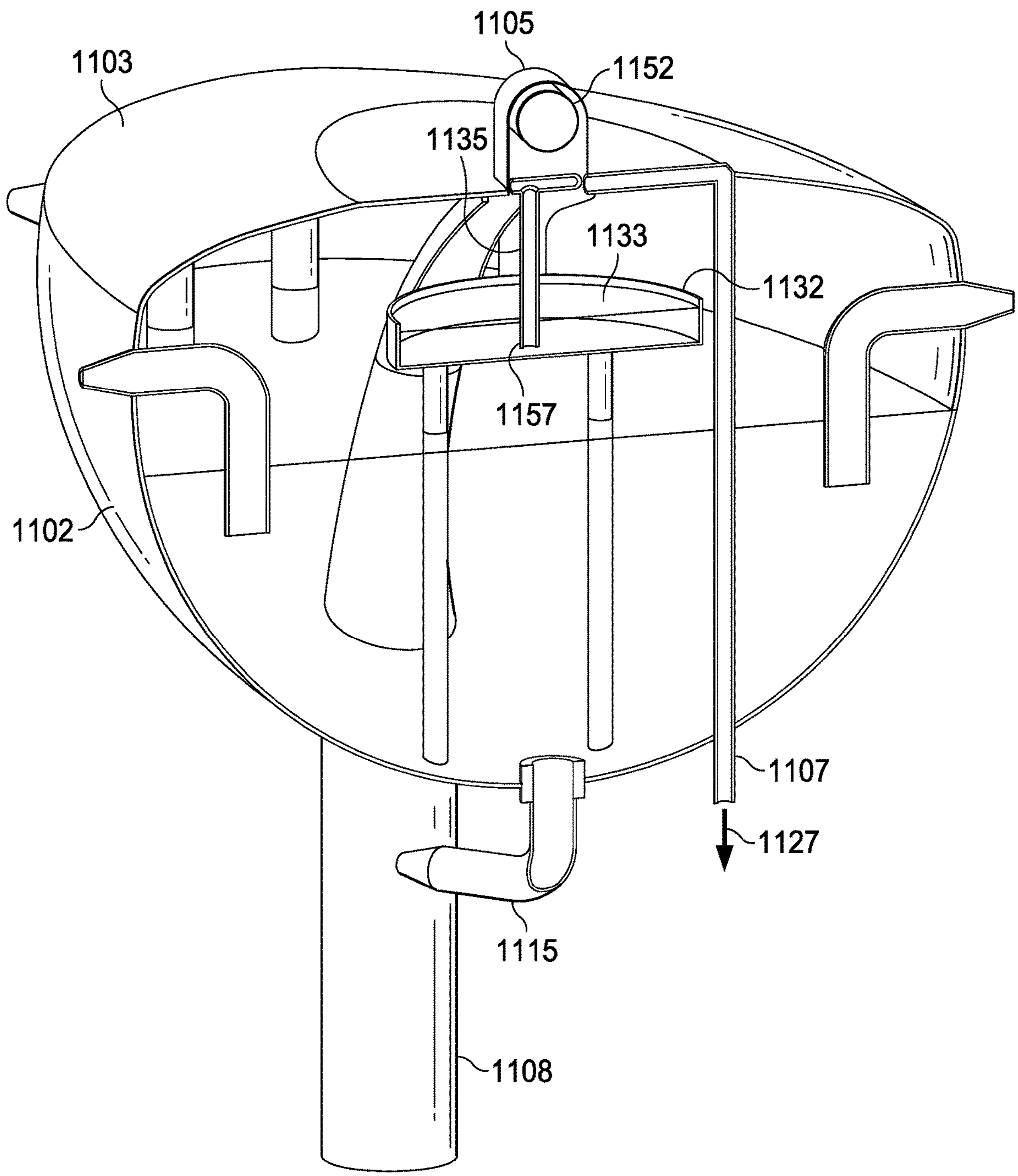
Figure 138:
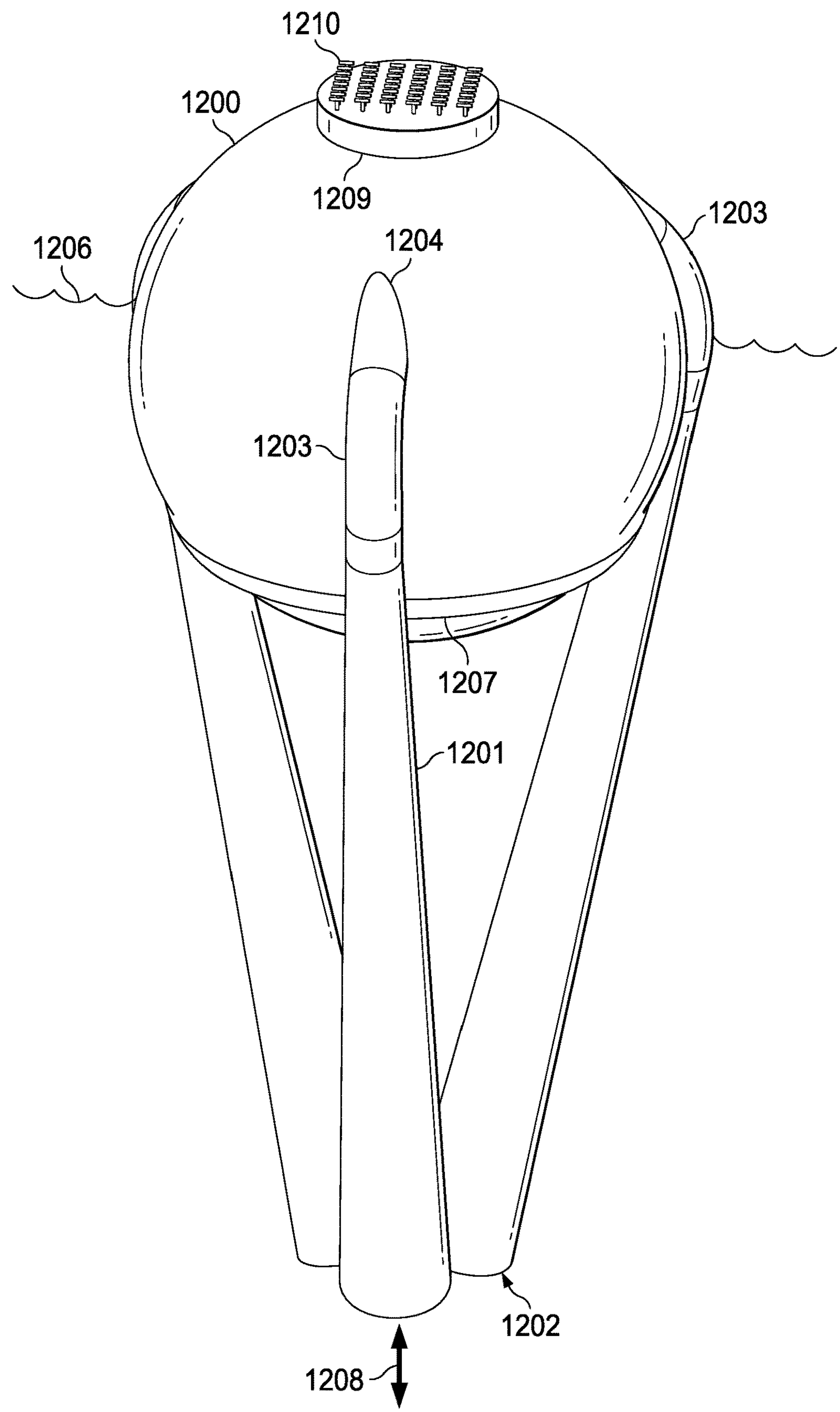
Figure 139:
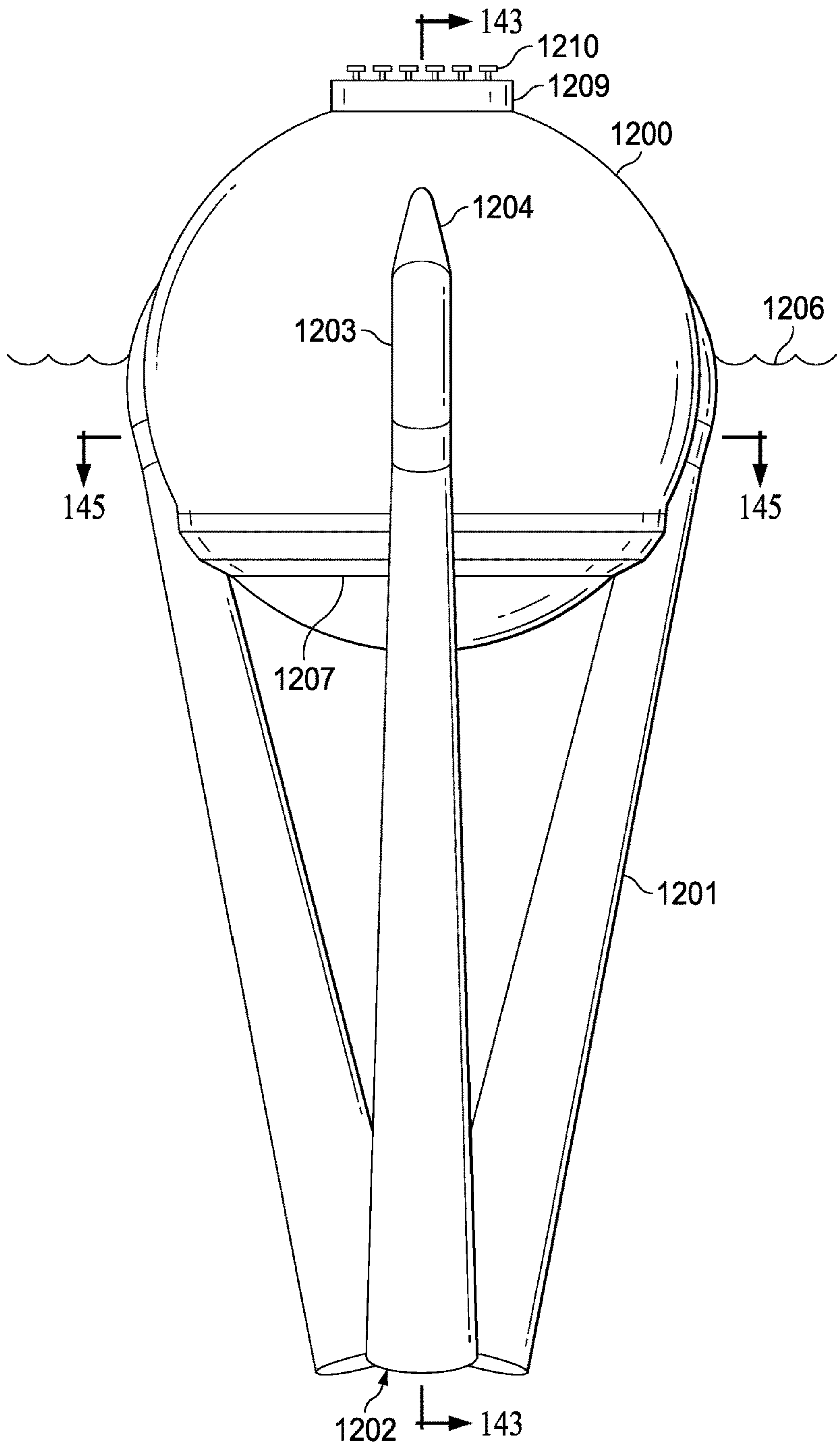
Figure 140:
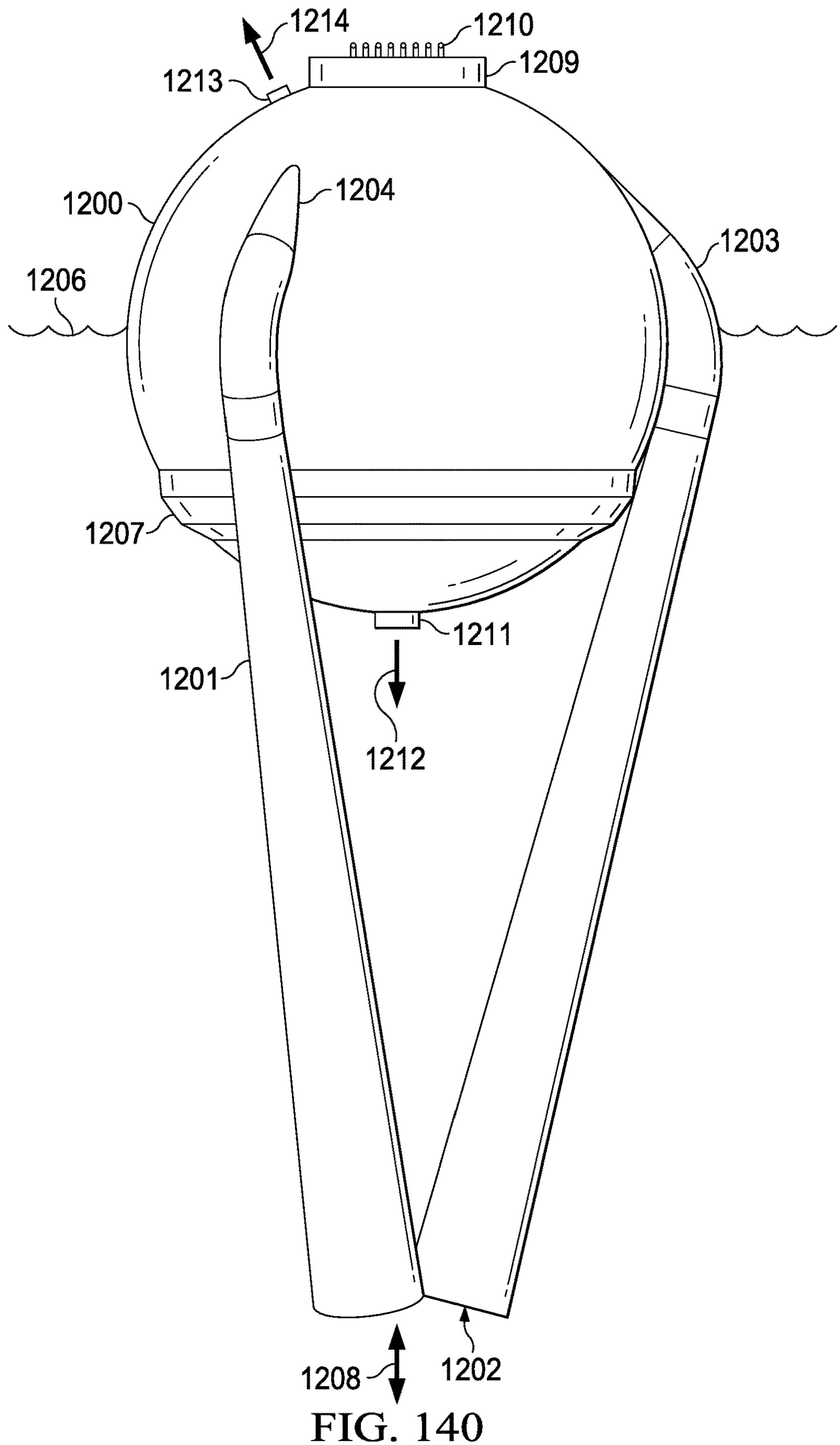
Figure 141:
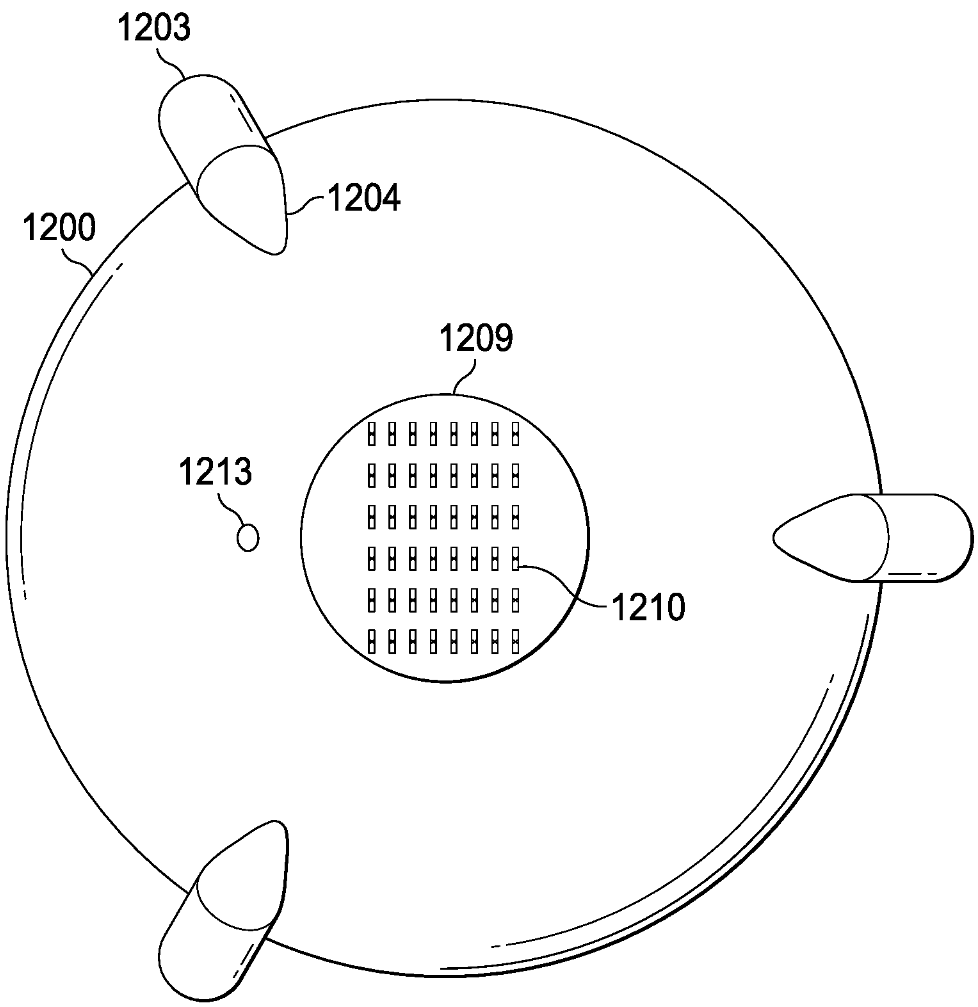
Figure 142:
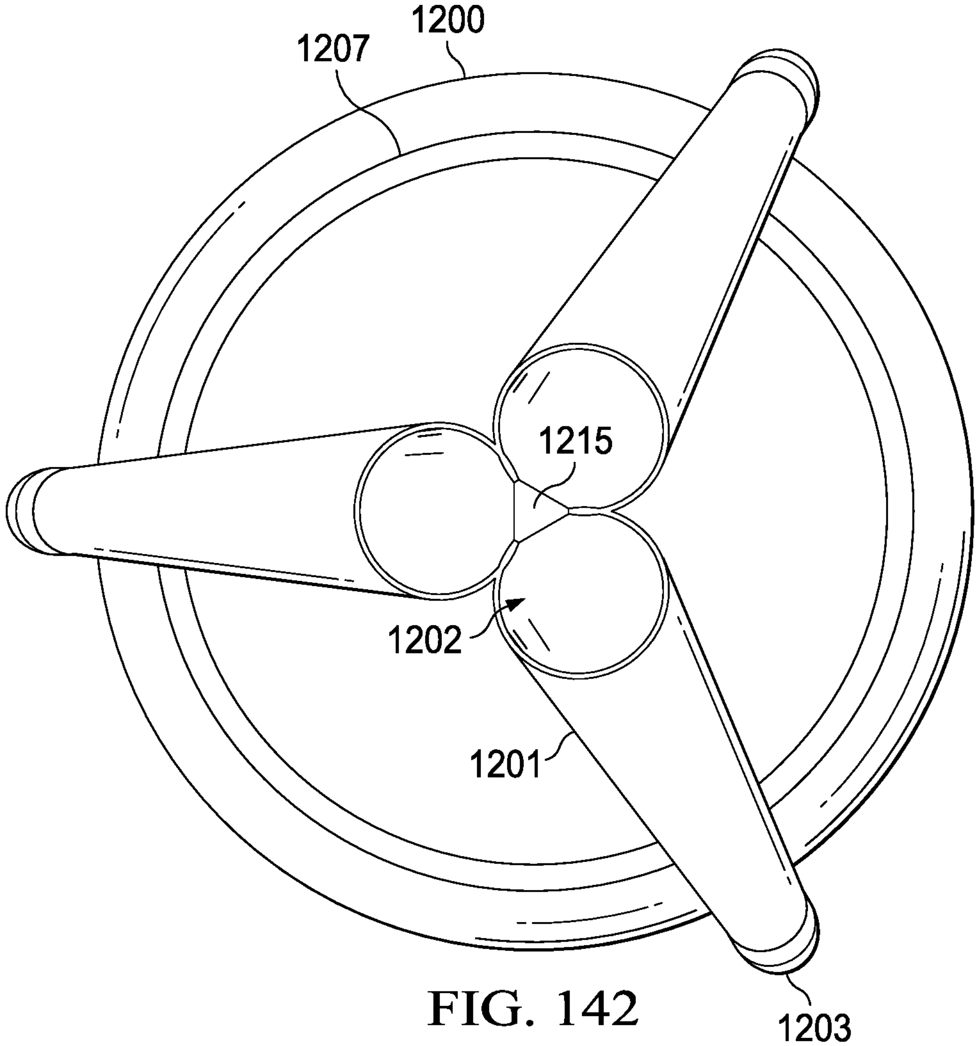
Figure 143:
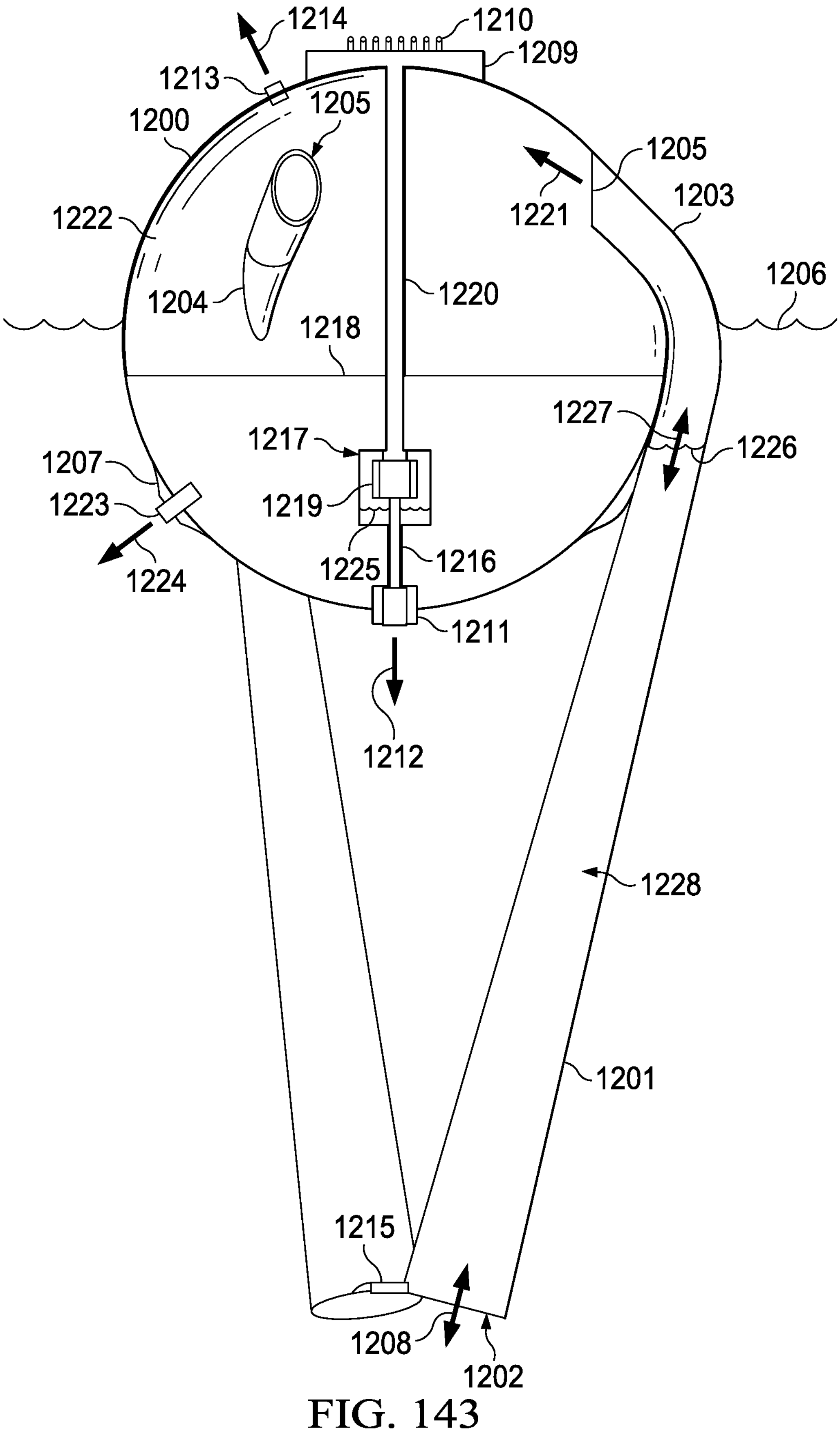
Figure 144:
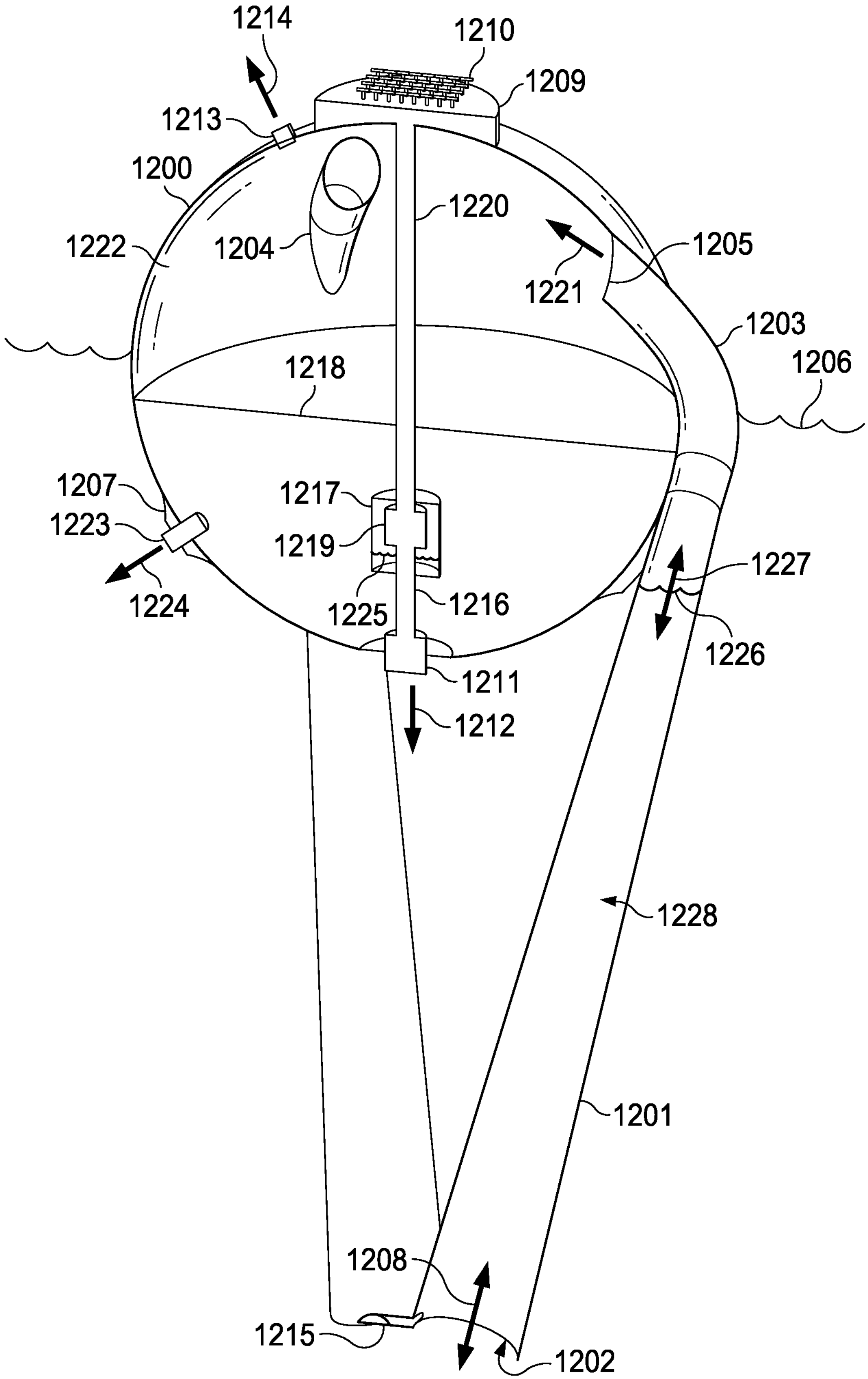
Figure 145:
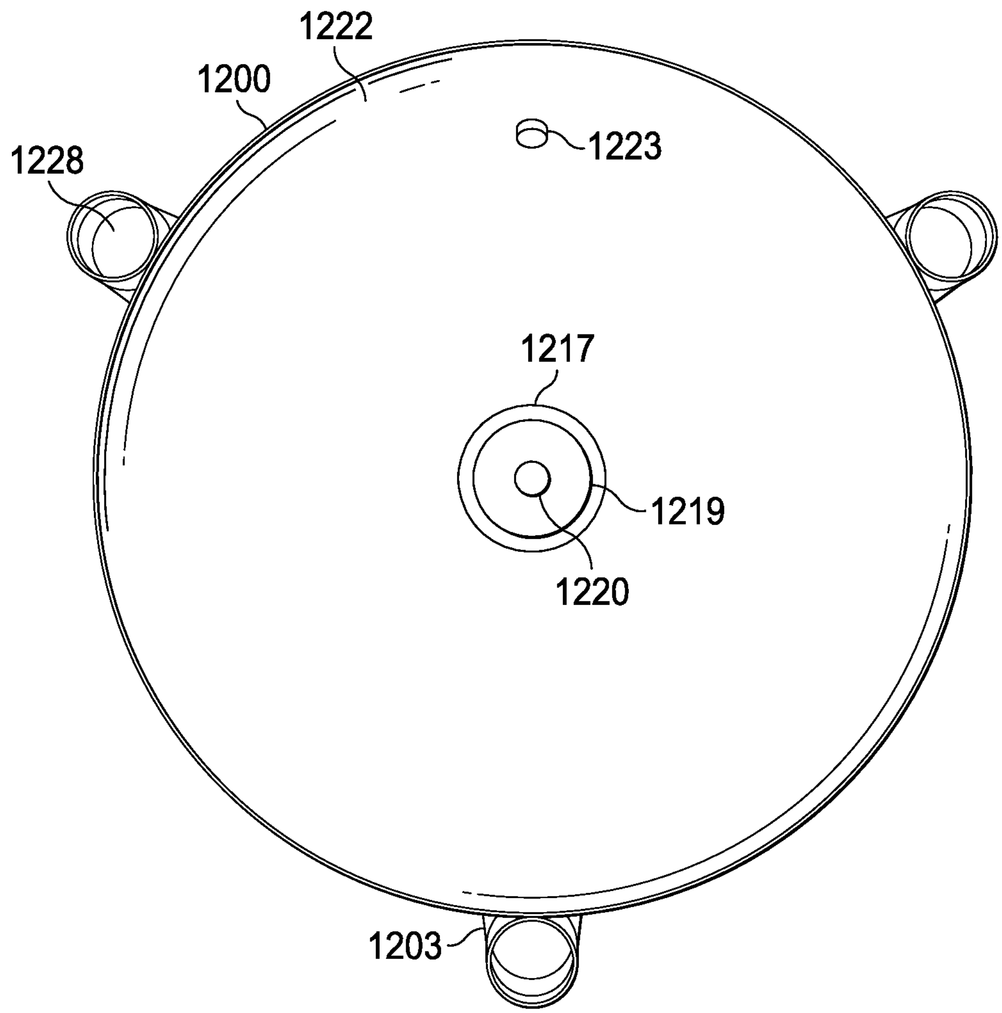
Figure 146:
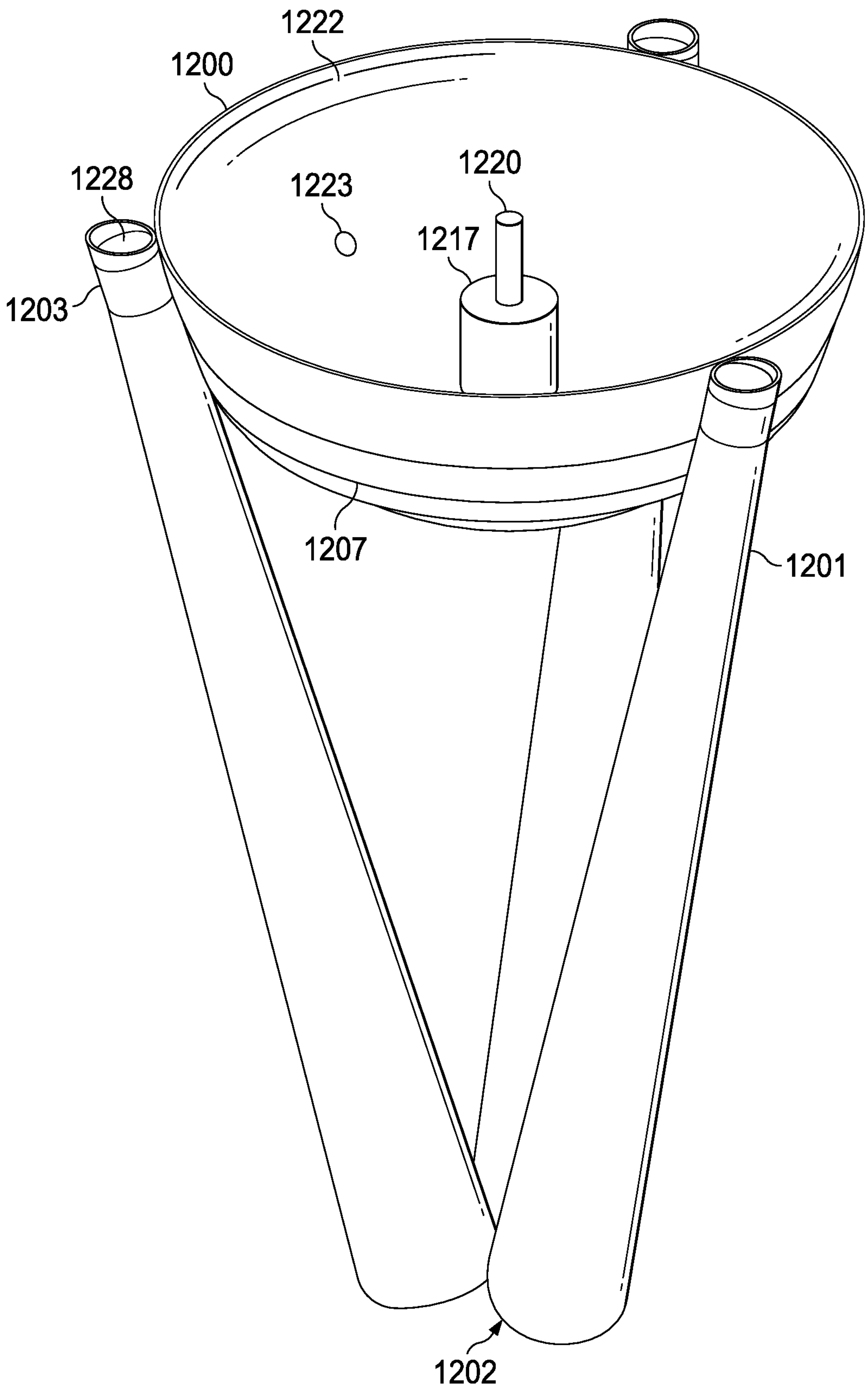
Figure 147:
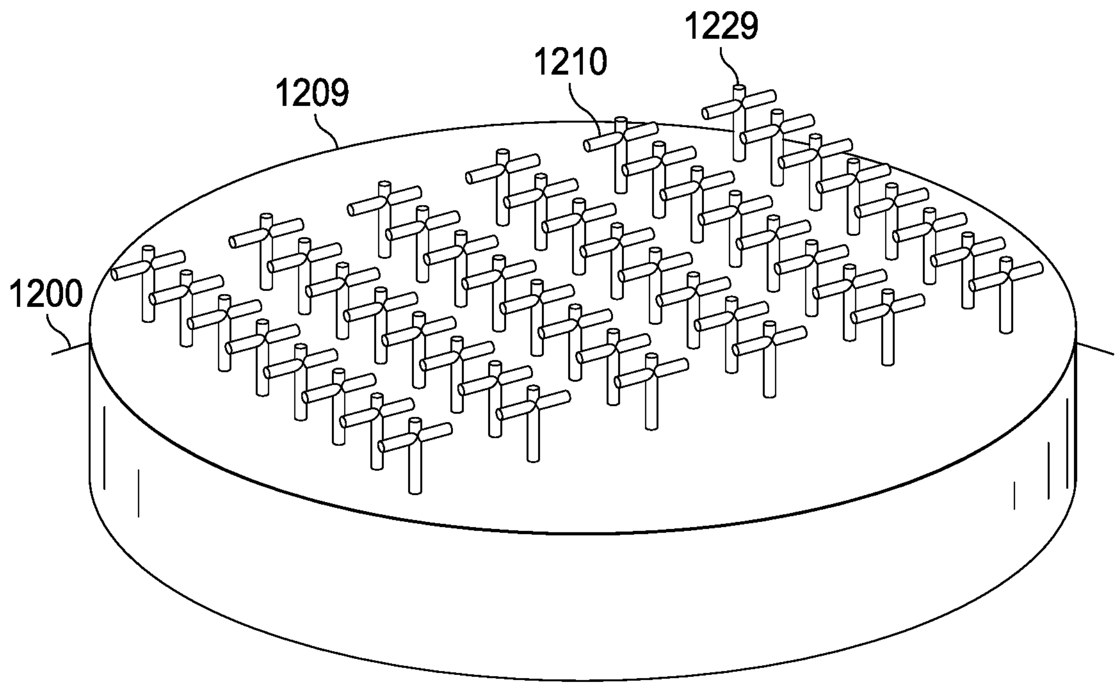
Figure 148:
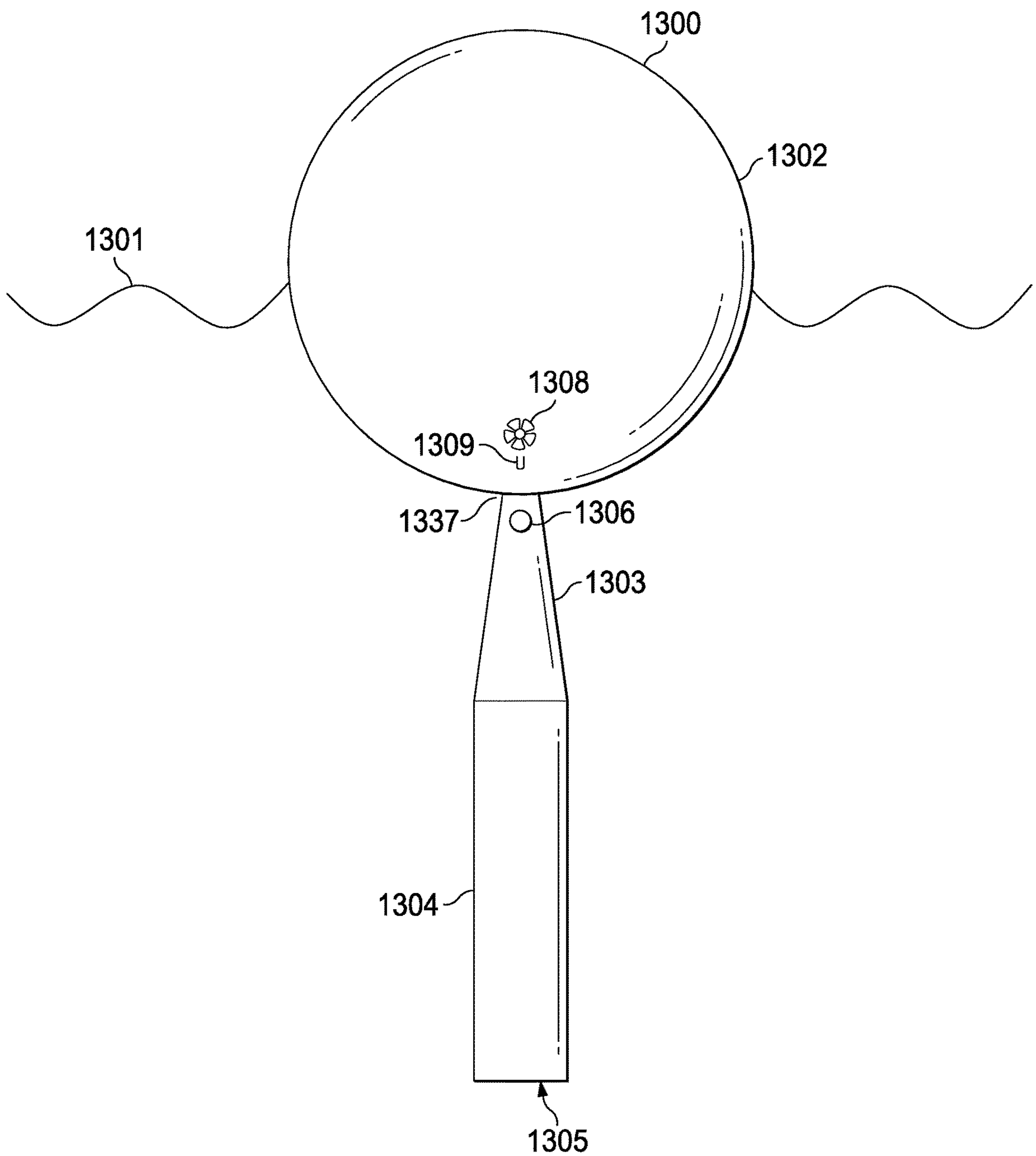
Figure 149:
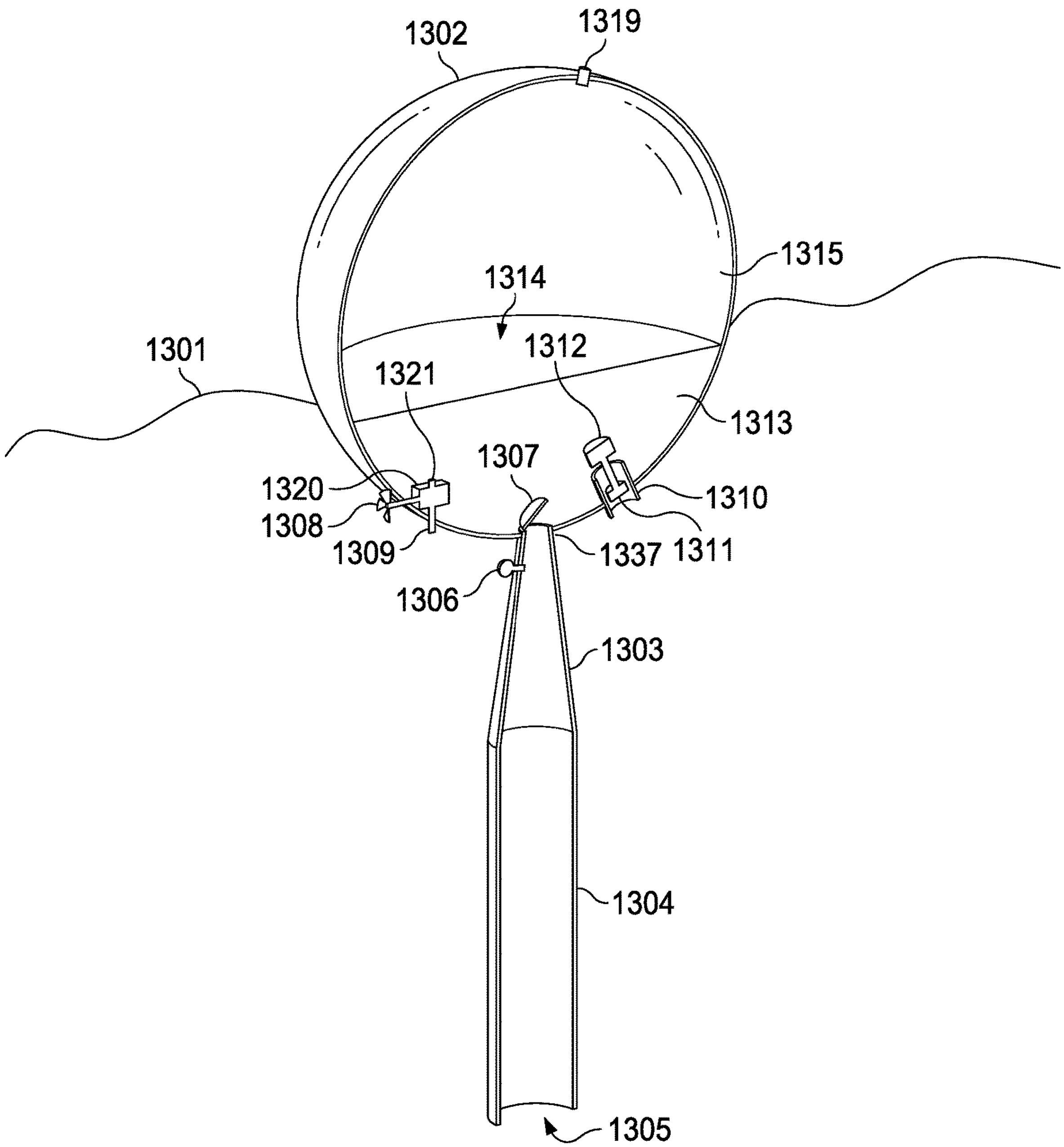
Figure 150:
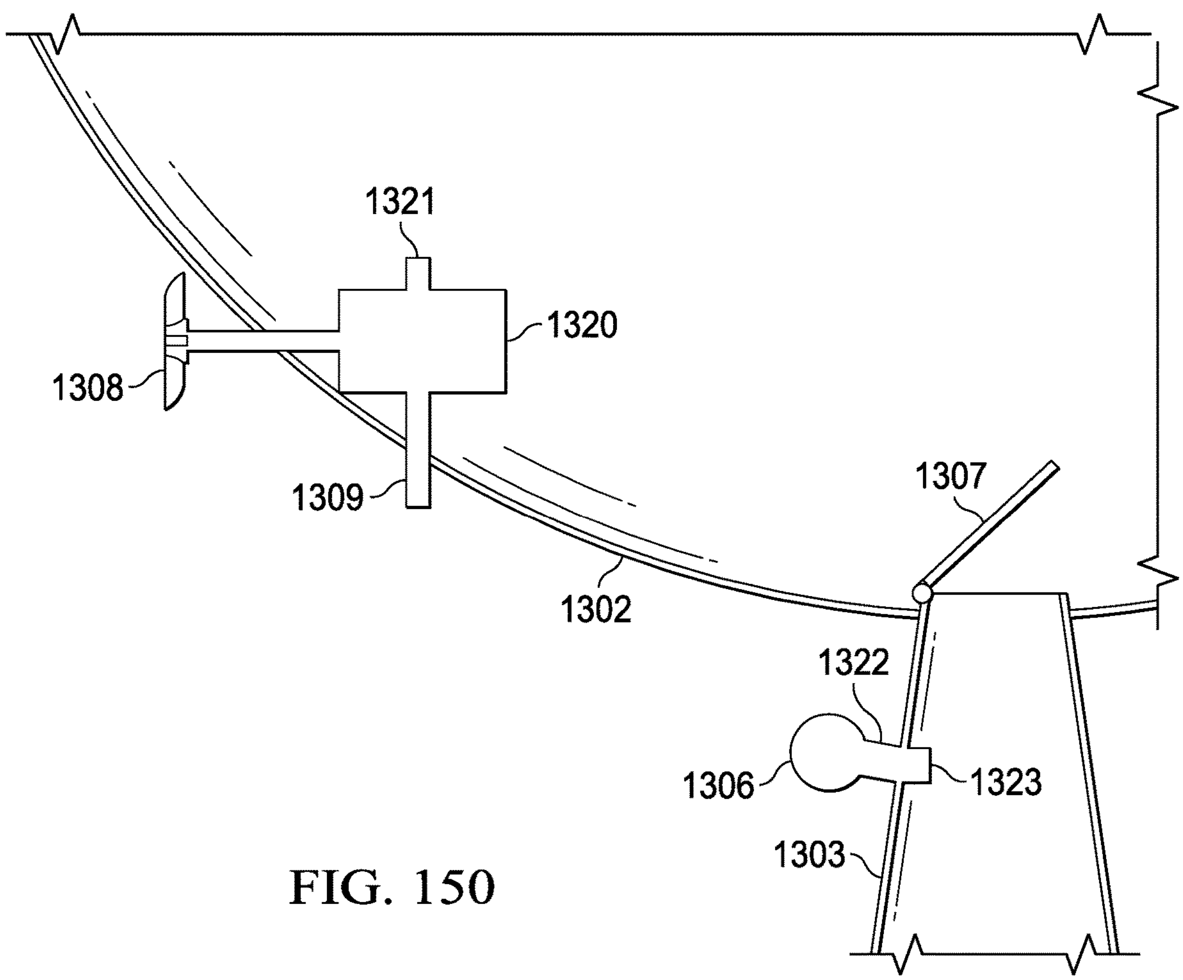

FIG. 132 is a side perspective of the same sectional view illustrated in FIG. 131;

FIG. 133 is a side sectional view of the embodiment of FIGS. 125-132;

FIG. 134 is a side perspective of the same sectional view illustrated in FIG. 133;

FIG. 135 is a side perspective sectional view of the embodiment of FIGS. 125-134;

FIG. 136 is a side sectional view of the embodiment of FIGS. 125-135;

FIG. 137 is a side perspective of the same sectional view illustrated in FIG. 136;

FIG. 138 is a side perspective view of another embodiment of the present invention;

FIG. 139 is a side view of the embodiment of FIG. 138:

FIG. 140 is a front view of the embodiment of FIGS. 138 and 139;

FIG. 141 is a top-down view of the embodiment of FIGS. 138-140;

FIG. 142 is a bottom-up view of the embodiment of FIGS. 138-141:

FIG. 143 is a vertical cross section of the same embodiment illustrated in FIGS. 138-142, with the section plane taken across line 143-143 in FIG. 139;

FIG. 144 is a perspective view of the vertical cross section illustrated in FIG. 143:

FIG. 145 is a horizontal cross section of the same embodiment illustrated in FIGS. 138-144, with the section plane taken across line 145-145 in FIG. 139;

FIG. 146 is a perspective view of the horizontal cross section illustrated in FIG. 145;

FIG. 147 is a detail view of the same embodiment illustrated in FIGS. 138-146;

FIG. 148 is a side view of another embodiment of the present invention:

FIG. 149 is a side perspective of a sectional view of the embodiment illustrated in FIG. 148;

FIG. 150 is a close-up side sectional view of the embodiment illustrated in FIG. 149.

Figure 151:
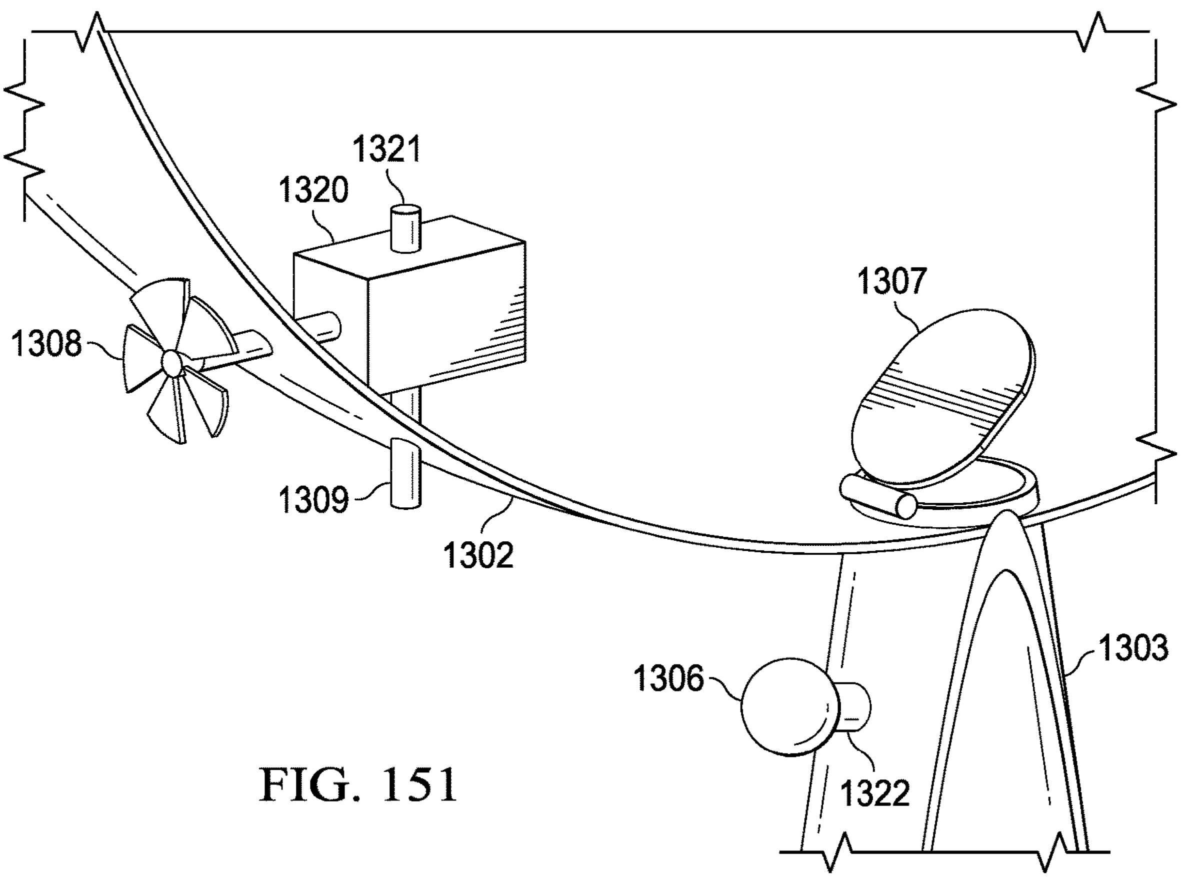
Figure 154:
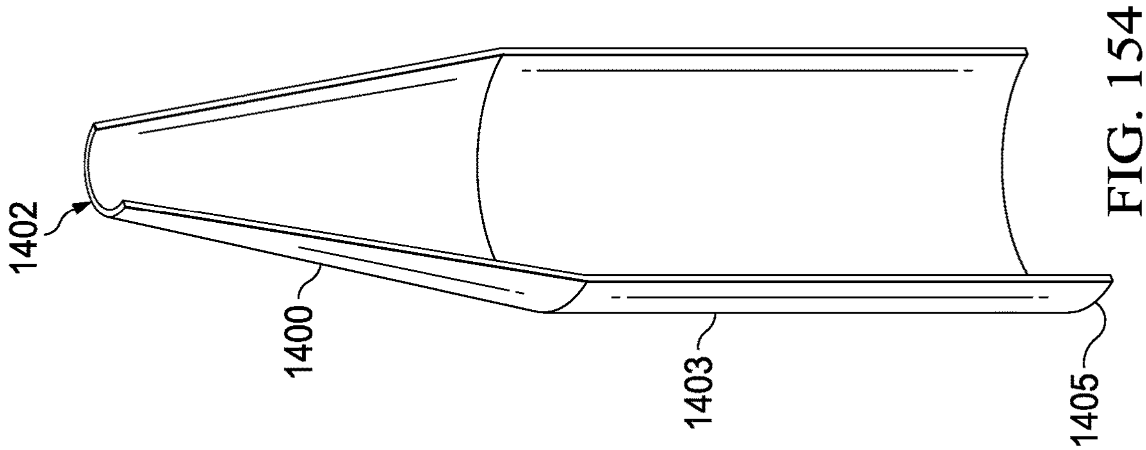
Figure 153:
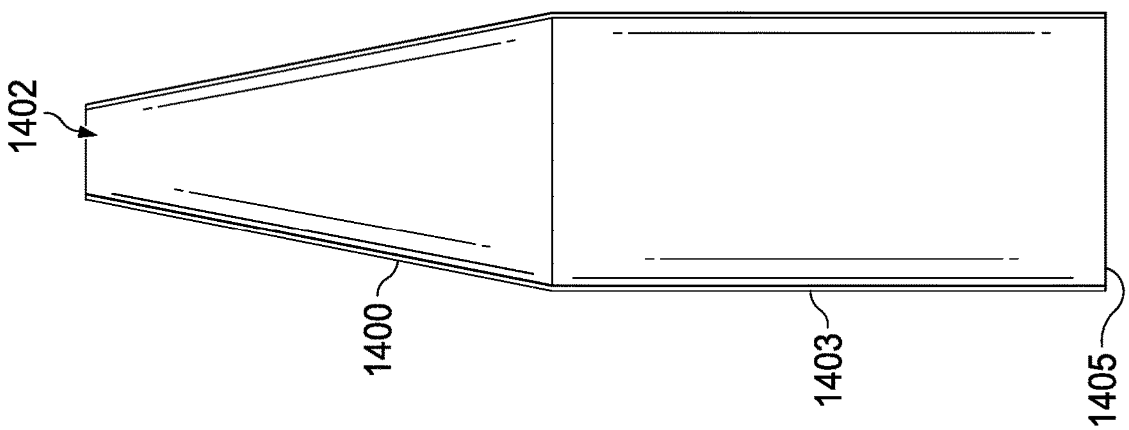
Figure 152:
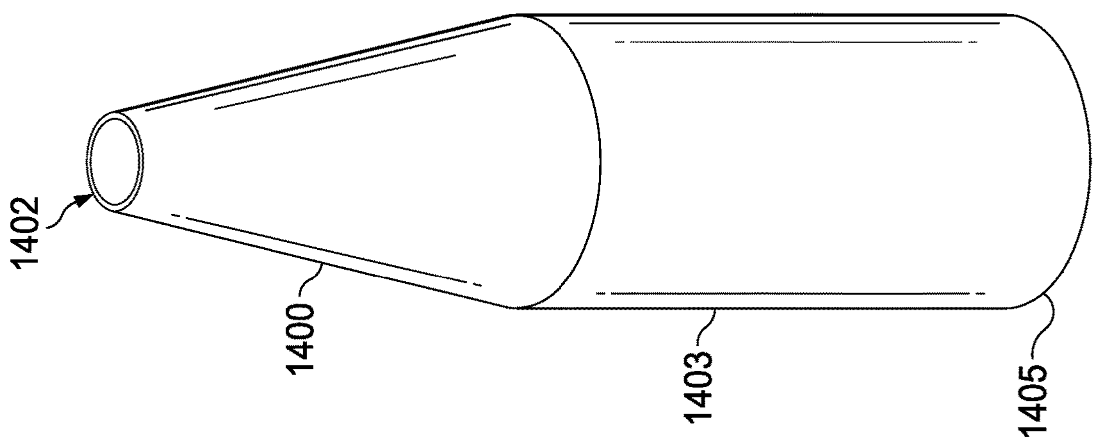
Figure 155:
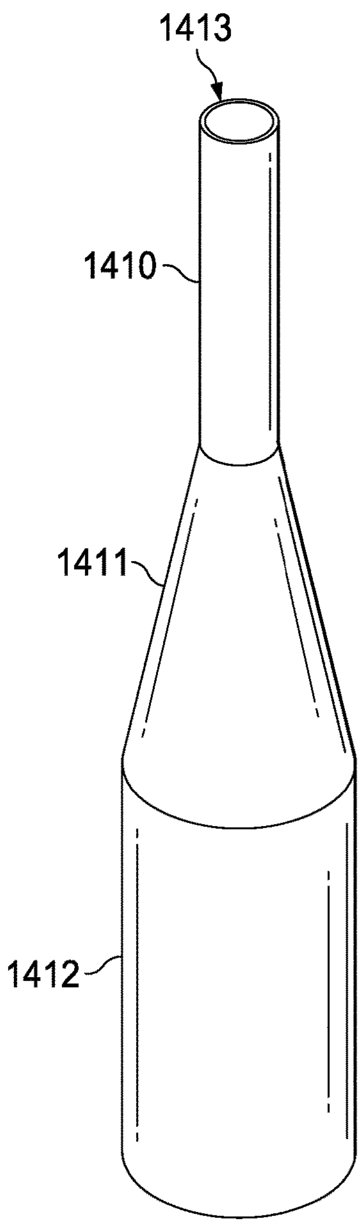
Figure 156:
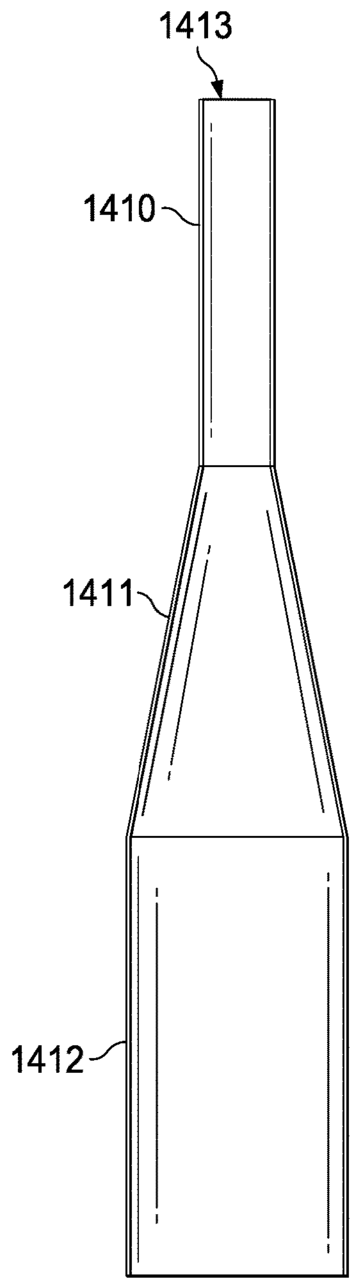
Figure 157:
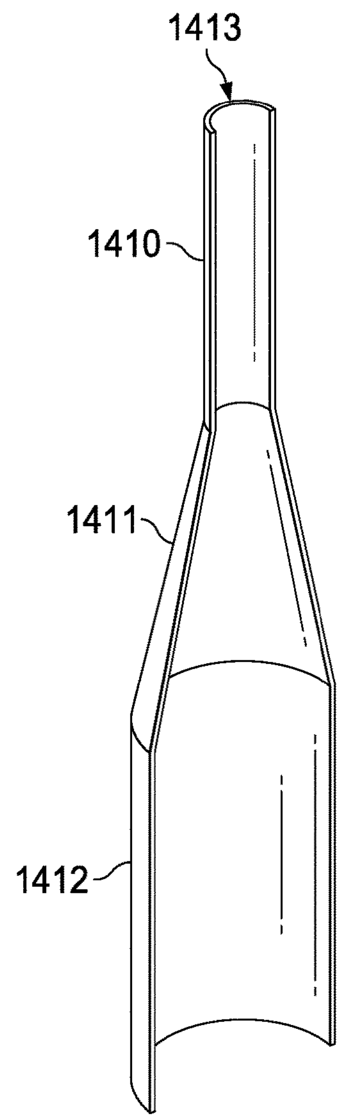
Figure 160:
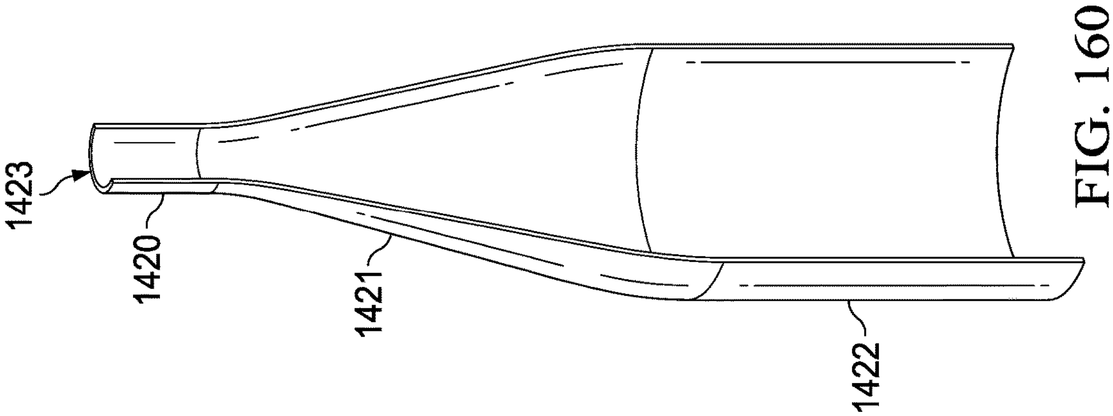
Figure 159:
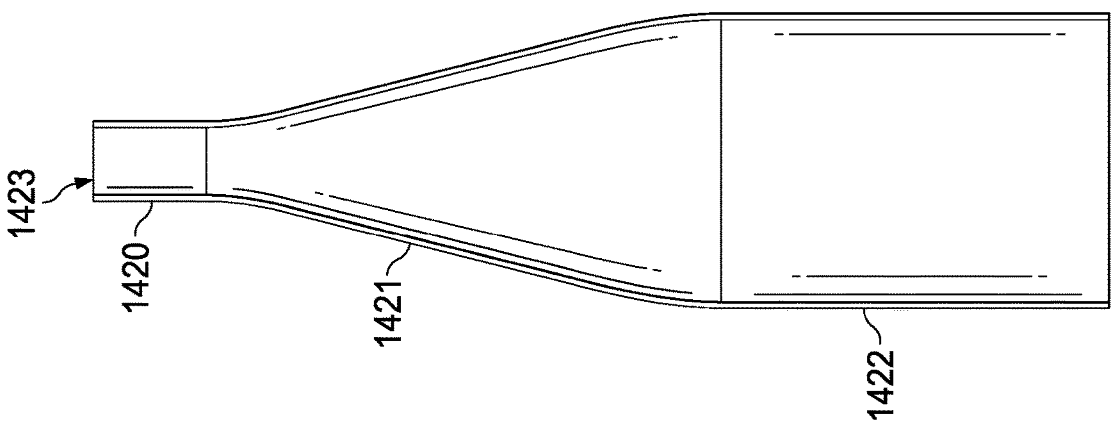
Figure 158:
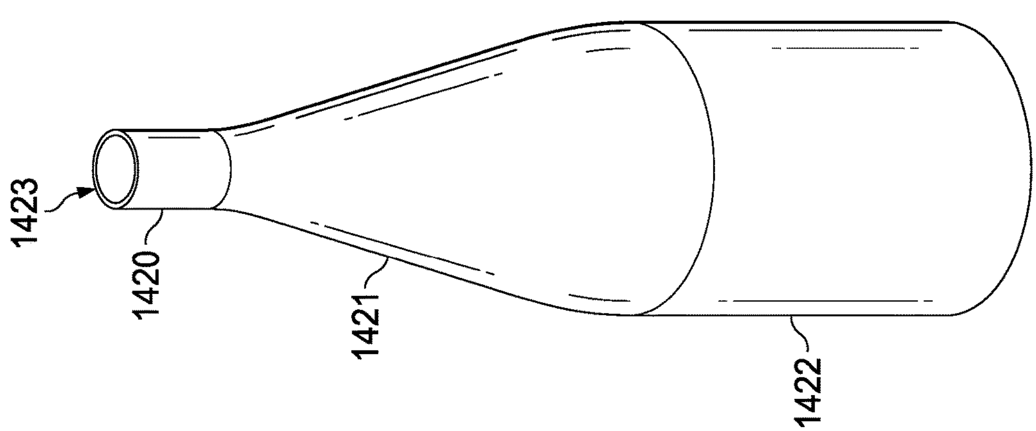
Figure 163:
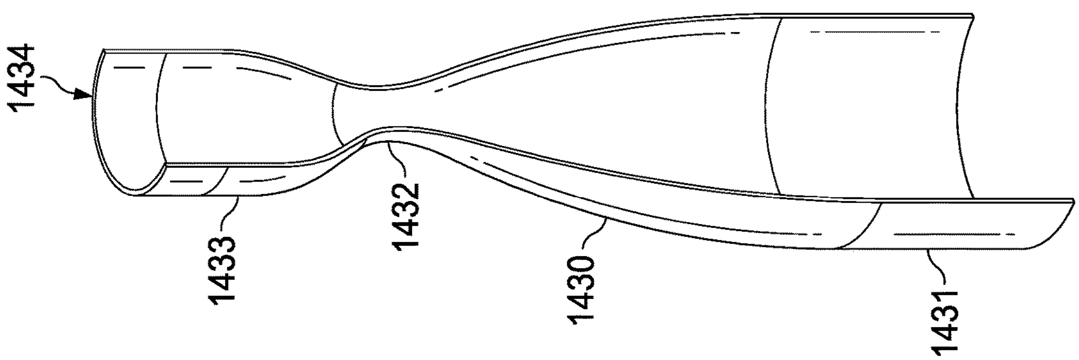
Figure 162:
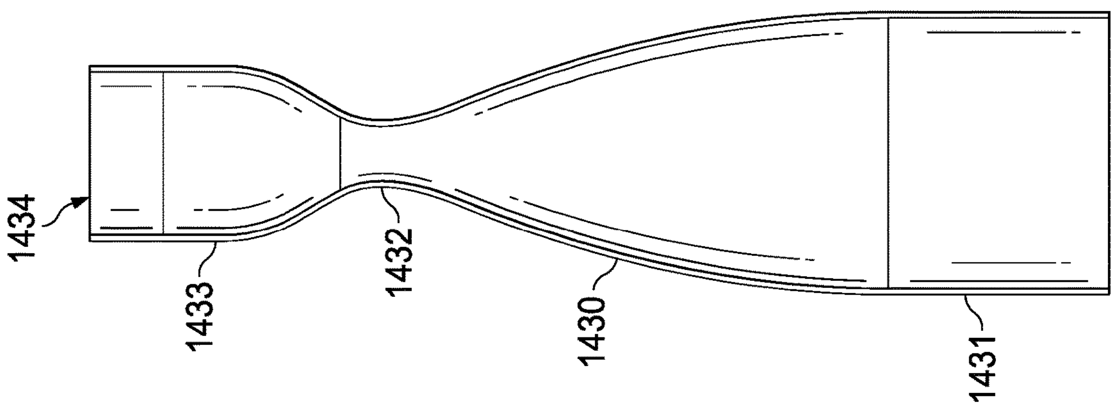
Figure 161:
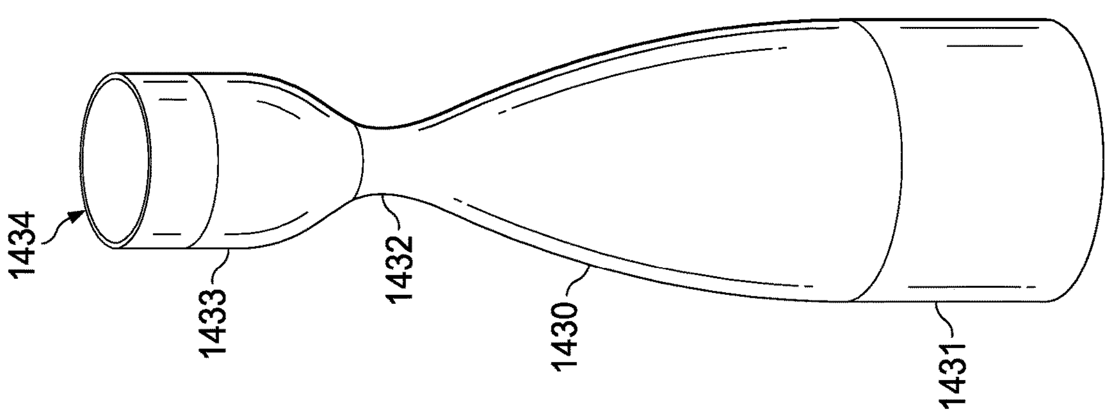
Figure 164:
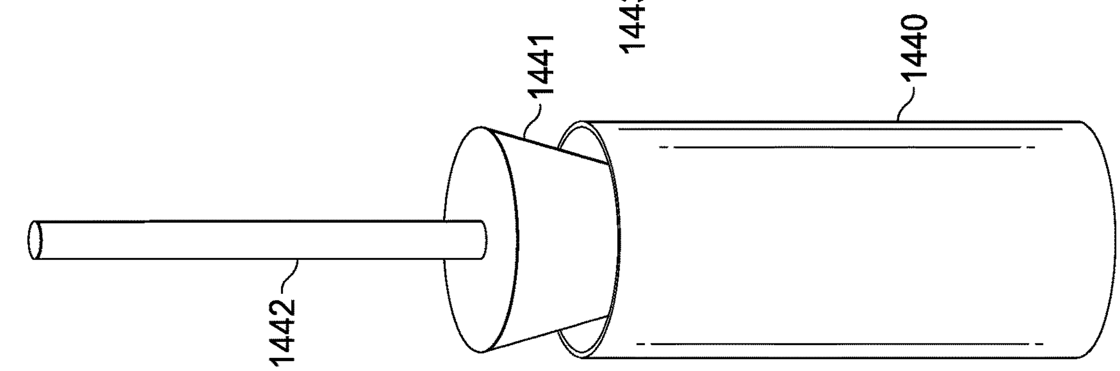
Figure 165:
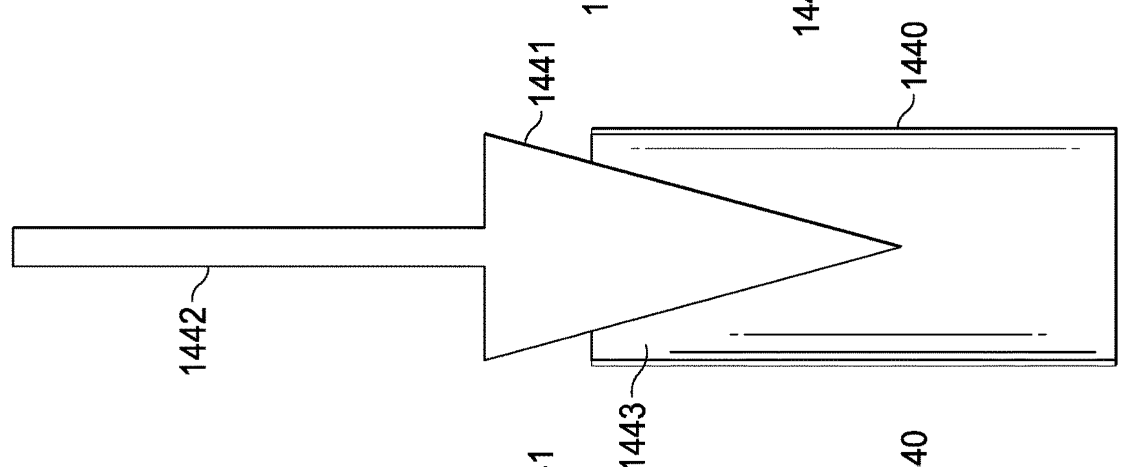
Figure 166:
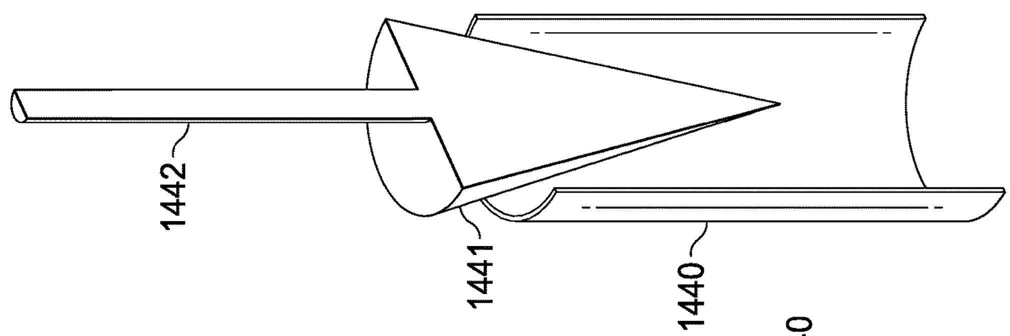
Figure 170:
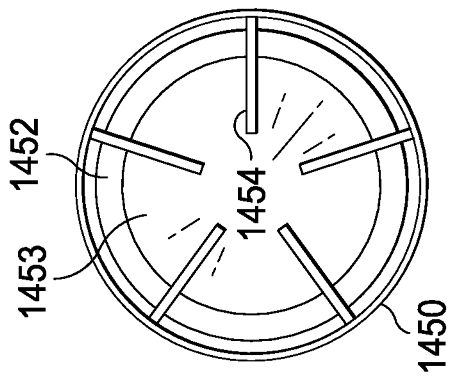
Figure 169:
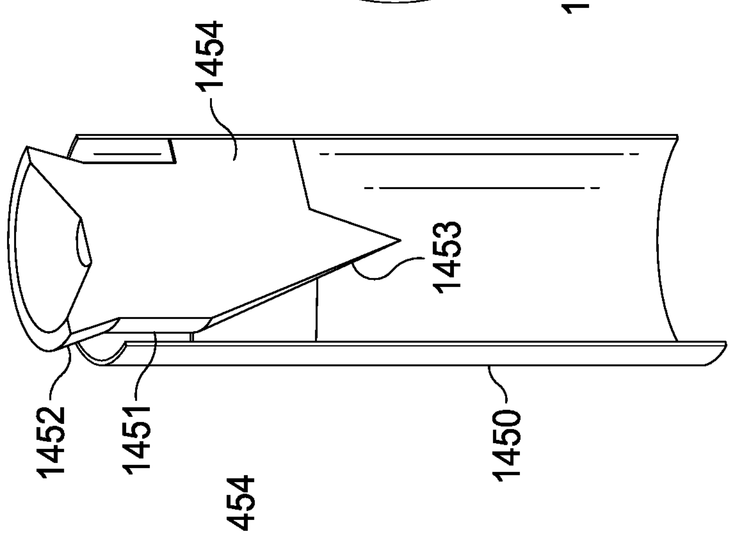
Figure 168:
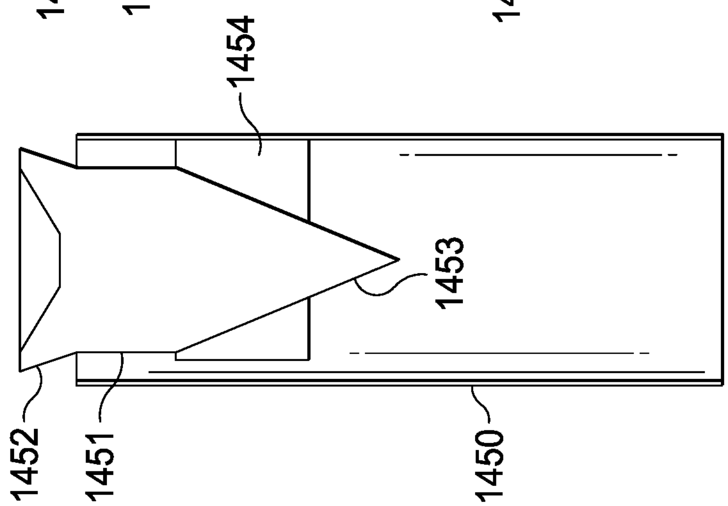
Figure 167:
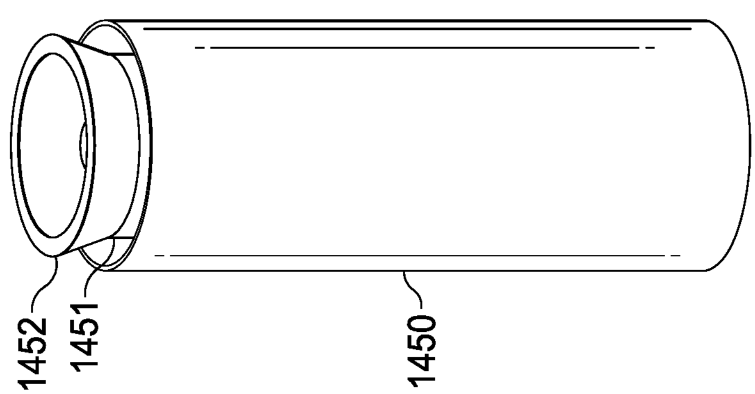
Figure 173:
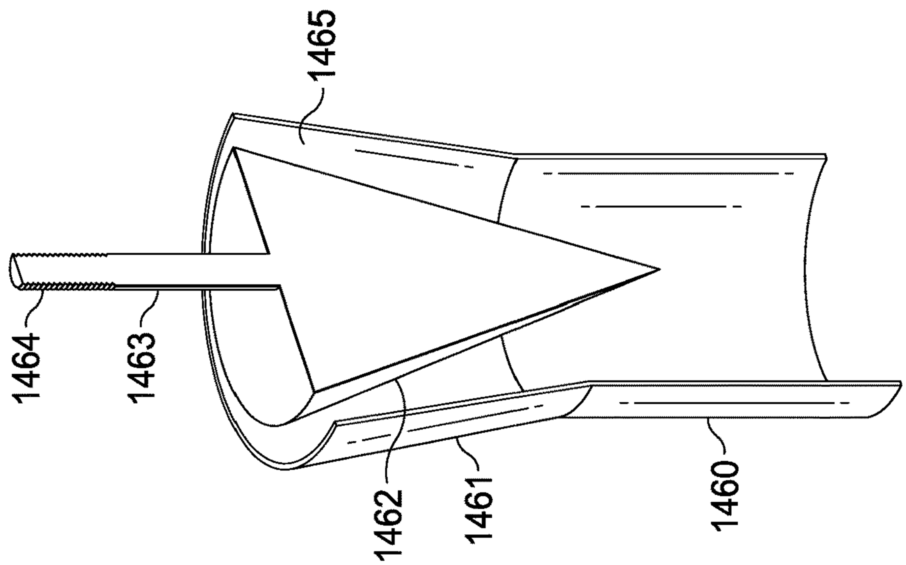
Figure 172:
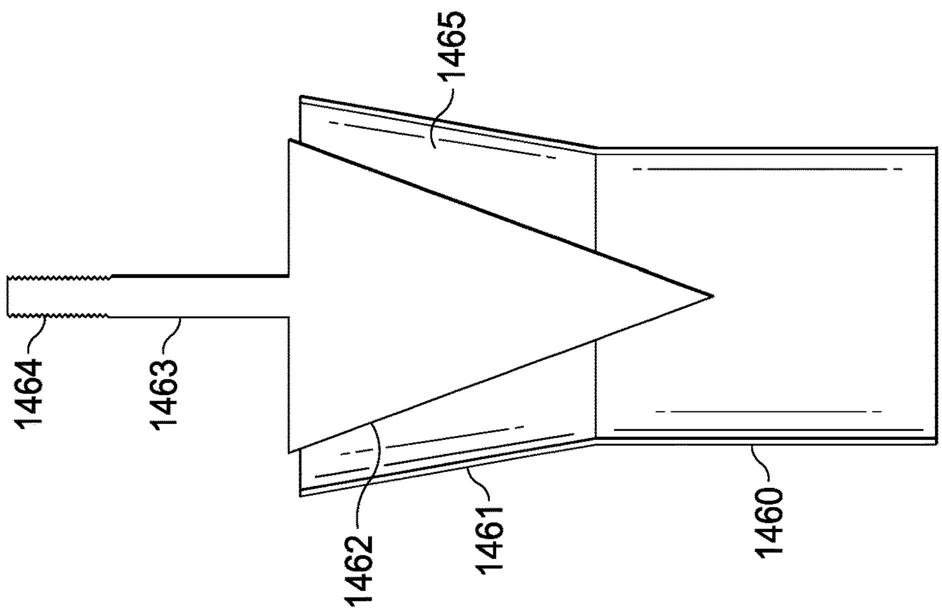
Figure 171:
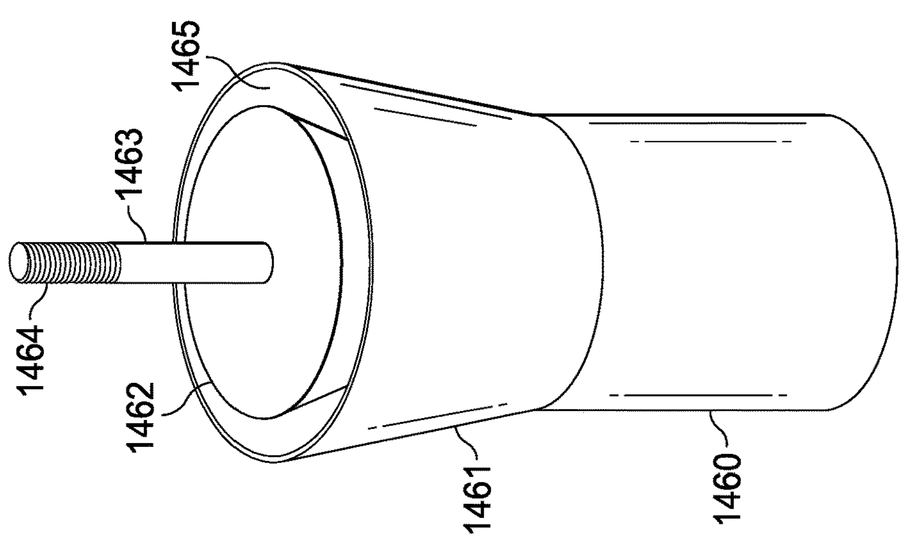
Figure 176:
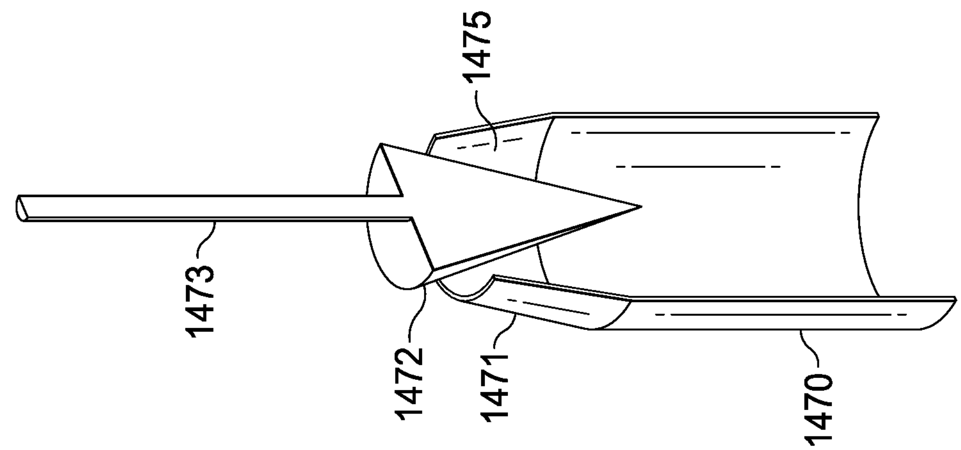
Figure 175:
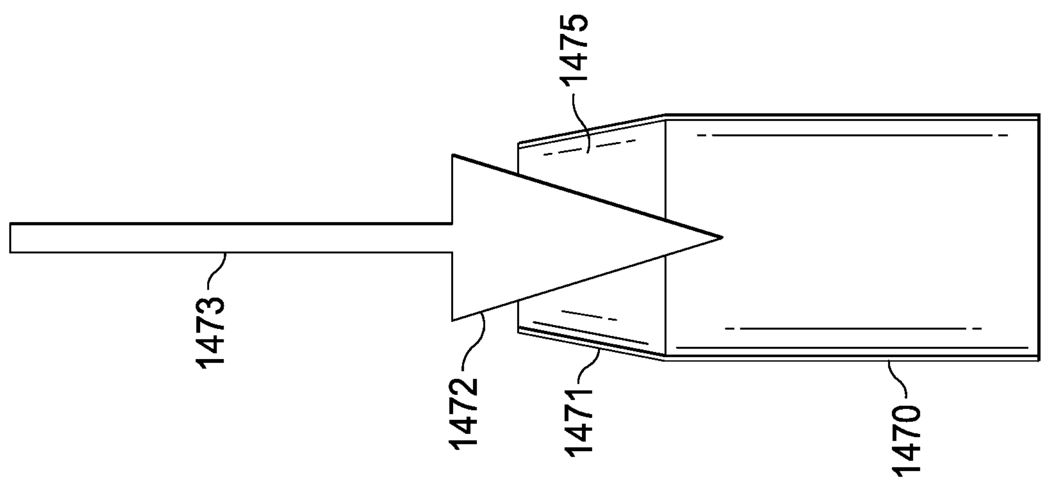
Figure 174:
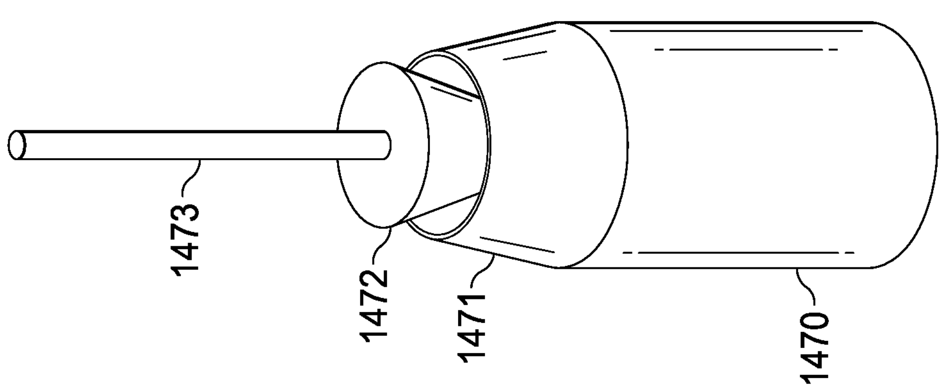
Figure 180:
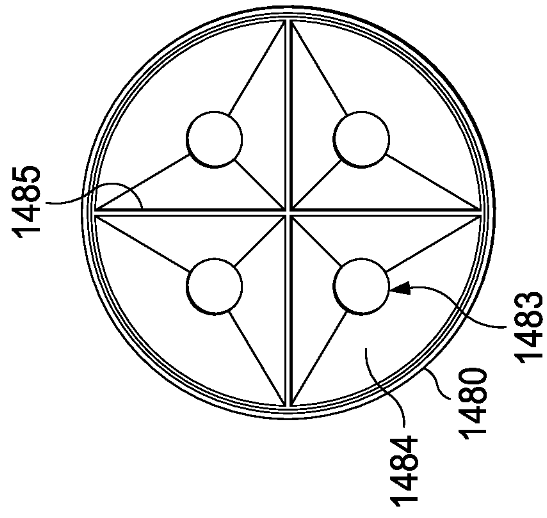
Figure 179:
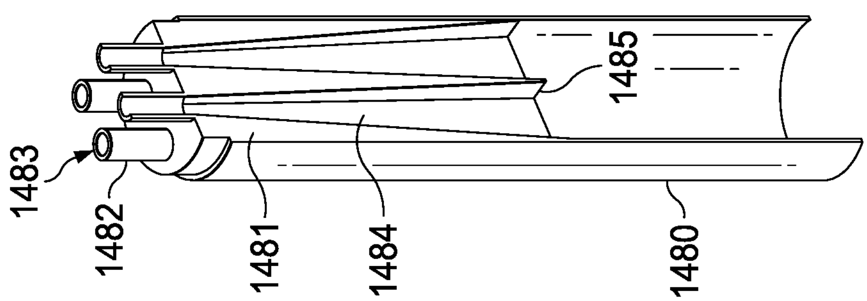
Figure 178:
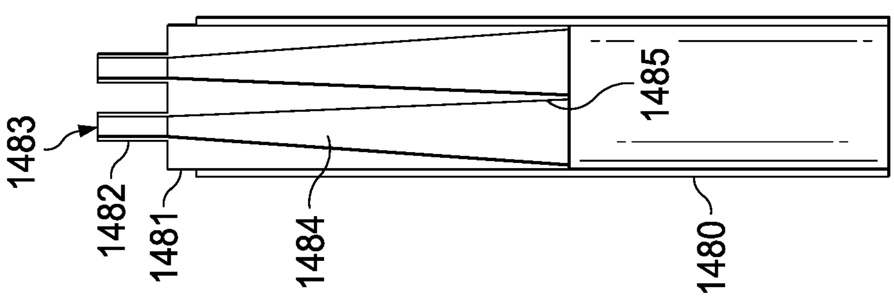
Figure 177:
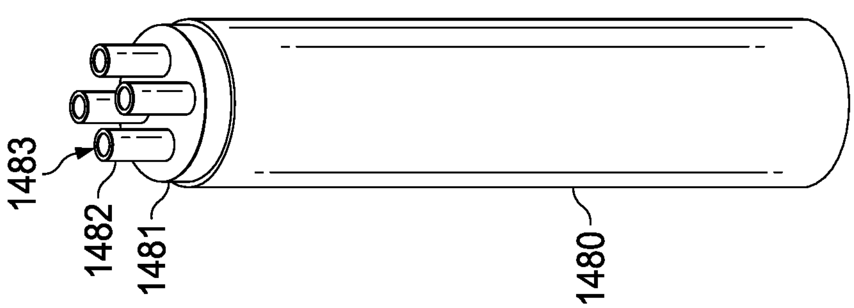
Figure 183:
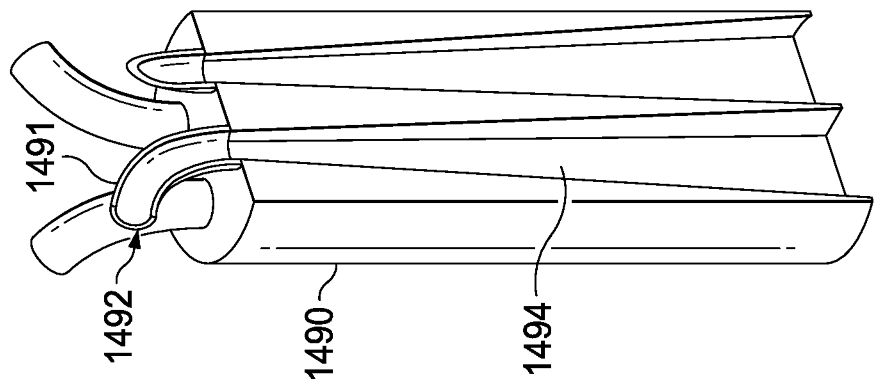
Figure 182:
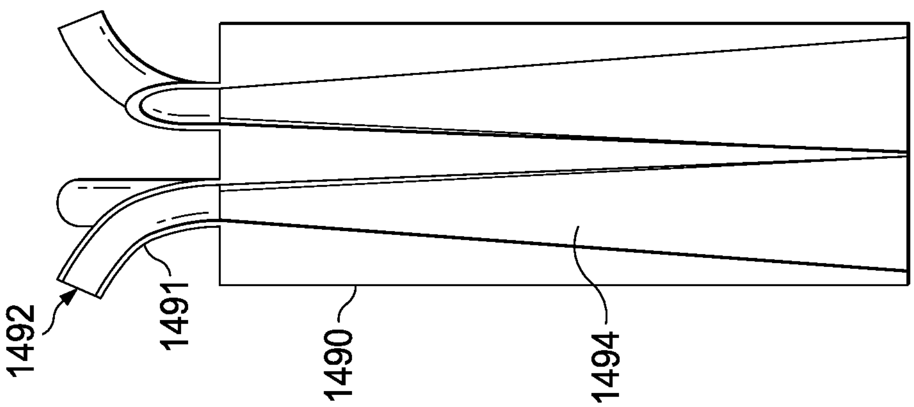
Figure 181:
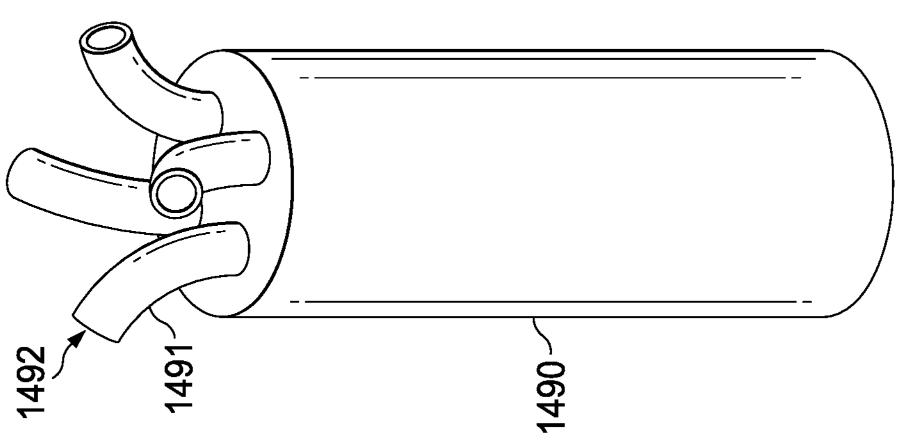
Figure 186:
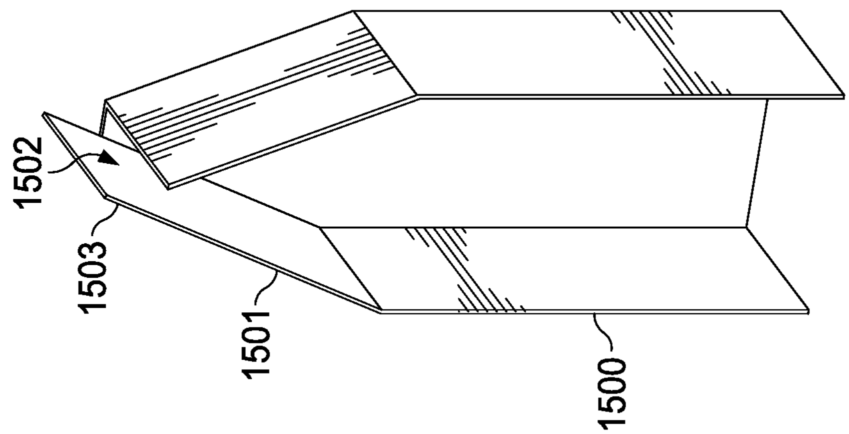
Figure 185:
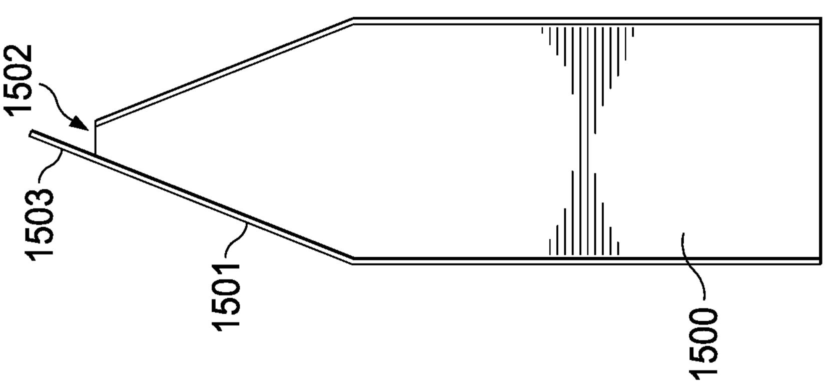
Figure 184:
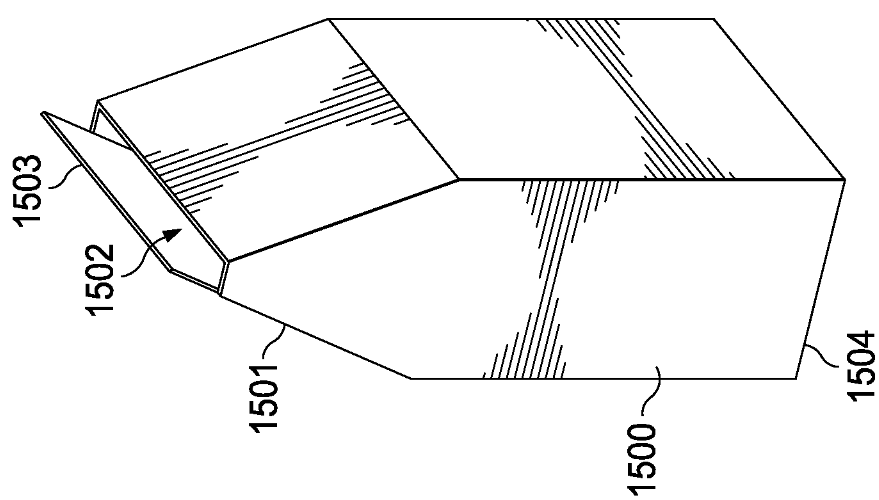
Figure 189:
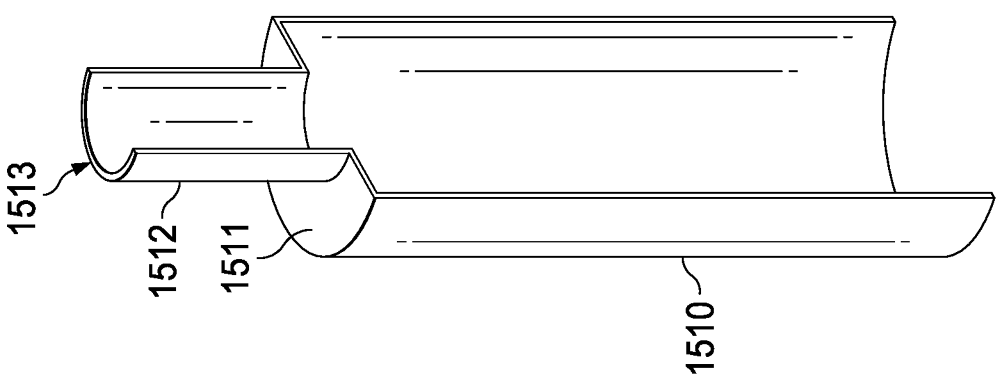
Figure 188:
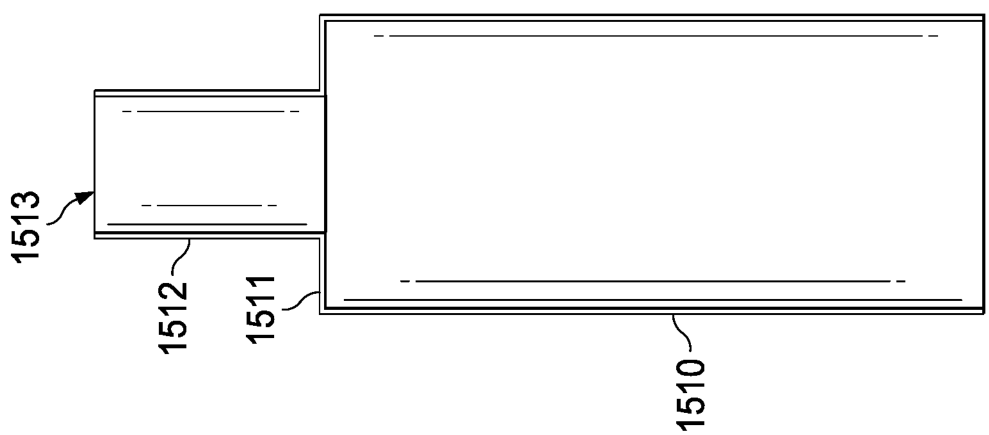
Figure 187:
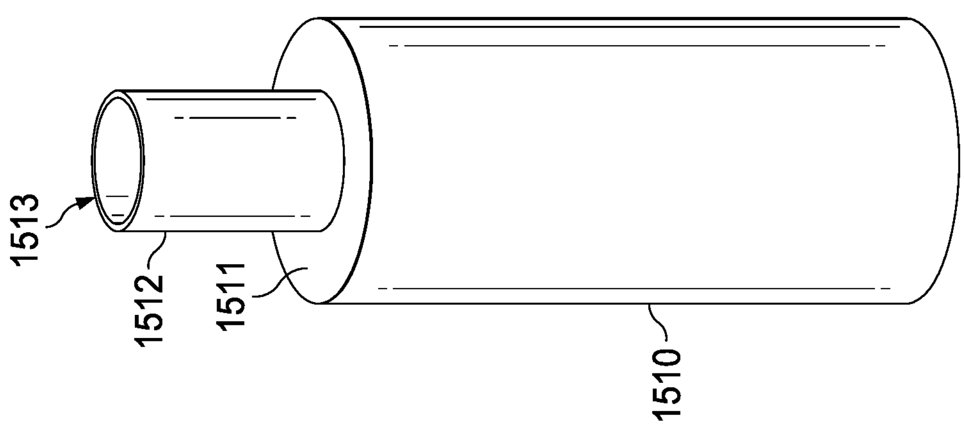
Figure 192:
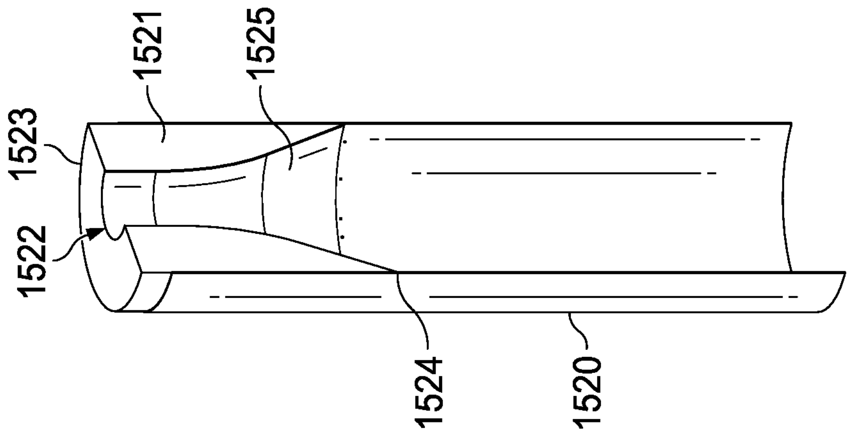
Figure 191:
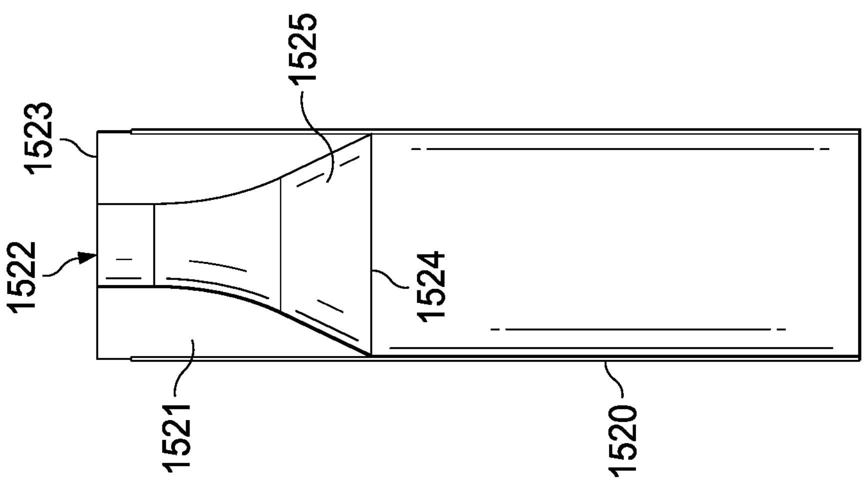
Figure 190:
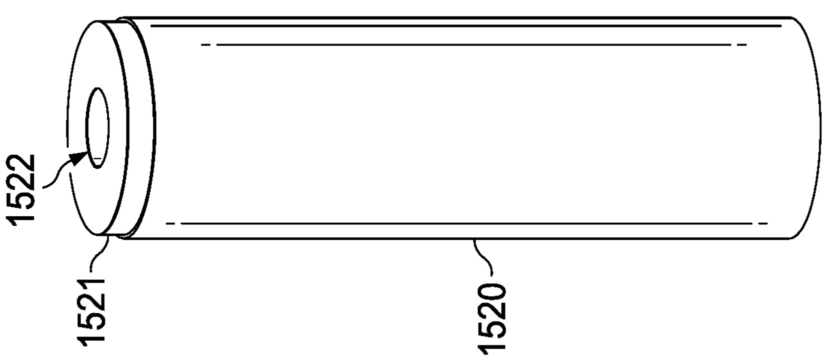
Figure 195:
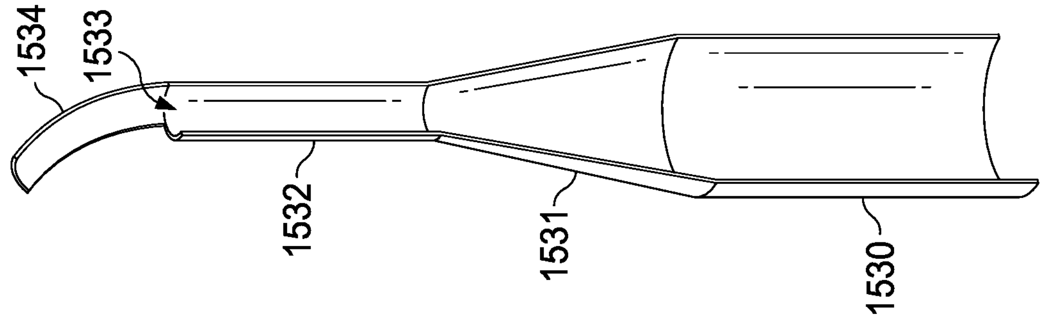
Figure 194:
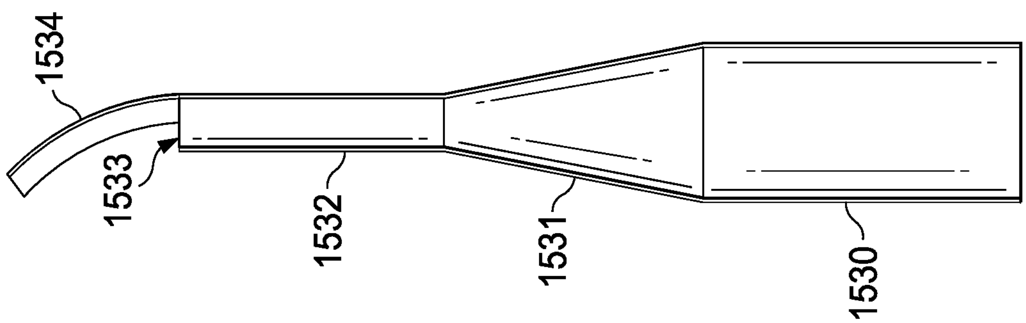
Figure 193:
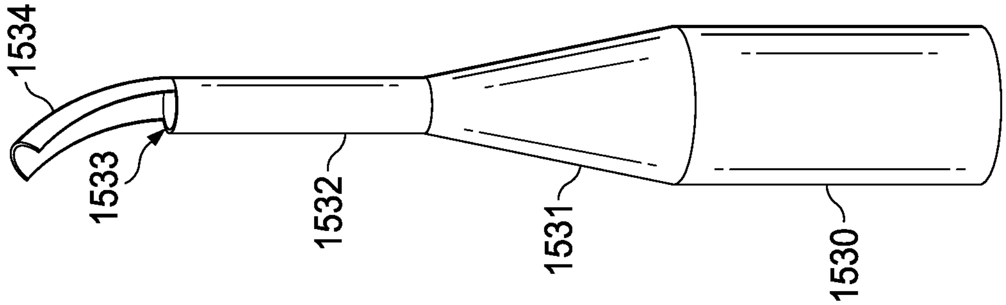
Figure 198:
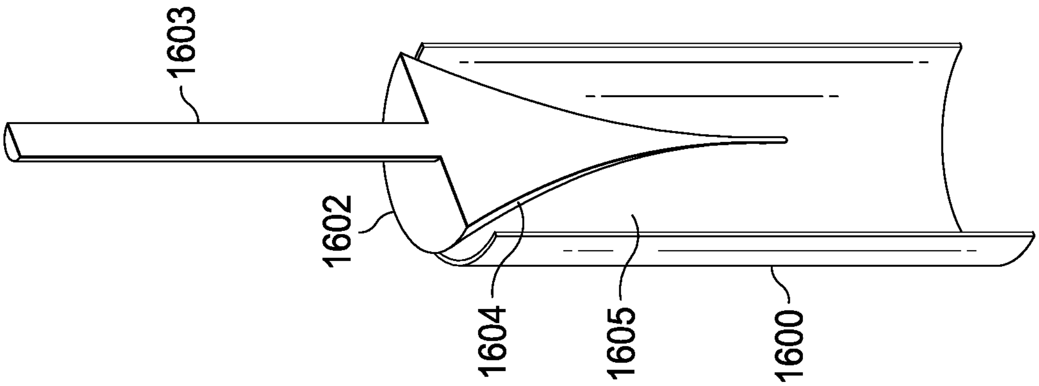
Figure 197:
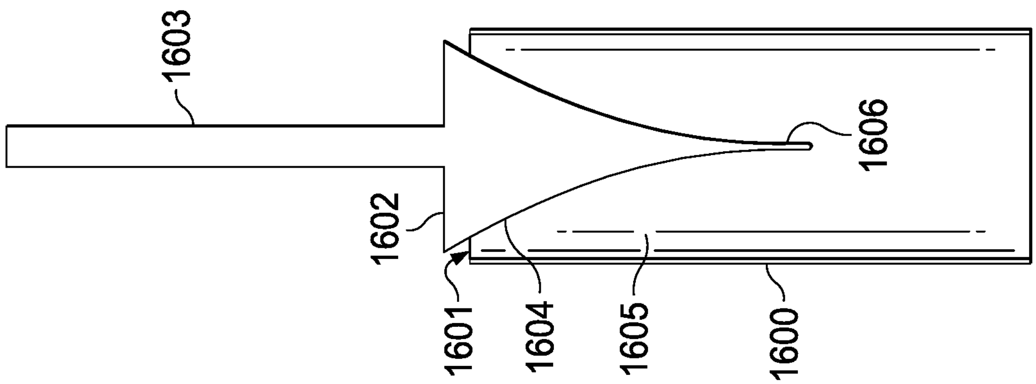
Figure 196:
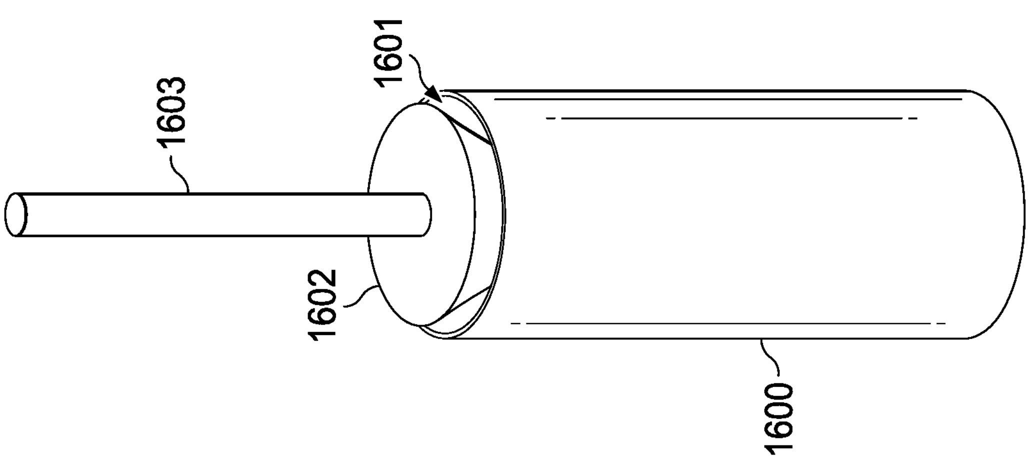
Figure 203:
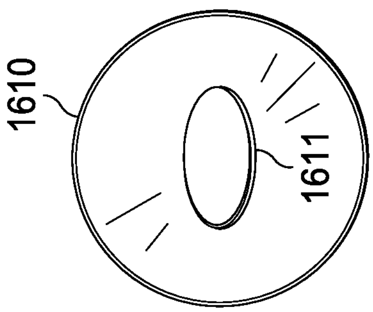
Figure 205:
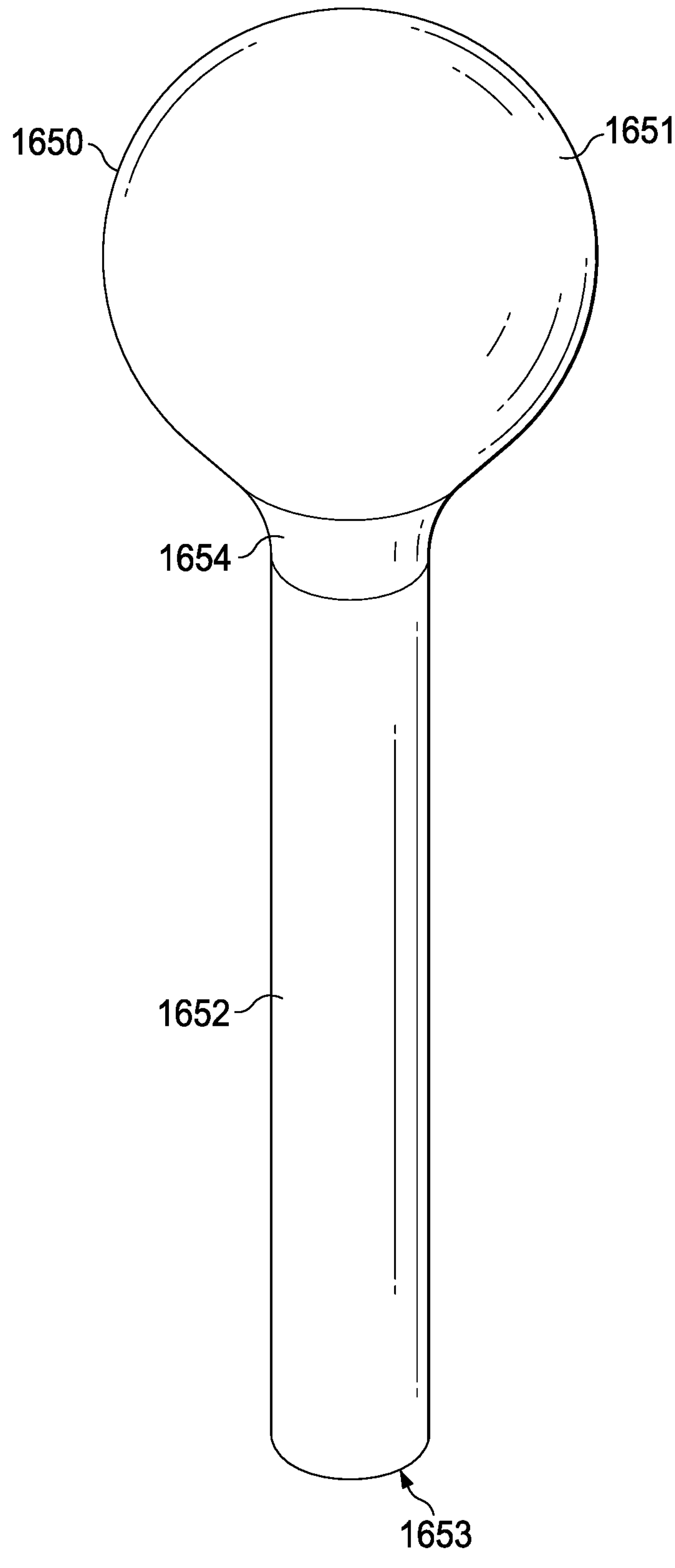
Figure 206:
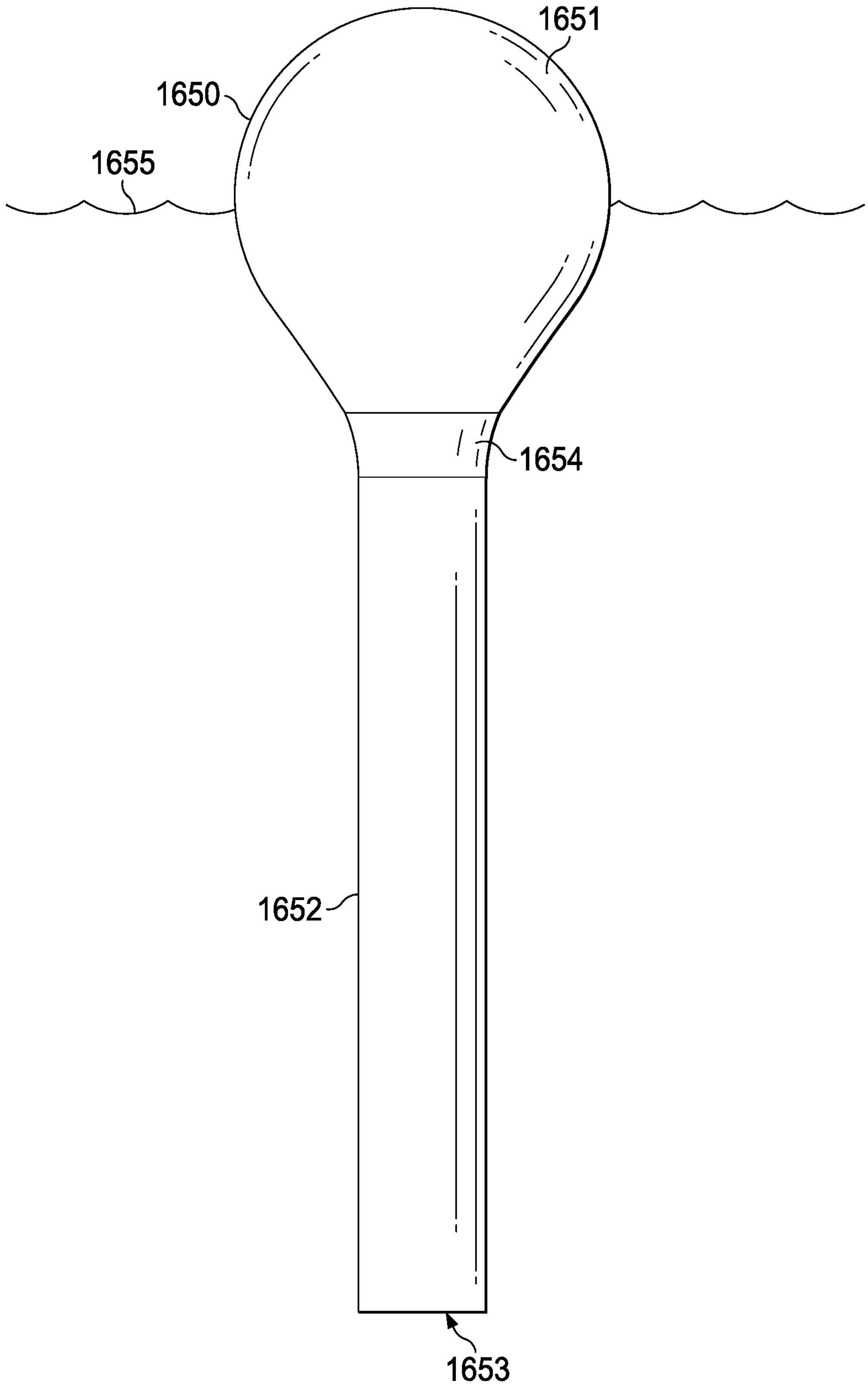
Figure 207:
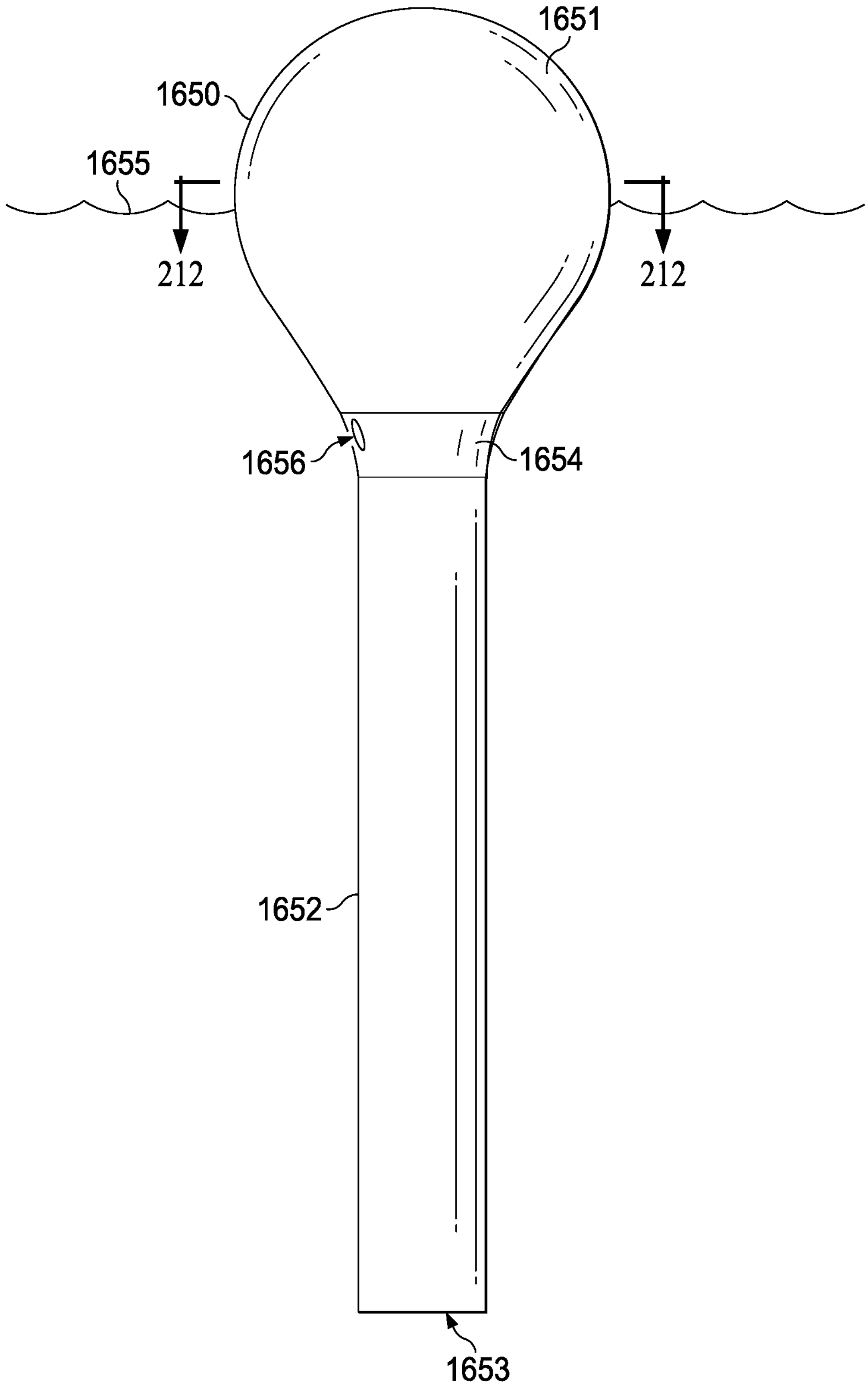
Figure 208:
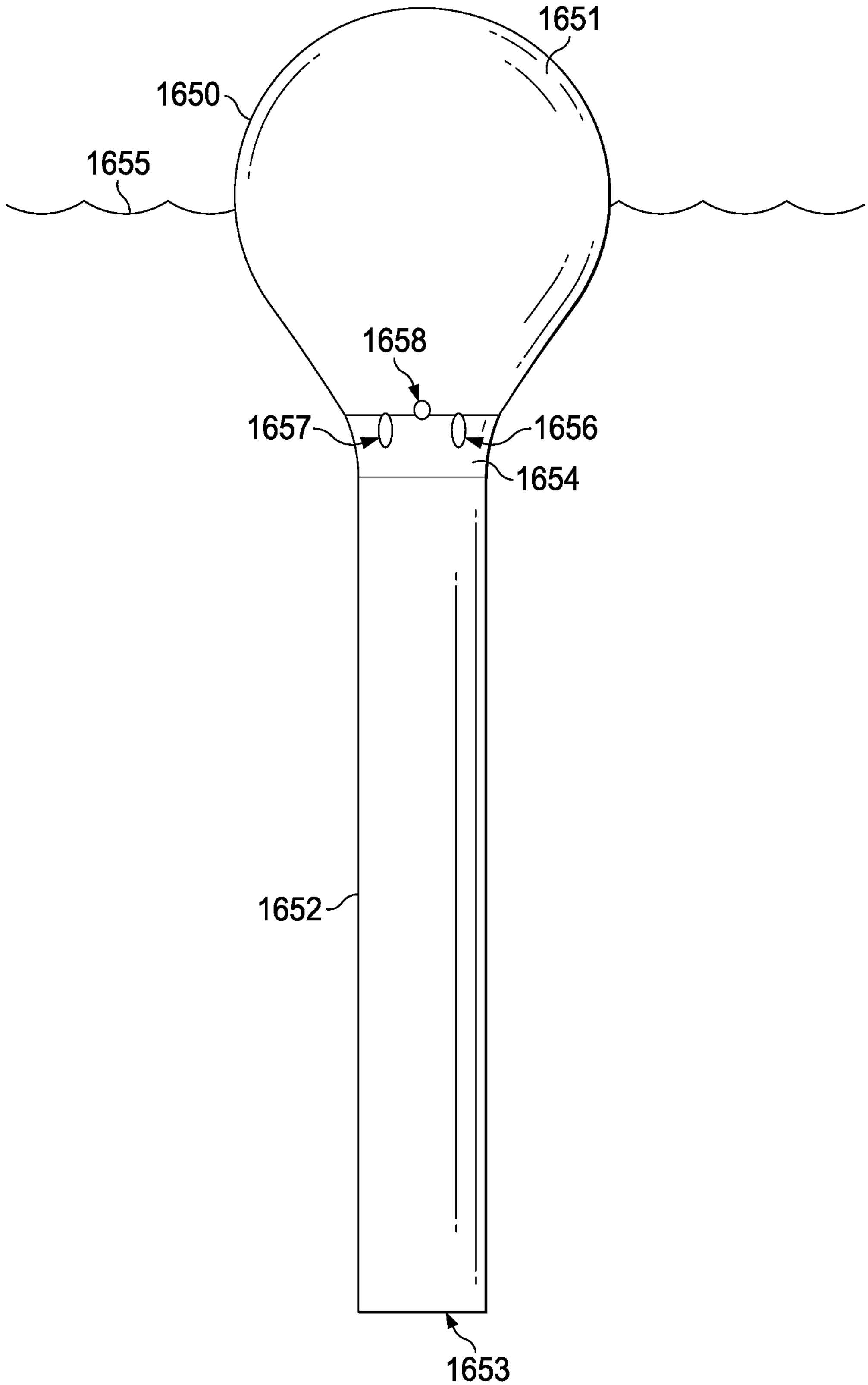
Figure 209:
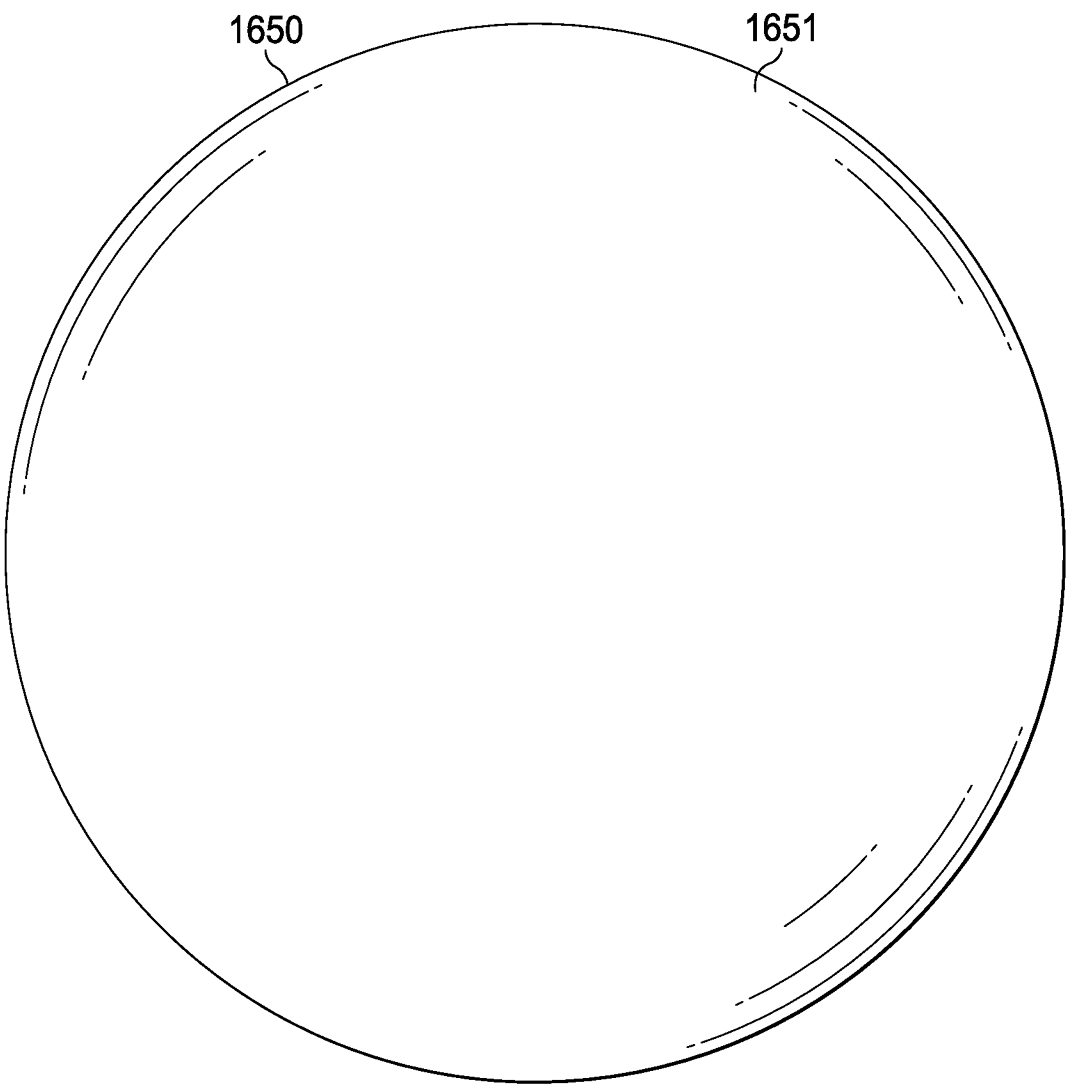
Figure 210:
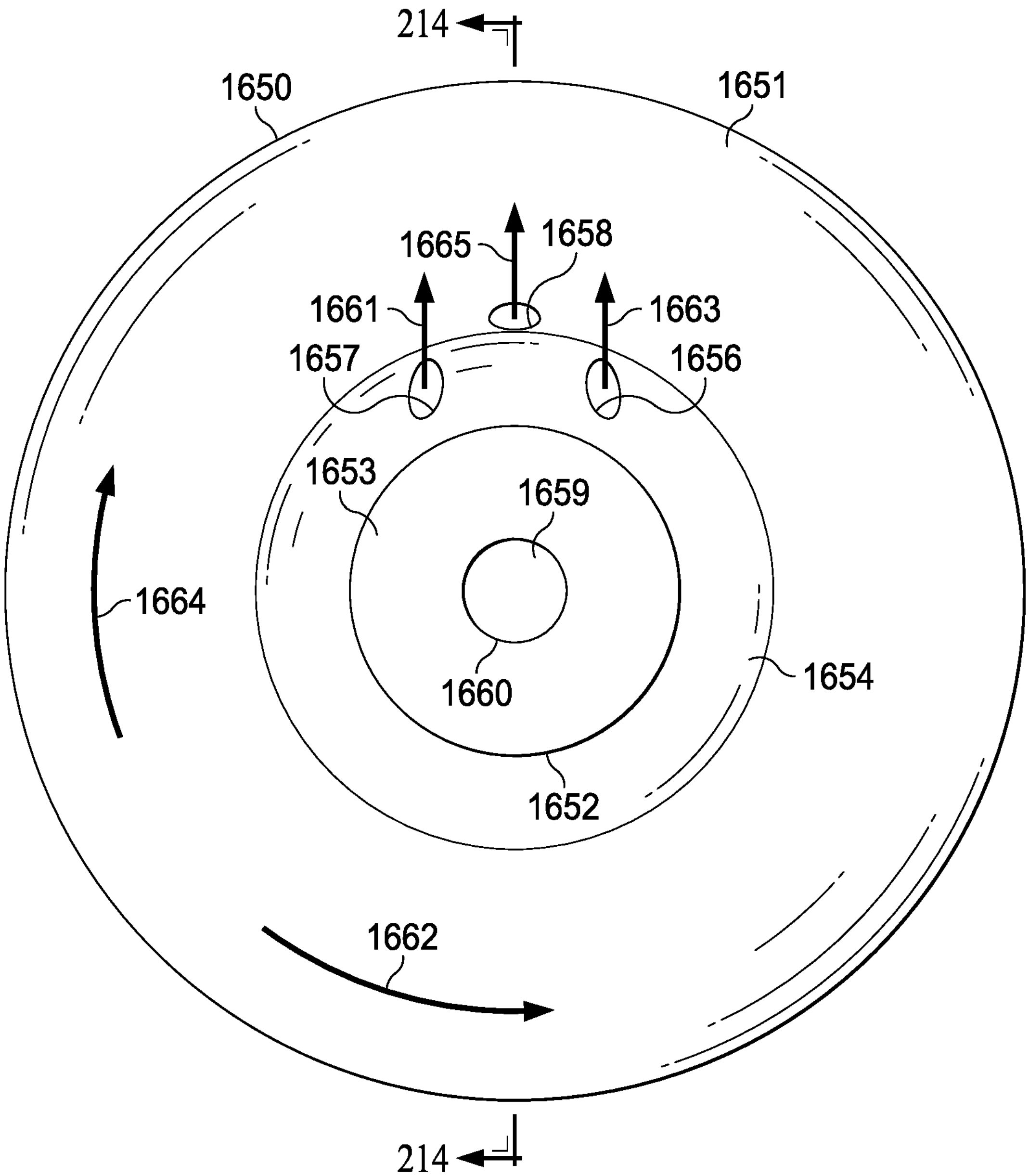
Figure 211:
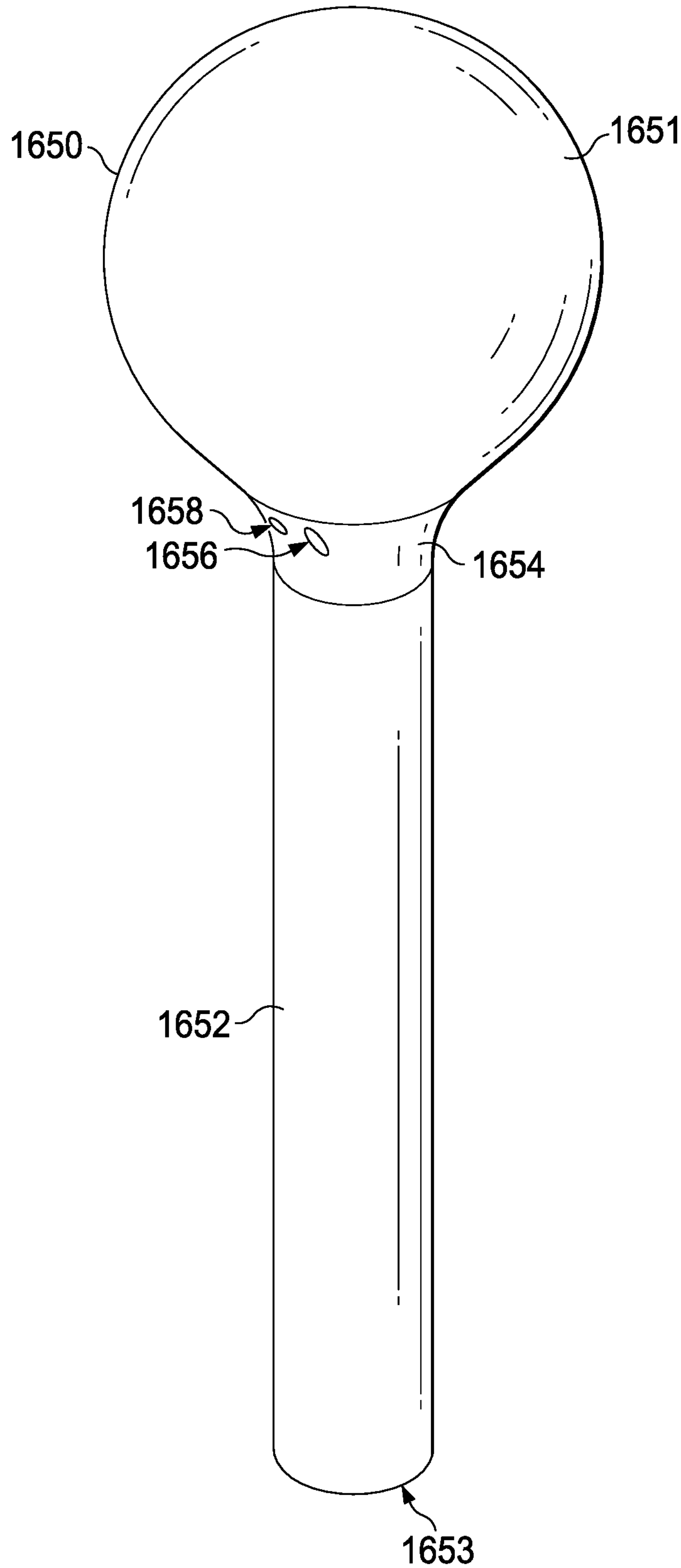
Figure 212:
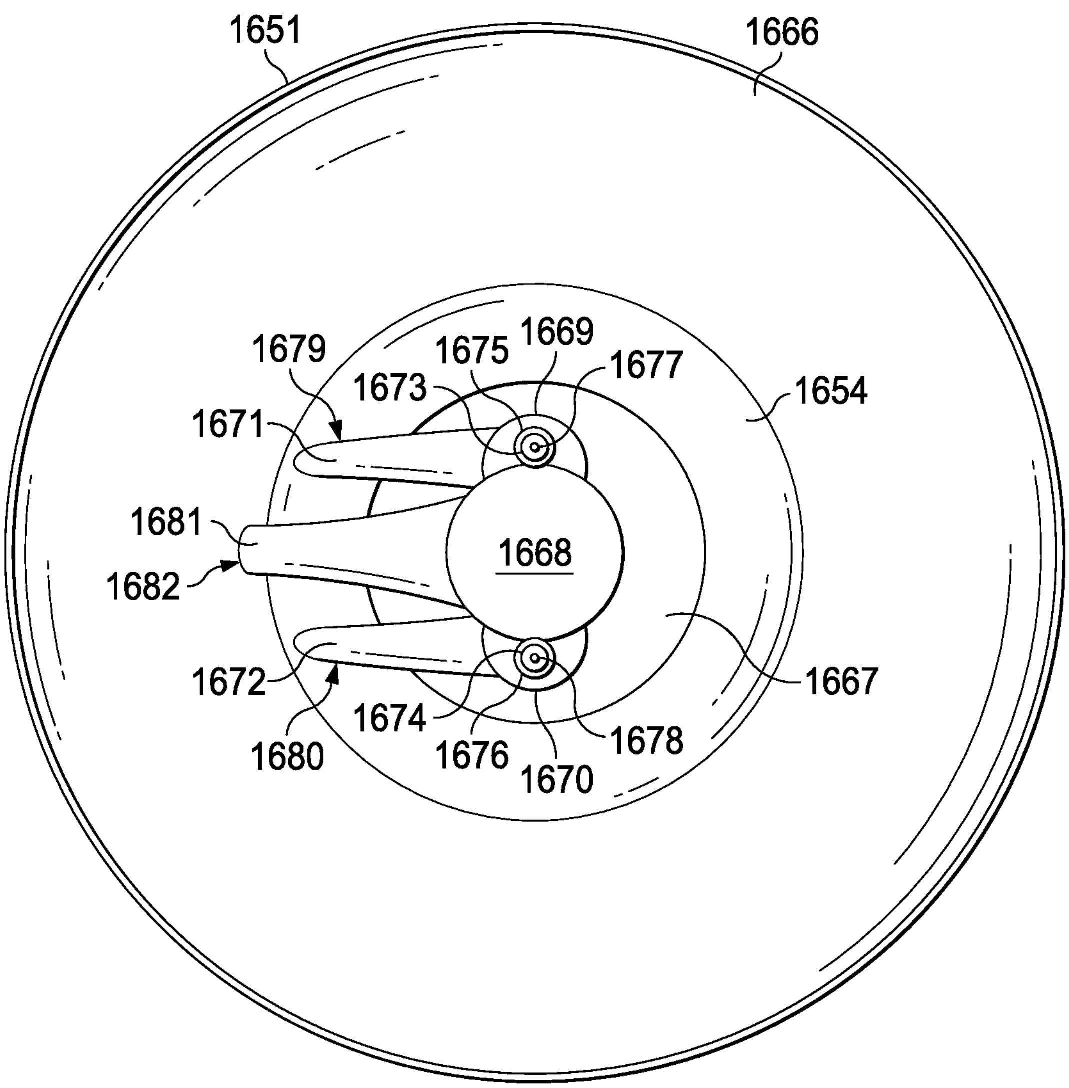
Figure 213:
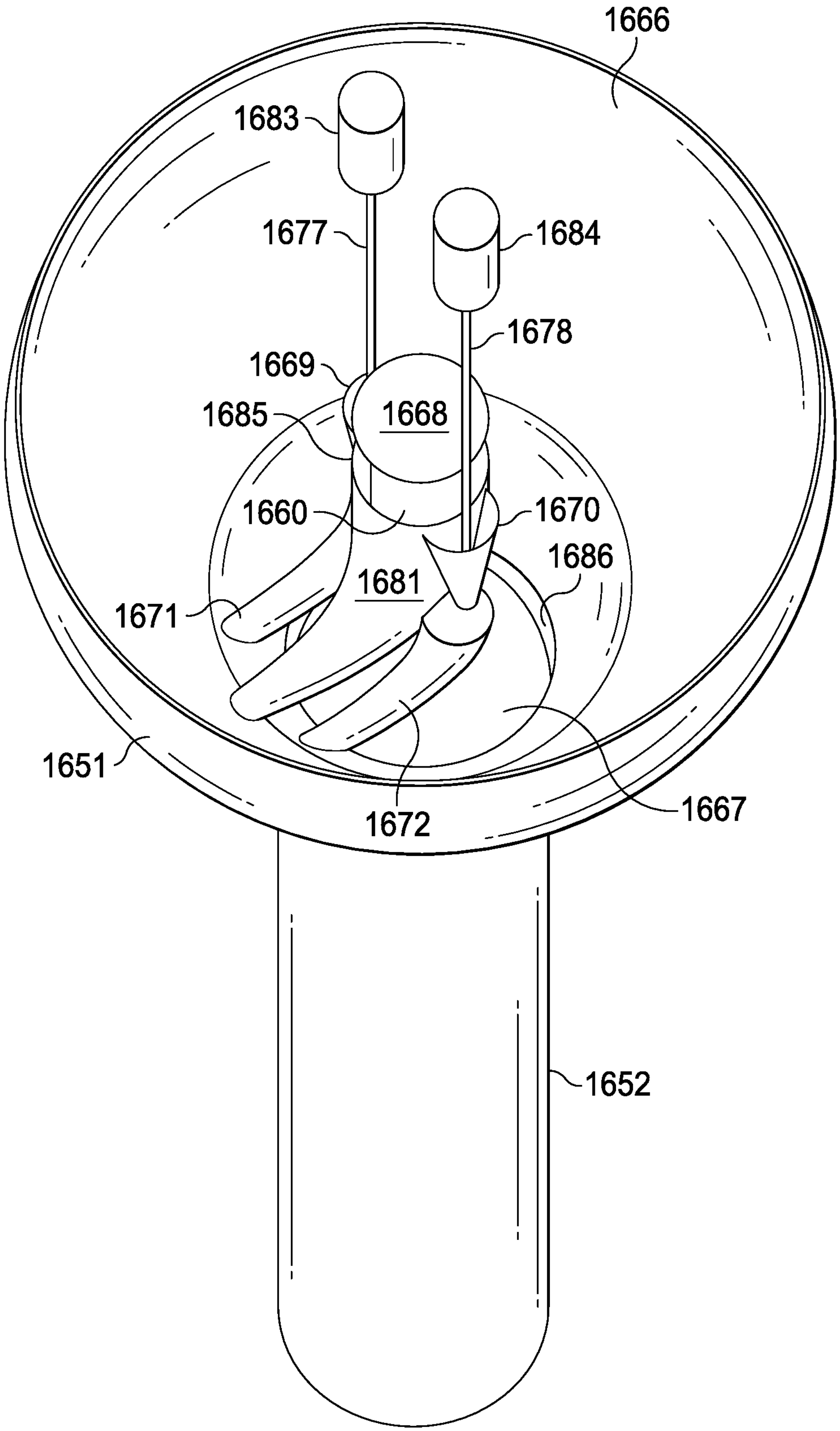
Figure 214:
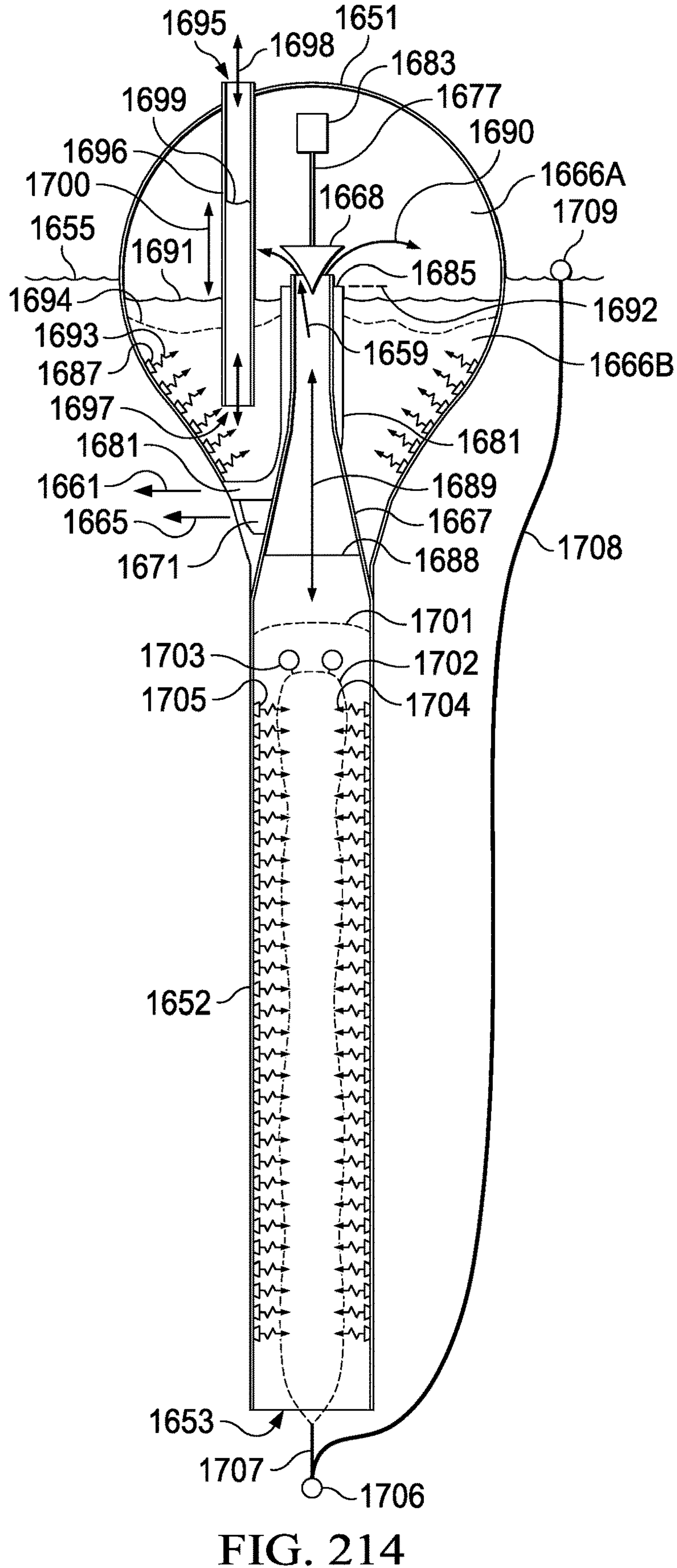
Figure 215:
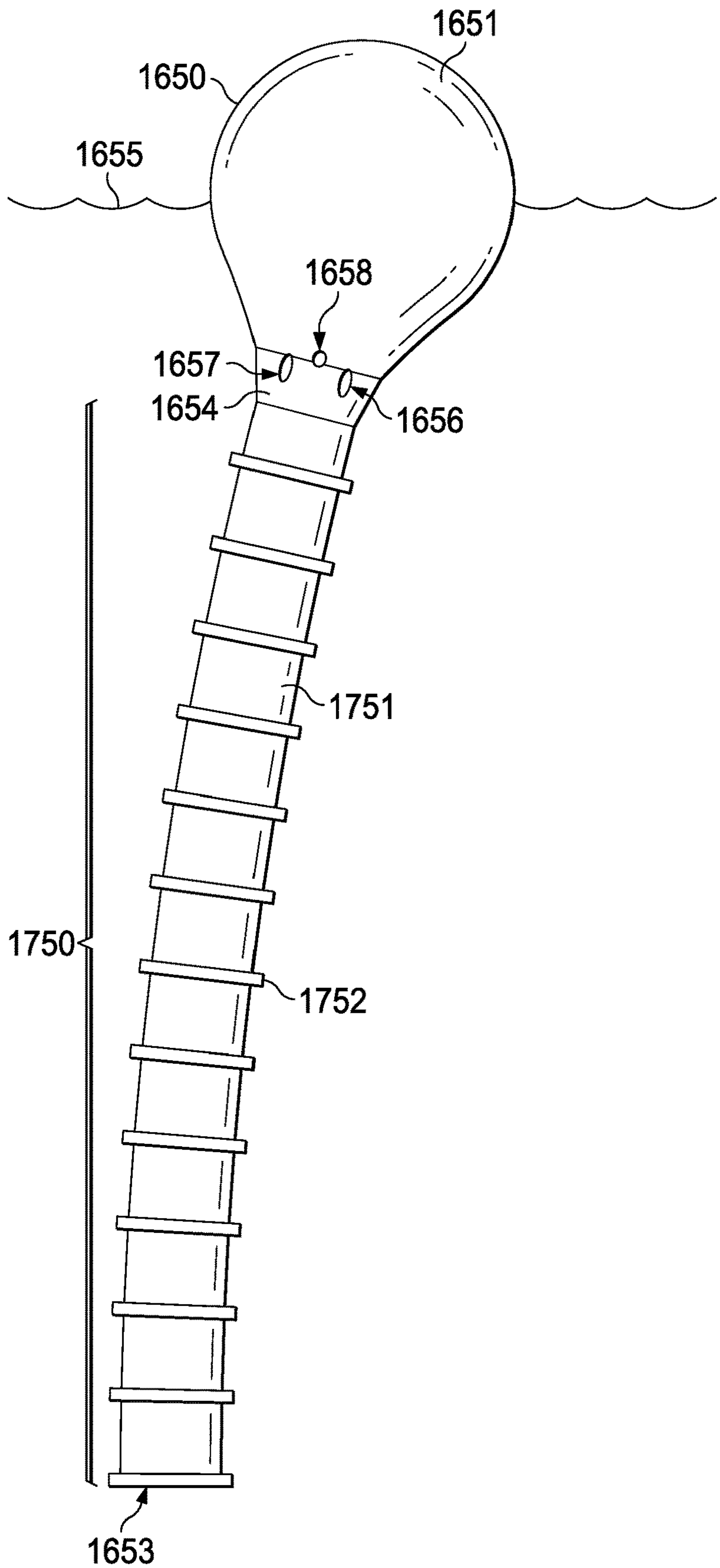
Figure 216:
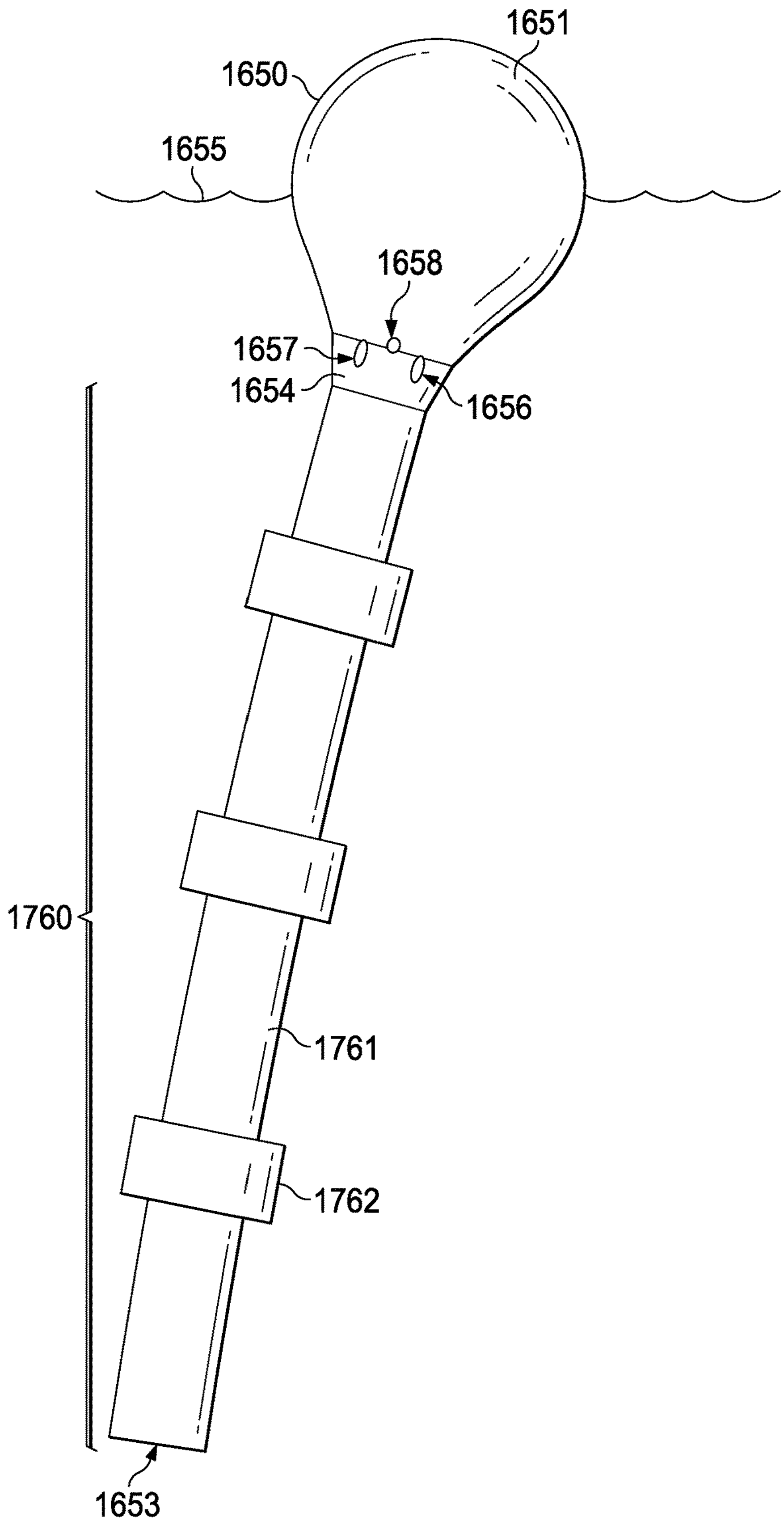
Figure 217:
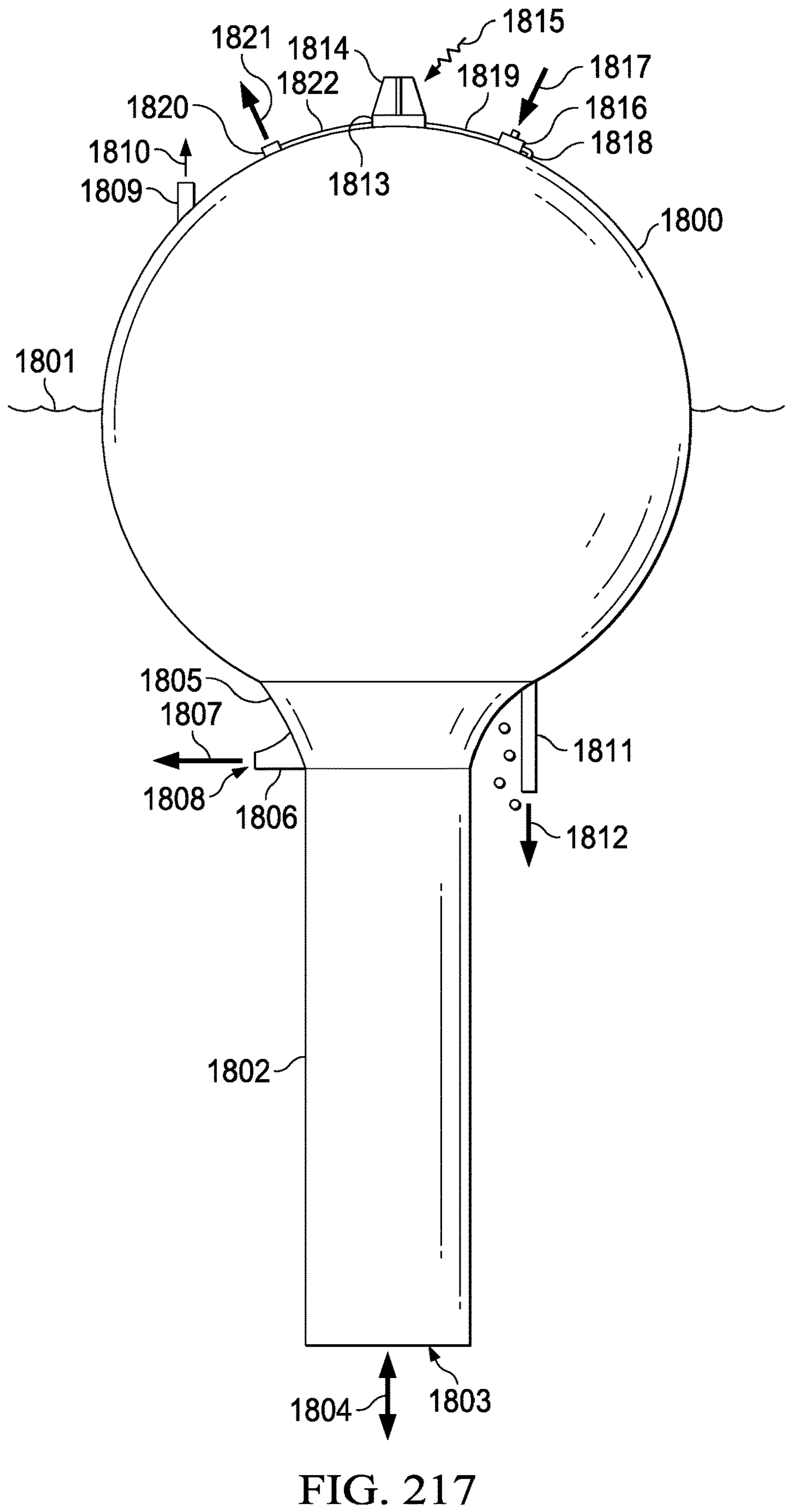
Figure 218:
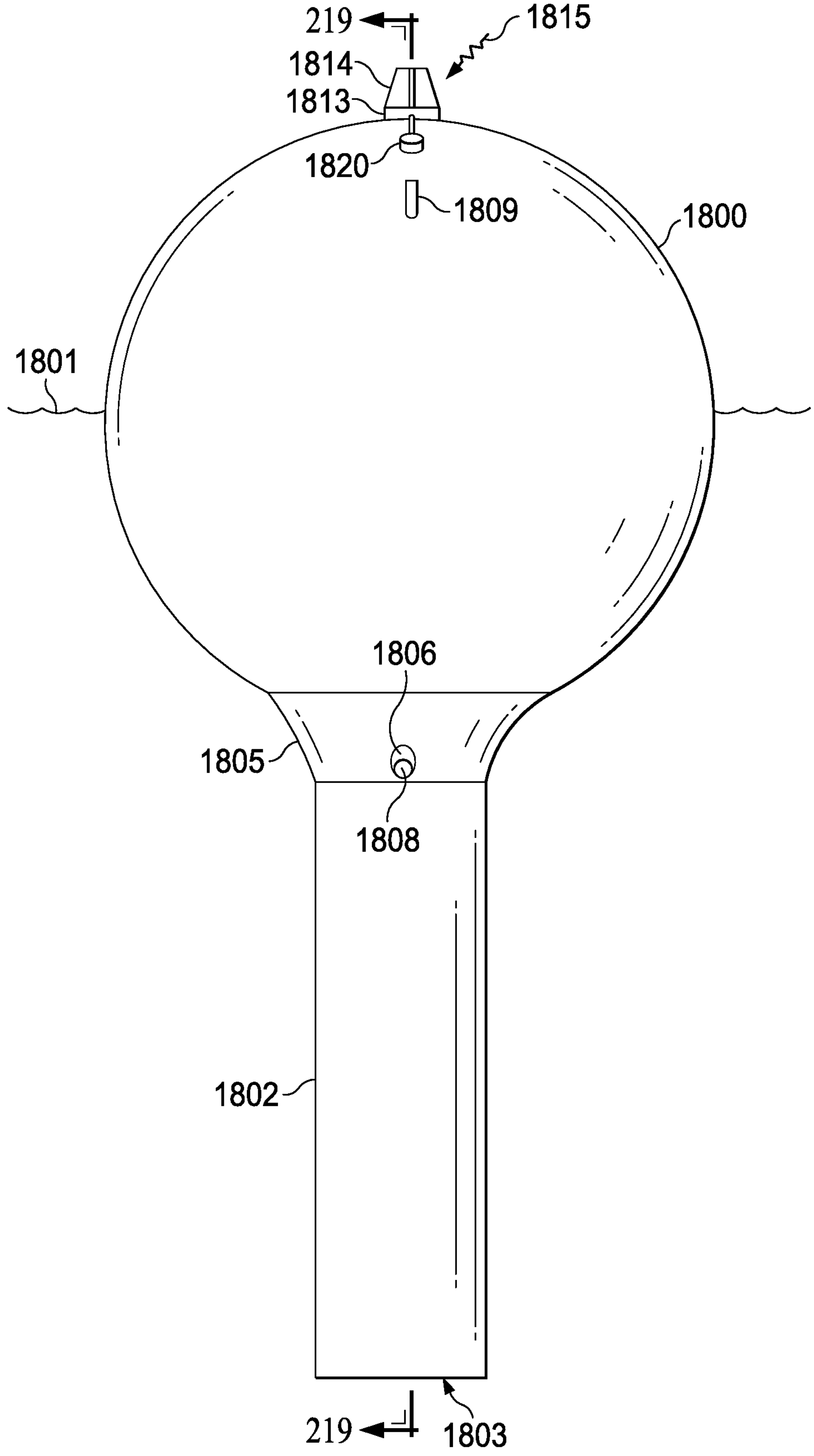
Figure 219:
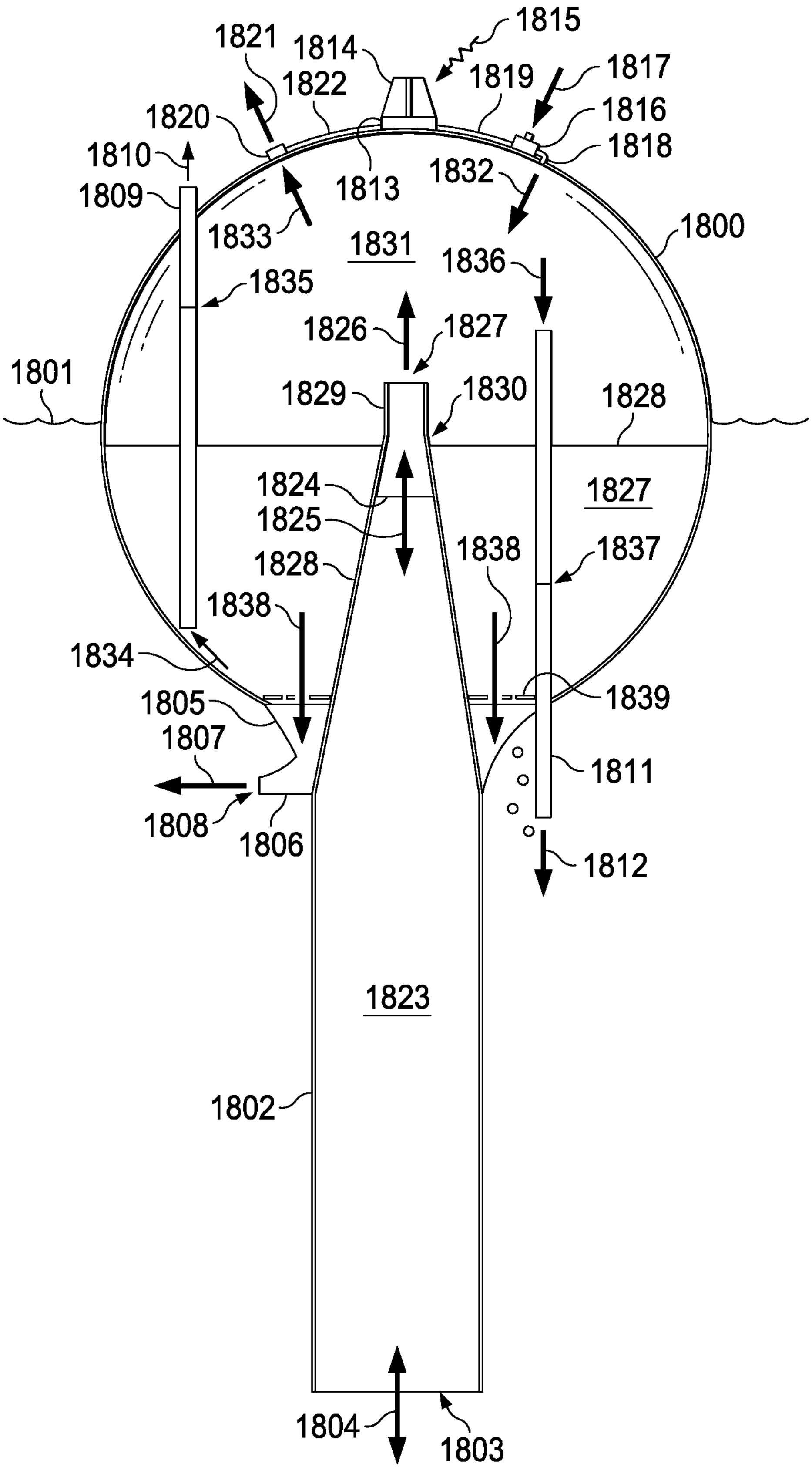
Figure 220:
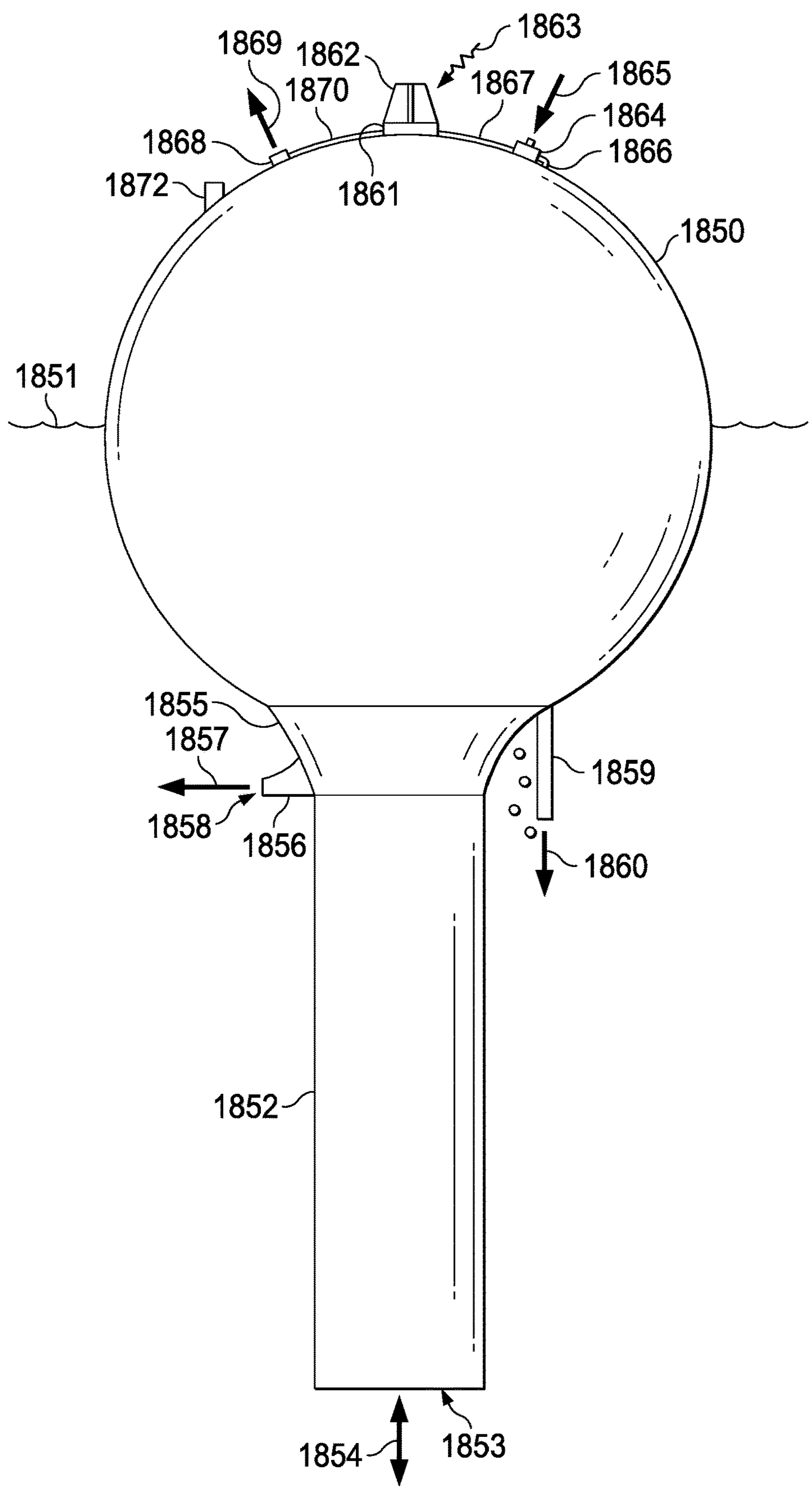
Figure 221:
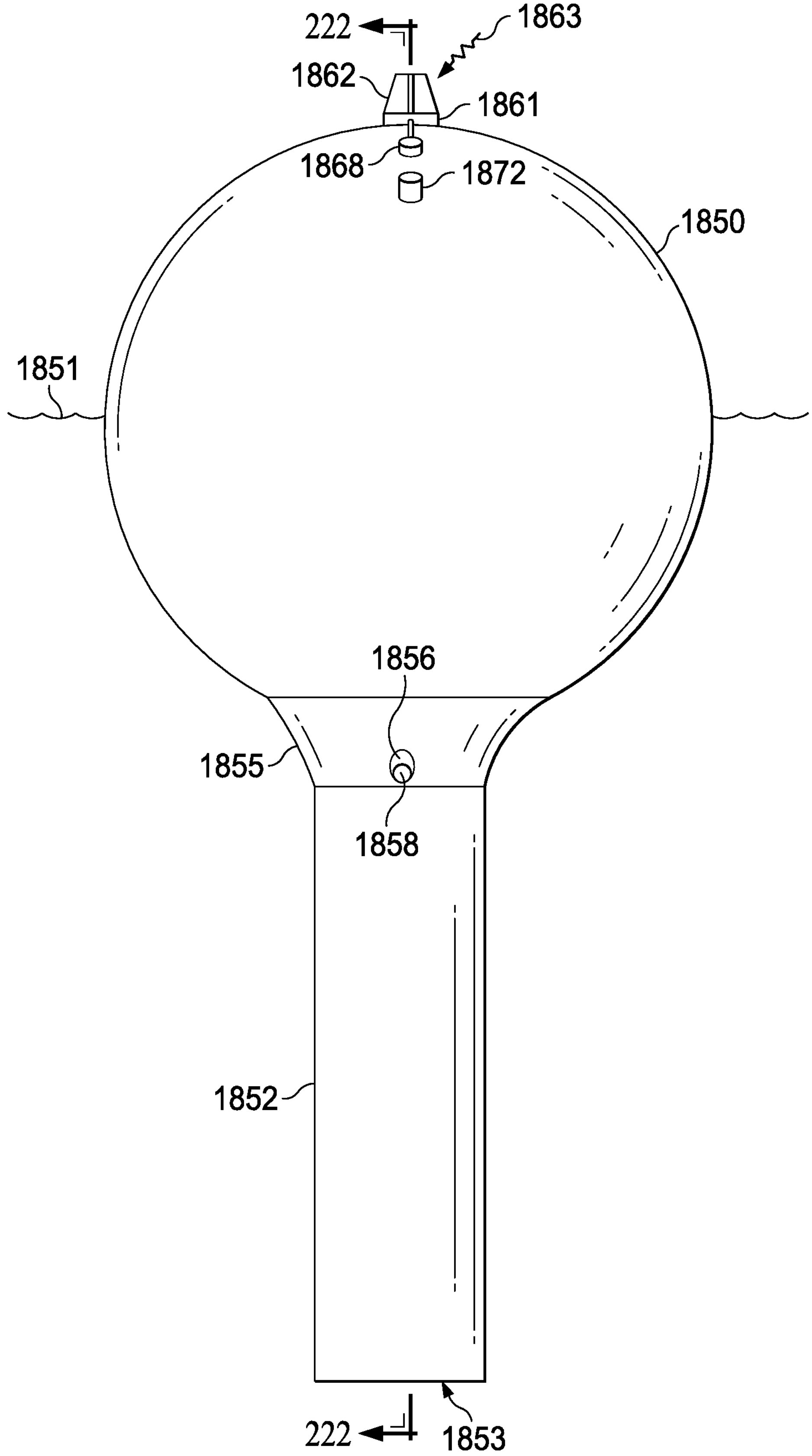
Figure 222:
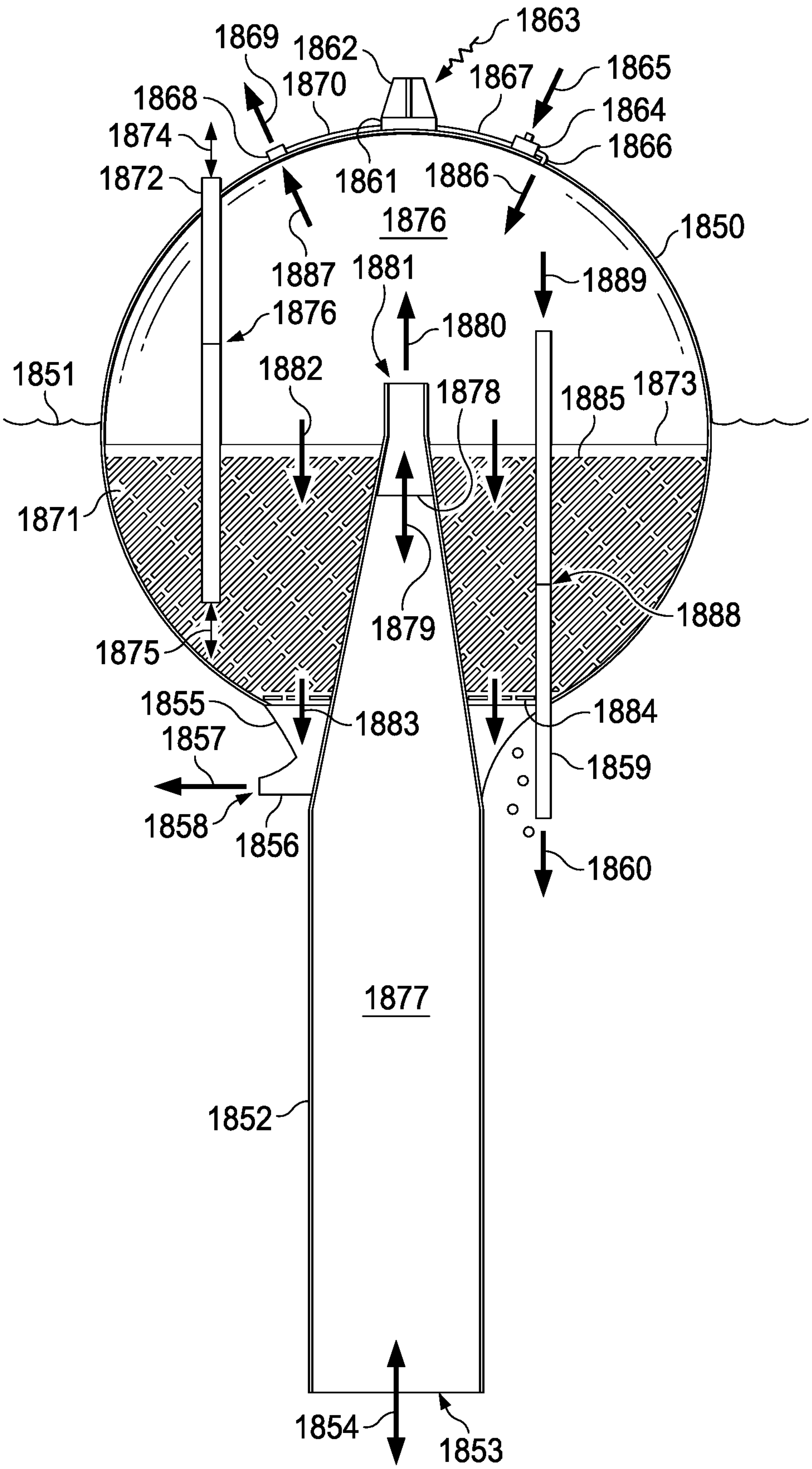
Figure 223:
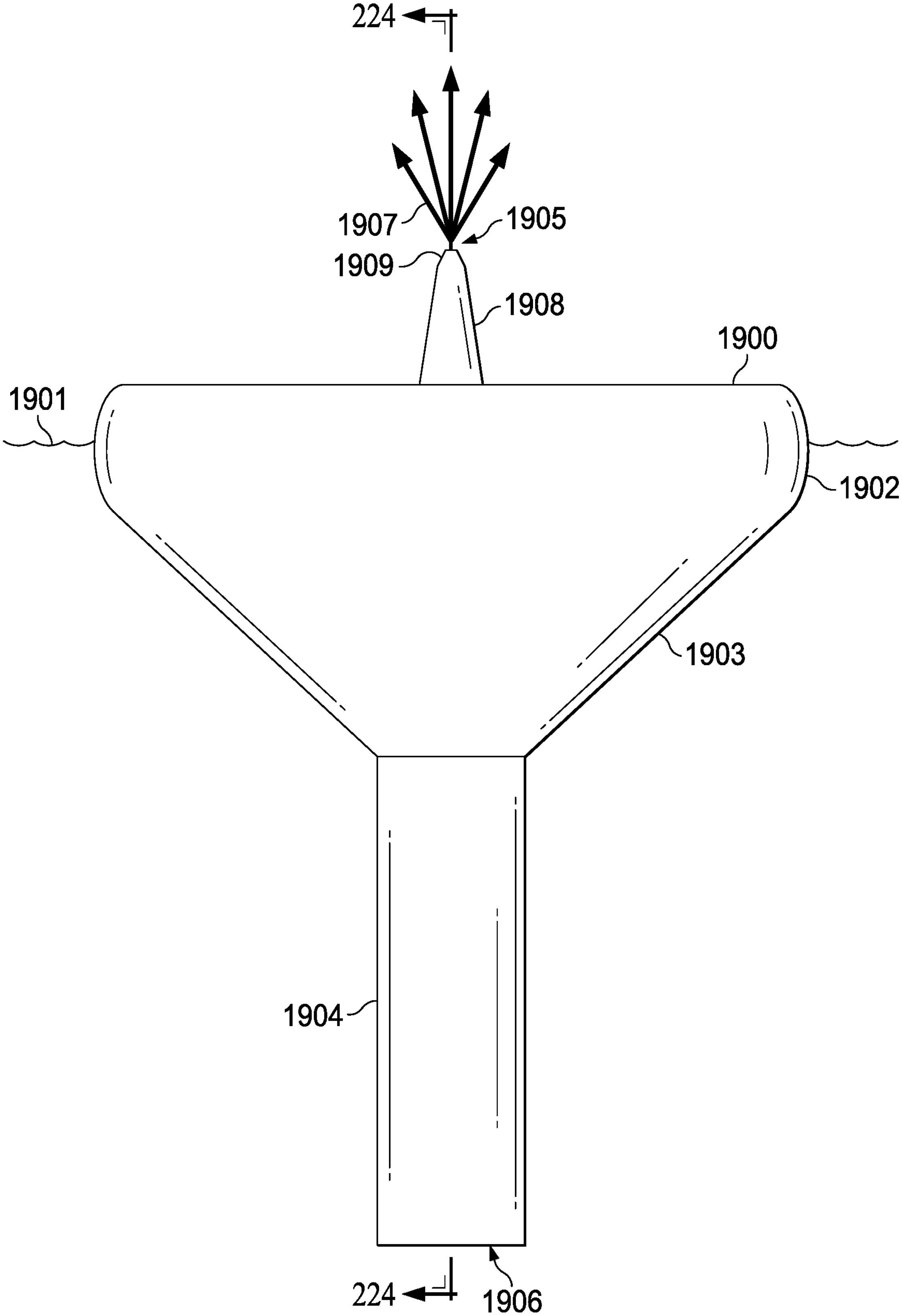
Figure 224:
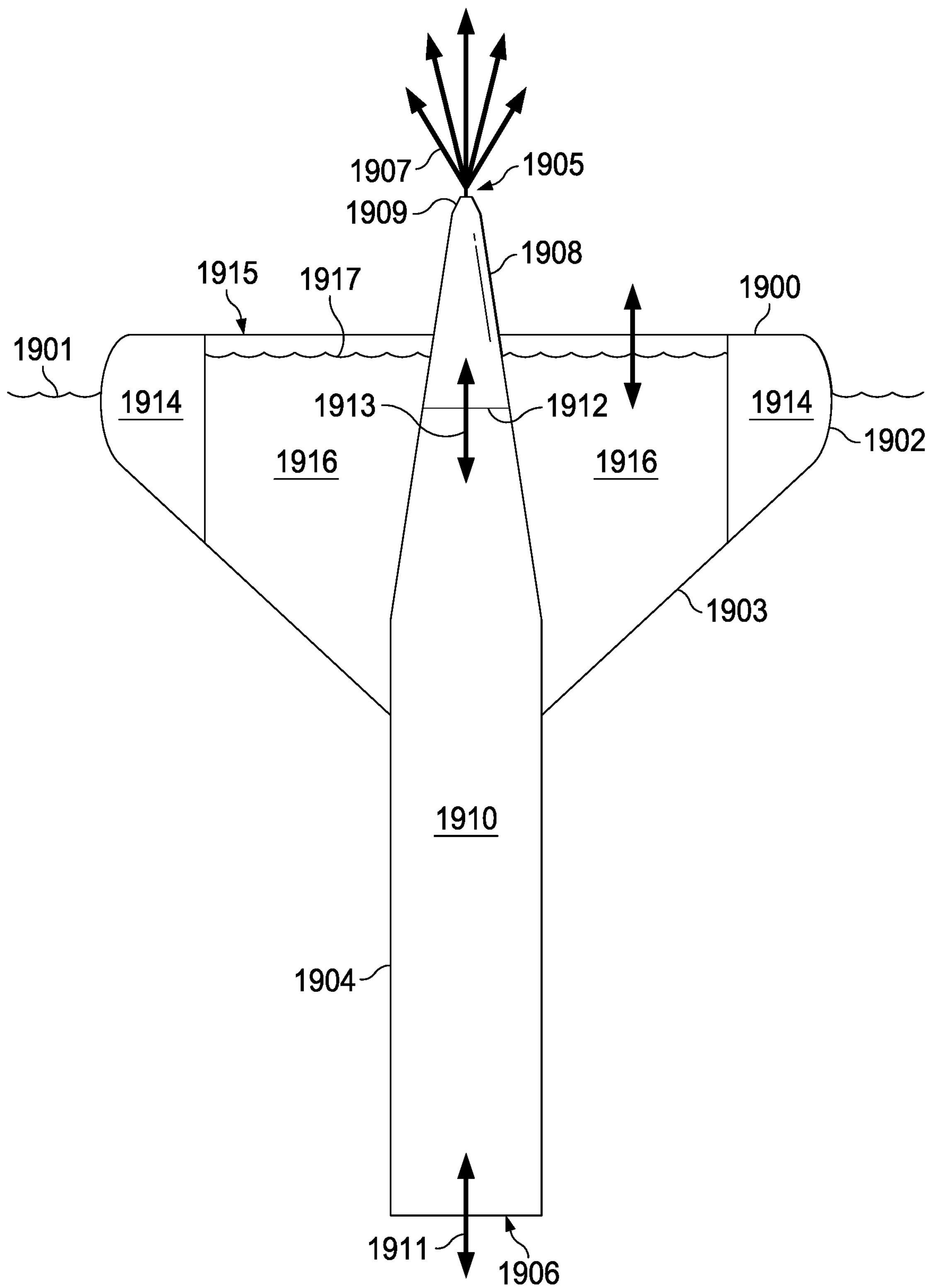
Figure 225:
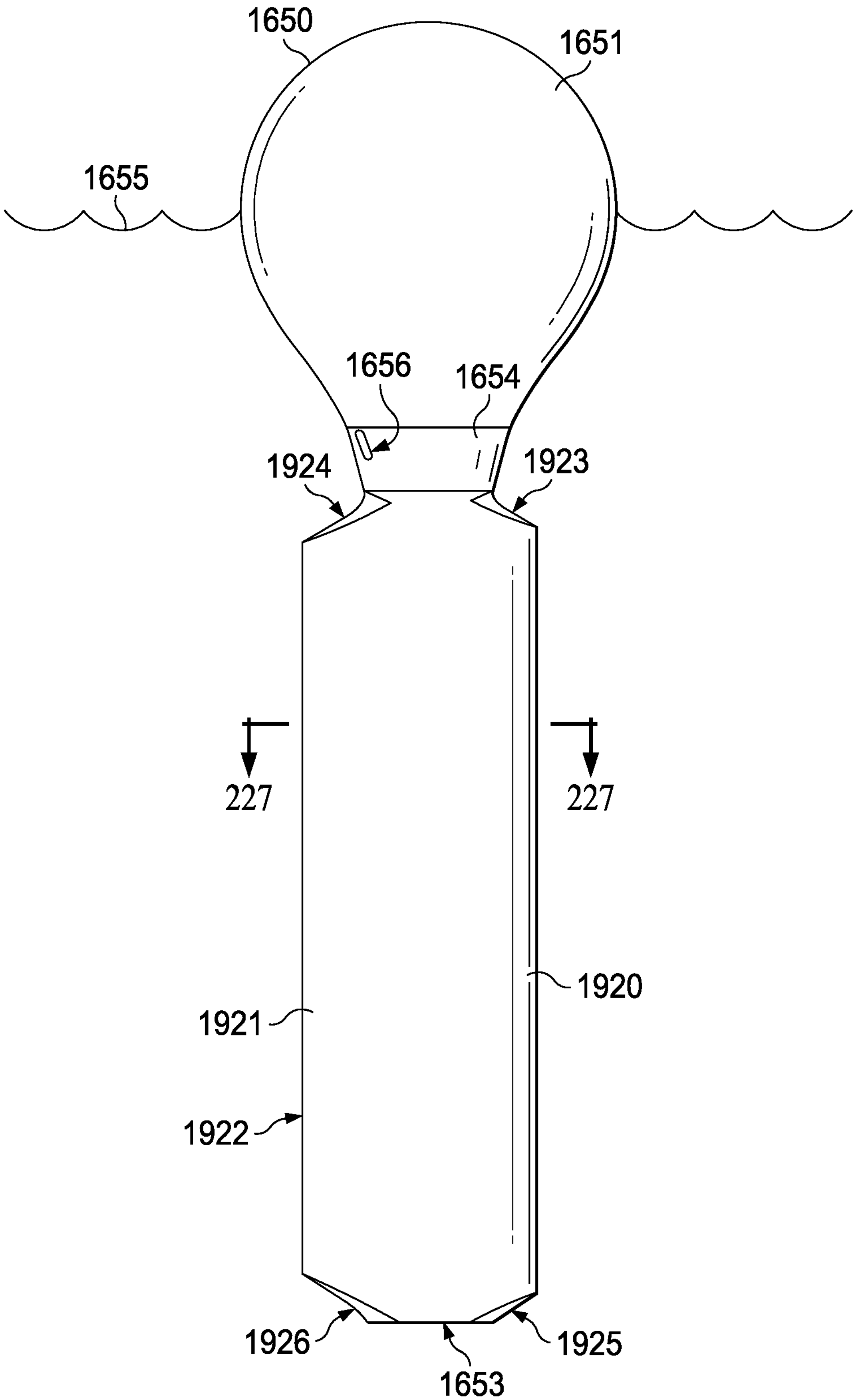
Figure 226:
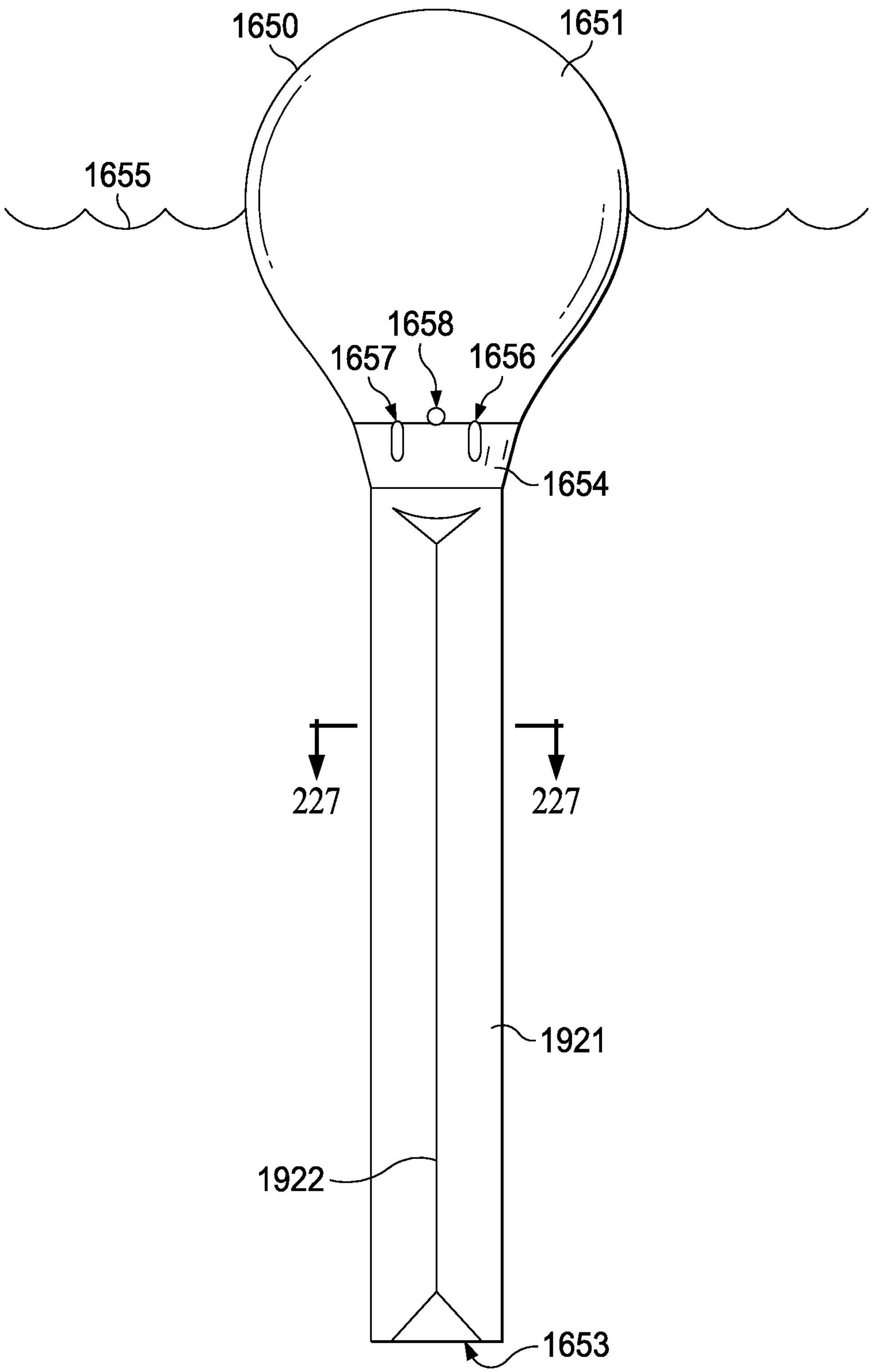
Figure 227:
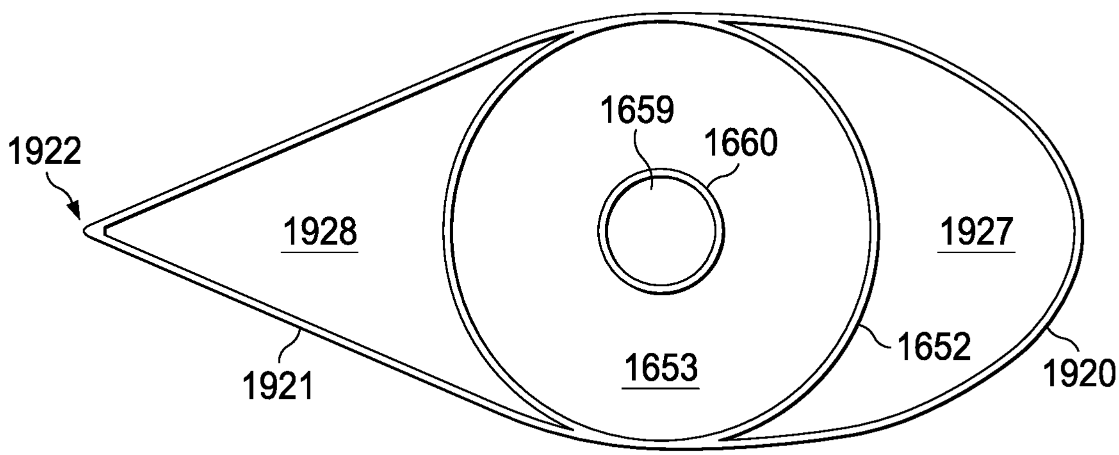
Figure 228:
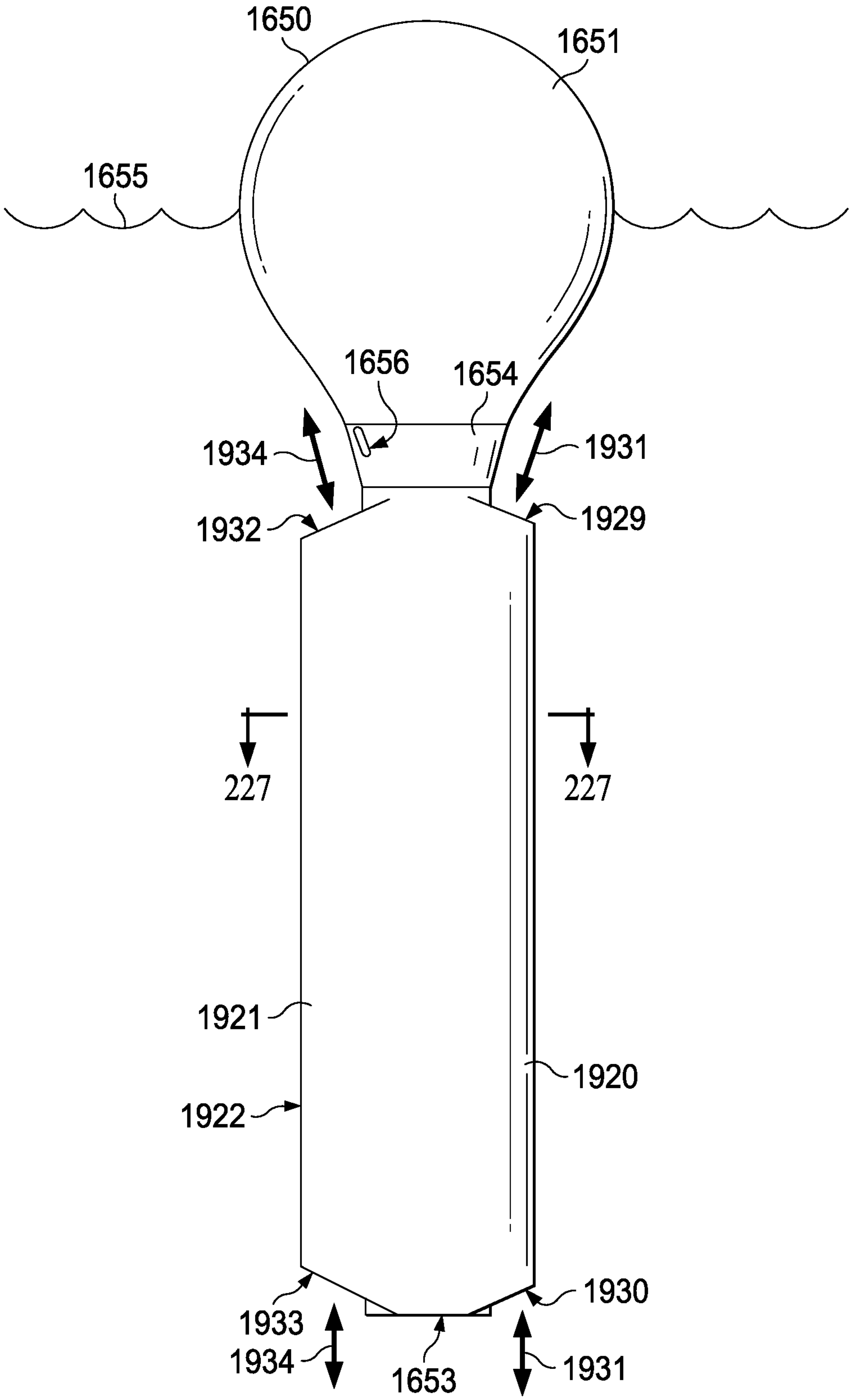
Figure 229:
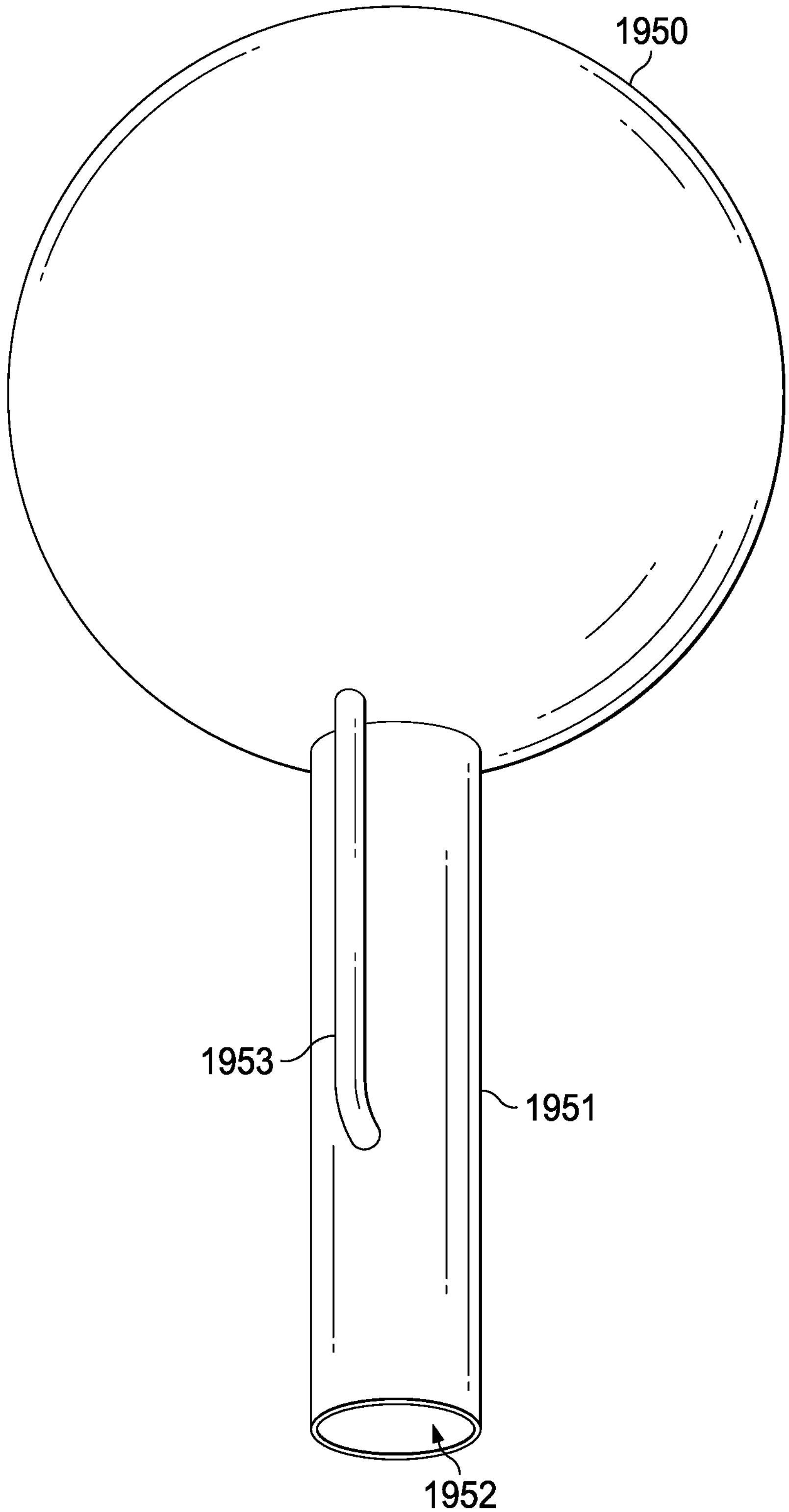
Figure 230:
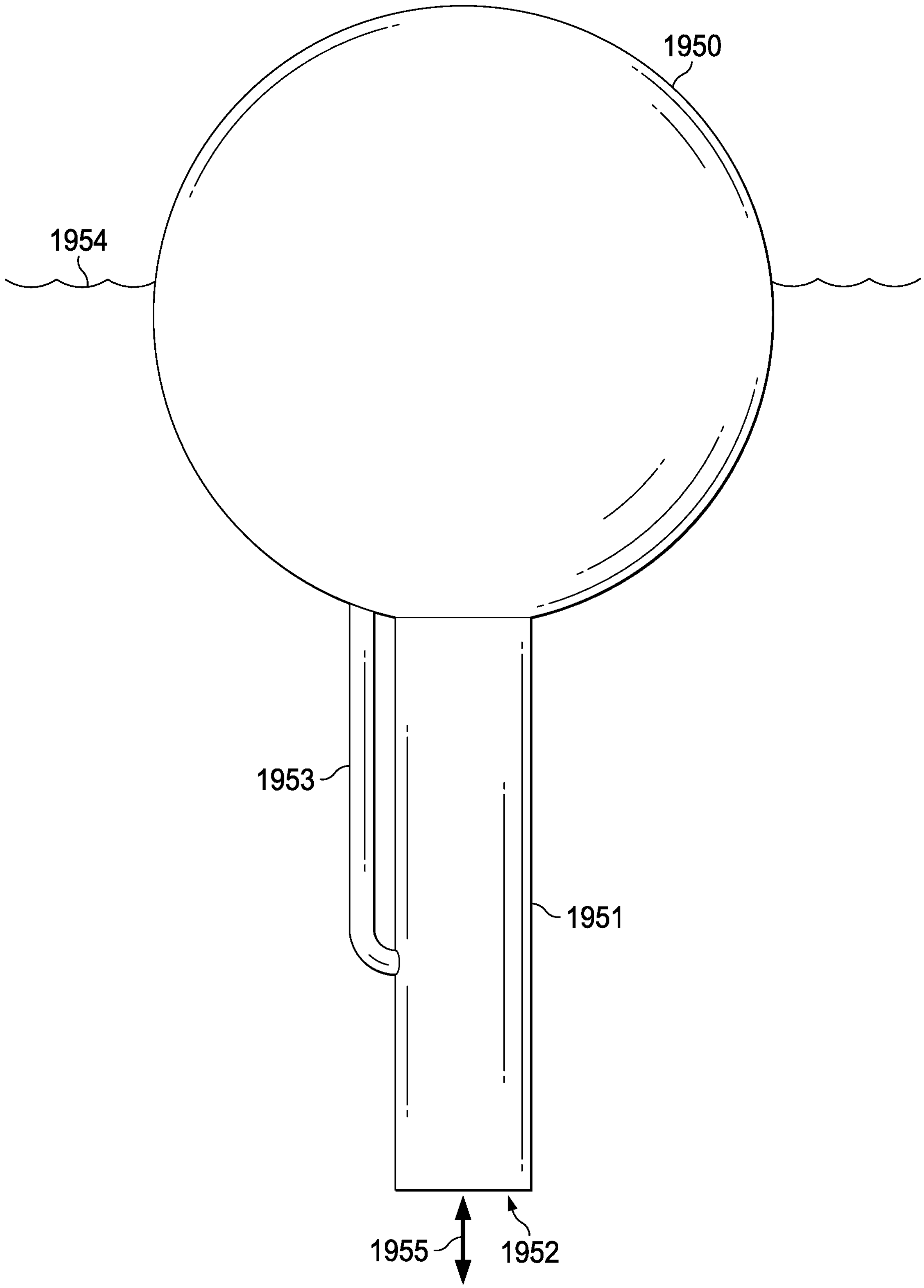
Figure 231:
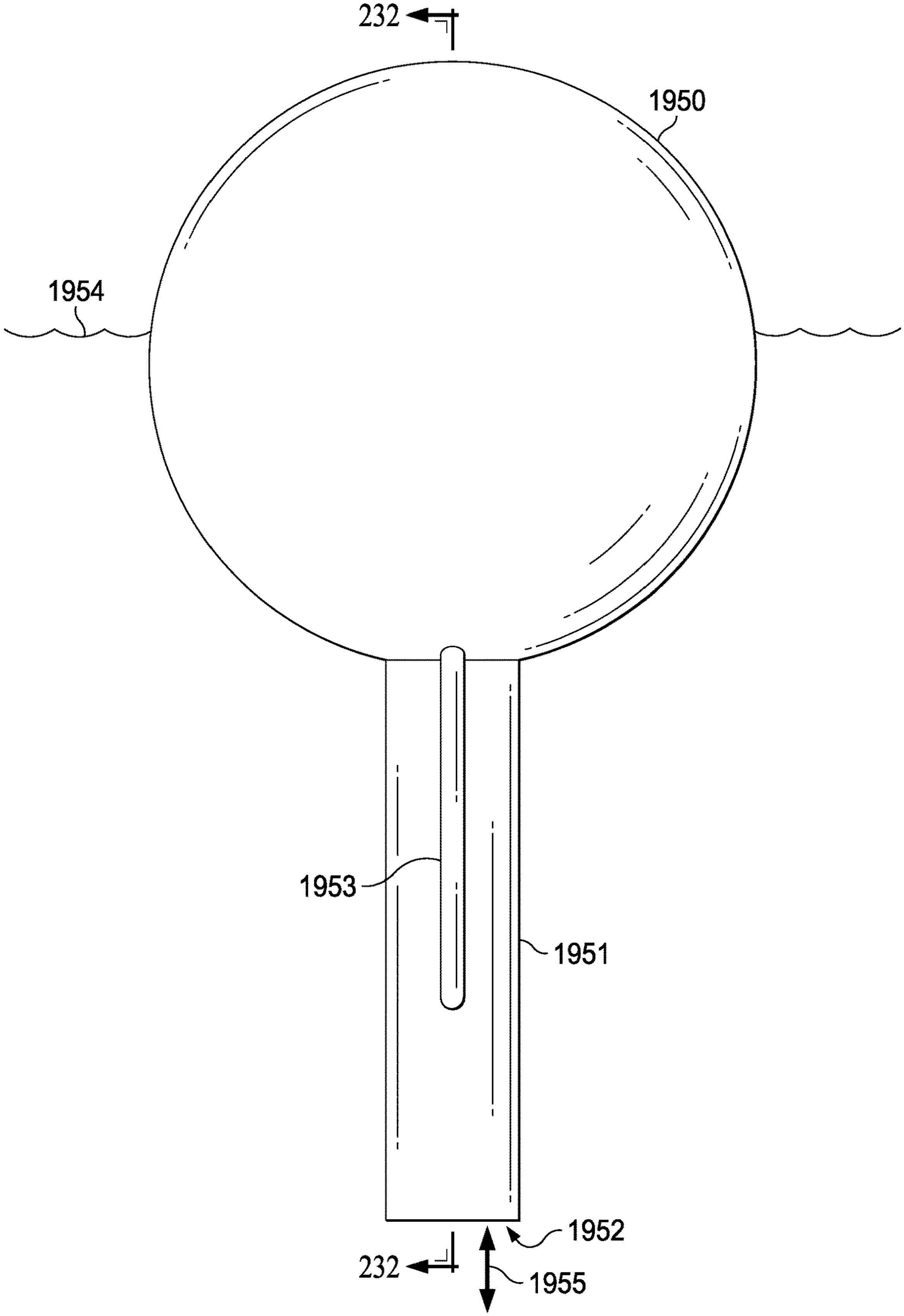
Figure 232:
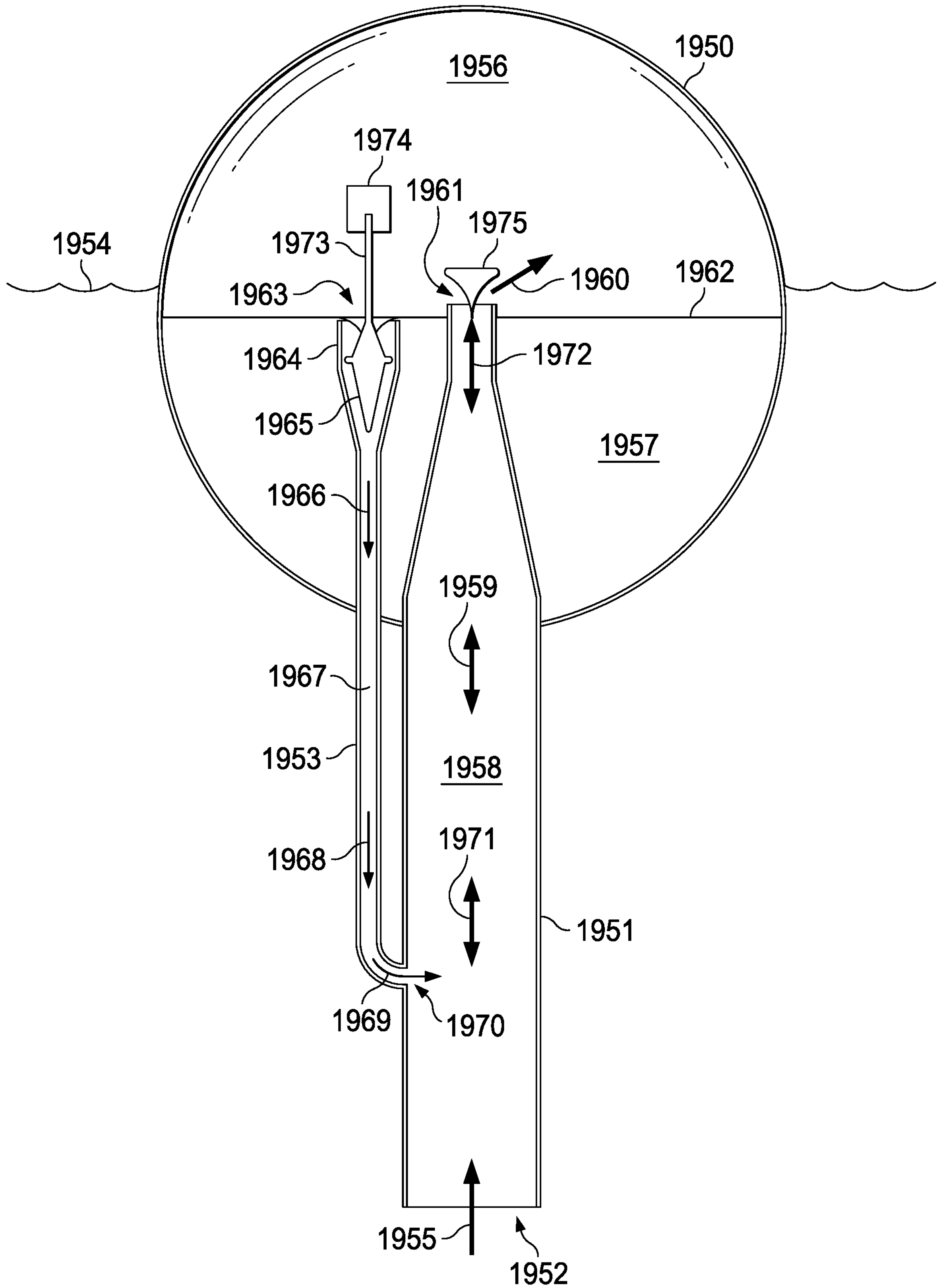
Figure 233:
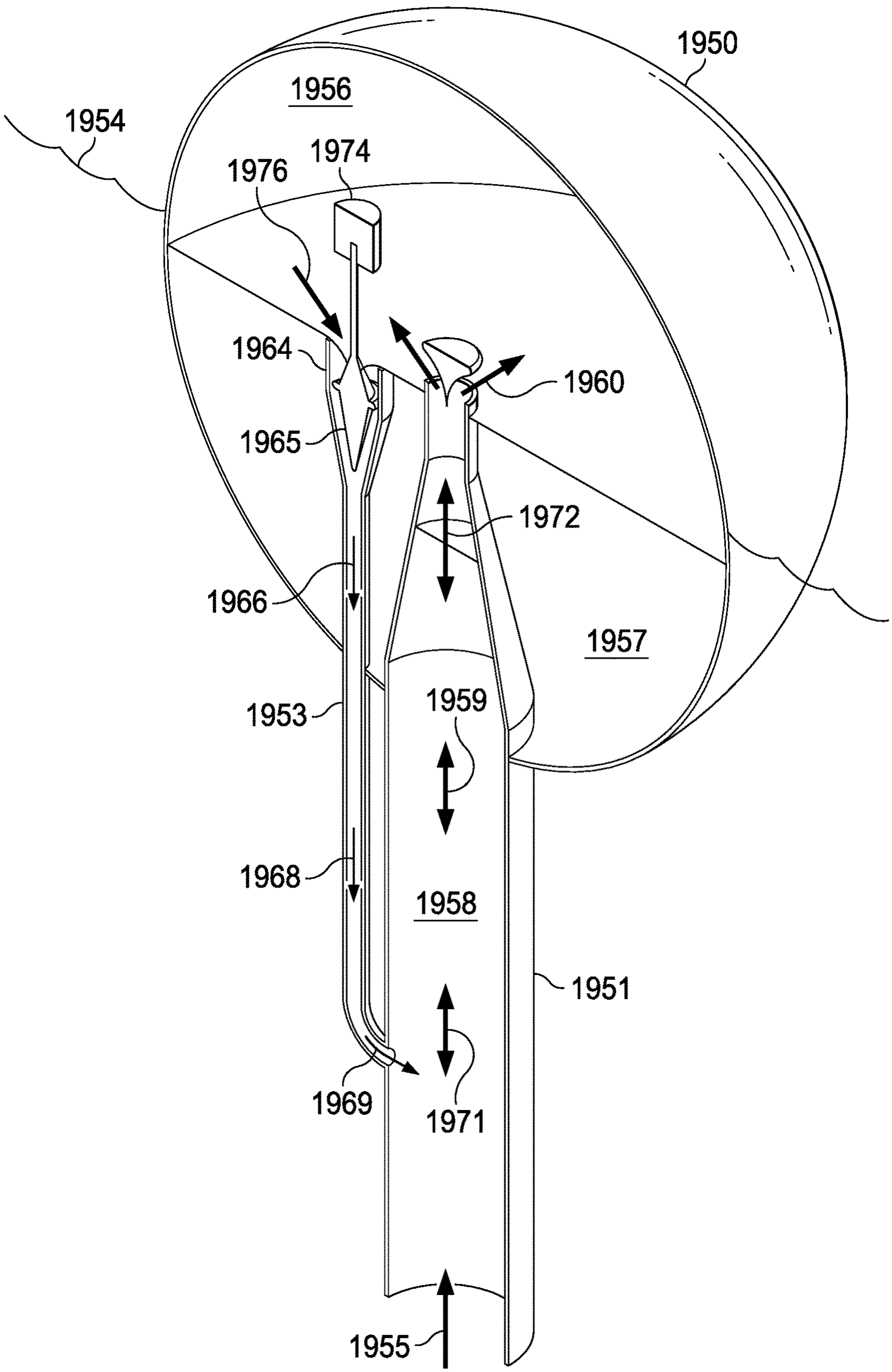
Figure 234:
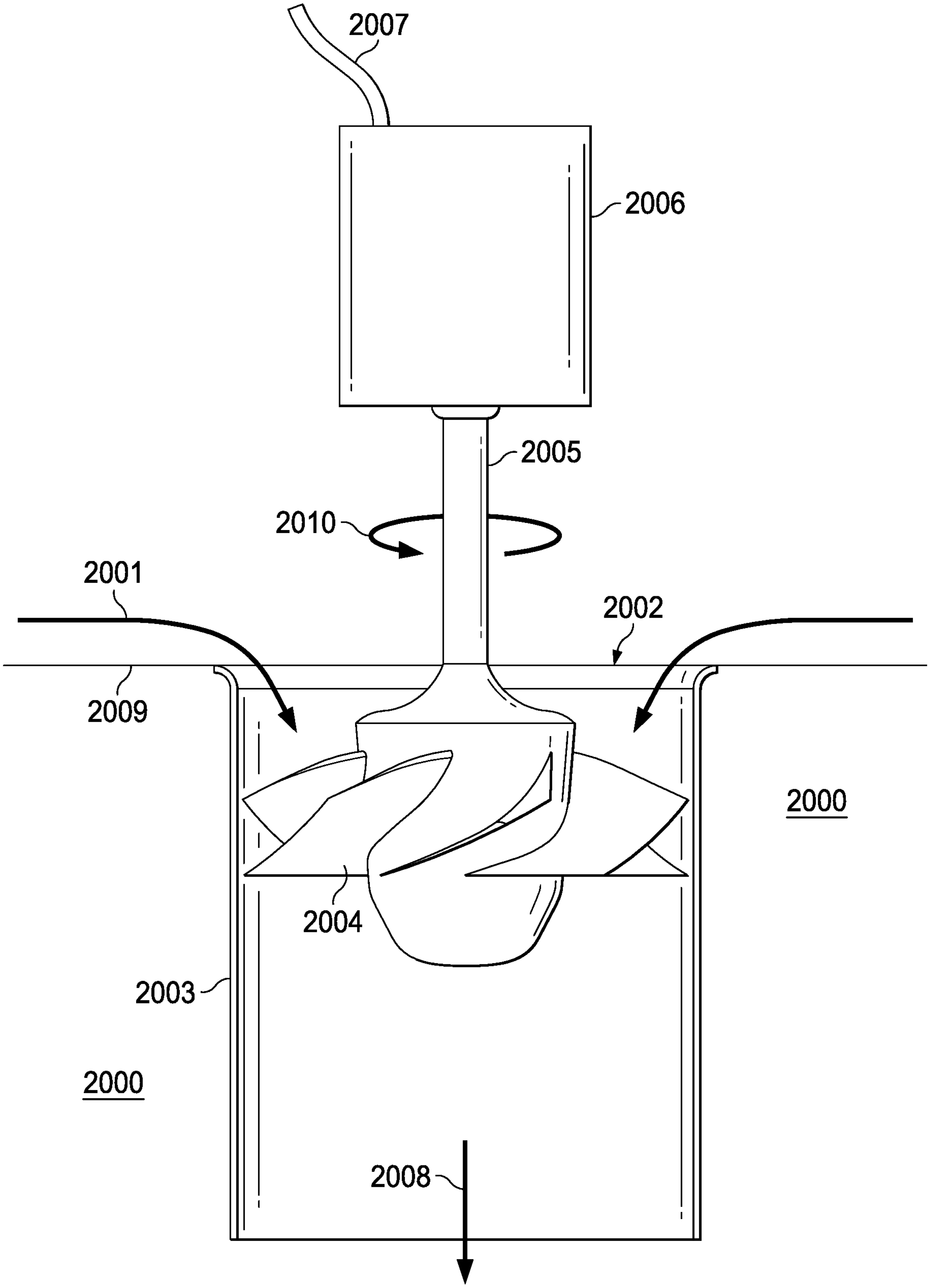
Figure 235:
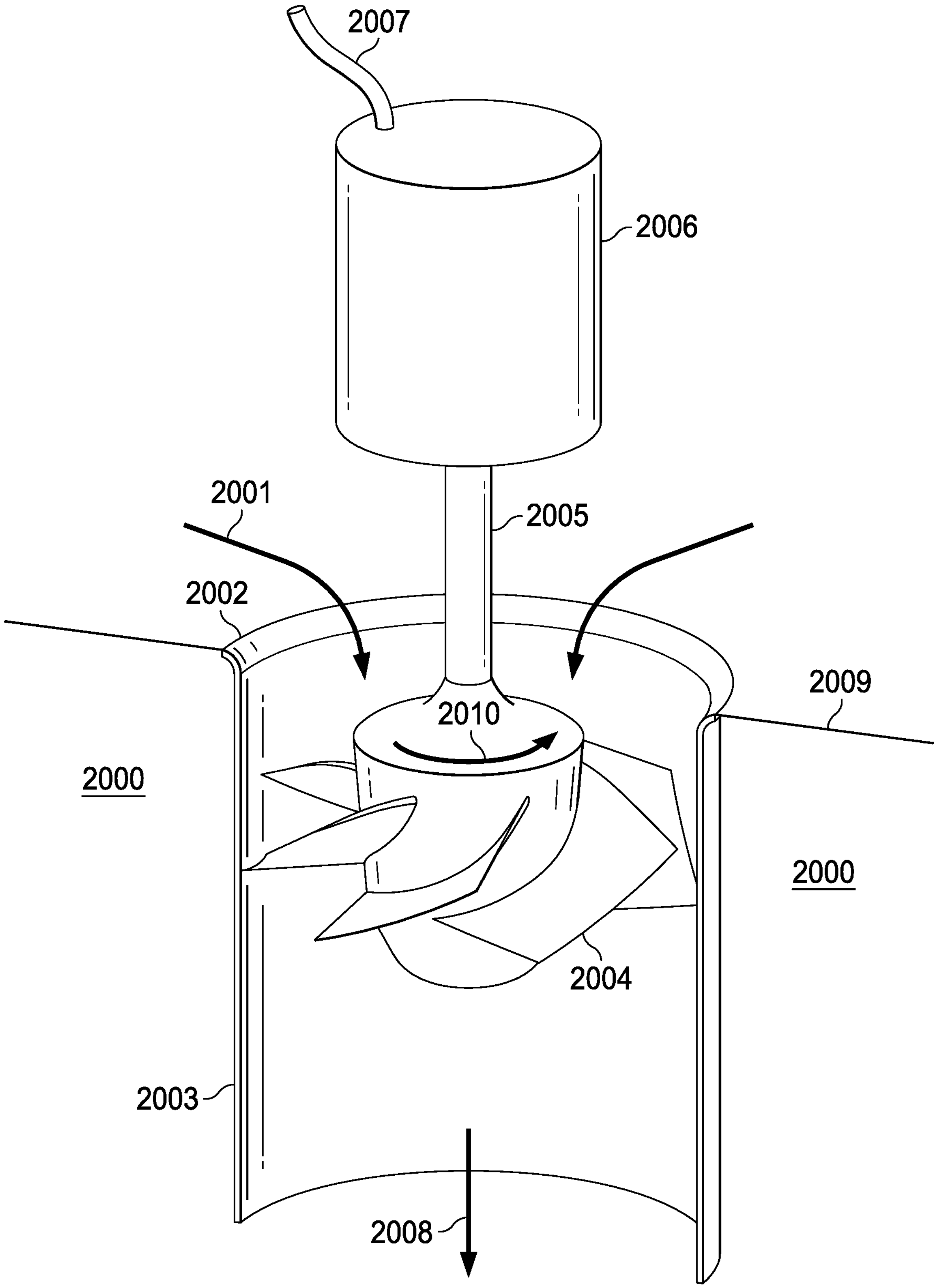
Figure 236:
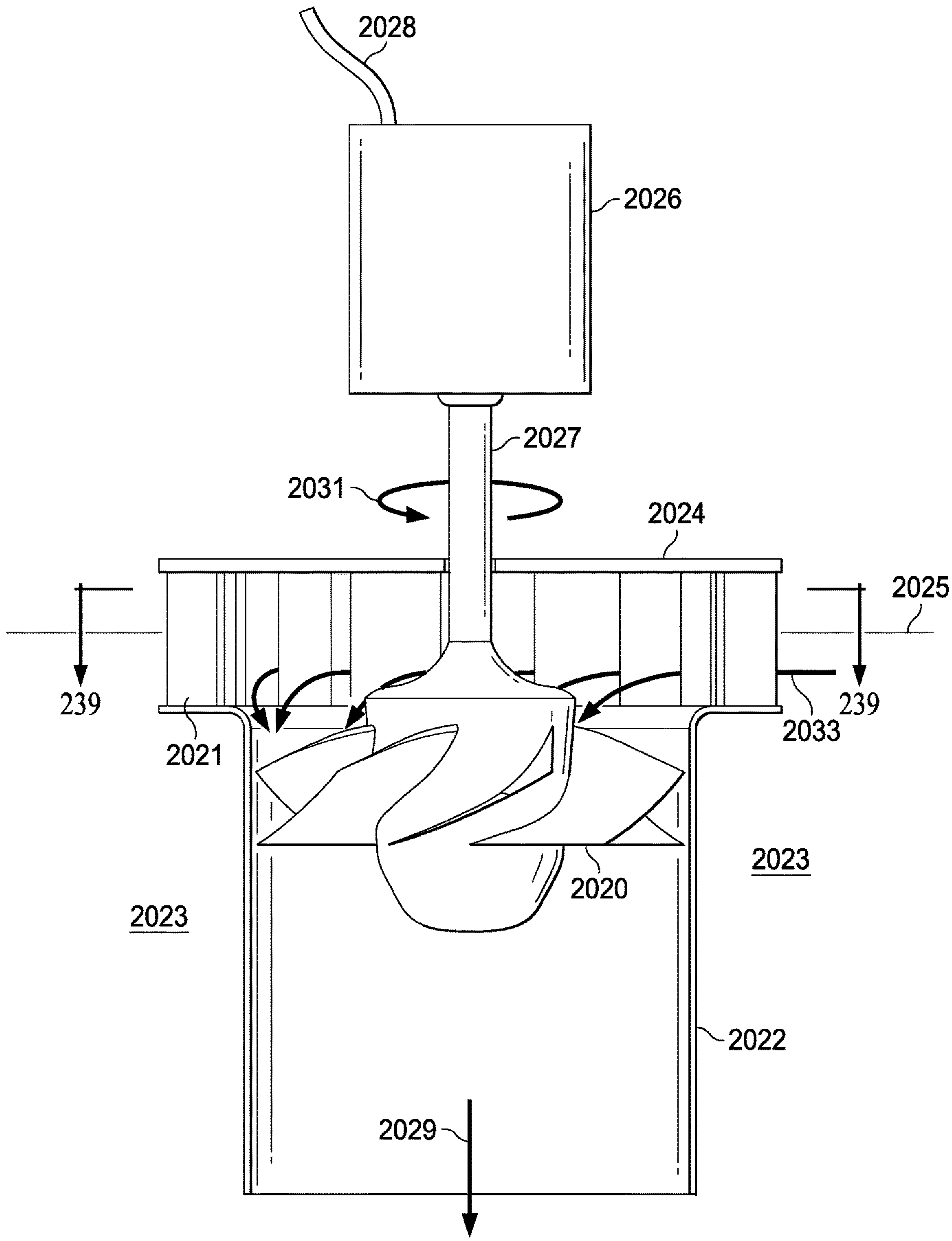
Figure 237:
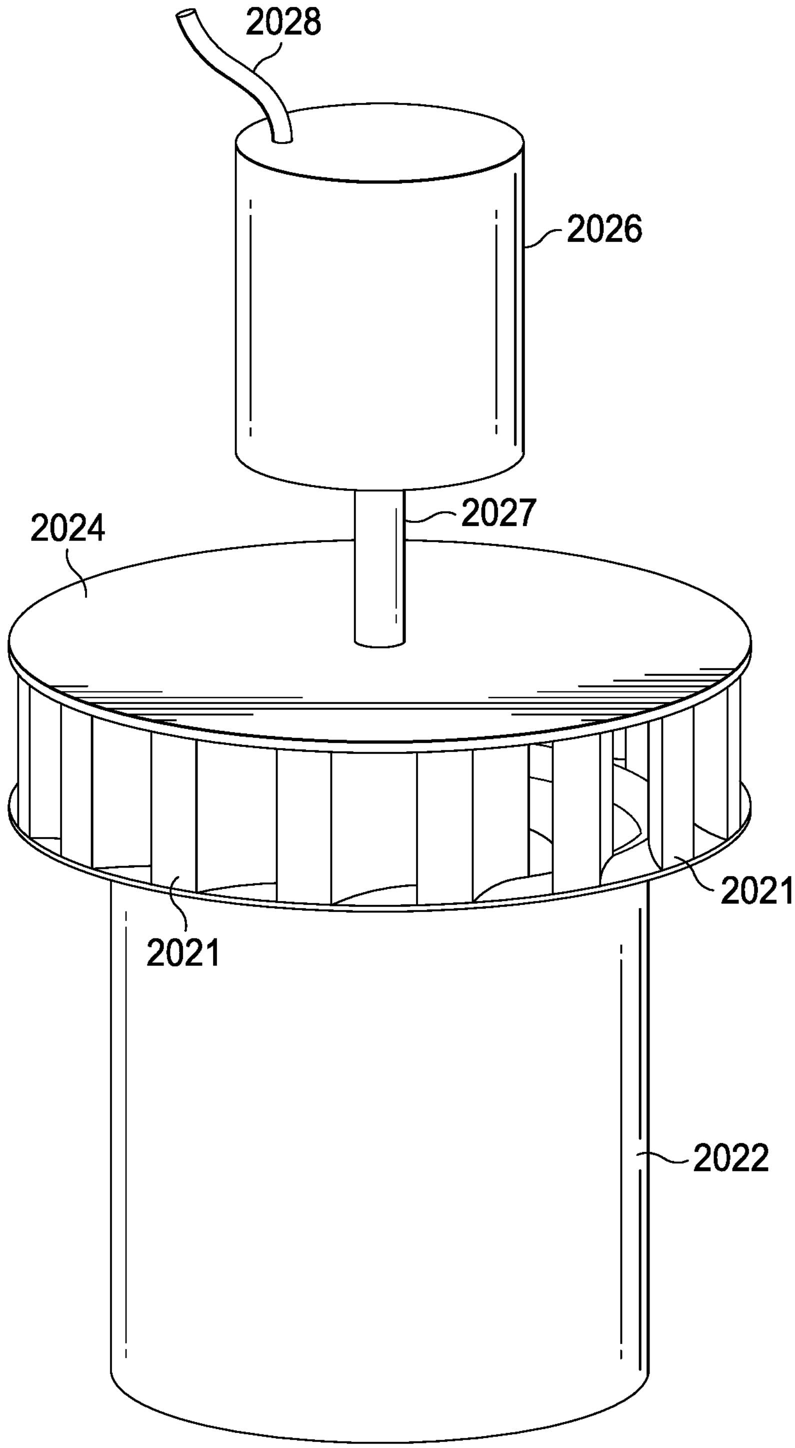
Figure 238:
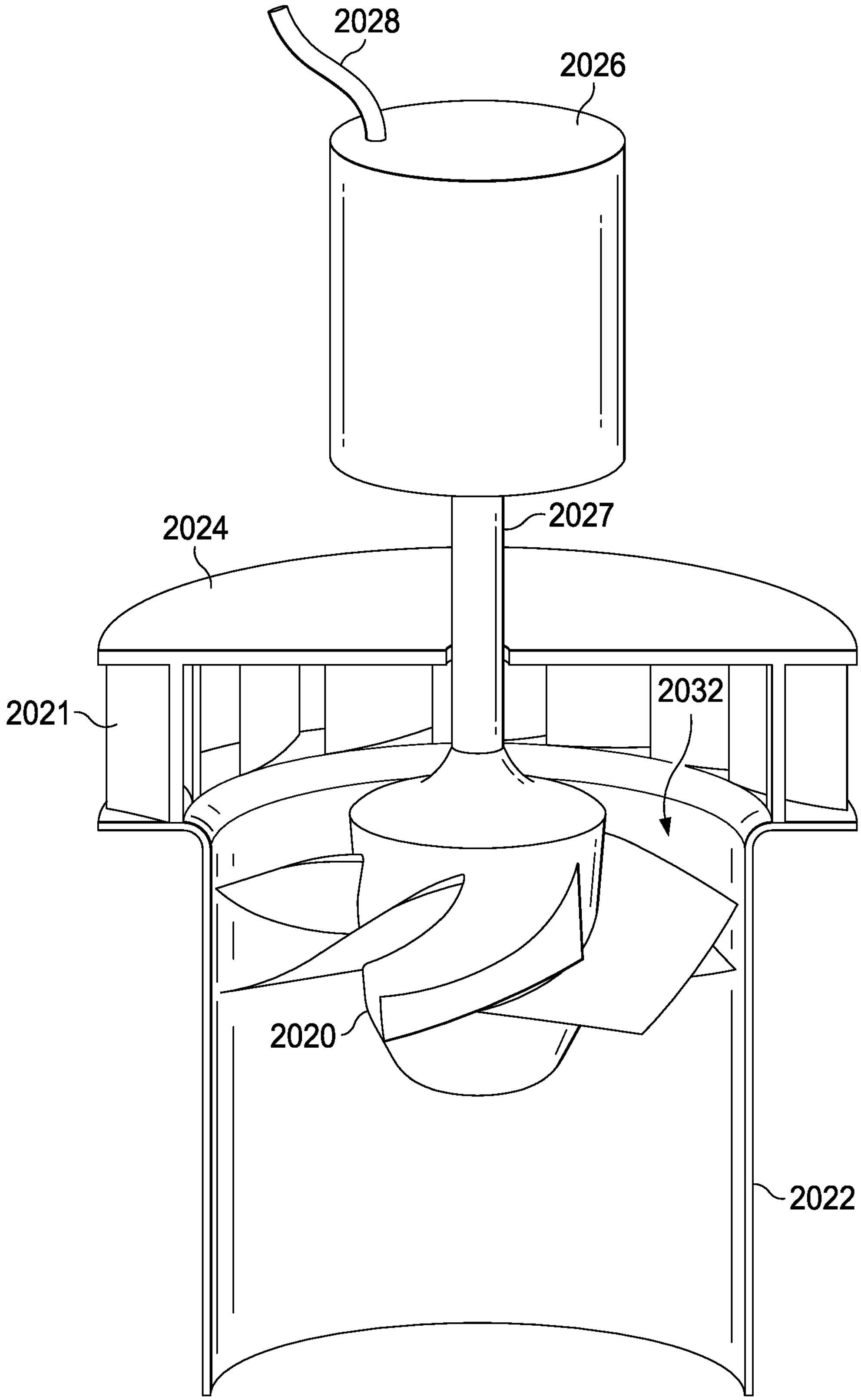
Figure 239:
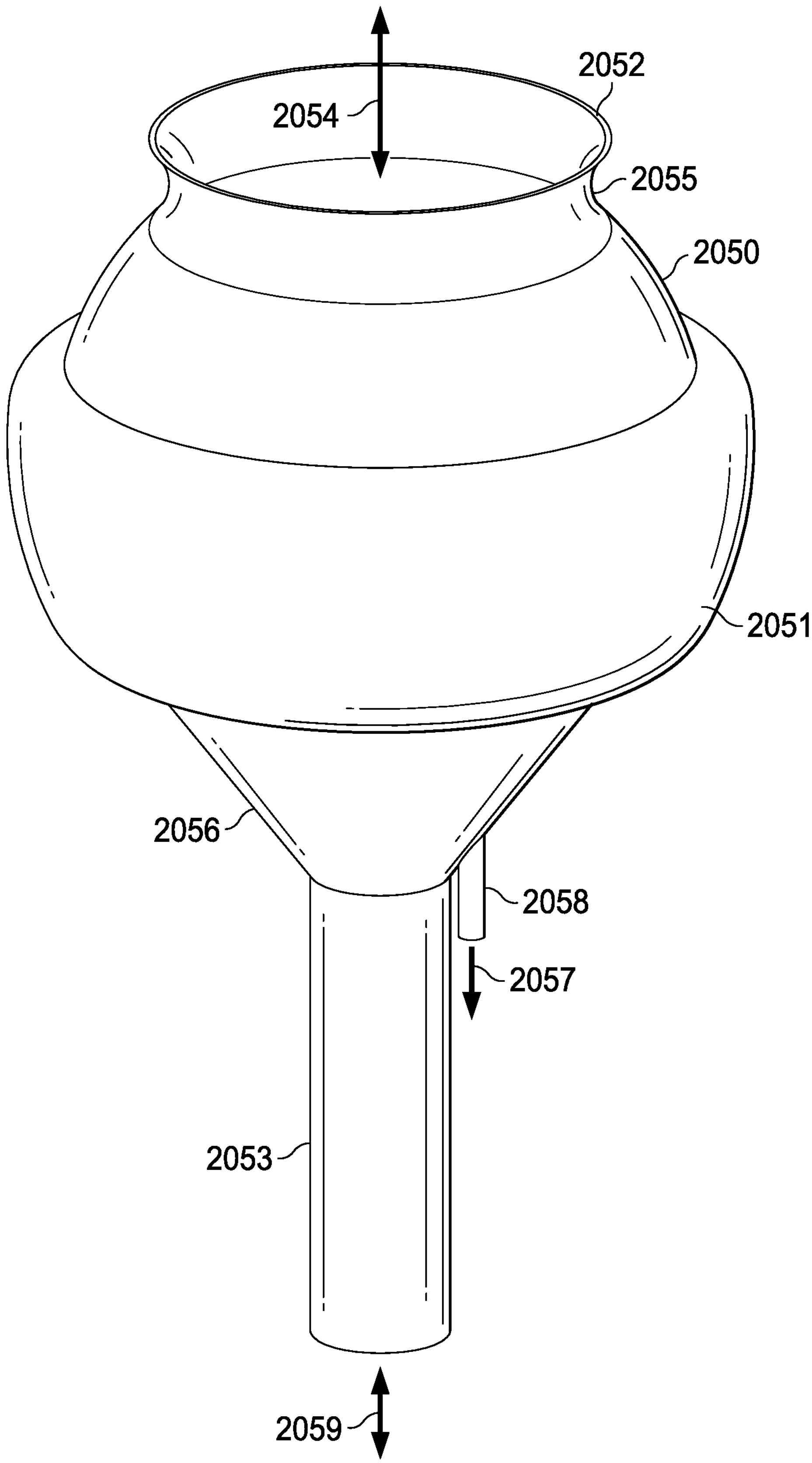
Figure 240:
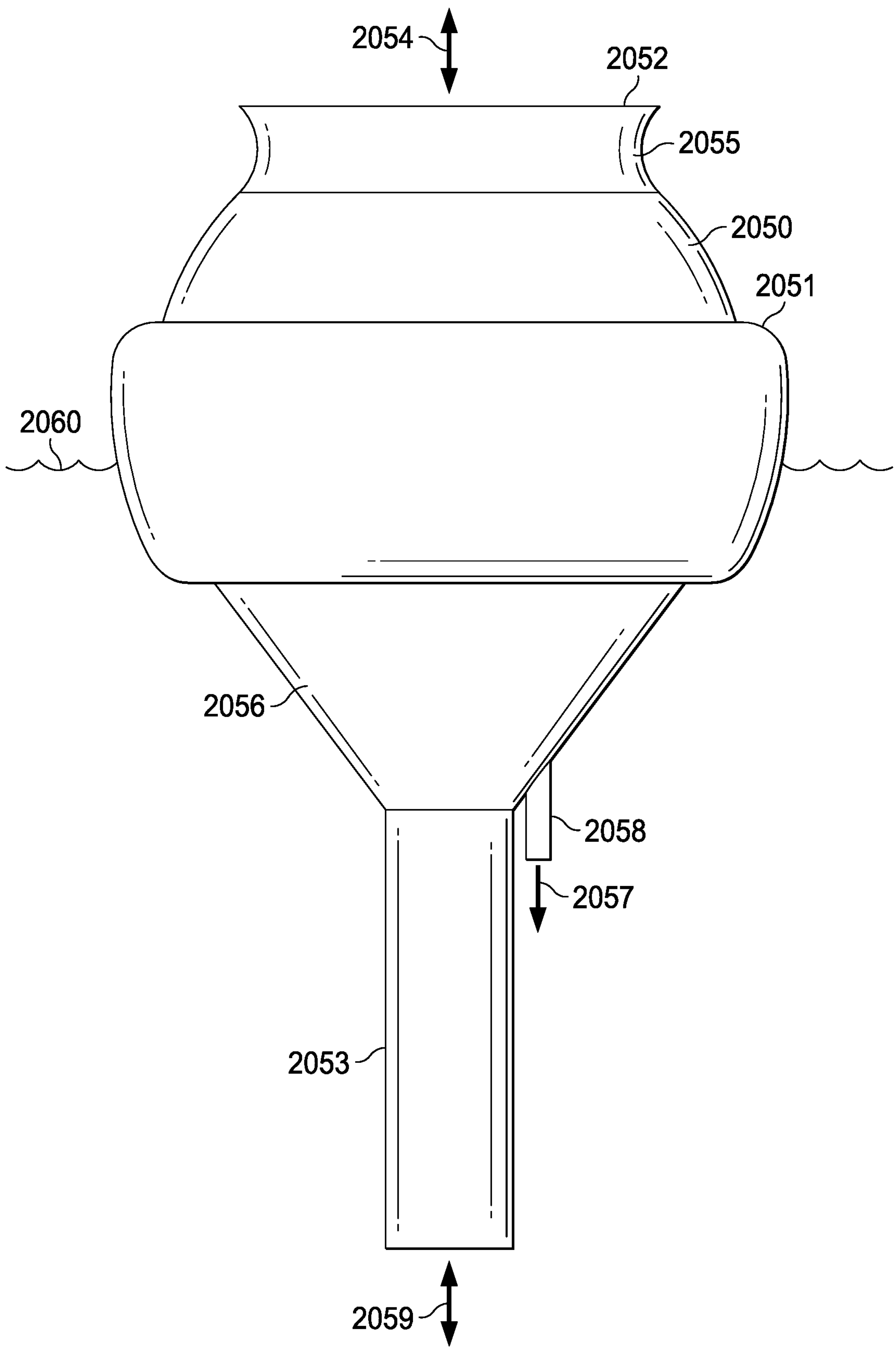
Figure 241:
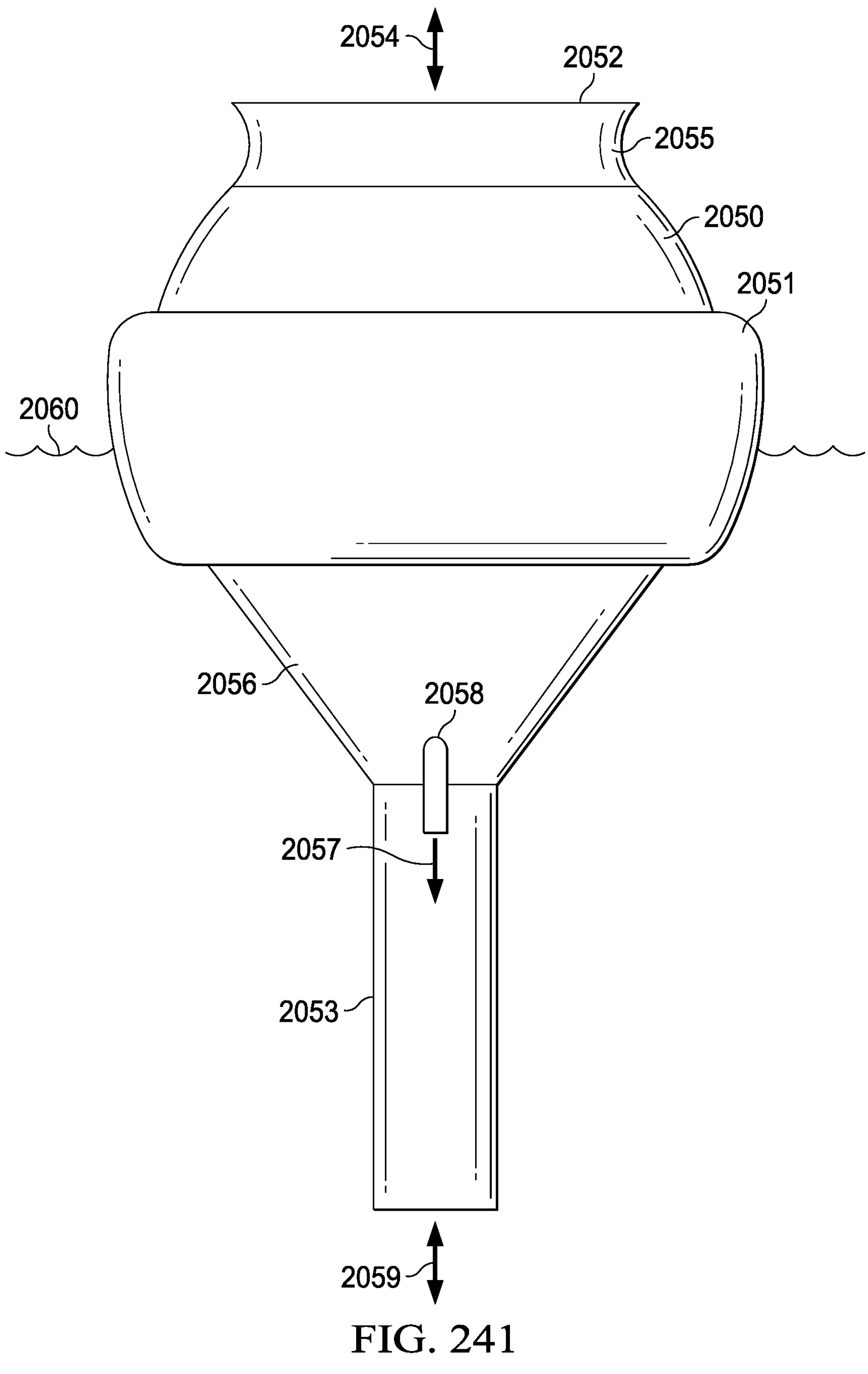
Figure 242:
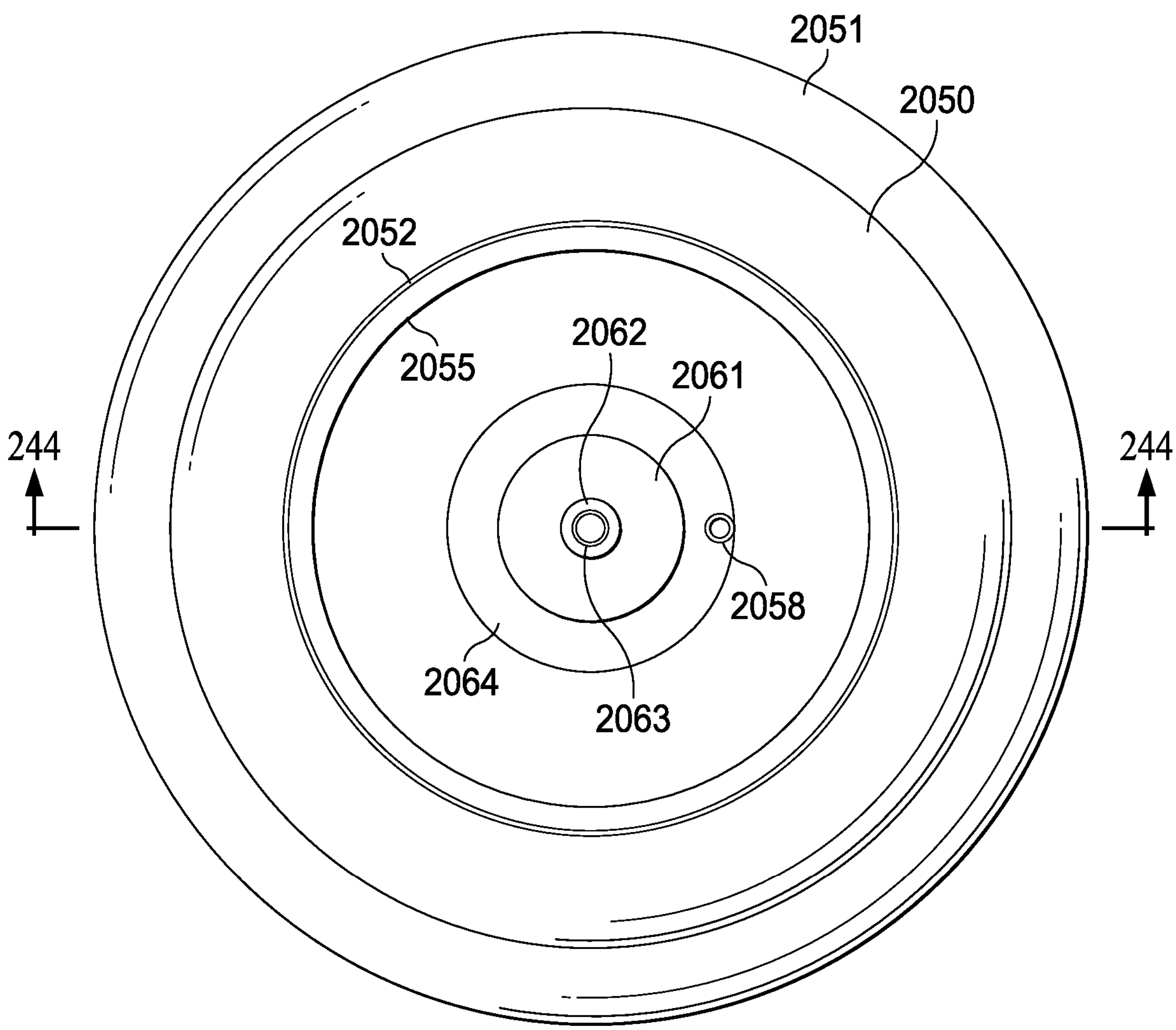
Figure 243:
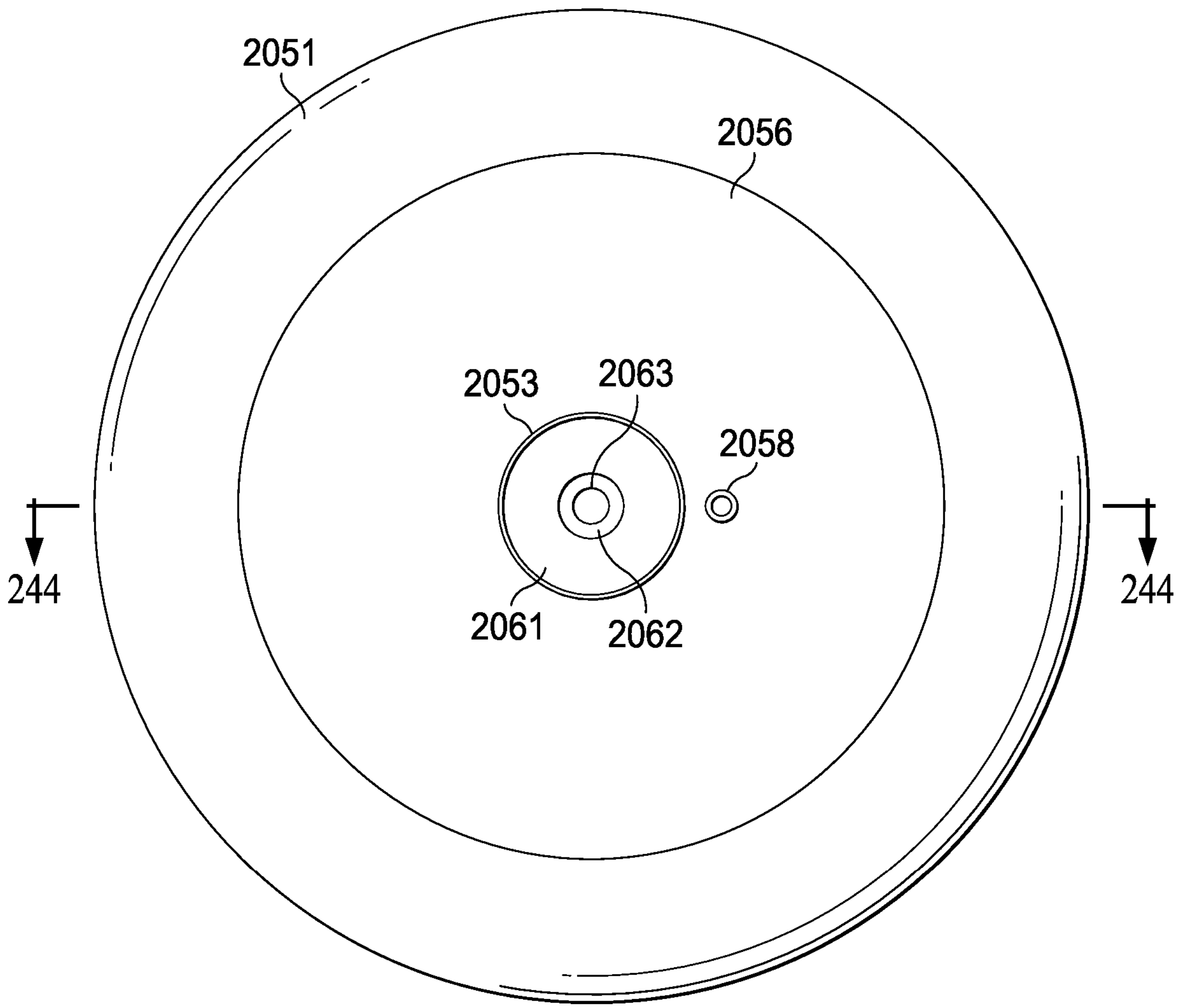
Figure 244:
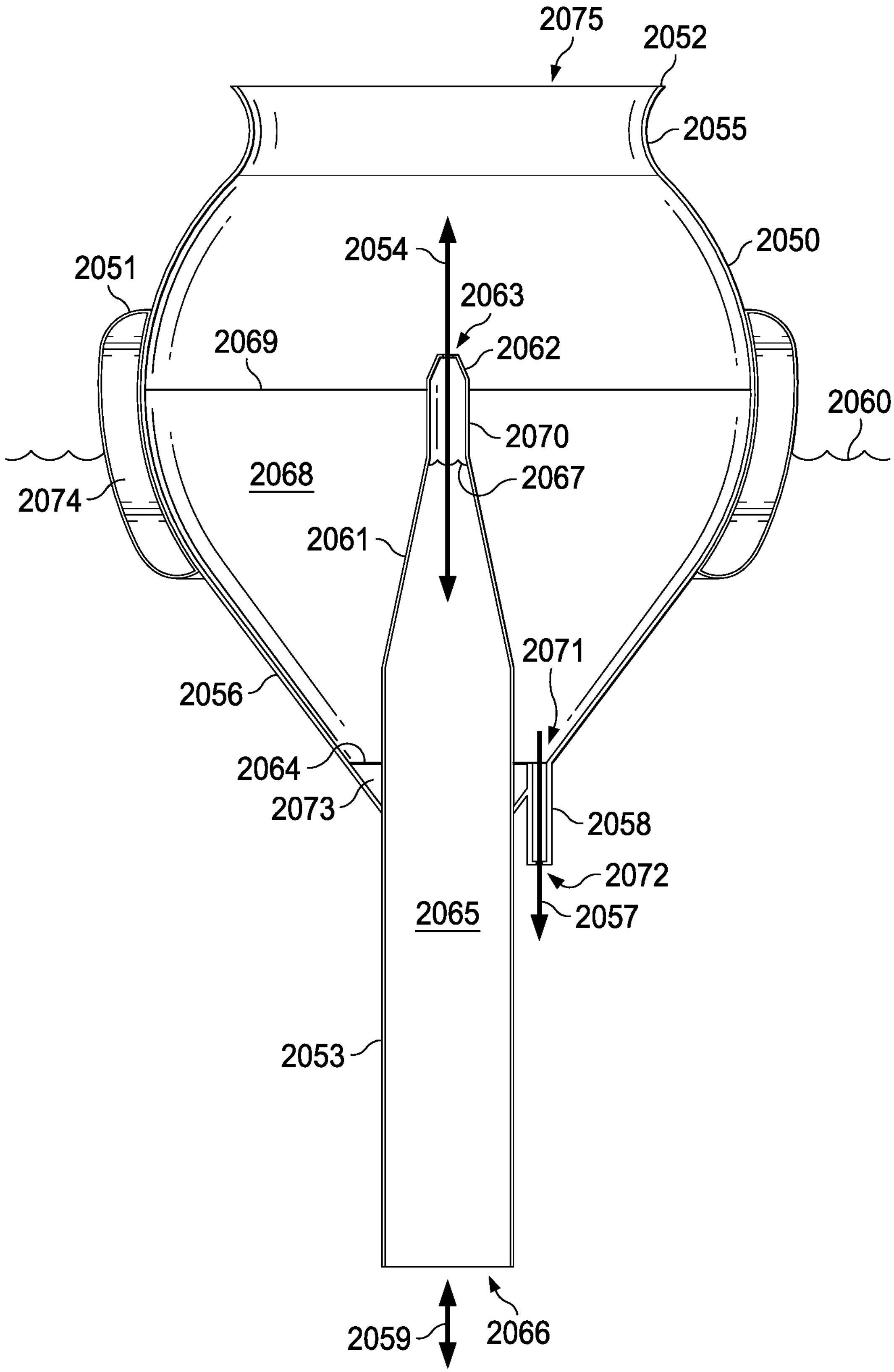
Figure 245:
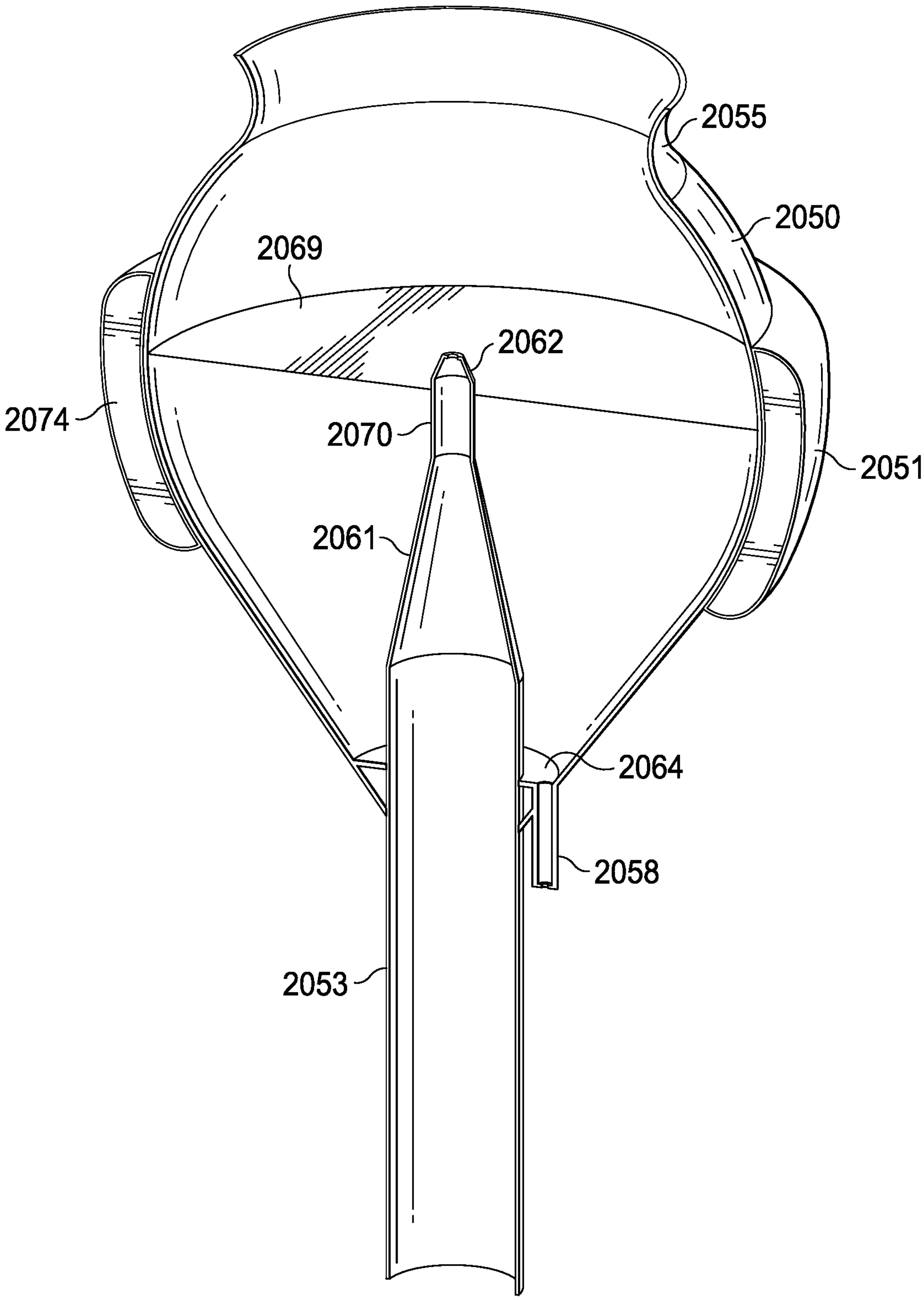
Figure 246:
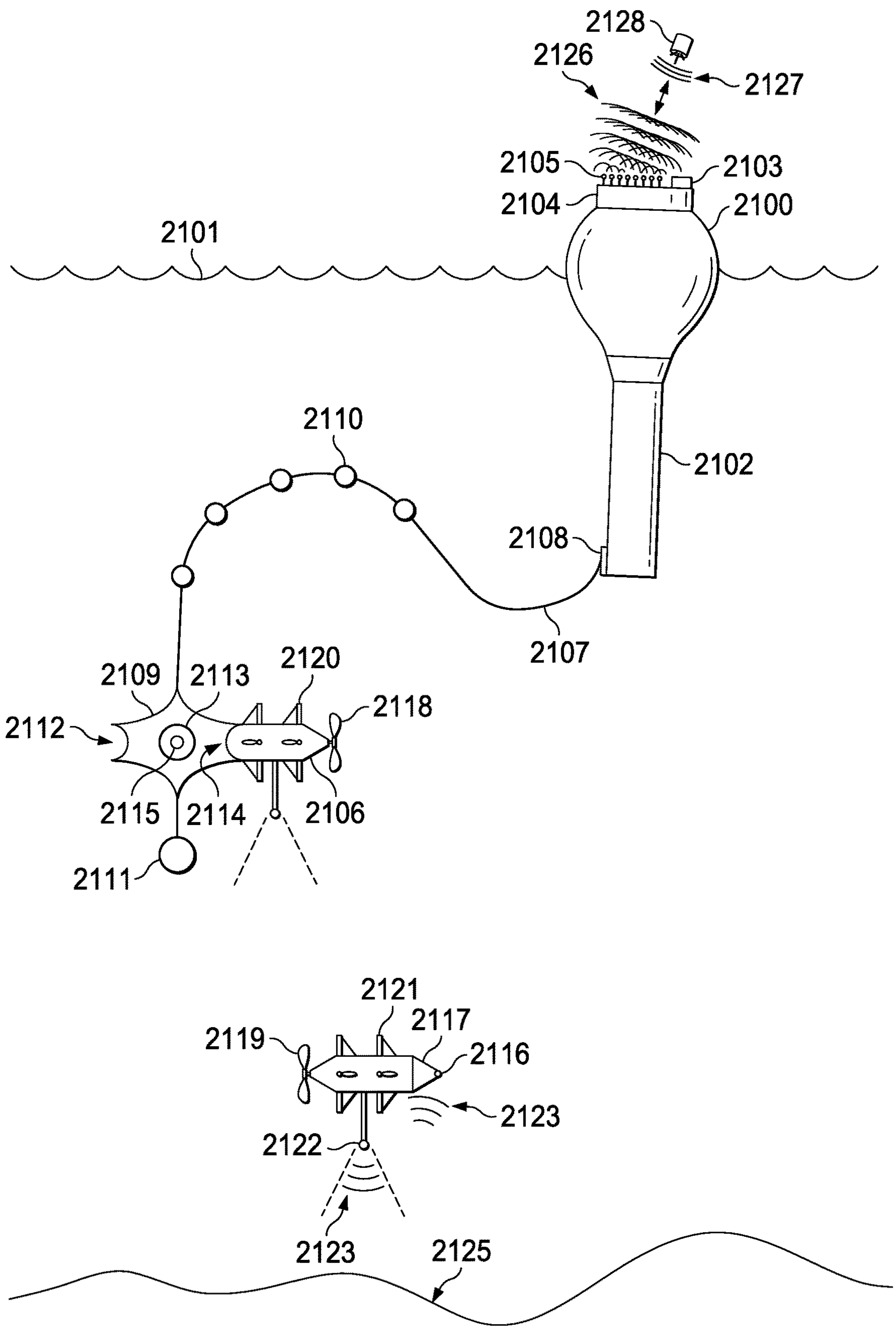
Figure 247:
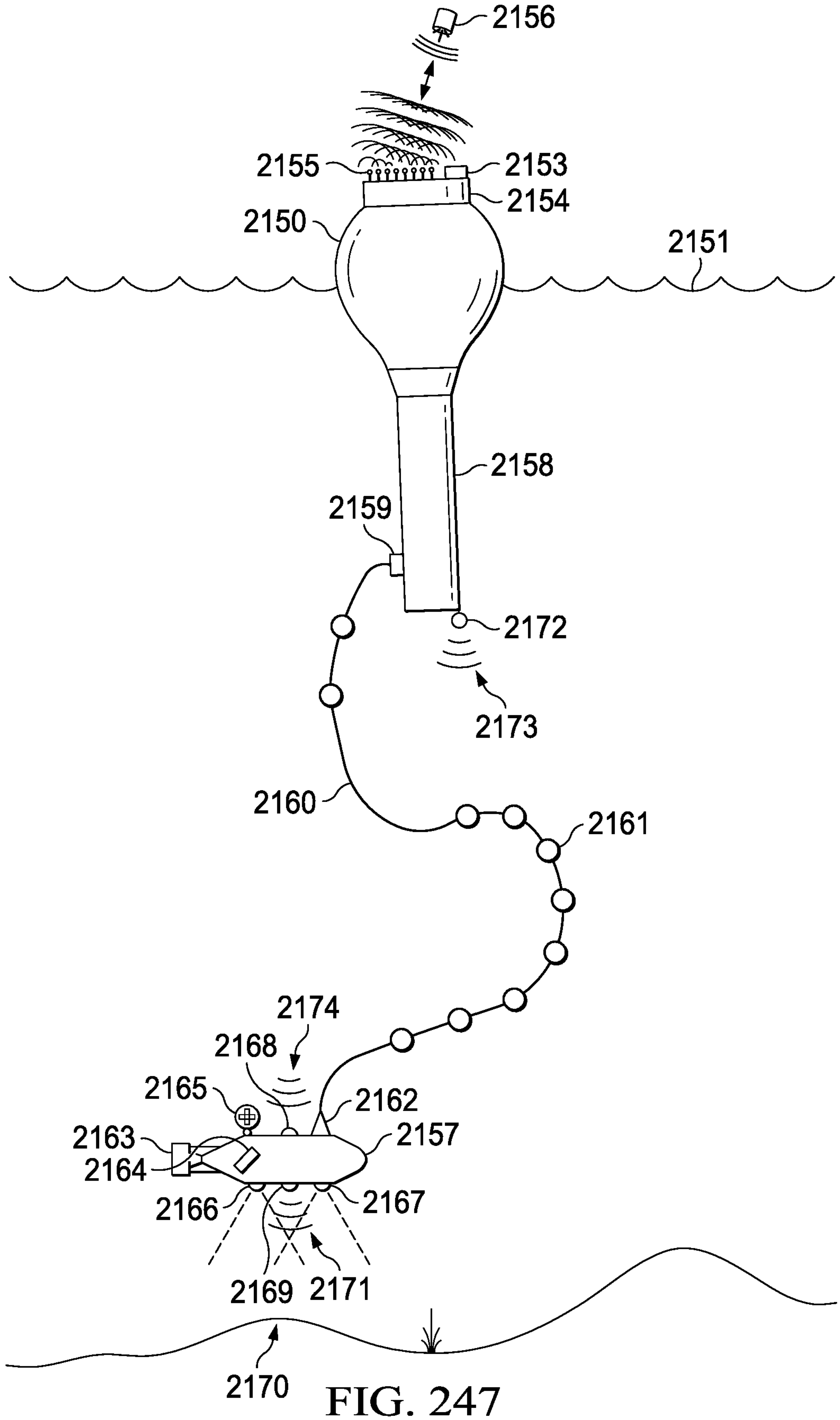
Figure 248:
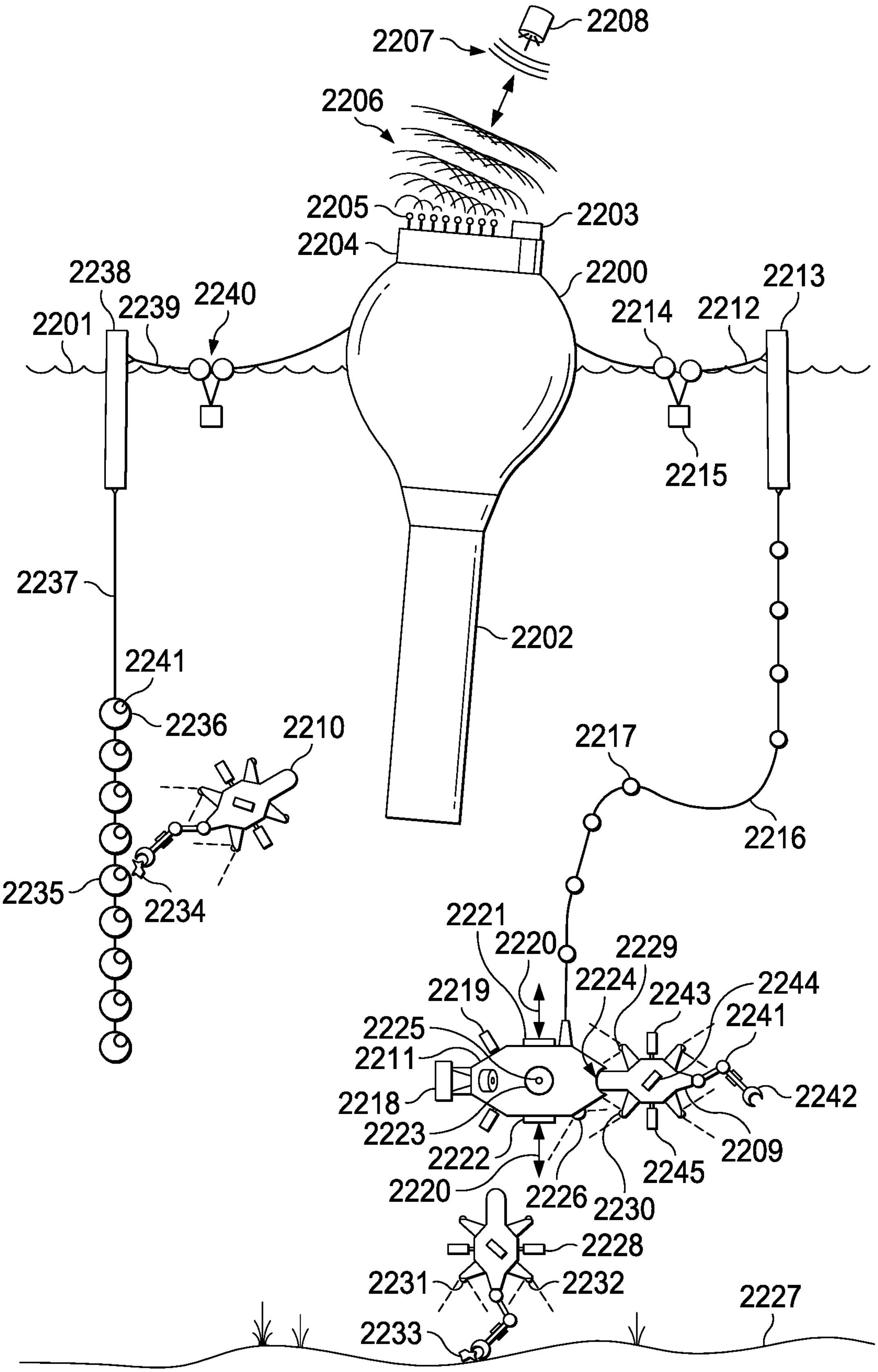
Figure 249:
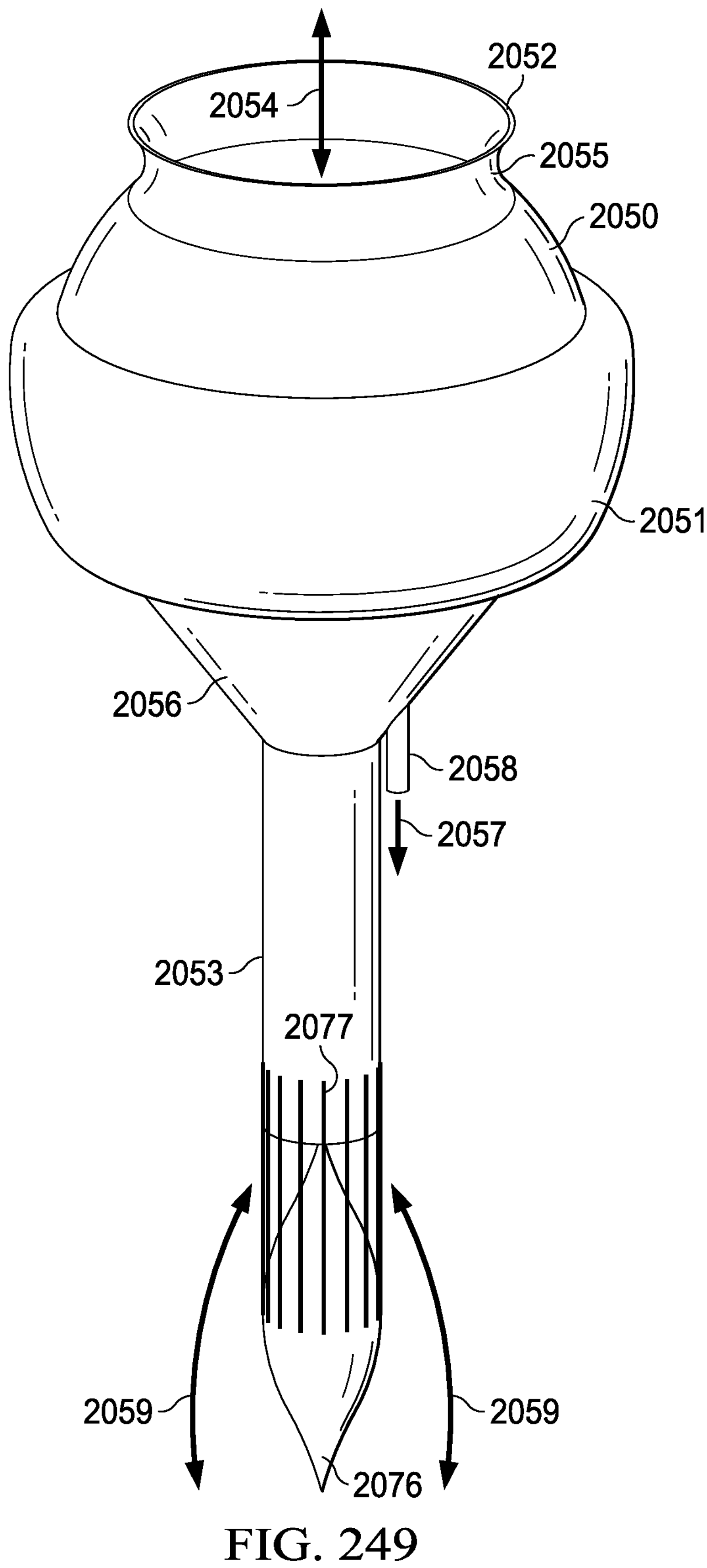
Figure 250:
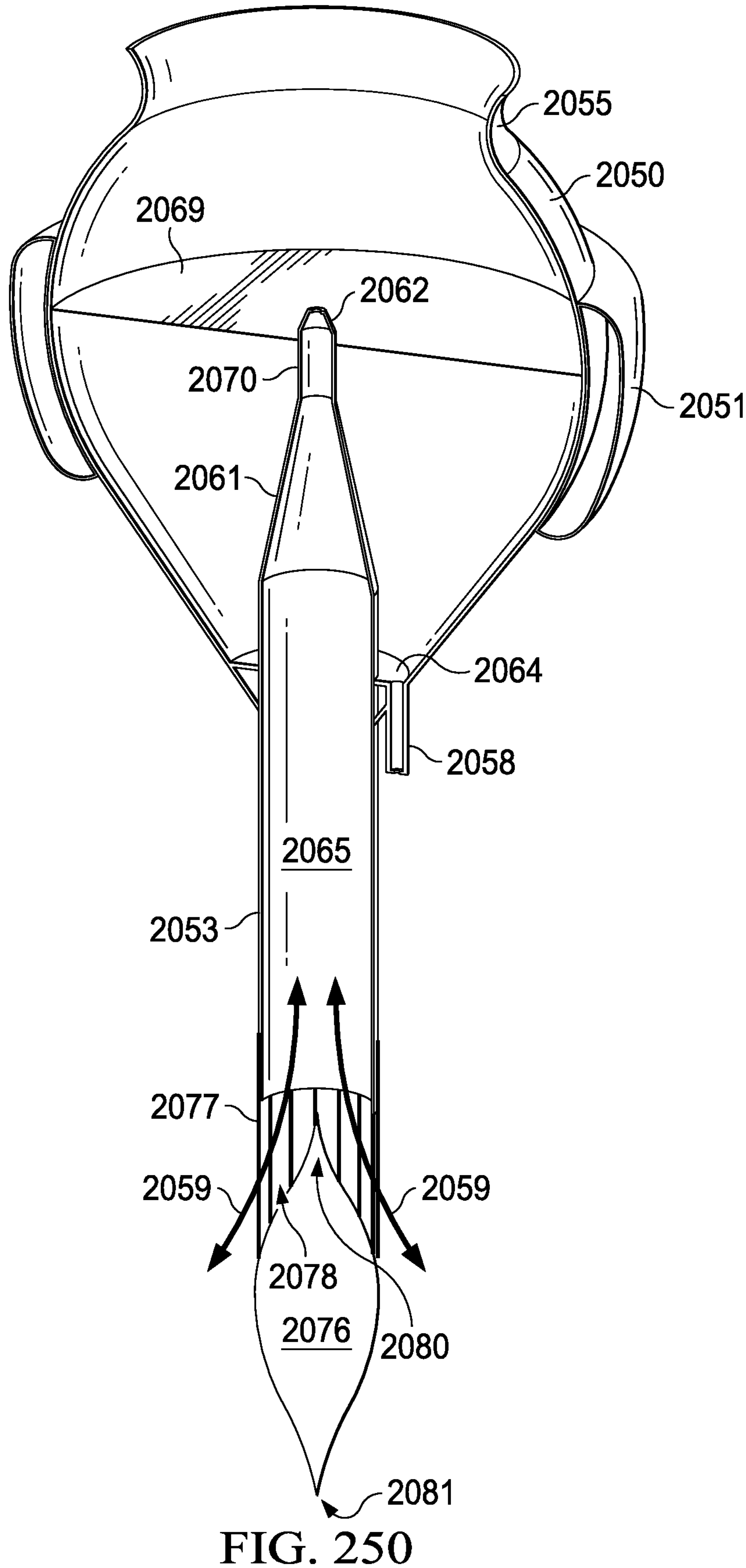
Figure 251:
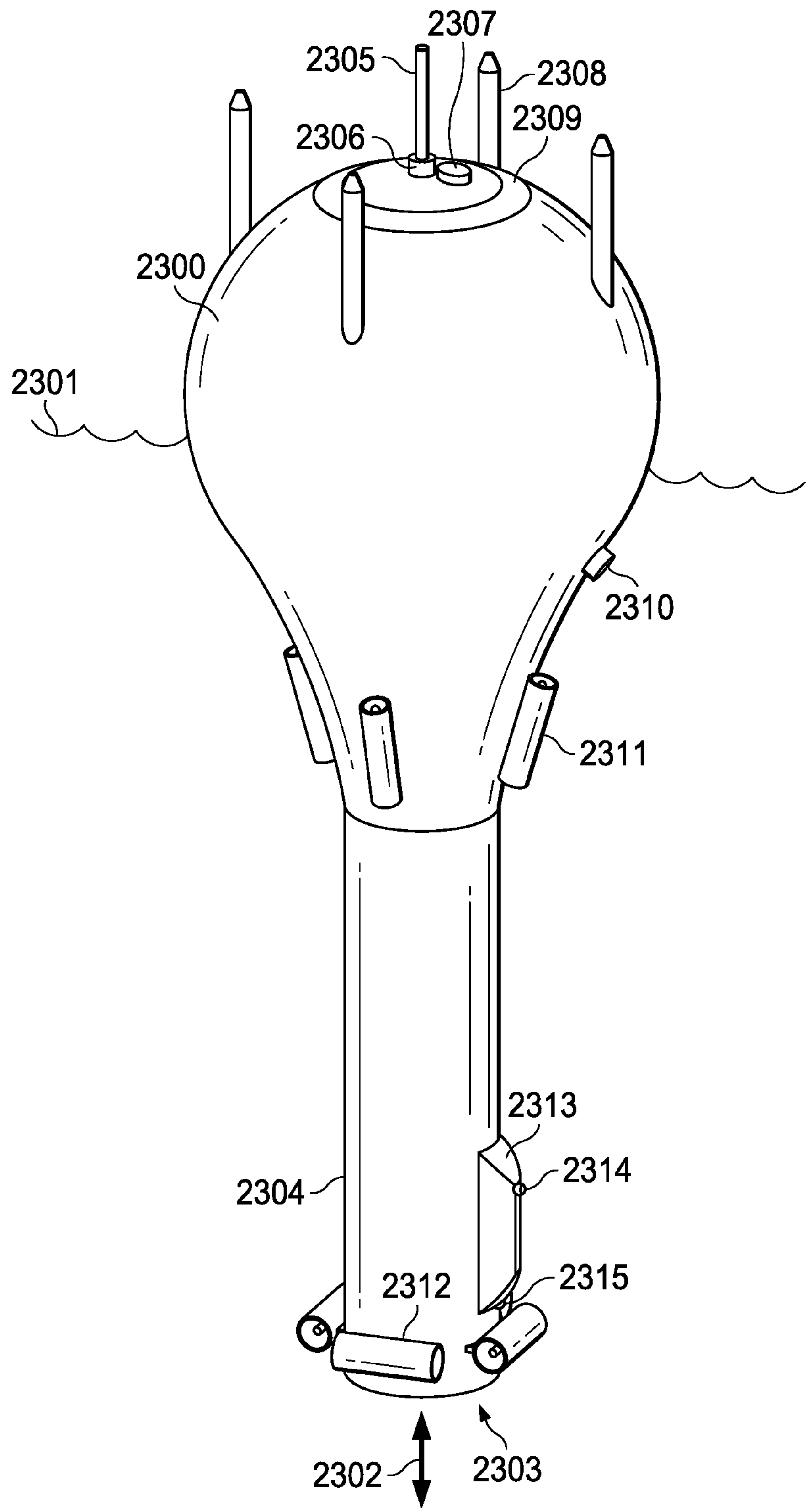
Figure 252:
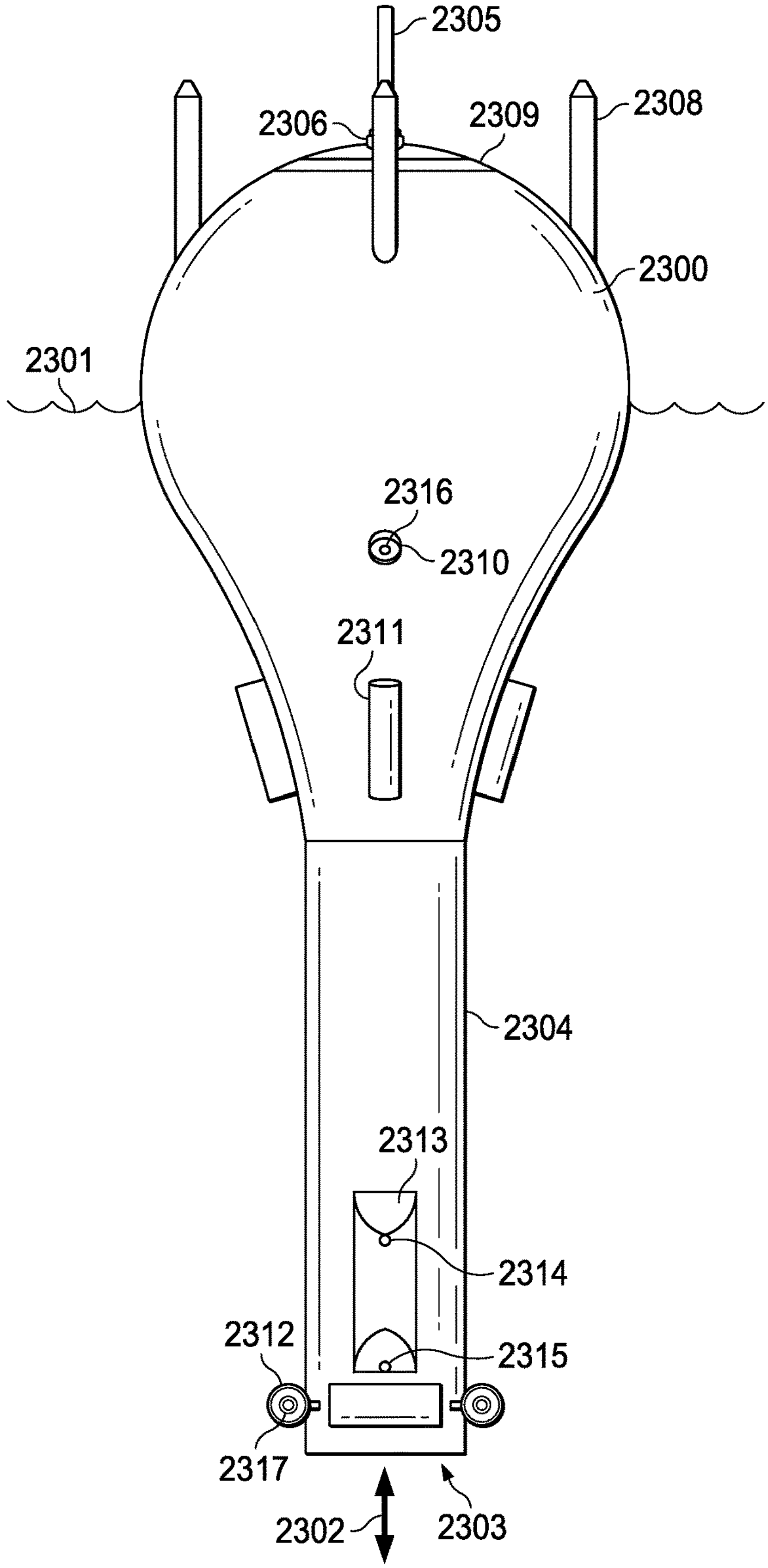
Figure 253:
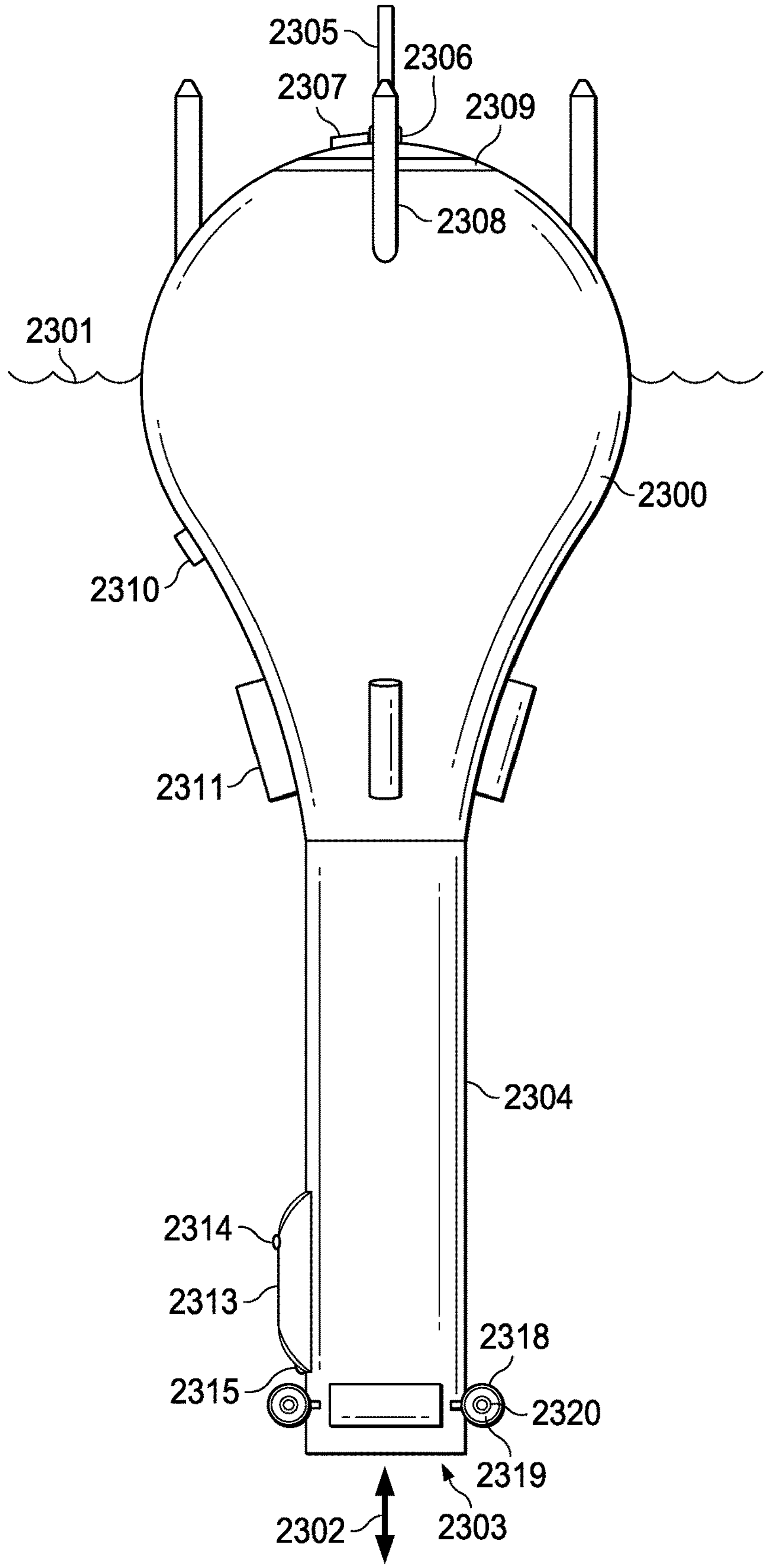
Figure 254:
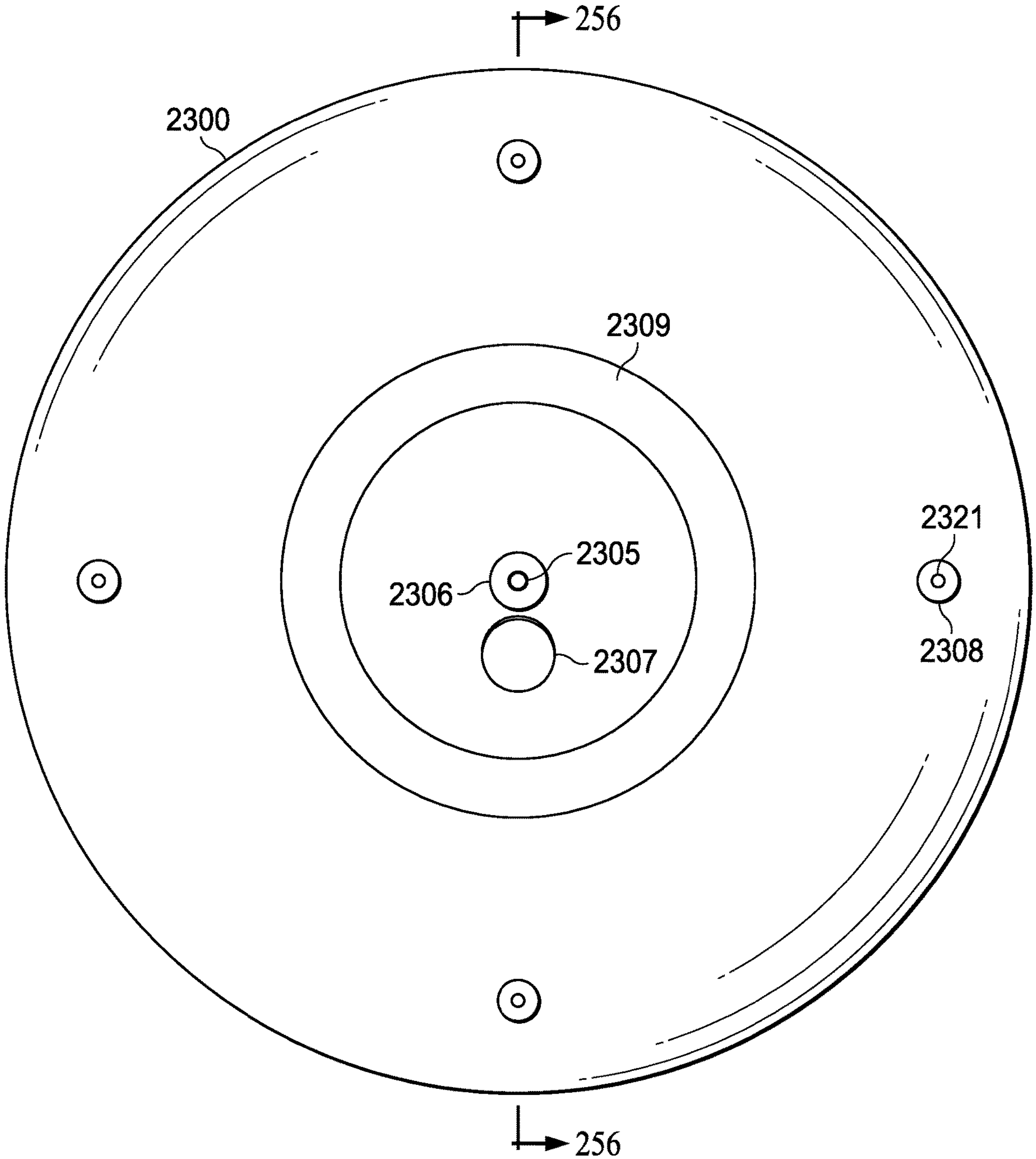
Figure 255:
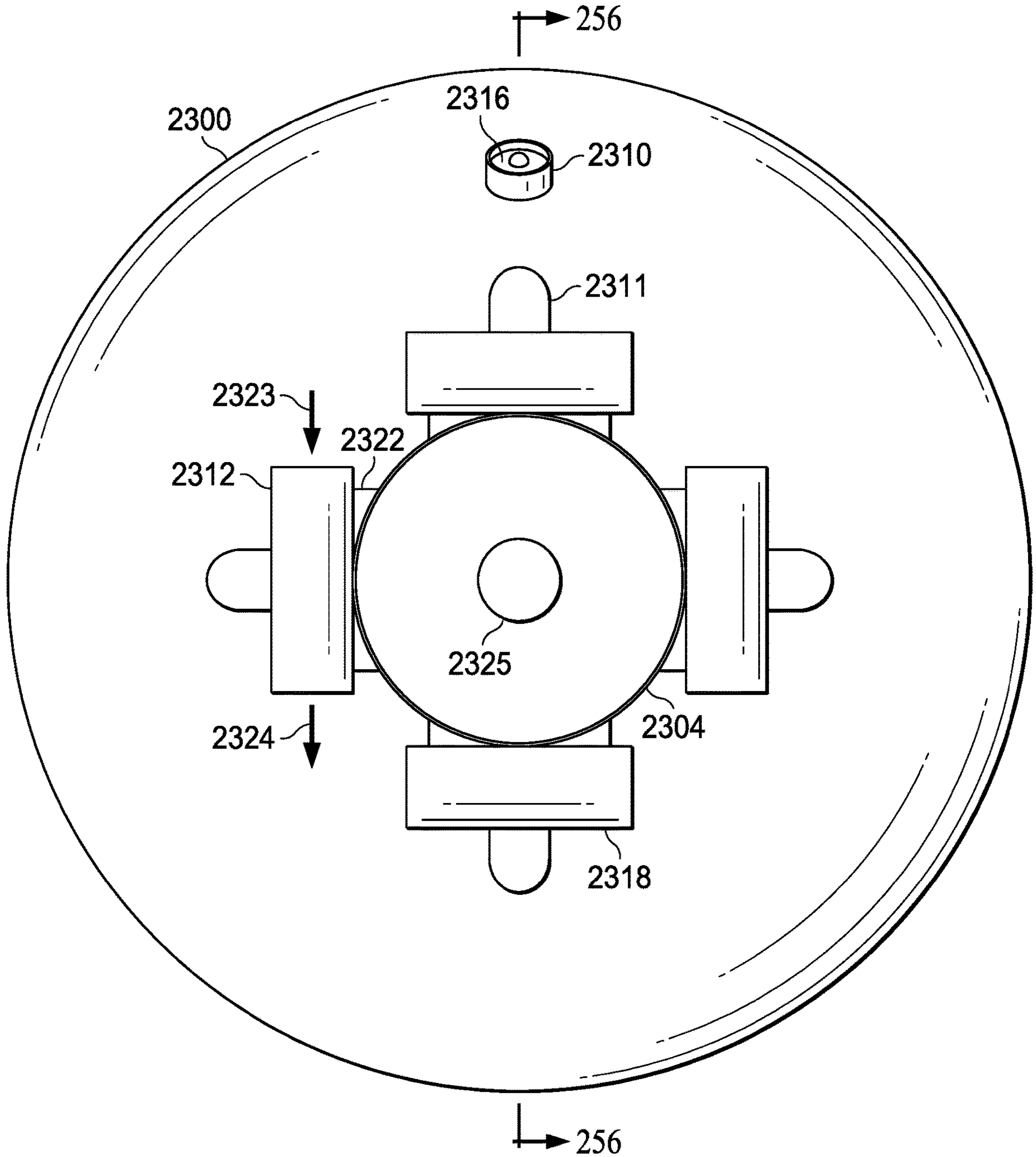
Figure 256:
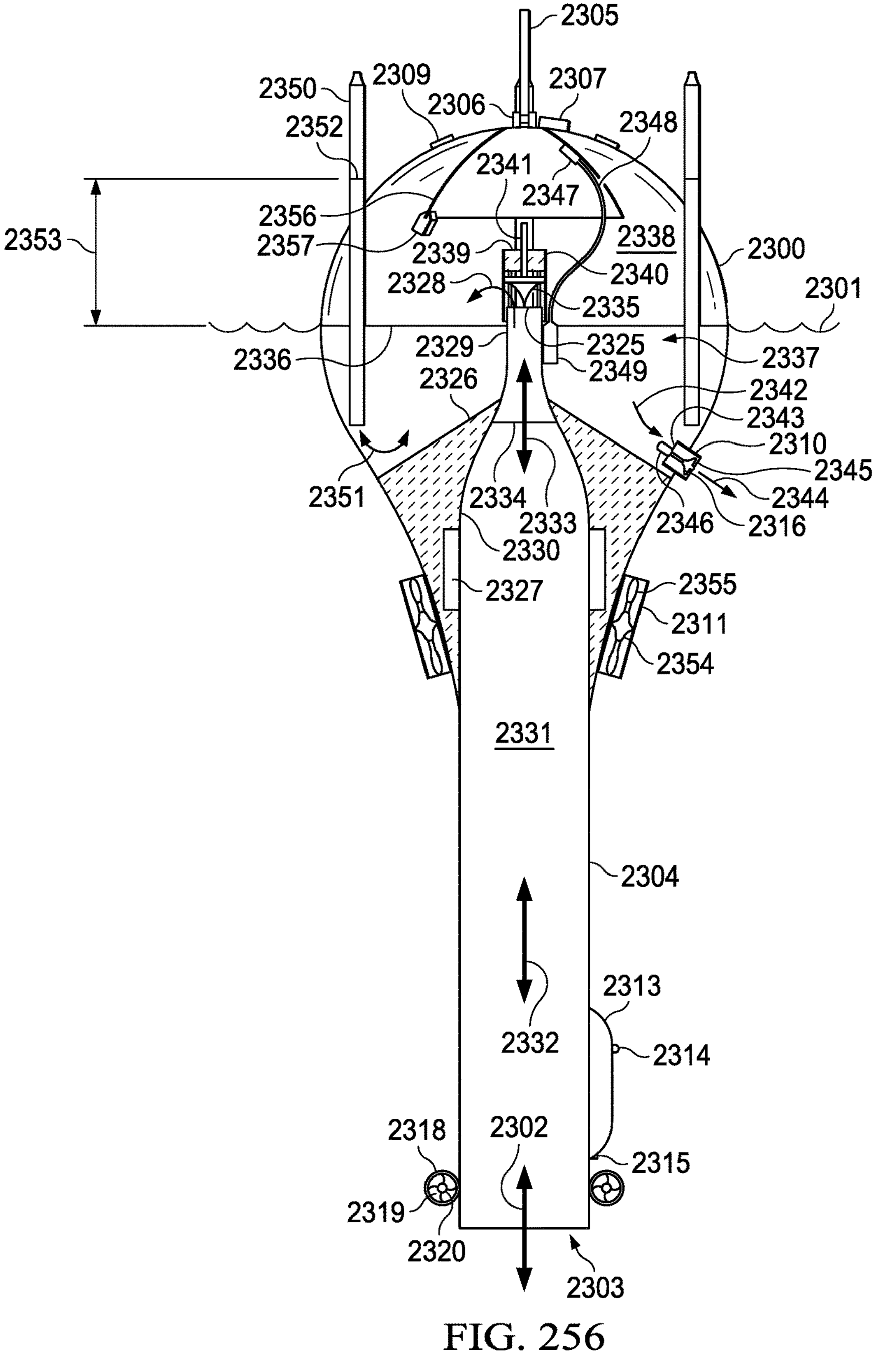
Figure 257:
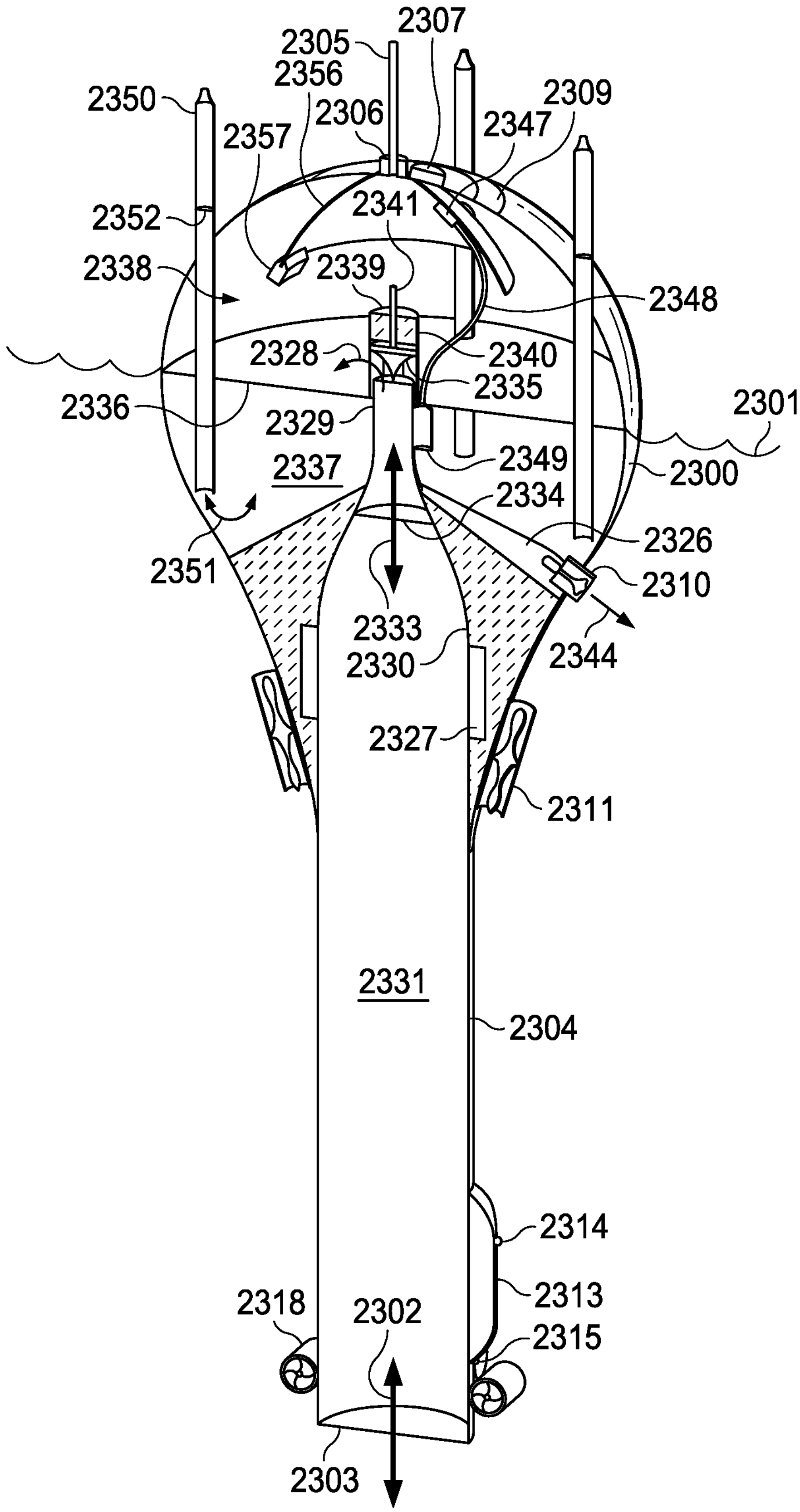
Figure 258:
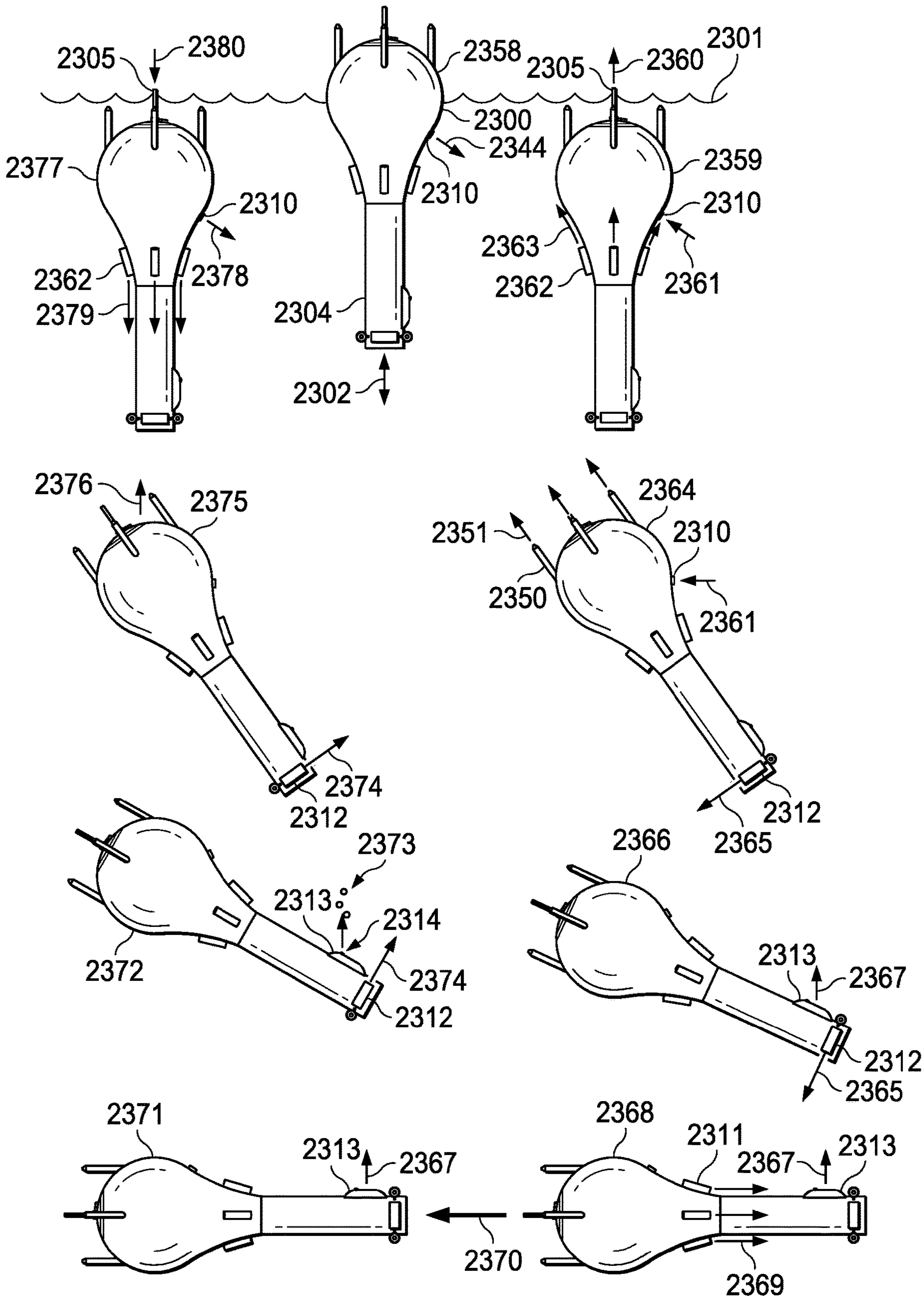
Figure 259:
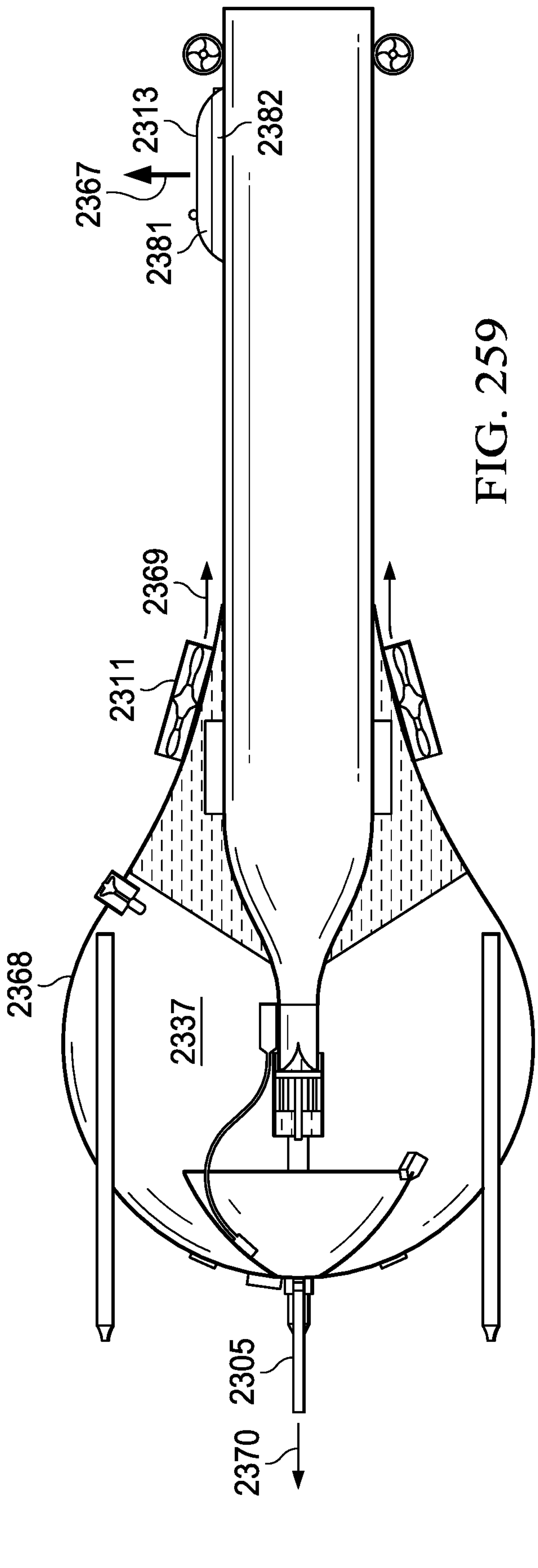
Figure 260:
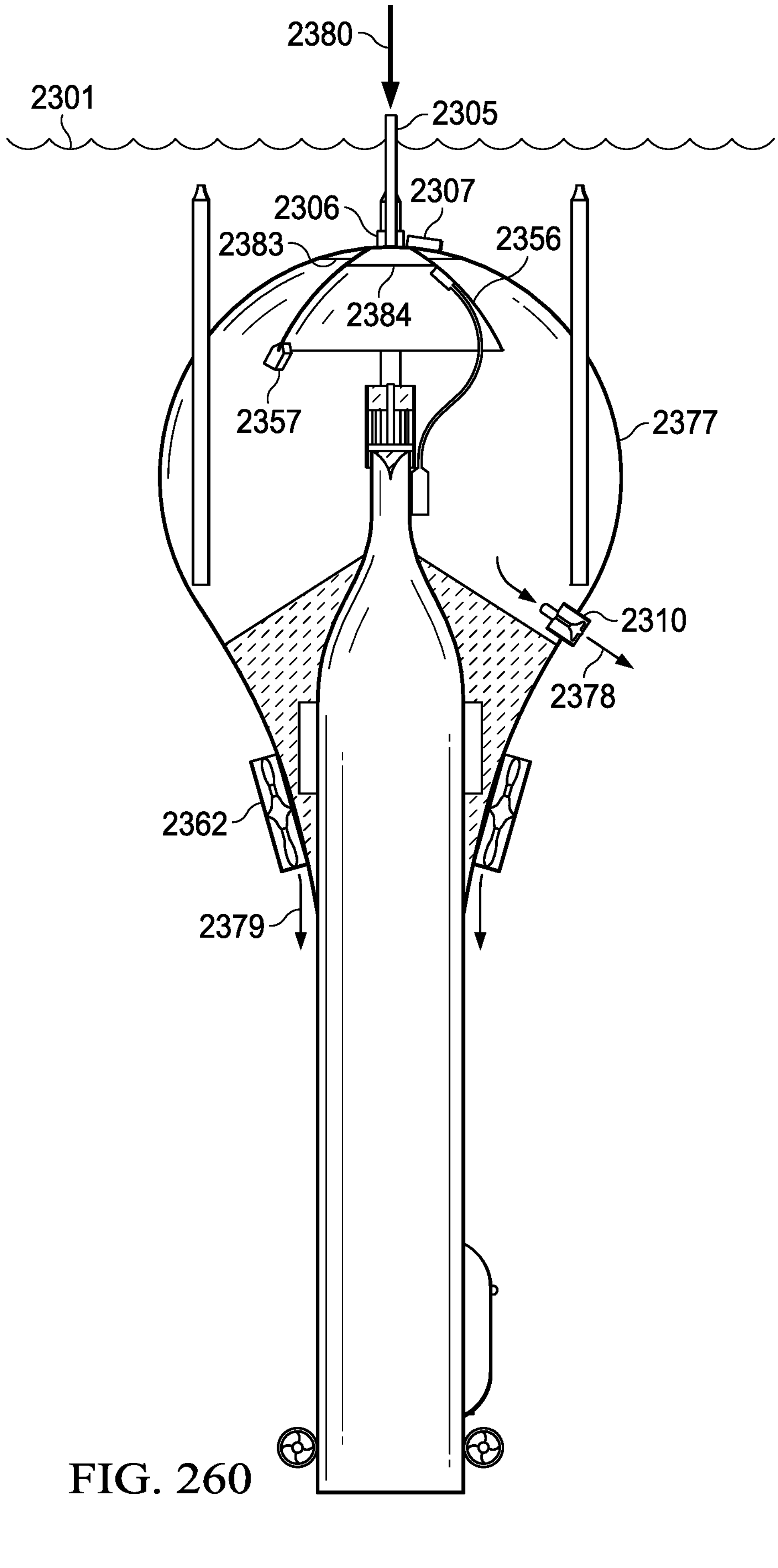
Figure 261:
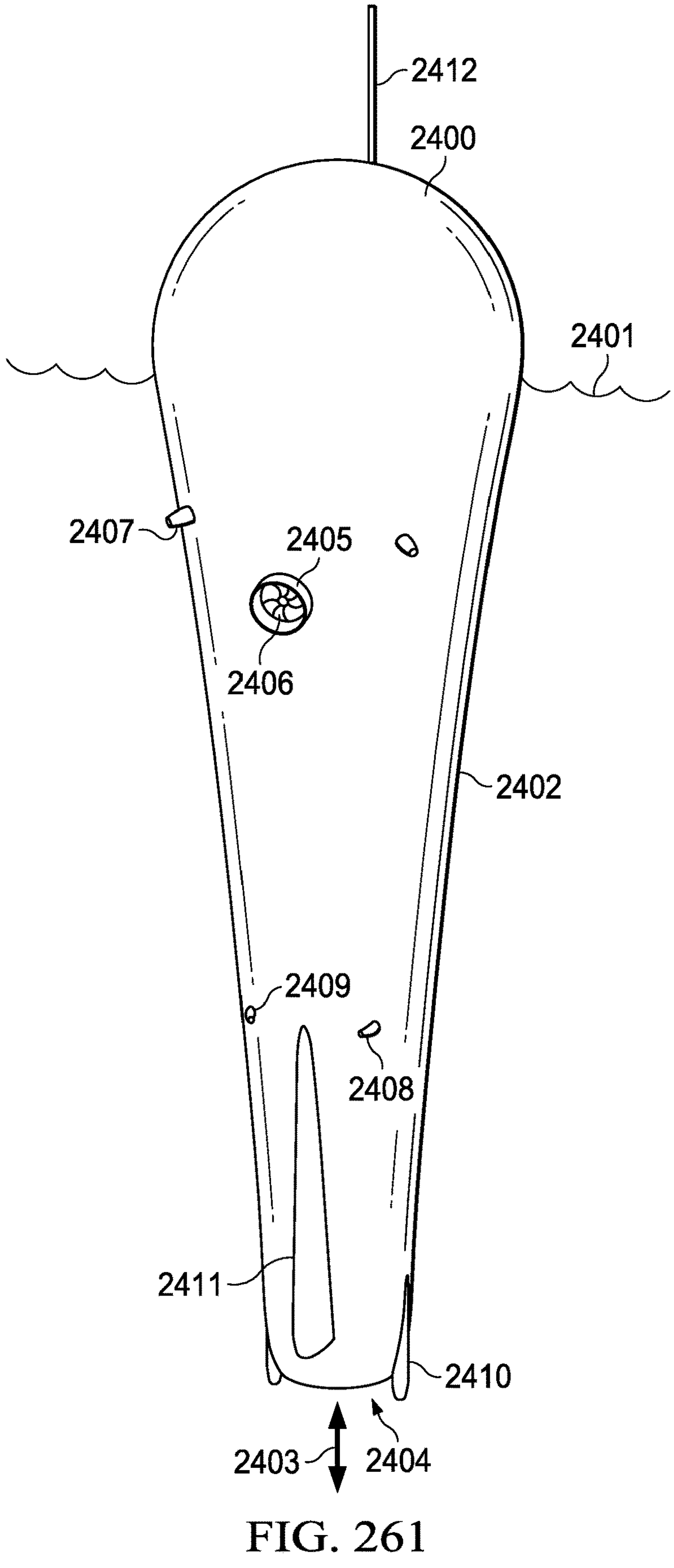
Figure 262:
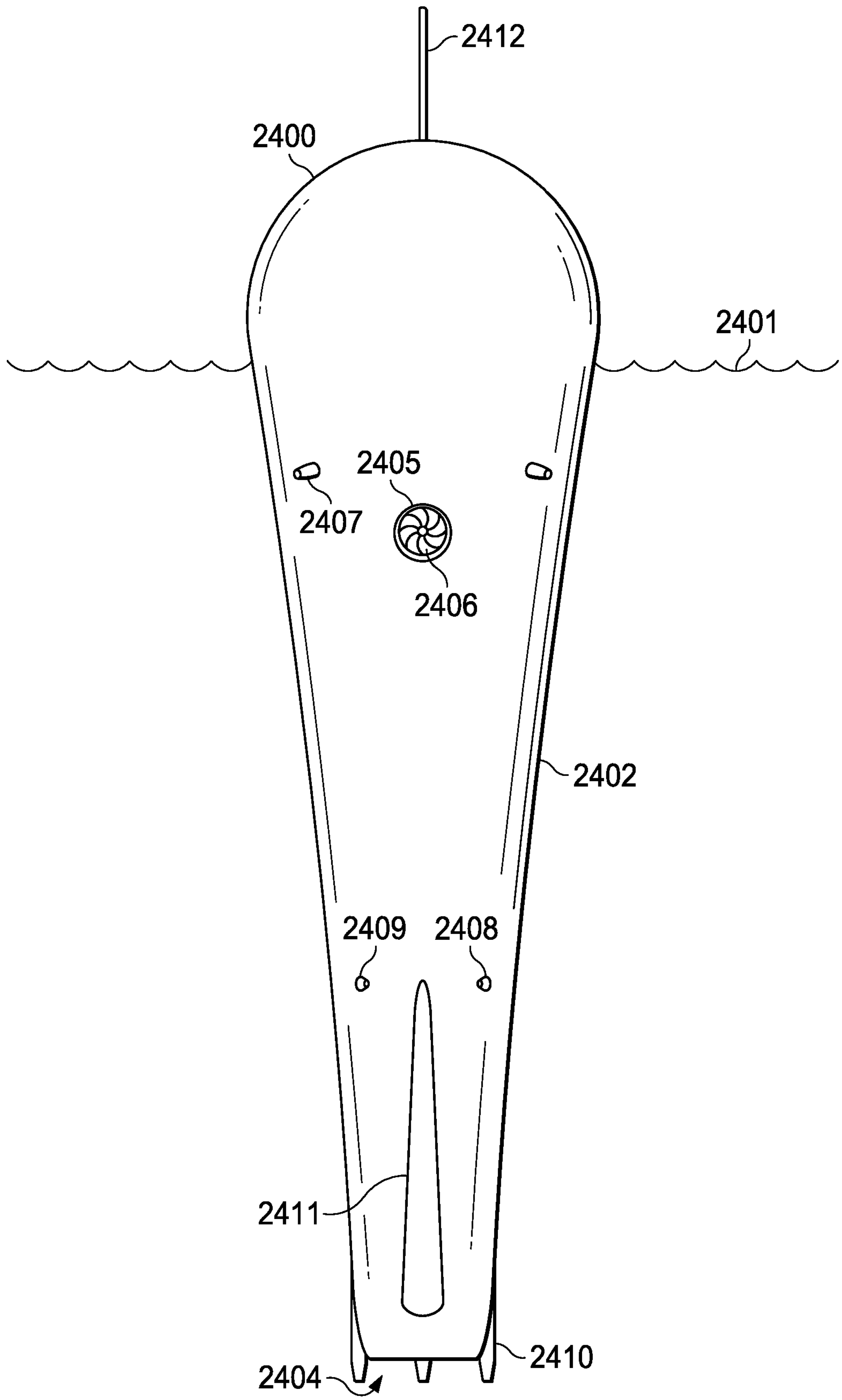
Figure 263:
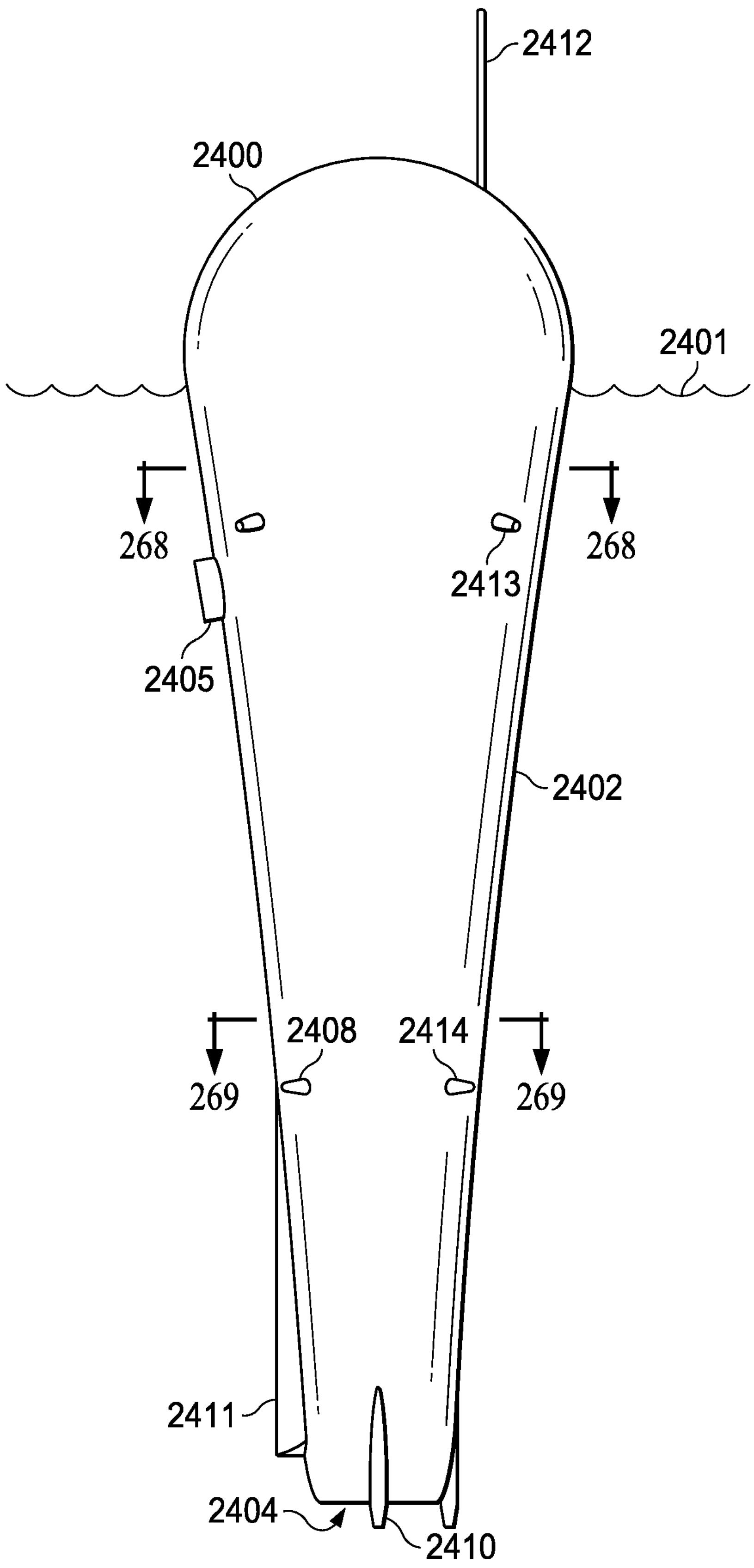
Figure 264:
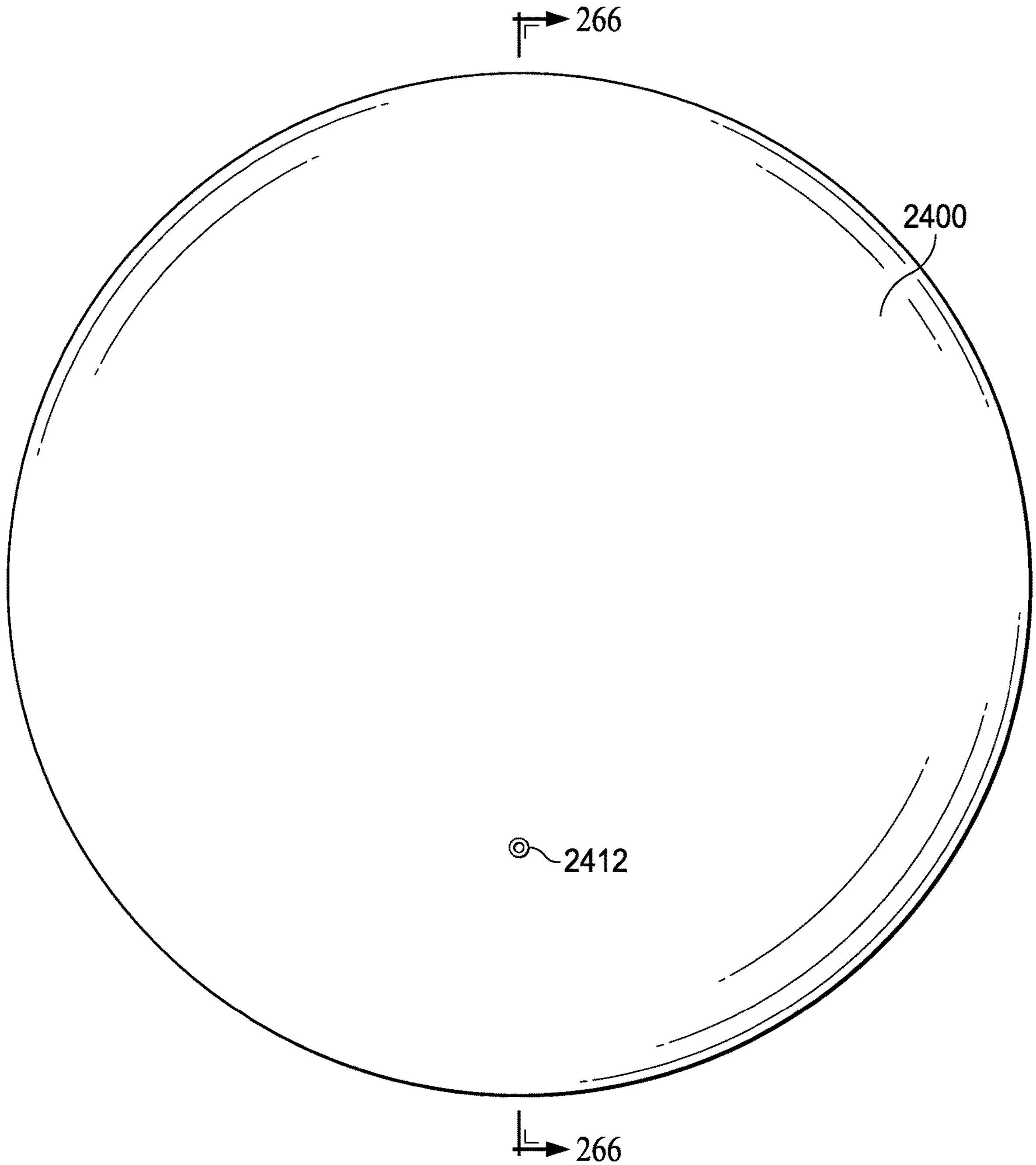
Figure 265:
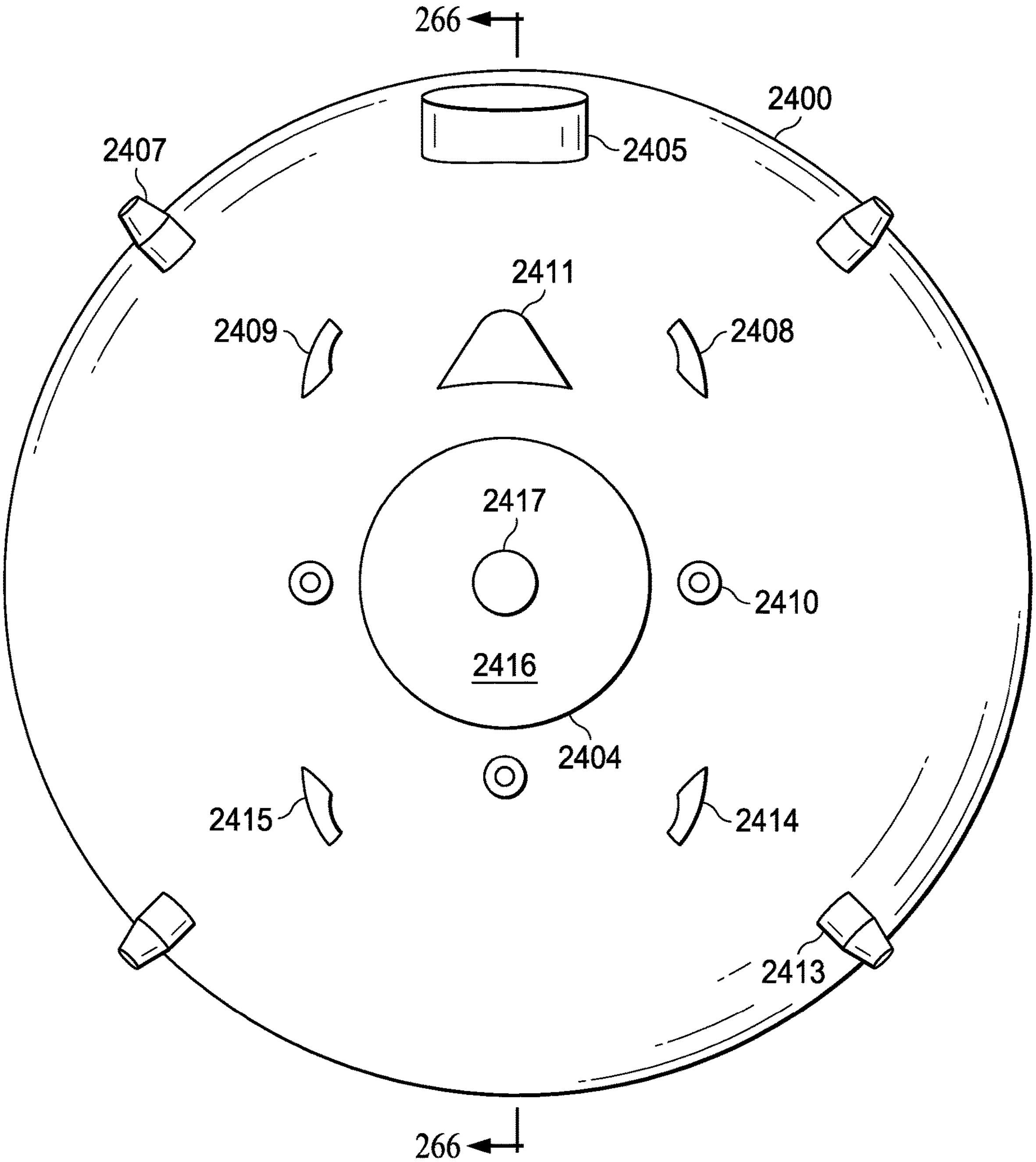
Figure 266:
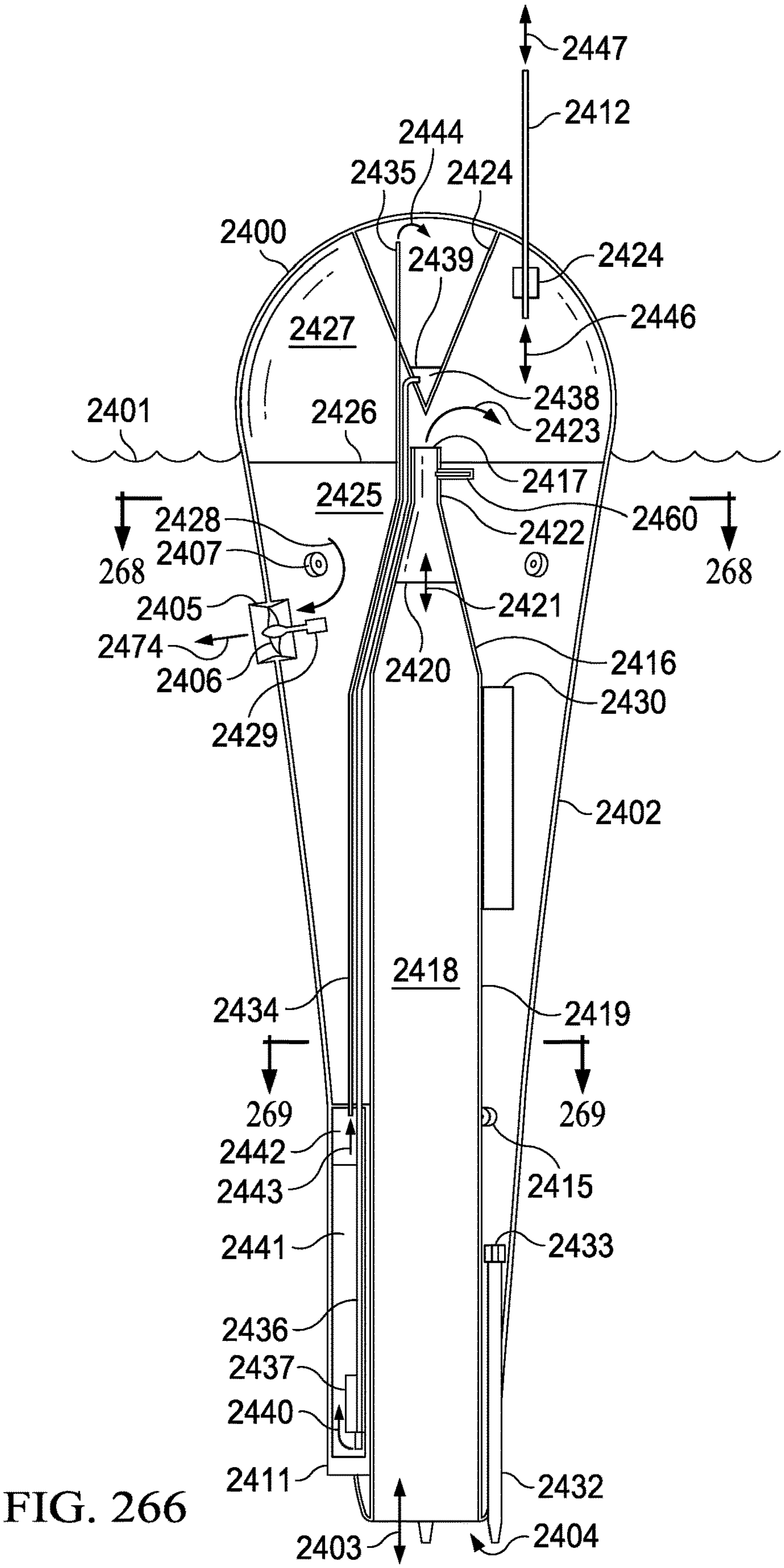
Figure 267:
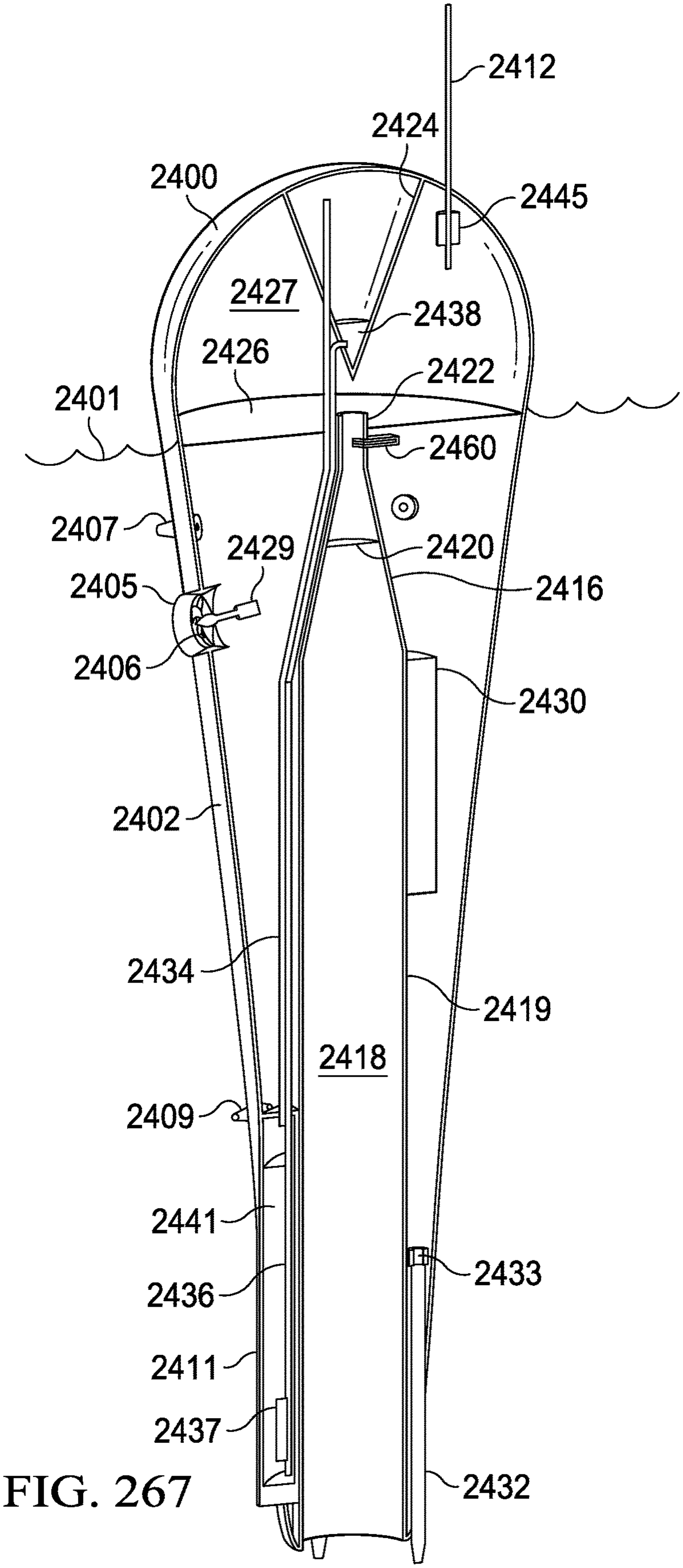
Figure 268:
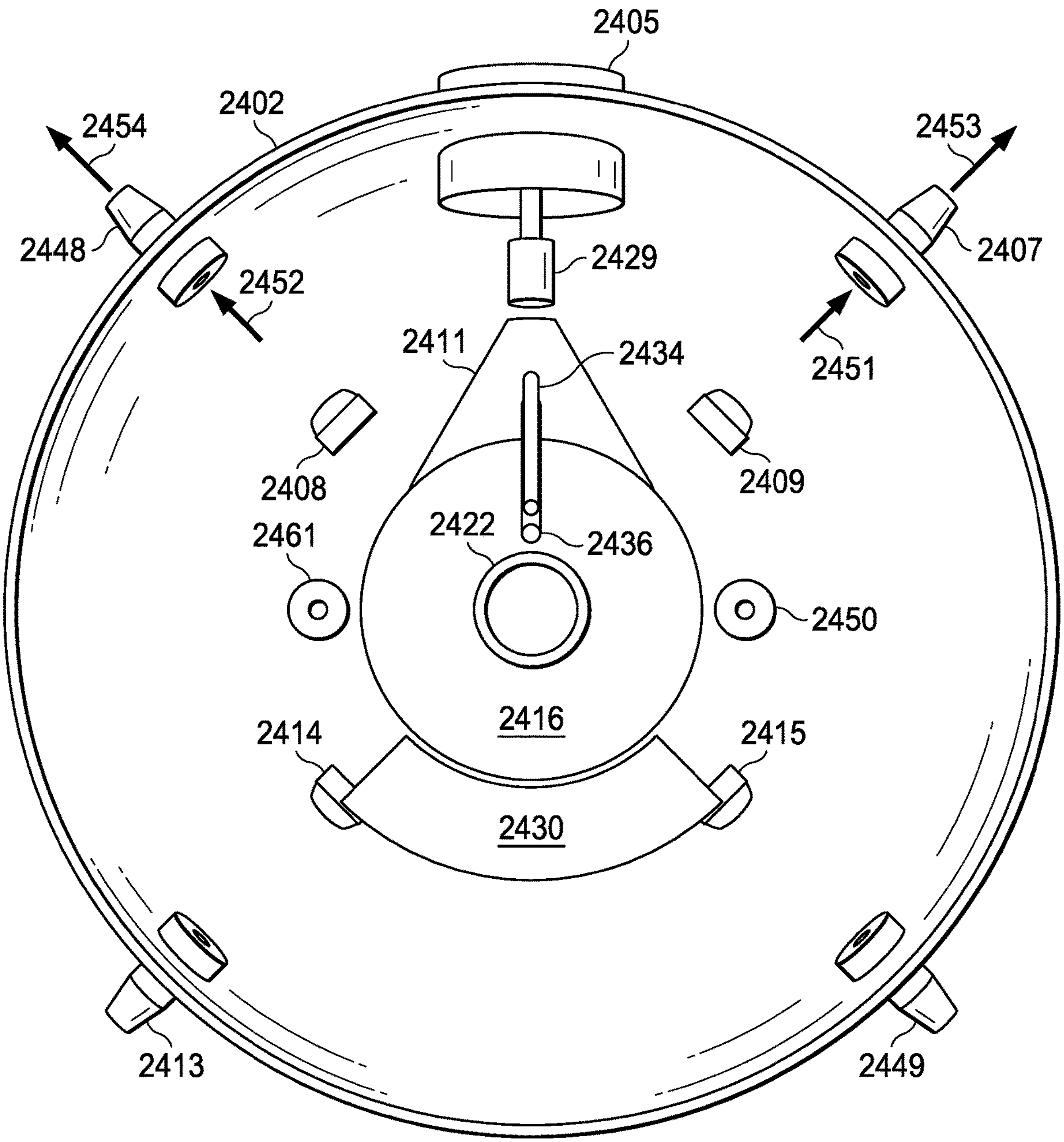
Figure 269:
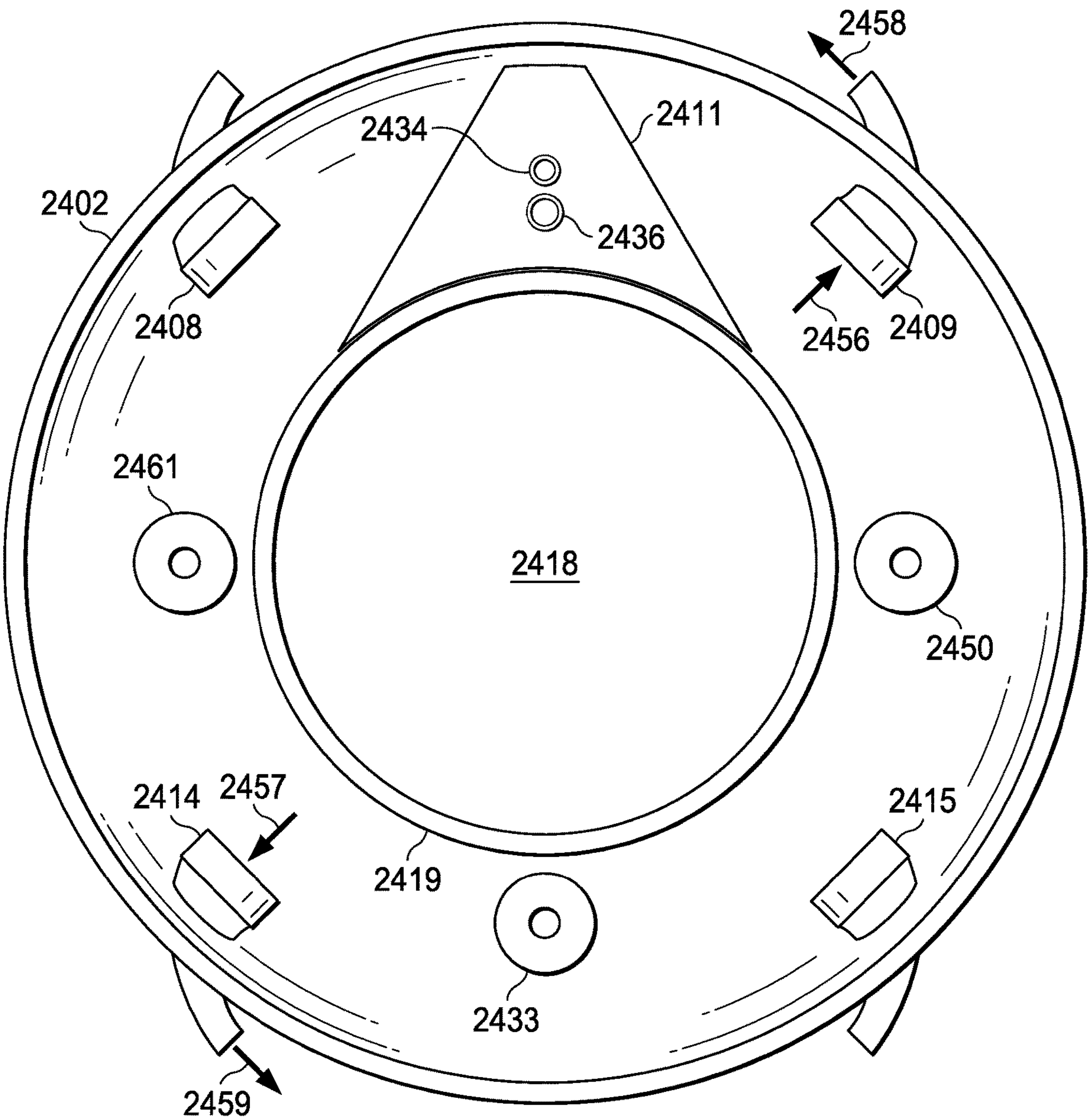
Figure 270:
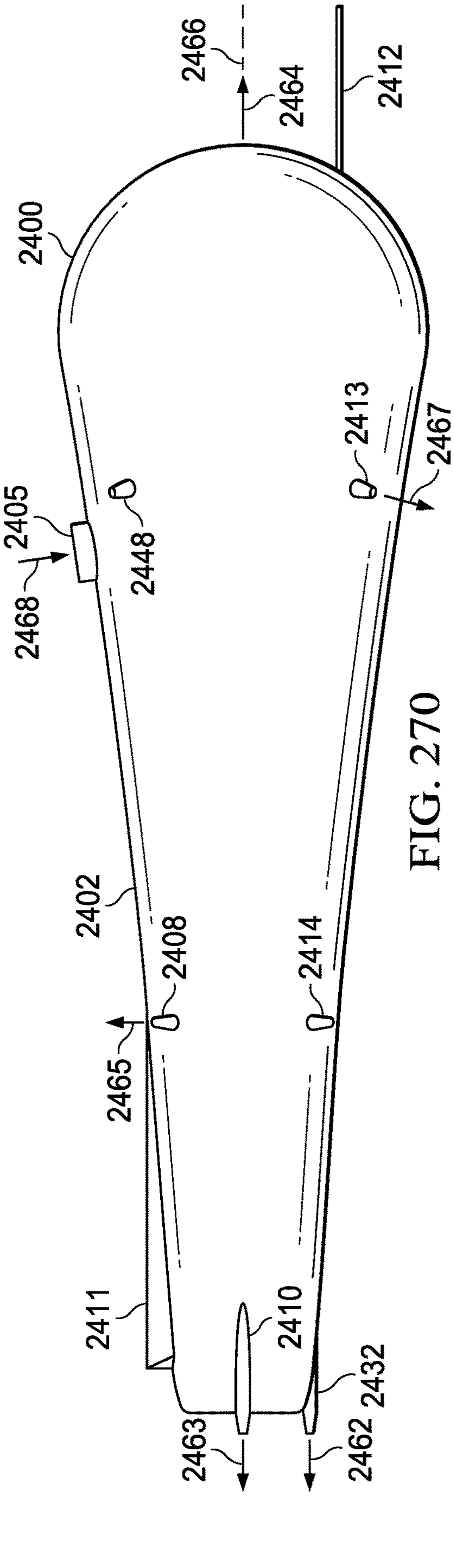

FIG. 151 is a close-up perspective view of the sectional view of the embodiment illustrated in FIG. 150;

FIGS. 152-154 show an inertial water tube of a frustoconical type, in elevated perspective view (FIG. 152), side sectional view (FIG. 153), and side perspective sectional view (FIG. 154):

FIGS. 155-157 show an inertial water tube of a frustoconical type, in elevated perspective view (FIG. 155), side sectional view (FIG. 156), and side perspective sectional view (FIG. 157):

FIGS. 158-160 show an inertial water tube of a bell-shaped type, in elevated perspective view (FIG. 158), side sectional view (FIG. 159), and side perspective sectional view (FIG. 160);

FIGS. 161-163 show an inertial water tube of an hourglass-shaped type, in elevated perspective view (FIG. 161), side sectional view (FIG. 162), and side perspective sectional view (FIG. 163);

FIGS. 164-166 show an inertial water tube of a conical partial plug type, in elevated perspective view (FIG. 164), side sectional view (FIG. 165), and side perspective sectional view (FIG. 166):

FIGS. 167-170 show an inertial water tube of a partial plug type, in elevated perspective view (FIG. 167), side sectional view (FIG. 168), side perspective sectional view (FIG. 169), and bottom-up view (FIG. 170);

FIGS. 171-173 show an inertial water tube of a conical partial plug type, in elevated perspective view (FIG. 171), side sectional view (FIG. 172), and side perspective sectional view (FIG. 173);

FIGS. 174-176 show an inertial water tube of a conical partial plug type, in elevated perspective view (FIG. 174), side sectional view (FIG. 175), and side perspective sectional view (FIG. 176);

FIGS. 177-180 show an inertial water tube of a multi-squirter plug type, in elevated perspective view (FIG. 177), side sectional view (FIG. 178), side perspective sectional view (FIG. 179);

FIGS. 181-183 show a different embodiment of the approximately cylindrical squirter plug illustrated in FIGS. 177-180, in elevated perspective view (FIG. 181);

FIGS. 184-186 show an inertial water tube of a rectilinear type, in elevated perspective view (FIG. 184), side sectional view (FIG. 185), and side perspective sectional view (FIG. 186):

FIGS. 187-189 show an inertial water tube of an orifice plate type, in elevated perspective view (FIG. 187), side sectional view (FIG. 188), and side perspective sectional view (FIG. 189);

FIGS. 190-192 show an inertial water tube of a single-squirter plug type, in elevated perspective view (FIG. 190), side sectional view (FIG. 191), and side perspective sectional view (FIG. 192);

FIGS. 193-195 show an inertial water tube of frustoconical type with a curved water diverter 1534, in elevated perspective view (FIG. 193), side sectional view (FIG. 194), and side perspective sectional view (FIG. 195);

FIGS. 196-198 show an inertial water tube of plug type, in elevated perspective view (FIG. 196), side sectional view (FIG. 197), and side perspective sectional view (FIG. 198);

FIGS. 199-204 show an inertial water tube of swivel type, in four different side views (FIGS. 199-202), bottom-up view (FIG. 203), and top-down view (FIG. 204):

FIG. 205 is a side perspective view of another embodiment of the present invention;

FIG. 206 is a front-side view of the embodiment of FIG. 205:

FIG. 207 is a side view of the embodiment of FIGS. 205 and 206;

FIG. 208 is a back-side view of the embodiment of FIGS. 205-207:

FIG. 209 is a top-down view of the embodiment of FIGS. 205-208;

FIG. 210 is a bottom-up view of the embodiment of FIGS. 205-209:

FIG. 211 is a side perspective view of the embodiment of FIGS. 205-210;

FIG. 212 is a top-down cross-sectional view of the embodiment of FIGS. 205-211:

FIG. 213 is a top-down perspective view of the same cross-sectional view illustrated in FIG. 212;

FIG. 214 is a side cross-sectional view of the embodiment of FIGS. 205-213, where the section is taken along the section line 214-214 specified in FIG. 210:

FIG. 215 is a side perspective view of a modified version of the embodiment of FIGS. 205-213:

FIG. 216 is a side perspective view of a modified version of the embodiment of FIGS. 205-213;

FIG. 217 is a side perspective view of another embodiment of the present invention;

FIG. 218 is a side view of the embodiment of FIG. 217;

FIG. 219 is a side cross sectional view of the embodiment of FIGS. 217-218;

FIG. 220 is a side perspective view of another embodiment of the present invention;

FIG. 221 is a side view of the embodiment of FIG. 220;

FIG. 222 is a side cross-sectional view of the embodiment of FIGS. 220-221:

FIG. 223 is a side perspective view of another embodiment of the present invention;

FIG. 224 is a side cross-sectional view of the embodiment of FIG. 223;

FIG. 225 is a right-side view of a modified version of the embodiment of FIGS. 205-213;

FIG. 226 is a back-side view of the embodiment of FIG. 225;

FIG. 227 is a horizontal cross-sectional view of the embodiment of FIGS. 225 and 226;

FIG. 228 is a right-side view of a modified version of the embodiment of FIGS. 205-213;

FIG. 229 is a side perspective view of another embodiment of the present invention;

FIG. 230 is a side view of the embodiment of FIG. 229;

FIG. 231 is a side view of the embodiment of FIGS. 229-230;

FIG. 232 is a vertical cross sectional view of the embodiment of FIGS. 229-231:

FIG. 233 is a perspective view of the same cross-sectional view illustrated in FIG. 232;

FIG. 234 is an enlarged, cut-away view of a water turbine, etc. of the present invention;

FIG. 235 is a perspective view of the embodiment of FIG. 234;

FIG. 236 is an enlarged, cut-away view of a modified version of the water turbine of FIG. 234;

FIG. 237 is a perspective view of the water turbine of FIG. 236;

FIG. 238 is an enlarged, cut-away view of the water turbine of FIG. 236;

FIG. 239 is a side perspective view of another embodiment of the present invention:

FIG. 240 is a side view of the embodiment of FIG. 239;

FIG. 241 is a side view of the embodiment of FIG. 239:

FIG. 242 is a top down view of the embodiment of FIGS. 239-241;

FIG. 243 is a bottom up view of the embodiment of FIGS. 239-241:

FIG. 244 is a cross-sectional view of the embodiment of FIGS. 239-243:

FIG. 245 is a perspective view of the vertical cross sectional view of FIG. 244;

FIG. 246 is a side view of another embodiment of the present invention;

FIG. 247 is a side view of another embodiment of the present invention;

FIG. 248 is a side view of another embodiment of the present invention;

FIG. 249 is a perspective view of a modified configuration of the embodiment of FIGS. 239-245;

FIG. 250 is a perspective vertical cross-sectional view of the embodiment of FIG. 249;

FIG. 251 is a perspective side view of an autonomous underwater, ocean wave powered vehicle;

FIG. 252 is a side view of the embodiment of FIG. 251;

FIG. 253 is another side view of the embodiment of FIG. 251;

FIG. 254 is a top down view of the embodiment of FIG. 251;

FIG. 255 is a bottom up view of the embodiment of FIG. 251;

FIG. 256 is a side sectional view of the embodiment of FIG. 251;

FIG. 257 is a perspective view of the sectional view of FIG. 256;

FIG. 258 is a side view of the embodiment of FIG. 251:

FIG. 259 is another side view of the embodiment of FIG. 251:

FIG. 260 is a side sectional view of the embodiment of FIG. 251;

FIG. 261 is a perspective side view of another embodiment of the present invention;

FIG. 262 is a side view of the embodiment of FIG. 261;

FIG. 263 is another side view of the embodiment of FIG. 261;

FIG. 264 is a top down view of the embodiment of FIG. 261;

FIG. 265 is a bottom up view of the embodiment of FIG. 261;

FIG. 266 is a side sectional view of the embodiment of FIG. 261;

FIG. 267 is a perspective side sectional view of the embodiment of FIG. 261;

FIG. 268 is a top down sectional view of the embodiment of FIG. 261;

FIG. 269 is another top down sectional view of the embodiment of FIG. 261;

FIG. 270 is a side view of the embodiment of FIG. 261; and

Figure 271:
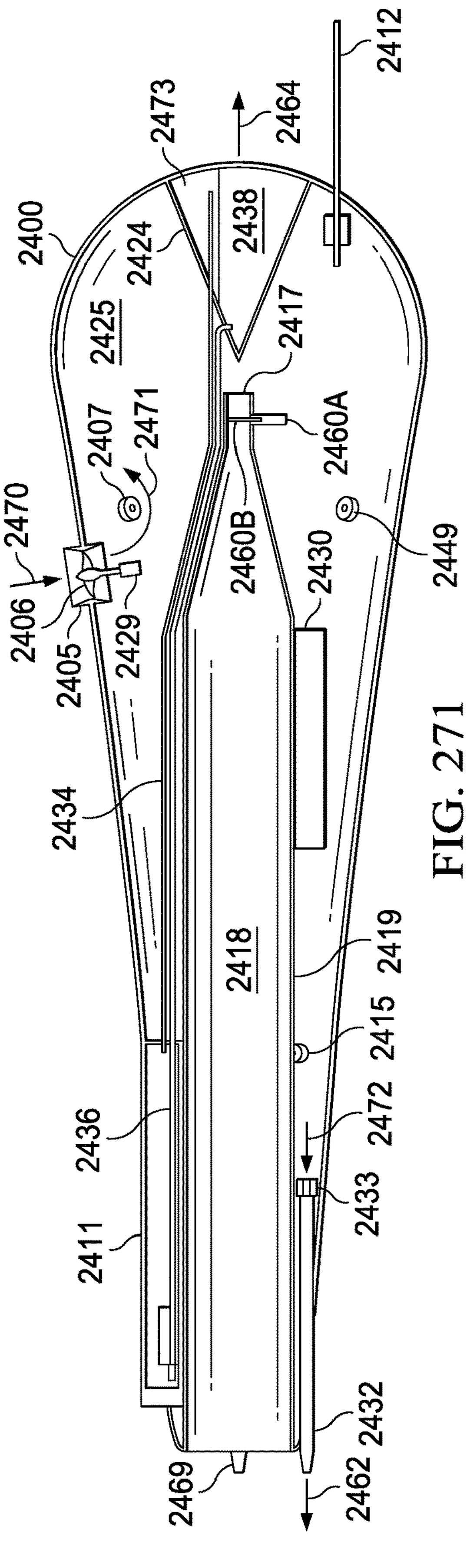

FIG. 271 is a side sectional view of the embodiment of FIG. 261.

DETAILED DESCRIPTION OF THE PREFERRED EMBODIMENTS

For a fuller understanding of the nature and objects of the invention, reference should be made to the preceding detailed description, taken in connection with the accompanying drawings. The following figures offer explanatory illustrations, which, like most, if not all, explanations and illustrations are potentially useful, but inherently incomplete. The following figures, and the illustrations offered therein, in no way constitute limitations, either explicit or implicit, on The present invention.

Figure 1:
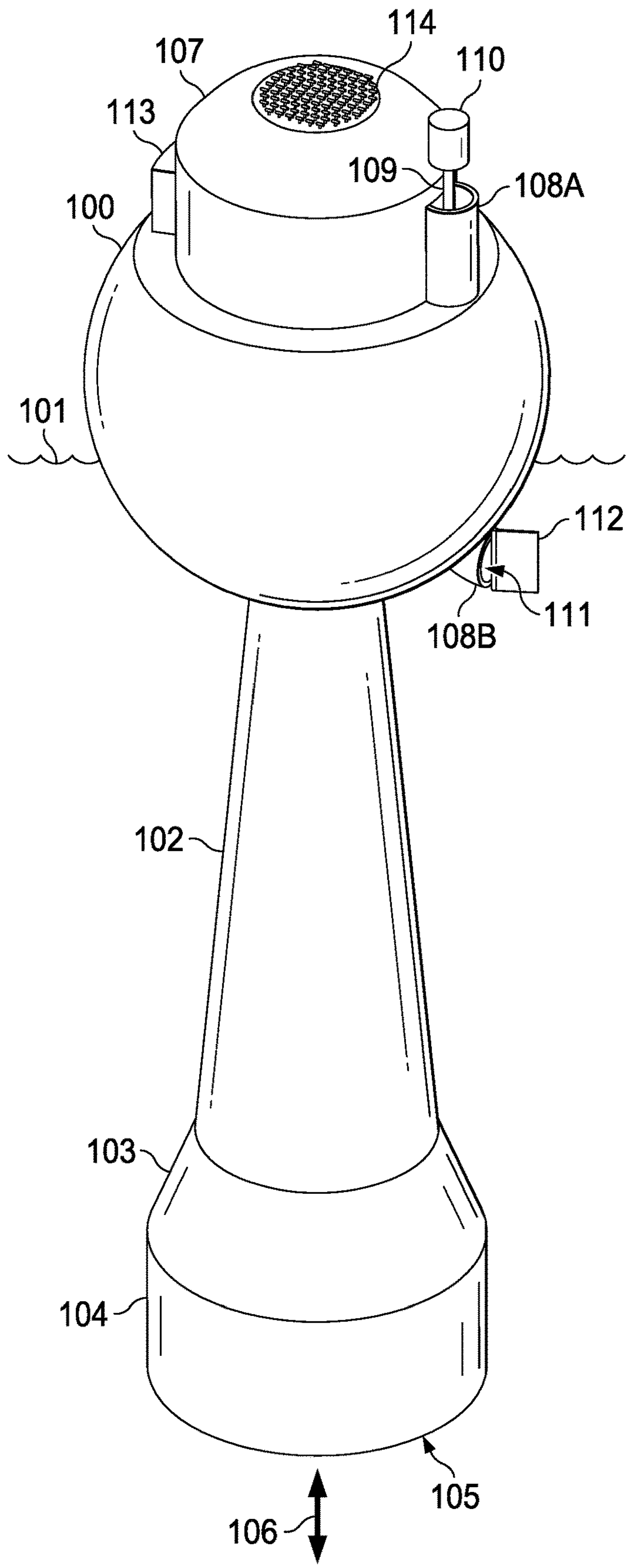
FIG. 1 is a side perspective view of another embodiment of the present invention.

FIG. 1 shows a side perspective view of an embodiment of the current disclosure.

The buoyant embodiment 100 floats adjacent to an upper surface 101 of a body of water over which waves tend to pass. The embodiment incorporates a tapered inertial water tube 102-104 characterized by approximately circular cross-sections with respect to sectional planes normal to a (nominally vertical) longitudinal axis of the tube, and/or normal to an axis of inner-tube fluid flow, i.e., characterized by approximately "flow-normal cross-sectional shapes and/or areas". An upper first portion 102 of the inertial water tube 102-104 has a frusto-conical shape (having circular flow-normal cross-sectional areas that increase in diameter with respect to increasing depths within the body of water 101 on which the embodiment floats). A second portion 103 of the inertial water tube 102-104 has a frusto-conical shape of a greater included angle. And, a bottom-most third portion 104 of the inertial water tube 102-104 is approximately cylindrical (having circular flow-normal cross-sectional areas that are approximately constant with respect to increasing depths within the body of water 101 on which the embodiment floats). Inertial water tube segment and/or portion 104 has a mouth 105 (which can also be referred to as an ingress orifice or water ingress/egress mouth) at its lower end that is open to the body of water 101 and allows water from the body of water to flow 106 in and out of the tube.

As the embodiment 100 moves up and down in response to passing waves, water within the inertial water tube 102-104 will occasionally move up and out of the upper mouth (not visible) inside the embodiment of the inertial water tube, thereby depositing water within an enclosed water reservoir 107. Water from that reservoir 107 drains through an effluent pipe 108 or channel in which is positioned a water turbine (not visible) within effluent pipe 108. As water flows from the reservoir 107 through effluent pipe 108 and back to the body of water 101, the flowing water causes the water turbine within the effluent pipe to rotate. And, rotations of the water turbine and an attached turbine shaft 109, causes to rotate the rotor (or other relevant rotating or moving element) of a generator 110 thereby generating electrical power.

As water exits an effluent pipe discharge mouth 111 (also referred to as an external effluent port) of a lower portion of effluent pipe 108B, it engages and/or is diverted by a rudder 112, which, when oriented with its broad surfaces at an angle to the effluent exiting effluent pipe discharge mouth 111, causes the embodiment 100 to rotate about its nominally vertical longitudinal axis, thereby allowing the embodiment's control system (not shown) to steer the embodiment by altering, changing, and/or adjusting the position of the rudder 112.

A portion of the electrical power generated by the generator 110 is used to energize a plurality of computing devices positioned within a computer chamber 113, enclosure, module, or compartment. One wall of computer chamber 113 is adjacent to water reservoir 107 and the water therein, thereby facilitating the absorption by the water within the water reservoir of a portion of the heat generated by the computers inside computer chamber 113.

A computer within computer chamber 113 exchanges data with a computer not directly connected to embodiment 100 via encoded electromagnetic transmissions generated and received by a phased array antenna 114 attached to a top surface of the water reservoir 107.

Figure 2:
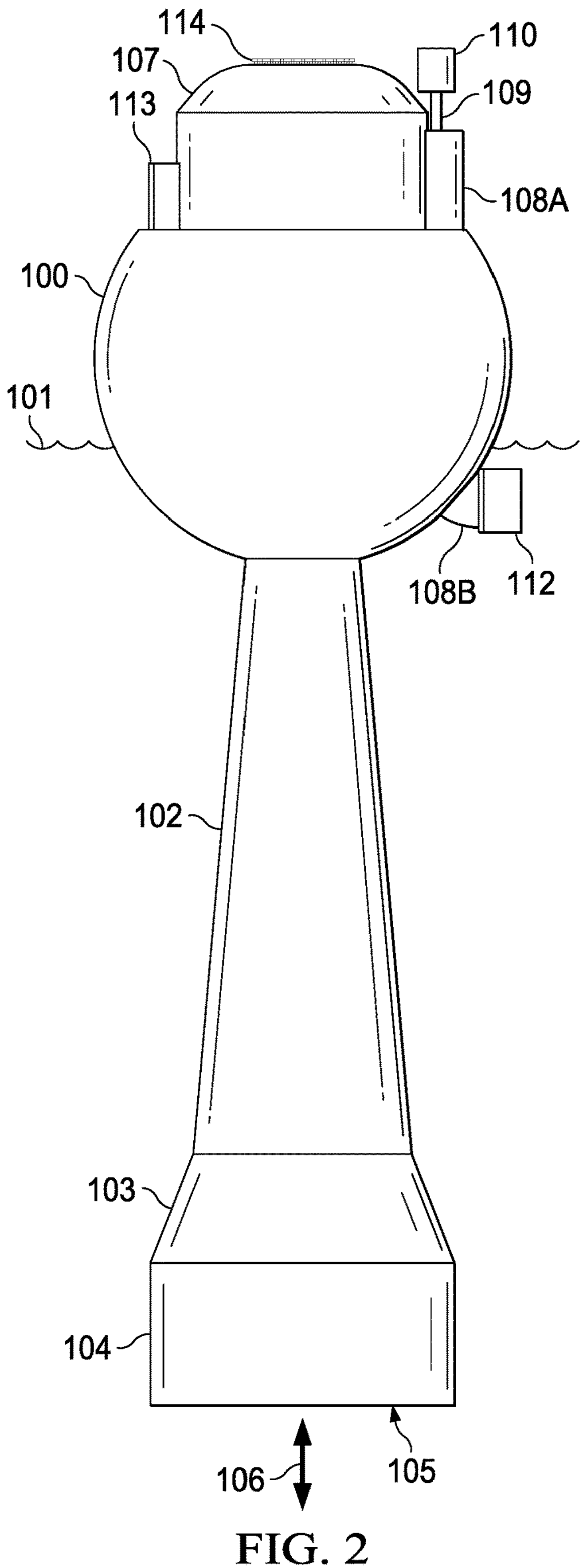
FIG. 2 is a side view of the embodiment of FIG. 1.

FIG. 2 shows a side view of the same embodiment of the current disclosure that is illustrated in FIG. 1.

Figure 3:
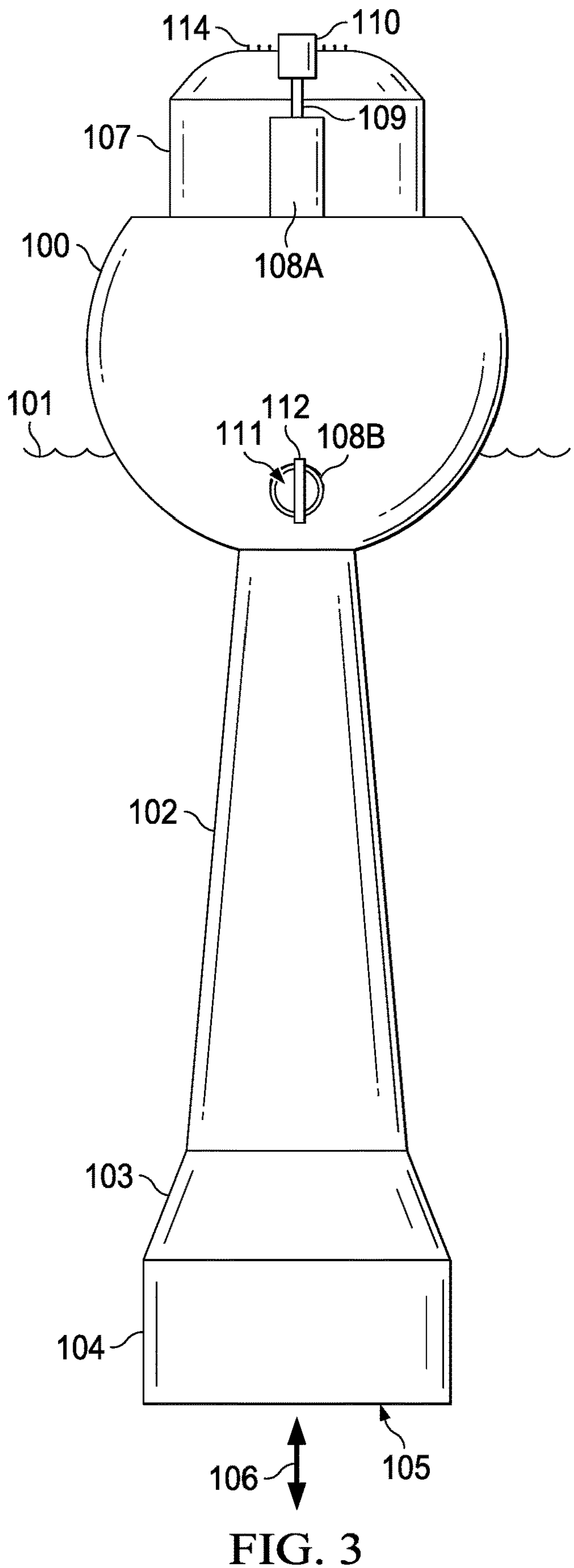
FIG. 3 is a back-side view of the embodiment of FIGS. 1 and 2.

FIG. 3 shows a back-side view of the same embodiment of the current disclosure that is illustrated in FIGS. 1 and 2.

Figure 4:
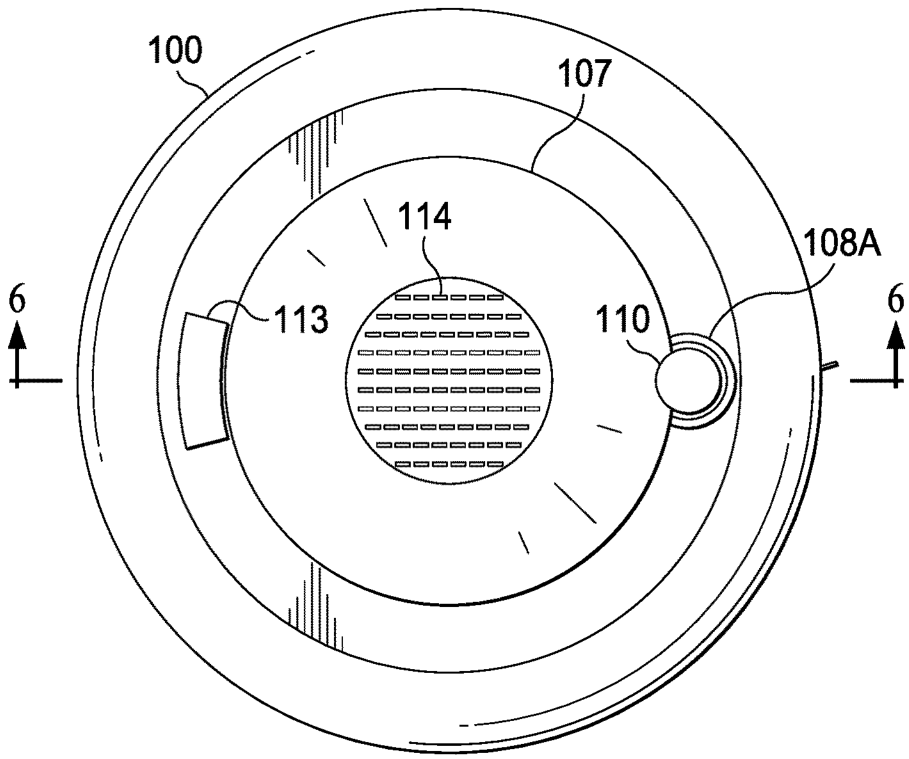
FIG. 4 is a top-down view of the embodiment of FIGS. 1-3.

FIG. 4 shows a top-down view of the same embodiment of the current disclosure that is illustrated in FIGS. 1-3.

Figure 5:
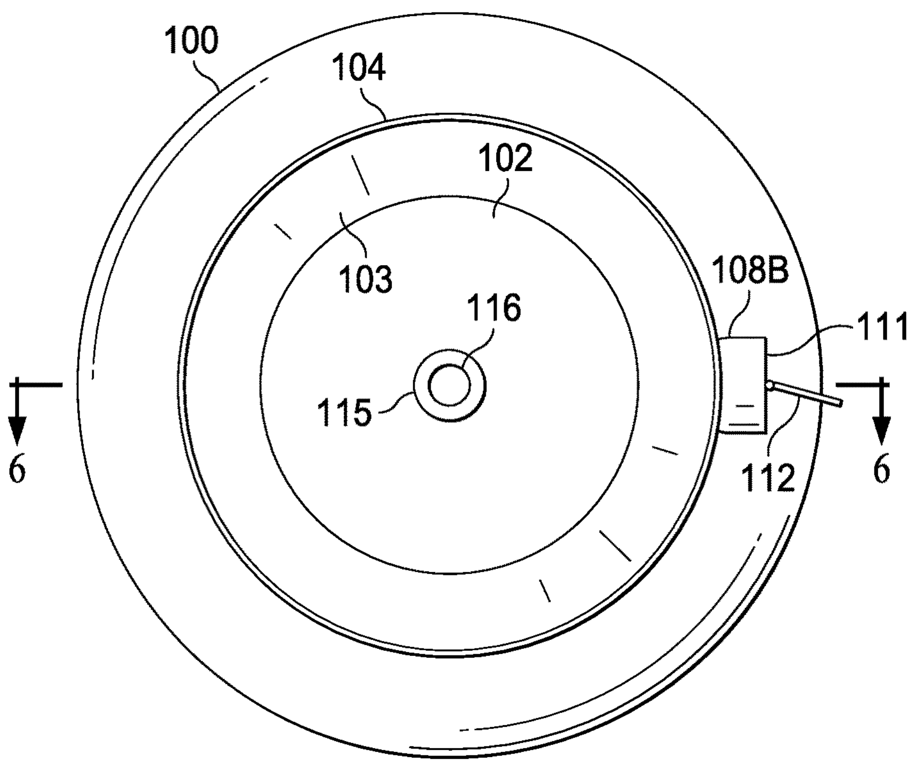
FIG. 5 is a bottom-up view of the embodiment of FIGS. 1-4.

FIG. 5 shows a bottom-up view of the same embodiment of the current disclosure that is illustrated in FIGS. 1-4. At an upper end of the embodiment's inertial water tube 104-102 is an upper mouth 115 through which water is occasionally, and/or periodically, ejected in response to wave-induced oscillations of the water within the inertial water tube. A water diverter 116 positioned at the upper mouth 115 diverts a portion of the ejected water in a lateral direction.

Figure 6:
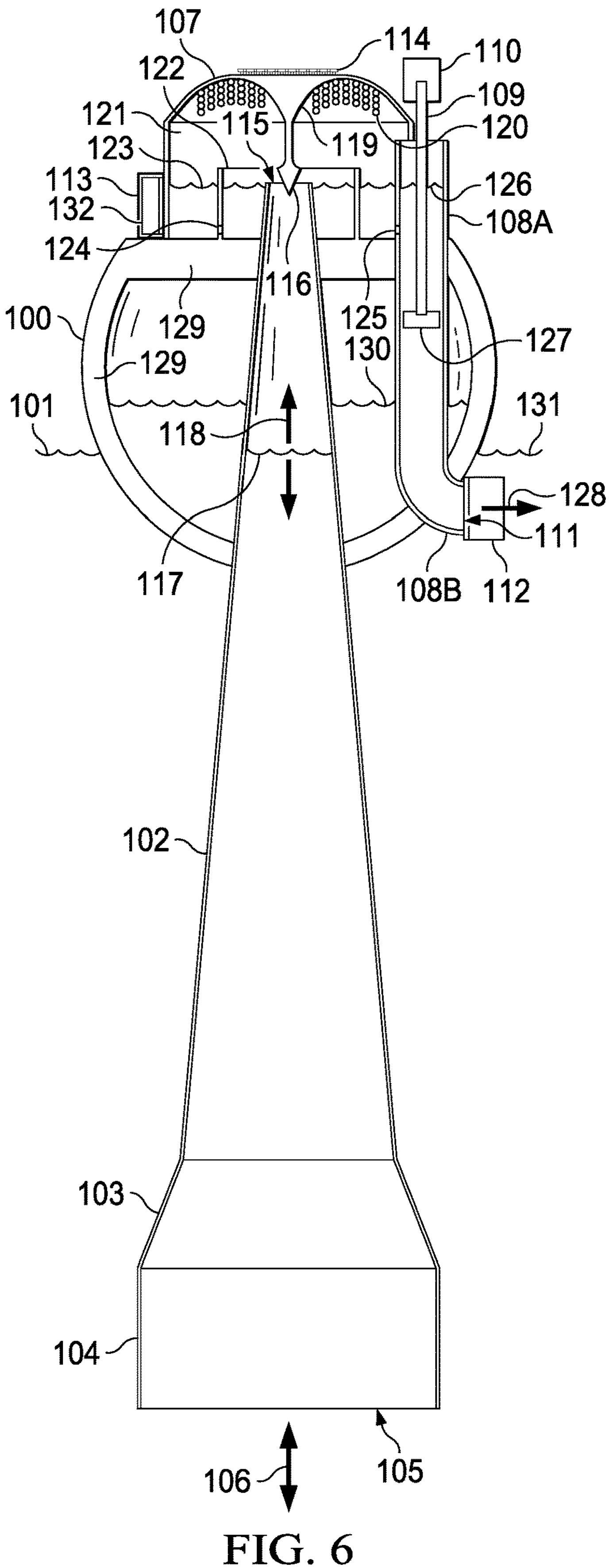
FIG. 6 is a side sectional view of the embodiment of FIGS. 1-5.

FIG. 6 shows a side sectional view of the same embodiment of the current disclosure that is illustrated in FIGS. 1-5, where the section is taken along the section line 6-6 specified in FIGS. 4 and 5.

As the embodiment 100 moves up and down in response to passing waves, water 101 outside the embodiment moves 106 into and out of the inertial water tube 102-104, through its lower mouth 105, resulting in a surface 117 of the water within the tube 102-104 moving 118 up and down, typically in an oscillatory fashion. Occasionally, and/or periodically, especially when the downward movements of the tapered walls of the inertial water tube impinge upon an upwelling body of water 117 within the inertial water tube thereby causing an increase in the pressure of the water within the tube, the surface 117 of the water within the inertial water tube 102-104 moves high enough to allow a portion of that water to escape the upper mouth 115 of the tube, thereby ejecting water 117 against a water diverter 116 which tends to break up the ejected stream of water into a spray. The ejected water tends to encounter the curved upper wall 119 of the water reservoir 107, and a plurality 120 of chains hanging therefrom, which tend to rob the ejected water of some of its kinetic energy and direct it into the lower portion 121 of the water reservoir where it is collected into a pool 123 that is divided by a cylindrically-shaped baffle 122 through which water can flow through an aperture 124. An embodiment similar to the one illustrated in FIGS. 1-6 does not have a cylindrically-shaped baffle 122.

Water 123 from the reservoir 107/122 flows through an aperture 125 into effluent pipe 108 where that water 126 flows down and through a water turbine 127 (e.g., a Kaplan or propeller turbine) causing that water turbine and a connected, and/or attached, turbine shaft 109 to rotate, thereby energizing a generator 110 and causing that generator to produce electrical power. After passing through the water turbine 127, water flowing through the effluent pipe 108 flows 128 out of an effluent pipe discharge mouth 111 positioned at a lower end 108B of the effluent pipe, thereafter passing over and around a rudder 112 whose angular orientation relative to the effluent outflow can be adjusted so as to steer the embodiment 100.

Inside the buoy 100, or buoyant portion, of the embodiment to which the inertial water tube 102-104 is attached, and/or comprising, at least in part the walls of that buoy 100, is a layer or wall 129 of buoyant material, which can, for instance, comprise a hermetically sealed hollow metal wall whose interior contains air or closed-cell plastic foam. For clarity of exposition, the thickness of the layer or wall 129 is not drawn to scale; the thickness of this layer or wall 129 must be sufficient to provide buoyancy to the embodiment sufficient to elevate reservoir 107/122 to the desired vertical level (taking into account the amount of water in water ballast 130) and will be subject to various thicknesses and configurations depending on desired performance characteristics and target wave conditions. Inside the hollow of the buoy 100 is an adjustable volume of water ballast 130. In relatively energetic wave conditions, when ejections of water from the upper mouth 115 of the inertial water tube are relatively vigorous, the amount of water ballast can be reduced, thereby lowering the waterline 131 relative to the embodiment and decreasing the draft of the embodiment, and raising the height of the water 123 in the reservoir 107/121, relative to the mean level 101 of the body of water on which the embodiment floats, and thereby increasing the head pressure associated with the water 123 in the reservoir 107/121 (with respect to that water's discharge back into the body of water 101). Furthermore, by lowering the waterline 131 of the embodiment 100, a decrease in the amount of water ballast 130 within the buoy 100 can decrease the waterplane area of the embodiment (i.e., as the waterline is lowered, the effective diameter of the waterplane area decreases) which will tend to reduce the amount of wave energy absorbed by the embodiment, which, in turn, will tend to help insulate the embodiment from an excessive influx of energy which might stress the embodiment and potentially cause it damage.

By contrast, in relatively mild wave conditions, when the level 117 of water within the inertial water tube 102-104 might not rise high enough to escape the upper mouth 115 of the inertial water tube (resulting in a cessation of electrical energy production), the amount of water ballast 130 can be increased, thereby raising the waterline 131 and increasing the draft of the embodiment and lowering the height of the water 123 in the reservoir 107/121 relative to the mean level 101 of the body of water on which the embodiment floats, and thereby decreasing the head pressure associated with the water 123 in the reservoir 107/121 (with respect to that water's discharge back into the body of water 101). By raising the waterline 131 of the embodiment 100, an increase in the amount of water ballast 130 within the buoy 100 can increase the waterplane area of the embodiment (i.e., as the waterline is raised up to and including the approximate middle of buoy 100 where the diameter of a flow-normal cross-sectional area is greatest, the effective diameter of the waterplane area increases) which will tend to cause the embodiment to absorb a greater fraction of the wave energy impinging on it.

Thus, in certain circumstances, by decreasing the volume and mass of water ballast 130 within the embodiment, a lesser amount of ambient wave energy can tend to be absorbed, but that energy will be processed more efficiently (e.g., through the availability of greater head pressure in the water 123 that flows through the water turbine 127). And, likewise, in certain circumstances, by increasing the volume and mass of water ballast 130 within the embodiment, a greater amount of ambient wave energy can tend to be absorbed thereby helping to better preserve a more nominal level of electrical power production, albeit by means of a water turbine 127 driven by water 123 possessing less head pressure.

Note that water turbine 127 will typically have a set of blades on its runner (not shown for clarity of exposition) and will typically have a converging and expanding/diverging (Venturi) sections upstream and downstream of the runner respectively (also not shown for clarity of exposition). In many figures of this disclosure, schematic representations of water turbines are simplified for clarity of exposition, and one skilled in the art will understand that established design principles applicable to water turbines will be aptly considered, including considerations related to the prevention of cavitation.

The embodiment includes a control system and/or module that controls and/or adjusts the level 130 and volume of the water ballast inside the buoy 100 through its control of a pump that connects the water within that water ballast to the water 101 outside the embodiment. In one embodiment, the level 130 and volume of the water ballast is controlled by actuating a valve that, when open, allows water to pass between the interior of the inertial water tube 118 and the water ballast chamber 130.

A portion of the electrical power generated by the embodiment is consumed by computers 132 within a computer chamber 113. Thus, electrical energy generated by the embodiment, and by extension the embodiment itself, is, at least in part, monetized through the execution of computational tasks for third parties, wherein the tasks and/or the data for those tasks is received (at least in part) via encoded radio transmissions received, e.g., by satellite, by the embodiment's phased array antenna 114. And, at least a portion of the results of the completed computational tasks are transmitted to a remote computer, server, receiver, or service, via encoded radio transmissions transmitted, e.g., to a satellite, by the embodiment's phased array antenna 114.

The embodiment illustrated in FIGS. 1-6 is an example of the disclosure herein and is not offered, nor should it be construed as, a limitation on the scope of the disclosure. The exact shape of the inertial water tube has many possible variants and any tube whose flow-normal diameter, and/or horizontal cross-sectional area, increases with depth, at least to an approximate degree, and/or at least at one point along the tube, is within the scope of the current disclosure. The configurations, positions, orientations, sizes, and/or designs, of the water reservoir 107/121, effluent pipe 108, water turbine 127, and generator 110, have many possible variants, and any alternate configurations and designs; any alternate numbers of effluent pipes, water turbines, and generators; any type of power takeoff, e.g., any mechanism and/or type of energy conversion, such as the production of pressurized air or desalinated water, and/or any other variation of the illustrated design, is within the scope of the current disclosure. Any type, shape, size, and/or design of the buoy, and/or buoyant portion, of the embodiment is within the scope of the current disclosure. Any type of energy consuming task, mechanism, module, and/or system (e.g., other than a network of computing devices), or no energy consuming task (e.g., wherein the generated electrical power is transmitted to a terrestrial grid via a connected power cable), is included within the scope of the current disclosure. Any type, design, size, location, and/or configuration, of antenna, or no antenna at all, is included within the scope of the current disclosure.

Figure 7:
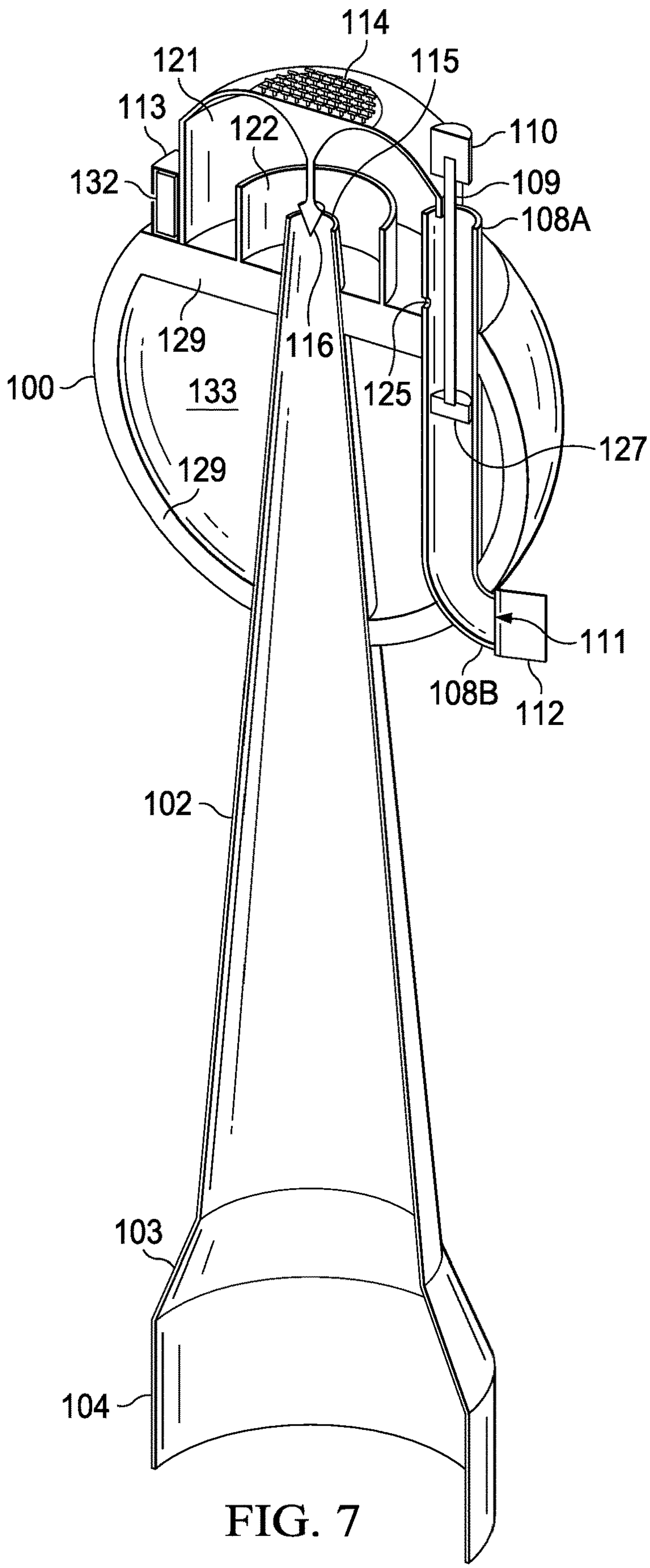
FIG. 7 is a sectional view of FIG. 6 from a perspective orientation.

FIG. 7 shows the sectional view of FIG. 6 from a perspective orientation, and illustrates the same embodiment of the current disclosure that is illustrated in FIGS. 1-6. In this perspective sectional view the water (both outside and inside the device), as well as the chains (120 in FIG. 6) suspended from the upper surface of the water reservoir, have been omitted to afford greater clarity of the embodiment's structural design. The embodiment incorporates a hollow buoy 100 into the hollow 133 and/or void of which water ballast may be added in order to adjust (e.g., to increase or decrease) the mass and inertia of the embodiment, and to thereby adjust (e.g., to lower or raise, respectively) its waterline (131 in FIG. 6).

Figure 8:
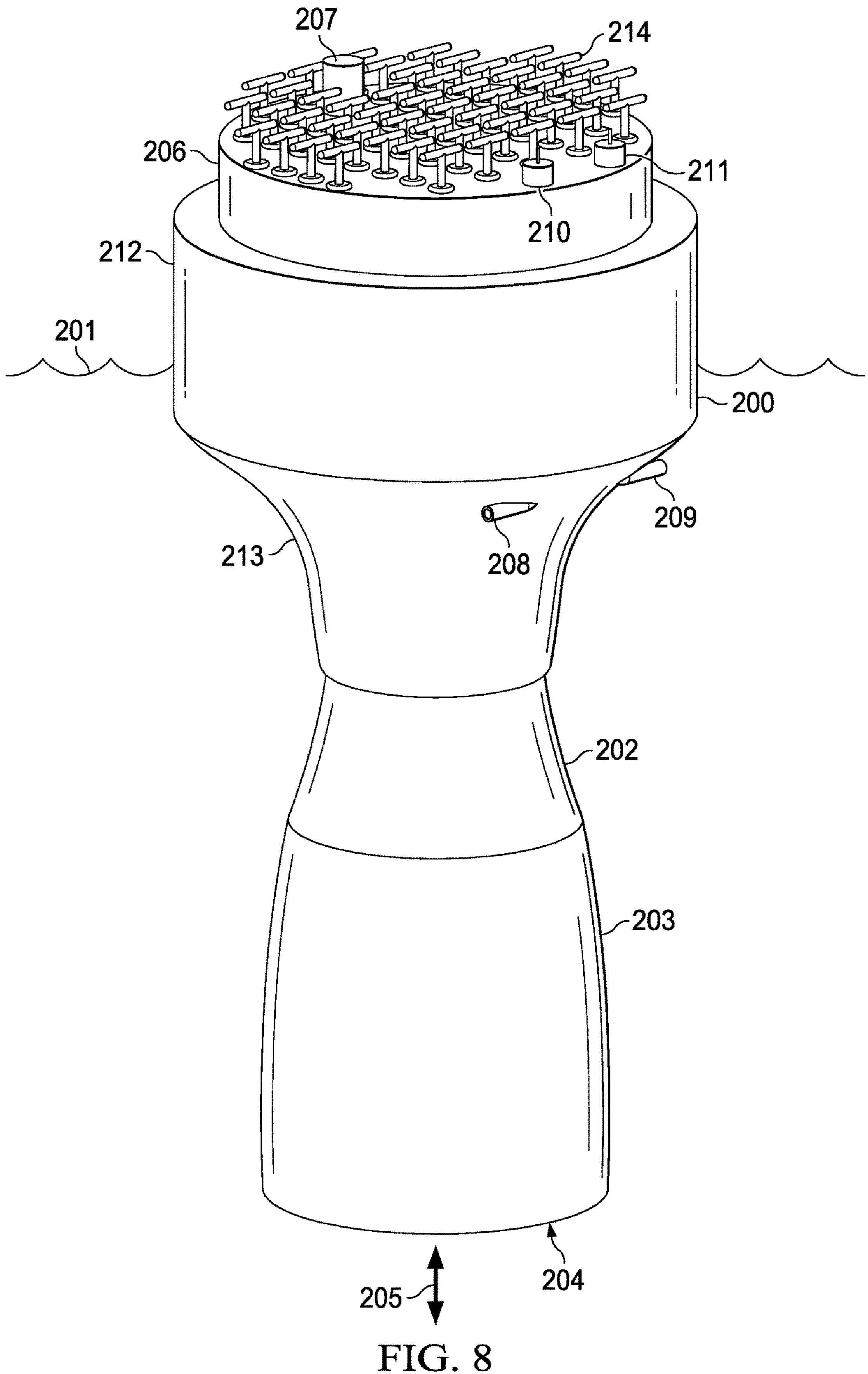
FIG. 8 is a side perspective view of another embodiment of the present invention.

FIG. 8 shows a side perspective view of an embodiment of the current disclosure.

The buoyant embodiment 200 floats adjacent to an upper surface 201 of a body of water over which waves tend to pass. The embodiment incorporates an inertial water tube 202-203 comprised of both convex (e.g., 203) and concave (e.g., 202) tubular segments. A lower mouth 204 allows water to move 205 into and out from the interior of the inertial water tube 202-203. And, an upper mouth (not visible and inside the embodiment) of the inertial water tube 202-203 allows water to be ejected up and out of the inertial water tube, and into a water reservoir 206, when the water inside the inertial water tube rises fast enough and/or far enough. A portion of the gravitational potential energy and kinetic energy of the water ejected from the upper mouth of the inertial water tube 202-203 is preserved through the capture of a portion of that water in the water reservoir 206 which is positioned above the surface 201 of the body of water to which it will return.

A portion of the water trapped in the water reservoir 206 is returned to the body of water 201 on which the embodiment 200 floats through an effluent pipe (not visible) in which is positioned a water turbine (not visible). When water flows through the discharge pipe, the water turbine therein is caused to rotate at least in part due to the head pressure of the water flowing to and through it from the water reservoir. The rotation of the water turbine by outflowing water causes an operatively connected generator 207 to be energized resulting in the generation of electrical power.

A portion of the water trapped in the water reservoir 206 may be returned to the body of water 201 on which the embodiment 200 floats through either or both of two effluent pipes 208 and 209. Because of their tangential orientation with respect to the vertical longitudinal axis of the embodiment, the discharge of water through the effluent pipe discharge mouth positioned at the lower end of effluent pipe 208 will tend to rotate the embodiment in a counter-clockwise direction (with respect to a top-down perspective). Likewise, the discharge of water through the effluent pipe discharge mouth at the lower end of effluent pipe 209 will tend to rotate the embodiment in a clockwise direction (with respect to a top-down perspective). The discharge of water through both effluent pipes 208 and 209 at approximately equal rates of flow will tend to produce torques on the embodiment that cancel each other and result in no rotation of the embodiment.

Effluent regulation motors 210 and 211 control the rate at which water from the water reservoir 206 is discharged and/or able to flow through and from effluent pipes 208 and 209, respectively, e.g. by adjusting the degree of openness, and/or the degree of obstruction, of two respective effluent valves or stoppers (not visible) positioned and/or operated adjacent to an upper end and/or mouth of effluent pipes 208 and 209. A control module and/or system (not shown) controls the behavior of the effluent regulation motors, and therethrough the angular orientation (i.e., the direction of travel) of the embodiment, as well as other aspects of the embodiment's behavior and operation.

A buoy, chamber, enclosure, canister, and/or portion 212 of the embodiment is hollow and contains water ballast, the volume of which may be adjusted, that is used to raise and lower the embodiment's waterline, and respectively to lower and raise the head pressure of the water in the water reservoir 206. A buoyant collar 213 provides the embodiment with a measure of permanent buoyancy which, following a reduction of water ballast within chamber 212, will tend to lift the embodiment to a height that places its buoy 212 in a more elevated position relative to the surface 201 of the water on which the embodiment floats.

The embodiment's control module (not shown) controls and/or adjusts the volume of water ballast within the buoy 212 through its control of a pump and pump conduit (not shown) that connects the water ballast within the interior of the buoy 212 to the water 201 outside the embodiment.

Attached to an upper exterior surface of the water reservoir 206 is a phased array antenna 214 comprised, at least in part, of a plurality of individual dipole antennas.

Figure 9:
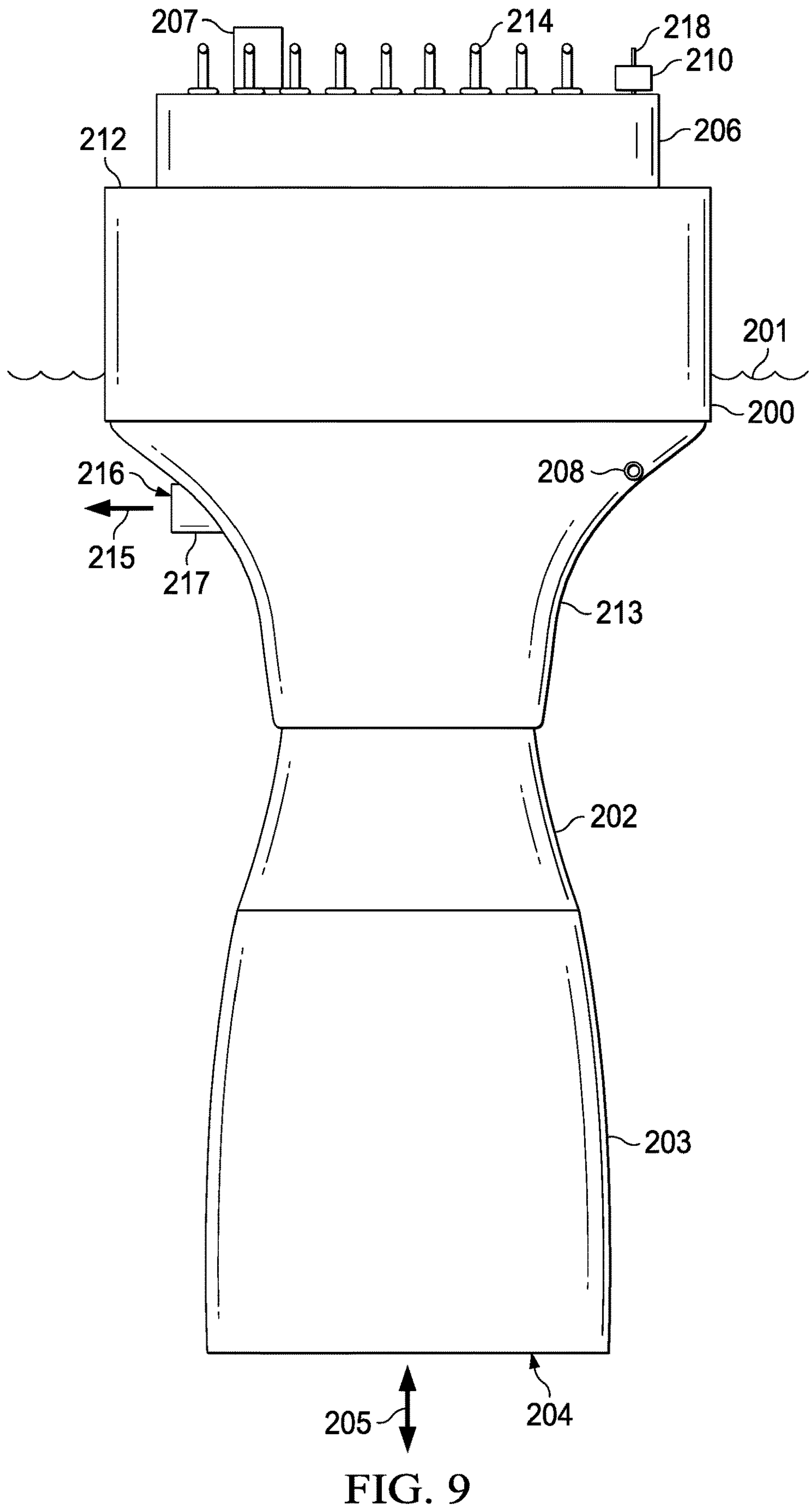
FIG. 9 is a side view of the embodiment of FIG. 8.

FIG. 9 shows a side view of the same embodiment of the current disclosure that is illustrated in FIG. 8.

Water trapped in water reservoir 206 flows 215 back into the body of water 201 from which it was initially captured through an effluent pipe discharge mouth 216 of effluent pipe 217, and, due to the lateral flow vector of the discharged water, will tend to generate and/or produce thrust that propels the embodiment in a direction opposite to the direction 215 of the effluent discharge.

The downward flow of water through effluent pipe 217, under the influence of the head pressure imparted to the flow by the height of the water reservoir 206 above the surface 201 of the body of water into which it flows, engages, and/or energizes, a water turbine (not visible) positioned within the effluent pipe thereby causing it to rotate. And, the rotation of the water turbine within effluent pipe 217 causes an operatively connected generator 207 to generate electrical power. Baffles can be provided to limit sloshing in reservoir 206.

The discharge of a water from the water reservoir 206 through effluent pipes 208 (and 209 in FIG. 8) is controlled by the lifting and lowering of respective rods, e.g., 218, which disengage (when a rod is lifted) and engage (when a rod is lowered to its maximal extent) effluent stoppers or plugs that open and close, respectively, effluent valves positioned adjacent to upper mouths of the effluent pipes 208 (and 209 in FIG. 8) positioned within and/or adjacent to the water reservoir 206. In a different embodiment, multiple effluent pipes are disposed at different locations around the circumferential periphery of the buoy, and by controlling the rate at which water from the water reservoir flows into each of those effluent pipes, and therethrough into the body of water 201 through said multiple effluent pipes (e.g. using valves or by variably controlling the resistance imparted to each generator, and/or the resistive torque imparted to each respective water turbine, associated with each said effluent pipe), the device can be steered.

Figure 10:
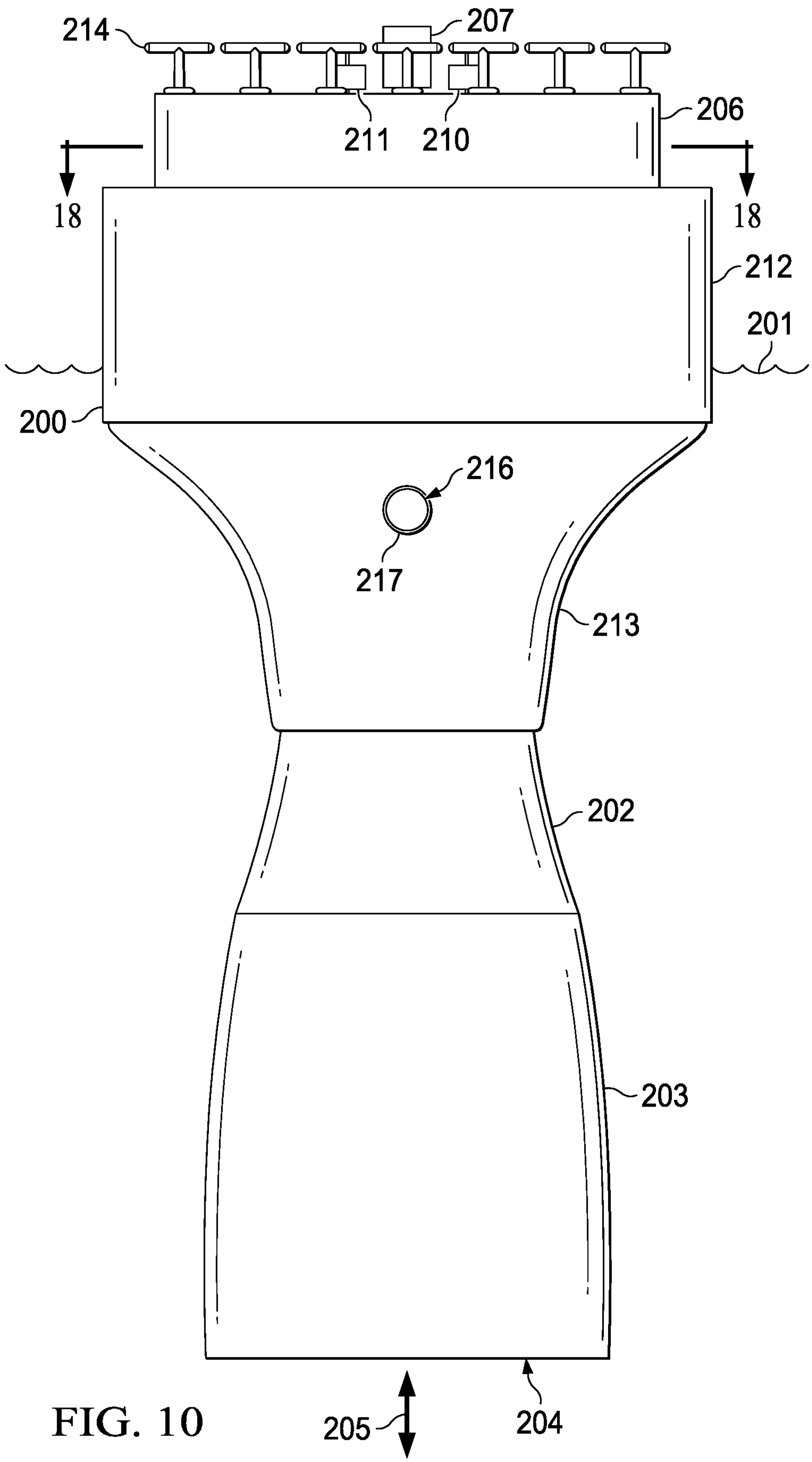
FIG. 10 is a back-side view of the embodiment of FIGS. 8 and 9.

FIG. 10 shows a back-side view of the same embodiment of the current disclosure that is illustrated in FIGS. 8 and 9.

Figure 11:
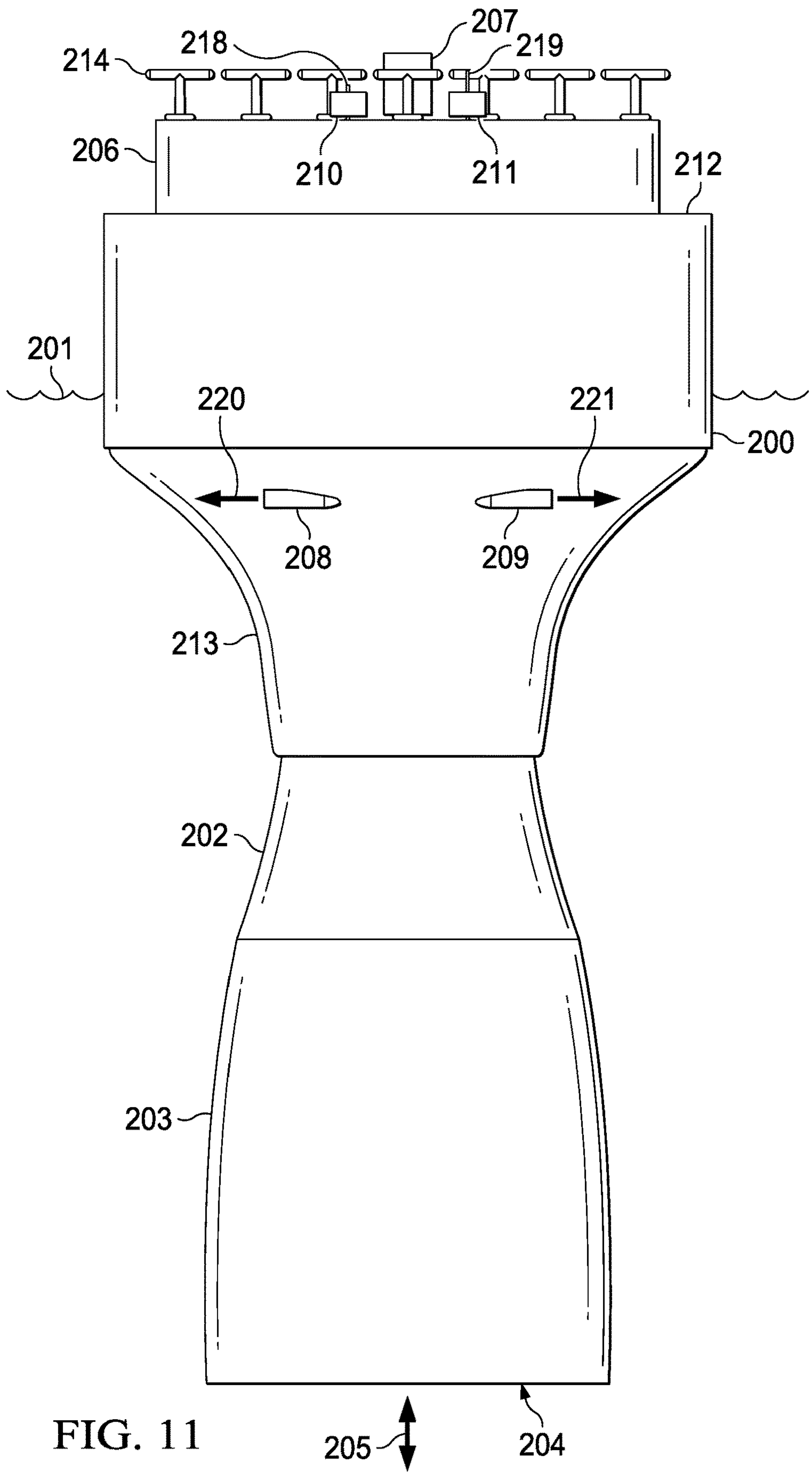
FIG. 11 is a front-side view of the embodiment of FIGS. 8-10.

FIG. 11 shows a front-side view of the same embodiment of the current disclosure that is illustrated in FIGS. 8-10.

Effluent regulation motors 210 and 211 raise or lower respective rods 218 and 219, which in turn raise or lower respective stoppers (not visible) of respective effluent valves (not visible), that open or close respective apertures within the water reservoir 206. When an effluent pipe's respective effluent valve is opened, e.g., through a raising of its respective stopper, then water flows from the water reservoir 206, under, with, and/or in response to, the head pressure associated therewith, out of the effluent pipe discharge mouth of the respective effluent pipe. When water flows from the water reservoir through effluent pipe 208 and discharges 220 into the body of water 201 then a torque is applied to the embodiment, with respect to a vertical longitudinal axis of the embodiment, causing the embodiment to turn to the right (with respect to the perspective of FIG. 11). By contrast, when water flows from the water reservoir through effluent pipe 209 and discharges 221 into the body of water 201 then a counter-torque is applied to the embodiment, with respect to a vertical longitudinal axis of the embodiment, causing the embodiment to turn to the left (with respect to the perspective of FIG. 11). Through its control of the rate at which water is discharged from the water reservoir 206 through effluent pipes 208 and 209, the embodiment's control system (not shown) is able to steer the embodiment with respect to the forward propulsion generated by the discharge (215 in FIG. 9) of water through the effluent pipe in which the water turbine is positioned (pipe 217 in FIG. 10).

In the embodiment configuration illustrated in FIG. 11, the rod 218 controlled and/or moved by effluent regulation motor 210 is maximally lowered, and the associated stopper is fully inserted into the aperture which controls the discharge 220 of water from the water reservoir 206 through effluent pipe 208, thereby preventing any significant flow therethrough. By contrast, the rod 219 controlled and/or moved by effluent regulation motor 211 is raised with respect to its maximally lowered and/or lowest position, and the associated stopper is, at least to a degree, separated from and above the aperture which controls the discharge 221 of water from the water reservoir 206 through effluent pipe 209, thereby allowing water to flow therethrough from the water reservoir 206 and into the body of water 201.

Figure 12:
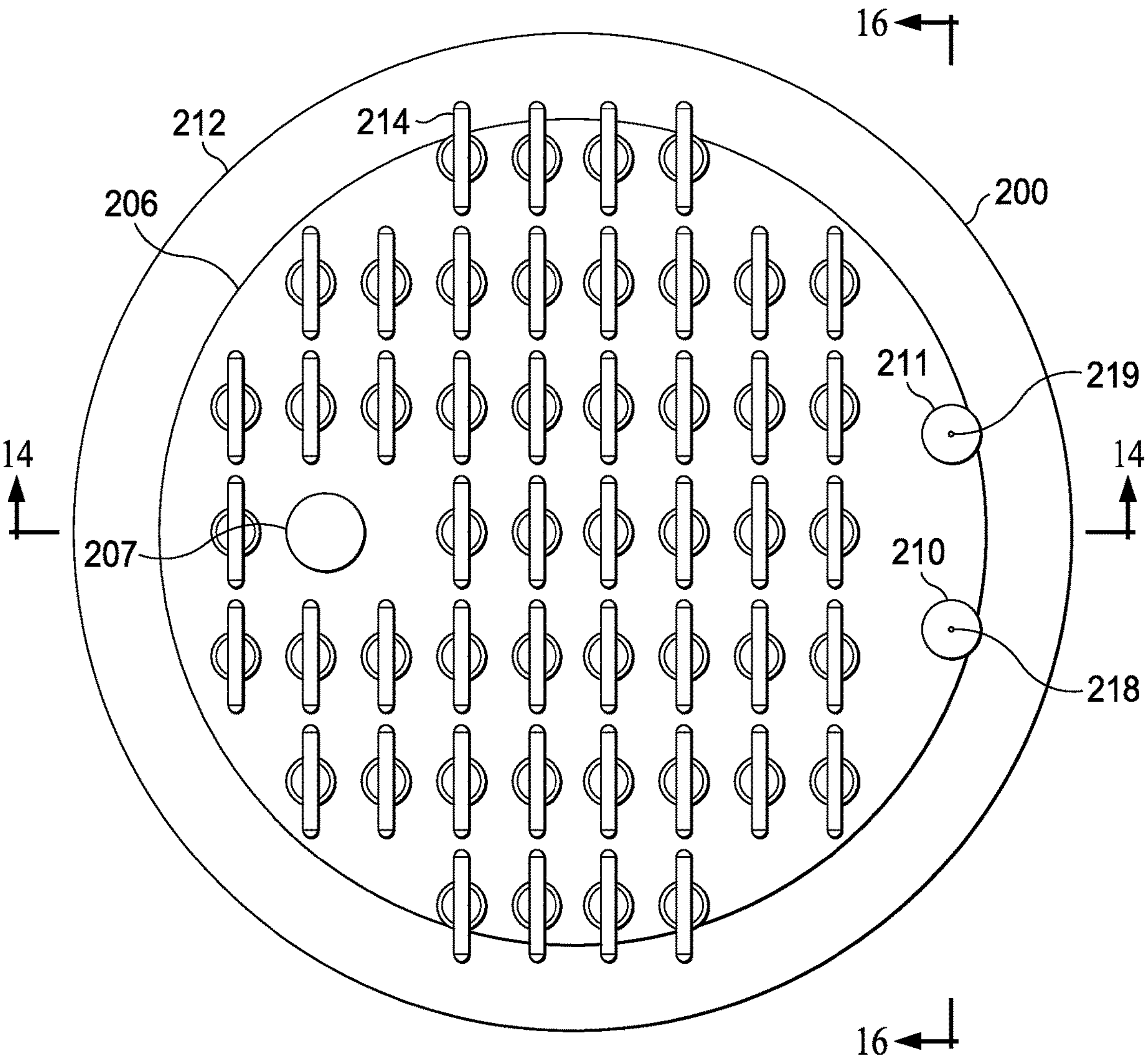
FIG. 12 is a top-down view of the embodiment of FIGS. 8-11.

FIG. 12 shows a top-down view of the same embodiment of the current disclosure that is illustrated in FIGS. 8-11.

Figure 13:
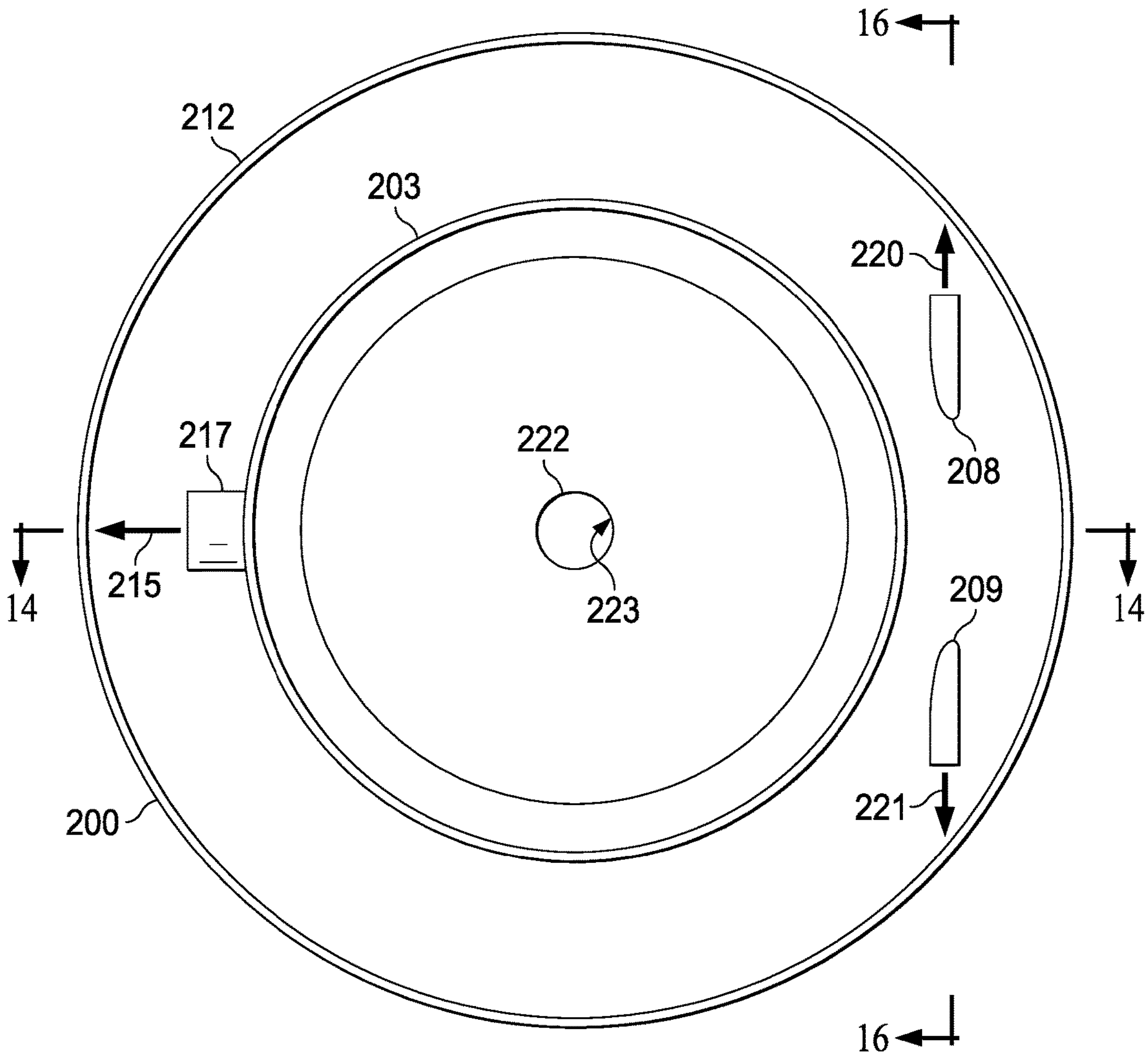
FIG. 13 is a bottom-up view of the embodiment of FIGS. 8-12.

FIG. 13 shows a bottom-up view of the same embodiment of the current disclosure that is illustrated in FIGS. 8-12.

As the embodiment 200 moves up and down in response to passing waves, water within the inertial water tube 203 will tend to oscillate, and be excited by the constricting/tapered walls of said water tube, and will tend to occasionally rise fast enough and far enough such that a portion of the water in the inertial water tube is ejected from the upper mouth 223 of the inertial water tube and into the reservoir (206 in FIG. 12) adjacent to, and/or surrounding, that upper mouth.

Note how discharges 220 and 221 of pressurized water from effluent pipes 208 and 209, respectively, will generate a torque about a longitudinal axis (e.g., passing through and normal to the upper mouth 223) of the embodiment thereby causing the embodiment to turn about that axis, and allowing the embodiment's control system (not shown) to steer the embodiment with respect to the more substantial forward thrust generated by the discharge 215 of water through effluent pipe 217.

Figure 14:
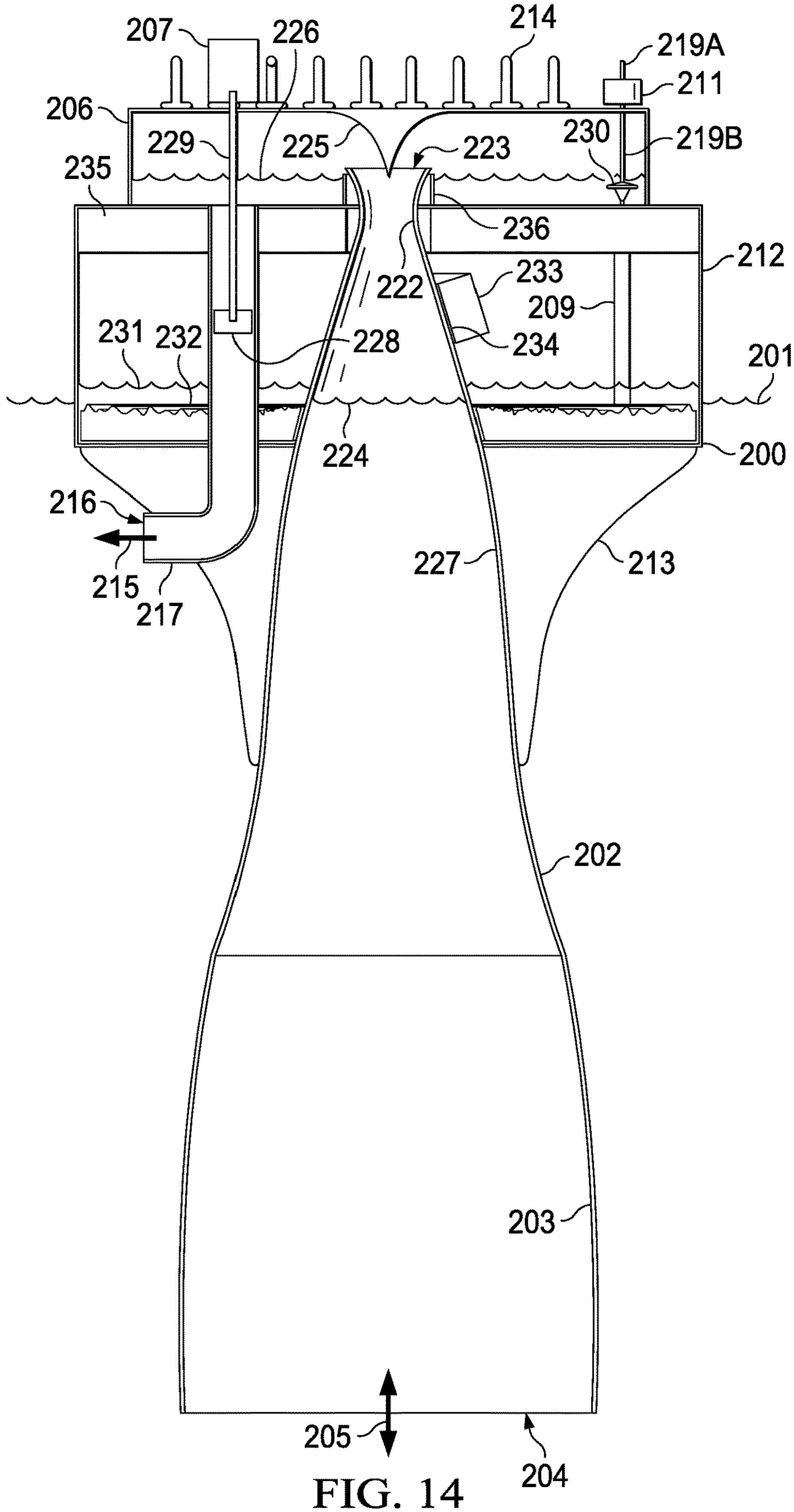
FIG. 14 is a side sectional view of the embodiment of FIGS. 8-13.

FIG. 14 shows a side sectional view of the same embodiment of the current disclosure that is illustrated in FIGS. 8-13, where the section is taken along the section line 14-14 specified in FIGS. 12 and 13.

As embodiment 200 moves up and down in response to waves traveling across the surface 201 of the body of water on which the embodiment floats, the water within the inertial water tube 202-203, and the surface 224 of that water, tend to move up and down, the former being excited in oscillation by the rise and fall of the embodiment. Occasionally, the surface 224 of the water within the inertial water tube 202-203 rises fast enough and far enough that a portion of that water is ejected and/or projected up and out of the upper mouth 223 of the inertial water tube. That ejected water may then collide with water diverter 225 whereupon it is, at least in part, dispersed, thereafter tending to fall into the pool 226 of water (or creating such a pool of water) within the water reservoir 206. The upper end 222 of the inertial water tube extends into the reservoir through an approximately cylindrical wall 236 at the center of the water reservoir 206.

Inertial water tube 202, 203, 227, 222 is comprised of segments that alternate between convex and concave. Segments 203 and 227 are convex (i.e., they differ from frustoconical in that they tend to bulge outward near the centers of the segments). Whereas segments 202 and 222 are concave (i.e., they differ from frustoconical in that they tend to bulge inward near the centers of the segments).

Note that this figure is not necessarily to scale, and the scope of the present disclosure includes inertial water tubes of any shape, design, size, and/or configuration. In one embodiment of the present disclosure, the ratio of the total height of inertial water tube to the diameter of a flow-normal cross-sectional area of buoy 212 is significantly greater than the one depicted or implied in FIG. 14. For instance, in one embodiment, the diameter of buoy 212 is approximately 50 meters, and the height of its inertial water tube 202, 203, 227, 222 is approximately 200 meters.

Some of the water 226 within the water reservoir 206 flows down through effluent pipe 217 thereby engaging, and causing to rotate, water turbine 228, positioned therein. The water turbine 228, in turn, imparts rotational kinetic energy to turbine shaft 229, which energizes operatively connected generator 207 causing it to produce electrical power. After passing and/or flowing through, and imparting rotational kinetic energy to, water turbine 228, the water in effluent pipe 217 flows 215 out of effluent pipe discharge mouth 216, thereby generating forward thrust that tends to propel the embodiment to the right (with respect to the illustration in FIG. 14).

When, as illustrated in FIG. 14, stopper 230 is raised out of, and/or from, its respective aperture (not visible) through the lifting of rod 219 by effluent regulation motor 211, water 226 from water reservoir 206 flows into effluent pipe 209 and thereafter flows out and into the body of water 201 imparting a turning torque to the embodiment. Conversely, when stopper 230 is positioned so as to close, obstruct, and/or shut its respective aperture through the lowering of rod 219 to its maximal downward position, then water 226 from water reservoir 206 is unable to flow into and/or through effluent pipe 209, thereby preventing a discharge of water from the effluent pipe discharge mouth of that effluent pipe from generating a turning torque.

A similar stopper is actuated by effluent regulation motor 210 (in FIG. 11) in order to permit or prevent the flow of water from water reservoir 206 through effluent pipe 208 (in FIG. 11).

Buoy chamber 212 is substantially hollow and nominally contains a water ballast 231 of adjustable volume and mass (e.g., wherein the volume of water ballast is adjusted by a pump, not shown, controlled by the embodiment's control system (not shown), that pumps water from the water ballast into the body of water 201 on which the embodiment floats in order to reduce the volume and mass of the ballast, thereby tending to cause the embodiment's draft to decrease, or, conversely, pumps water from the body of water 201 on which the embodiment floats into the buoy chamber 212 in order to increase the volume and mass of the water ballast 231, thereby tending to cause the embodiment's draft to increase. A layer 232 of rocks, gravel, and/or other aggregate material, helps to reduce side-to-side flows of water within the water ballast, and to thereby stabilize the orientation of the embodiment with respect to wave motion.

Within buoy chamber 212, and attached to a wall of the inertial water tube 227, is a computer chamber 233, enclosure, container, module, and/or vessel, which contains, at least in part, a plurality of computing devices which consume at least a portion of the electrical power generated by the embodiment's generator. One wall 234 of the computer chamber is connected to, or shared by, the inertial water tube thereby facilitating the passive and/or conductive cooling of the computing devices within the enclosure 233.

Attached to an inner upper surface inside the buoy chamber 212 is a layer 235 of buoyant material which provides a degree of permanent buoyancy, and a measure of safety that the embodiment will not sink following an unanticipated accident, or unanticipated damage (e.g., from a collision with a ship or other water vessel).

Figure 15:
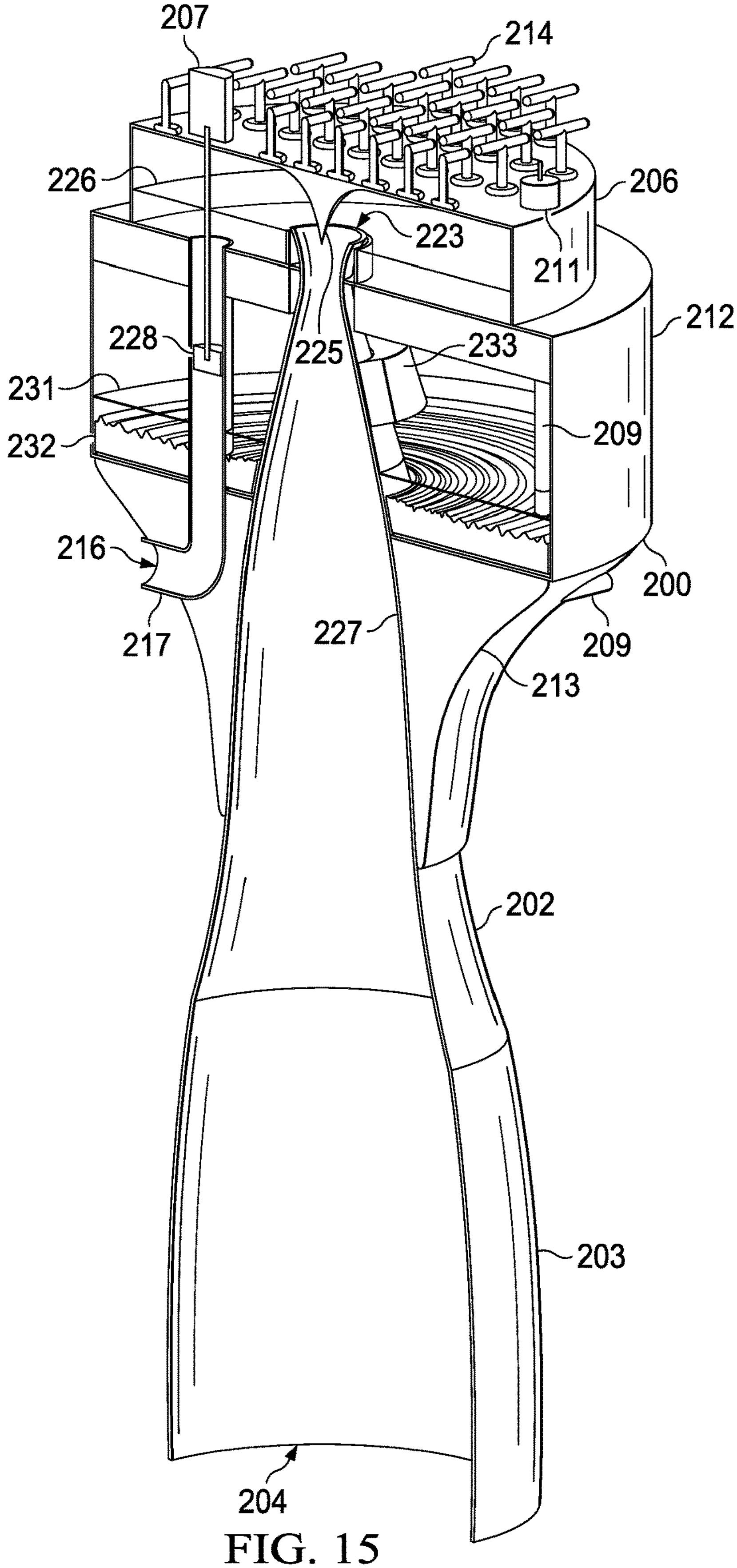
FIG. 15 is a sectional view of FIG. 14 from a perspective orientation.

FIG. 15 shows the sectional view of FIG. 14 from a perspective orientation, and illustrates the same embodiment of the current disclosure that is illustrated in FIGS. 8-14. In this perspective sectional view the water on which the embodiment floats, as well as the water 224 (FIG. 14) nominally inside the embodiment's inertial water tube 202, have been omitted to afford greater clarity of the embodiment's structural design.

Figure 16:
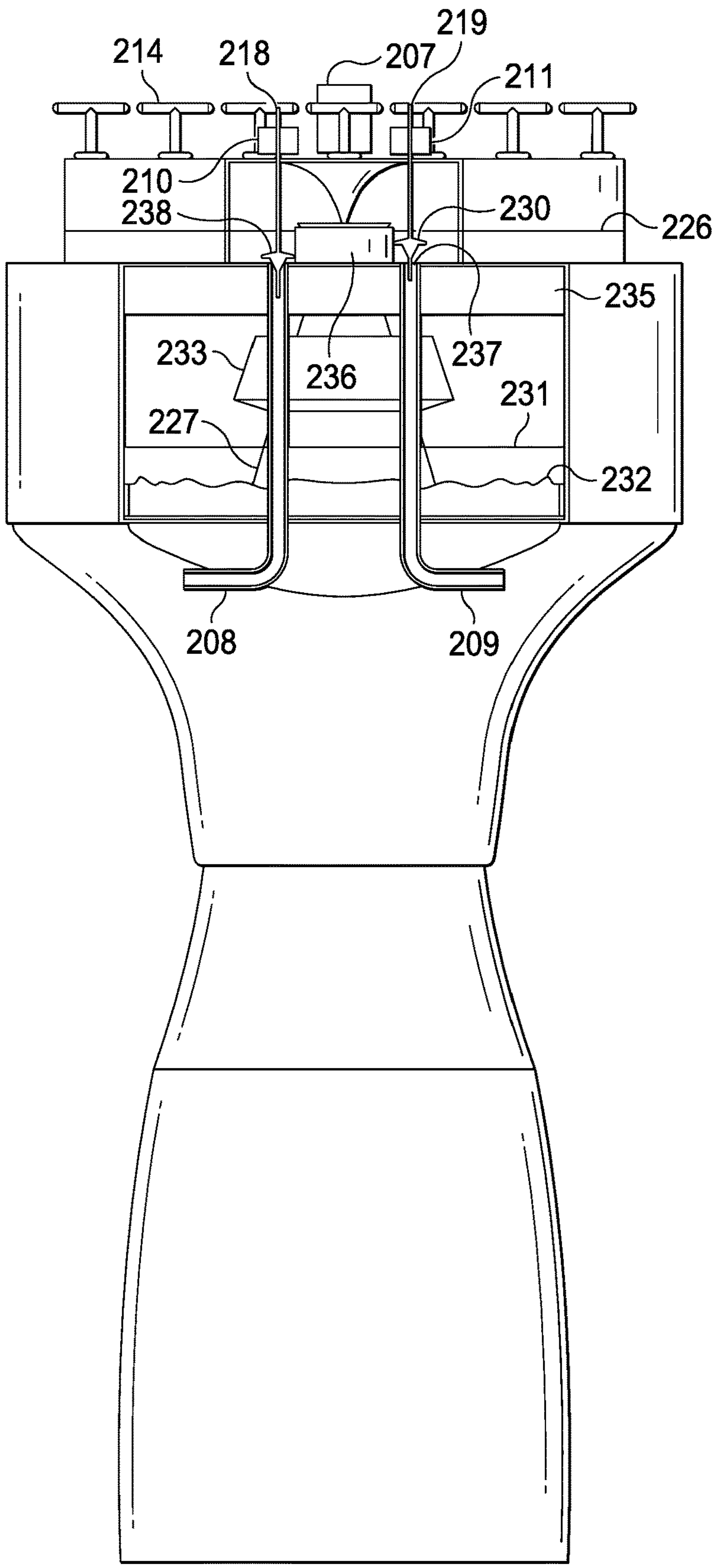
FIG. 16 is a front-side sectional view of the embodiment of FIGS. 8-15.

FIG. 16 shows a front-side sectional view of the same embodiment of the current disclosure that is illustrated in FIGS. 8-15, where the section is taken along the section line 16-16 specified in FIGS. 12 and 13.

Effluent pipes 208 and 209 are connected to water reservoir 206, and the water 226 therein, by apertures, e.g., 237, in a bottom wall of the water reservoir. Stoppers 238 and 230 control the flow of water, and/or the rate at which water flows, through each respective effluent pipe 208 and 209. When a stopper, e.g., 238, is fully lowered, thereby fully obstructing its respective aperture, then water 226 from the water reservoir is unable to flow into and/or through the respective effluent pipe, e.g., 208. Conversely, when a stopper, e.g., 230, is raised, and does not fully obstruct its respective aperture, e.g., 237, then water 226 from the water reservoir is able to flow into and through the respective effluent pipe, e.g., 209, thereby generating a tangential thrust that tends to turn the embodiment and permit the embodiment's control system (not shown) to steer the embodiment in a desirable direction, along a desirable course, and/or to a desirable location. Stoppers 238 and 230 are raised and lowered by their respective lifting rods 218 and 219, which are raised and lowered by their respective effluent regulation motors 210 and 211.

Figure 17:
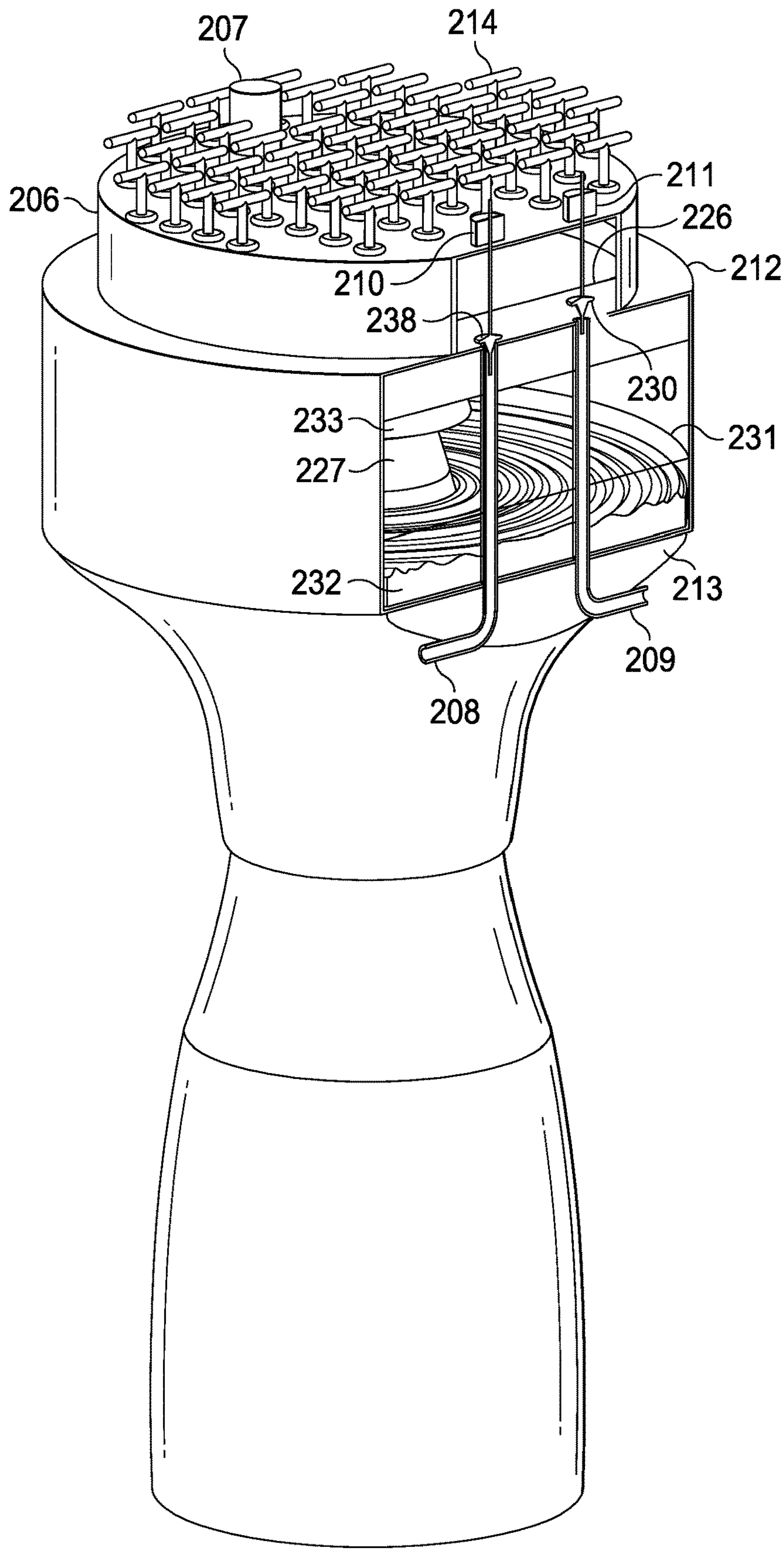
FIG. 17 is a front-side partial sectional view of the embodiment of FIGS. 8-15.

FIG. 17 shows the sectional view of FIG. 16 from a perspective orientation, and illustrates the same embodiment of the current disclosure that is illustrated in FIGS. 8-16. In this perspective sectional view the water on which the embodiment floats has been omitted to afford greater clarity of the embodiment's structural design.

Figure 18:
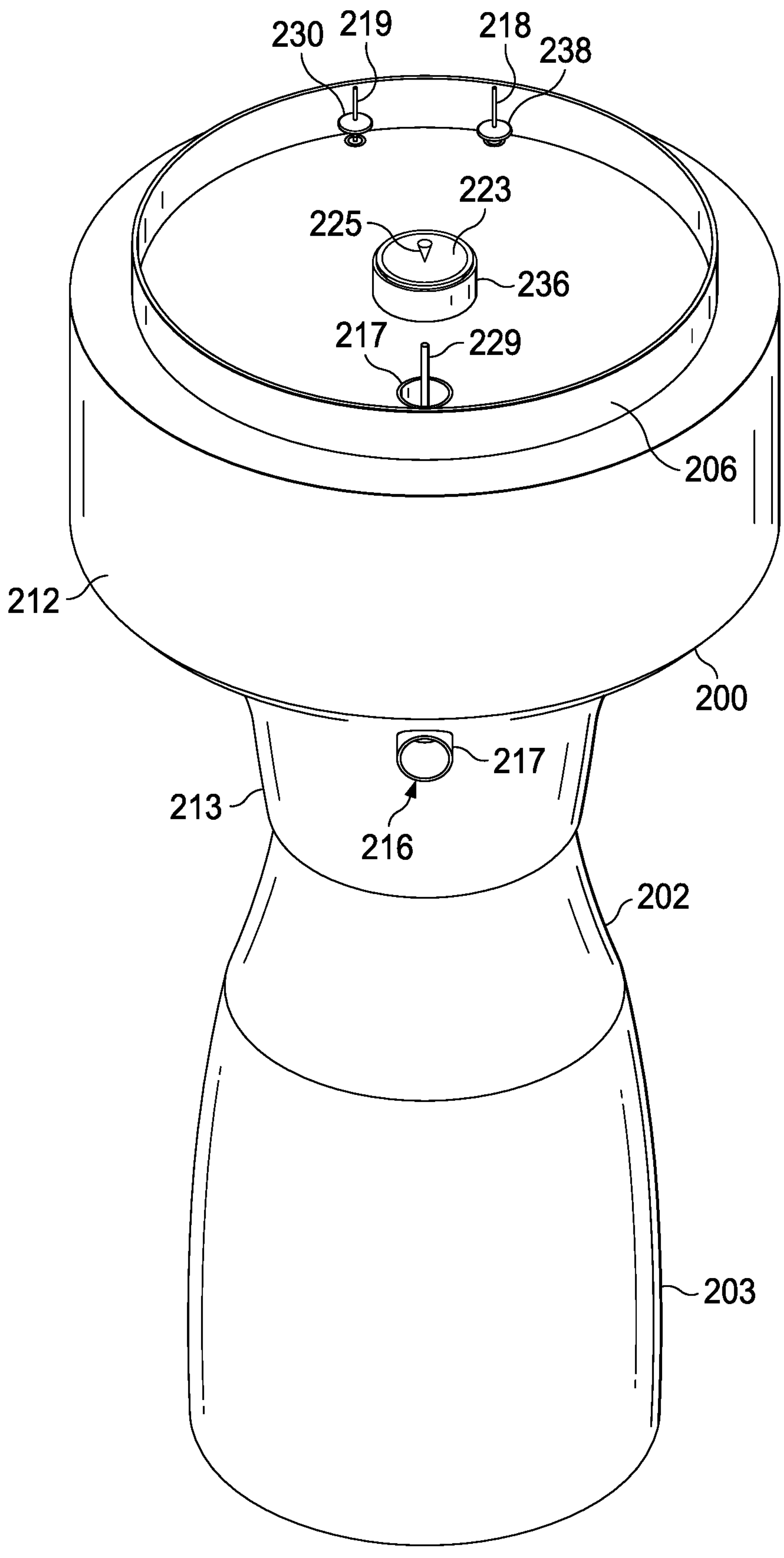
FIG. 18 is a top-down perspective sectional view of the embodiment of FIGS. 8-17.

FIG. 18 shows a top-down perspective sectional view of the same embodiment of the current disclosure that is illustrated in FIGS. 8-17, where the section is taken along the section line 18-18 specified in FIG. 10.

Figure 19:
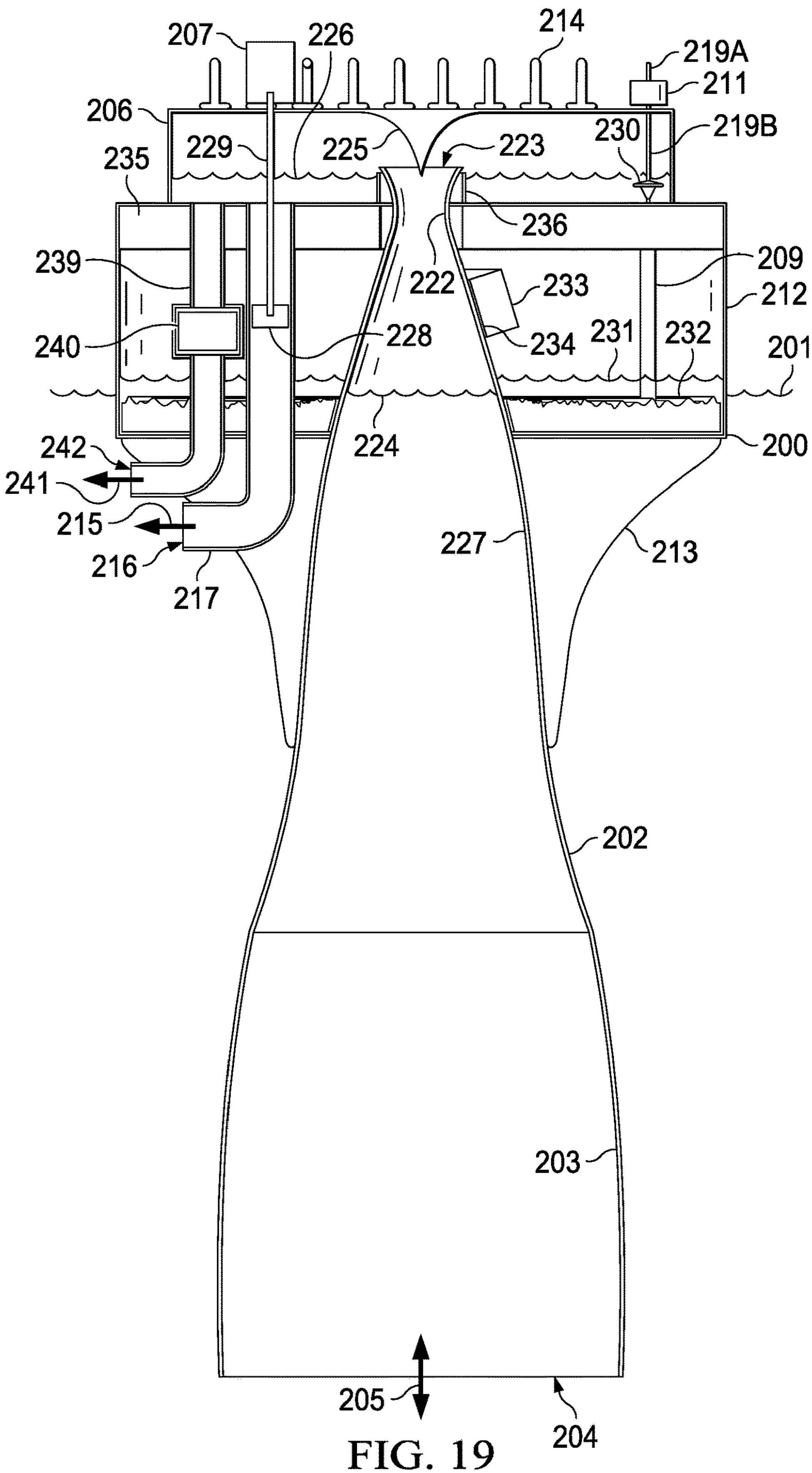
FIG. 19 is a side sectional view of another embodiment of the present invention similar to the one illustrated in FIGS. 8-18.

FIG. 19 shows a side sectional view of an embodiment of the current disclosure that, with the exception of one added feature, is identical to the one illustrated in FIGS. 8-18, and for this reason the elements of this augmented embodiment share the same numbers as their counterparts in the embodiment previously illustrated in FIGS. 8-18. With one exception, the sectional view illustrated in FIG. 19 is identical to the sectional view illustrated in FIG. 14.

The embodiment illustrated in FIGS. 8-18 drains and/or releases water from its water reservoir 206 through three effluent pipes. Water that flows back to the body of water 201 on which the embodiment floats through an effluent pipe 217 and a water turbine 228 positioned therein tends to convert some of the gravitational potential energy of the water in water reservoir 206 into electrical power. Water also flows back to the body of water 201 on which the embodiment floats through two additional effluent pipes 208 and 209 that provide a turning force to the embodiment. However, unlike the embodiment illustrated in FIGS. 8-18, the embodiment illustrated in FIG. 19 includes a fourth effluent pipe 239 through which water from water reservoir 206 drains and/or flows 241 back to the body of water 201.

The head pressure of the water that flows through pipe 239, and originates in and/or from the water reservoir 206, forces that water to pass through an effluent filter 240, mat, block, aggregation, collection of membranes, and/or puck comprised of material with a tendency to adsorb, absorb, or otherwise collect certain elements, minerals, and/or compounds from the seawater flowing through it (for instance, the effluent filter, mat, block, aggregation, collection of membranes and/or puck may be composed and/or comprised, at least in part, of adsorbing fibers, yarns, and/or solids contained within a porous fabric bag). When the gravitational potential energy and/or head pressure of the water within the water reservoir 206, is relatively high, then the efficiency with which effluent filter 240 adsorbs target and/or desirable chemical may tend to be increased. And, following its passage through the mineral-adsorbent effluent filter 240, water draining and/or flowing from the water reservoir 206 through effluent pipe 239 returns 241 to the body of water 201 outside the embodiment, through effluent pipe discharge mouth 242, providing (additional) thrust to propel the embodiment in a forward direction (i.e., toward the right with respect to the embodiment configuration illustrated in FIG. 19).

Effluent filters 240, such as the one illustrated in FIG. 19, can collect useful, and valuable, minerals, atoms, substances, and/or other components, from the water on which an embodiment, such as 200 floats. The adsorbent efficiencies of some of these mineral-adsorbent filters and/or mats is increased when the mineral-containing fluid is passed through the filter and/or mat under pressure, such as the head pressure of the water draining into, and through, effluent filter 240 from water reservoir 206.

In one embodiment of the present disclosure, the adsorbing material of the embodiment's effluent filter 240 preferentially adsorbs lithium and/or lithium compounds. In one embodiment of the present disclosure, the adsorbing material of the embodiment's effluent filter 240 preferentially adsorbs rubidium and/or rubidium compounds. In one embodiment of the present disclosure, the adsorbing material of the embodiment's effluent filter 240 preferentially adsorbs uranium and/or uranium compounds.

An embodiment of the present disclosure similar to the one illustrated in FIG. 19 uses and/or incorporates, in place of, or in addition to, the effluent filter 240, and/or adsorbent mat, of the embodiment illustrated in FIG. 19, mechanisms, modules, systems, and/or separators that separate water from the salt water on which they float, thereby producing deionized, potable, and/or purified water. The scope of the present disclosure includes embodiments that utilize pressurized water (as from an embodiment's water reservoir(s)) to perform, accomplish, execute, and/or manifest, any type, variety, category, and/or manner, of processing, filtering, concentration, energy production, and/or other useful work or product.

The embodiment illustrated in FIG. 19 is an example of the variety of beneficial applications for which the pressurized water stored within the water reservoir 206 of an embodiment may be utilized. All such purposes, uses, processes, and applications of the water within water reservoir 206 are included within the scope of the present disclosure.

Figure 20:
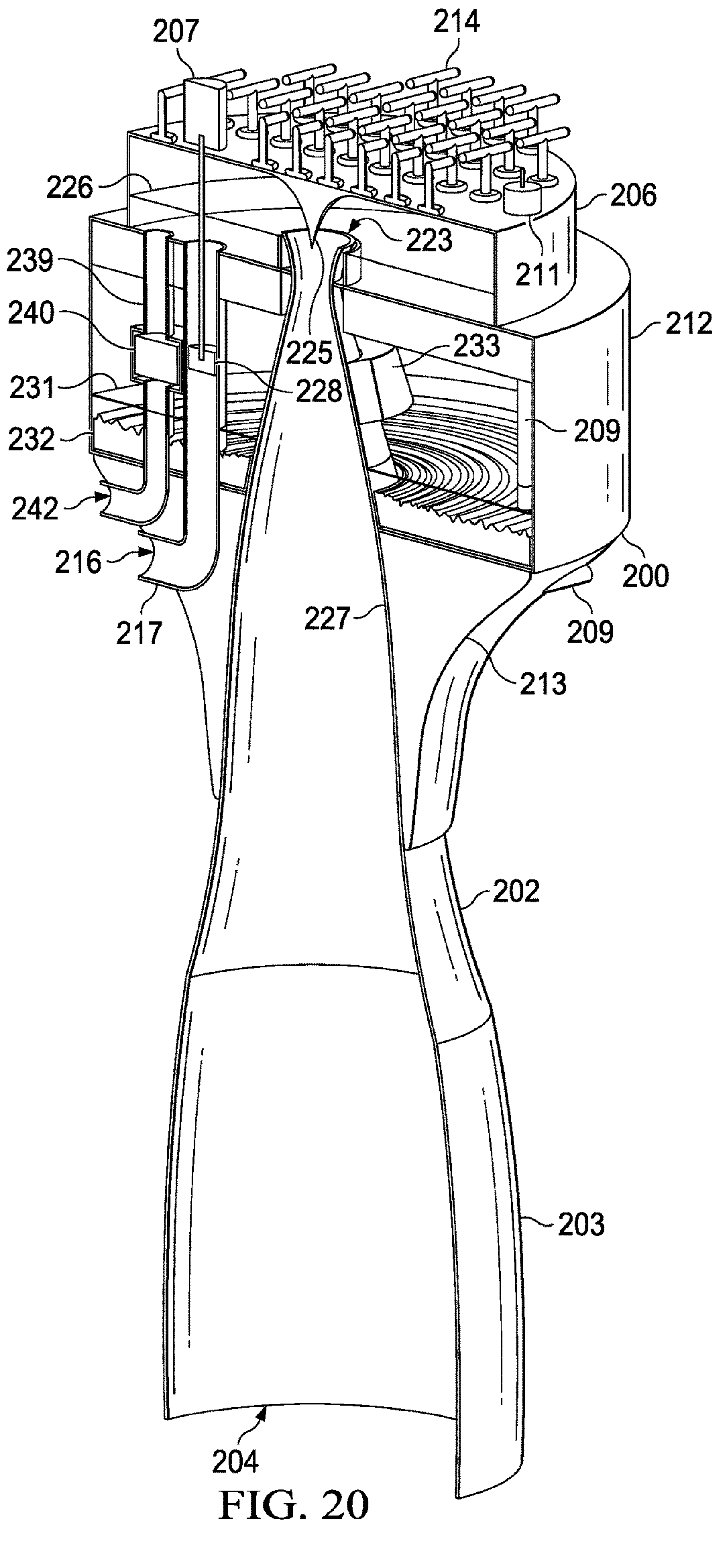
FIG. 20 is a sectional view of the embodiment of FIG. 19 from a perspective orientation.

FIG. 20 shows the sectional view of FIG. 19 from a perspective orientation. FIGS. 19 and 20 show sectional views of an embodiment of the current disclosure that, with the exception of one added feature, is identical to the embodiment illustrated in FIGS. 8-18, and for this reason the elements of this augmented embodiment share the same numbers as their counterparts in the embodiment illustrated in FIGS. 8-18. With one exception, the sectional view illustrated in FIG. 20 is identical to the view illustrated in FIG. 15. In this perspective sectional view the water on which the embodiment floats, as well as the water 224 (FIG. 19) nominally inside the embodiment's inertial water tube 202, 203, 227, have been omitted to afford greater clarity of the embodiment's structural design.

Figure 21:
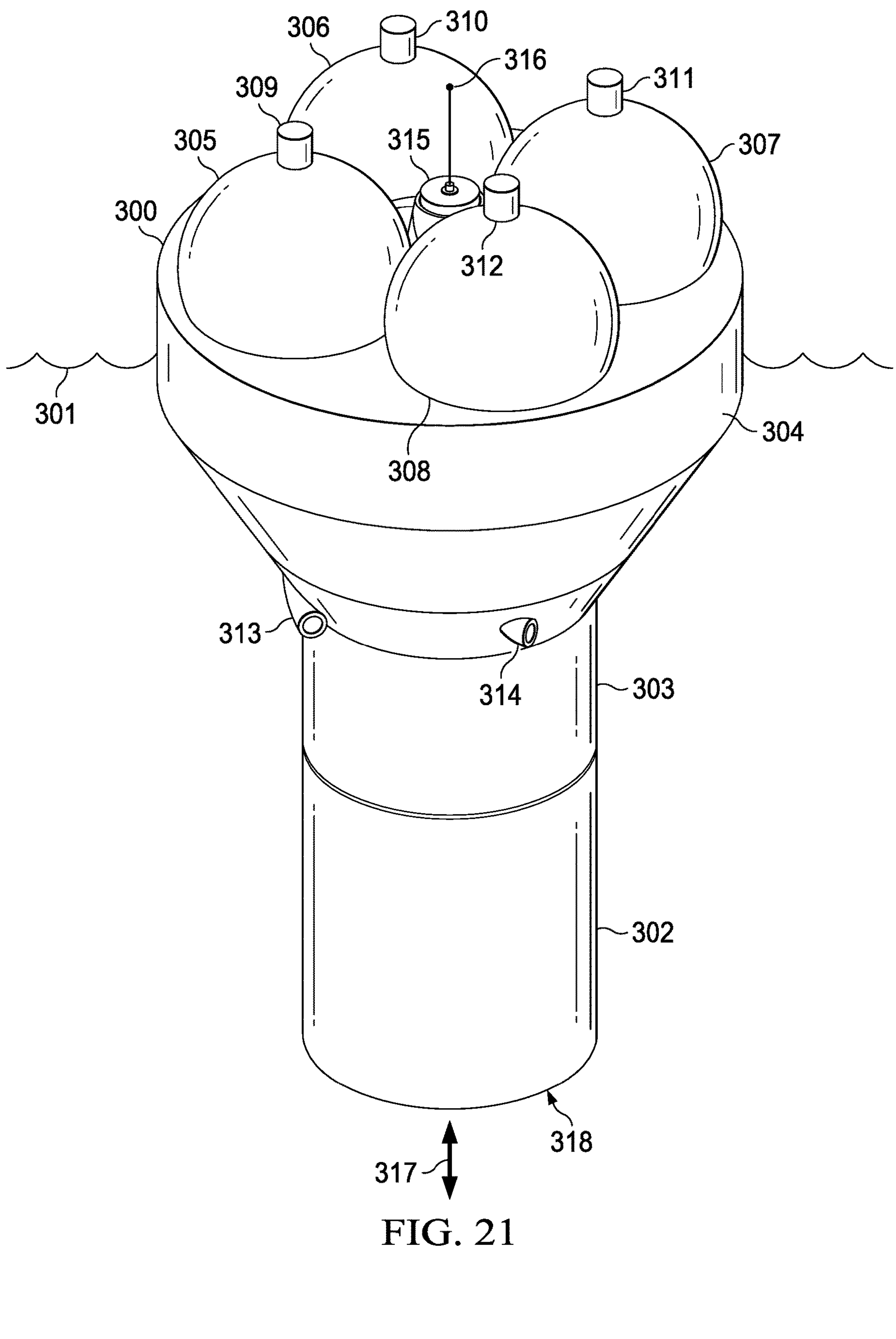
FIG. 21 is a side perspective view of another embodiment of the present invention.

FIG. 21 shows a side perspective view of an embodiment of the current disclosure.

The buoyant embodiment 300 floats adjacent to an upper surface 301 of a body of water over which waves tend to pass. The embodiment incorporates an inertial water tube 302 comprised of an approximately frusto-conical top portion (not visible) and an approximately cylindrical bottom portion 302. Surrounding the frusto-conical top portion of the inertial water tube is an annular ring 303 comprised of buoyant material that provides the embodiment with at least a degree of permanent buoyancy and reduces the average density of the embodiment 300. A hollow chamber 304, enclosure, buoy, and/or portion of the embodiment provides structural support for four water reservoirs 305-308. And, each of the four water reservoirs 305-308 supports, and/or is attached to, a generator 309-312, respectively, that is operatively connected to a reservoir-specific water turbine (not visible).

As the embodiment 300 moves up and down in response to waves traveling across the surface 301 of the body of water on which it floats, water within the embodiment's inertial water tube 302 tends to oscillate in a direction approximately parallel to a longitudinal axis of the inertial water tube, occasionally ejecting water from tubes (not visible) and upper mouths and/or apertures (not visible) incorporated within and/or at an upper end of the inertial water tube 302. Water ejected from the top of the inertial water tube 302 enters one of the four water reservoirs 305-308 at an approximately tangential orientation to each respective water reservoir's radially-symmetrical interior, thereby tending to induce in the water therein a swirling motion.

Water within each water reservoir 309-312 flows back to the body of water 301 through a respective effluent pipe e.g., 313 and 314, each effluent pipe of which is oriented so as to release and/or discharge its effluent in an approximately lateral direction and to thereby generate a propulsive thrust that tends to move the embodiment in a lateral direction (e.g., in a direction parallel to the surface 301 of the body of water on which the embodiment floats). Two effluent pipes at a "front side" of the embodiment (the side adjacent to reservoirs 305 and 306) are angled so as to release water in a direction that is, to a degree, tangential to the embodiment, and tends to produce both forward (to the left of the illustrated embodiment) and tangential thrust, the tangential thrust tending to cause the embodiment to turn relative to a vertical longitudinal axis of the embodiment.

The energy extracted by the water turbine within the effluent pipe operatively connected to each water reservoir 305-308 arises from both the gravitational potential energy (i.e., head pressure potential energy) of the water, and the rotational (or angular) kinetic energy of the water's swirling.

Attached to an upper surface of the exterior wall of the inertial water tube 302 is a computer chamber 315 compartment, enclosure, and/or module that contains a plurality of computing devices, components, and/or other electronic components, modules, systems, and/or equipment. The computing devices within the computer chamber 315 are energized with electrical power generated at least in part by the generators 309-312. And, the computing devices within the computer chamber 315 receive instructions, programs, and/or data from a remote transmitter, e.g., from a satellite, by means of encoded electromagnetic signals transmitted to, and captured by, an antenna 316. Completed computational results and data are transmitted to a remote transmitter, e.g., to a satellite, by means of encoded electromagnetic signals transmitted from antenna 316. For clarity, as in all embodiments of this disclosure, such a computer chamber can be located anywhere in and/or on the embodiment, and in some embodiments it is located at least partially below a mean waterline of the embodiment and has an outer wall, and/or an operatively connected heat exchanger, that is in contact with the water 301 on which the embodiment floats so as to allow the ambient external water to cool the computer chamber.

Water flows 317 into, and out from, a lower mouth 318 at a bottom end of inertial water tube 302.

The hollow chamber 304, enclosure, and/or portion of the embodiment is able to contain a variable and/or adjustable volume and/or mass of water ballast, e.g., comprised of water. The volume of that water ballast may be adjusted by the embodiment's control system (not shown) through its activation and/or control of one or more pumps (not shown) which are able to remove water from the water ballast, thereby reducing the embodiment's draft, and to add water to the water ballast, thereby increasing the embodiment's draft.

Figure 22:
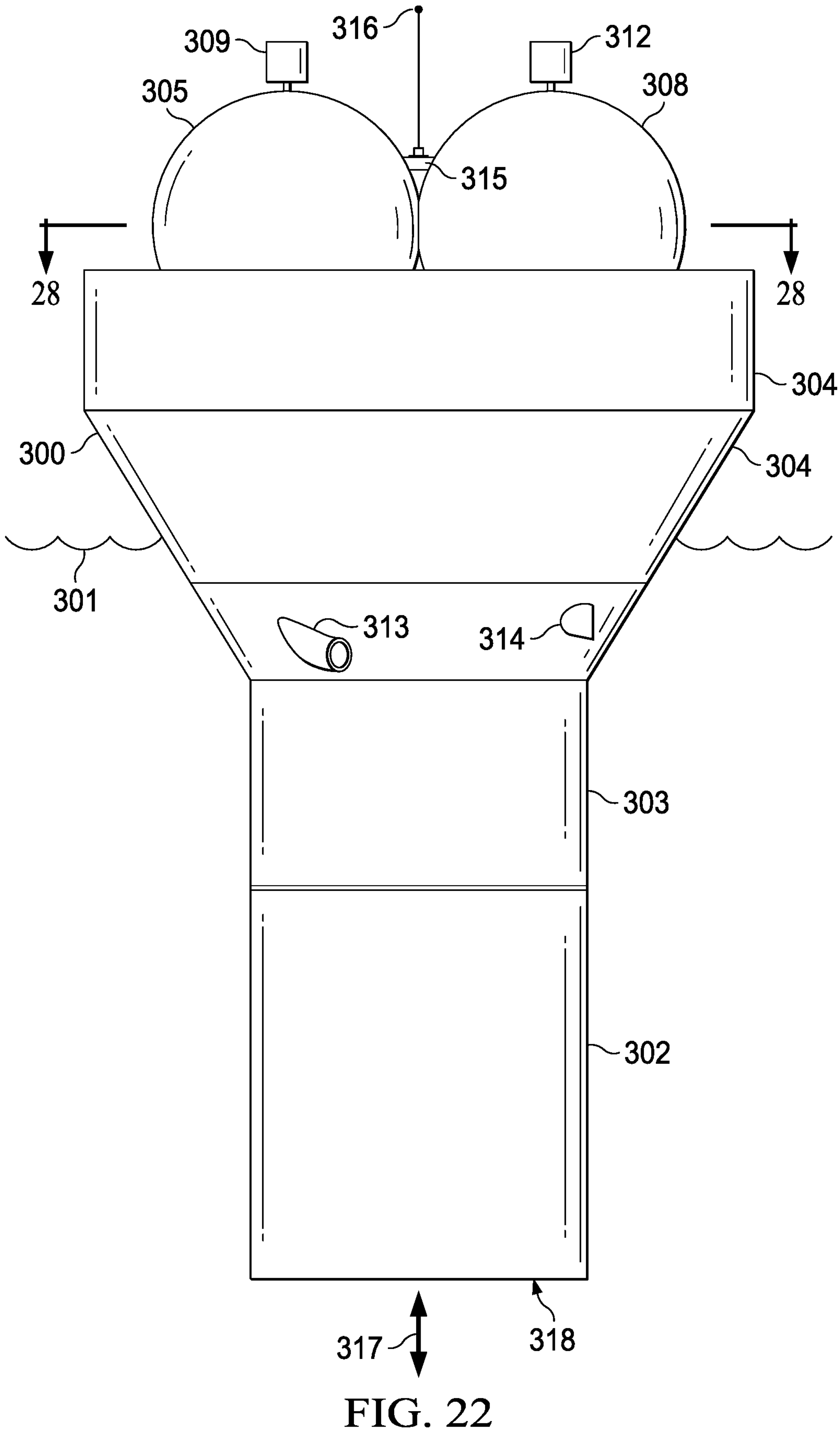
FIG. 22 is a side view of the embodiment of FIG. 21.

FIG. 22 shows a side view of the same embodiment of the current disclosure that is illustrated in FIG. 21.

In response to the discharge of water from the water reservoirs 305-308, the embodiment 300 will tend to be propelled to the left (with respect to the embodiment orientation illustrated in FIG. 22).

Figure 23:
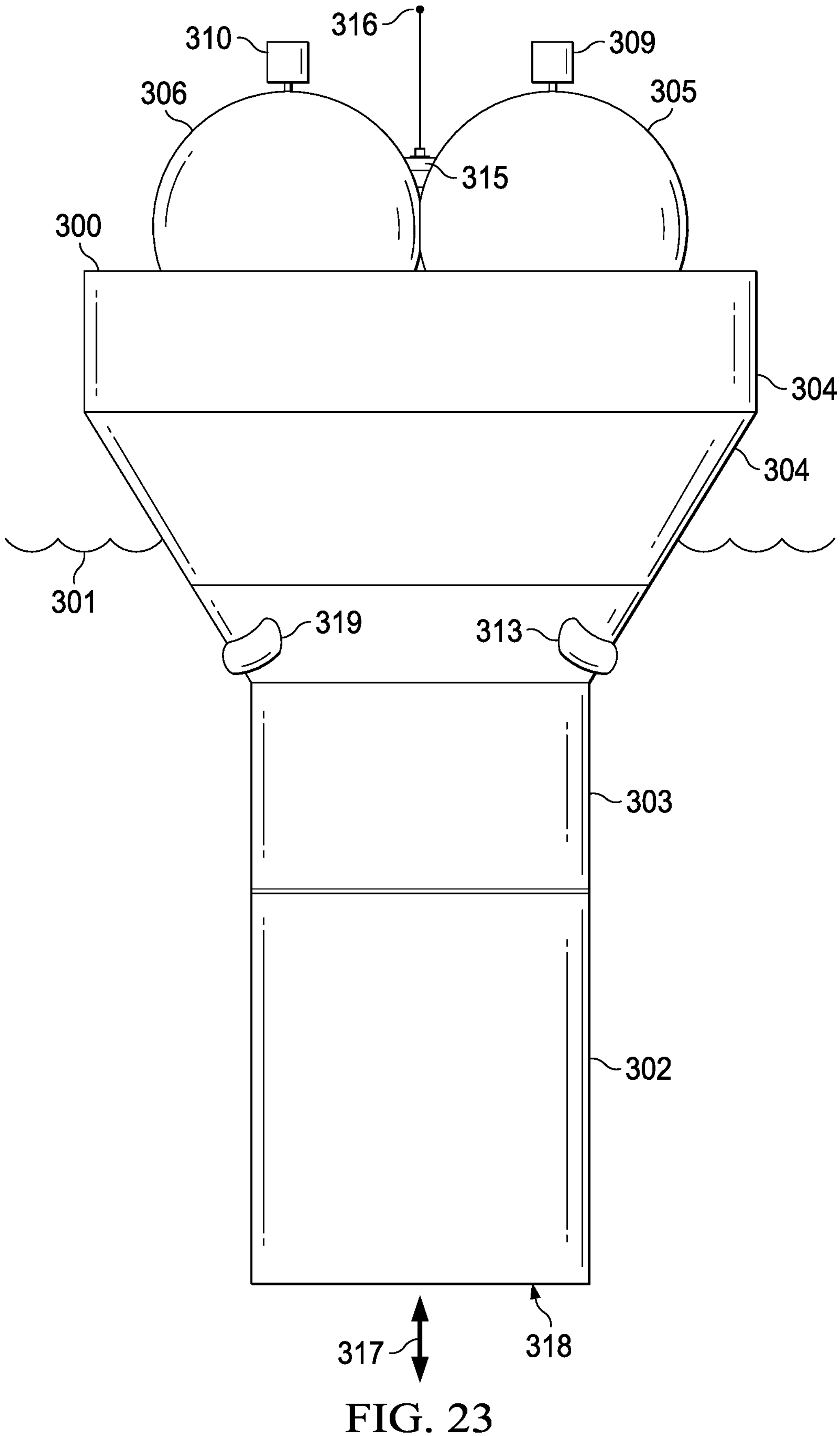
FIG. 23 is a front-side view of the embodiment of FIGS. 21 and 22.

FIG. 23 shows a front-side view of the same embodiment of the current disclosure that is illustrated in FIGS. 21 and 22.

A discharge of water from water reservoir 306 through and/or from effluent pipe 319 will tend to generate a first tangential thrust that, at least to a degree, will tend to cause the embodiment 300 to rotate about a vertical longitudinal axis in a counter-clockwise direction (as viewed from above the embodiment). Whereas a discharge of water from water reservoir 305 through and/or from effluent pipe 313 will tend to generate a second tangential thrust that, at least to a degree, will tend to cause the embodiment 300 to rotate about a vertical longitudinal axis in a clockwise direction (as viewed from above the embodiment).

By adjusting the relative rates at which water flows from the water reservoirs 306 and 305 and out of the respective effluent pipes 319 and 313, such that those rates of relative outflow and/or discharge are unequal and/or imbalanced, a differential torque can be applied to the embodiment, causing the embodiment to turn about a vertical axis in the direction dictated by the effluent pipe with the greater rate of flow. By contrast, when the rates of outflow and/or discharge out of effluent pipes 319 and 313 are approximately equal, then the embodiment will tend to move forward in a lateral direction across the surface 301 of the body of water on which the embodiment floats (e.g., in a direction normal to, and out of the page, and toward the reader, with respect to the orientation of the embodiment illustrated in FIG. 23) without appreciable turning.

A control system and/or module (not shown) controls the relative torques, and or resistance, imparted by generators 310 and 309 to their respective water turbines (not visible, inside respective effluent pipes 319 and 313) in order to control the relative rates of outflow and/or discharge of water from effluent pipes 319 and 313, respectively. By increasing the torque and/or resistance imparted by a generator to its respective operatively connected shaft and water turbine, the embodiment's control system can reduce the rate at which water flows out of that generator's respective effluent pipe. Conversely, by reducing the torque and/or resistance imparted by a generator to its respective operatively connected shaft and water turbine, the embodiment's control system can increase the rate at which water flows out of that generator's respective effluent pipe. Thus, by controlling and/or adjusting the torque and/or resistance imparted by a generator to its respective operatively connected shaft and water turbine, the embodiment's control system can control and/or adjust the rate and direction at which the embodiment will turn, thereby allowing the control system to steer the embodiment with respect to the thrust, and/or components of thrust, that tend to propel the embodiment forward. However, in some embodiments, increasing and reducing the torque imparted by a generator is not used to adjust the rate of flow out of a generator's respective effluent pipe, but instead, a valve is used to adjust the rate of flow. In either case, the turbine or valve is a species of flow governor that limits the flow rate of water from the respective reservoir so as to maintain a relatively constant flow out of the embodiment despite the fact that injections of water to the respective reservoir is sporadic and stochastic.

Figure 24:
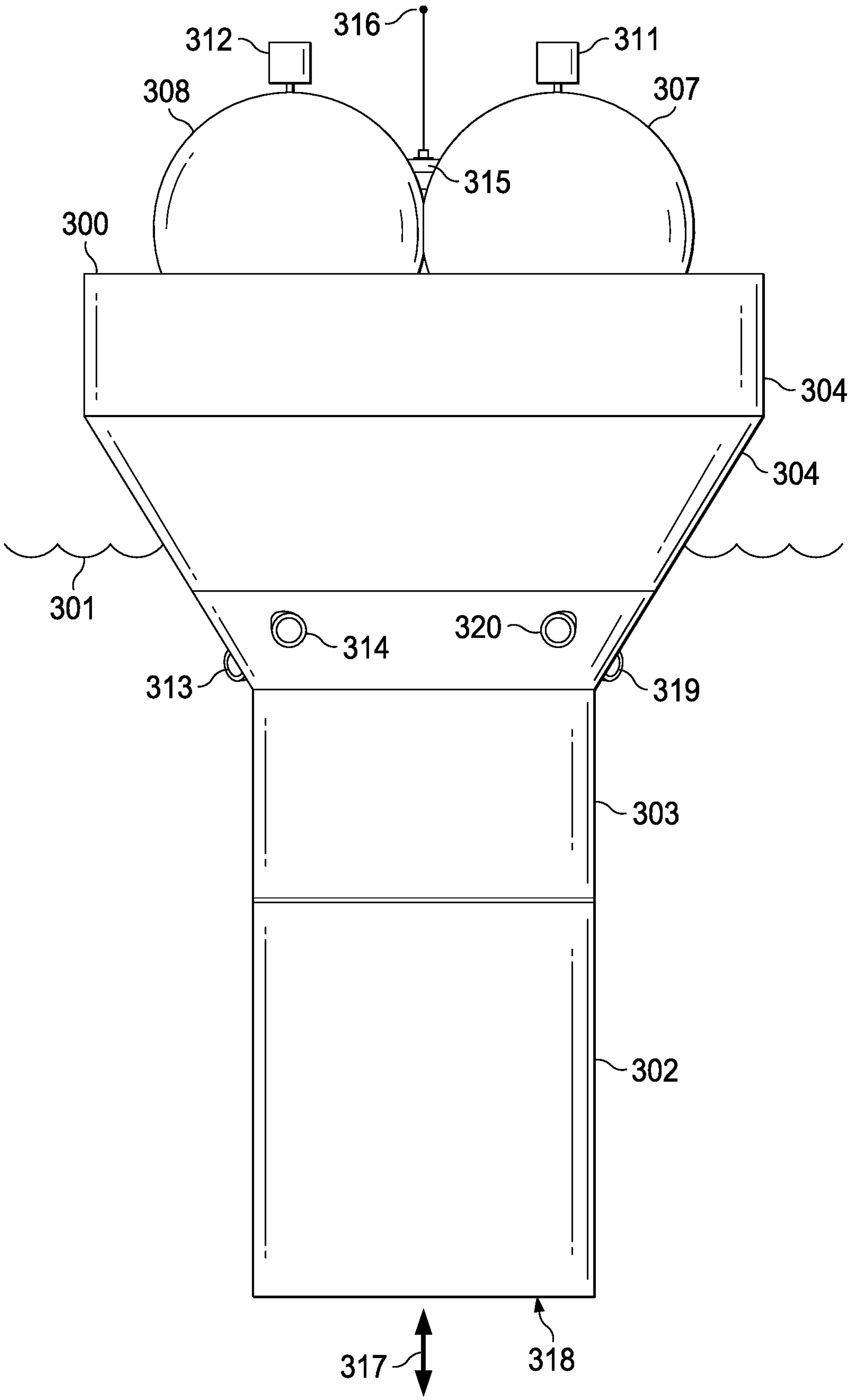
FIG. 24 is a back-side view of the embodiment of FIGS. 21-23.

FIG. 24 shows a back-side view of the same embodiment of the current disclosure that is illustrated in FIGS. 21-23.

Water that flows from water reservoirs 305-308 and is discharged into the body of water 301 through effluent pipes 313, 319, 320, and 314, respectively, tends to generate and/or produce, at least to a degree, thrust that tends to the propel the embodiment forward (i.e., normal to, and into, the page with respect to the embodiment orientation illustrated in FIG. 24).

Figure 25:
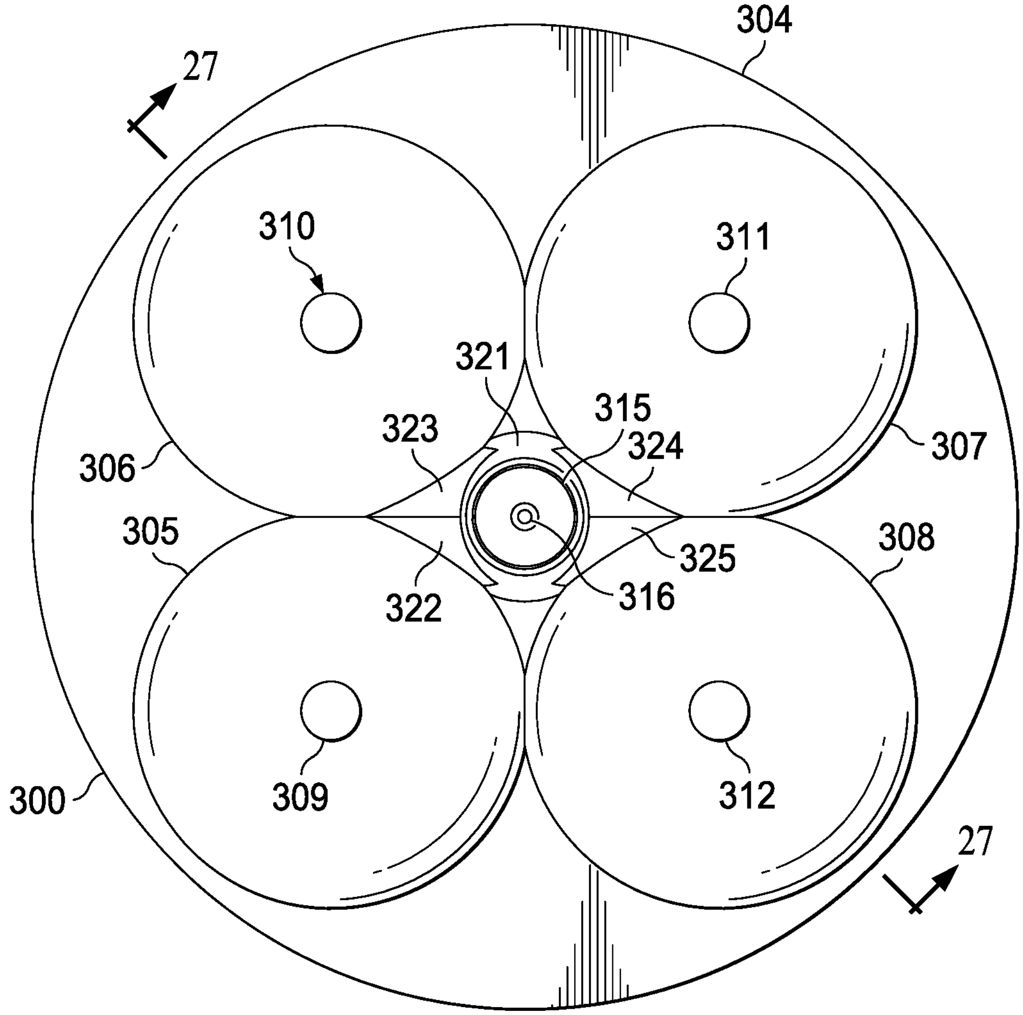
FIG. 25 is a top-down view of the embodiment of FIGS. 21-24.

FIG. 25 shows a top-down view of the same embodiment of the current disclosure that is illustrated in FIGS. 21-24.

Embodiment 300 floats at the surface of a body of water and tends to move up and down in response to passing waves. As the embodiment rises and falls, water within an inertial water tube 302 (in FIG. 24) and 321 moves up and down within the tube. Occasionally, water reaches an upper end 321 of the inertial water tube with sufficient energy to be ejected through one of four ejection pipes 322-325, and/or branching tubes, that are connected to the main tube 302/321. At the distal end of each ejection pipe is an aperture or mouth (not visible) through which the water escapes the respective ejection pipe. Each ejection pipe 322-325 discharges water into its respective water reservoir 305-308 at, near, and/or adjacent to, the periphery of the respective water reservoir so as to tend to cause water within each water reservoir to rotate and/or swirl about a respective longitudinal and/or vertical axis (e.g., an axis of approximate radial symmetry).

Computer chamber 315 is attached to an upper end of inertial water tube 321, and antenna 316 is attached to an upper surface of the computer chamber 315.

Figure 26:
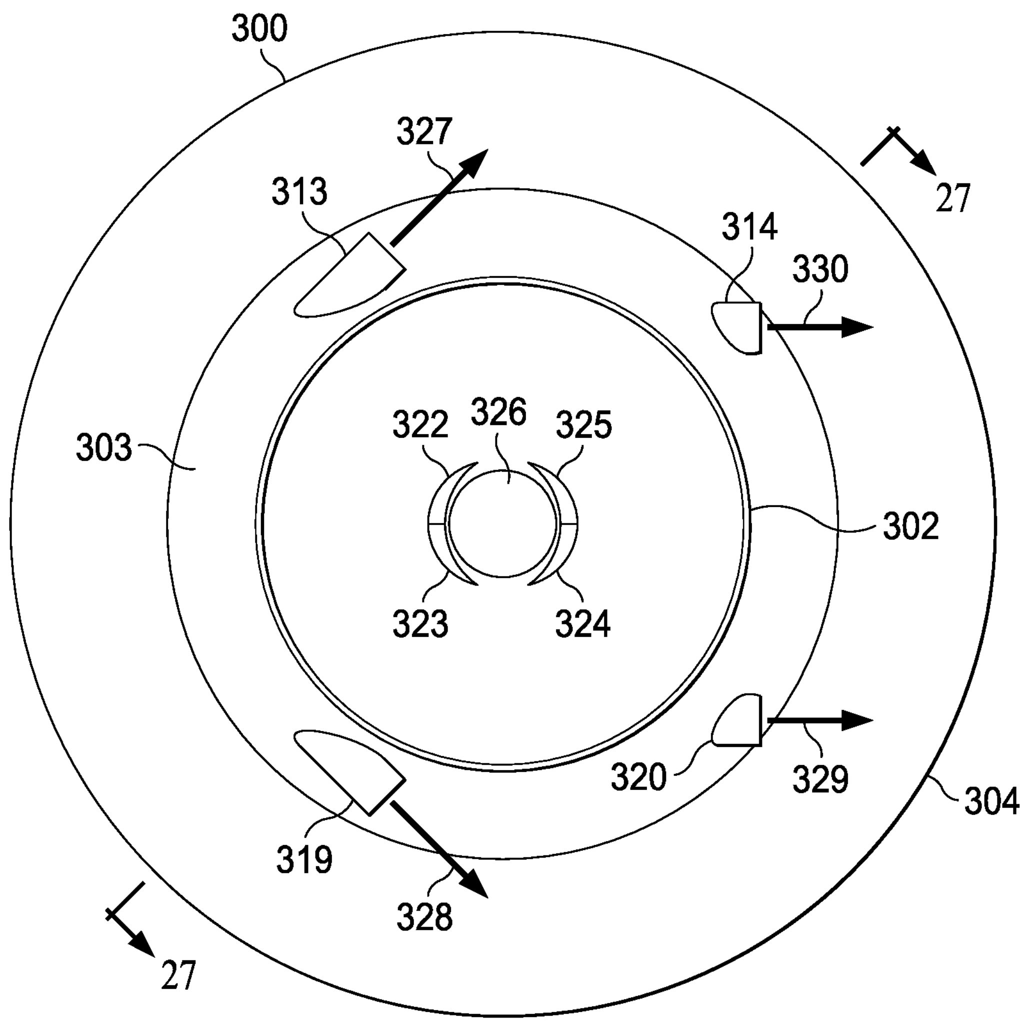
FIG. 26 is a bottom-up view of the embodiment of FIGS. 21-25.

FIG. 26 shows a bottom-up view of the same embodiment of the current disclosure that is illustrated in FIGS. 21-25.

As the embodiment 300 moves up and down in response to passing waves, water inside inertial water tube 302 tends to move up and down. Occasionally, water rising within tube 302 reaches the upper interior wall 326 of the tube and is thereby blocked. Upon reaching, or almost reaching, the top inertial tube wall 326, water rising within tube 302 tends to move laterally through apertures and/or ejection pipes 322-325, after which portions of such diverted flows of water may flow into corresponding and/or respective water reservoirs 305-308. When water reaches the upper end 326 of inertial water tube 302 with sufficient energy, then those portions of the inertial water tube's water that flow through ejection pipes 322-325 may still possess kinetic energy upon their ejection from those ejection pipes. Portions of such residual kinetic energy may be imparted to the water within the respective water reservoirs as rotational kinetic energy and/or angular momentum.

Water flowing from water reservoirs 305 and 306 (in FIG. 23), and out of respective thrust pipes 313 and 319, will tend to enter the body of water on which the embodiment floats, and flow in directions 327 and 328, respectively, thereby generating tangential thrust that will tend to apply equal and opposite turning torques to the embodiment (with respect to a vertical longitudinal axis of the embodiment) as well as equal degrees of forward thrust (i.e., to the left with respect to the orientation of the embodiment illustrated in FIG. 26). By adjusting the relative rates at which water flows out and/or is discharged from effluent pipes 313 and 319 the embodiment may be turned so as to steer a course through the water.

Water flowing from water reservoirs 307 and 308 (in FIG. 24), and out of respective thrust pipes 320 and 314, will tend to enter the body of water on which the embodiment floats, and flow in directions 329 and 330, respectively, thereby generating forward thrust. Because the water discharged from effluent pipes 320 and 314 is not discharged along an axis that passes through the centermost vertical longitudinal axis of the embodiment, a differential rate of flow through effluent pipes 320 and 314 (e.g., as might be manifested through the adjustment of the degrees to which respective generators 311 and 312 resist the turning of their respective water turbines) will also tend to impart a turning torque to the embodiment.

Figure 27:
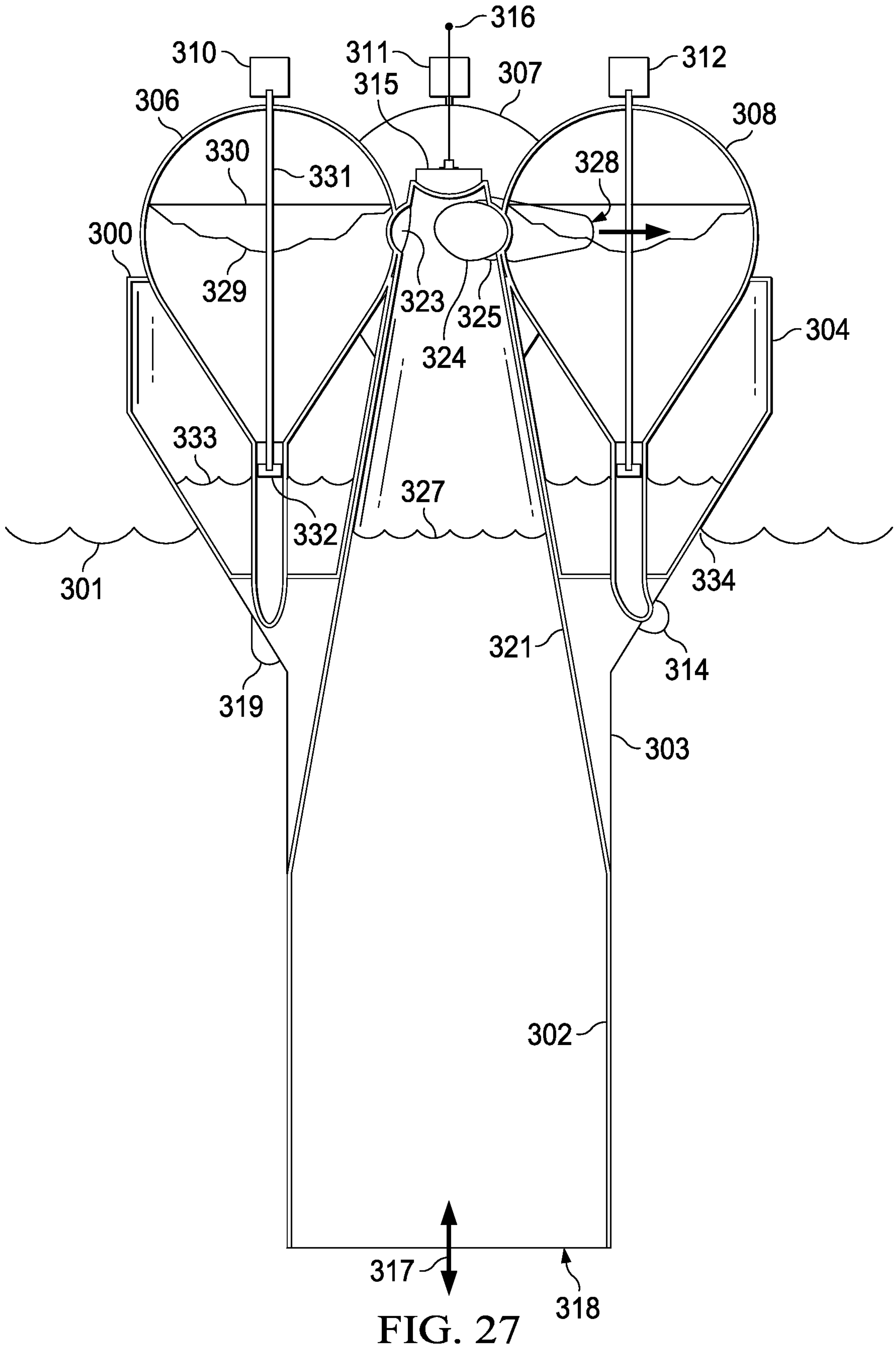
FIG. 27 is a side sectional view of the embodiment of FIGS. 21-26.

FIG. 27 shows a side sectional view of the same embodiment of the current disclosure that is illustrated in FIGS. 21-26, where the section is taken along the section line 27-27 specified in FIGS. 25 and 26.

As the embodiment 300 moves up and down in response to passing waves, water inside inertial water tube 302/321 tends to move up and down. When the level 327 of the water inside the inertial water tube 302/321 rises high enough to reach the ejection pipes, e.g., 325, water will flow from the vertical inertial water tube 302/321 and through the ejection pipes, e.g., 325, and flow into a respective water reservoir, e.g., 308, from a point and/or aperture, e.g., 328, that is adjacent to the approximately circular interior wall of the respective reservoir, e.g., 308. The approximately tangential discharge of water from the ejection pipes, e.g., 325, into the respective water reservoirs, e.g., 308, tends to induce a swirling motion or vortex within the water trapped within each respective water reservoir. Thus, the sectional profile of the water within each reservoir can tend to be similar to that of a vortex wherein the level 329 of the water near the center of the vortex tends to the lower than the level 330 of the water at its periphery.

Adjacent to, and attached to, an upper exterior surface of each water reservoir, e.g., 306, is a generator, e.g., 310. Depending from, and operatively connected to, each generator, e.g., 310, is a turbine shaft, e.g., 331. A lower end of each shaft, e.g., 331, is connected to a water turbine, e.g., 332. Water, e.g., 330, from each water reservoir drains and/or flows into an effluent pipe, e.g., 319, wherein the rotational kinetic energy and head pressure of the flowing water imparts rotational kinetic energy to a respective water turbine, e.g., 332, therein. Water that flows through and past each water turbine is discharged into the body of water 301 through an effluent pipe discharge mouth at a lower end of each respective effluent pipe, e.g., 319, thereby generating lateral thrust that tends to push against the embodiment in a direction normal to the embodiment's vertical longitudinal axis and/or approximately parallel to the resting surface 301 of the body of water on which the embodiment floats.

Within the hollow interior of hollow chamber 304 is water ballast 333. A pump (not shown) allows the embodiment's control system (not shown) to alter, adjust, and/or control, the level, volume, and/or mass, of the water ballast within the hollow chamber 304, thereby allowing the embodiment's control system to adjust, and/or control, the mass of the embodiment, its displacement, its draft, and its waterline 334. When the mass of the ballast 333 is reduced, the embodiment tends to rise in the water concomitantly lowering its waterline and decreasing its draft. Because the bottom portion of hollow chamber 304 is tapered, and because the cross-sectional area of the hollow chamber 304 decreases with increasing vertical distance from the top of the embodiment, e.g., the top of antenna 316, a lowering of the embodiment's waterline 334 tends to reduce the embodiment's waterplane area. This in turn tends to reduce the fraction of the available wave energy that is imparted to the embodiment, while also increasing the energy threshold that must be reached in order for water rising within inertial water tube 302/321 to reach and escape the ejection pipes. Thus, reducing the water ballast 333 tends to insulate, at least to a degree, the embodiment from excessive wave energy as might be encountered during storms.

On the other hand, when wave conditions are of and/or at suboptimal energy levels, e.g., during relatively calm conditions, then the embodiment's control system (not shown) can increase the level 333 of the water ballast, thereby raising the waterline, increasing the embodiment's draft, and increasing the embodiment's waterplane area, and thereby increasing the fraction of the available wave energy that is imparted to the embodiment. The raising of the embodiment's waterline also can tend to reduce the energy threshold that must be reached in order for water rising within inertial water tube 302/321 to reach and escape the ejection pipes. Thus, in an energy-poor wave climate, raising the waterline will tend to allow a greater volume of the less energetic water oscillating within the tube 302/321 to be collected and discharged through the embodiment's water turbines. Increasing the water ballast 333 tends to compensate, at least to a degree, for the reduction in energy generation that an embodiment might otherwise experience as a consequence of reduced wave energies.

It should be noted that, as in other embodiments of this disclosure, the shown figure (and in particularly the vertical length of the cylindrical tube segment 302/321) is not necessarily to scale. In particular, the vertical length of the inertial water tube 302/321 (measured from bottom 318 to top 315) may be 2, 3, 4, 5, or more, times the maximum horizontal diameter of the hollow chamber 304. In an embodiment of the present disclosure, the vertical length of the inertial water tube 302/321 can be 100-200 meters or more, while the horizontal diameter of the hollow chamber 304 is 40-50 meters. In another embodiment of the present disclosure, the vertical length of the inertial water tube 302/321 can be 25 meters, while the horizontal diameter of the hollow chamber 304 can be 8 meters.

Figure 28:
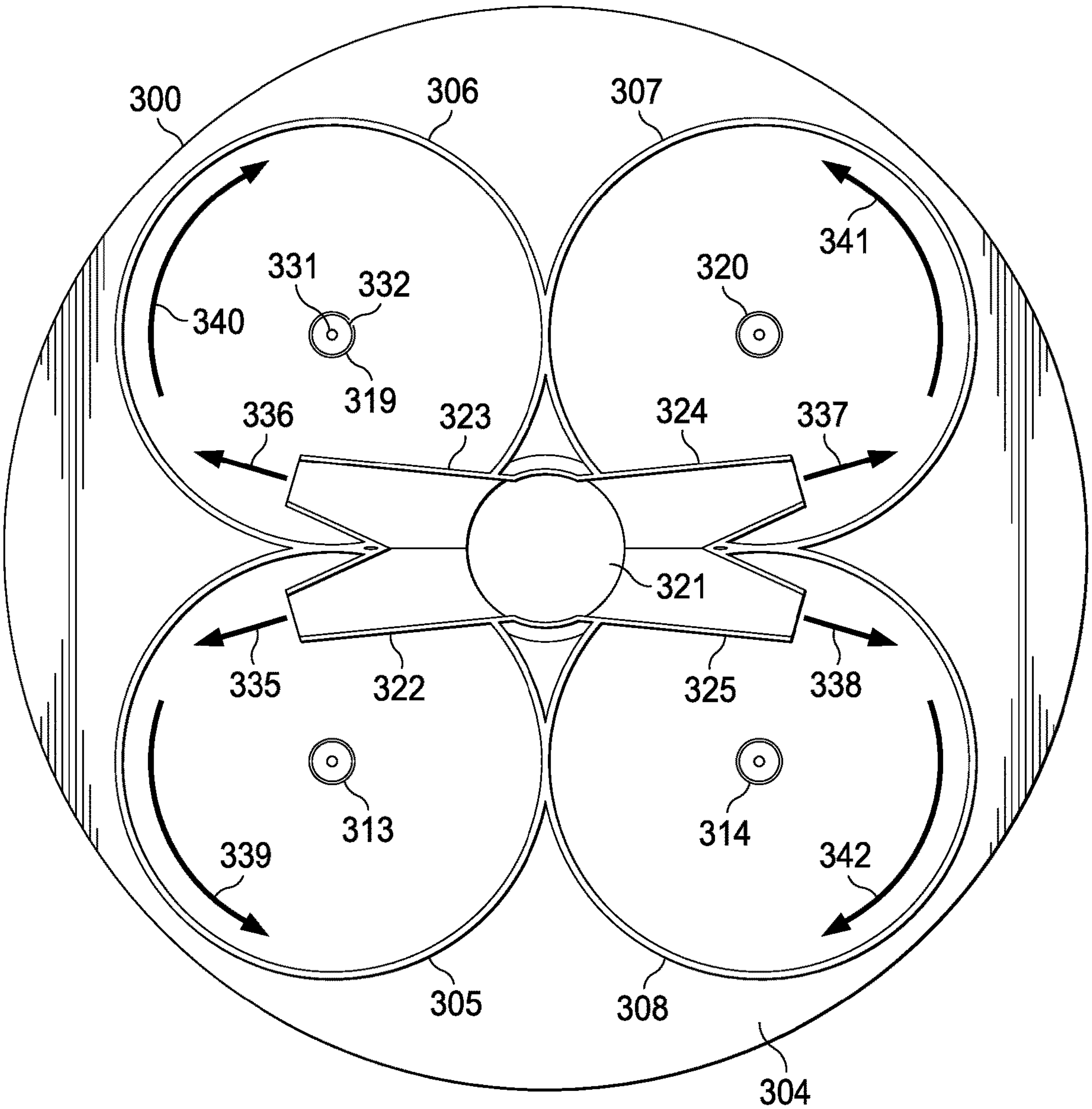
FIG. 28 is a top-down sectional view of the embodiment of FIGS. 21-27.

FIG. 28 shows a top-down sectional view of the same embodiment of the current disclosure that is illustrated in FIGS. 21-27, where the section is taken along the section line 28-28 specified in FIG. 22.

In response to wave-induced motion of the embodiment, water oscillates approximately vertically and/or longitudinally within the central vertical inertial water tube 321 of the embodiment 300. Occasionally, water rises within inertial water tube 321 with enough vigor that some of that water enters, and is subsequently discharged from, ejection pipes 322-325. Water discharged from ejection pipes 322-325 is ejected and/or discharged 335-338 into water reservoirs 305-308 in a direction approximately tangential to vertical longitudinal axes of approximate radial symmetry of the respective reservoirs 305-308. Because of their approximately circular horizontal cross-sections, especially at the vertical level at which water is discharged into them by the ejection pipes 322-325, water discharged 335-338 into water reservoirs 305-308 tends to induce swirling motions, e.g., 339-342, in the water contained within the reservoirs.

In order to reach, and then be discharged from, ejection pipes, water within an embodiment's inertial water tube 321 must achieve enough gravitational potential energy to rise as high as the embodiment's ejection pipes. The induction and/or creation of swirling in the waters stored within an embodiment's water reservoir(s) permits not only the capture of a portion of the gravitational potential energy of the water ejected from an embodiment's inertial water tube, it also permits the capture of a portion of any kinetic energy remaining within the discharged water (i.e., the amount of the kinetic energy, if any, that remains within the rising and/or discharged water after the requisite amount of kinetic energy in the rising water has been converted into the gravitational potential energy required by the water to reach the ejection pipes).

The water captured within the water reservoirs possesses head pressure potential energy (i.e., gravitational potential energy), and, because of the induced swirling motion of that water, the water also possesses rotational kinetic energy (i.e., angular momentum). By capturing and extracting portions of both of these types of energy, the efficiency of an embodiment of the present disclosure is increased.

Figure 29:
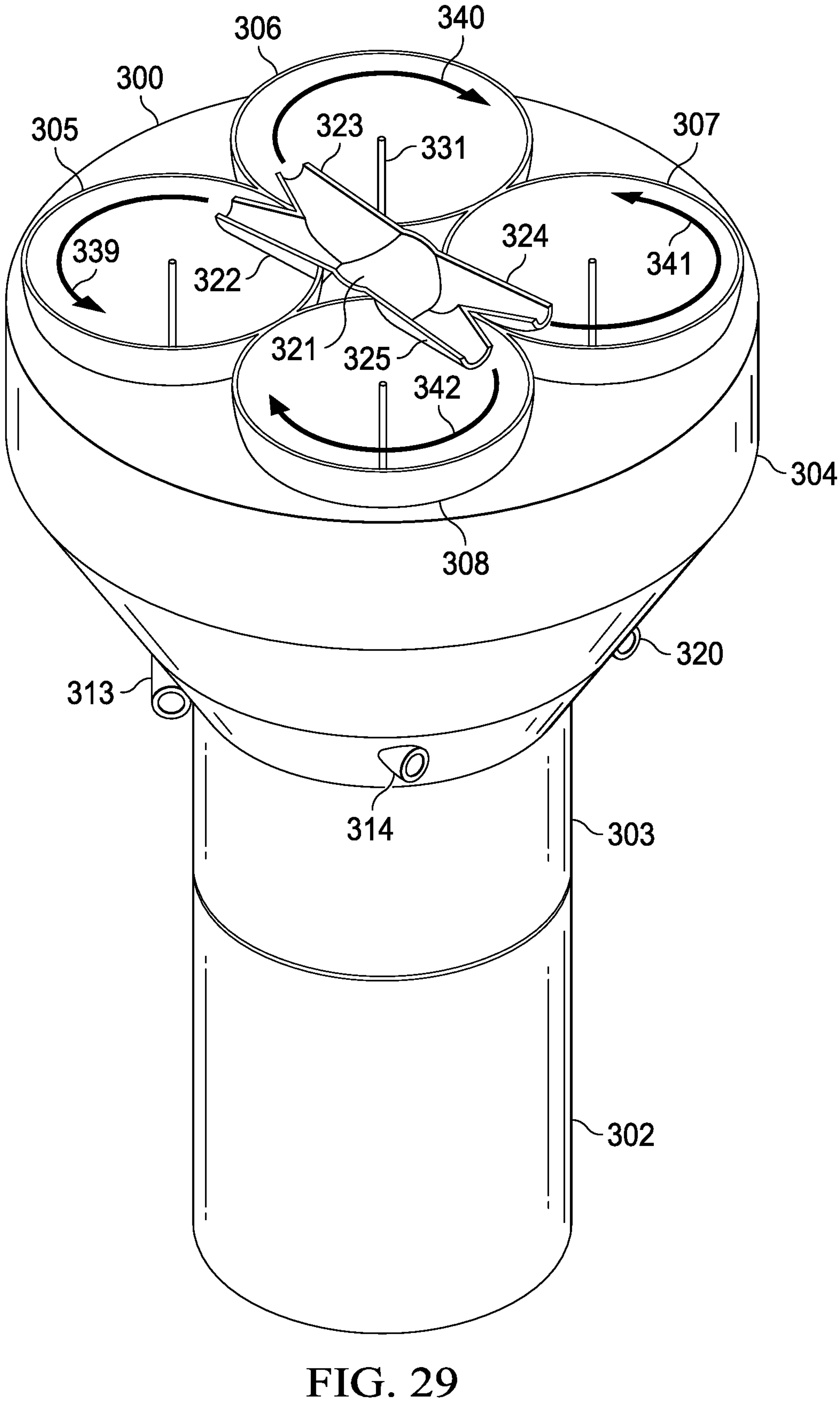
FIG. 29 is a horizontal sectional view from a perspective orientation of the embodiment of FIGS. 21-28.

FIG. 29 shows the horizontal sectional view of FIG. 28 from a perspective orientation, and illustrates the same embodiment of the current disclosure that is illustrated in FIGS. 21-28.

In the embodiment configuration illustrated in FIGS. 21-29, the water discharged from the four ejection pipes 322-325 induces vortices that are counter-rotating, i.e., the vortices of reservoirs 305 and 307 swirl in directions opposite the vortices of reservoirs 306 and 308.

Figure 30:
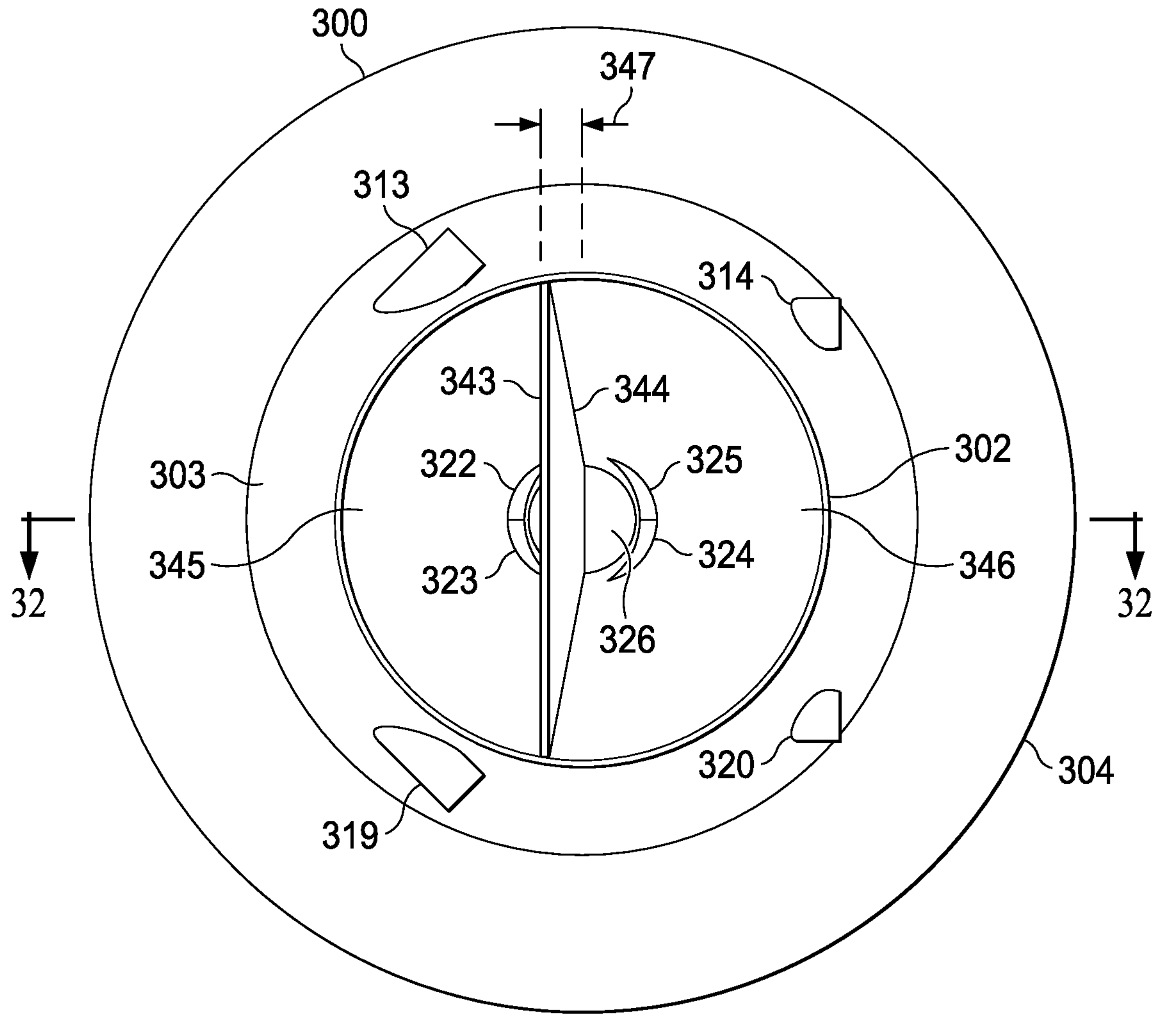
FIG. 30 is a bottom-up view of another embodiment of the present invention that is similar to the one illustrated in FIGS. 21-29.

FIG. 30 shows a bottom-up view of an embodiment of the current disclosure that is similar to the one illustrated in FIGS. 21-29. And, the view illustrated in FIG. 30 is identical to the one illustrated in FIG. 26 except that the one illustrated in FIG. 30 incorporates a partition, wall, divider, and/or wall 343-344 within its inertial water tube 302 that extends from the bottom-most mouth of inertial water tube up to the uppermost wall 326 of the inertial water tube. Partition 343-344 creates two distinct and operationally independent channels within inertial water tube 302 through which water may flow and/or oscillate up and down, e.g., in response to wave-induced motions of the embodiment.

An upper part or portion 344 of the partition dividing tube 302 into two adjacent channels 345 and 346 is angled as its centermost longitudinal angle maintains a constant angular orientation with respect to the vertical longitudinal axis of the upper tapered portion of tube 302. A lower part or portion 343 of the partition dividing tube 302 into two adjacent channels 345 and 346 is approximately parallel to the vertical longitudinal axis of the cylindrical lower portion of tube 302.

The lower portion 343 of the partition wall is parallel to the central longitudinal axis of the inertial water tube, but is not positioned at the center of the inertial water tube, i.e., the partition wall is offset 347 from the longitudinal axis and/or from the lateral center of the inertial water tube 302. Because the partition wall 343 does not pass through the center of the inertial water tube 302, and is instead offset from such a central position, the flow-normal cross-sectional area of inertial water tube channel 345 is less than the flow-normal cross-sectional area of inertial water tube channel 346. Therefore, the average volume and/or mass of the water within inertial water tube channel 345 will tend to be less than the average volume and/or mass of the water within inertial water tube channel 346, and each channel will likely be most responsive to different wave heights, wave periods, wave states, and/or wave conditions.

Water flowing and/or oscillating within inertial water tube channel 345 occasionally flows into and out of ejection pipes 322 and 323, thereby flowing into respective water reservoirs 305 and 306. Water flowing and/or oscillating within inertial water tube channel 346 occasionally flows into and out of ejection pipes 324 and 325, thereby flowing into respective water reservoirs 307 and 308.

Because inertial water tube channels 345 and 346 have different relative cross-sectional areas, different included angles, and, in light of their approximately equal lengths, different volumes, each of the two inertial water tube channels will tend to oscillate most vigorously at different resonant frequencies, and will therefore tend to supplement their respective reservoirs at differing rates with respect to the same wave climate. However, and of greater benefit, will be their tendency to extend the range of wave climates over which at least one of the embodiment's two inertial water tube channels is supplementing its respective reservoirs at a relatively high rate.

Figure 31:
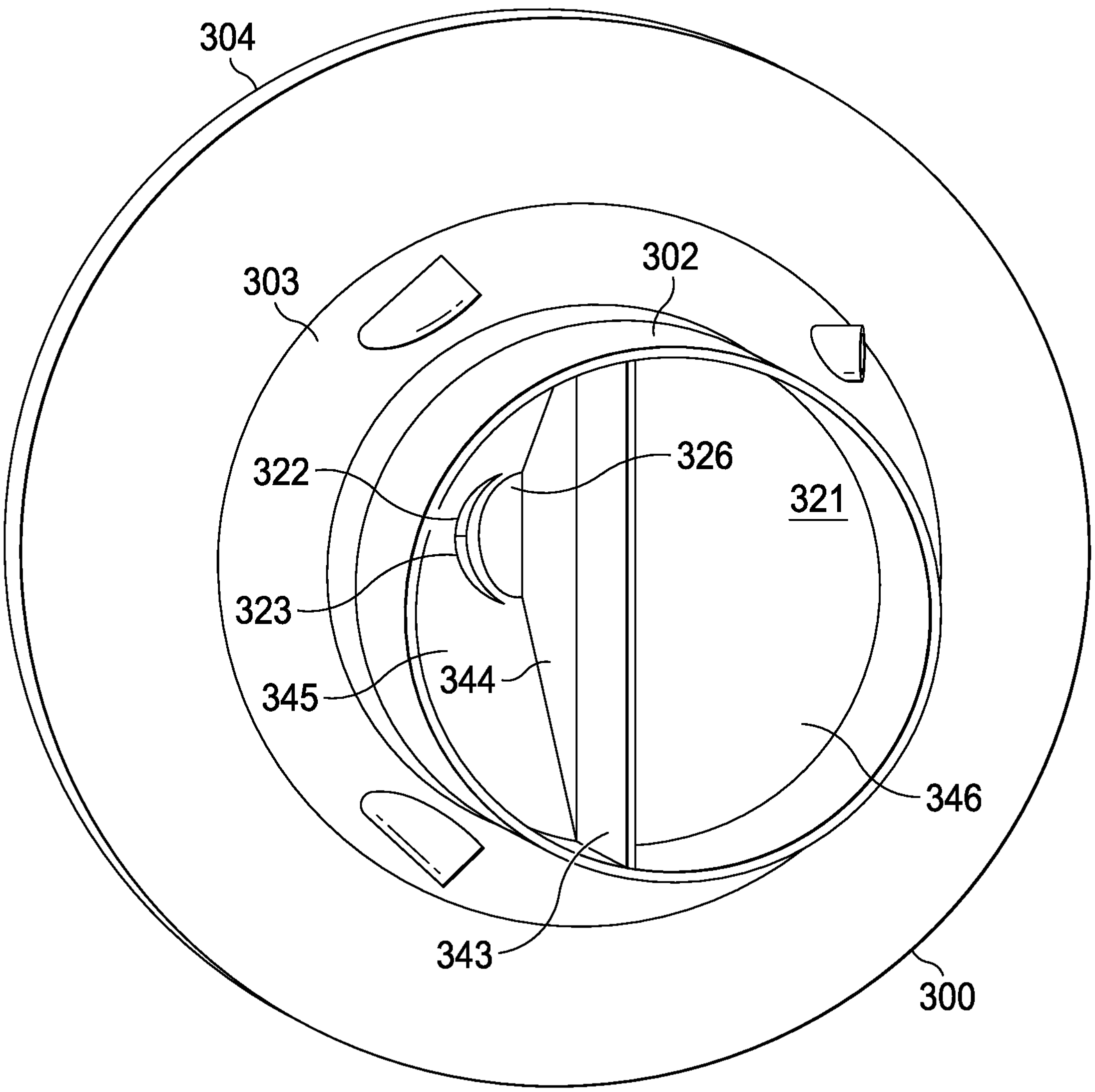
FIG. 31 is a bottom-up view of FIG. 30 from a perspective orientation, and illustrates the embodiment of FIG. 30.

FIG. 31 shows the bottom-up view of FIG. 30 from a perspective orientation, and illustrates the same embodiment of the current disclosure that is illustrated in FIG. 30, which is similar to the embodiment illustrated and discussed in FIGS. 21-29.

Figure 32:
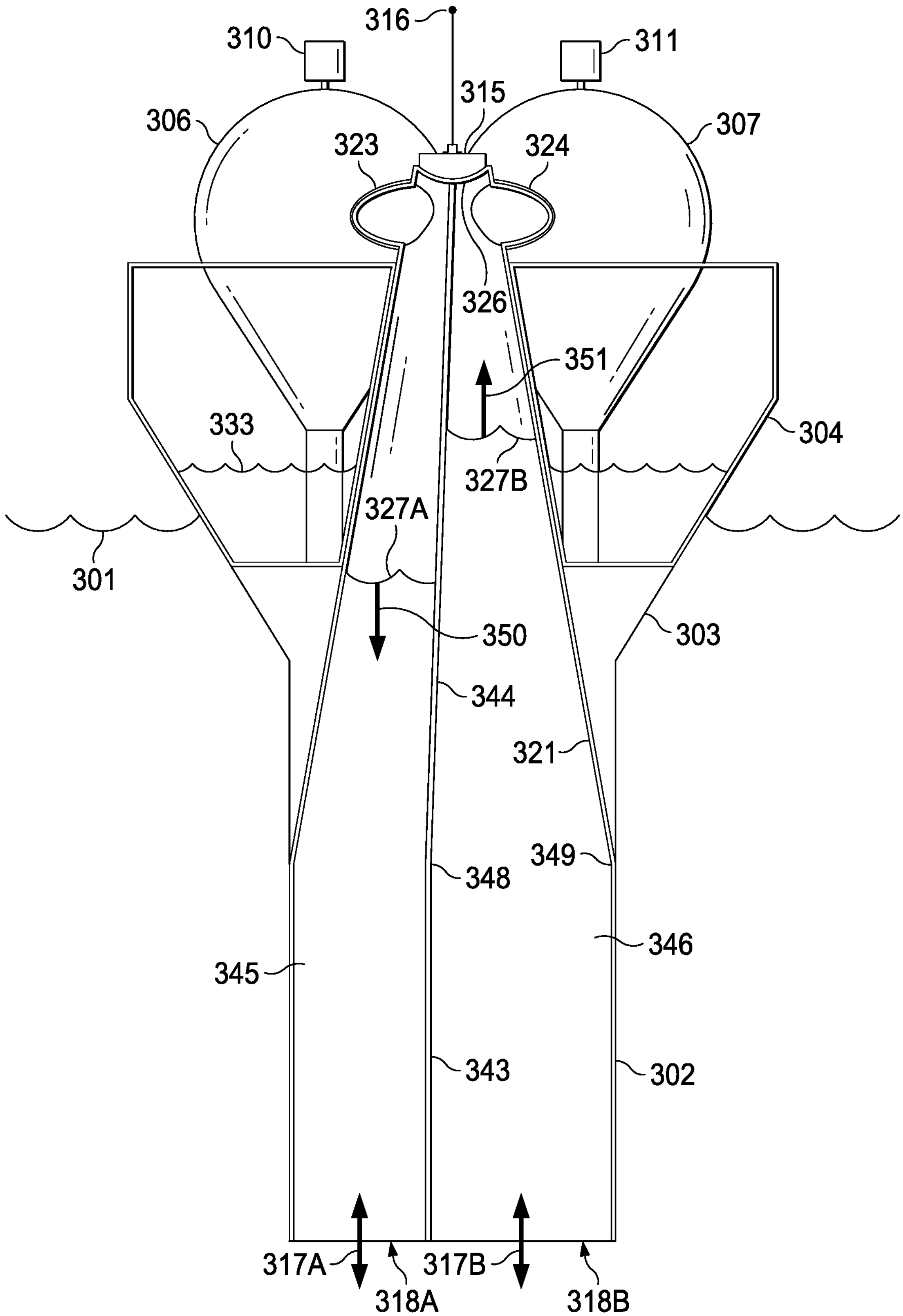
FIG. 32 is a side sectional view of the embodiment of FIGS. 30 and 31.

FIG. 32 shows a side sectional view of the same embodiment of the current disclosure that is illustrated in FIGS. 30 and 31, where the section is taken along the section line 32-32 specified in FIG. 30. The embodiment illustrated in FIG. 32 is identical to the one illustrated and discussed in FIGS. 21-29 except that it contains a partition or dividing wall 343-344 that divides its inertial water tube into two channels 345 and 346 which are of unequal volume. Within the lower cylindrical portion 302 of inertial water tube the dividing wall 343 is approximately vertical and parallel to the central vertical longitudinal axis of the tube 302/321. However, at a vertical position 348, approximately equal to the plane and/or point 349 at which the lower cylindrical portion 302 of the tube transitions to a conical tapered portion 321 wherein the flow-normal cross-sectional area begins to progressively decrease, the approximately vertical portion 343 of the partition wall that is approximately parallel to the vertical longitudinal axis of the tube 302/321 transitions to an angled portion 344 of the partition wall that has an approximately constant angular orientation with respect to the tube's vertical longitudinal axis. The upper end 344 of the partition wall is connected to the upper wall 326 of the inertial water tube. Thus, water rising to a sufficient height within tube 302/321 is forced to exit through one of the two ejection pipes on either side of the partition wall.

In the embodiment configuration and/or operational state illustrated in FIG. 32 the water 327A within inertial water tube channel 345 is descending 350, and some of the water therein is correspondingly flowing out 317A of that channel's lower mouth 318A. By contrast, the water 327B within inertial water tube channel 346 is rising 351 and some of the water therein is correspondingly flowing into 317B the inertial water tube channel through that channel's lower mouth 318B. Because the two inertial water tube channels 345 and 346 have different dimensions, flow-normal cross-sectional areas (with respect to any horizontal plane), included angles, and volumes, they will tend to have different resonant frequencies and therefore they will tend to produce optimal and/or maximal flows of water, and/or rates of water ejection, through their respective ejection pipes, and into their respective water reservoirs, e.g., 306 and 307, with respect to wave conditions of different wave amplitudes (and/or spectra or ranges of wave heights or amplitudes, e.g., with respect to different significant wave heights) and/or different wave periods (and/or spectra or ranges of wave periods, e.g., with respect to different dominant wave periods).

Figure 33:
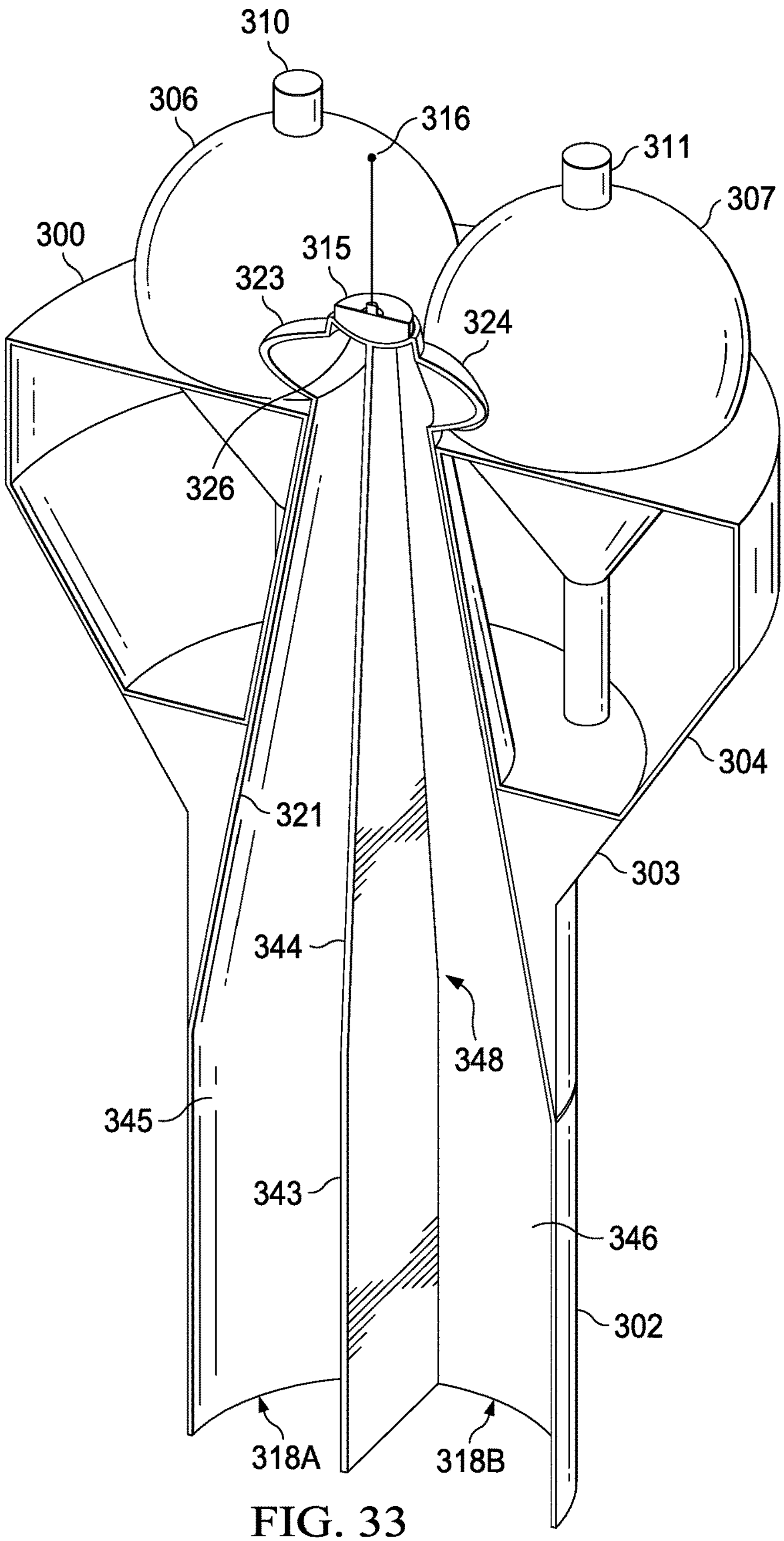
FIG. 33 is a sectional view of FIG. 32 from a perspective orientation, and illustrates the embodiment of FIGS. 30-32.

FIG. 33 shows the sectional view of FIG. 32 from a perspective orientation, and illustrates the same embodiment of the current disclosure that is illustrated in FIGS. 30-32, which, with the exception of a single modification is the same embodiment that is illustrated and discussed in FIGS. 21-29. In this perspective sectional view, only the structural elements are included in the illustration, and all water is omitted for the sake of clarity.

Figure 34:
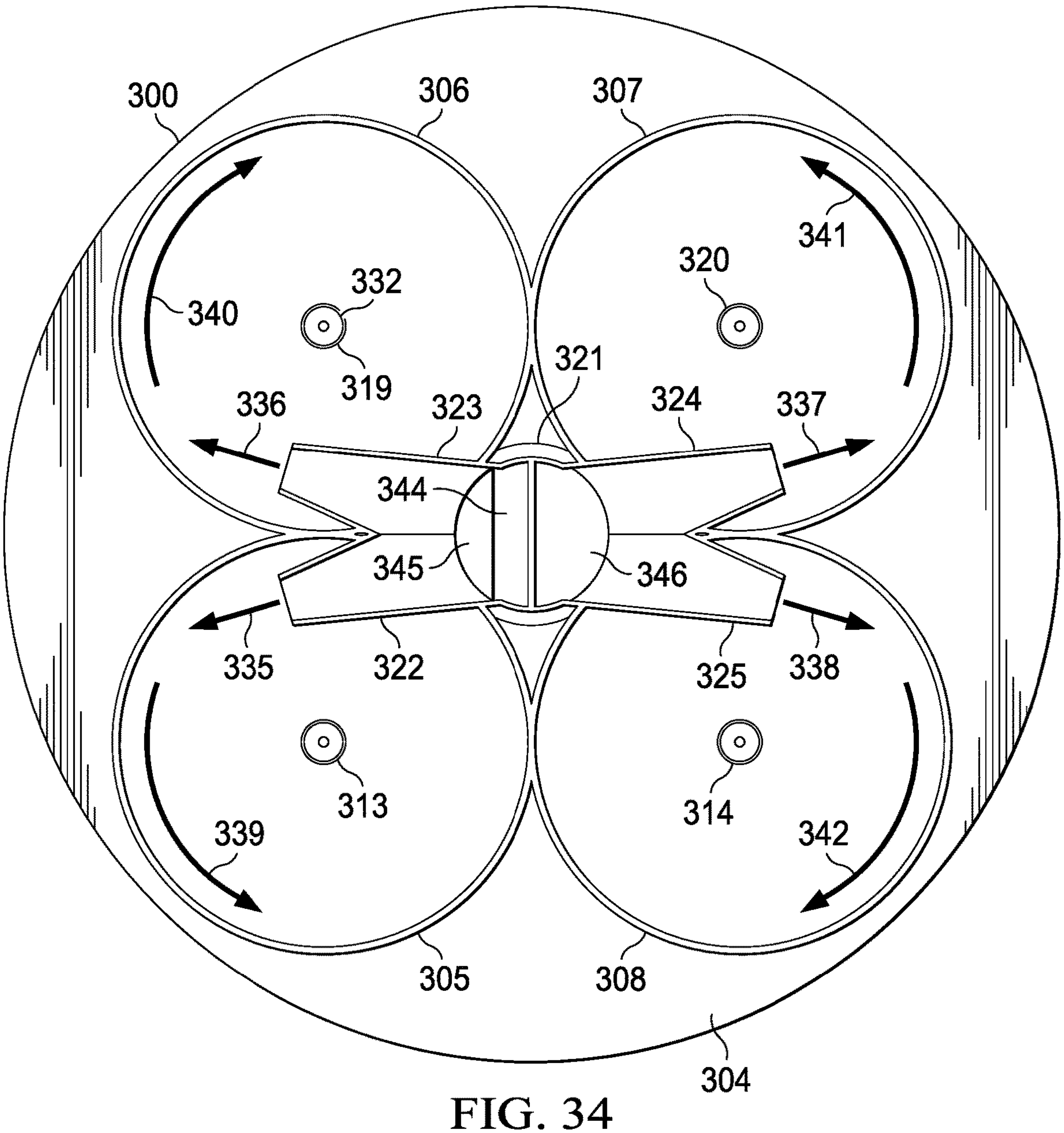
FIG. 34 is a top-down sectional view of the embodiment of FIGS. 30-33.

FIG. 34 shows a top-down sectional view of the same embodiment of the current disclosure that is illustrated in FIGS. 30-33, which, with the exception of a single modification, is the same embodiment that is illustrated and discussed in FIGS. 21-29. The sectional view illustrated in FIG. 34 the same as the one illustrated in FIG. 28 except that the embodiment illustrated in FIG. 34 includes a partition and/or dividing wall 344 that separates its inertial water tube into greater and lesser inertial water tube channels 345 and 346. The sectional views illustrated in FIGS. 28 and 34 are taken along the section line 28-28 specified in FIG. 22.

Any water that rises to the top of inertial water tube 321 within inertial water tube channel 345 is forced by wall 344 to exit through one of the ejection pipes 322 or 323. Likewise, any water that rises to the top of inertial water tube 321 within inertial water tube channel 346 is forced by wall 344 to exit through one of the ejection pipes 324 or 325. And, because of their tendency to be characterized by different resonant frequencies, the water within each inertial water tube channel 345 and 346 will tend to exhibit a maximum rate of flow into its respective reservoirs in response to different wave climates.

Figure 35:
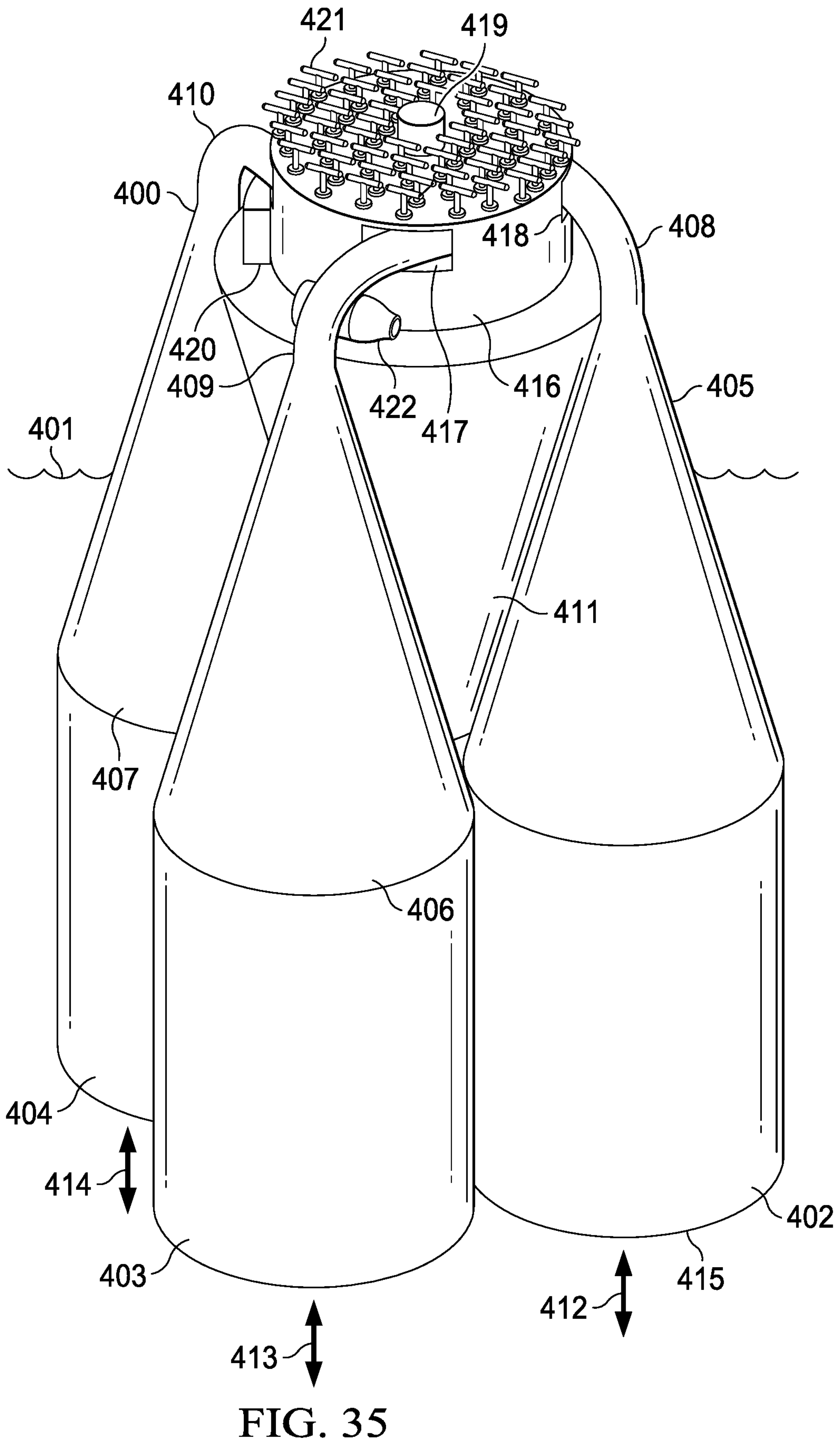
FIG. 35 is a side perspective view of another embodiment of the present invention.

FIG. 35 shows a side perspective view of an embodiment of the current disclosure.

The buoyant embodiment 400 floats adjacent to an upper surface 401 of a body of water over which waves tend to pass. The embodiment incorporates four inertial water tubes each of which is comprised of a lower cylindrical portion, e.g., 402-404, a conical middle portion, e.g., 405-407, and an upper curved cylindrical portion, e.g., 408-410. The conical portions of the four inertial water tubes, e.g., 405-407, are attached to a central and/or centermost approximately frusto-conical hollow chamber 411, enclosure, buoy, and/or portion, that buoyantly holds the embodiment at the surface 401 of the body of water, and/or imbues the embodiment with an average density sufficiently less than that of that of water so that the embodiment floats adjacent to the surface 401 of a body of water.

As the embodiment rises and falls in response to waves traveling across the surface 401 of the body of water on which the embodiment floats, water enters and leaves, e.g., 412-414, the inertial water tubes, e.g., 402407, through the respective lower mouths, e.g., 415, at the base of each inertial water tube, and the water within each inertial water tube tends to move up and down, and/or oscillate, in a direction approximately parallel to the longitudinal axis of the respective inertial water tube. Occasionally, water rises within one or more of the embodiment's inertial water tubes with sufficient speed, energy, momentum, and/or force, to cause a portion of that water to enter, and pass through, the ejection pipes, e.g., 408-410, at the upper end of each inertial water tube. Each inertial water tube's respective ejection pipe enters a central, shared, and/or common, water reservoir 416 through a space, e.g., 417-418, in a side wall of the water reservoir 416. Water is discharged into the water reservoir 416 from each ejection pipe in a direction that is approximately tangential to the flow-normal, and/or horizontal, cross-section of the water reservoir. Because of its tangential discharge and/or ejection into the water reservoir, any residual kinetic energy, speed, and/or momentum, in the water discharged from an ejection pipe will induce, and/or magnify, a swirling motion in the water within the water reservoir 416.

Water within the water reservoir flows and/or drains back to the body of water 401 on which the embodiment floats through an effluent pipe within which is a water turbine that is operatively connected to a generator 419. The generator 419 is attached to an upper exterior surface of the water reservoir 416. At least a portion of the electrical power generated by generator 419, and/or by the embodiment, is used to power a plurality of computing devices, circuits, modules, and/or systems, contained within a computer chamber 420, enclosure, box, container, housing, and/or locker. Some of the computing devices within computer chamber 420 perform and/or execute computational tasks specified by code, programs, instructions, and/or data transmitted by, and/or originating from, a remote transmitter (e.g., a satellite) and received as encoded electromagnetic signals by a phased array antenna 421 attached to an upper exterior surface of the water reservoir 416. Some of the computational results produced by the computing devices within computer chamber 420 are transmitted to a remote receiver (e.g., a satellite) by the phased array antenna 421.

The computer chamber is in thermal contact with a portion of the water reservoir's 416 wall thereby allowing a portion of the heat generated by the computing devices within the computer chamber 420 to pass into the water within the water reservoir 416, and thereby facilitating the passive and/or conductive cooling of those computing devices.

Some of the electrical power generated by generator 419, and/or by the embodiment, is used to energize one or both of a pair of ducted fans, e.g., 422, which are used to propel and steer the embodiment across the surface 401 of the body of water on which the embodiment floats, and/or to maintain the embodiment's geospatial position at the surface 401 of that body of water. In some embodiments, the geospatial position of the device is monitored and/or controlled using GPS signals.

Figure 36:
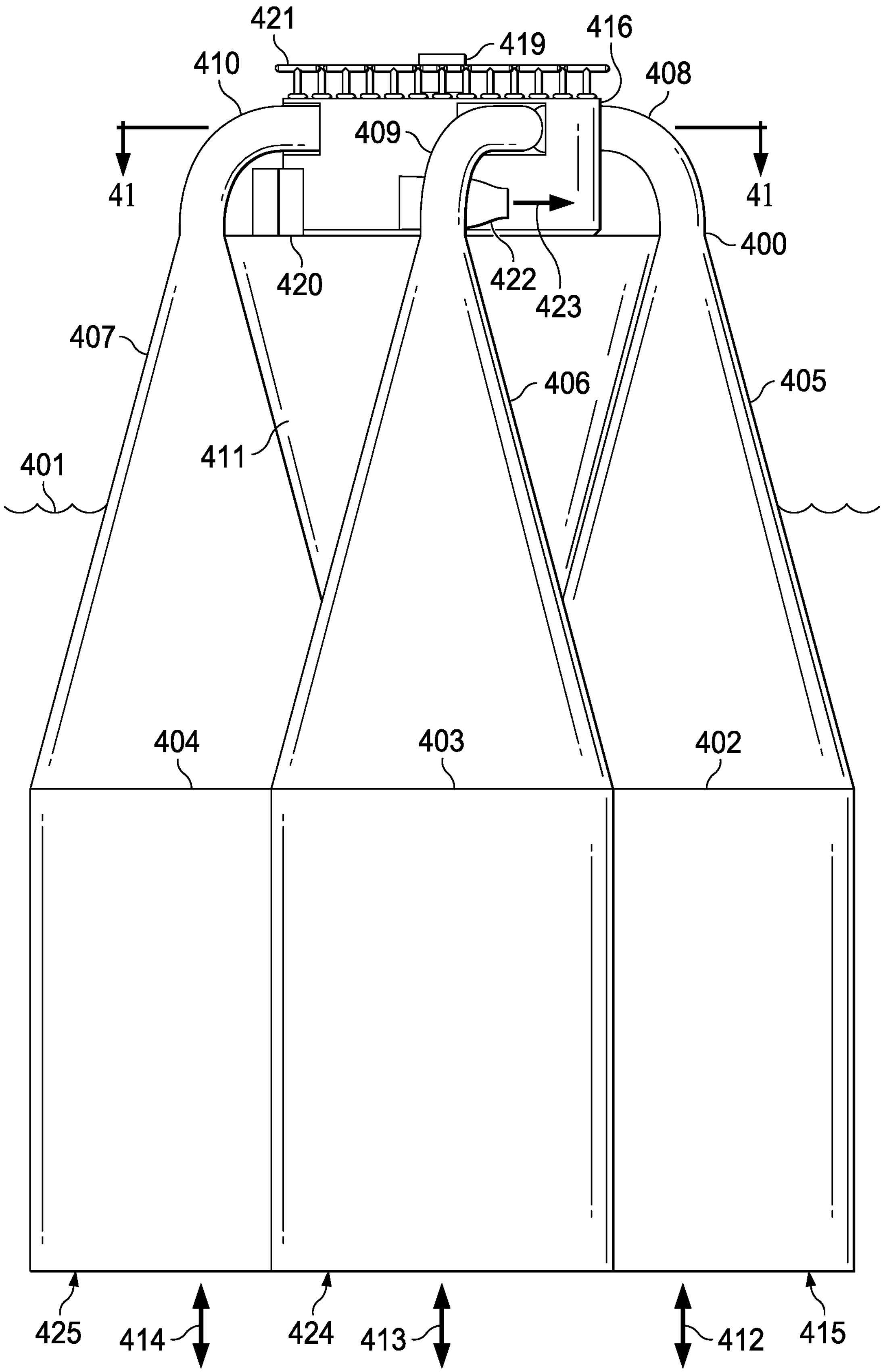
FIG. 36 is a side view of the embodiment of FIG. 35.

FIG. 36 shows a side view of the same embodiment of the current disclosure that is illustrated in FIG. 35.

Ducted fan 422 is energized, at least in part, by electrical power generated by the embodiment 400, and/or the embodiment's generator 419, and it blows 423 a forceful stream of air, generating thrust, thereby tending to propel the embodiment forward (i.e., to the left with respect to the embodiment orientation illustrated in FIG. 36) across the surface 401 of the body of water on which it floats.

At the bottom end of each of the embodiment's four inertial water tubes, e.g., 402-404, is a lower mouth, e.g., 415, 424 and 425, into and out of which tends to flow, e.g., 412-414, water when the embodiment rises and falls in response to passing waves.

Figure 37:
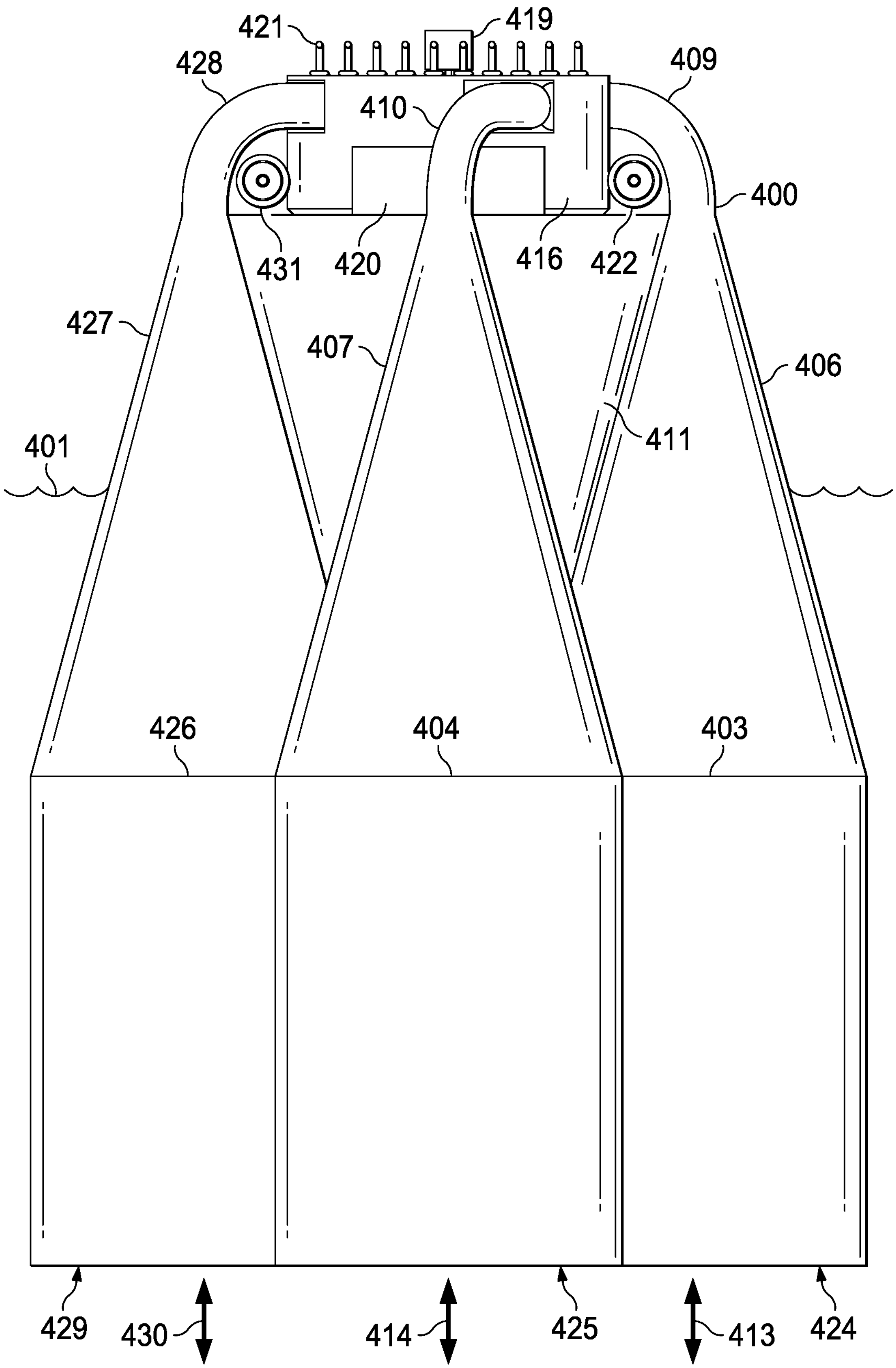
FIG. 37 is a front-side view of the embodiment of FIGS. 35 and 36.

FIG. 37 shows a front-side view of the same embodiment of the current disclosure that is illustrated in FIGS. 35 and 36.

Four inertial water tubes, e.g., 406, 407, and 427, each of which incorporates a lower cylindrical portion 403, 404, 426, and 402 (in FIG. 35) and an upper an approximately frusto-conical middle portion 406, 407, 427, and 405 (in FIG. 35), tend to be partially filled with water, and that water tends to oscillate up and down, in directions approximately parallel to the longitudinal axes of their respective inertial water tubes, in response to wave-induced oscillations of the embodiment. Each inertial water tube contains an upper, curved ejection pipe 409, 410, 428, and 408 (in FIG. 35). At an upper end of each ejection pipe (i.e., at the upper and/or distal end of each ejection pipe 408-410 and 428 is an upper mouth through water may be discharged and/or ejected into water reservoir 416. And, at a lower end of each inertial water tube is a lower mouth 424, 425, 429, and 415 (in FIGS. 35 and 36), through which water inside the inertial water tubes communicates with the water 401 outside the embodiment by freely moving 413, 414, 430, and 412 (in FIGS. 35 and 36) through the respective lower mouths.

A pair of ducted fans 422 and 431 provide propulsive thrust to the embodiment. And, by varying the amount of thrust generated by each fan, the embodiment is able to turn and steer a course across the surface 401 of the body of water, and/or to maintain a particular desired geospatial location at the surface 401 of that water (e.g., in conjunction with mooring so as to reduce the requisite strength, and/or to extend the lifetime, of that mooring). The ducted fans are energized, at least in part, with electrical energy generated by generator 419.

Figure 38:
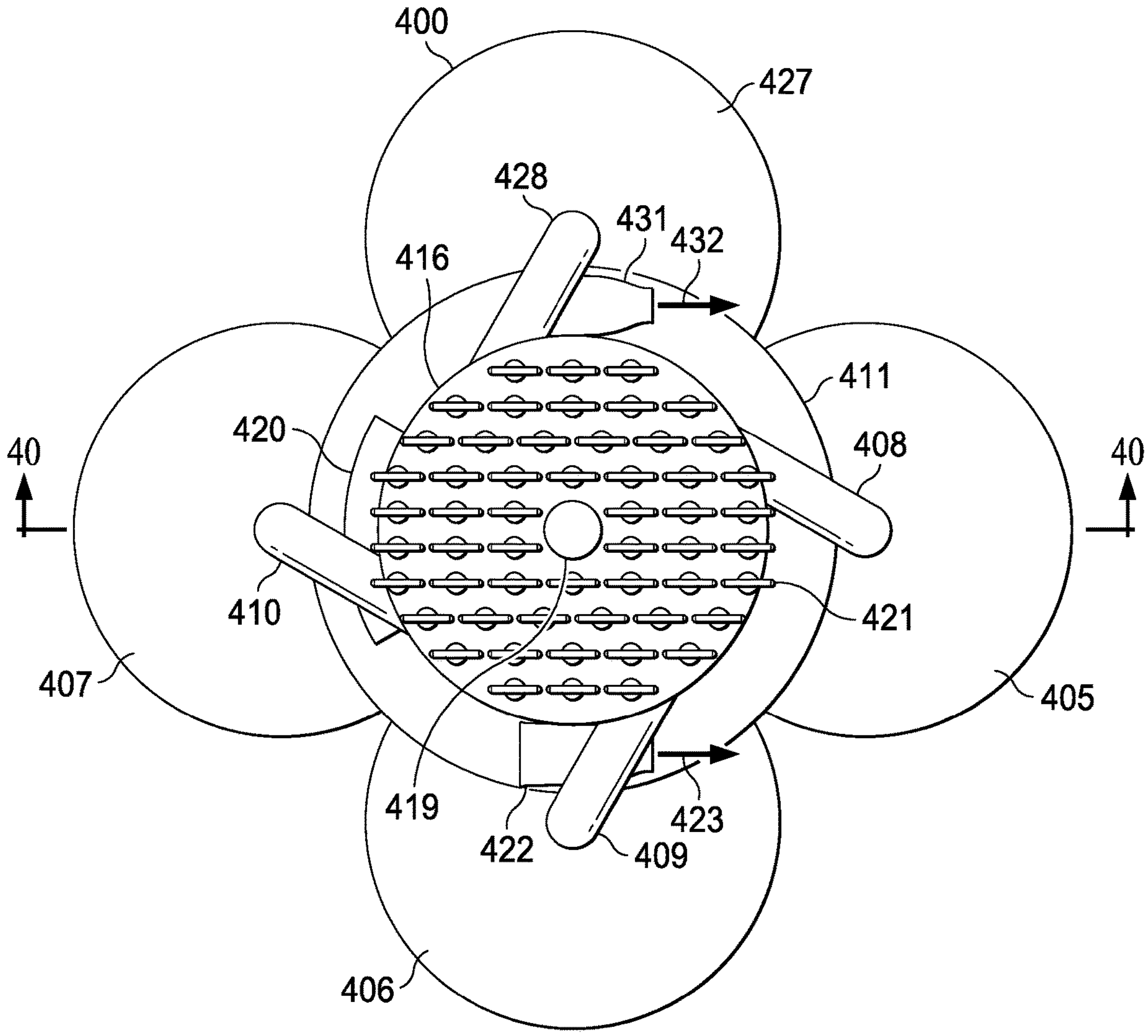
FIG. 38 is a top-down view of the embodiment of FIGS. 35-37.

FIG. 38 shows a top-down view of the same embodiment of the current disclosure that is illustrated in FIGS. 35-37.

A pair of ducted fans 422 and 431 generate propulsive flows 423 and 432, respectively, that provide propulsive thrust to the embodiment. And, by varying the amount of thrust generated by each fan, relative to the amount generated by the other fan, the embodiment is able to turn and steer a course. A control module and/or system (not shown) controls the thrust generated by each fan, and tracks the geospatial position of the embodiment, and thereby tends to be able to move the embodiment, and/or to hold the position of the embodiment, as programmed, instructed, and/or desired (with respect to other factors, such as wave climate, winds, antenna gain, e.g., with respect to a particular remote antenna, etc.).

Figure 39:
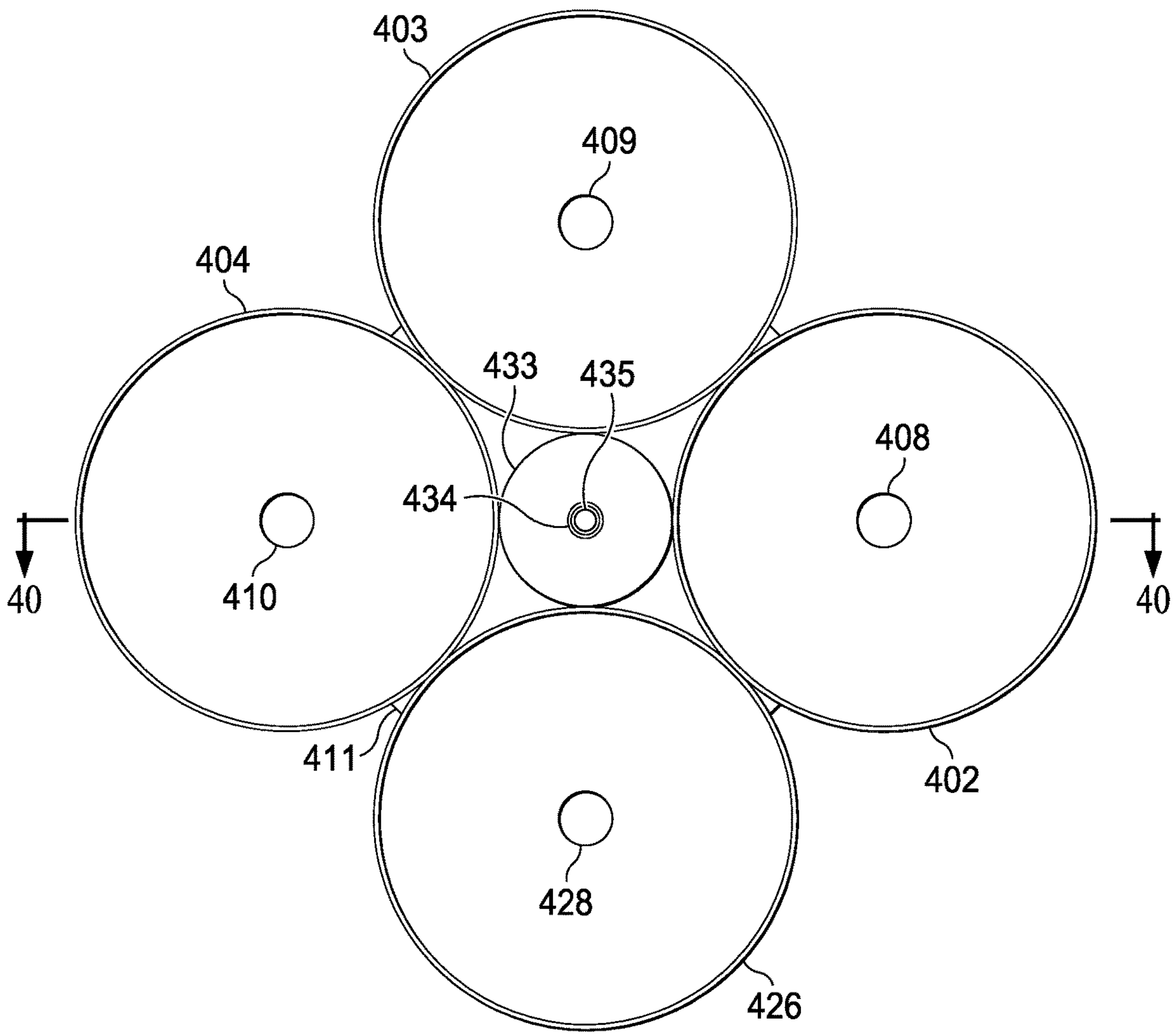
FIG. 39 is a bottom-up view of the embodiment of FIGS. 35-38.

FIG. 39 shows a bottom-up view of the same embodiment of the current disclosure that is illustrated in FIGS. 35-38.

The embodiment incorporates four inertial water tubes 402-404 and 426, attached to a central hollow chamber 411, enclosure, buoy, and/or portion. Water within the four inertial water tubes tends to oscillate vertically, occasionally reaching and discharging water from tube-specific upper mouths, into a water reservoir through four respective ejection pipes 408-410 and 428 (note that the bottom-up illustration in FIG. 39 shows the lower end and/or orifice of each ejection pipe, and not the upper mouth through which water is ejected into the water reservoir). At a bottom wall 433 of the hollow chamber 411, enclosure, buoy, and/or portion, is an effluent pipe 434 through which water from the embodiment's water reservoir flows and/or drains back into the body of water (401 in FIGS. 35-37) on which the embodiment floats. As water flows from the water reservoir through the effluent pipe and back into the body of water on which the embodiment floats, it passes through and imparts energy to a water turbine 435 positioned within the effluent pipe. Water turbine 435 is operatively connected to a generator (not visible) which produces electrical energy in response to the water turbine's rotations.

Figure 40:
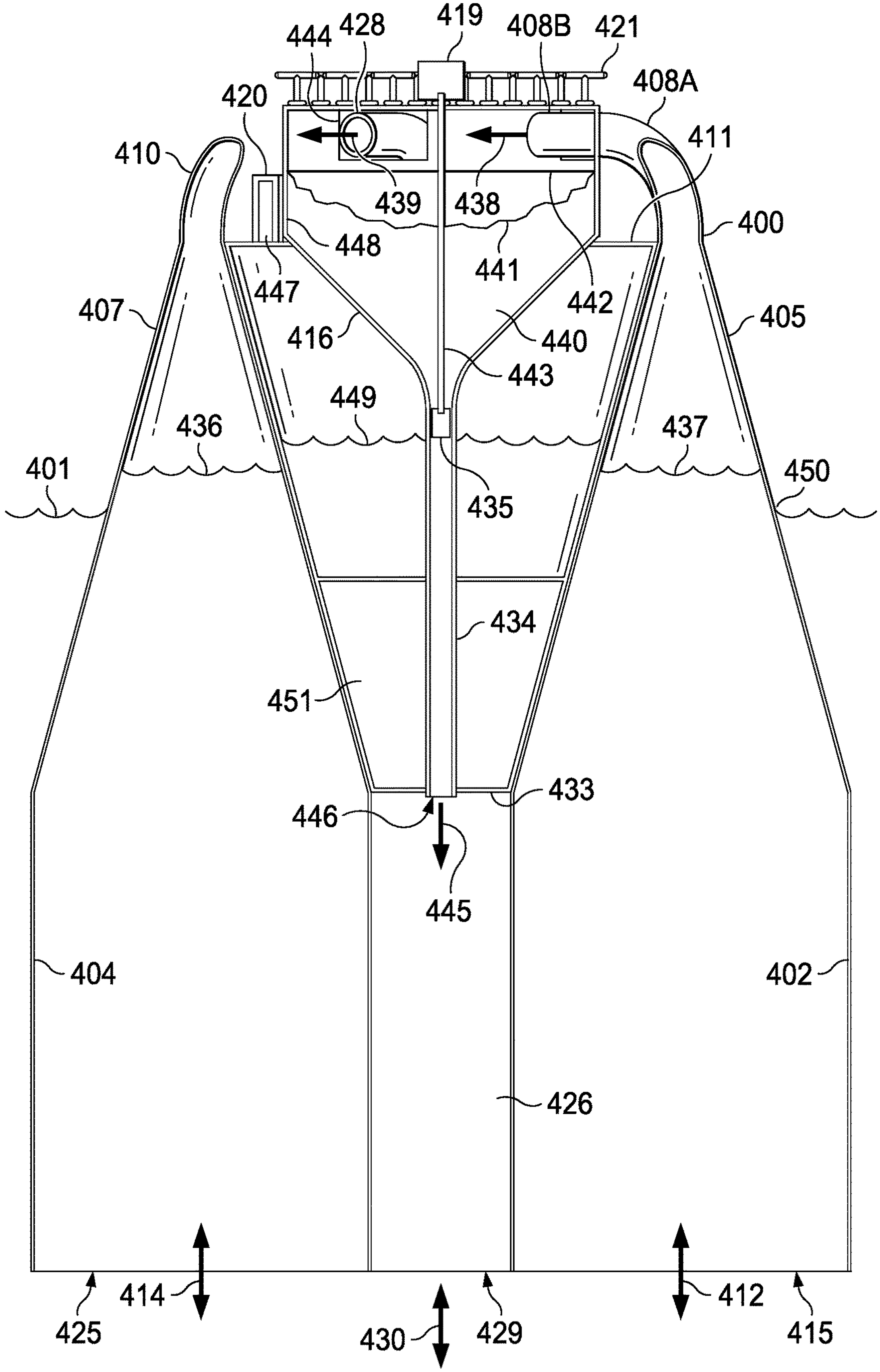
FIG. 40 is a side sectional view of the embodiment of FIGS. 35-39.

FIG. 40 shows a side sectional view of the same embodiment of the current disclosure that is illustrated in FIGS. 35-39, where the section is taken along the section line 40-40 specified in FIGS. 38 and 39.

As embodiment 400 moves up and down in response to waves across the surface 401 of the body of water on which the embodiment floats, water, e.g., 436 and 437, within the embodiment's four inertial water tubes 402, 404, 426 and 403 (in FIG. 35) moves up and down in a direction that is approximately parallel to the longitudinal axes of the respective inertial water tubes. Occasionally, water rises high enough and/or fast enough to travel through an inertial water tube's ejection pipe, e.g., 408 and 428. Water reaching and traveling through an ejection pipe is discharged, e.g., 438 and 439, from the respective upper mouth, e.g., 408B, of the ejection pipe and is subsequently deposited into water reservoir 416 wherein the discharge tends to add angular momentum and/or rotational kinetic energy to the water 440 within the water reservoir. When the water 440 within the water reservoir 416 swirls it will tend to adopt a flow-parallel, and/or vertical, cross-sectional profile typical of a vortex wherein the surface 441 of the water will tend to be lower in the middle (e.g., near the longitudinal axis of radial symmetry of the vortex) than at the periphery 442.

Water within the water reservoir 416 flows and/or drains back into the body of water 401 on which the embodiment floats through an effluent pipe 434 in which is positioned a water turbine 435. The combination of the swirling motion and head pressure of the water 440 flowing into effluent pipe 434 from water reservoir 416 tends to impart rotational kinetic energy and/or a torque to the water turbine 435 and to the turbine shaft 443 connected and/or attached to it. The turbine shaft 443 communicates at least a portion of the torque and/or rotational kinetic energy, produced by the water turbine 435 in response to water flowing through effluent pipe 434, to the generator 419 nominally resulting in the generation of electrical power. Water flows 445 out of, and/or is discharged by, the embodiment through an effluent pipe discharge mouth 446 at a lower end of effluent pipe 434.

The ejection pipes, e.g., 408 and 428, enter the water reservoir through portals, apertures, spaces, and/or gaps, e.g., 444, in upper portions of the walls of the reservoir 416, and if the rate at the embodiment's ejection pipes discharge water into the water reservoir exceeds, for too long a time, the rate at which water flows out of the water reservoir through effluent pipe 434, then water may leak out of the water reservoir through those apertures, e.g., 444.

A portion of the electrical power generated by generator 419 is used to energize a portion of a plurality of the computing devices 447 positioned, mounted, and/or housed, within a computer chamber 420. And a portion of the heat generated by those computing devices 447 tends to be transmitted to the water within the water reservoir 416 through a water reservoir wall 448 shared by, and/or in contact with, a wall of the computer chamber 420.

An adjustable amount, volume, and/or mass of water ballast 449 is held within the hollow chamber 411, enclosure, buoy, and/or portion, and adds to the mass of the embodiment 400 thereby affecting the inertia of the embodiment as well as the height of the embodiment's waterline 450. A pump (not shown) is controlled by the embodiment's control system (not shown), thereby enabling the control system to pump water 401 from outside the embodiment into the hollow chamber 411, thereby increasing the volume and/or mass of the embodiment's water ballast 449 and tending to raise the embodiment's waterline 450 and increase the embodiment's waterline draft, and to pump water out of the embodiment's water ballast 449, thereby decreasing the volume and/or mass of the embodiment's water ballast and tending to lower the embodiment's waterline 450 and reduce the embodiment's waterline draft.

In heavy seas, when wave energies are greater than normal, the embodiment's control system can reduce the mass of the water ballast 449 thereby lowering the embodiment's waterline 450 and decreasing the embodiment's draft, and, since the hollow chamber 411 and/or buoy is conical and its cross-sectional area, and therefore its waterplane area, decreases as the waterline is lowered, the lowering of the embodiment's waterline 450 tends to reduce the embodiment's sensitivity to the waves, thereby tending to reduce its energy absorption efficiency, which may tend to protect the embodiment from damage that might result from excessively vigorous energy absorption.

In periods of relative calm, the embodiment's control system can increase the mass of the water ballast 449, thereby raising the embodiment's waterline 450, and thereby tending to increase the embodiment's waterplane area, to increase the embodiment's sensitivity to the ambient waves, and to increase its energy absorption efficiency, which may permit the embodiment to maintain a near nominal, and/or an acceptable, rate of energy production during weak wave states.

A compartment 451 within a lower portion of the hollow chamber 411 and/or buoy provides the embodiment with a degree of permanent buoyancy.

Water moves 412, 414, 430, and 413 (in FIG. 35) in and out of the mouths 415, 452, 429, and 424 (in FIG. 36) at the lower ends of the embodiment's inertial water tubes 402, 404, 426 and 403 (in FIG. 35).

Figure 41:
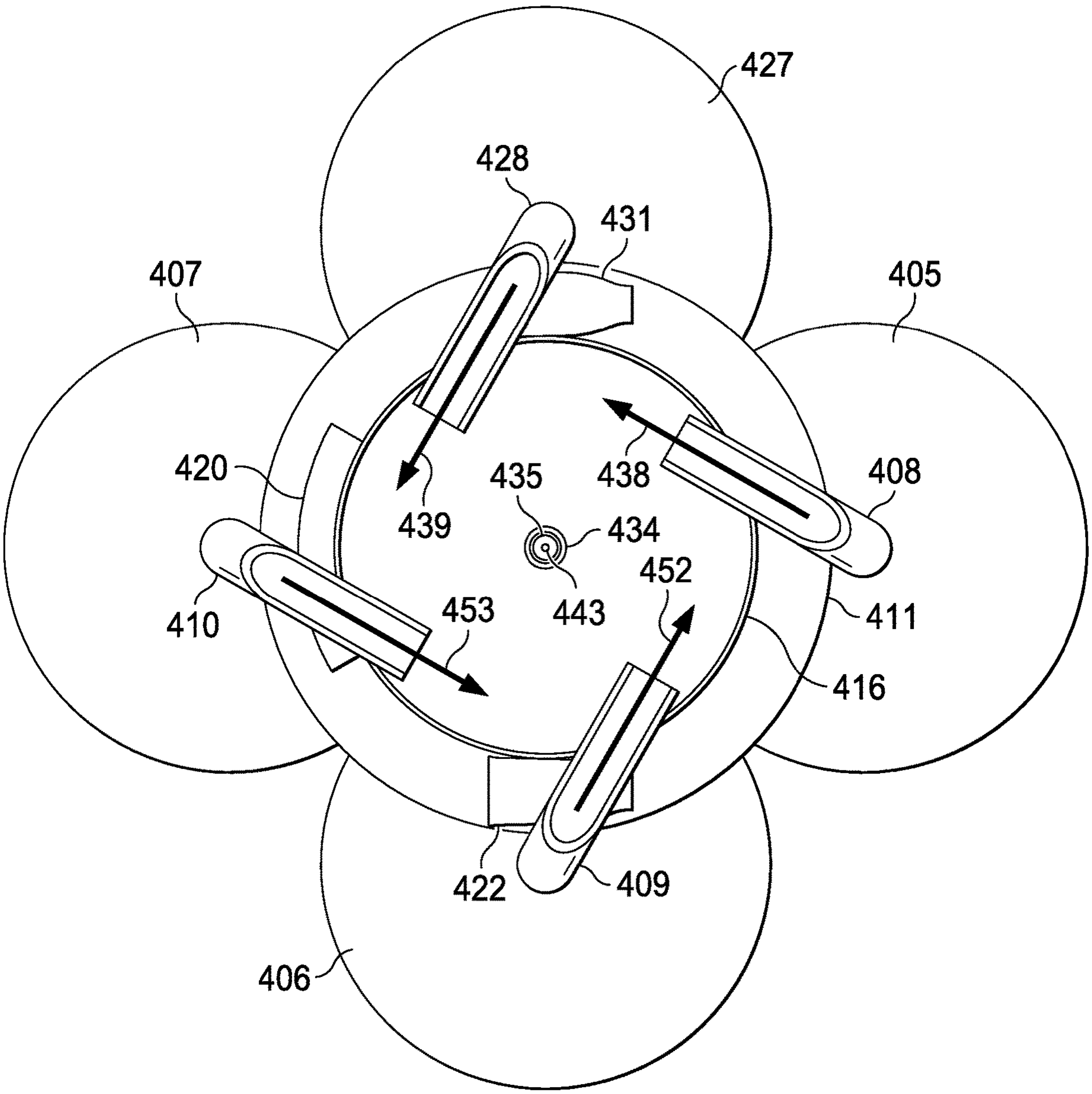
FIG. 41 is a top-down view of a horizontal section of the embodiment of FIGS. 35-40.

FIG. 41 shows a top-down view of a horizontal section of the same embodiment of the current disclosure that is illustrated in FIGS. 35-40, where the section is taken along the section line 41-41 specified in FIG. 36.

Water that rises with sufficient force, momentum, speed, and/or kinetic energy to reach an ejection pipe 408, 409, 410, or 428, will flow out 438, 452, 453, or 439, respectively, through the ejection pipe's respective upper mouth, and will tend to enter the water reservoir 416 near the periphery of the water reservoir and with a tangential orientation, thereby tending to induce a swirling motion in the water within the water reservoir. Water within the water reservoir 416 flows down through effluent pipe 434 therein tending to engage and energize water turbine 435 and to induce, produce, and/or create a torque and/or rotational kinetic energy therein. The turning of water turbine 435 causes a rotation in the attached turbine shaft 443 which is operatively connected to a generator (419 in FIG. 35) thereby causing the generator 419 to generate electrical power.

Figure 42:
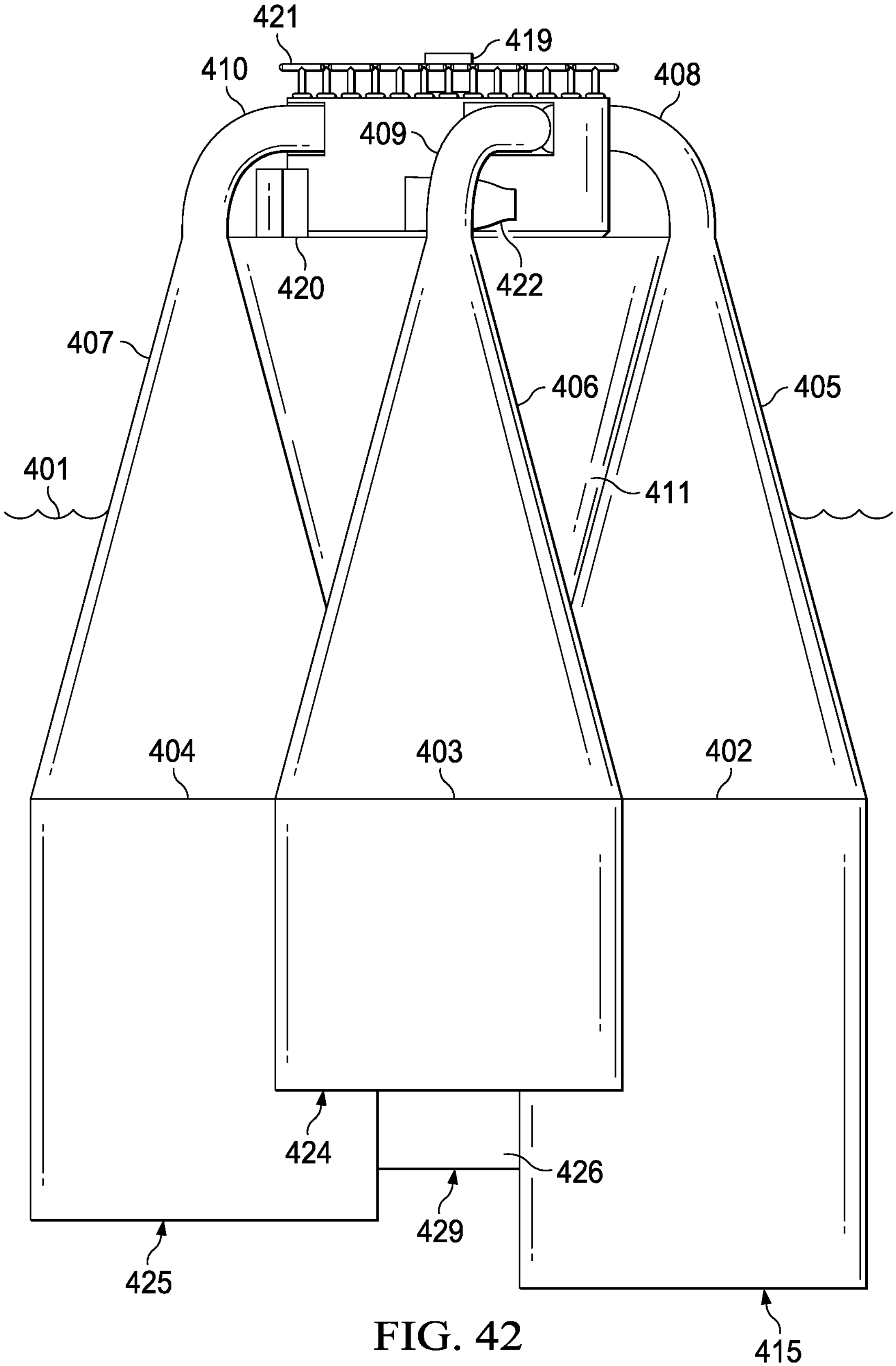
FIG. 42 is a side-view of another embodiment that is similar to the one illustrated in FIGS. 35-41.

FIG. 42 shows a side-view of an embodiment of the current disclosure that is similar to the one illustrated in FIGS. 35-41. And, the view illustrated in FIG. 42 is identical to the view illustrated in FIG. 36 except that with respect to the embodiment illustrated in FIG. 42 each of the four inertial water tubes are of different lengths, thereby imparting to each inertial water tube a different and/or unique resonant frequency, and causing each inertial water tube to exhibit optimal and/or maximal outflow and/or ejections into the shared water reservoir in response to wave climates of differing wave amplitudes, periods, significant wave heights, and/or dominant wave periods.

Inertial water tube 406/403, with lower mouth 424, is the shortest of the embodiment's four inertial water tubes. And, inertial water tube 405/402, with lower mouth 415, is the longest. With respect to the embodiment illustrated in FIG. 42, the lengths of the embodiment's inertial water tubes vary with respect to the lengths of their respective lower cylindrical portions, whereas the lengths and/or other dimensions of the upper tapered portions of those inertial water tubes are approximately identical.

The scope of the present disclosure includes embodiments with any number of inertial water tubes, any inertial water tube shape(s), any inertial water tube length(s), any inertial water tube volume(s), inertial water tubes that taper with any included angle(s), and inertial water tubes with complex shapes (e.g., tubes not simply comprised of cylindrical and frusto-conical segments). The scope of the present disclosure includes embodiments with inertial water tubes whose lengths differ as a result of differences in the lengths of the cylindrical portions of those inertial water tubes (as in the embodiment of FIG. 42). The scope of the present disclosure includes embodiments with inertial water tubes whose lengths differ as a result of differences in the lengths of their tapered portions. The scope of the present disclosure includes embodiments with inertial water tubes whose lengths differ as a result of differences in the included angles of their tapered portions. The scope of the present disclosure includes embodiments with inertial water tubes whose lengths differ as a result of any attribute, characteristic, dimension, pattern, design, and/or scale. The scope of the present disclosure includes embodiments with inertial water tubes whose lengths differ and whose inertial water tubes do not have discrete cylindrical and/or frusto-conical portions, but rather have continuously, smoothly, and/or occasionally varying wall slopes, diameters, etc., including inertial water tubes having shapes that can be characterized as hourglass-shaped, hyperboloid-shaped, hemi-hyperboloid-shaped, half-hyperboloid-shaped, parabola-shaped, bell-shaped, and bell-bottom-shaped.

Figure 43:
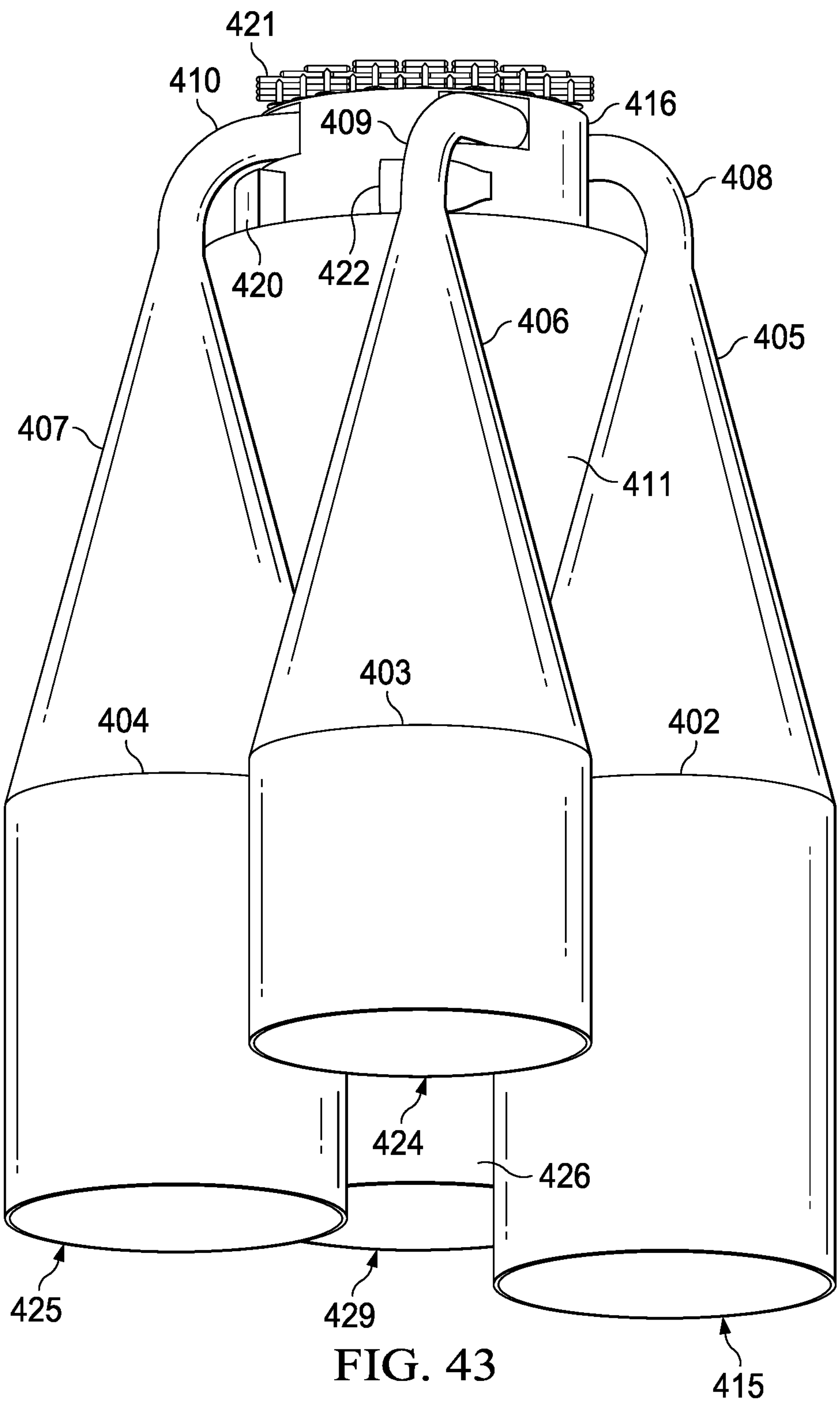
FIG. 43 is a side view of FIG. 42 from a perspective orientation, illustrating the differing lengths of each of the embodiment's four inertial water tubes.

FIG. 43 shows the side view of FIG. 42 from a perspective orientation, illustrating from a perspective orientation the differing lengths of each of the embodiment's four inertial water tubes.

Figure 44:
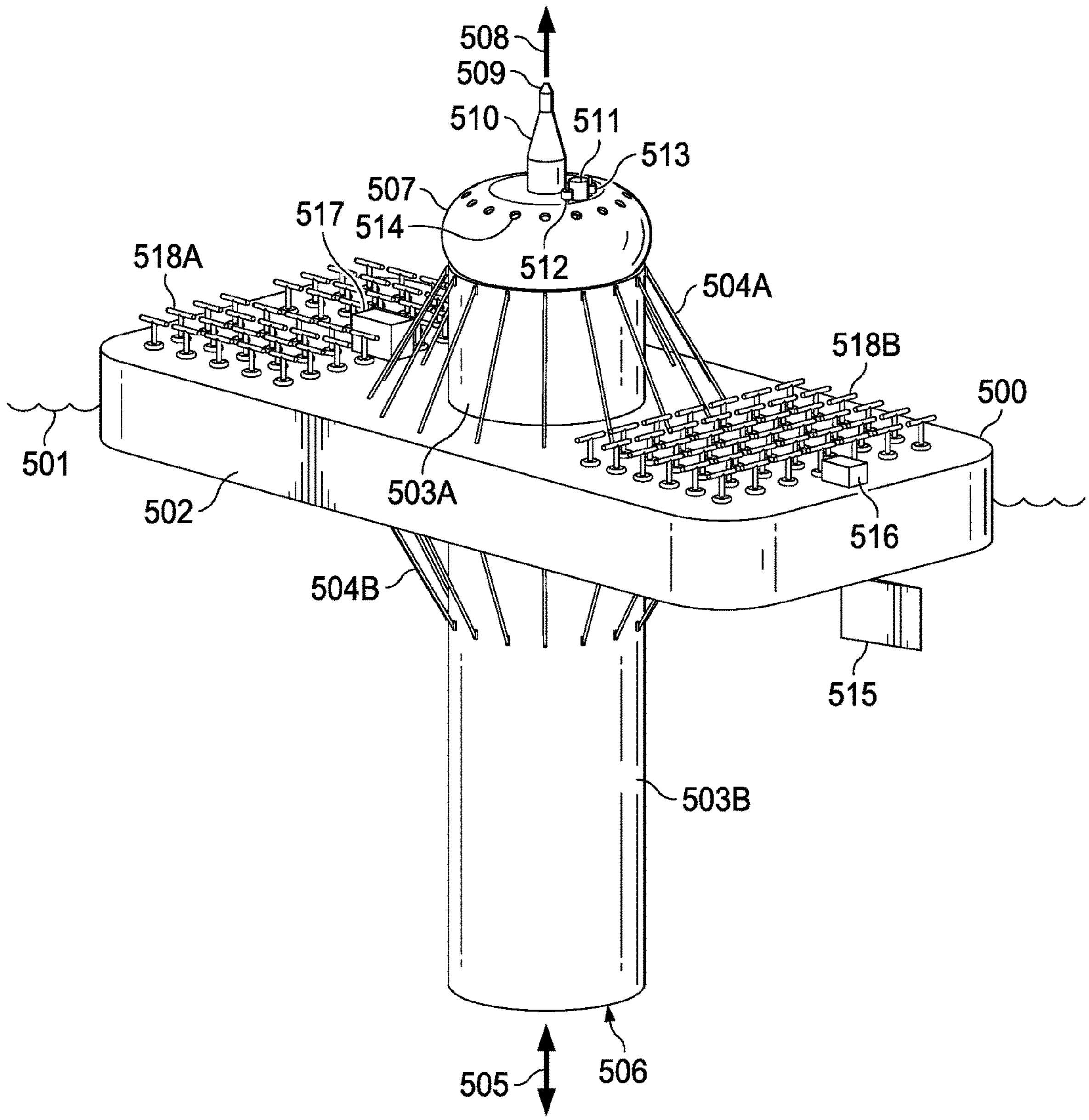
FIG. 44 is a side perspective view of another embodiment of the present invention.

FIG. 44 shows a side perspective view of an embodiment of the current disclosure.

The buoyant embodiment 500 floats adjacent to an upper surface 501 of a body of water over which waves tend to pass. The embodiment incorporates a buoyant platform or buoy 502 which causes the embodiment to float upon the water 501. Attached to, and passing through, the buoy 502 is a nominally vertical, approximately cylindrical tube 503 which incorporates an inertial water tube (not visible) and a hollow chamber within which a water ballast of variable volume is located. A plurality of struts 504 strengthen the attachment of the cylindrical tube 503 to the buoy 502, reducing the likelihood that the changing buoyant forces applied to the buoy 502, in conjunction with the drag forces inhibiting lateral motions of the lower portion 503B of the cylindrical tube, will result in a weakening of the attachment and/or alignment of the cylindrical tube 503 to the buoy 502.

As the embodiment 500 moves up and down in response to passing waves, water within the embodiment's inertial water tube will tend to move up and down as well. In response to wave motion at and/or against the embodiment, water will tend to enter and leave 505 the inertial water tube's lower mouth 506. Occasionally, water will rise within the inertial water tube with sufficient energy, speed, and/or to a sufficient height, that a portion of that water will exit, and/or be ejected from, the inertial water tube through an upper mouth (not visible) at its upper end, thereafter tending to enter a water reservoir 507.

If water rises within the inertial water tube so quickly, and/or with such force, that the upper mouths of the tube are unable to accommodate the requisite level of flow, then that water may continue rising within the inertial water tube. If water rises in the inertial water tube with sufficient energy or force, then a pressure activated pressure-relief valve (not visible) opens and thereby allows a portion of that rising water to exit 508, and/or be ejected from, the inertial wall tube through an upper pressure-relief nozzle 509, with the water so ejected tending to form an aerosol (which may promote cloud formation). Whether or not the pressure-activated, pressure-relief valve is open, the portion 510 of the inertial water tube that extends above the upper mouths (not visible, but positioned adjacent to the interior of the water reservoir 507) of the inertial water tube, through which water may exit the inertial water tube and enter the water reservoir, will tend to contain air and the compression of that air (e.g., when the pressure-relief valve is closed, and the air at the top of that portion 510 of the inertial water tube is trapped) will tend to occur in response to the water rising above the upper mouths of the inertial water tube, and that pocket of air will tend to act as a shock-absorbing buffer or cushion. By smoothly, gently, gracefully, and/or gradually, countering the upward acceleration of upwelling water within the inertial water tube, the air pocket in the upper portion 510 of the inertial water tube will tend to reduce structural stress, fatigue, and damage that might otherwise result from a sudden collision of upward rising water against a rigid surface.

If the water rises within the inertial water tube with enough force to rise above the upper mouths, then either the pressure-relief valve will open thereby allowing a portion of rising water to escape the inertial water tube, and thereby tending to relieve and/or reduce at least a portion of the pressure of the water rising in the inertial water tube, of the pressure-relief valve will remain closed, in which case the pocket of air trapped within the inertial water tube, adjacent to the pressure-relief valve, will tend to be compressed and thereby absorb and/or dampen at least a portion of the pressure of the water rising in the inertial water tube.

Water within the reservoir 507 tends to flow and/or drain back into the body of water 501 on which the embodiment floats through one of three effluent pipes fluidly connected to the water reservoir. One centermost effluent pipe (not visible) contains a water turbine (not visible) that tends to receive rotational kinetic energy and/or angular momentum from the water that flows through it from the water reservoir. The water turbine is operatively connected to a generator 511 that tends to generate electrical energy in response to the rotation of the water turbine. After passing through the water turbine, water flowing out and/or back into the body of water 501 through the centermost effluent pipe will tend to generate thrust that tends to propel the embodiment in a forward direction (e.g., in a direction approximately toward the left and into the page with respect to the embodiment configuration illustrated in FIG. 44).

Water within the water reservoir 507 is allowed to flow, or prevented from flowing, through one or both of two lateral effluent pipes (not visible). Effluent regulation motors 512 and 513 raise and/or lower respective stoppers or plugs (not visible) that, when raised, allow water to flow through the respective lateral effluent pipes, or, when fully lowered, prevent such flow. In energetic wave climates, when water is ejected from the inertial water tube, and thereby injected into the water reservoir at a rate that exceeds the nominal and/or desired value, then water can be caused (e.g., by the embodiment's control system—not shown) to flow out of the water reservoir 507 through one or both of the lateral effluent pipes thereby generating (additional) forward thrust that will tend to propel the embodiment in a forward direction (e.g., in a direction toward the left and into the page with respect to the embodiment configuration illustrated in FIG. 44). The lateral effluent pipes do not contain water turbines, and, as such, water discharged from it would tend to be more vigorous than water discharged from the centermost effluent pipe which does contain a water turbine.

By releasing water from the water reservoir 507 through two lateral effluent pipes in addition to the centermost effluent pipe, water may be released from the water reservoir at a faster rate than might otherwise be achieved through the release of water only through the centermost effluent, thereby perhaps avoiding an overflow of the water reservoir, and also thereby perhaps providing additional forward thrust and speed in a wave climate where additional speed might be helpful in maintaining the embodiment's most desirable course and direction. In the event that the release of water from the water reservoir 507 through all three of the effluent pipes is unable to avoid the overfilling of the reservoir, then water may flow out of the water reservoir 507 through apertures 514 positioned about an upper portion of the water reservoir wall.

In conjunction with the generation of forward thrust through the release of water from the water reservoir 507, the embodiment utilizes a rudder 515, the angular orientation of which is controlled by a motor 516, which, in turn, is controlled by the embodiment's control system (not shown) in order to steer a course that is determined and executed by that control system.

A portion of the electrical energy generated by the generator 511 is used to energize a plurality of computing devices, circuits, modules, and/or systems positioned, stored, enclosed, and/or protected, within a computer chamber, enclosure, box, housing, locker, cavity, and/or compartment 517. A portion of those computing devices execute computational tasks for which the tasks, programs, codes, parameters, and/or data, are received from a remote computer, network, transmitter, and/or antenna via encoded electromagnetic signals received by the embodiment's phased array antenna 518. A portion of the results, data, values, products, and/or information, generated through and/or by the execution of such remotely-received computational tasks are transmitted to a remote computer, network, receiver, and/or antenna via encoded electromagnetic signals transmitted by the embodiment's phased array antenna 518. Computational task and/or result data might be received from, and/or transmitted to, any of a variety of remote systems, computers, networks, transceivers, and/or antennas, including, but not limited to, those incorporated within and/or accessed via: satellites, surface drones, flying drones, balloon drones, terrestrial stations, boats, planes, and submarines.

Figure 45:
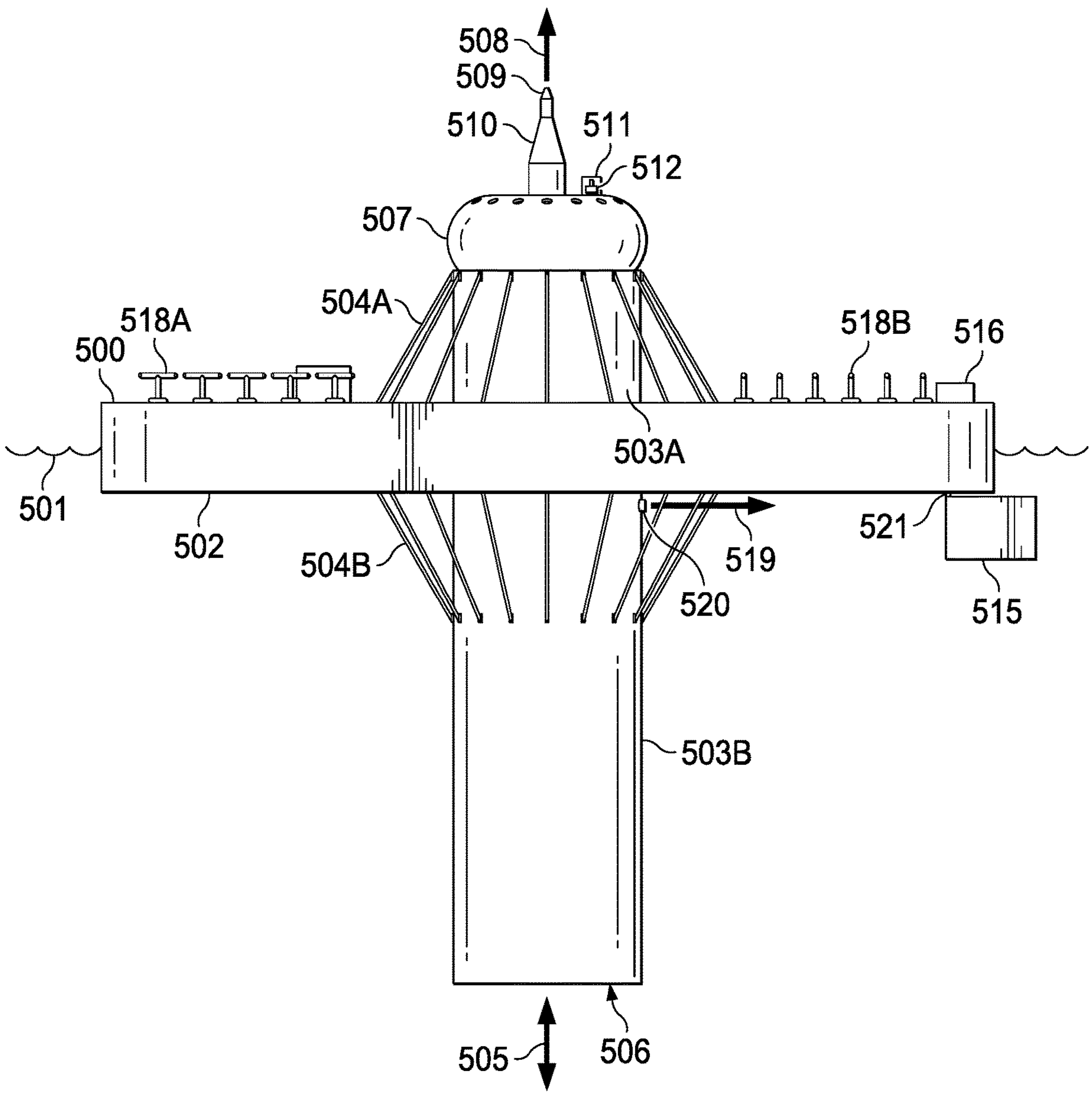
FIG. 45 is a side view of the embodiment of FIG. 44.

FIG. 45 shows a side view of the same embodiment of the current disclosure that is illustrated in FIG. 44. The lateral effluent pipe 520 controlled by effluent regulation motor 512 releases 519 water from the effluent pipe discharge mouth at its lower end 520 thereby generating forward (i.e., to the left in FIG. 45) thrust when effluent regulation motor 512 raises the plug that when fully lowered obstructs the upper mouth of that effluent pipe and prevents reservoir water from entering and flowing through it.

The embodiment's control system (not shown) steers the embodiment through its control of the rudder control system 516 and its rudder-turning motor, which rotates shaft 521 to which rudder 515 is fixedly attached.

Figure 46:
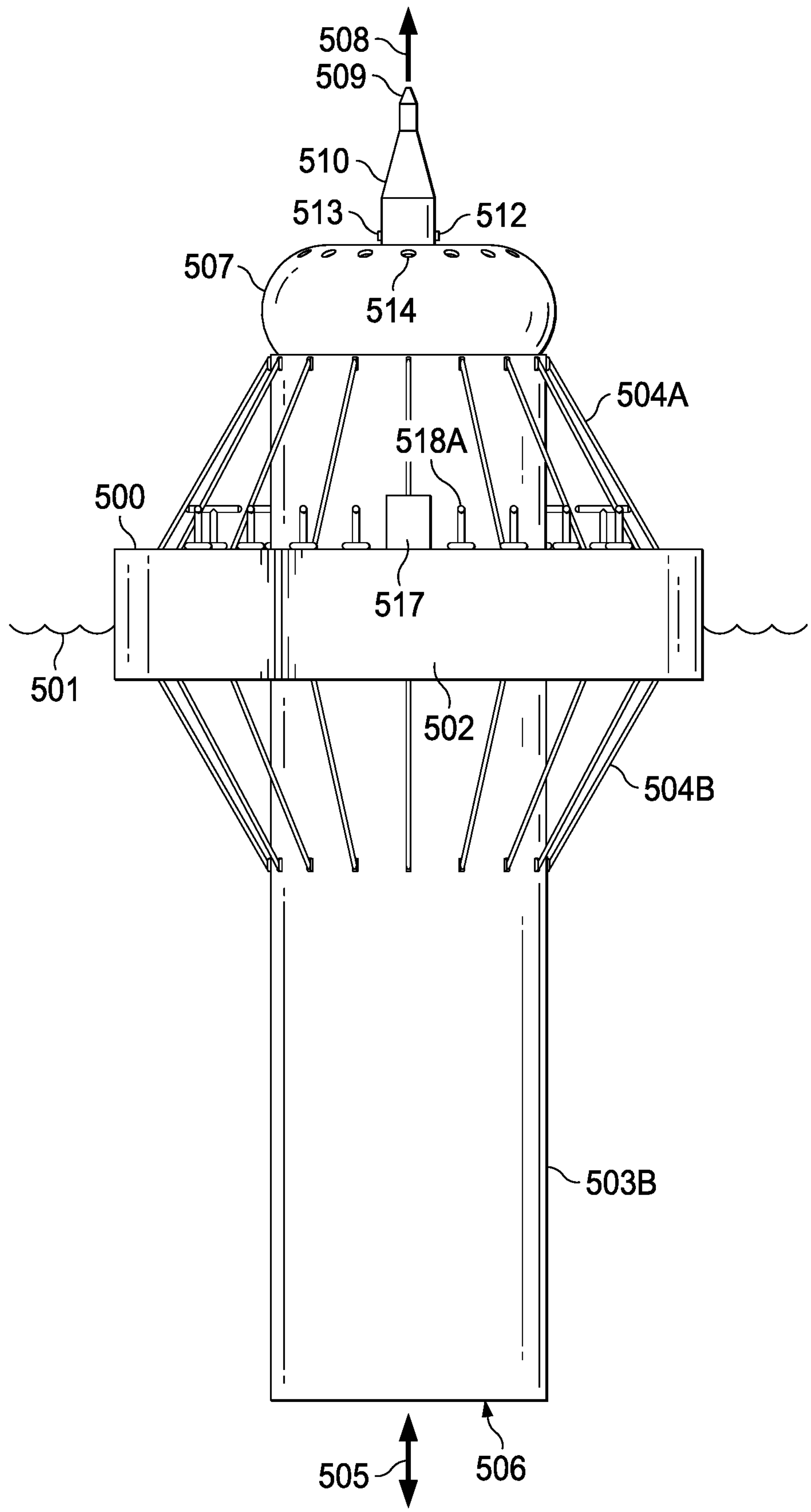
FIG. 46 is a front-side view of the embodiment of FIGS. 44 and 45.

FIG. 46 shows a front-side view of the same embodiment of the current disclosure that is illustrated in FIGS. 44 and 45.

Figure 47:
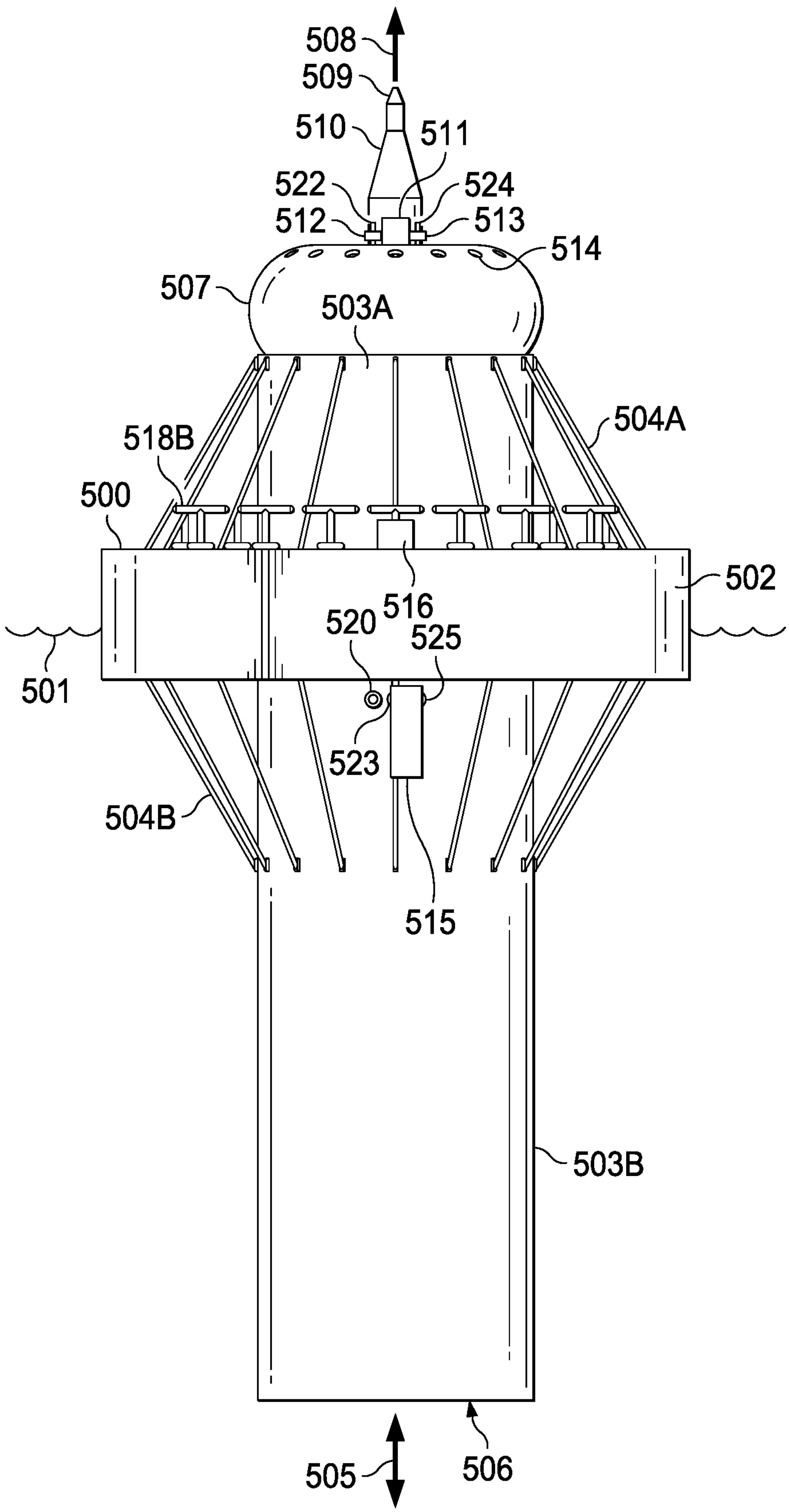
FIG. 47 is a back-side view of the embodiment of FIGS. 44-46.

FIG. 47 shows a back-side view of the same embodiment of the current disclosure that is illustrated in FIGS. 44-46. In the embodiment configuration illustrated in FIG. 47, the effluent regulation motor 512 has raised its respective plug (not visible), as evidenced by the raised configuration and/or position of the plug rod 522 that it controls, thereby allowing water in the water reservoir 507 to flow into, through, and out of, lateral effluent pipe 520, thereby generating additional thrust to augment the thrust (if any) generated by the outflow of water from the centermost effluent pipe 523. In the embodiment configuration illustrated in FIG. 47, the effluent regulation motor 513 has lowered its respective plug (not visible), as evidenced by the lowered configuration and/or position of the plug rod 524 that it controls, thereby preventing water in the water reservoir 507 from flowing into, through, and out of, lateral effluent pipe 525.

Because water is flowing out of lateral effluent pipe 520, but not out of lateral effluent pipe 525, the unbalanced and/or tangential component of the thrust generated by the water flowing out of lateral effluent pipe 520 will tend to generate a torque on the embodiment, about a centermost longitudinal axis, thereby tending to cause the embodiment to rotate in a clockwise direction (if viewed from above the embodiment). However, the embodiment's control system (not shown) can correct for this, or augment it, through its control of the rudder's 515 angular orientation (about the longitudinal axis of its shaft 521 (in FIG. 45) through its activation and control of rudder control system 516 and its rudder-turning motor.

Figure 48:
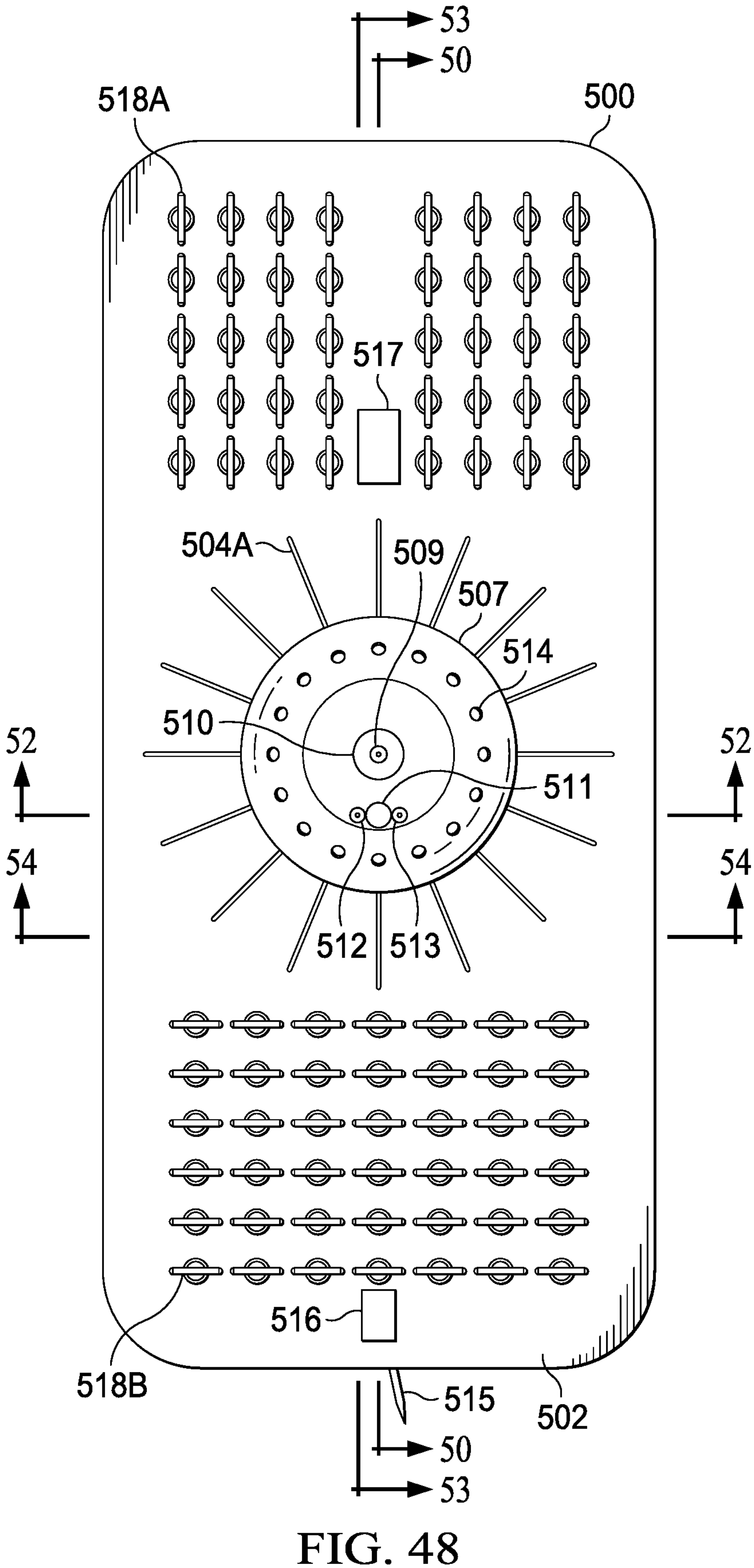
FIG. 48 is a top-down view of the embodiment of FIGS. 44-47.

FIG. 48 shows a top-down view of the same embodiment of the current disclosure that is illustrated in FIGS. 44-47.

Figure 49:
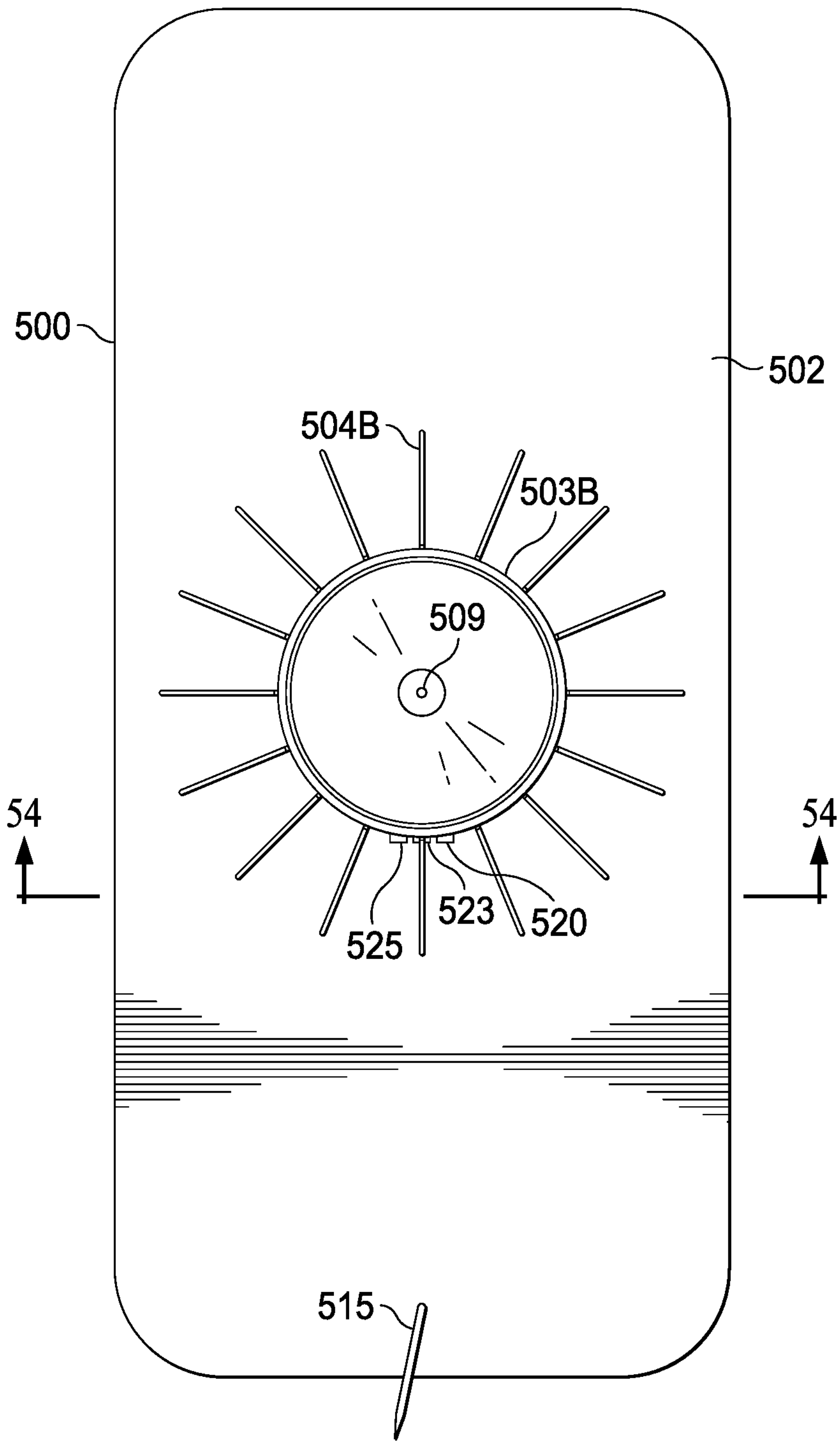
FIG. 49 is a bottom-up view of the embodiment of FIGS. 44-48.

FIG. 49 shows a bottom-up view of the same embodiment of the current disclosure that is illustrated in FIGS. 44-48.

Figure 50:
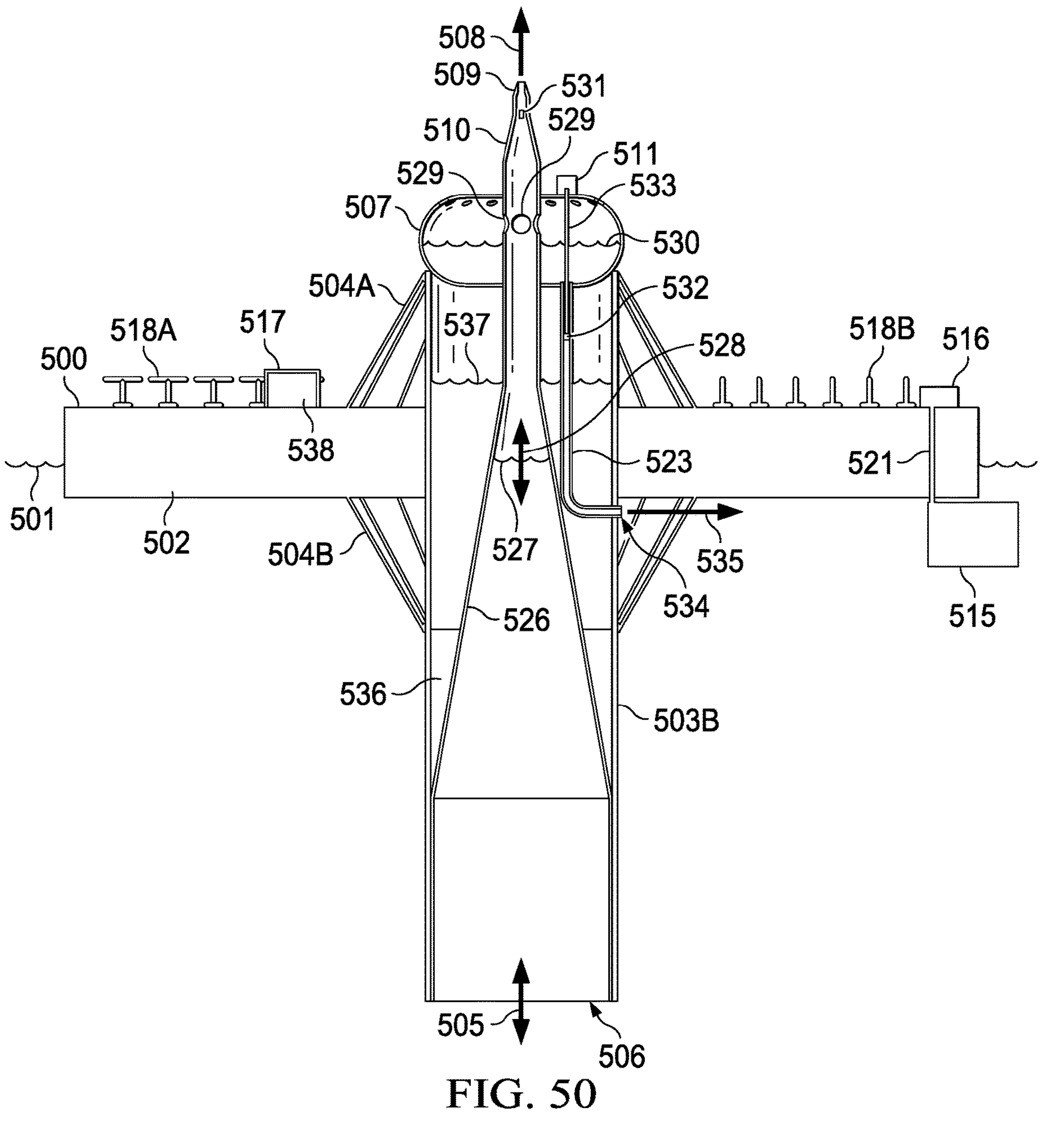
FIG. 50 is a side sectional view of the embodiment of FIGS. 44-49.

FIG. 50 shows a side sectional view of the same embodiment of the current disclosure that is illustrated in FIGS. 4449, where the section is taken along the section line 50-50 specified in FIG. 48.

Within the cylindrical outer tube 503 is an inertial water tube 526 that includes a bottom-most cylindrical portion, a middle frusto-conical portion, and an upper cylindrical portion. As the embodiment moves up and down in response to waves passing across the surface 501 of the body of water on which the embodiment floats, water moves 505 into and out from the lower mouth 506 of the inertial water tube 526, and water 527 within the inertial water tube 526 likewise moves 528 up and down. Occasionally, water rises within inertial water tube 526 with sufficient energy, speed, and/or momentum to raise the upper level 527 of that water up to, and/or above, the upper mouths 529 of the inertial water tube, thereby causing a portion of that rising water to pass from, and/or be ejected by, the inertial water tube 526, into the water reservoir 507, thereby, at least momentarily, raising the level 530 of the water within the water reservoir 507.

If the water rising in the inertial water tube 526 is so great that the rate of up flow exceeds the rate at which water flows into the water reservoir through upper mouths 529, then the water that rises above those upper mouths may trap a pocket of air within the upper portion 510 of the tube 526, and with further rising of the level 527 of the water within the inertial water tube 526 the air within that air pocket may be compressed thereby exerting a counterforce upon the rising water, and thereby tending to cause its deceleration. If the resulting rate of deceleration in the up flow is insufficient to dissipate the momentum of the rising water to a sufficient degree, then a pressure-actuated valve 531 will open and allow a portion of the rising water to escape 508 through nozzle 509 as a spray, potentially creating an aerosol useful in the promotion of cloud formation, and cooling of the Earth.

Another embodiment utilizes a valve 531 that is opened and closed in response to the control signals generated by the embodiment's electronic or fluidic control system. In one such embodiment, the valve 531 is actuated through the variation of an electrical signal, voltage, and/or current, controlled, adjusted, and/or set, by the embodiment's control system.

A portion of the water within the water reservoir 507 flows into an effluent pipe 523 and passes over and/or through a water turbine 532 therein. As water from the water reservoir 507 flows through water turbine 532 a torque is applied and/or imparted to the water turbine. That water turbine torque is shared with a shaft 533 that is operatively connected to a generator 511. The rotation of water turbine 532 by water flowing under pressure from the water reservoir, results in the generation of electrical energy. After passing through the water turbine 532, the water flowing through effluent pipe 523 flows out of the pipe at effluent pipe discharge mouth 534 and thereby flows 535 out and/or into the body of water 501 on which the embodiment floats in an approximately horizontal direction thereby tending to generate forward (i.e., to the left with respect to the embodiment configuration and orientation illustrated in FIG. 50) thrust which tends to propel the embodiment across the surface 501 of the body of water.

Within a middle portion of cylindrical outer tube 503B is buoyant material 536, positioned between the wall of the cylindrical outer tube 503B and the wall of the inertial water tube 526, which provides the embodiment with a degree of permanent buoyancy. Above the buoyant material 536, and within the hollow gap between the wall of the cylindrical outer tube 503B and the wall of the inertial water tube 526, is water ballast 537, the volume and mass of which may be altered by a pump (not shown) that is able to pump additional water into the hollow gap and increase the volume of the water ballast, thereby tending to increase the draft of the embodiment, and is able to pump water from the water ballast to the water 501 outside the embodiment, thereby tending to decrease the draft of the embodiment. By adjusting the embodiment's amount of water ballast 537, the embodiment's control system (not shown) is able to adjust the embodiment's average mass, its average inertia, its average draft, its average displacement, and its waterline. The embodiment's extraction of energy from passing waves may be optimized with appropriate adjustments of the embodiment's inertia.

A portion of the electrical power generated by generator 511 is used to power some or all of the computing devices 538, circuits, modules, and/or systems positioned, stored, enclosed, and/or protected, within a computer chamber, enclosure, box, cavity, and/or compartment 517. A portion of the heat generated by those computing devices 538 may be conductively communicated and/or transferred to the air outside the embodiment.

Figure 51:
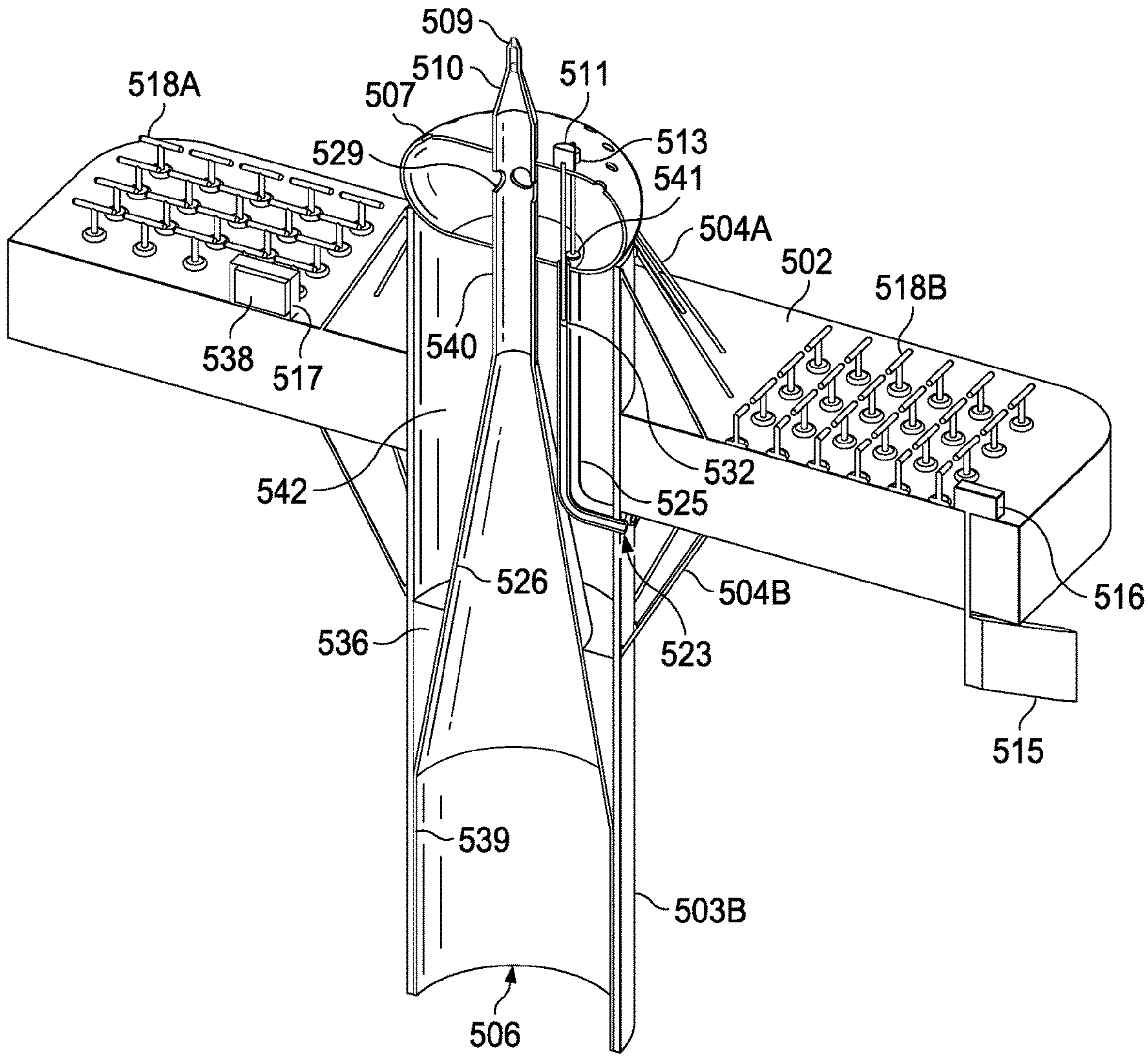
FIG. 51 is a sectional view of FIG. 50 from a perspective orientation.

FIG. 51 shows the sectional view of FIG. 50 from a perspective orientation. In this perspective sectional view only the structural elements are included in the illustration, and all water is omitted for the sake of clarity.

Within the outer cylindrical wall or casing 503 is an inertial water tube 526. The inertial water tube has an approximately cylindrical bottom portion 539, a middle approximately frusto-conical portion 526, and an approximately cylindrical upper portion 540. At an upper end of the upper cylindrical portion 540 of the inertial water tube are a plurality of apertures 529 through which water that rises high enough within the inertial water tube is ejected, and/or flows, into the water reservoir 507.

In addition to the effluent pipe 523 through which water from water reservoir 507 flows back into the body of water on which the embodiment floats, a pair of lateral effluent pipes, e.g., 525, allow water from the water reservoir 507 to flow back into the body of water on which the embodiment floats generating thrust in the process. When a stopper or plug, e.g., 541, is in its lowered and/or closed position (i.e., as illustrated by plug 541 in FIG. 51), then water from the water reservoir is prevented from flowing into and/or through the respective lateral effluent pipe, e.g., 525. However, when a stopper or plug is in its raised and/or open position, and/or not in a fully lowered and/or a fully closed position, then water from the water reservoir is able to flow into and through the respective lateral effluent pipe.

Between the walls of the inertial water tube 539/526/540 and the outer cylindrical tube 503 is a hollow space 542, chamber, and/or cavity, in which water may be deposited and/or trapped as water ballast.

Figure 52:
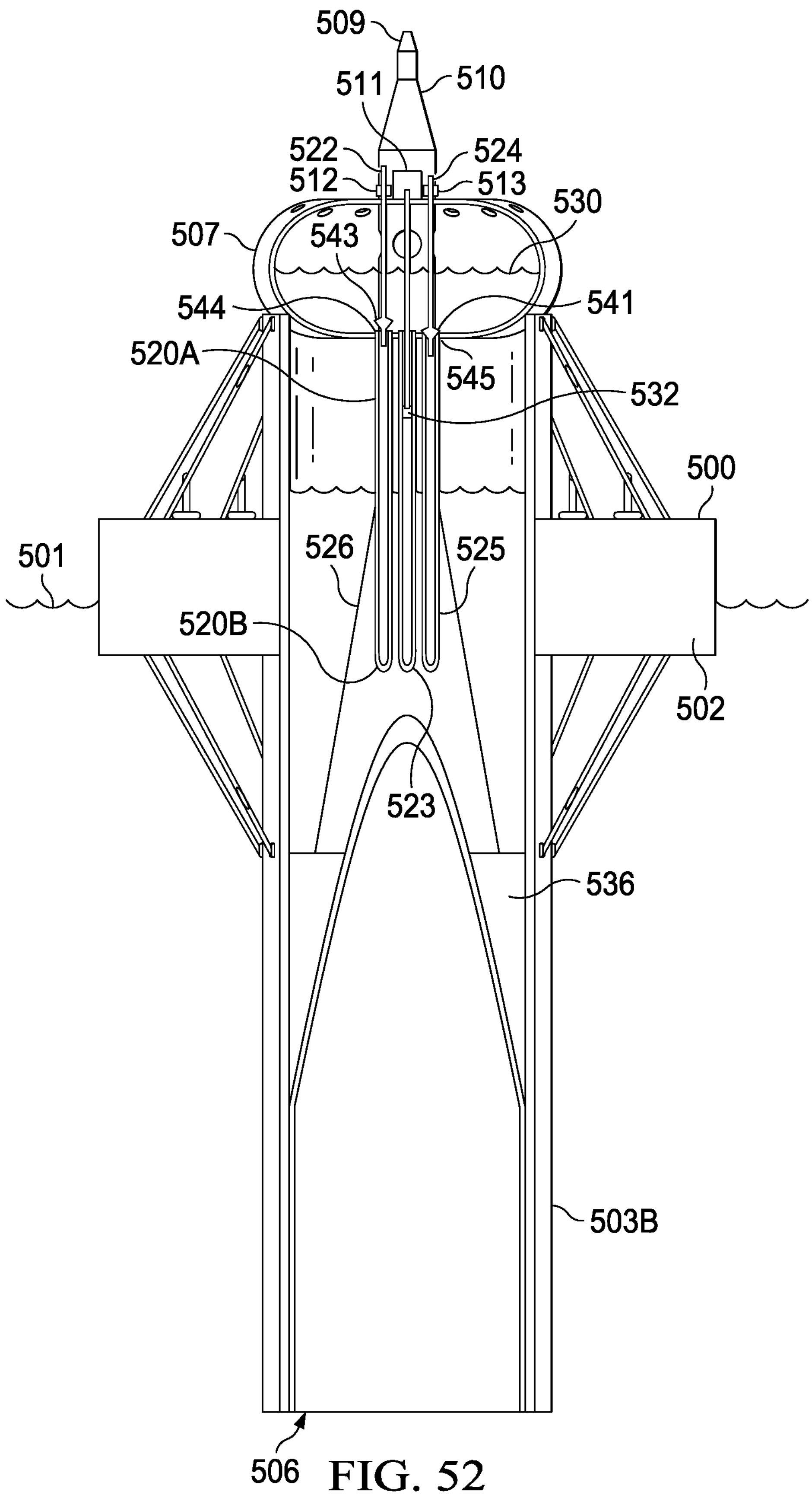
FIG. 52 is a side sectional view of the embodiment of FIGS. 44-51.

FIG. 52 shows a side sectional view of the same embodiment of the current disclosure that is illustrated in FIGS. 44-51, where the section is taken along the section line 52-52 specified in FIG. 48.

Some of the water that rises far enough inside the inertial water tube 526 is ejected from, and/or spills into, the water reservoir 507 and is trapped there as a pool 530 of water with substantial head pressure and gravitational potential energy relative to the surface 501 of the body of water on which the embodiment floats. Water 530 inside the water reservoir 507 returns, and/or flows back, to the body of water 501 through three effluent pipes 520, 523, and 525. Water continuously flows from the water reservoir 507 through a centermost effluent pipe 523 within which it engages, energizes, and tends to cause to rotate a water turbine 532 positioned therein. The water turbine 532 in turn rotates a turbine shaft (533 in FIG. 50) that then rotates the rotor, or some other component, of an operatively connected generator 511, thereby causing the generator to generate electrical energy.

Water can flow out of the water reservoir 507 through two additional effluent pipes 520 and 525 if and when respective pipe stoppers or plugs 543 and 541 are raised from their respective upper effluent pipe mouths 544 and 545. In the embodiment configuration illustrated in FIG. 52, stopper 543 is raised and thereby separated from its respective and/or corresponding upper effluent pipe mouth 544, thereby permitting water 530 from the water reservoir 507 to flow through pipe 520 back into the body of water 501 on which the embodiment floats, and to thereby generate thrust that tends to propel the embodiment forward (i.e., into the page with respect to the embodiment configuration and orientation illustrated in FIG. 52). In the embodiment configuration illustrated in FIG. 52, stopper 541 is fully lowered and its respective and/or corresponding upper effluent pipe mouth 545, is therefore fully obstructed, thereby preventing the entry of water 530 from the reservoir 507 into pipe 525.

The section plane of the sectional view illustrated in FIG. 52 passes through, and removes from view, the lower effluent pipe discharge mouths of the centermost 523 and lateral 520 and 525 effluent pipes. For example, the illustrated end 520B of lateral effluent pipe 520 continues out of the page and toward the reader where water flowing through it exits the effluent pipe and returns to the body of water 501.

Figure 53:
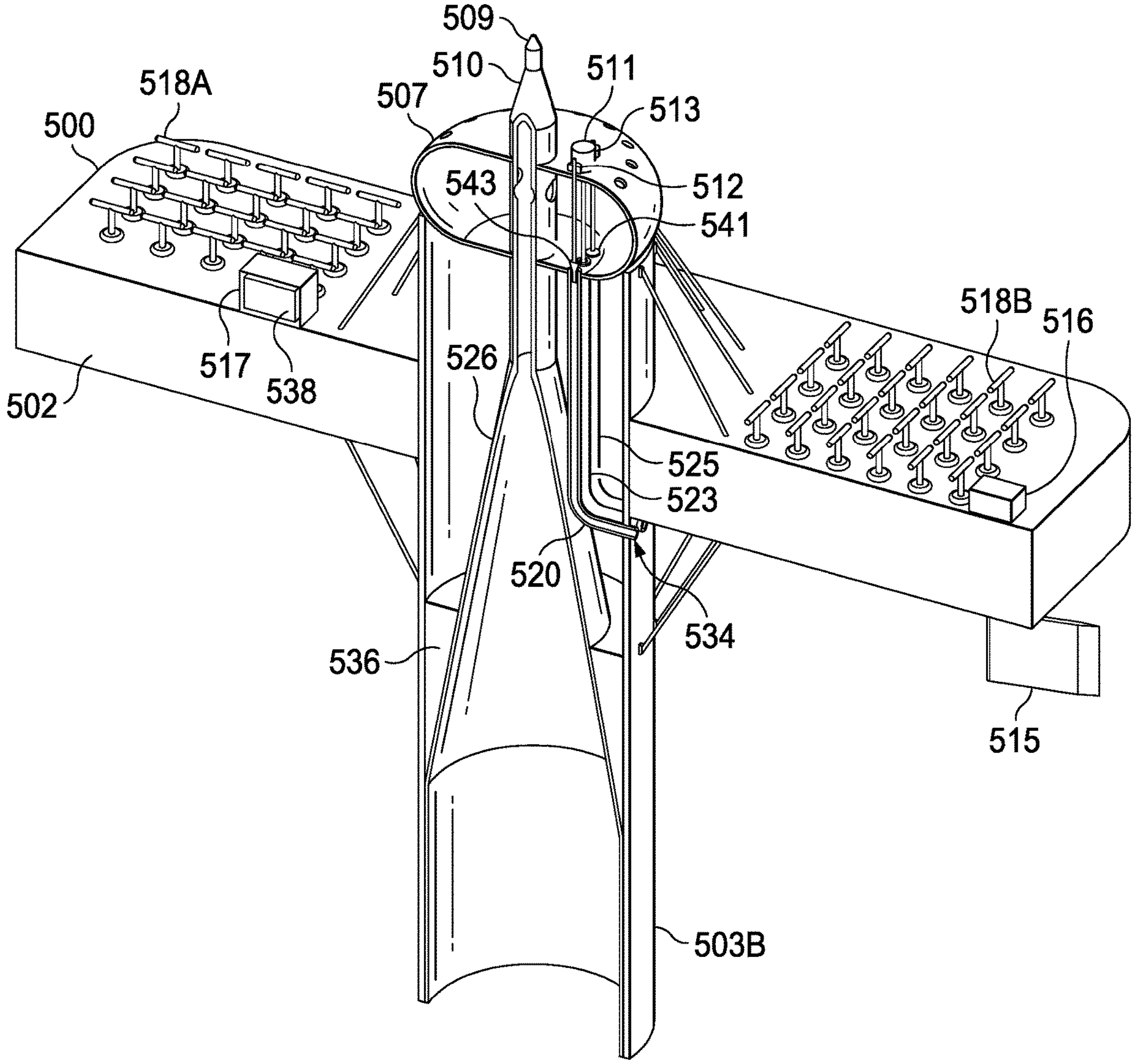
FIG. 53 is a sectional view of FIG. 52 from a perspective orientation.

FIG. 53 shows the sectional view of FIG. 52 from a perspective orientation. In this perspective sectional view only the structural elements are included in the illustration, and all water is omitted for the sake of clarity. The effluent pipe 523 and the two lateral effluent pipes 520 and 525 descend from the water reservoir 507 and exit the outer cylindrical tube 503 in an approximately horizontal orientation thereby creating approximately parallel lateral (forward) thrusts in response to the discharge of water from the water reservoir through those effluent pipes.

Figure 54:
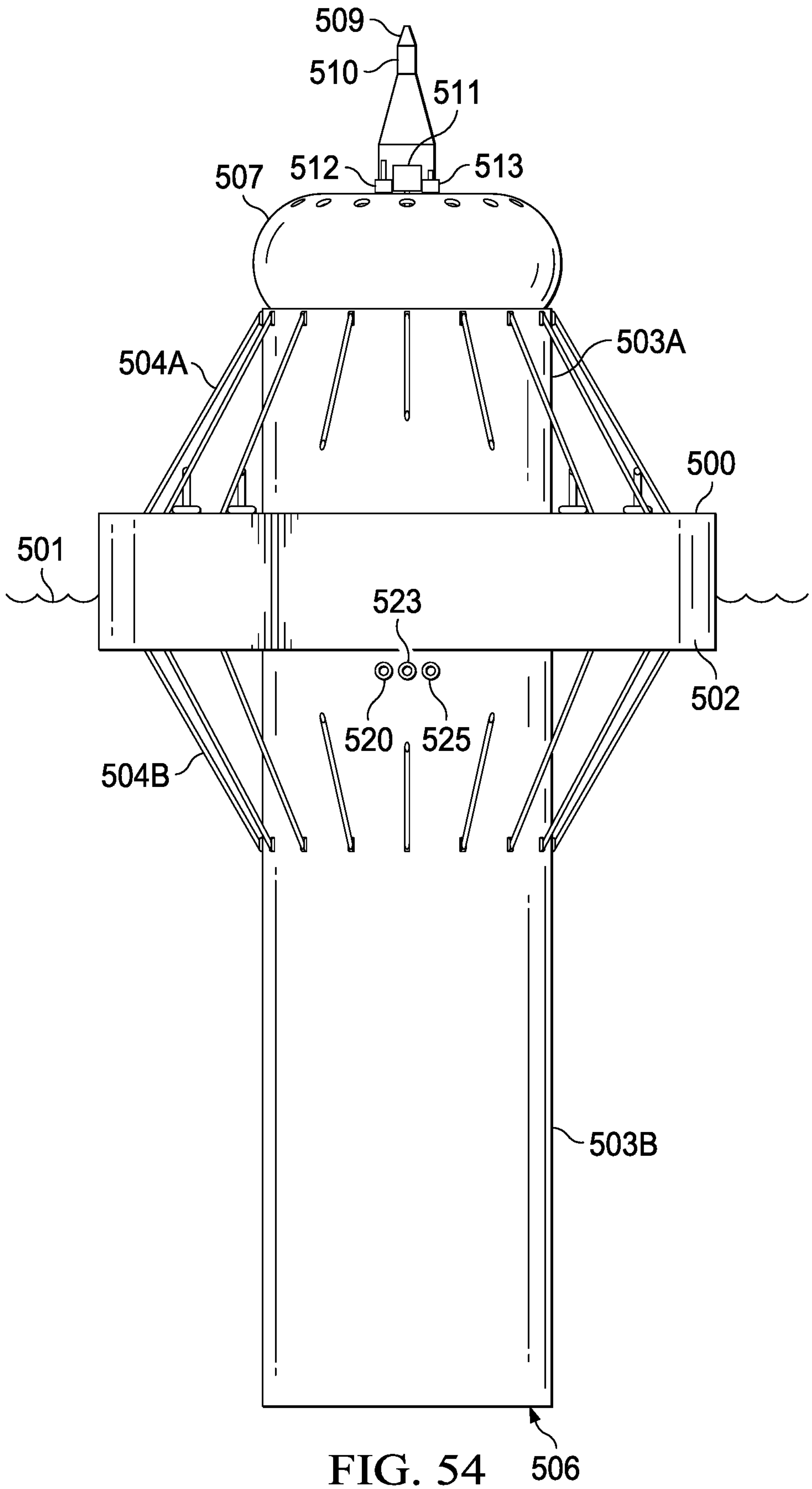
FIG. 54 is a back-side sectional view of the embodiment of FIGS. 44-53.

FIG. 54 shows a back-side sectional view of the same embodiment of the current disclosure that is illustrated in FIGS. 44-53, where the section is taken along the section line 54-54 specified in FIGS. 48 and 49.

Figure 55:
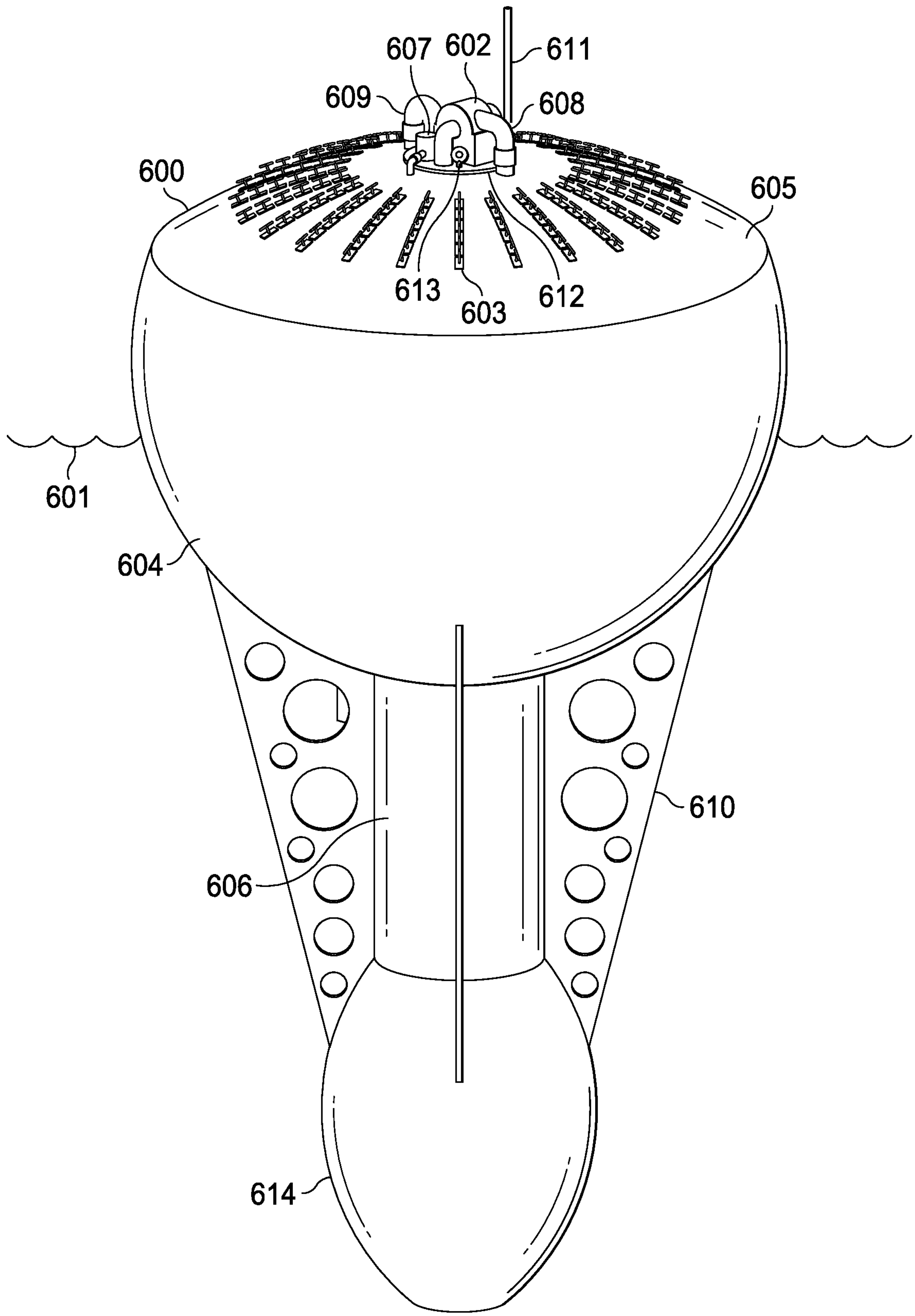
FIG. 55 is a side perspective view of another embodiment of the present invention.

FIG. 55 shows a side perspective view of an embodiment of the current disclosure.

Embodiment 600 floats adjacent to the surface 601 of a body of water. And, when in operation, embodiment 600 moves up and down in waves moving across the surface 601 of the water on which it floats, and it generates electrical power from the rotation of a water turbine (not visible) positioned inside a turbine-generator assembly, compartment, and/or housing 602.

A portion of the electrical power generated by the embodiment is used to energize and/or operate a computer array (not visible and positioned within a chamber below and adjacent to the turbine-generator assembly 602) and a phased array antenna 603. In one embodiment, the computer array processes computational tasks that the embodiment 600 receives by radio signals transmitted to, and converted into electrical signals by, its phased array antenna 603, or performs computational operations using input data that the embodiment 600 receives by radio signals transmitted to, and converted into electrical signals by, its phased array antenna 603. In one embodiment, the embodiment and/or its computers return computational results to a computer and/or computer network on land by radio-encoded versions and/or analogues of those computational results transmitted to a remote antenna, flying drone, balloon-suspended antenna/transceiver, satellite, or other receiver, by its phased array antenna 603.

Embodiment 600 includes several functional and/or structural elements including, but not limited to: a hollow flotation module 604/605 (having an approximately spherical-cap-shaped lower flotation module surface 604 and an approximately spherical-cap-shaped upper flotation module surface 605); a tube jacket wall 606; tube ballast (not visible, and positioned inside a tube ballast void between the inertial water tube 625 and the tube jacket walls 606/614); a turbine-generator assembly 602; an air pump 607; a turbine ingress pipe 608; an effluent pipe 609; an effluent pipe discharge mouth (not visible, and located in and/or passing through, tube jacket wall 606); a phased array antenna 603; a plurality of radial structural support fins 610; an inertial water tube (not visible, and located within hollow flotation module 604/605 and tube jacket wall 606, having an upper mouth at its top and a lower mouth at its bottom, and from which wave-induced ejections of water enter into, and are stored within, hollow flotation module 604/605), a pressure-relief tube 611, and several other elements that will be identified and discussed in subsequent figures.

Radial structural support fins 610 are connected to hollow flotation module 604/605, and tube jacket walls 606/614, and provide structural support to tube jacket walls 606/614 (and to the inertial water tube contained therein).

Hollow flotation module 604/605 is a broad, and/or large-diameter, upper structural component of the embodiment, and has an approximately spherical or ellipsoidal curvature, with an approximately spherical bottom surface 604.

Hollow flotation module 604/605 is substantially hollow and its walls are substantially hermetically sealed with the exception the inertial water tube (not visible), concentrically enclosed inside of tube jacket 606/614, is fluidly connected to the body of water 601 on which the embodiment floats. As shown and described in detail in subsequent figures, the inertial water tube (not visible) creates a passageway between the water below the embodiment (below the lower mouth (not visible) of the inertial water tube) and the interior of the hollow flotation module 604/605, and enables water to be "pumped" into the hollow interior of the hollow flotation module, when wave-induced oscillations of the water within the inertial water tube achieve sufficient energy, height, and/or momentum to escape and/or to be ejected by the upper mouth of the inertial water tube.

Between the wall of the inertial water tube (not visible) and the wall of the tube jacket 606 is a substantially hollow, preferably rigid, enclosure that is concentric with the inertial water tube (not visible) and substantially traps, encloses, and/or holds, therein a volume of water (e.g. seawater), i.e., a tube ballast, adjacent to a bottom portion of the inertial water tube (not visible), thereby providing additional mass (inertia) to the embodiment without substantially adding to its wet weight (i.e., the weight of the embodiment when dry and/or free of any water less the weight of the water displaced by the embodiment's dry portions). In some embodiments, a part of the tube ballast consists of and/or contains an additional volume of material denser than water, e.g. rock, iron, steel, aggregate stone or gravel, or concrete, in order to provide additional hydrostatic stability to the embodiment.

When in operation, the up and down motions of the embodiment due to the motion of waves acting on and/or against the embodiment cause water in the embodiment's inertial water tube (not visible and substantially inside the tube jacket 606/614) to periodically and/or occasionally be forced upward, and to be ejected into the hollow interior of flotation module 604/605. This periodic pumping of water, from the body of water 601 on which the embodiment floats, into the interior of the hollow flotation module 604/605 via the inertial water tube tends to raise and/or increase the average pressure of the water and gas inside the hollow flotation module. When the pressure of the air and water trapped inside the hollow flotation module is sufficiently great, then water trapped, cached, and/or stored, within the interior of the hollow flotation module 604/605 tends to rise up from the interior of the hollow flotation module through turbine ingress pipe 608 and therethrough to flow into turbine generator assembly 602, where it tends to flow through, and/or to cause the rotation of, a water turbine therein (not visible). And, having passed through, and imparted energy to, the water turbine, the risen water then tends to flow downwardly through turbine effluent pipe 609 and emerge from effluent pipe discharge mouth (not visible; penetrates through the tube jacket wall 606) into the body of water 601.

The thrust generated by the exit of water from the effluent pipe discharge mouth (not visible) and into the body 601 of water causes the embodiment to move through the body of water 601 in a direction substantially opposite that of the water outflow and/or discharge.

An embodiment of the present disclosure includes, incorporates, and/or utilizes, "steering elements" including, but not limited to, multiple effluent pipe discharge mouths (whose relative flow magnitudes can be controlled and/or adjusted e.g. using a valve and/or using variations in the torque of an operationally connected water turbine), and a pair of rudders. The embodiment can utilize its steering elements to propel and steer the embodiment in a specific direction, and/or to a specific location. In a similar embodiment, an electrical control system controls the steering elements in order to maintain and/or adjust the position of the embodiment in response to electromagnetically encoded signals and/or instructions received by a phased array antenna.

The embodiment's turbine-generator assembly 602, computer chamber (not visible), and air pump 607, are all contained on and/or within a removable spar module 612 which incorporates pad eyes, e.g., 613, that facilitate the placement and/or removal of the removable spar module 612 by a ship crane or aircraft, e.g. for servicing or replacement. In some embodiments, the removable spar module's removal is limited or prevented by an electronically controlled locking mechanism. In some embodiments, the electronically controlled locking mechanism is controlled by a computer that receives electromagnetically encoded instructions via the respective embodiments' phased array antennas, e.g. signals that are sent from a land-based control center or a maintenance vessel to unlock the removable spar module at a time corresponding to the presence of said maintenance vessel in the vicinity of the embodiment.

In the embodiment 600 illustrated in FIG. 55, the volume of water enclosed and/or entrained by the tube jacket 606/614 wall, and/or within the tube ballast void 647, is substantially greater at a deeper portion 614 than at an upper portion 606. And, the flow-normal and/or horizontal cross section of the tube ballast is substantially greater at a deeper portion 614 of the tube jacket than at an upper portion 606.

In some embodiments, the horizontal diameter of hollow flotation module 604/605 may be 30 meters, 40 meters, 50 meters, 60 meters, or 70 meters. In some embodiments, the vertical height of the embodiment, from the top of hollow flotation module 605 (e.g. at the turbine-generator assembly 602), to the lower mouth 619 of the inertial water tube, may be 100 meters, 130 meters, 160 meters, 190 meters, or 220 meters.

In some embodiments, a different type of antenna, i.e., other than a phased array, and/or a different means of transmitting and/or receiving coded signals, computational tasks, and/or other forms and/or types of data, is used in place or, or in addition to, a phased array antenna. For instance, a dipole antenna or a satellite dish may be used.

Figure 56:
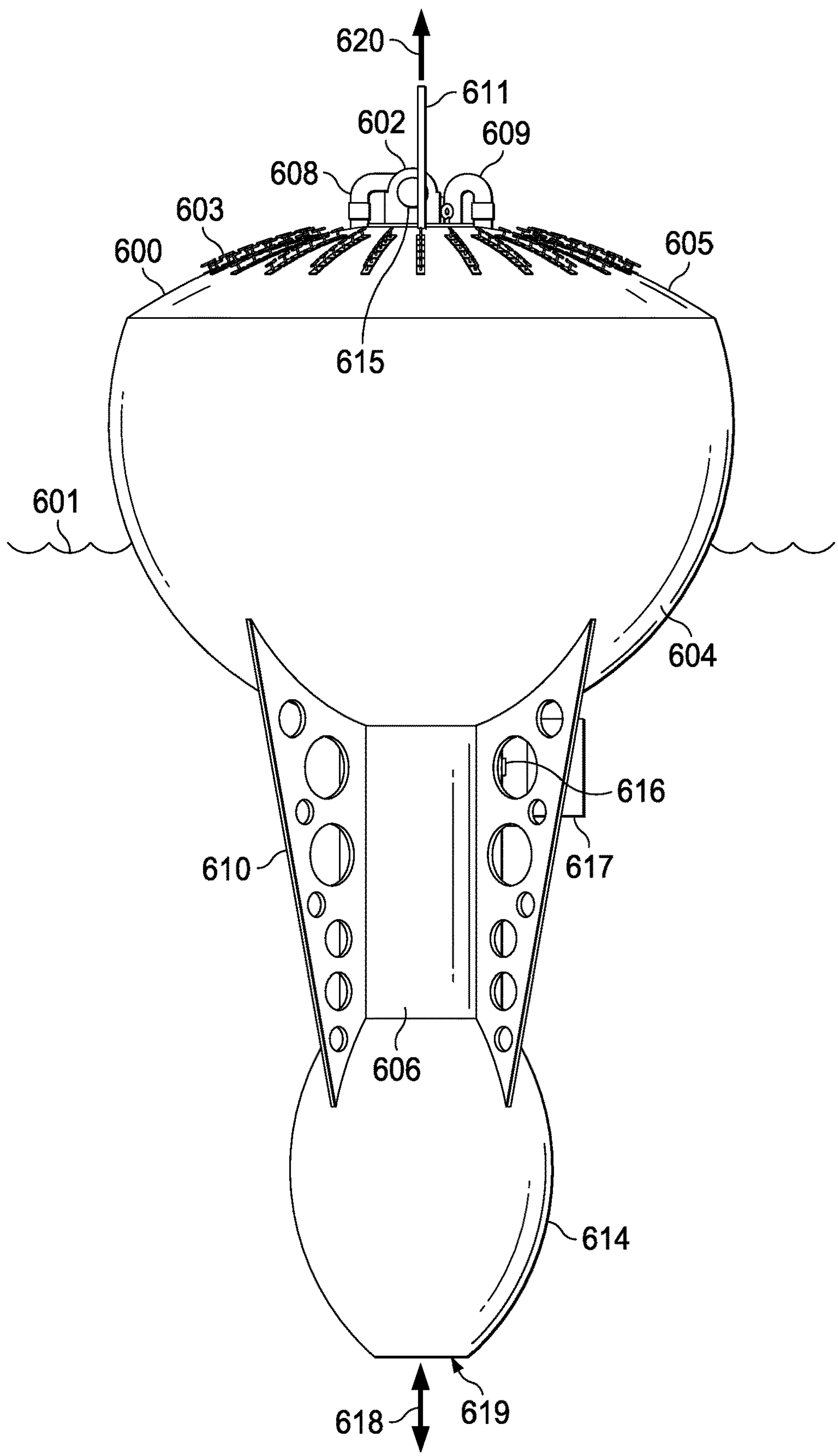
FIG. 56 is a left-side view of the embodiment of FIG. 55.

FIG. 56 shows a left-side view of the same embodiment of the current disclosure that is illustrated in FIG. 55.

Turbine-generator assembly 602 includes a generator 615 that is operatively connected to the water turbine (not visible) inside the turbine-generator assembly 602.

Water from within the hollow flotation module 604/605 flows up and into the turbine-generator assembly 602 through ingress pipe 608, and imparts energy to the water turbine therein (not visible) and causes it to rotate. Water discharged from the water turbine flows out of the turbine-generator assembly 602 through effluent pipe 609 and thereafter exits through effluent pipe discharge mouth 616, thereby leaving the embodiment 600 and entering the body of water 601 on which the embodiment floats, and thereby tending to generate thrust that tends to move the embodiment 600 in a "forward" direction (i.e., to the left in the embodiment configuration and/or orientation illustrated in FIG. 56). An adjustable rudder 617 is controlled and/or adjusted by an embodiment control system (not shown). The rudder 617 enables that embodiment control system to steer the embodiment so as to follow a specified and/or desirable course, e.g., such as a course and/or a destination specified in a message and/or instruction received via a radio signal captured by the embodiment's phased array antenna 603.

As the embodiment 600 moves up and down in response to waves passing across the surface 601 of the body of water on which the embodiment floats, water enters and leaves 618 a lower mouth and/or aperture 619 in the inertial water tube (not visible and inside, and substantially coaxial with, the tube jacket 606/614).

If the pressure of the air and/or water within the hollow flotation module 604/605 exceeds a threshold pressure, then pressurized water from within the hollow flotation module will tend to be ejected 620 from an upper mouth and/or aperture in a pressure-relief pipe 611 thereby relieving and/or reducing that pressure, and potentially preventing damage to the embodiment that might otherwise result from an excessive pressure within the hollow flotation module.

Figure 57:
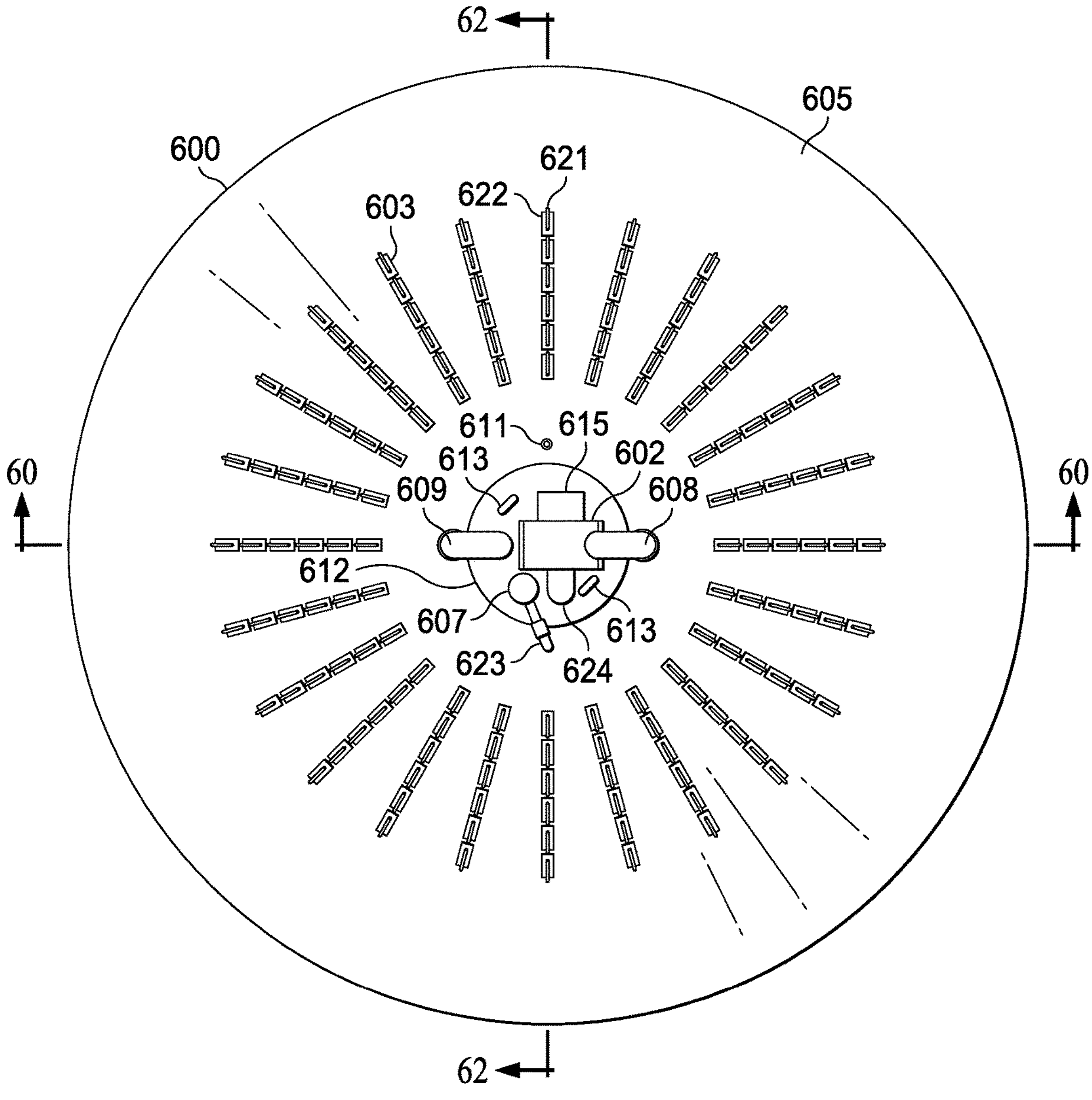
FIG. 57 is a top-down view of the embodiment of FIGS. 55 and 56.

FIG. 57 shows a top-down view of the same embodiment of the current disclosure that is illustrated in FIGS. 55 and 56.

The individual dipole antennas of which the embodiment's phased array antenna 603 is comprised are visible on atop surface of the hollow flotation module 605. Each individual antenna element 621 (e.g., each dipole antenna) of the phased array antenna 603 is mounted to a mounting plate 622 which secures it to the hollow flotation module 605. Phased array antenna 603 enables electromagnetically encoded transmissions to be sent from, and received by, the embodiment to remote antennas, e.g. the antenna(s) of a satellite.

The individual antenna elements, e.g., 621, of the phased array antenna 603 are arranged radially around the embodiment's central removable spar module 612. The phased array antenna 603, the removable spar module 612, the hollow flotation module 605, and the inertial water tube (not visible), share, at least to an approximate degree, a common flow-normal and/or vertical longitudinal axis (i.e., normal to the page and at the approximate center of the circular perimeter 600 of the embodiment with respect to the orientation of the embodiment illustrated in FIG. 57).

The air pump 607, when activated, pumps pressurized air into the interior of the hollow flotation module 605 through air pipe 623. Air pump 607 can be used to increase the mass and/or pressure of air inside the interior chamber, and/or enclosure, of the embodiment 600. Air pump 607 can be powered, at least in part, by electricity generated by turbine-generator assembly 602, electricity generated by a solar panel (not shown), and/or it can be directly mechanically driven by the rotating water turbine of turbine-generator assembly 602, or by any other means, mechanism, and/or source of electrical power.

Pressurized water from within hollow flotation module 605 is forced up, as a consequence of its pressure, through turbine ingress pipe 608 whereupon it flows through, engages, and causes to turn, a water turbine (not visible) inside turbine-generator assembly 602, which, in turn, causes the rotor of an operatively connected generator 615 to turn, thereby generating electrical power in response to the passage of water through the water turbine. Effluent from the water turbine flows out of the turbine-generator assembly 602 through effluent pipe 624. Water flowing out of the water turbine through effluent pipe 624 flows down and into a heat-exchanging, and/or heat-absorbing, cooling chamber (not visible) located within the removable spar module 612 and positioned directly beneath the upper wall of the removable spar module and the turbine-generator assembly 602 thereon. After flowing through the cooling chamber, the water turbine effluent flows up and into effluent pipe 609, and therethrough down to effluent pipe discharge mouth (616 in FIG. 56) where it enters the body of water 601 on which the embodiment floats, thereby generating thrust that tends to propel the embodiment across the surface of the water on which the embodiment floats.

Figure 58:
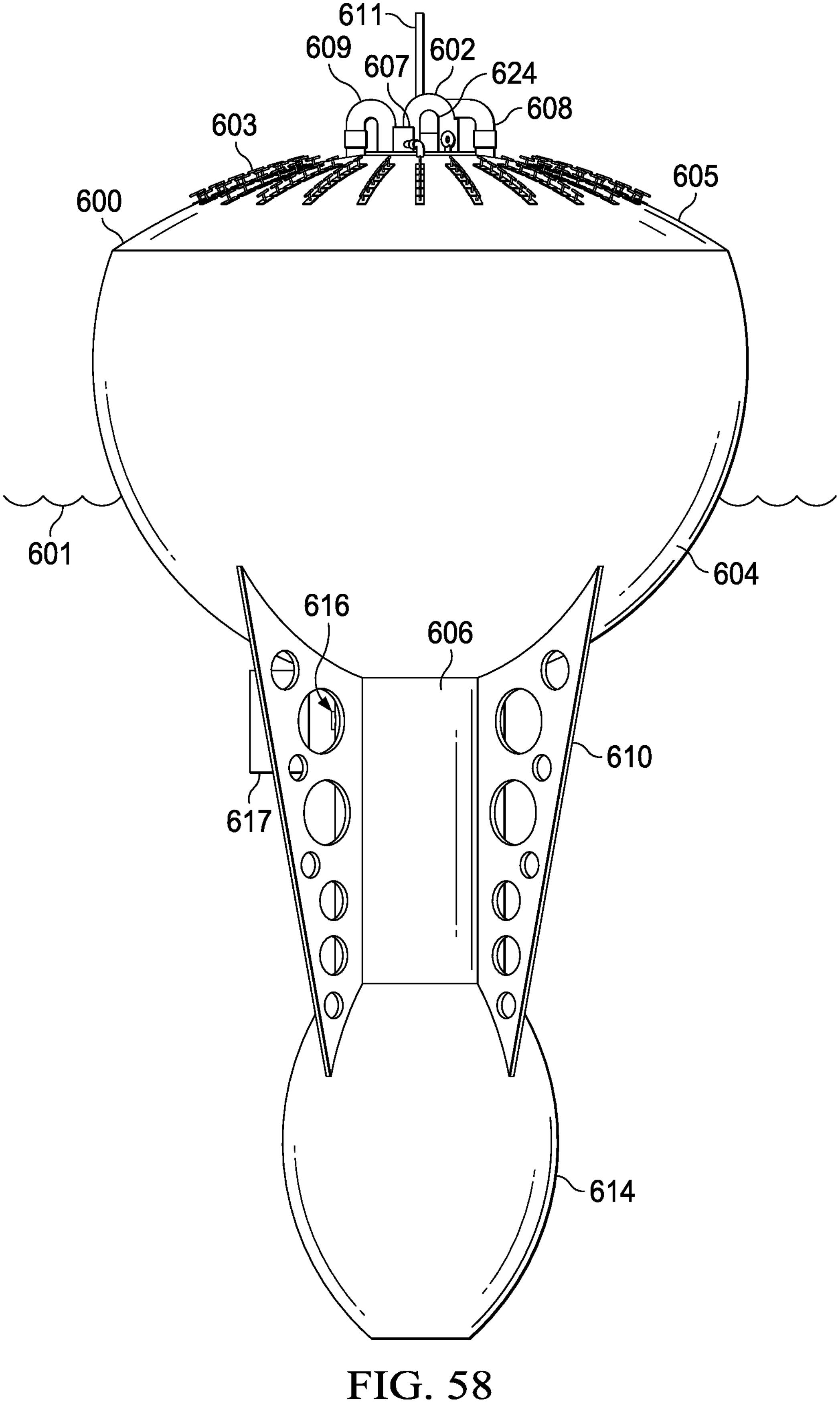
FIG. 58 is a right-side view of the embodiment of FIGS. 55-57.

FIG. 58 shows a right-side view of the same embodiment of the current disclosure that is illustrated in FIGS. 55-57.

Figure 59:
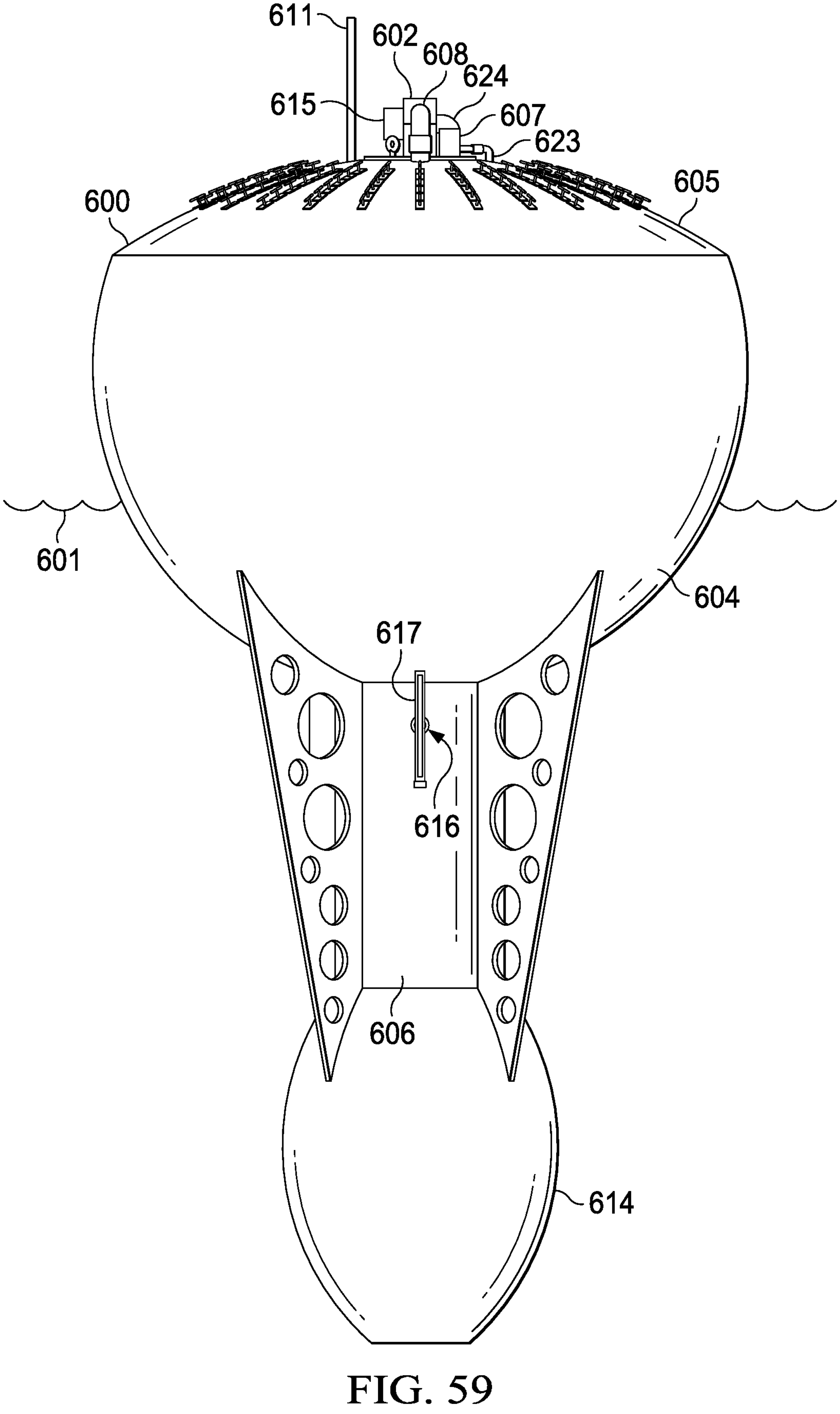
FIG. 59 is a back-side view of the embodiment of FIGS. 55-58.

FIG. 59 shows a back-side view of the same embodiment of the current disclosure that is illustrated in FIGS. 55-58.

Figure 60:
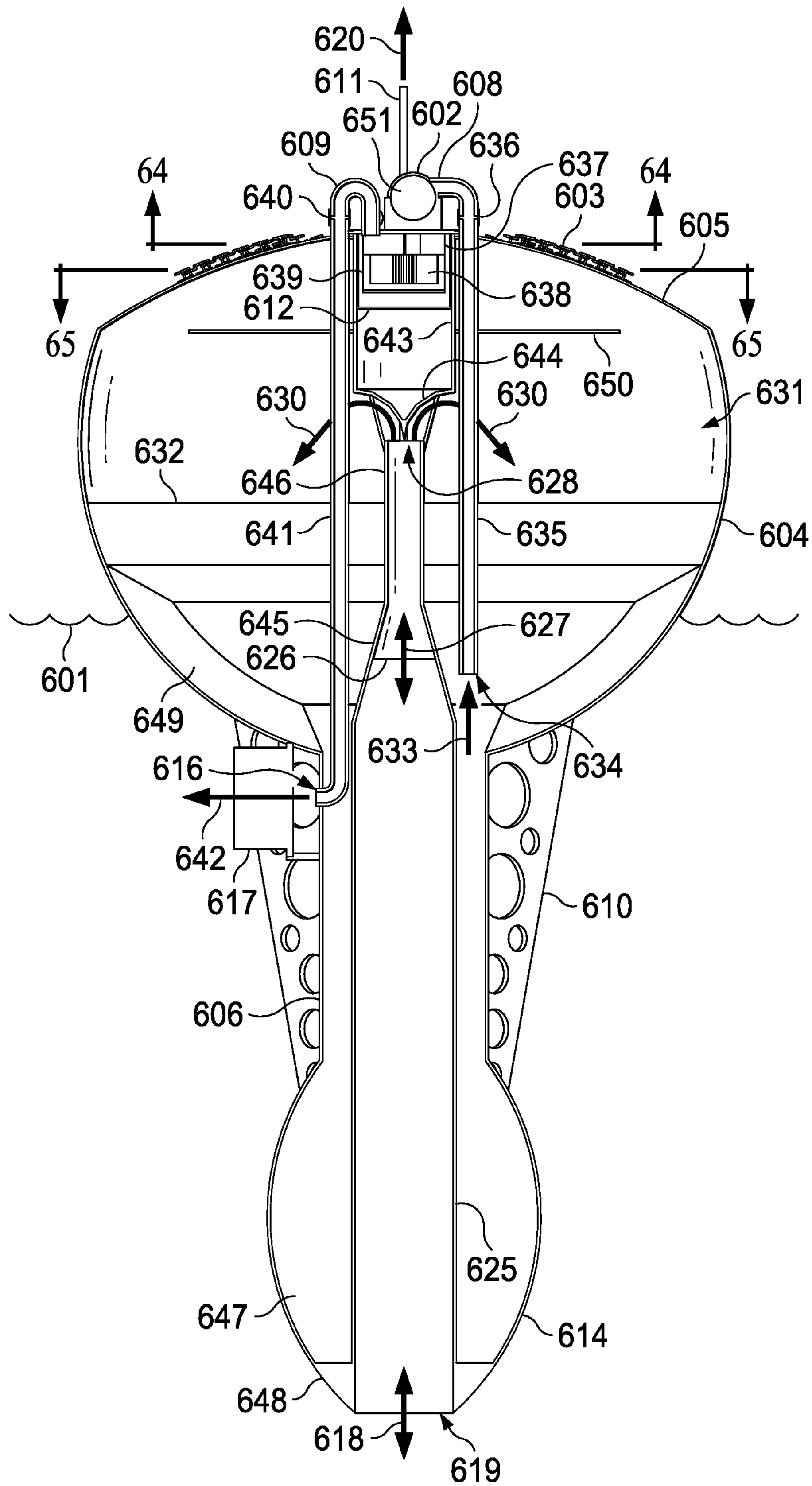
FIG. 60 is a right-side sectional view of the embodiment of FIGS. 55-59.

FIG. 60 shows a right-side sectional view of the same embodiment of the current disclosure that is illustrated in FIGS. 55-59, where the section is taken along the section line 60-60 specified in FIG. 57.

As the embodiment moves up and down in response to the passage of waves across the surface 601 of the body of water on which the embodiment floats, water moves 618 in and out of a lower mouth 619 of the embodiment's inertial water tube 625. The water inside inertial water tube 625, as well as the upper surface 626 of that water, moves 627 up and down in response to the passage of waves at, around, and/or beneath, the embodiment. Occasionally, the surface 626 of the water inside the water tube 625 rises so high, and/or with such speed, momentum, and/or kinetic energy, that it escapes an upper mouth 628 of the inertial water tube 625 and collides with a water diverter 644 and is diverted 630 laterally such that it tends to fall into the hollow 631, and/or interior space, enclosure, and/or chamber, within the hollow flotation module 604/605, thereby adding water to a water reservoir and/or pool 632 of water therein.

Inertial water tube 625 is a substantially cylindrical tube and is concentric and/or coaxial with both the cylindrical tube ballast wall 606 and the oblong tube ballast wall 614. Inertial water tube 625 passes vertically through, and/or within, the center of tube ballast jacket 606/614. Inertial water tube 625 is open to the body of water 601 on which the embodiment floats at lower mouth 619, such that the interior of inertial water tube 625 communicates with the water outside (e.g. below) the embodiment, and water can pass freely 618 into (upwardly) and out from (downwardly) inertial water tube 625 via lower mouth 619.

As a consequence of the ejection of water from the upper mouth 628 of inertial water tube 625, and its subsequent addition to the interior hollow, chamber, and/or enclosure 631 of the hollow flotation module, and/or the addition of pressurized air to the interior hollow, chamber, and/or enclosure 631 by air pump 607, and/or the addition of both, the pressure of both the air (occupying the upper portion of the hollow flotation module's interior hollow, chamber, and/or enclosure 631 that lies above the surface 632 of the pool of water therein) and the water 632 within that hollow, chamber, and/or enclosure 631. The pressure of the water 632 causes water to flow 633 into, and up through, the lower mouth 634 of that portion 635 of the turbine ingress pipe 608 that is connected, via pipe coupler 636, to that portion 608 of the turbine ingress pipe that is directly connected to turbine-generator assembly 602. The water flowing up through turbine ingress pipe 635/608 flows into, onto, and/or through, water turbine 651 thereby tending to cause that turbine to rotate.

Hollow flotation module 604/605 contains a hollow, chamber, enclosure, vessel, and/or void 631 that can contain quantities of water 632 and/or air (above the water 632) at various pressures, including pressures significantly elevated from atmospheric pressure. Hollow flotation module void 631 has a top interior surface defined by the upper hollow flotation module wall 605, and a bottom interior surface defined by the lower hollow flotation module wall 604 of the flotation module.

Following its passage through water turbine 651, the water that reached the water turbine via turbine ingress pipe 635/608 flows out of the turbine-generator assembly through effluent pipe 624 and therethrough down and into a water cooling chamber 637 where it will tend to absorb at least a portion of the heat generated by computers, batteries, power converters, radio transceivers, phased-array controllers, and other electronic and/or electrical components and/or circuits 638, that are positioned, affixed, mounted, and/or protected, within computer chamber 639.

After its passage through the water cooling chamber 637, the water that reached and flowed through the water turbine 651 via ingress pipe 635/608 flows out through the upper portion 609 of the effluent pipe, and then, via pipe coupler 640, through the lower portion 641 of that effluent pipe, after which it exits 642 the pipe via effluent pipe discharge mouth 616, thereby generating thrust in a direction opposite that of its exit flow. Rudder 617 allows an embodiment navigational control system (not shown) to direct the motion of the embodiment 600 across the surface 601 of the body of water on which the embodiment floats thereby steering the embodiment along a desirable and/or specified course, and/or to a desirable and/or specified destination.

Turbine-generator assembly 602, effluent pipe 624, the upper portion 608 of the ingress pipe, the upper portion 609 of the effluent pipe, air pump 607, water cooling chamber 637, and computer chamber 639 (and the computers 638 and other electrical circuits therein), are attached to, and/or incorporated within, removable spar module 612. And, removable spar module 612 is positioned within and removably attached to removable spar enclosure 640.

If and when movable pipe connectors 636 and 640 are loosened, moved, and/or removed, the upper portions 608 and 609, of the respective ingress and effluent pipes, can be separated from their respective complementary lower pipe portions and/or segments 635 and 641 thereby permitting those respective upper and lower pipe portions to be separated. Similarly, although not visible in the illustration of FIG. 60, a movable and/or removable pipe connector permits the separation of upper and lower portions of pipe 623 that connects air pump 607 to the interior void of hollow flotation module 604/605. After the upper pipe portions are disconnected from their complementary lower pipe portions through the removal of the respective pipe connectors, removable spar module 612 may be separated and/or removed from its complementary removable spar enclosure 643.

Aside from the rudder 617, and its associated mechanical components and/or systems, all of the moving (e.g., bearings) and electronic components of the embodiment 600 are incorporated within removable spar module 612. Thus, if any of those respective moving and electronic components fail, the damaged and/or non-functional removable spar module 612 may be replaced with an operational one. A pair of pad eyes (613 in FIG. 57) facilitate the lifting, movement, and placement (or replacement), of a removable spar module, such as by a crane on an adjacent ship, or a helicopter.

In normal operation, removable spar module 612 is locked inside its complementary removable spar enclosure 643 by an electronic locking mechanism that can be locked and unlocked by coded radio signals received by the embodiment's phased array antenna 603.

A bottom surface 644 of the removable spar enclosure 643 creates a water diverter. That bottom surface 644 has an approximately conical shape and tends to laterally divert 630 water that is ejected from the upper mouth 628 of water tube 625.

The inertial water tube 625 of the embodiment illustrated in FIG. 60 has three geometrically distinct segments, sections, or portions. A bottom-most portion 625 is approximately cylindrical. A middle portion 645 is tapered and/or approximately frusto-conical. And, an upper-most portion 646 of the inertial water tube is, like the bottom-most portion 625, approximately cylindrical. However, the diameter, width, and/or flow-normal cross-sectional area, of the upper-most portion is less than that of the bottom-most portion 625.

Inertial water tube 625 is defined by three continuous and mutually interconnected sections: a lower cylindrical section 625, a middle frustoconical section 645, and an upper cylindrical section 646. Lower cylindrical section 625 rises from lower mouth 619 up through the region about which is stored, entrained, and/or positioned, tube ballast 647, and through the bottom portion of flotation module 604.

When the embodiment 600 is in operation, and waves pass under and/or collide with the embodiment, water tends to move up and down within the inertial water tube 625. Water moving upward within and/or through lower cylindrical section 625 tends to accelerate, and/or to be accelerated, within the middle frustoconical section 645, and thereafter to move upward through the upper cylindrical section 646. Water that reaches the top of the upper cylindrical section 628 and has remaining upward velocity can leave water tube 646, and/or be ejected from it, whereupon it will tend to be laterally diverted by water diverter 644, so that it is deposited in the hollow, chamber, enclosure, vessel, and/or void 631 of hollow flotation module 604/605, whereupon it becomes "trapped" and typically cannot easily enter, and/or flow down, upper cylindrical section 628.

Continued wave action at and/or against the embodiment 600 can cause water to be periodically, occasionally, frequently, and/or somewhat regularly, pumped into interior enclosure 631, and to thereby be added to the reservoir 632 of water therein, which will tend to progressively, incrementally, and/or somewhat continually, raise the interior waterline 632 of the water deposited within the hollow flotation module 604/605. At the same time, the air or gas that is trapped with and/or alongside the water inside the hollow, chamber, enclosure, vessel, and/or void 631 is pressurized and compressed when water is added to the enclosure 631. As this air or gas is compressed, the pressure of the water in the enclosure also tends to be increased. At some point, as more and more water is added to the enclosure 631, and the pressure of the air and water within that enclosure 631 continues increasing, the pressure becomes sufficient to force water from the pool 632 into 633 the lower mouth 634 of the turbine ingress pipe, and up the turbine ingress pipe 635, to the point that it reaches and flows through the water turbine 651 within the turbine-generator assembly 602. Water flowing out of, and/or away from, the water turbine 651 through effluent pipe 609/641 tends to pull water up through turbine ingress pipe 608/635, and through the water turbine 651.

At the same time that water is added to the interior enclosure 631, tending to cause the pressure of the air and water within enclosure 631 to increase, the average density of the embodiment 600 tends to increase, thereby tending to cause the device to sit lower in the water which tends to reduce the effective and/or net head pressure required to drive water through the water turbine and back to the body of water 601 on which the embodiment floats, thereby tending to increase the rate at which water is evacuated from the embodiment.

The shape, dimensions, design, and/or geometrical configuration, of the inertial water tube is arbitrary and inertial water tubes with other shapes, dimensions, designs, and/or configurations are included within the scope of the present disclosure.

While the embodiment 600 illustrated in FIGS. 55-60 has a single inertial water tube, embodiments including and/or incorporating two or more inertial water tubes are included within the scope of the present disclosure.

While the embodiment 600 illustrated in FIGS. 55-60 has a frusto-conical tapered portion and/or constriction within its inertial water tube, embodiments including, incorporating, and/or utilizing, one or more inertial water tubes characterized by tapered portions and/or constrictions that are not frusto-conical, e.g., having smooth, approximately hourglass or inverted-wine-glass shaped tapers, are included within the scope of the present disclosure.

While the embodiment 600 illustrated in FIGS. 55-60 has an inertial water tube 625 comprised of three portions distinguished by differing geometrical shapes, patterns, configurations, and/or designs, embodiments including, incorporating, and/or utilizing, one or more inertial water tubes comprised of one, two, four, or more, such portions are included within the scope of the present disclosure.

While the embodiment 600 illustrated in FIGS. 55-60 has an inertial water tube 625 comprised of a tapered and/or constricted portion 645 positioned between adjoining, adjacent, and/or connected cylindrical portions, embodiments including, incorporating, and/or utilizing, one or more inertial water tubes comprised of a tapered and/or constricted portion connected only to a bottom cylindrical portion, i.e., and omitting an upper cylindrical portion 646, such that the mouth 628 through which water is ejected is the upper mouth of the tapered and/or constricted portion, are included within the scope of the present disclosure.

While the embodiment 600 illustrated in FIGS. 55-60 has an inertial water tube 625 comprised of a tapered and/or constricted portion 645 positioned between adjoining, adjacent, and/or connected cylindrical portions, embodiments including, incorporating, and/or utilizing, one or more inertial water tubes comprised of a tapered and/or constricted portion connected only to an upper cylindrical portion, i.e., and omitting a lower cylindrical portion 625, such that the mouth 619 through which water flows from into and out of the inertial water tube is the lower mouth of the tapered and/or constricted portion, are included within the scope of the present disclosure.

While the embodiment 600 illustrated in FIGS. 55-60 has an inertial water tube 625 comprised of a tapered and/or constricted portion 645 positioned between adjoining, adjacent, and/or connected cylindrical portions, embodiments including, incorporating, and/or utilizing, one or more inertial water tubes that are tapered along their entirety, i.e., omitting both upper 646 and lower 625 cylindrical portions such that the mouths 628 and 619 through which water flows into and out of the tube are the upper and lower mouths, respectively, of the tapered portion of the inertial water tube, are included within the scope of the present disclosure.

The water reservoir 632 occupies a lower portion of the hollow chamber 631 within the flotation module 604/605. However, that water reservoir extends down and surrounds the sides of the water tube 625 by occupying a space, chamber, and/or void, i.e., the tube ballast void 647, positioned and/or located between the wall of the bottom-most portion 625 of the inertial water tube and the wall of the surrounding and/or circumferential water tube jacket 606/614. The water 647 between the inertial water tube 625 and the tube jacket 606/614 is effectively tube ballast (i.e., ballast positioned adjacent to the inertial water tube 625). The tube ballast chamber 647 is contiguous and fluidly-connected to the water reservoir 632 and to the entire hollow chamber 631 within the flotation module 604/605.

A different embodiment of the present disclosure similar to the one illustrated in FIGS. 55-60 also contains, includes, and/or incorporates, a tube ballast 647 comprised of water that is positioned, entrained, captured, and/or stored, between the inertial water tube 625 and the tube jacket 606/614. However, the space, chamber, vessel, container, and/or volume, containing the tube ballast 647 of this embodiment is not contiguous nor fluidly-connected to the water reservoir 632 nor to the entire hollow chamber 631, because in this embodiment (unlike the one illustrated in FIGS. 55-60), an impermeable barrier separates the tube ballast from the hollow chamber 631.

Tube ballast 647 is located at the bottom portion of the embodiment 600 and is defined and/or constrained by walls 614/606 that are rigidly and concentrically attached to the outer circumference of the embodiment's inertial water tube 625 that passes vertically inside of it. The tube ballast walls 614 of tube ballast 647 have a curved and/or convex exterior shape. The horizontal cross-sectional area of tube ballast 647 is greatest at a vertical position that falls within the lower half of the embodiment (i.e. a vertical position located beneath the vertical midpoint of the embodiment). In a similar embodiment of the present disclosure, the horizontal cross-sectional area of tube ballast 647 is greatest at a vertical position that falls within the lower third of the embodiment. The scope of the present disclosure includes tube ballast chambers of any size, shape, relative position on the embodiment, and/or design.

Adjacent to a lower end of the inertial water tube 625, within a bottom portion of the tube ballast chamber 647, is a weight 648 and/or negatively buoyant material (e.g., rocks, sand, metallic objects, and/or other aggregate materials) that also serves as ballast for the embodiment 600.

Tube ballast wall 606/614 includes, creates, and/or comprises, a hollow container that serves as a jacket and/or wall that surrounds inertial water tube 625, especially but not exclusively jacketing a bottom portion of inertial water tube 625. Tube ballast wall 606/614 encloses and substantially constrains a large volume of water 647, "fixing" that water's vertical position relative to water tube 625 and therefore effectively adding the mass of that enclosed water to the mass of the embodiment. Tube ballast wall 614 defines a shape that corresponds to an elongated torus, whose central axis is nominally oriented vertically, with thin bottom annulus near 619, thin top annulus near 606, and bulbous center region near 614, so as to pass through the water with minimal drag (while providing the desired inertial ballast at the desired position along the inertial water tube).

While the embodiment 600 illustrated in FIGS. 55-60 has a tube ballast chamber 647 characterized by a narrower upper portion 606 and a wider, e.g., bulging, and/or convex, lower portion 614, embodiments including, incorporating, and/or utilizing, tube ballast chambers of different shapes, dimensions, designs, and/or geometrical configurations are also included within the scope of the present disclosure.

While the embodiment 600 illustrated in FIGS. 55-60 has a single tube ballast chamber 647, embodiments including, incorporating, and/or utilizing, two or more tube ballast chambers, e.g., distributed across multiple ballast tubes adjacent to the water tube 625, distributed vertically across a single ballast tube, distributed circumferentially about a single ballast tube, are also included within the scope of the present disclosure.

While the embodiment 600 illustrated in FIGS. 55-60 has a tube ballast chamber 647 that is fluidly-connected to both the water reservoir 632 and hollow flotation module chamber 631, embodiments including, incorporating, and/or utilizing, one or more tube ballast chambers that are separated from, and not contiguous with, nor fluidly-connected to, the interior chambers of their respective hollow flotation modules, nor to water reservoirs therein, are also included within the scope of the present disclosure.

While the embodiment 600 illustrated in FIGS. 55-60 has a tube ballast chamber 647 that exerts a consistent, if not constant, inertial resistance to an acceleration of the embodiment 600, embodiments including, incorporating, and/or utilizing, tube ballast chambers through which water may, e.g., if so actuated, be allowed to move with relative freedom in and out of the ballast chamber, thereby effectively reducing, if not eliminating, the inertial resistance of the water therein to accelerations of the embodiment are also included within the scope of the present disclosure.

While the embodiment 600 illustrated in FIGS. 55-60 has negatively-buoyant, i.e., supplemental, ballast 648 affixed to, within, and/or near, a lower portion of the inertial water tube 625 and/or tube jacket 614, adjacent to, and/or at the bottom of, tube ballast void 647, embodiments including, incorporating, and/or utilizing, negatively-buoyant ballast positioned at other locations relative to the respective hollow flotation modules and/or inertial water tubes, as well as embodiments that have no such negatively-buoyant ballast, are also included within the scope of the present disclosure. The incorporation of negatively-buoyant ballast, its distribution within an embodiment, and/or the amount, weight, and/or mass of such ballast, is subject to many configurations, designs, and/or structures, and all such variations are included within the scope of the present disclosure.

Lower flotation module surface and/or wall 604 provides "permanent buoyancy" to the embodiment because it is thickened relative to the upper flotation module surface and/or wall 605 and either is made of a low-density material or contains hermetically sealed voids containing gas or a low-density material like closed-cell foam, in either case decreasing the average density of the embodiment. For instance, bottom flotation module surface and/or wall 604 might be made of closed cell foam. Or, bottom flotation module surface and/or wall 604 might include sealed bulkhead-separated compartments containing air, nitrogen, and/or other gases. In other words, bottom flotation module surface and/or wall 604 has an average density lower than that of water, and therefore contributes to an overall positive buoyancy of the embodiment. Other similar embodiments of the present disclosure include, incorporate, and/or utilize, permanent buoyancy that is located elsewhere on and/or in the embodiment. Some embodiments of the present disclosure include, incorporate, and/or utilize, a buoyant cladding or jacket around inertial water tube 625, especially around its middle frustoconical section 645. Some embodiments of the present disclosure have no structures, components, elements, features, and/or parts, that provide the respective embodiments with permanent buoyancy. These embodiments achieve positive buoyancy, and remain floating, as a result and/or consequence of, the air and/or other gas trapped, and/or forming a "bubble", within hollow flotation module chamber 631.

The hollow flotation module 604 incorporates permanent buoyancy in the form of a material, structure, chamber, module, space, volume, and/or element, 649 from which water is largely, substantially, and/or completely, excluded. The illustrated embodiment 600 includes a volume 649 conformal to a bottom surface of the hollow flotation module 604 wherein water is substantially excluded.

The shape, dimensions, design, position, distribution within the embodiment, geometrical configuration, relative volume, absolute volume, and/or material(s) through which water is excluded from a part, region, area, volume, and/or portion of an embodiment of the present disclosure, e.g., so as to create and/or establish a measure of permanent buoyancy within the embodiment, may be achieved through, and/or by means of, many possible embodiment configurations, as well as through, and/or by means of, many other shapes, designs, relative and absolute volumes, and materials, suitable to the exclusion of water from at least a portion of an embodiment, and embodiments including, incorporating, and/or utilizing any and/or all such variations are included within the scope of the present disclosure.

While the embodiment 600 illustrated in FIGS. 55-60 has a single permanently buoyant air-filled chamber 649 comprised of bounding steel plates, embodiments including, incorporating, and/or utilizing permanently-buoyant elements comprised of closed-cell foam, foam-filled chambers, etc., and all such variations are included within the scope of the present disclosure.

Removable spar enclosure 643 is structurally stabilized, at least in part, by four approximately horizontal struts, e.g., 650, that rigidly connect it to the wall of the hollow flotation module 604/605, e.g., that connect it to the reinforced seam between hollow flotation module portions 604 and 605.

Embodiments including, incorporating, and/or utilizing, any number, geometry, design, configuration, strength, thickness, type, material composition, etc., of strengthening struts, stringers, and/or other structural reinforcements, used to stabilize an embodiment's removable spar enclosure and/or water diverter are included within the scope of the present disclosure.

Co-located with the turbine-generator assembly 602 is an array 638 of computers and/or other electronic components and/or circuits. Computer array 638 is located in a hermetically sealed computer container and/or chamber 639 and the computers and/or other electronic components and/or circuits within the computer array 638 are energized, at least in part, by electrical power generated by the embodiment and/or its generator 651.

Computer array 638 consists of computer chips (CPUs, GPUs, ASICs, or other similar chips) and other computer components at least some of which are bathed in a heat exchange fluid that has low electrical conductivity and tends to boil at a temperature corresponding to an operating temperature of the computer chips. This heat exchange fluid tends to rise as a gas to the top of the hermetically scaled computer chamber 639 when the computer array is in operation. A heat exchange surface at the top of hermetically sealed computer chamber 639 allows heat from the heat exchange fluid to be transferred to water that has traveled up turbine ingress pipe 635/608 and into and/or through cooling chamber 637. Accordingly the water moved by the embodiment to the turbine-generator assembly 602 is used, indirectly, to cool the computer chips of the computer array 638, via the intermediation of a phase-changing boiling heat exchange fluid in the hermetically sealed computer chamber 639. After receiving heat from the heat exchange fluid through the heat exchange surface that separates the computer chamber 639 from the cooling chamber 637, the water in the cooling chamber 637 flows through effluent pipe 609/641 and through effluent pipe discharge mouth 616. By this mechanism, heat generated by the embodiment's computer chips and other computer components is indirectly and/or passively discharged into the body of water 601 on which the embodiment floats.

In the embodiment illustrated in FIG. 60, the computer chamber 639 and the cooling chamber 637 are located at a top portion of the embodiment, but this is not essential. The computer chamber 639 and the cooling chamber 637 can be located at any location on and/or in the embodiment, including in and/or at an interior middle portion (e.g. adjacent to middle frustoconical section 645), a side portion (e.g. adjacent to a side wall of the hollow flotation module 604/605), or a bottom portion (e.g. adjacent to a bottom wall of the flotation module 604 or adjacent to the lower mouth 619 of the inertial water tube 625). Nor is it essential that the water to which heat is transferred is in a closed, and/or an enclosed, conduit. e.g., in a cooling chamber 637, near the turbine-generator assembly 602. For instance, in an embodiment of the present disclosure, a heat exchange surface of a cooling chamber (e.g., for the embodiment's one or more computer chambers) is positioned inside the interior enclosure 631 of the embodiment's hollow flotation module 604/605, and the water 632 inside that interior enclosure 631 of the embodiment's hollow flotation module 604/605 is used to remove and/or absorb heat from the boiling heat exchange fluid within the embodiment's computer chamber.

In an embodiment of the present disclosure, the heat exchange surface of a cooling chamber (e.g., for the embodiment's one or more computer chambers) is positioned at or adjacent to an outer peripheral surface of the embodiment, and the water that is used to remove heat from the boiling heat exchange fluid within the embodiment's computer chamber is the water upon which the embodiment floats.

In an embodiment of the present disclosure, inertial water tube 625 is substantially longer/taller than in the embodiment configuration illustrated in FIG. 60. Accordingly, the distance between (i) the vertical location of maximal horizontal cross section of the hollow flotation module 604/605 and (ii) the vertical location of maximal horizontal cross section of the tube ballast 647 may be substantially longer than that shown here, and embodiments including, incorporating, and/or utilizing, any length of inertial water tube 625 are included within the scope of the current disclosure.

In the embodiment illustrated in FIGS. 55-60, a water turbine 651 is located at an upper, and/or top-most, position in the embodiment 600 at an intermediate position between ingress and effluent pipes. However, the scope of the current disclosure includes embodiments wherein a water turbine is placed at other positions within the embodiment, and at other relative positions along the paths across and/or over which water flows from one or more chambers and/or water reservoirs inside the embodiment and back to the bodies of water 601 on which those embodiments float. For example, an embodiment of the present disclosure has a water turbine positioned near the effluent pipe discharge mouth 616 of the effluent pipe 641. Another embodiment of the present disclosure has a water turbine positioned near the entry aperture and/or mouth 634 of the ingress pipe 635.

In the embodiment illustrated in FIGS. 55-60, the potential energy of the water accumulated, trapped, captured, cached, and/or stored, within the pressurized reservoir 632 of the interior chamber 631 of the hollow flotation module 604/605 is used to desalinate water. The scope of the present disclosure includes embodiments that utilize and/or transform a substantial portion, and/or any portion, of the potential energy (e.g., head pressure) generated by the embodiments for thrust in order to propel a ship-like embodiment. The scope of the present disclosure includes embodiments that utilize and/or transform the potential energy (e.g., head pressure) generated by the embodiments for other useful purposes and/or applications, such as pumping pressurized water through effluent filters and/or adsorbent materials so as to capture and/or adsorb useful minerals from that water.

In some embodiments of the present disclosure, computer array 638 includes a plurality of CPUs, GPUs, TPUs, FPGAs, and/or ASICs that can to compute cryptographic hash values and/or other "proof of work" values for cryptocurrency block chain blocks. There are many methods, protocols, mechanisms, systems, and/or strategies, by which embodiments of the present disclosure may execute, complete, and/or process, the computation of cryptographic hash values and/or other "proof of work" values for cryptocurrency block chain blocks, and embodiments including, incorporating, and/or utilizing, any and/or all such methods, protocols, mechanisms, systems, and/or strategies are included within the scope of the current disclosure.

An embodiment of the present disclosure executes the following steps in order to compute cryptographic hash values:

a. A plurality of cryptocurrency transaction records are collected by a first computer (e.g. a first land-based computer) (e.g. collected from the global "Bitcoin" network).
b. A second computer (e.g. a second land-based computer) (which can be the same computer as the first computer) computes a block header specification from the plurality of cryptocurrency transaction records. For instance, the block header specification might include a Merkle root, and/or a set of Merkle tree intermediate nodes, computed from the plurality of cryptocurrency transaction records. The block header specification might include a designation of a range of timestamp values, and/or a designation of a range of "nonce" values, and/or a designation of a subset of possible permutations of Merkle tree intermediate nodes, any of which separately (and/or all of which collectively) can designate a "parameter space" for the embodiment to "search" in its attempt to compute a valid "proof of work" value (e.g. a cryptographic hash value meeting the relevant constraints imposed and/or specified by the current "difficulty" level of the global Bitcoin network).

c. The second computer transmits the block header specification (associated, if applicable, with one or more appropriate embodiment-specific IDs) to the embodiment.

d. The embodiment computes a block header from the block header specification. For instance, it can compute a block header from the block header specification by randomly choosing a value for a block header that is consistent with the constraints defined by the block header specification. It can cycle sequentially through block headers consistent with these constraints. It can also and/or alternatively randomly select block headers consistent with these constraints.

e. The embodiment calculates a cryptographic hash value of the block header.

f. The embodiment transmits the cryptographic hash, and/or the entire block header from which the cryptographic hash was computed, to a third computer (e.g. a third land-based computer) (which can be the same as the first and/or the second computers). This transmission can occur via radio or satellite, e.g., using the embodiment's phased array antenna.

When coordinating the cryptographic computational work of a plurality of such embodiments, the second computer can calculate a common block header specification from the plurality of cryptocurrency transaction records collected, collated, and/or processed, the by the first computer. It can then divide the total range of potential cryptographic hash values by specifying sequential, contiguous, and/or segmented, ranges of timestamp values, "nonce" values, and/or possible permutations of Merkle tree intermediate nodes, and transmit to each embodiment, and/or subset of embodiments, cooperatively searching for a cryptographic hash value, as part of a larger group, set, and/or collective, of such cooperating embodiments, a block header and/or computational task specification that will limit the searching of the embodiment, and/or subset of embodiments, to a specified range of potential cryptographic hash solutions, wherein optimally that range of potential solutions does not overlap, and/or is not redundant with, the ranges of potential solutions, searched, and/to be searched, by the other embodiments, and/or subsets of embodiments.

The range(s) and/or subset(s) of timestamp values, "nonce" values, and/or possible permutations of Merkle tree intermediate nodes, that an instance of an embodiment will be instructed to search, and/or that are sent to a given instance of an embodiment, might be chosen, e.g., by the second computer, an algorithm thereon, and/or a human operator, according to a "divide and conquer" scheme whereby a plurality of instances of embodiments are each given a different block header specification (or a block header specification at least some parts of which are conditionalized on, parameterized on, limited in scope by and/or narrowed with respect to, pre-designated embodiment-specific IDs), enabling the plurality of instances to simultaneously and efficiently search different parts of the "parameter space" of valid block chain block headers, thereby avoiding, at least to a degree, redundancy. Such a "block header specification" can also be referred to as a "partial block header specification" because it typically does not include concrete, immutable, and/or final values for all components of the block header, such as the nonce, timestamp, and/or Merkle root. Instead, it may contain ranges, parameters, and/or instructions, according to which the embodiment can vary these aforementioned components (and/or other components of the block header) in order to find and/or produce a block header whose cryptographic hash is valid (e.g. whose numerical value is less than the relevant "target") with reference to the relevant block chain network's current difficulty level.

In some variants of the aforementioned method, and/or with respect to some embodiments of the present disclosure, the block header specification transmitted to the embodiment includes a set of cryptocurrency transaction records and may not necessarily include a Merkle root or a set of Merkle tree intermediate nodes. In these variants, the embodiment itself computes the relevant Merkle root from the set of cryptocurrency transaction records transmitted to it. In some variants, and/or with respect to some embodiments of the present disclosure, the embodiment is a node of the global Bitcoin network and receives transaction records directly from computers comprising said network.

Figure 61:
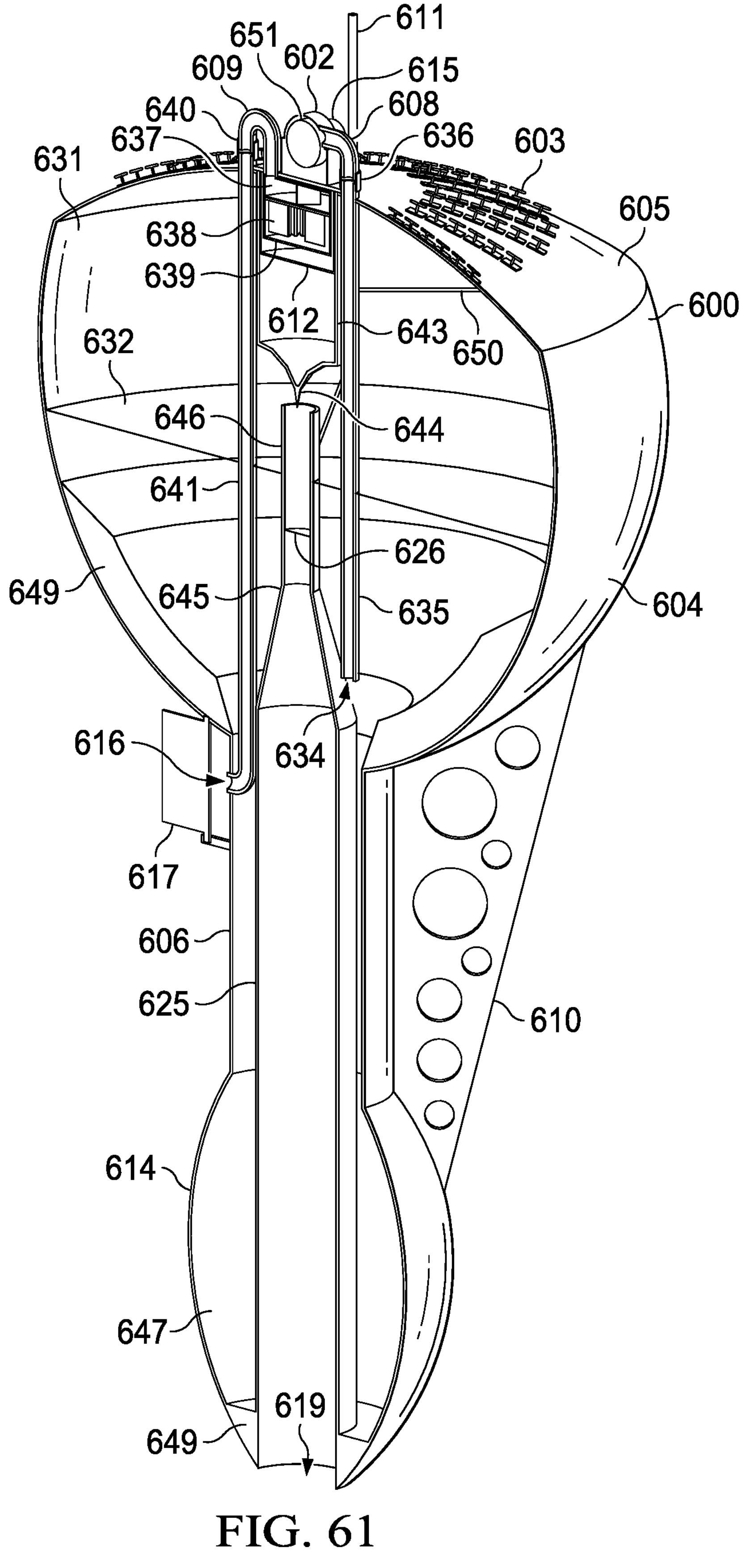
FIG. 61 is a perspective view of the same sectional view illustrated in FIG. 60.

FIG. 61 shows a perspective view of the same sectional view illustrated in FIG. 60.

Figure 62:
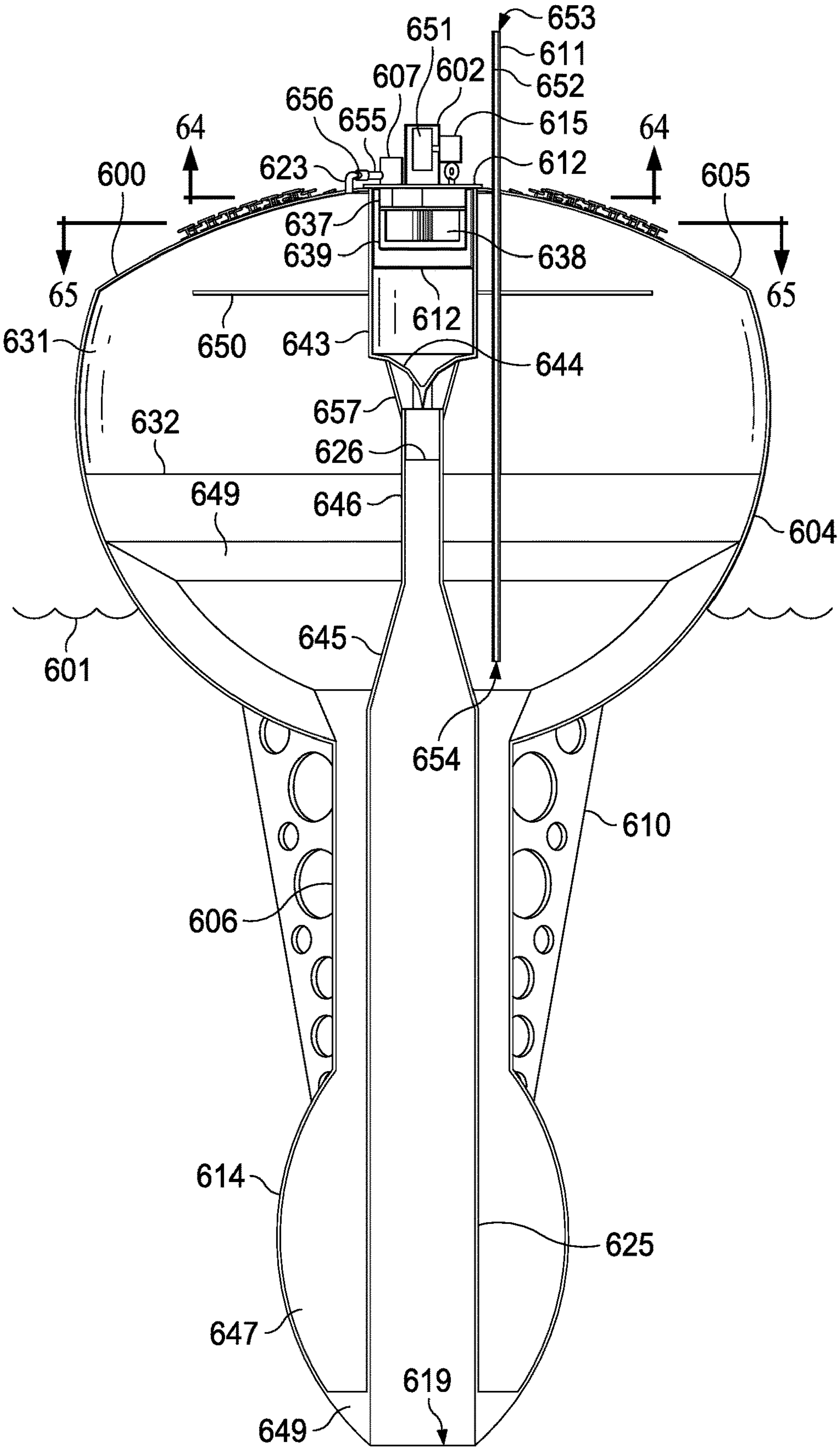
FIG. 62 is a right-side sectional view of the embodiment of FIGS. 55-61.

FIG. 62 shows a right-side sectional view of the same embodiment of the current disclosure that is illustrated in FIGS. 55-61, where the section is taken along the section line 62-62 specified in FIG. 57.

A pressure-relief pipe 611 releases water from the water reservoir 632 inside the hollow flotation module 604/605 if and when the pressure of the air and water within the hollow flotation module is sufficient to lift the upper surface 652 of the water within the pressure relief pipe to a height that exceeds the height of the upper mouth 653 of the pressure-relief pipe. In other words, the height of the upper mouth 653 of the relief pipe 611 determines the maximum pressure of air and/or water that may be reached within the hollow flotation module 604/605. Water from the water reservoir 632 enters the pressure relief pipe 611 through a lower mouth 654. In some embodiments, the upper mouth 653 is fitted with a nozzle that can convert at least a portion of any water that escapes the pressure-relief pipe 611 into an aerosolized spray of water (e.g., of seawater).

Some embodiments of the present disclosure include, incorporate, and/or utilize, multiple pressure-relief pipes. Some embodiments of the present disclosure include, incorporate, and/or utilize a pressure-relief pipe 611 possessing a larger diameter and/or flow-normal cross-sectional area than that of the respective embodiment's turbine ingress pipe 635/608. Some embodiments of the present disclosure include, incorporate, and/or utilize a pressure-relief pipe 611 possessing a smaller diameter and/or flow-normal cross-sectional area than that of the respective embodiment's turbine ingress pipe 635/608. Some embodiments of the present disclosure include, incorporate, and/or utilize, at least one pressure-relief pipe that is fitted with an aerosolization nozzle and at least one relief pipe is not fitted with such a nozzle. An embodiment of the present disclosure includes, incorporates, and/or utilizes, multiple relief pipes and the upper mouth of one of the embodiment's relief pipes is at a higher vertical position and/or elevation than the upper mouth of a second of the embodiment's relief pipes.

The height of the upper mouth 653 of the relief pipe 611, and the related maximal pressure that may be achieved and/or maintained within a respective hollow flotation module 604/605, can be achieved, and/or is consistent, with many different embodiment configurations, and embodiments that include, incorporate, and/or utilize any and/or all such configurations and variations are included within the scope of the present disclosure. Some embodiments included within the scope of the present disclosure do not include a pressure relief pipe, nor any pressure relief mechanism, component, module, means, and/or system. Such embodiments may regulate the pressure of the water reservoirs 632 within their hollow flotation modules 604/605 by altering the torque and/or resistance of their respective water turbines 651, e.g., reducing the resistive torque of their respective water turbines so as to reduce their impedance and/or obstruction of the outflow of pressurized water. Some embodiments included within the scope of the present disclosure, include, incorporate, utilize, and/or rely upon, alternate mechanisms, components, modules, means, and/or systems, to prevent the possibility of excessive pressure from developing and/or persisting within their respective hollow flotation modules, e.g., such as with electrically actuated relief valves operated in conjunction with, and/or activated in response to, readings from pressure sensors within the flotation modules.

Pressurized air may be generated and/or produced by air pump 607 after which a portion of that pressurized air flows into the chamber, cavity, void, hollow, and/or interior 631, of the hollow flotation module 604/605, through an upper portion 655 and a lower portion 623 of an air pressurization pipe. The upper and lower pipe portions 655 and 623 of the air pressurization pipe are connected by pipe connector 656, which, if loosened, moved, and/or removed, will facilitate the separation, removal, and/or replacement, of the removable spar module 612 from its complementary removable spar enclosure 643.

The upper portion 646 of the inertial water tube is rigidly connected to the bottom of removable spar enclosure 643 by a plurality of struts 657.

During operation, the embodiment 600 moves up and down in waves due to the action of the wave pressure field of the body of water and/or the interaction of that wave pressure field with the embodiment, particularly the interaction of that wave pressure field with the broad bottom surface 604 of the hollow flotation module.

While the embodiment 600 moves up and down, the water contained within inertial water tube 625 has a large inertia and tends to resist being moved up and down in synchrony with the tube. When the middle frustoconical section 645 of inertial water tube 625 moves downward against the water contained within the inertial water tube 625, the pressure of the water within that inertial water tube 625 tends to increase and/or to be increased, especially within the upper region of lower cylindrical section 625. This higher and/or increased pressure tends to drive a portion of the water within the inertial water tube up through middle frustoconical section 645 of the inertial water tube, into and through the upper cylindrical section 646 of the inertial water tube, and, after being diverted by water diverter 644, out and into the interior chamber and/or enclosure 631 of the embodiment, where it tends to fall into, and/or to be captured by, the pool of water within the water reservoir 632, thereby tending to increase the volume and/or mass of the water within the water reservoir 632.

Embodiment 600 floats adjacent to the surface 601 of a body of water (e.g., of an ocean) when in an operational configuration. The average waterline of the embodiment may be at any of a range of locations along the vertical extent of the embodiment depending on the ratio of water to air inside flotation module 604/605 and/or the chamber 631 therein. In other words, the average density of the embodiment can be changed, controlled, altered, and/or adjusted, by changing, controlling, altering, and/or adjusting, the amount of water (e.g., seawater) that is contained within its hollow interior chamber 631 (e.g. inside hollow flotation module 604/605). These changes in average embodiment density can cause the embodiment's average vertical position within the body of water 601 on which the embodiment floats to change (and accordingly, they can cause its average waterplane area to change, as well as its degree of exposure and/or sensitivity to the dynamic pressure field in the water due to waves). The volumetric ratio of water to air inside and/or within 631 the hollow flotation module 604/605 can be altered by the rate at which water is permitted to flow through, and/or past, the embodiment's water turbine 651, as well as the volume and/or amount of pressurized air that is added to the interior 631 of the hollow flotation module 604/605 by air pump 607 via air conduit 655/623.

The lower and/or bottom wall 604 of the hollow flotation module 604/605 is continuous with tube jacket wall 606/614. Tube jacket wall 606 is cylindrical and has an approximately vertical longitudinal axis that is approximately coaxial with a longitudinal axis of the inertial water tube 625. Tube jacket wall 606 is spaced, separated, and/or offset, from the wall of the inertial water tube 625, and the intervening space and/or gap, defines and/or establishes the upper portion of the tube ballast void 647. When the device is in operation, the tube ballast void 647 can contain water (e.g., seawater). The water contained in tube ballast void 647 is continuous with the water 632 contained in the bottom portion of interior chamber 631 of the hollow flotation module 604/605 (in other words, water particles can move between the interior chamber 631 and the tube ballast void 647).

Tube jacket wall 606 is continuous with tube jacket wall 614. Tube jacket wall 614 is curved, convex, spaced, separated, and/or offset, from the wall of the inertial water tube 625, and tube ballast void 647 includes, and/or is defined as, the space between them; when the device is in operation, this tube ballast void 647 contains water (e.g., seawater). Tube ballast wall 606/614, the water 647 enclosed thereby, and solid ballast 649, and/or any subset of these, together constitute the embodiment's tube ballast.

Figure 63:
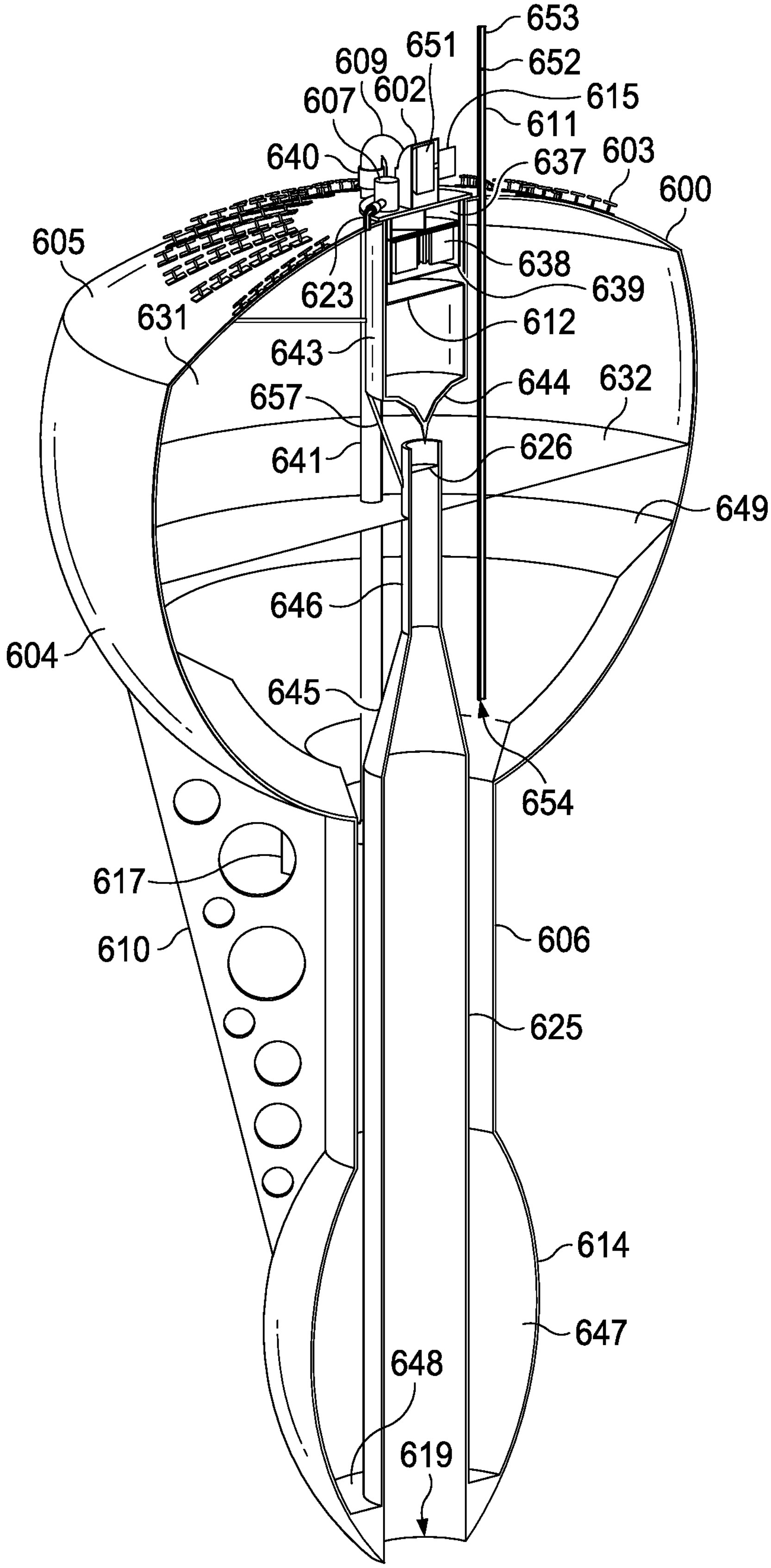
FIG. 63 is a perspective view of the same sectional view illustrated in FIG. 62.

FIG. 63 shows a perspective view of the same sectional view illustrated in FIG. 62.

Figure 64:
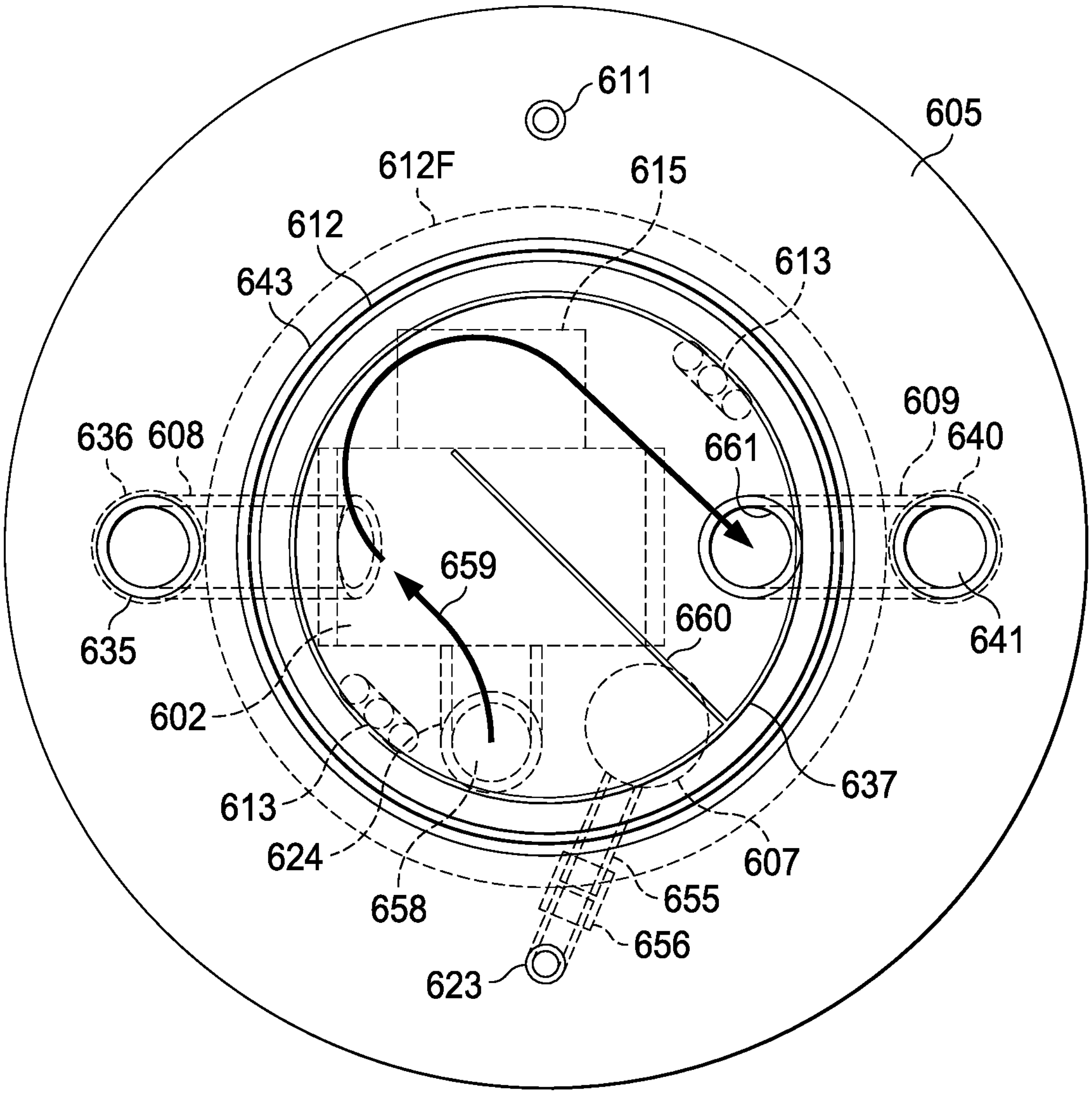
FIG. 64 is a bottom-up sectional view of the embodiment of FIGS. 55-63.

FIG. 64 shows a bottom-up sectional view of the same embodiment of the current disclosure that is illustrated in FIGS. 55-63, where the section is taken along the section line 64-64 specified in FIGS. 60 and 62. FIG. 64 illustrates the structure and flow of water through the cooling chamber 637.

Components above the upper wall 605 of the hollow flotation module are shown with dotted lines in order to better illustrate the path followed by water as it flows into, through, and then out of, the cooling chamber 637.

Water flows from the water reservoir (632 in FIGS. 60 and 62) inside 631 the hollow flotation module 604/605, and up through the lower portion 635 of the turbine ingress pipe, ingress-pipe junction 636, and the upper portion 608 of the turbine ingress pipe. Then the water flows through the water turbine (651 in FIG. 63, not visible) within the turbine-generator assembly 602 after which it flows out of the turbine-generator assembly 602 through effluent pipe 624 and then through cooling-chamber inflow aperture 658 into the interior of cooling chamber 637. After flowing 659 into cooling chamber 637, the water follows an approximately circular path 659 enforced by a central dividing wall 660 after which it flows out through cooling-chamber outflow aperture 661. After flowing out of the cooling chamber 637, the water flows into and through the upper portion 609 of the effluent pipe, pipe junction 640, and the lower portion 641 of the effluent pipe, after which the water flows through effluent pipe discharge mouth (616 in FIG. 61) and into the body of water (601 in FIG. 60) on which the embodiment floats.

The removable spar module 612 is supported at an upper position on the hollow flotation module 605 by flange 612F, by which the removable spar module is also removably attached to the hollow flotation module.

Figure 65:
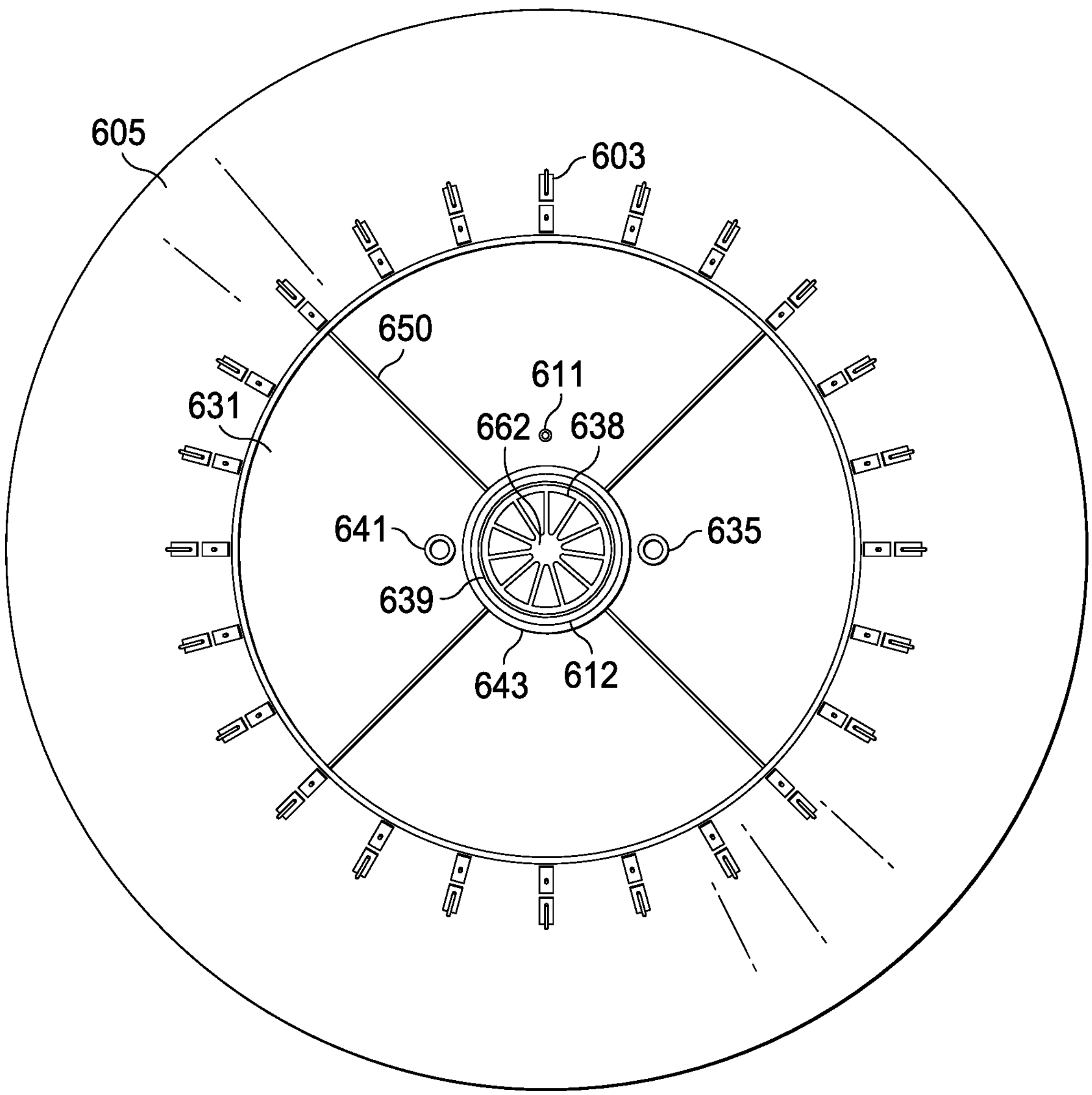
FIG. 65 is a top-down sectional view of the embodiment of FIGS. 55-64.

FIG. 65 shows a top-down sectional view of the same embodiment of the current disclosure that is illustrated in FIGS. 55-64, where the section is taken along the section line 65-65 specified in FIGS. 60 and 62.

Inside the computer chamber 639 are computers, batteries, power converters, radio transceivers, phased-array controllers, and other electronic and/or electrical components and/or circuits 638. In the spaces, gaps, and/or voids, 662 between these electrical components 638 is a phase-changing material that, after absorbing heat from the electrical components 638 volatilizes and rises within the computer chamber 639. The gasified phase-change material then tends to condense on the bottom surface of the cooling chamber which is above and adjacent to the computer chamber 639. As the gasified phase-change material within the computer chamber 639 condenses on the wall that is shared between the computer and cooling chambers it tends to transfer at least a portion of its heat to that wall. And, at least a portion of that transferred heat then tends to be absorbed and carried away from the shared wall by the effluent water flowing through the cooling chamber on its way back to the body of water on which the embodiment floats.

The removable spar enclosure 643 is structurally stabilized, at least in part, by struts 650 that affix it to the wall of the hollow flotation module 604/605.

Figure 66:
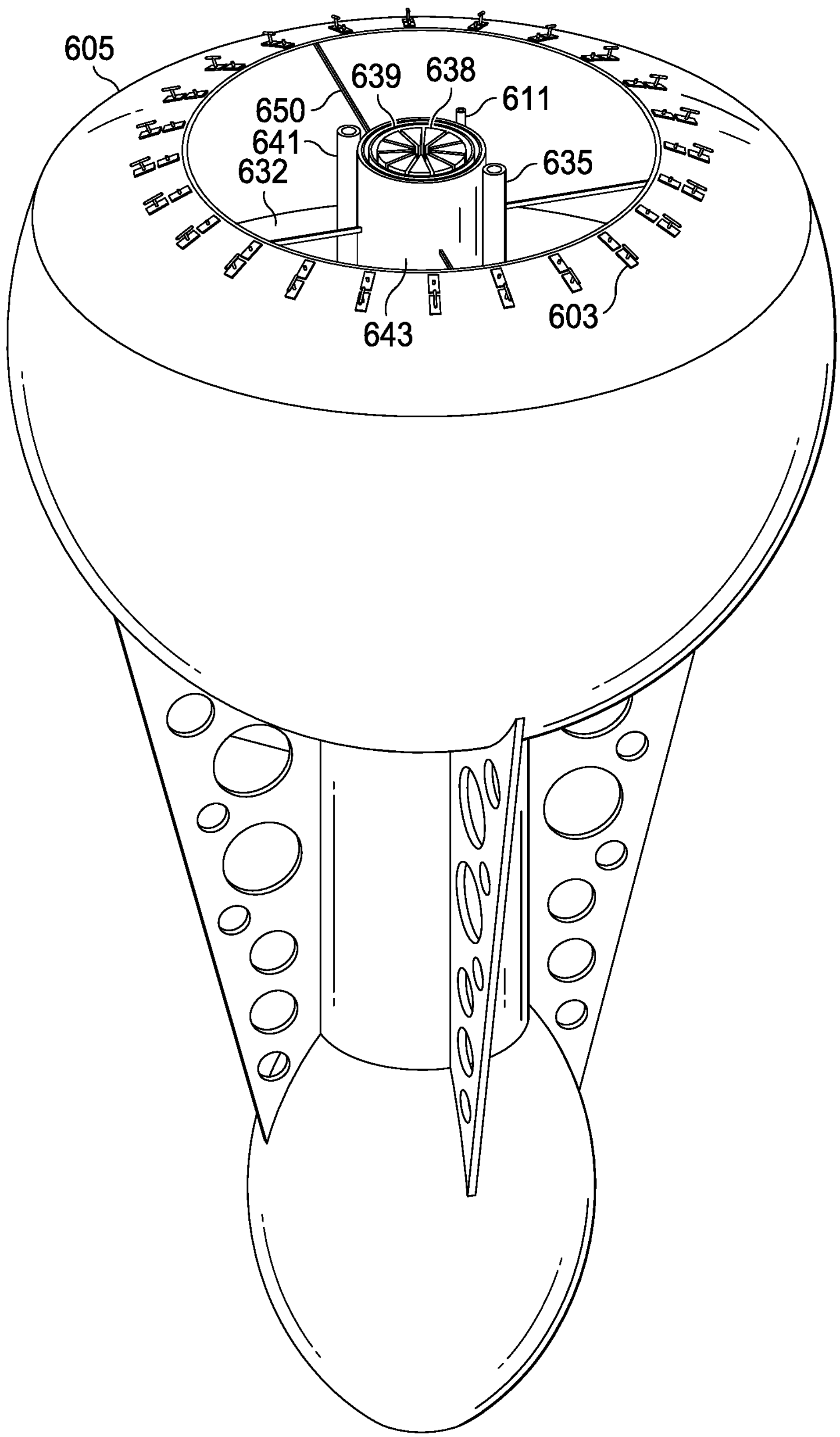
FIG. 66 is a perspective view of the same sectional view illustrated in FIG. 65.

FIG. 66 shows a perspective view of the same sectional view illustrated in FIG. 65.

Figure 67:
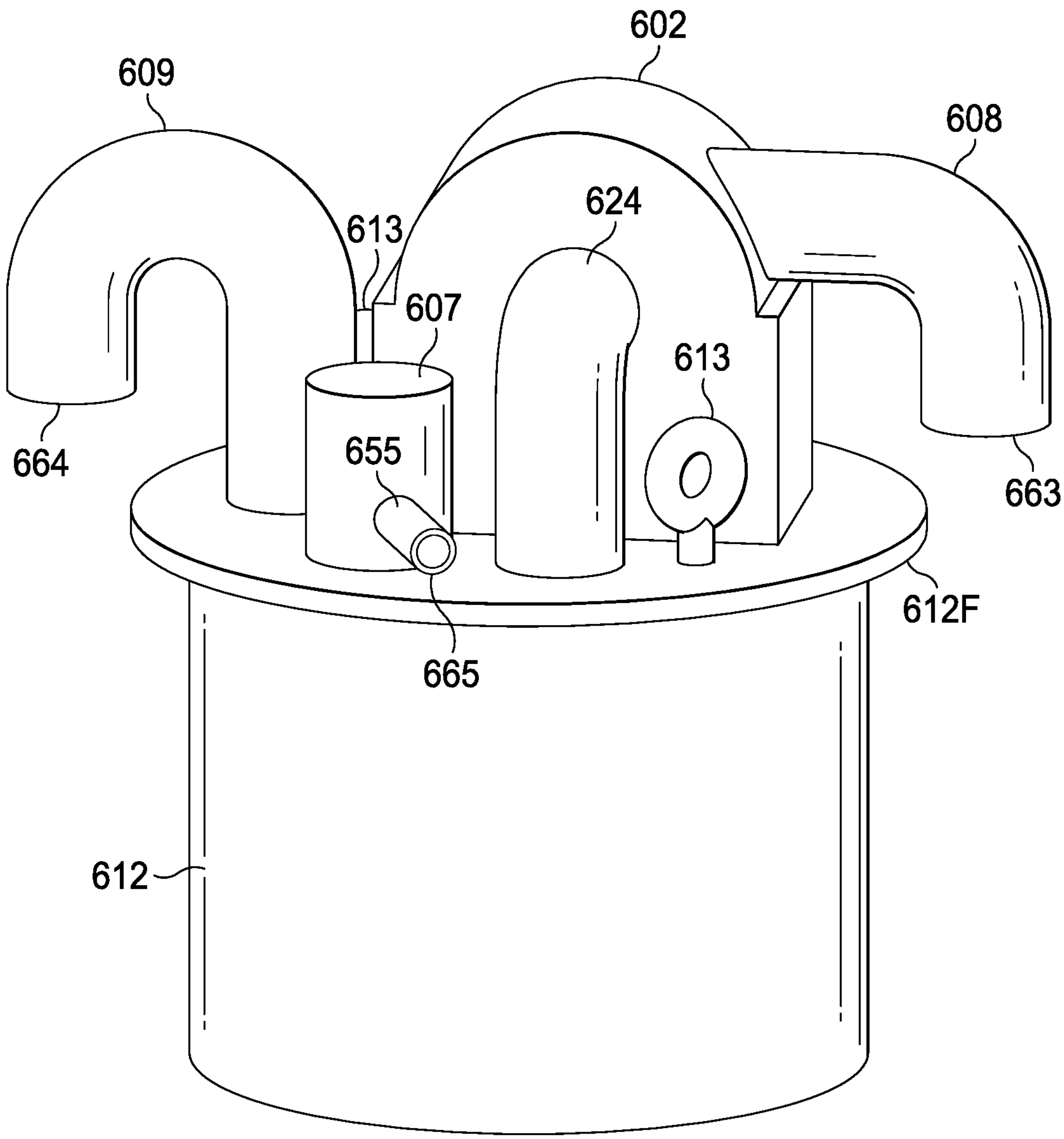
FIG. 67 is a perspective side view of the removable spar module 612 that is a part and/or component of the embodiment of FIGS. 55-66.

FIG. 67 shows a perspective side view of the removable spar module 612 that is a part and/or component of the same embodiment of the current disclosure that is illustrated in FIGS. 55-66.

The embodiment illustrated in FIGS. 55-66 includes a removable module which houses and/or incorporates most of the moving parts and electronic components of the embodiment, thereby permitting, at least in some situations, a dysfunctional and/or broken embodiment to be repaired and/or restored to operation through the replacement of the removable spar module 612. The distal ends 663-665, of respective pipes 608, 609, and 655, are connected to complementary pipes on the embodiment by pipe connectors after installation of a removable spar module 612 into a removable spar enclosure 643. Those pipe connectors are loosened and/or removed in order to facilitate the removal and/or replacement of the removable spar module 612.

The scope of the present disclosure includes embodiments in which the flange 612F and/or the removable spar module 612 is attached, whether removably or permanently, to the other portions of the respective embodiments by explosive bolts, that, when detonated, e.g. as by a command transmitted to the embodiment by a satellite and received by the embodiment's phased array antenna, disconnect the spar module 612 from the portion of the embodiment to which it is attached, thereby permitting it to fall into the interior chambers and/or water reservoirs 632 of the respective embodiments and/or into the bodies of water 601 on which the embodiments float. Some embodiments that attach a removable spar module 612 to the embodiment with explosive bolts, also incorporate additional explosive bolts and/or panels which, when detonated, open the computer chamber 639 to the water (e.g., seawater) into which the spar module falls, thereby speeding the degradation of the computers and other electronic circuits therein. Embodiments that utilize explosive bolts may automatically and/or autonomously detonate some or all of those bolts when piracy, and/or an attempted breach, is detected, and/or when so instructed by a coded radio transmission received by the embodiments' respective phased array antennas.

Figure 68:
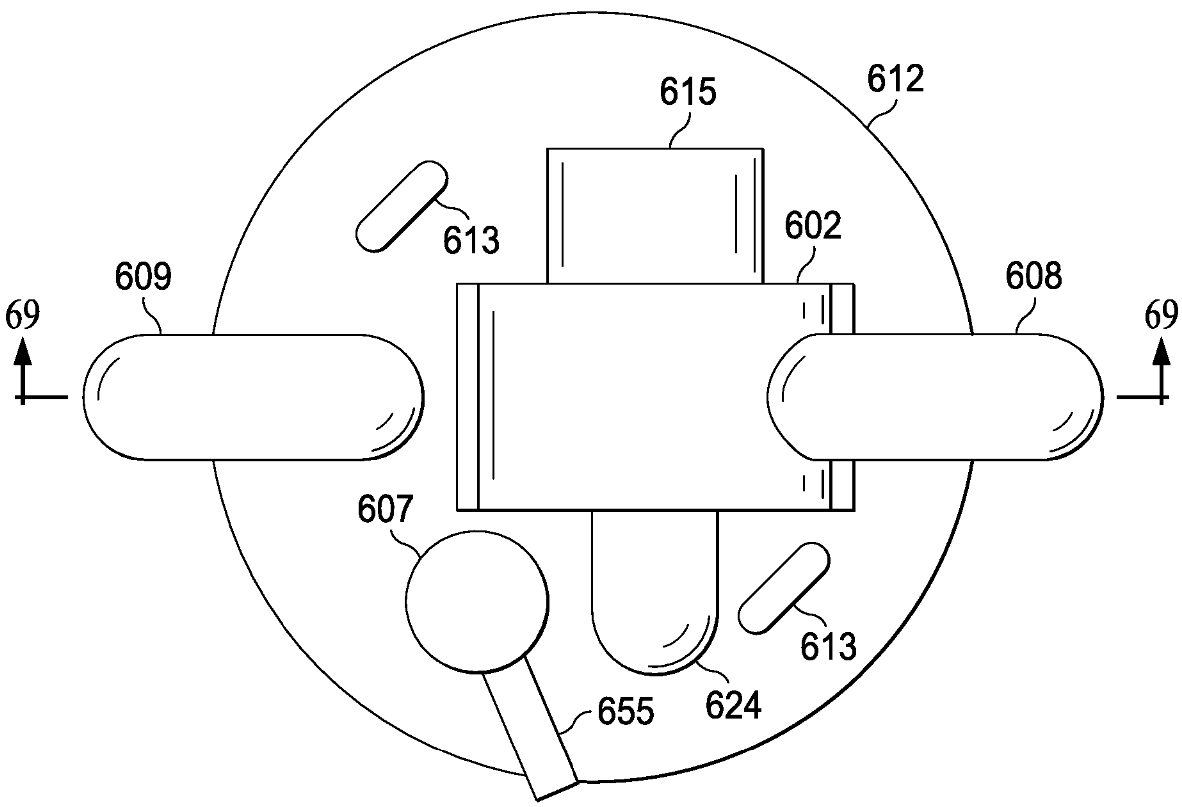
FIG. 68 is a top-down view of the same removable spar module 612 that is illustrated in FIG. 67.

FIG. 68 shows a top-down view of the same removable spar module 612 that is illustrated in FIG. 67 and which is a part and/or component of the same embodiment of the current disclosure that is illustrated in FIGS. 55-66.

Figure 69:
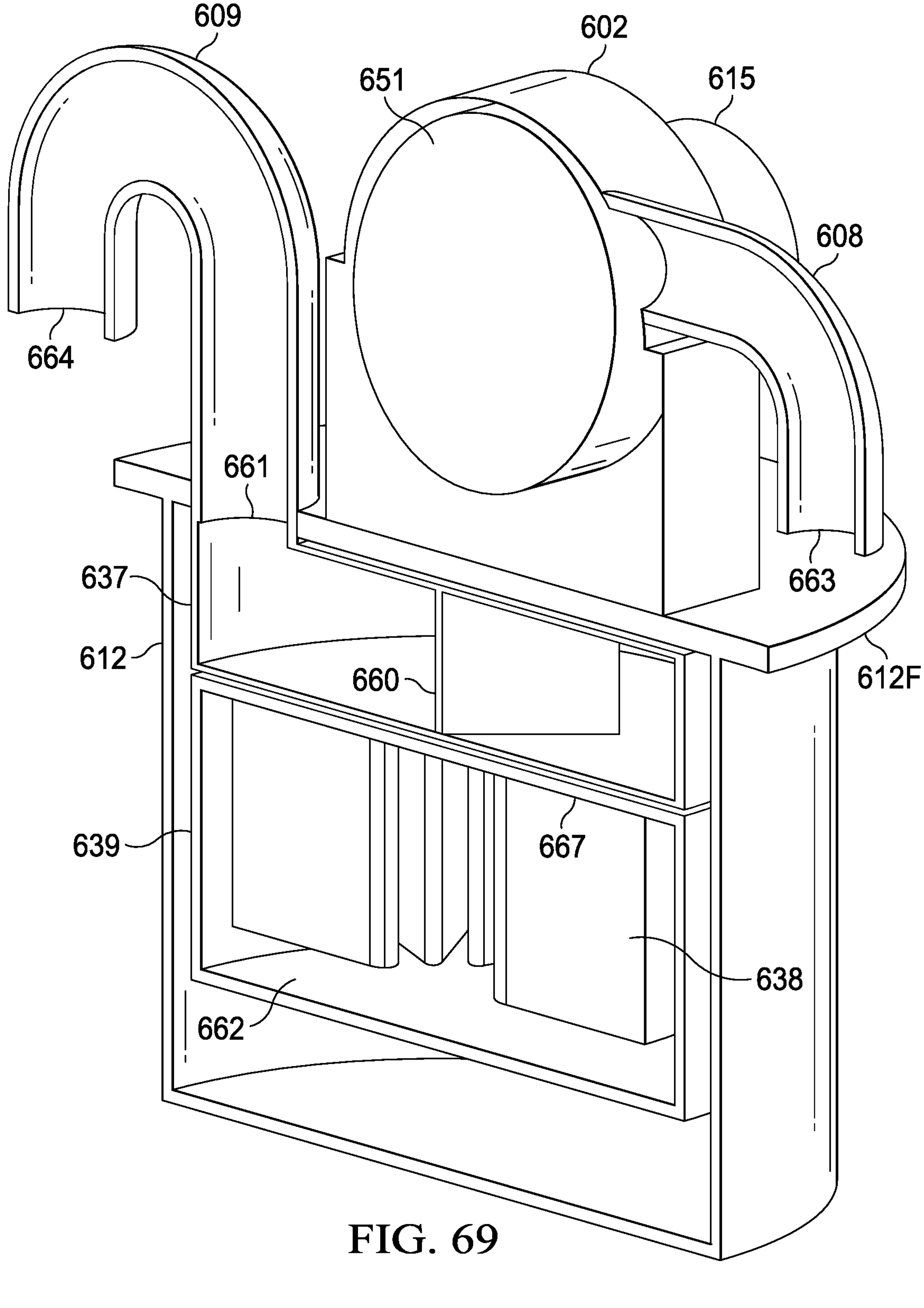
FIG. 69 is a side sectional view of the same removable spar module that is illustrated in FIGS. 67 and 68.

FIG. 69 shows a side sectional view of the same removable spar module that is illustrated in FIGS. 67 and 68, where the section is taken along the section line 69-69 specified in FIG. 68. The computer chamber 639 and the cooling chamber 637 share wall 667 through which at least a portion of the heat generated by the electronic circuits 638 within the computer chamber 639 is transmitted to water that has flowed out of the water turbine 651 and into the cooling chamber 637 and after which that heated water will exit the embodiment, e.g., through effluent pipe 609 and the respective effluent pipe discharge mouth.

Computer and/or electronic array 638 is indirectly cooled by water that has exited turbine-generator assembly 602. Computer array 638 consists, at least in part, of a number of computer chips enclosed in a hermetically sealed box, i.e., the computer chamber 639, that are bathed in a heat exchange fluid that can boil when heated by the computer chips and/or other electronic circuits. The gasified heat exchange (e.g., phase changing) fluid then condenses on a heat exchange surface 667, especially when said heat exchange surface is in contact with and cooled by water that has exited turbine-generator assembly 602 via the embodiment's heat exchange conduit, i.e., the cooling chamber 637. In some embodiments, heat exchange surface 667 is a flat metal surface. In some embodiments, heat exchange surface 667 includes of a series or array of pipes, ridges, or other features allowing a greater heat exchange surface between the heat exchange fluid inside the hermetically sealed computer chamber 639 box and the water flowing through heat exchange conduit, i.e., the cooling chamber 637.

The generator 615 of the turbine-generator assembly 602 produces electricity when the water turbine 651 is rotated by water. At least a portion of the electricity produced and/or generated by generator 615 powers the computers, batteries, power converters, radio transceivers, phased-array controllers, and other electronic and/or electrical components and/or circuits located and/or positioned within the computer array 638 via conductive cables passing from the generator of the turbine-generator assembly 602 to, and/or into, the computer chamber 639.

Figure 70:
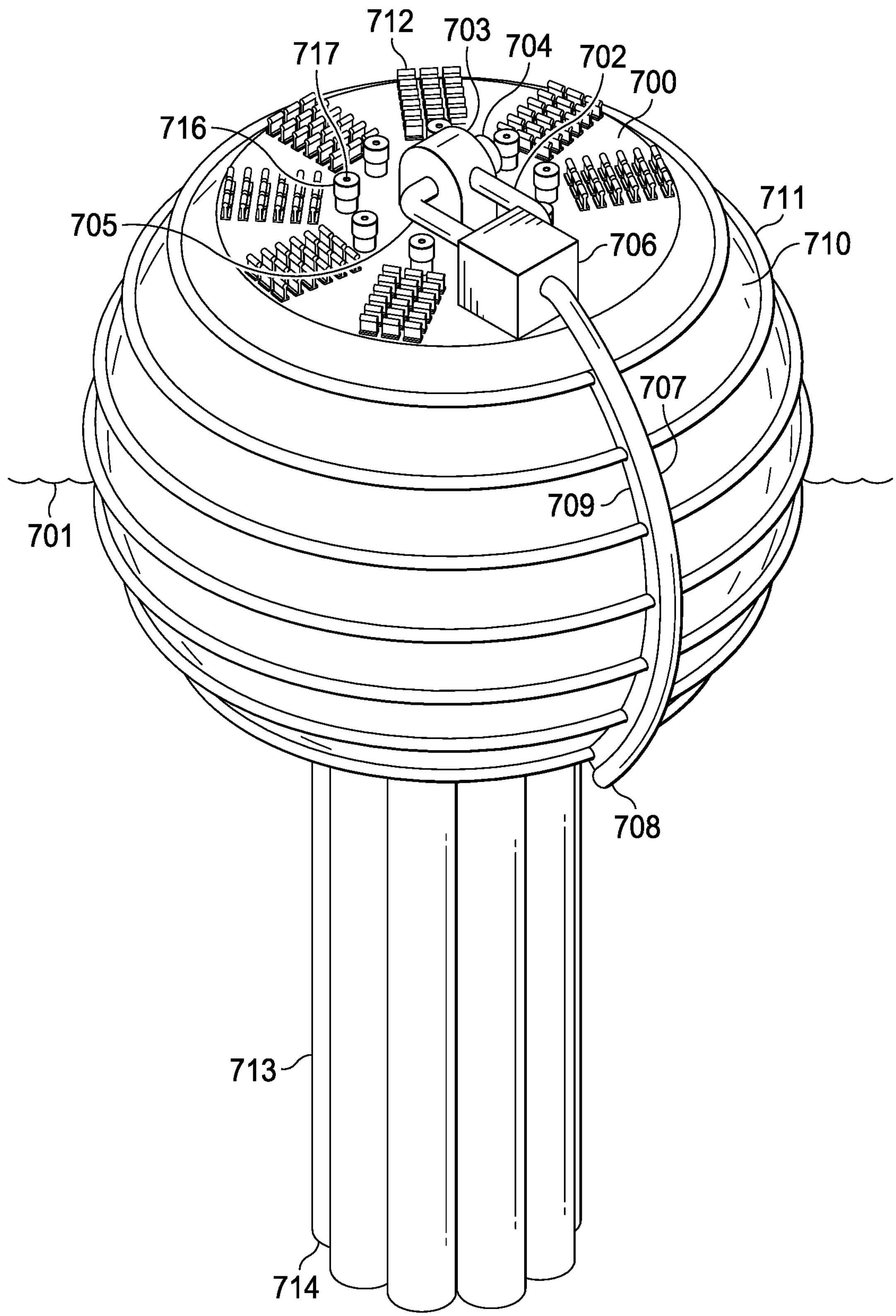
FIG. 70 is a side perspective view of another embodiment of the present invention.

FIG. 70 shows a side perspective view of an embodiment of the current disclosure.

Embodiment 700 floats adjacent to the surface 701 of a body of water. And, when in operation, embodiment 700 moves up and down in response to the action of ocean waves impinging on, and/or colliding with, its surface as those waves move across the surface 701 of the body of water on which the embodiment floats. As it moves up and down in response to ocean waves, water within a partially tapered inertial water tube (not visible) at the embodiment's center moves up and down relative to the embodiment, said inertial water tube having a longitudinal and/or radial axis of symmetry that is oriented approximately vertically and/or approximately normal to the resting surface 701 of the water. A tapered upper portion of the inertial water tube causes a portion of the water moving upward within the tube to be raised to a height sufficient to cause a volume, and/or at least a portion, of the water flowing up the inertial water tube to be ejected from an upper mouth, aperture, channel opening, and/or orifice (not visible) in the inertial water tube.

Water ejected through an upper aperture of the embodiment's inertial water tube (not visible) tends to be deposited into a water reservoir (not visible) within the embodiment (i.e. within an interior chamber, hollow, void, and/or enclosure, thereof). Water within the embodiment's water reservoir is propelled, lifted, driven, and/or caused to flow, by a combination of pressures, including the head pressure of the water trapped within the embodiment, and the air pressure above and/or outside the water trapped within the embodiment, through a turbine ingress pipe 702 into a water turbine 703, thereby causing the water turbine to rotate and consequently causing the rotation of a rotor of an operatively connected generator 704, thereby causing electrical power to be generated.

Effluent from the water turbine 703 travels through effluent pipe 705 and therethrough into a computer chamber, compartment, and/or enclosure, 706 containing (not visible) electronic devices, components, mechanisms, modules, and circuits, including, but not limited to: computing devices, network routers, batteries, radio transceivers, encryption and decryption circuits, and memory storage devices and circuits. The effluent water flows through the computer chamber 706 through a portion of the effluent pipe therein, and that pipe is hermetically separated from the electronic circuits and components operated and/or operating within that computer chamber (thereby avoiding short circuits).

The effluent water passing through effluent pipe 705 tends to absorb heat from the electronic circuits within the computer chamber 706 and carry away at least a portion of that heat as that water flows out of, and/or exits, the computing compartment and continues flowing through effluent pipe 707 after which it flows out of the effluent pipe through effluent pipe discharge mouth 708 and returns to the body of water 701 on which the embodiment floats.

Effluent pipe 707 is secured to the embodiment by means of a rigid strut, brace, fin, rail, member, element, and/or component 709 that affixes the pipe to an outer surface 710 of the embodiment. The outer hull 710 of the upper bulbous portion (i.e., to the hollow flotation module) of the embodiment is structurally strengthened by means of a plurality of ribs, e.g., 711, which are approximately circular in shape and are attached and/or affixed to the outer hull of the embodiment's hollow flotation module and/or buoy portion such that a plane bisecting the upper and lower portions of each rib will be approximately normal to a flow-parallel and/or vertical longitudinal axis of the embodiment and/or of its inertial water tube.

Affixed to an upper surface 700 of the embodiment are seven arrays of antennas, e.g., 712, each array of rectilinearly positioned antennas comprises a phased array antenna, and the collection of radially disposed such phased array antennas comprises a larger composite phased array antenna.

Radially surrounding the embodiment's central inertial water tube (not visible) are a plurality of water ballast tubes, e.g., 713, each of which is open at a bottom-most end, e.g., 714, where an aperture, mouth, and/or orifice, permits water from the body of water 701 to freely move into and out of each ballast tube. An upper end of each ballast tube, e.g., 713, is adjustably and/or controllably opened to, or closed from the air and/or atmosphere above the embodiment 700 by an air valve, e.g., 716.

Each water ballast tube's air valve, e.g., 716, controls the opening and closing of a corresponding aperture, e.g., 717. When a ballast tube's air valve, e.g., 716, is open, its unobstructed aperture, e.g., 717, allows air to flow freely between the respective interior of the water ballast tube, e.g., 713, and the atmosphere. When a ballast tube's air valve is closed, the fully obstructed aperture, e.g., 717, of the water ballast tube traps the contents of the respective water ballast tube (e.g., by suction), thereby preventing the flow of air between the interior of the respective tube and the atmosphere, and tending to prevent, or at least to inhibit, the flow of water between the interior of the respective tube and the body of water 701 on which the embodiment floats.

An embodiment control system (not shown and located within computer chamber 706) opens a water ballast tube's air valve in order to allow the amount of air within the respective water ballast tube, and thereby the level of the water within the respective water ballast tube, to change in response to ambient waves, and to the wave-induced motions of the embodiment. When the amount of air within the respective water ballast tube is at a desirable level, and/or when the volume and/or mass of water within the respective water ballast tube is at a desirable level, then the embodiment's control system may close the respective water ballast tube's air valve, thereby tending to fix the level of the water within the tube, and thereby add the water trapped in the respective water ballast tube to the inertia of the embodiment, at least to a degree (since the water within a water ballast tube may still exhibit a small degree of oscillation through the consequent alterations in the pressure of the air trapped at the top of the water ballast tube). Through the exercise of such control, the embodiment's control system can achieve an advantageous level, volume, and/or mass, of water ballast within the embodiment's ballast tubes.

Figure 71:
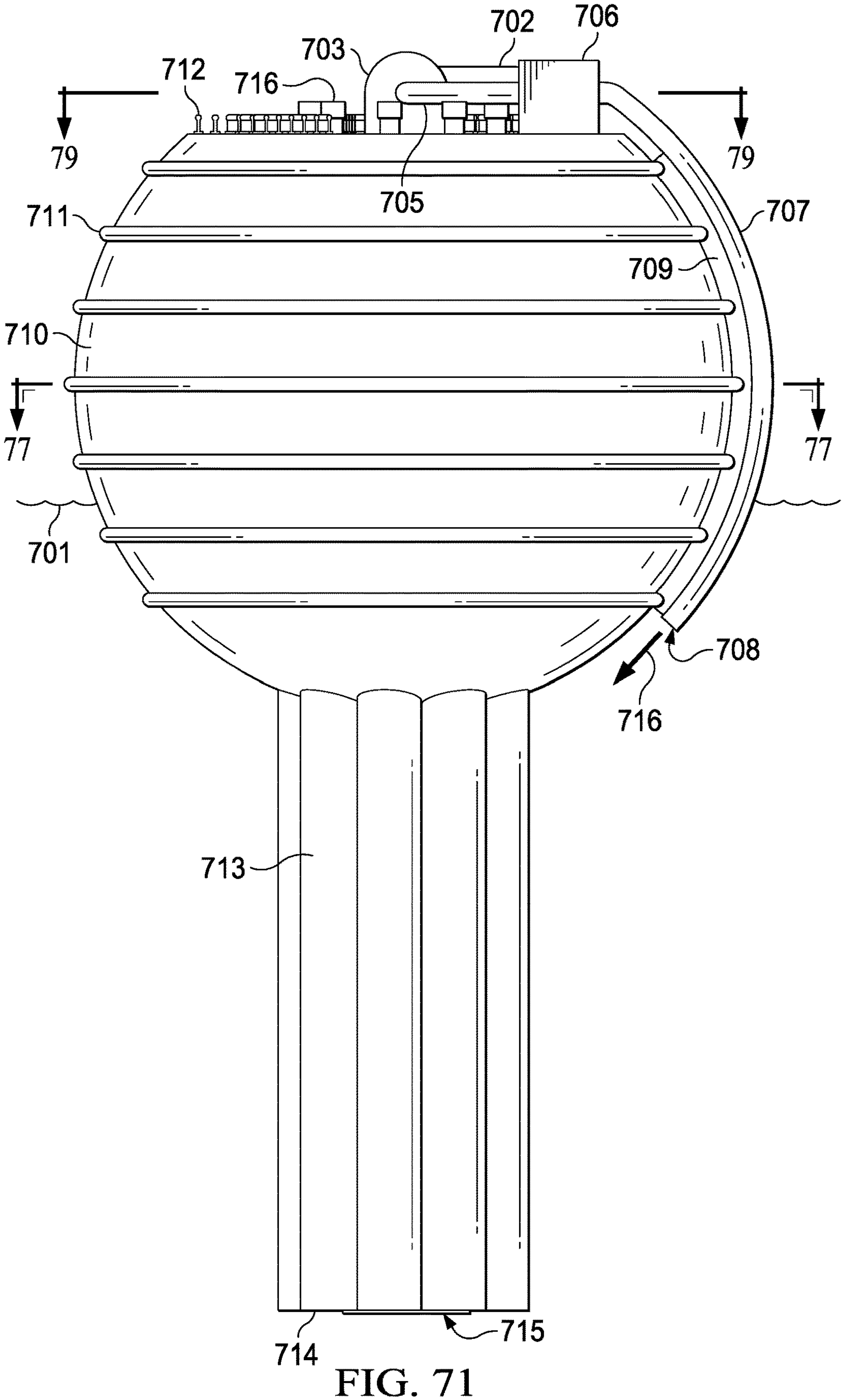
FIG. 71 is a left-side view of the embodiment of FIG. 70.

FIG. 71 shows a left-side view of the same embodiment of the current disclosure that is illustrated in FIG. 70.

Water moves in and out of a lower mouth, aperture, and/or orifice 715 of the embodiment's centrally positioned inertial water tube.

After passing through the embodiment's water turbine, water discharged by the water turbine flows through effluent pipe 705 and effluent pipe 707 until it flows 716 through and out of an effluent pipe discharge mouth 708 positioned at a lower end of the effluent pipe 707 and thereby returns to the body of water 701 from which it was originally captured by the embodiment's inertial water tube (not visible).

Figure 72:
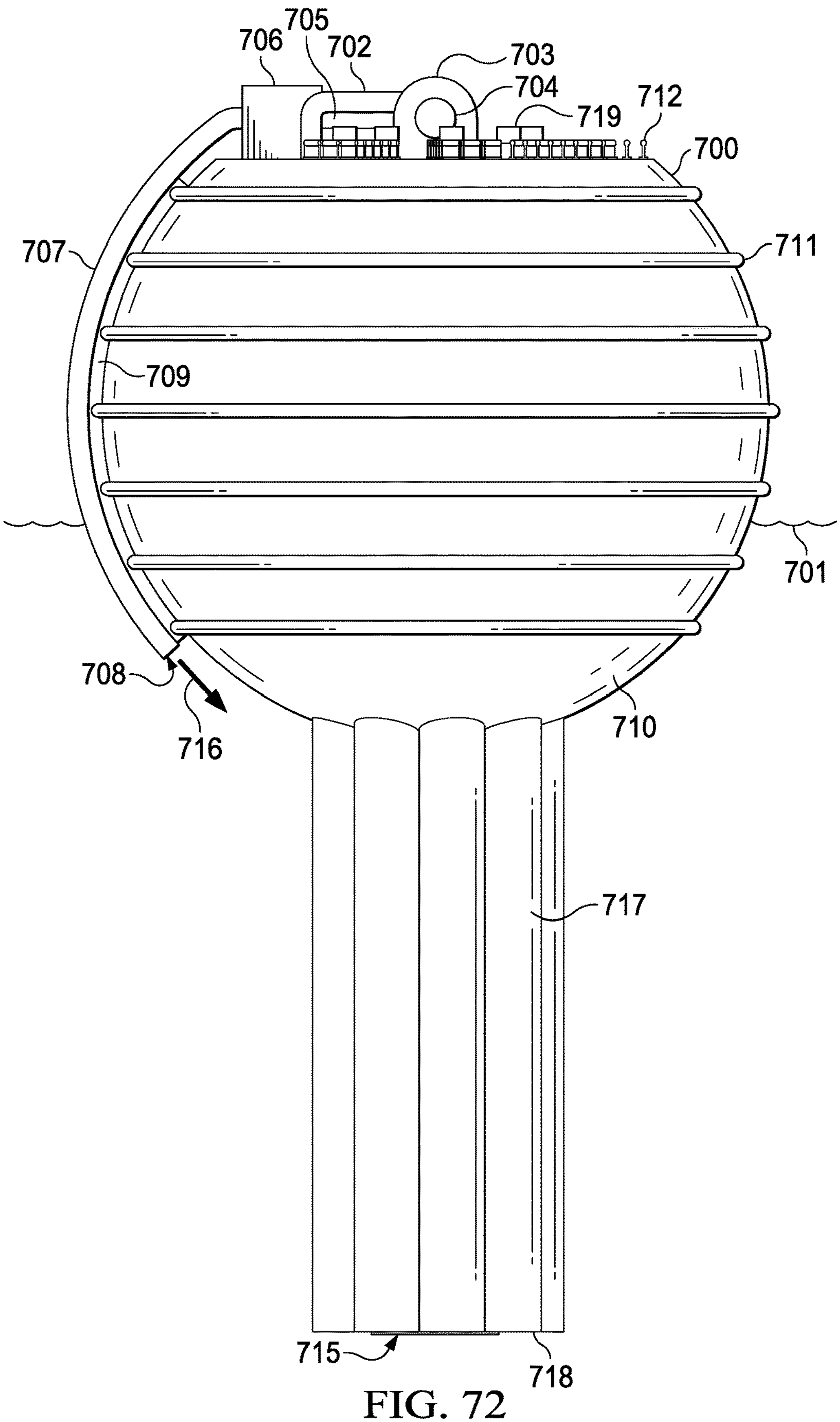
FIG. 72 is a right-side view of the embodiment of FIGS. 70 and 71.

FIG. 72 shows a right-side view of the same embodiment of the current disclosure that is illustrated in FIGS. 70 and 71.

Each of the embodiment's water ballast tubes, e.g., 717, allows water to freely enter and leave through a respective bottom mouth, aperture, and/or orifice, e.g., 718. The movement of water into and out of each respective water ballast tube is, at least to a degree, regulated, and/or controlled, through the opening and closing of a respective air valve, e.g., 719, positioned at an upper end of each respective water ballast tube. When open, the air valve permits air to move into and out of the respective water ballast tube, e.g., 717, thereby permitting the water therein to readily change its level in response to wave and embodiment motions. When allowed to move freely, the water within a water ballast tube has little effect on the inertia and/or vertical oscillations and/or movements of the embodiment. However, when closed, the air valve obstructs the flow of air therethrough thereby inhibiting the flow of air into and out of the respective water ballast tube, and thereby inhibiting changes in the level of the water within the tube. When prevented and/or inhibited from moving independently of the embodiment, the water within a water ballast tube tends to increase the inertia and tends to have a substantial inhibitory effect on vertical oscillations and/or movements of the embodiment.

Figure 73:
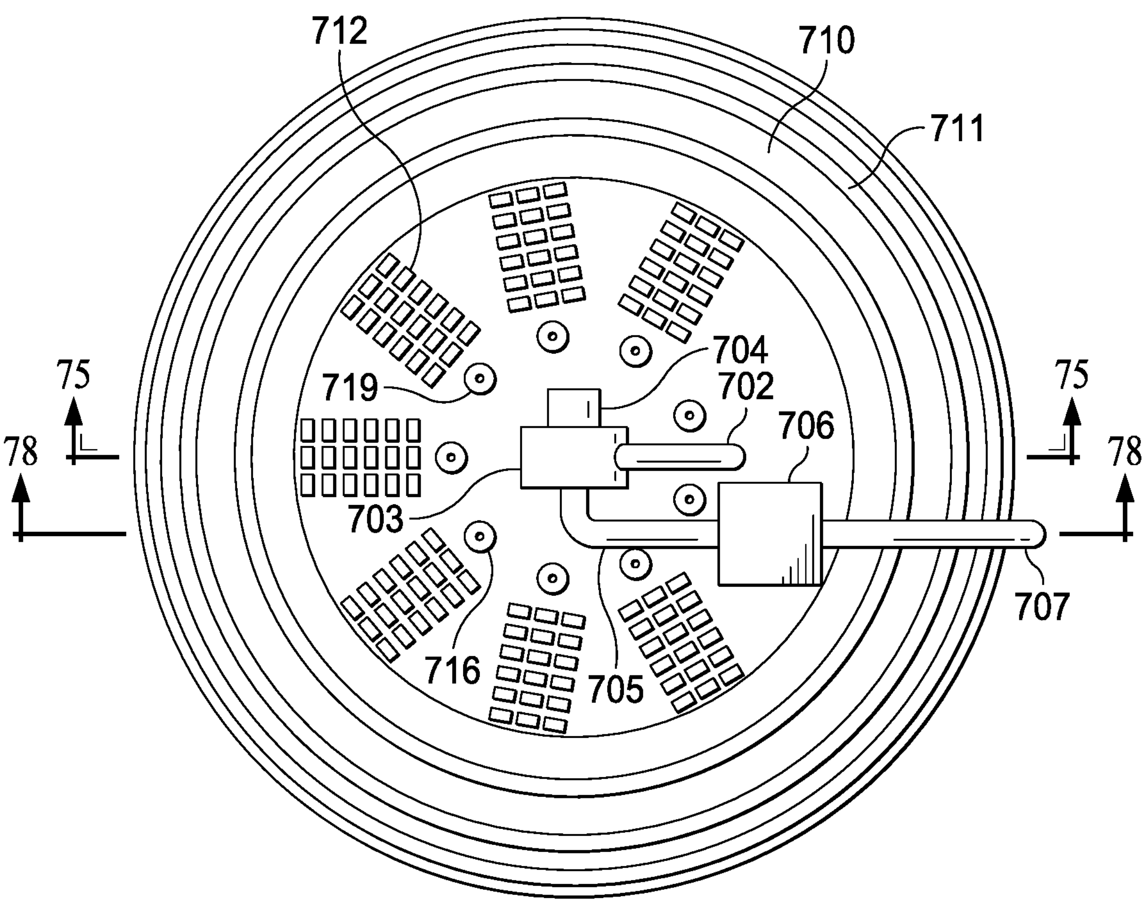
FIG. 73 is a top-down view of the embodiment of FIGS. 70-72.

FIG. 73 shows a top-down view of the same embodiment of the current disclosure that is illustrated in FIGS. 70-72.

Seven three-by-six rectilinear arrays of antennas, e.g., 712, comprise a composite phased array antenna that is affixed to an upper surface of the embodiment. Encoded electromagnetic signals are received by the phased array antenna and are processed by a transceiver (not shown) positioned within the embodiment's computer chamber 706. The phased array antenna 712, and the respective transceiver, are energized, at least in part, with electrical power generated by generator 704.

The encoded signals received by the phased array antenna 712 include computational problems, tasks, and/or data which are processed, at least in part, by computing devices and/or circuits within the computer chamber 706. At least a portion of the computational results and/or data generated by the computing devices within the computer chamber 706 (said results computed in response to the embodiment's receipt of electromagnetically encoded computational task specifications or commands) is encoded and transmitted by the phased array 712. The computing devices within the computer chamber 706 are energized, at least in part, with electrical power generated by generator 704.

Figure 74:
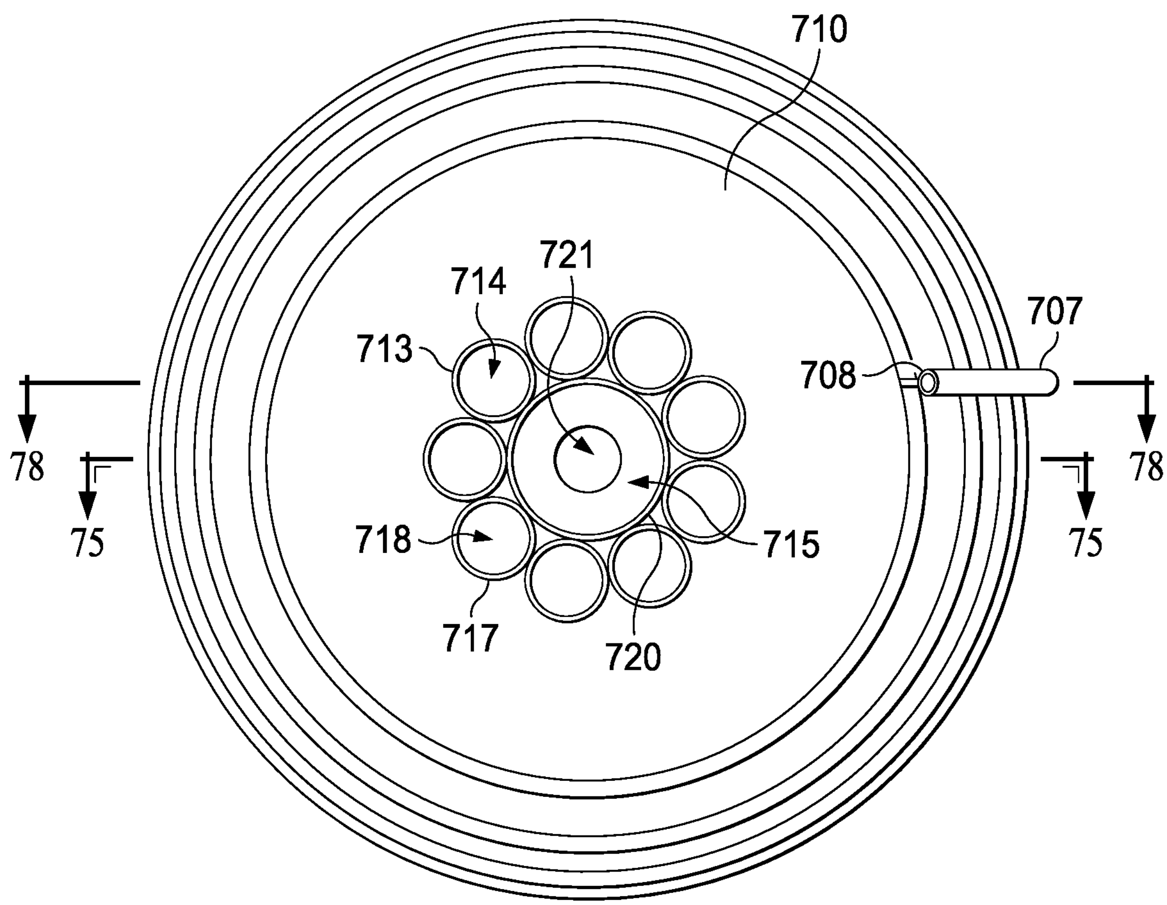
FIG. 74 is a bottom-up view of the embodiment of FIGS. 70-73.

FIG. 74 shows a bottom-up view of the same embodiment of the current disclosure that is illustrated in FIGS. 70-73.

A centrally-positioned inertial water tube 720 has a relatively large-diameter lower mouth 715 at its bottom end and a relatively small-diameter upper mouth 721 at its top end. A narrowing of the tube from its bottom end to its top end results in a relative reduction of flow-normal cross-sectional area of the top mouth 721 relative to the bottom mouth 715. The inertial water tube 715 is surrounded by nine water ballast tubes, e.g., 713 and 717. When the respective air valves, e.g., 716 and 719 in FIG. 73, are closed, thereby inhibiting the free movement of air in and out of the respective water ballast tubes, the water within each such "sealed" and/or "capped" water ballast tube is at least partially compelled to move with, and/or to be moved by, the embodiment, thereby effectively increasing the mass and inertia of the embodiment by approximately the mass and inertia of the water within the sealed water ballast tubes. The compression and expansion of a pocket of air that tends to be and/or to become trapped in an upper portion of each water ballast tube serves to buffer the contribution of the water within each respective water ballast tube to the inertia of the embodiment, as does any vaporization of any water within each respective water ballast tube due to the occurrence of a very low pressure within a water ballast tube.

Figure 75:
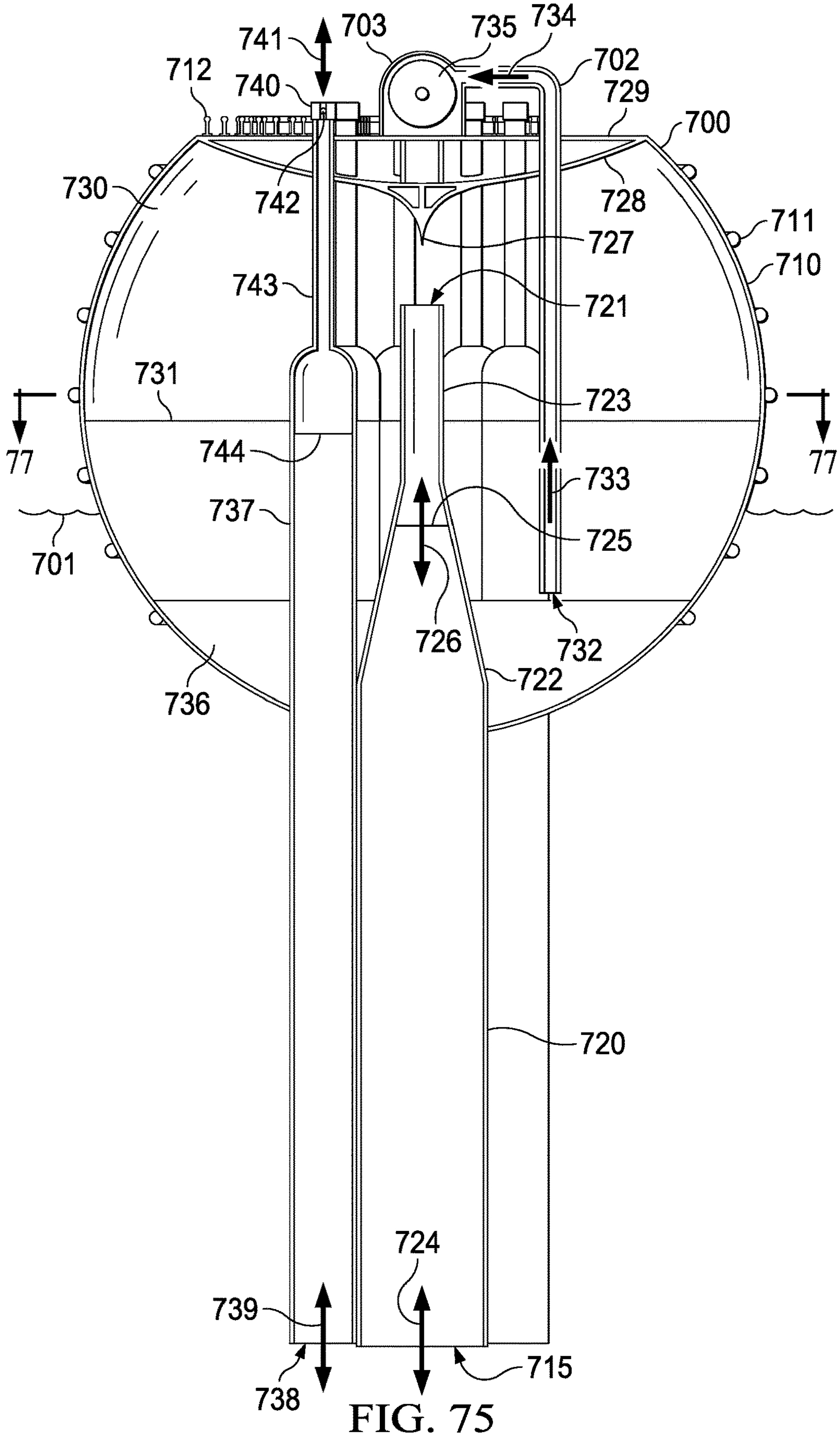
FIG. 75 is a side sectional view of the embodiment of FIGS. 70-74.

FIG. 75 shows a side sectional view of the same embodiment of the current disclosure that is illustrated in FIGS. 70-74, where the section is taken along the section line 75-75 specified in FIGS. 73 and 74.

Water within a centrally positioned inertial water tube 720, 722 and 723, is able to freely move 724 in and out of a lower mouth 715 of the tube, thereby freely moving between the interior of the inertial water tube and the body of water 701 on which the embodiment floats. Any air or water within the inertial water tube is also able to freely move out of an upper mouth 721 of the tube (thereby tending to be ejected from the tube and into the interior 730 of the embodiment). As the embodiment 700 moves up and down in response to passing waves, the surface 725 of the water within the inertial water tube 722 moves 726 up and down. Periodically, the surface 725 of the water within the inertial water tube 720, 722, 723, will rise above the mouth 721 and a portion of that water will be ejected from the tube 723. Water ejected from the upper mouth 721 of the inertial water tube 723 may be laterally deflected upon its collision with an approximately conical and/or pointed water diverter 727.

The water diverter 727 is formed within and/or by an inner upper hull, wall, structure, and/or surface 728. Above, and joined at an approximately circular seam 700 with, the inner upper hull 728 is an outer upper hull 729.

Water ejected from and/or through the upper mouth 721 of the inertial water tube 723 enters the interior 730 of the embodiment's hollow flotation module 710 and tends to accumulate and/or pool in a bottom portion of that interior chamber, enclosure, and/or space thereby tending to form a reservoir of water 731. As water accumulates in the embodiment's water reservoir 731 it tends to displace and compress the air above the water reservoir 731 within that interior space 730 thereby tending to increase the pressure of that air. Additionally, as the level 731 of the water reservoir rises above the mean level of the surface 701 of the body of water on which the embodiment floats, the height of the surface 731 of the reservoir above the surface 701 of the outside body of water creates a head pressure and/or gravitational potential energy.

Through a combination of air and head pressures, water within the embodiment's water reservoir 731 tends to be driven and/or pushed into a mouth 732 of turbine ingress pipe 702 after which the water tends to flow 733 upward through the pipe 702 and into 734 the water turbine 735 within the turbine compartment 703 thereby tending to cause the water turbine to rotate, and an operatively connected generator to generate electrical power.

Within a lower portion 736 of the interior 730 of the embodiment's hollow flotation module 710 is a permanently buoyant space 736, chamber, and/or material, characterized by a density that is lower than that of the water 701 on which the embodiment floats. This buoyant space 736 tends to reduce the likelihood that the embodiment will sink if the wall 710 of the embodiment's hollow flotation module is punctured, structurally compromised, and/or ruptured, which might tend to allow the interior 730 of the hollow flotation module to fill with water. A volume 736 of permanent buoyancy will tend to keep the embodiment afloat even if the ingress of water from the upper mouth 721 of the inertial water tube 723 is not countered and/or resisted by a corresponding increase in the pressure of the air within the buoy.

The embodiment 700 incorporates permanent buoyancy in the form of a material, structure, chamber, module, space, volume, and/or element, 736 from which water is largely, substantially, and/or completely, excluded. The illustrated embodiment 700 includes a volume 736 conformal to a bottom interior surface of the buoy 710 from which water is excluded.

Buoyancy space 736 may be made of a low-density material or may contain one or more hermetically scaled voids containing gas or a low-density material like closed-cell plastic foam, in either case decreasing the average density of the embodiment. For instance, buoyancy space 736 might be made of closed cell foam. Or, buoyancy space 736 might include sealed bulkhead-separated compartments containing air or another gas. In other words, buoyancy space 736 has an average density lower than that of water, so as to help provide an overall positive buoyancy to the embodiment.

Some embodiments of the present disclosure include, incorporate, and/or utilize, permanent buoyancy that is located elsewhere on and/or in those embodiments. Some embodiments of the present disclosure include, incorporate, and/or utilize, permanent buoyancy that is attached, connected, and/or incorporated within, those embodiments as a cladding or jacket around the lower portions of the water ballast tubes, e.g., 737. Some embodiments of the present disclosure have no permanent buoyancy; in which case those embodiments derive, and/or rely upon, a positive buoyancy exclusively from the "bubble" of trapped gas within the interior 730 of the hollow flotation modules 710 of the respective embodiments. Those embodiments may utilize the space 736 in order to extend and/or to expand the water reservoirs 731 of the respective embodiments.

Arrayed about the outer perimeter of the inertial water tube 720 are a plurality of water ballast tubes, e.g., 737, with vertical longitudinal axes that are substantially parallel to a vertical longitudinal axis of the inertial water tube. A lower mouth, e.g., 738, at a bottom end of each water ballast tube, e.g., 737, allows water to enter and leave, e.g., 739, each water ballast tube without restriction or hindrance. An air valve, e.g., 740, at a top end of each water ballast tube allows air to enter and leave, e.g., 741, each respective water ballast tube without restriction when the valve is in an open orientation and/or configuration. However, when an air valve, e.g., 740, is closed, e.g., 742, then air (and water) are obstructed and tend to be unable to enter or exit the respective water ballast tube, e.g., 737.

When a water ballast tube's, e.g., 737, air valve, e.g., 740, is open, air may flow 741 in and out of the respective water ballast tube. Each water ballast tube, e.g., 737, has an upper tube portion, e.g., 743, of relatively small diameter. The relatively narrow upper portion of each water ballast tube is contiguous, continuous, and/or fluidly connected, with a relatively wide lower portion, e.g., 737. When a water ballast tube's, e.g., 737, air valve, e.g., 740, is open, the relatively unrestricted inflow and outflow 741 of air into the upper portion of the tube allows the level 744 of the water within the respective water ballast tube to freely change and/or move in response to movements of the embodiment and/or the waves that move it. When a water ballast tube's, e.g., 737, air valve, e.g., 740, is closed, e.g., 742, the passage of air into and out of the upper portion of the tube tends to be obstructed, thereby trapping air therein. Such trapped air will tend to impede, inhibit, and/or prevent, any raising of the level 744 of the water within the water ballast tube, which will tend to compress the pocket of trapped air. Such trapped air will tend to impede, inhibit, and/or prevent, any lowering of the level 744 of the water within the water ballast tube, which will tend to create a partial vacuum within the pocket of trapped air.

Thus, when a water ballast tube's respective air valve is open, the volume and mass of water within that respective water ballast tube may change with relative freedom. However, when the embodiment's control system (not shown) determines that the level of water within a water ballast tube is optimal, desirable, and/or suitable, it may close the respective water ballast tube's air valve thereby inhibiting any changes in the volume and mass of water within that water ballast tube.

Figure 76:
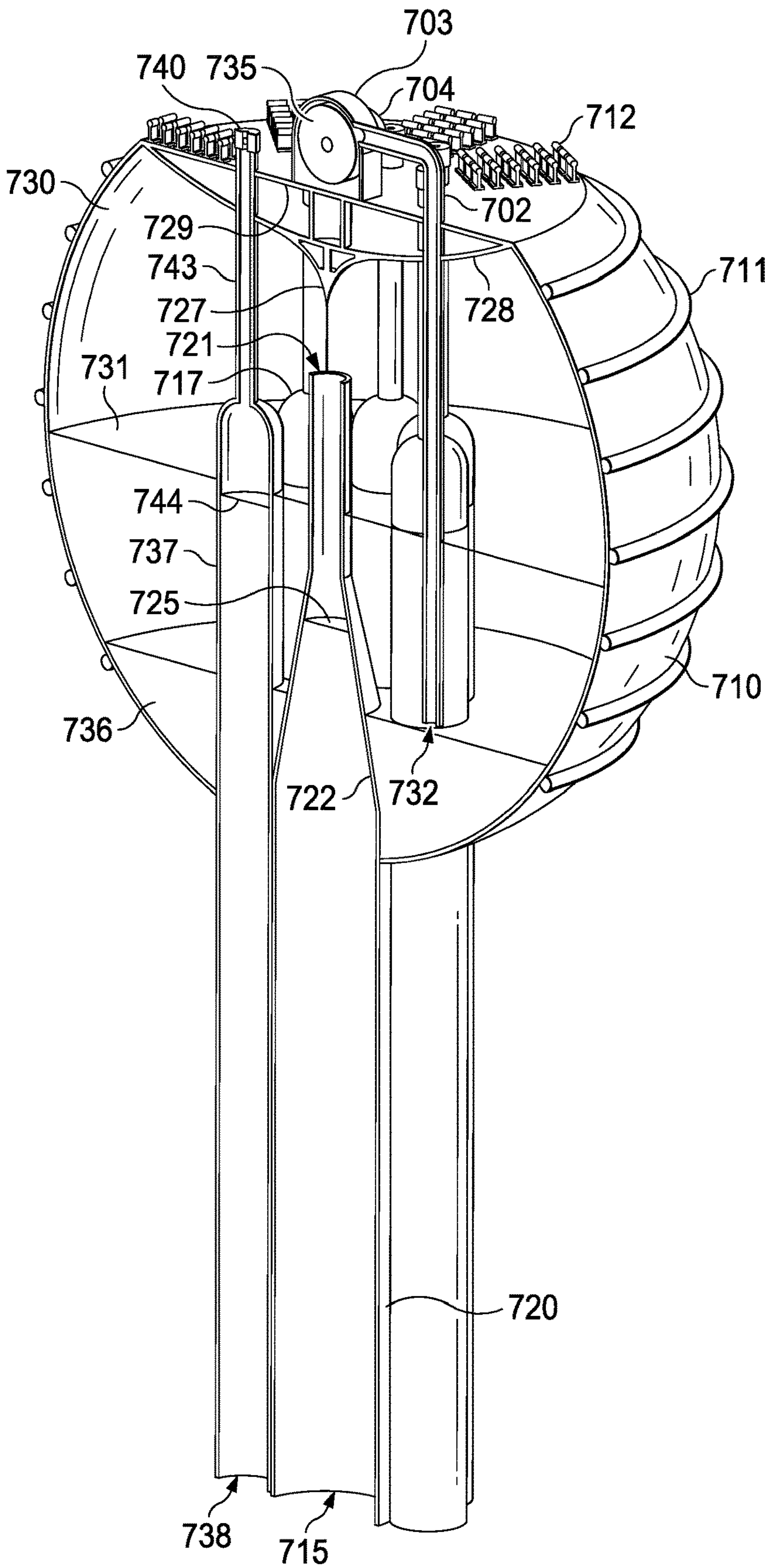
FIG. 76 is a perspective view of the side section of the present invention that is illustrated in FIG. 75.

FIG. 76 shows a perspective view of the side section of the current disclosure that is illustrated in FIG. 75.

Figure 77:
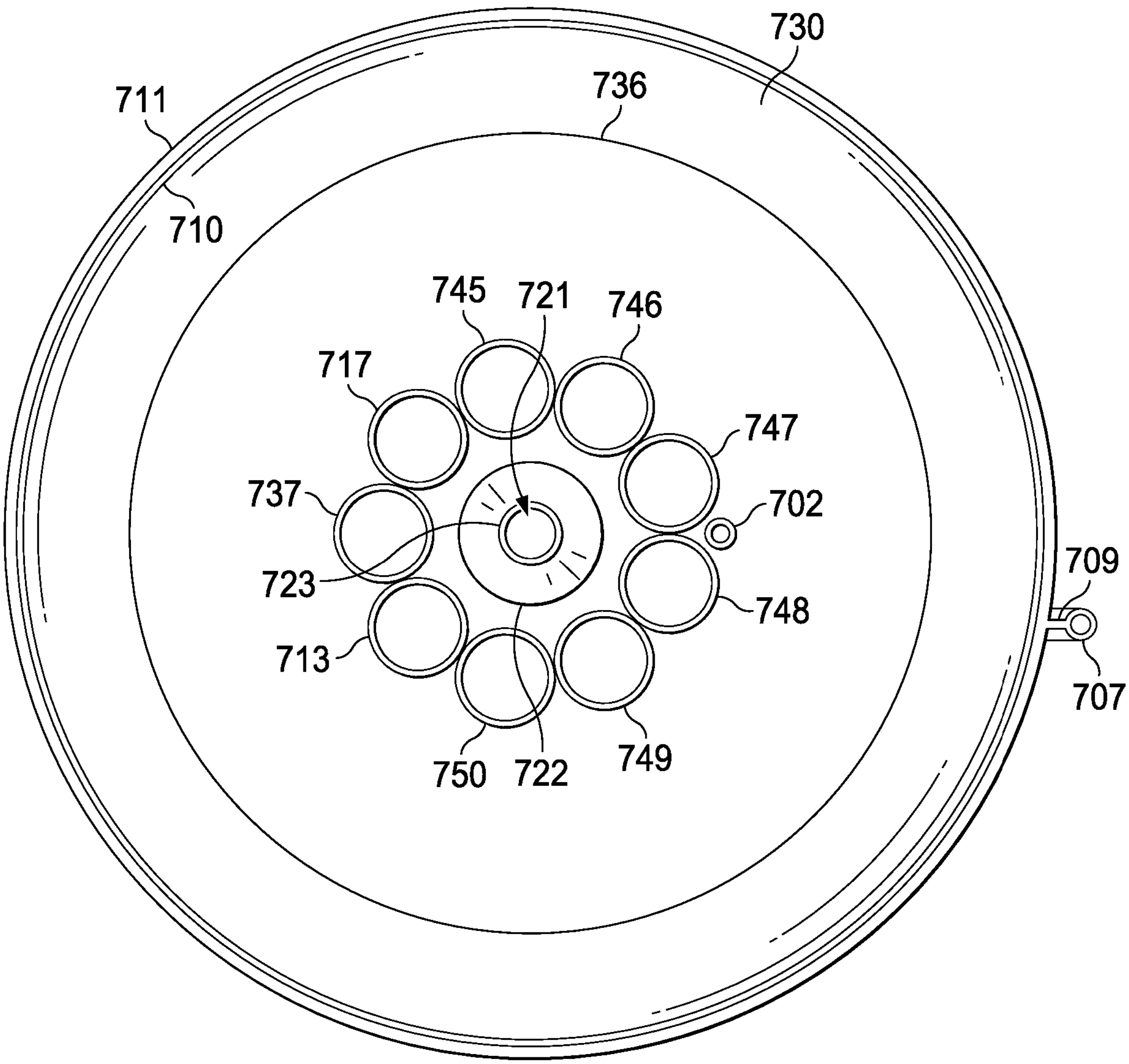
FIG. 77 is a top-down sectional view of the embodiment of FIGS. 70-76.

FIG. 77 shows a top-down sectional view of the same embodiment of the current disclosure that is illustrated in FIGS. 70-76, where the section is taken along the section line 77-77 specified in FIGS. 71 and 75.

A lower portion of the centrally disposed inertial water tube 722-723 is obscured by the permanent buoyancy 736. The inertial water tube 722-723 is surrounded in a radial fashion by nine water ballast tubes 713, 717, 737, 745-750. The section plane passes through one of the embodiment's circular reinforcing bands 711 which helps to resist any expansion of the wall 710 of the hollow flotation module that might occur in response to an increase in the pressure of the air and water trapped within the internal chamber 730 bounded by the wall 710 of the hollow flotation module.

Effluent pipe 707 is secured, fastened, and/or affixed to the embodiment's hollow flotation module 710 by means of a strut 709 that spans the gap between the effluent pipe and the wall 710 of the hollow flotation module.

Figure 78:
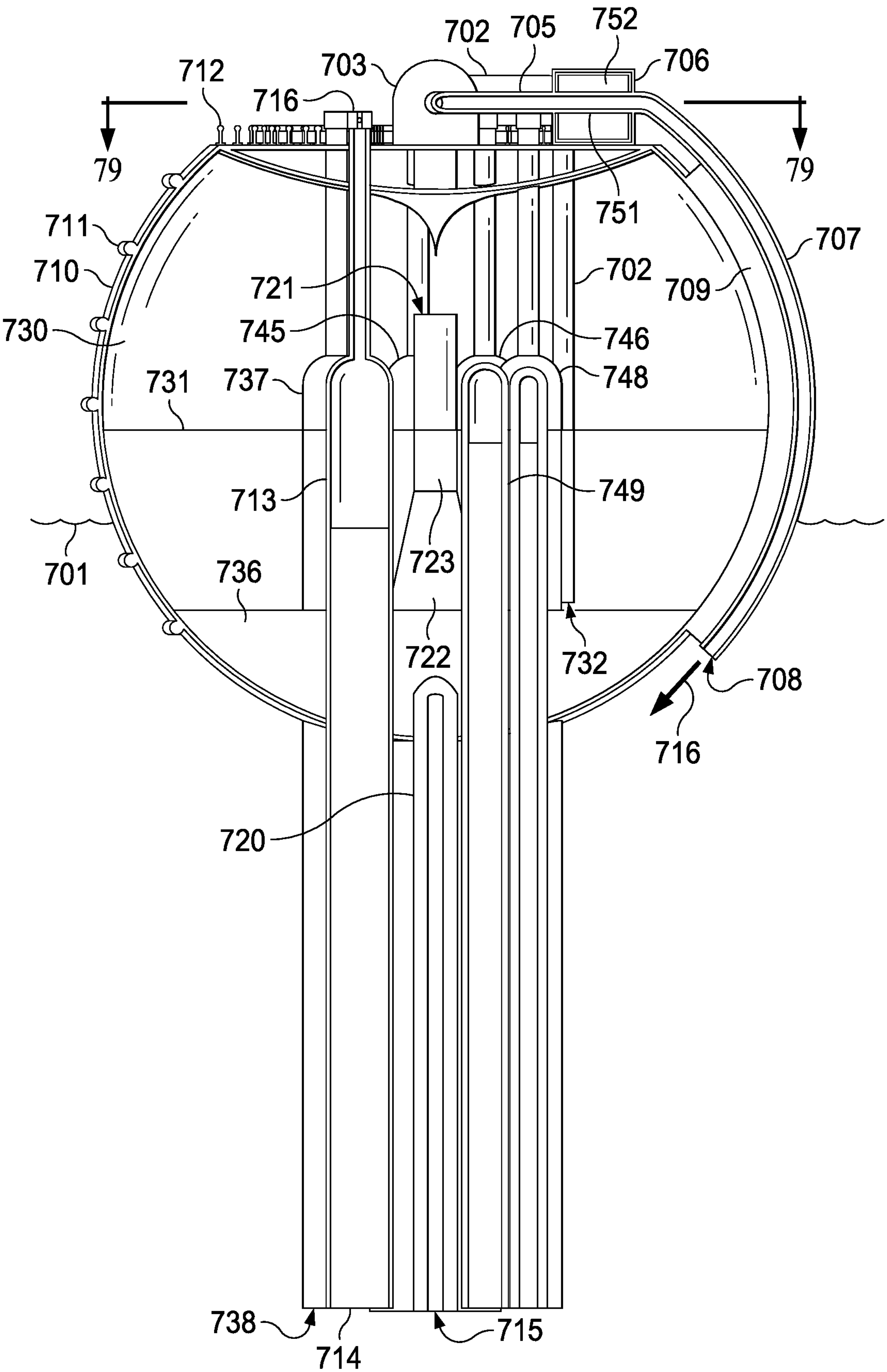
FIG. 78 is a side sectional view of the embodiment of FIGS. 70-77.

FIG. 78 shows a side sectional view of the same embodiment of the current disclosure that is illustrated in FIGS. 70-77, where the section is taken along the section line 78-78 specified in FIGS. 73 and 74.

Effluent water from the water turbine 703 flows away from the water turbine through turbine egress pipe 705. A short distance from the water turbine 703, the effluent pipe 705 enters the computer chamber 706, and water flowing through the section and/or portion of pipe 751 positioned within the interior of the computer chamber will tend to absorb at least a portion of the heat generated by the computing and/or other electronic circuits, devices, components, and/or elements, within the computer chamber. The effluent pipe 751 then passes out of the computer chamber 706, and the heated water then flows out of the computing chamber 706 and into effluent pipe 707, after which that water flows 716 through and out of an effluent pipe discharge mouth 708 and thereby returns to the body of water 701 on which the embodiment floats.

Figure 79:
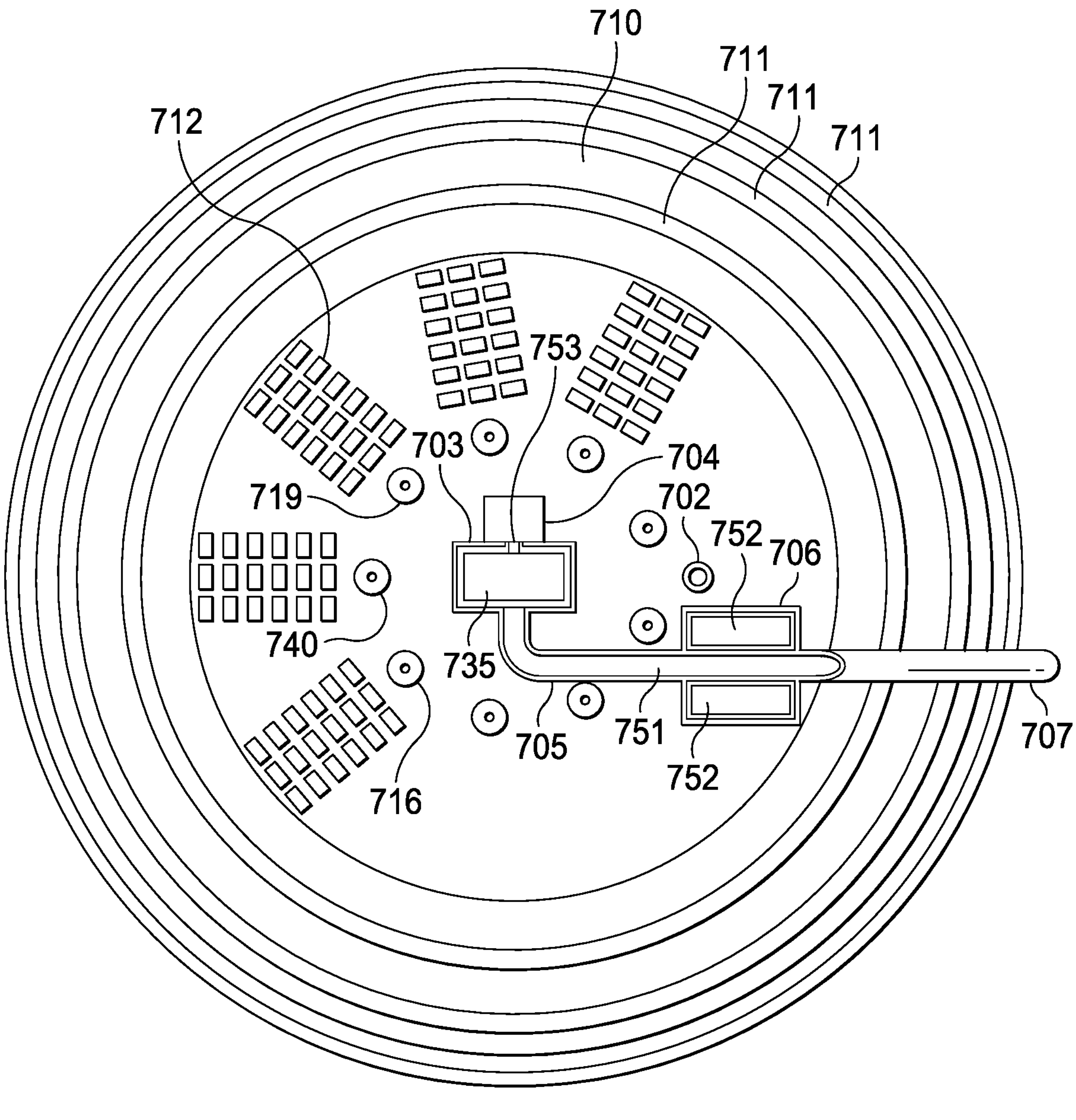
FIG. 79 is a top-down sectional view of the embodiment of FIGS. 70-78.

FIG. 79 shows a top-down sectional view of the same embodiment of the current disclosure that is illustrated in FIGS. 70-78, where the section is taken along the section line 79-79 specified in FIG. 78.

Water pushed out of the water reservoir (731 in FIG. 78) positioned within the interior (730 of FIG. 78) of the embodiment's hollow flotation module 710 by air and head pressure through turbine ingress pipe 702 collides with the water turbine 735 within the turbine compartment 703 causing the water turbine to rotate, and consequently causing the operatively connected generator 704 (connected by shaft 753) to generate electrical power. The effluent of the water turbine 735 flows through effluent pipe 705 into and/or through a portion of that pipe 751 positioned within, and/or passing through, computer chamber 706, where the effluent water tends to absorb heat generated by the computers 752 and/or other electronics within the computer chamber 706. The effluent water continues flowing out of the computer chamber and enters effluent pipe segment 707 through which flows back to the body of water 701 on which the embodiment floats.

Hollow flotation module 710 is a broad upper structural component of the embodiment, and has an approximately spherical or ellipsoidal curvature, with an approximately spherical bottom surface.

Hollow flotation module 710 is substantially hollow and its walls are substantially hermetically sealed with the exception of its connection to the body of water via inertial water tube (720 in FIG. 78).

Some embodiments of the present disclosure include, incorporate, and/or utilize, respective hollow flotation modules 710 having respective horizontal diameters of 30 meters, 40 meters, 50 meters, 60 meters, or 70 meters. Some embodiments of the present disclosure are characterized by vertical heights, e.g., the distances from the tops of their respective flotation modules 710, to their respective lower mouths 715, of 100 meters, 130 meters, 160 meters, 190 meters, or 220 meters.

Some embodiments of the present disclosure include, incorporate, and/or utilize, different types of antenna, i.e., other than a phased array antenna, and/or different means of transmitting and/or receiving coded signals, instead of, and/or in addition to, a phased array antenna.

If the pressure of the air and/or water within the hollow flotation module 710 of the embodiment exceeds a threshold pressure, then pressurized water from within the water reservoir 731 of the hollow flotation module 710 will tend to be ejected from an upper mouth and/or aperture of the embodiment's pressure-relief pipe 702 thereby relieving and/or reducing that pressure.

Individual and/or constituent antennas (e.g., dipole antennas) of the embodiment's phased array antenna 712 are visible on the top surface of the embodiment's hollow flotation module 710. Phased array antenna 712 enables electromagnetically encoded transmissions to be sent from the embodiment to remote antennas, e.g. to the antenna(s) of a satellite, and to be received by the embodiment, e.g. from the antenna(s) of a satellite.

The shape, dimensions, design, and/or geometrical configuration, of the inertial water tube 720 is arbitrary and inertial water tubes with other shapes, dimensions, designs, and/or configurations are included within the scope of the present disclosure.

While the embodiment illustrated in FIGS. 70-79 has a single inertial water tube 720, other embodiments included within the scope of the present disclosure include and/or incorporate two or more inertial water tubes.

While the embodiment illustrated in FIGS. 70-79 has a frusto-conical tapered portion, the one or more inertial water tubes of other embodiments included within the scope of the present disclosure include, incorporate, and/or utilize, inertial water tubes in which the requisite constriction of the tube is not frusto-conical. Some embodiments of the present disclosure include, incorporate, and/or utilize, inertial water tubes that have smooth, approximately hour-glass or bell-shaped tapers and/or regions of narrowing.

While the embodiment illustrated in FIGS. 70-79 has an inertial water tube comprising three portions and/or segments distinguished by differing geometrical shapes, patterns, included angles, lengths, diameters, flow-normal cross-sectional areas, configurations, and/or designs, other embodiments included within the scope of the present disclosure include one, two, four, or more, such portions and/or segments.

While the inertial water tube 720 of the embodiment illustrated in FIGS. 70-79 has a tapered portion positioned between connected cylindrical portions, other embodiments included within the scope of the present disclosure include a tapered portion connected to only a bottom cylindrical portion, i.e., omitting an upper cylindrical portion such that the mouth 721 through which water is ejected by each respective inertial water tube of each respective embodiment is the upper mouth of the tapered portion. While the embodiment illustrated in FIGS. 70-79 has a tapered portion positioned between connected cylindrical portions, other embodiments included within the scope of the present disclosure include a tapered portion connected to only an upper cylindrical portion, i.e., omitting a bottom cylindrical portion such that the mouth 715 through which water flows 724 from into and out of the respective inertial water tube of each respective embodiment from outside and/or below the embodiment, is the bottom mouth of the tapered portion. While the embodiment illustrated in FIGS. 70-79 has a tapered portion positioned between connected cylindrical portions, other embodiments included within the scope of the present disclosure include an inertial water tube that is tapered along its entirety, i.e., omitting both upper and lower cylindrical portions such that the mouths 721 and 715 through which water into and out of the respective inertial water tube of each respective embodiment are the upper and lower mouths, respectively, of the respective inertial water tubes.

The scope of the present disclosure includes embodiments that include, incorporate, and/or utilize, any means, manner, element, component, design, and/or material, of excluding water from any portion of the embodiment and thereby creating to any degree a measure of permanent buoyancy. Embodiments possessing any measure of permanent buoyancy are included within the scope of the present disclosure regardless of the shape, dimensions, design, geometrical configurations, positions, distributions within the embodiment, relative volumes, absolute volumes, and material(s) of fabrication, of the buoyant features, components, elements, portions, and/or parts, by which that measure of permanent buoyancy is achieved.

In the embodiment illustrated in FIGS. 70-79, a water turbine 735 is located at a top-most position in the embodiment. However, the scope of the current disclosure includes embodiments wherein a water turbine is placed at other positions within the embodiment, and/or at other relative positions along the paths across, through, and/or over, which water flows from the water reservoirs of the embodiments to the bodies of water 701 on which the embodiments float. For example, an embodiment of the present disclosure has a water turbine positioned near the exit aperture (708 in FIG. 78) of the effluent pipe 707. Another embodiment of the present disclosure has a water turbine positioned near the entry aperture (732 in FIG. 78) of the turbine ingress pipe 702.

Figure 80:
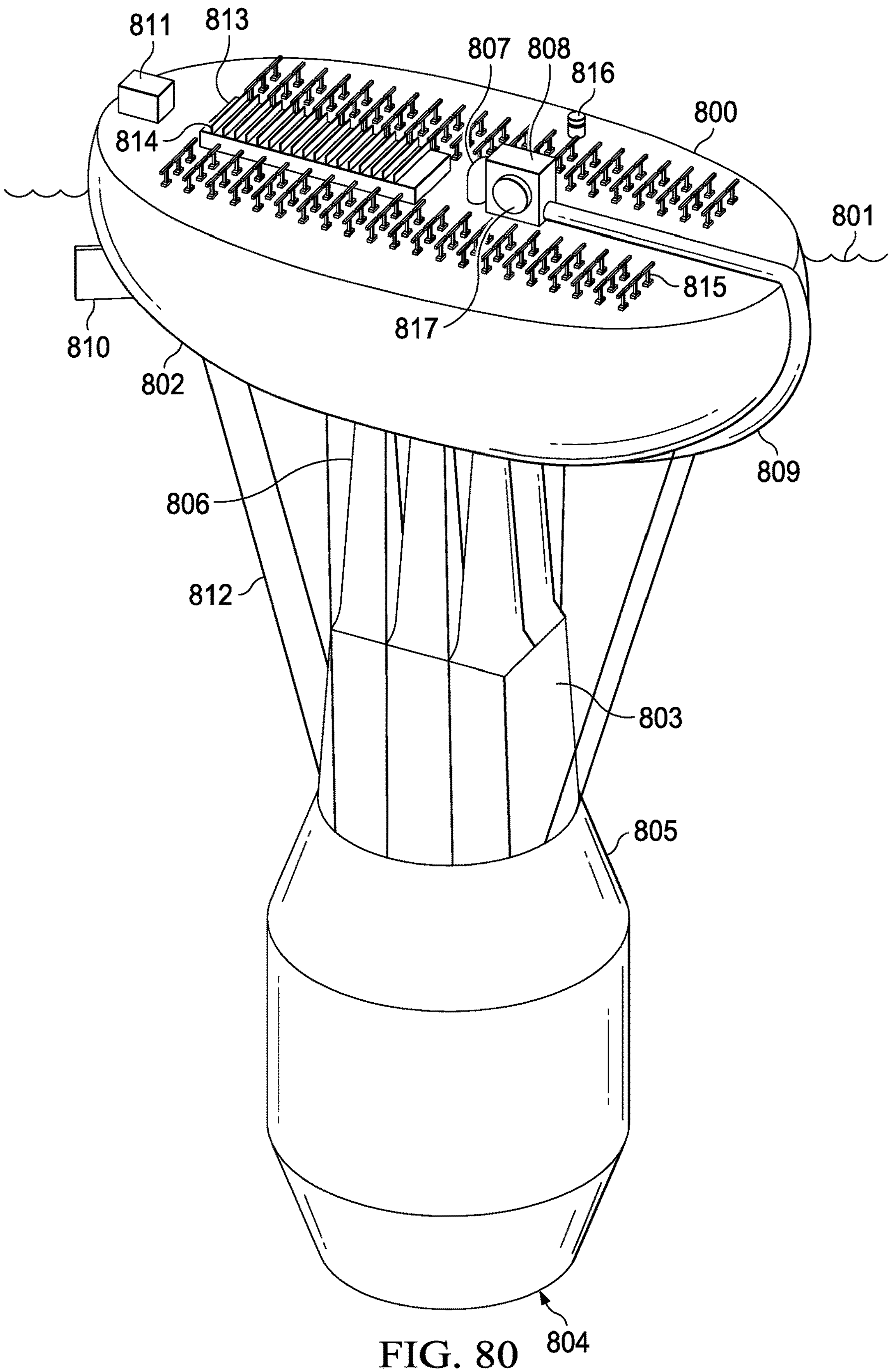
FIG. 80 is a side perspective view of another embodiment of the present invention.

FIG. 80 shows a side perspective view of an embodiment of the current disclosure.

The embodiment 800 floats adjacent to an upper surface of a body of water 801 over which waves pass. The embodiment comprises an upper buoyant portion (i.e., a hollow flotation module) 802 and a depending, rigidly connected tubular portion (i.e., an inertial water tube) 803 through which water rises and falls in response to the wave-induced changes in the height of the water's surface 801 and to the wave-induced movements of the embodiment.

The embodiment's hollow flotation module 802 encloses a sealed hollow chamber that nominally contains both air and water. The embodiment's hollow flotation module 802 has an approximately ellipsoidal shape from which an upper portion has been cleaved so as to form a relatively flat upper surface that is oriented so as to be approximately normal to a nominally vertical longitudinal axis of the embodiment's inertial water tube 803, and approximately parallel to a resting and/or mean surface 801 of the body of water on which the embodiment 800 floats. In other embodiments, hollow flotation module 802 has no cleaved portion or has a smaller cleaved portion, so that it more closely resembles a full ellipsoid, and its upper surface can be curved rather than flat.

The embodiment's inertial water tube 803 is open to the body of water 801 on which the embodiment floats by means of a lower aperture or mouth 804. And, the embodiment's inertial water tube 803 is open to the interior of the embodiment's hollow flotation module 802 by means of an array of upper apertures or mouths (not visible). A lower portion 805 of the embodiment's inertial water tube 803 is surrounded by, and/or positioned within, a water-filled tank, chamber, and/or jacket 805 which provides the embodiment with water ballast and additional inertia, which tends to alter the natural frequency of its oscillations.

The embodiment's inertial water tube 803 comprises a single channel of relatively great flow-normal cross-sectional area at its lower extent, e.g. 803 and the channel passing through tube ballast chamber 805. At its upper end 806, the tubular portion of the inertial water tube 803 is partitioned into an array of substantially parallel and tapered channels, whose cumulative flow-normal cross-sectional area narrows to become less than the flow-normal cross-sectional area of the tube's lower mouth 804. Thus, water rising within the embodiment's inertial water tube tends to pass through a constricting channel (i.e. an array of constricting channels that, in flow-normal cross-sectional aggregate, also constitute a constricting channel). Whereas, water moving downward within the inertial water tube tends to pass into an expanding channel.

As the embodiment 800 rises and falls in response to passing waves, the inertia of the water within its inertial water tube inertially resists the nominally wave-induced upward and downward accelerations of the embodiment 800, thereby causing the water within the inertial water tube to tend to move vertically and/or longitudinally relative to the inertial water tube that constrains and/or entrains it, and typically and/or often in a relative direction opposite that of the embodiment's movements.

Changes in the relative height of the water 801 outside the embodiment, e.g., changes in the height of the embodiment's waterline, result in changes in the effective depth of the inertial water tube's lower mouth 804, and/or in the magnitude of the pressure of the water at and/or adjacent to that lower mouth, which also tends to cause the water within the embodiment's inertial water tube 803 to move vertically and/or longitudinally relative to the tube 803. At least as a consequence of the two factors described above, the water within the embodiment's inertial water tube 803/806 tends to rise and fall within the inertial water tube's tapered channels when the embodiment rises and falls in response to passing waves.

As the water within the embodiment's inertial water tube 803 rises and falls, the relative narrowing and/or constriction of the tube's tapered channels tends to amplify the movements and/or speeds of movement of that water. Occasionally, the water within the embodiment's inertial water tube rises to an extent that causes a portion of that water to be ejected from, and/or to flow out of, one or more of the upper apertures or mouths of the inertial water tube's tapered channels, e.g., 806, thereby depositing water within the interior of the embodiment's hollow flotation module 802. As water collects within the embodiment's hollow flotation module 802, the air therein is displaced and compressed causing its pressure to increase. When the height of the water within the embodiment's hollow flotation module 802 is great enough, and/or the pressure of the air therein is great enough, water from within the embodiment's hollow flotation module 802 rises through a turbine ingress pipe 807 and enters a water turbine enclosure 808 where it collides with a water turbine therein (not visible), tending to cause the water turbine to rotate, and thereby tending to cause an operatively connected generator 817 to be energized, e.g., through a rotation of its rotor, thereby generating electrical energy.

After passing through, around, and/or over the water turbine within the water turbine enclosure 808, water flowing out of the embodiment's hollow flotation module 802 flows through effluent pipe 809, and then flows out of an end of that effluent pipe through a mouth or aperture (not visible) beneath the embodiment's hollow flotation module 802, where it rejoins the body of water 801 on which the embodiment floats. The outflow of water from the distal mouth of effluent pipe 809 tends to generate thrust that tends to propel the embodiment in a direction opposite the embodiment's rudder 810, thereby allowing the embodiment's control system (not visible) to direct the thrust-induced motion thereof so as to steer the embodiment in a desirable direction and/or to a desirable destination. The rudder's rotational orientation about the longitudinal axis of its substantially vertical shaft (not visible) is altered, changed, adjusted, positioned, and/or controlled, by a rudder control mechanism 811 that is controlled by the embodiment's control system.

The position, orientation, and structural integrity of the embodiment's inertial water tube 803/806, relative to the embodiment's hollow flotation module 802, is supported, augmented, facilitated, and/or promoted through a plurality of tensioning linkages, e.g., 812, that connect the two. Embodiments of the current disclosure may utilize tensioning linkages that are rigid, such as, but not limited to, pipes and struts, such as those made of steel or another metal. Embodiments of the current disclosure may also use and/or alternatively use tensioning linkages that are flexible, such as, but not limited to, chains, cables, ropes, and/or other linkages.

Affixed to an upper surface of the embodiment's hollow flotation module 802 is an electronics enclosure 813 whose contents can include, but are not limited to, computers, computing devices, computer networking devices, memory storage devices, energy storage devices, radio communications circuits, navigational devices, and the embodiment's control system. At least a portion of the electrical power that energizes some or all of these electronic devices and circuits is generated by the embodiment's water-turbine-powered generator 817. A portion of that electrical power may be stored within energy storage devices within the electronics enclosure 813 and made available to power some or all of the other electronic devices and circuits. At least a portion of the heat generated by the electronic circuits and devices is dissipated into the atmosphere by heat-radiating fins, e.g., 814, and as in previous embodiments of the present disclosure, by communicating some of that heat via a heat exchanger to one or more of: the water enclosed within the embodiment, the water passing from or to the turbine of the embodiment, and/or the water 801 on which the embodiment floats.

The embodiment's phased-array antenna 815 receives encoded radio transmissions that include, but are not limited to: computational problems, computational data, signals, coordinates, status requests, status updates, and other information that allows the embodiment to perform computational tasks on, with, and/or within, its computational devices; navigate to desirable locations (e.g., where wave conditions are and/or will be optimal, where the number and/or dangers of potential navigational hazards are and/or will be minimal, etc.); coordinate its navigation, position, computational activities, etc., with other embodiments: etc.

Likewise, the embodiment's phased-array antenna 815 transmits encoded radio transmissions that include, but are not limited to: the results of fully or partially completed computational tasks; reports of the embodiment's status (e.g., available electrical energy, and performance of devices, systems, and/or subsystems on, in, or within, the embodiment); reports of ambient environmental conditions (e.g., wave conditions, wind speeds and directions, precipitation, relative humidity, water temperature and salinity, current speed and direction, and positions, speeds and densities, of passing marine life); available computing resources (e.g., CPUs, memory, etc.) and estimates of future availability; and observations of nearby ships, planes, fish, etc.

An air intake valve 816 is controlled by the embodiment's control system (not visible) and, when opened, allows a suction created within one or more tapered channels 806 of the embodiment's inertial water tube to draw air into the interior of the embodiment's hollow flotation module 802, thereby tending to increase the mass of air therein. If the pressure of the air within the embodiment's hollow flotation module 802 exceeds a threshold level, then portions of that air will exit through a pressure-relief pipe (not visible).

Other embodiments have other types of generators, multiple generators, generators coupled to the water turbine by differing mechanisms, and so on. An embodiment of the current disclosure incorporates and utilizes a generator that is incorporated within, and/or is an integral part of, the water turbine. One such integral water turbine generator mechanism comprises a set of electricity generating coils embedded within a cylindrical coaxial block about the longitudinal and/or radial axis of which the water turbine, and magnets attached thereto, rotates.

Figure 81:
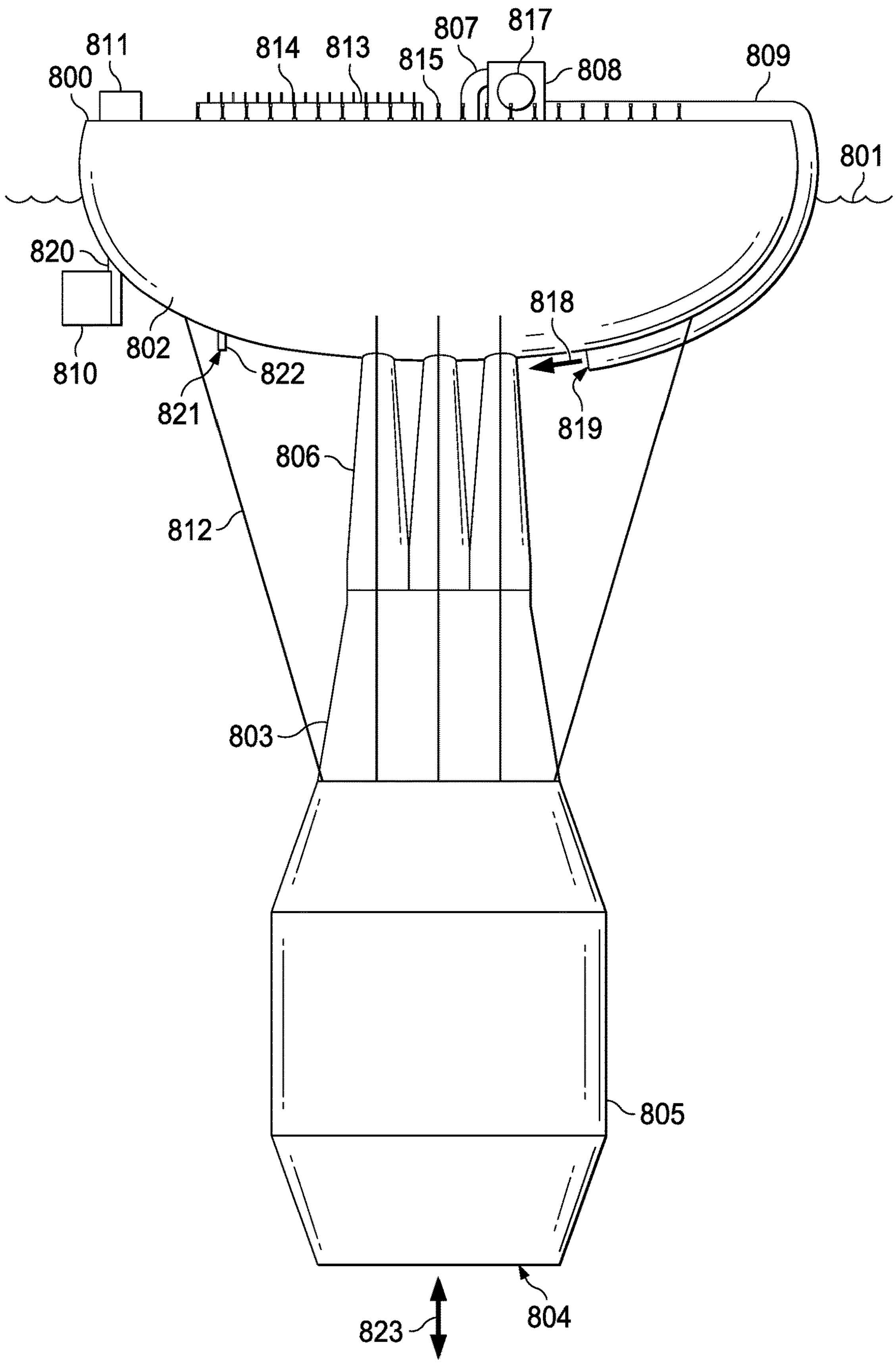
FIG. 81 is a right-side view of the embodiment of FIG. 80.

FIG. 81 shows a right-side view of the same embodiment of the current disclosure that is illustrated in FIG. 80.

When the volume and/or height of water within the interior of the embodiment's hollow flotation module 802 is sufficiently great and/or the pressure of the air within the embodiment's hollow flotation module is sufficiently high, water will tend to rise within turbine ingress pipe 807 and pass through, engage, and cause to rotate, the water turbine (not visible) positioned within the water turbine enclosure 808 after which the water will tend to flow through effluent pipe 809 and thereafter to flow 818 into the body of water 801 on which the embodiment floats through effluent pipe discharge mouth 819.

Rudder 810 is attached to rotatable shaft 820 the rotational orientation of which is adjusted and controlled by rudder control mechanism 811.

If and when the pressure of the air within the embodiment's hollow flotation module 802 exceeds the pressure of the water at the lower mouth and/or aperture 821 of the (air) pressure-relief pipe 822, a sufficient portion of that air will exit the embodiment 800 through that lower pressure-relief pipe mouth so that the pressure of the air within the embodiment's hollow flotation module 802 returns to its maximum nominal value. In a similar manner, a water pressure-relief pipe such as 611 in FIG. 63 can be used in this and other embodiments, which allows water to exit the interior void of the embodiment in case the pressure inside the embodiment rises higher than the head pressure of the water in the pressure-relief pipe. Typically a water relief pipe will be preferable to an air pressure relief pipe, but embodiments of the present disclosure can utilize either or both.

As the embodiment 800, and the adjacent waves, rise and fall, water enters and exits 823 the lower mouth 804 of the embodiment's inertial water tube, thereby permitting the water within the inertial water tube to rise and fall without significant hindrance.

Figure 82:
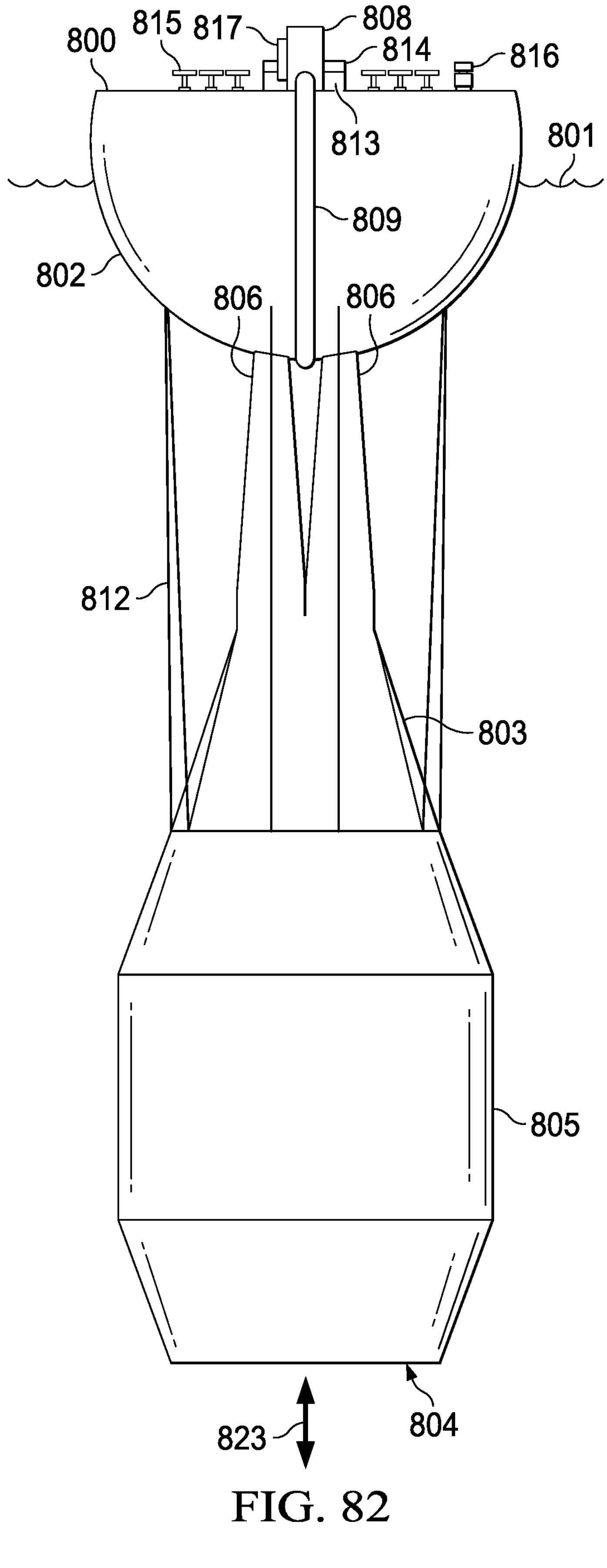
FIG. 82 is a front-side view of the embodiment of FIGS. 80 and 81.

FIG. 82 shows a front-side view of the same embodiment of the current disclosure that is illustrated in FIGS. 80 and 81.

Figure 83:
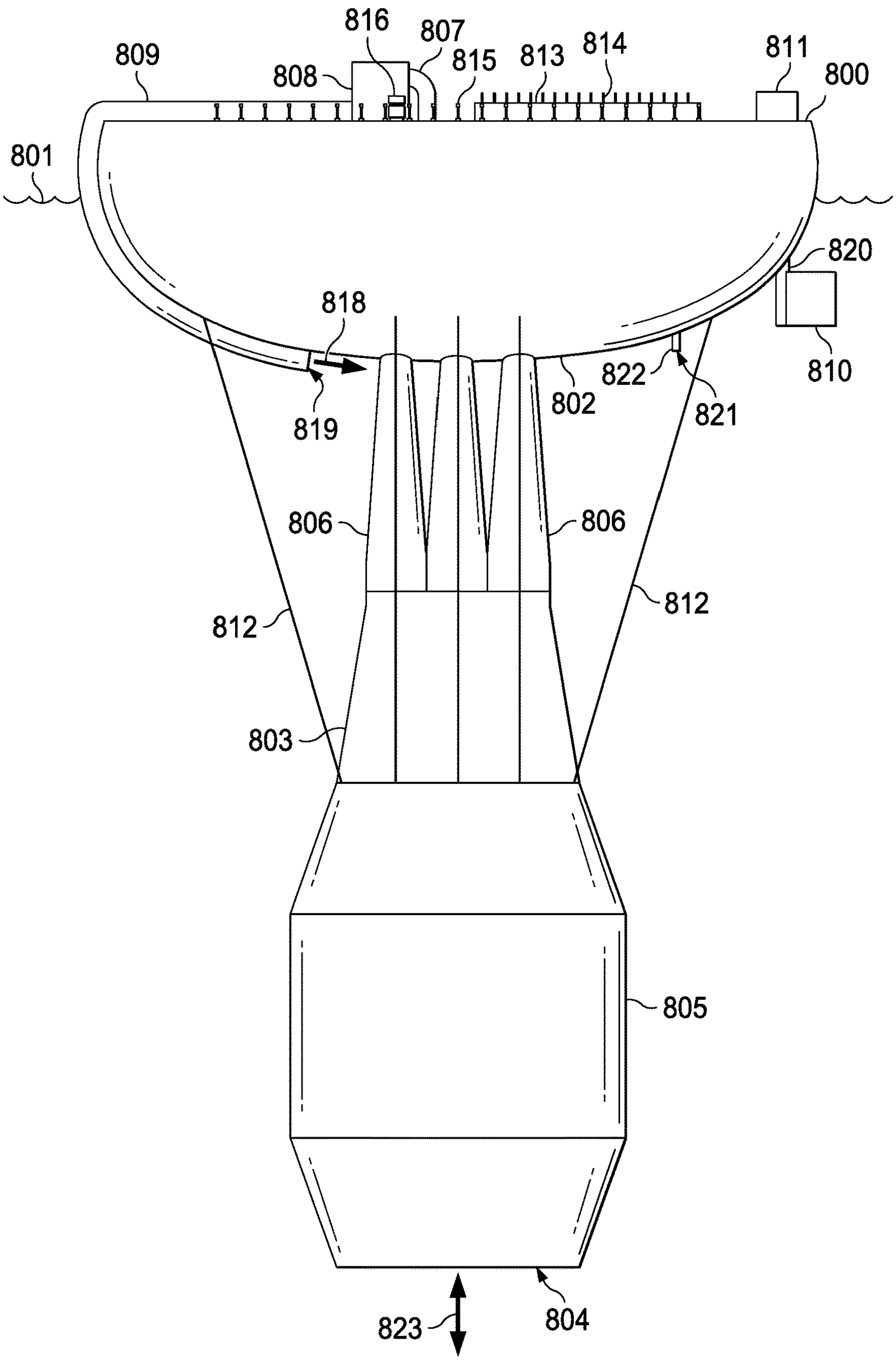
FIG. 83 is a left-side view of the embodiment of FIGS. 80-82.

FIG. 83 shows a left-side view of the same embodiment of the current disclosure that is illustrated in FIGS. 80-82.

Figure 84:
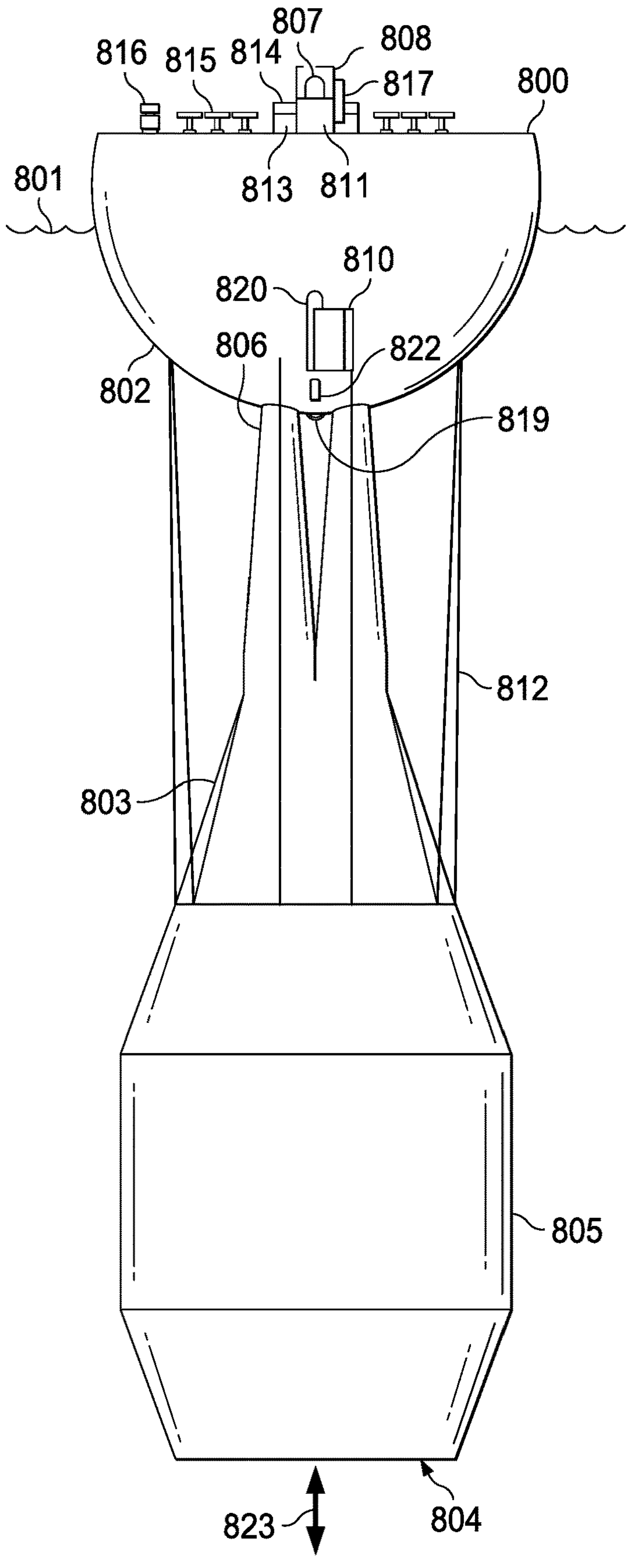
FIG. 84 is a back-side view of the embodiment of FIGS. 80-83.

FIG. 84 shows a back-side view of the same embodiment of the current disclosure that is illustrated in FIGS. 80-83.

Figure 85:
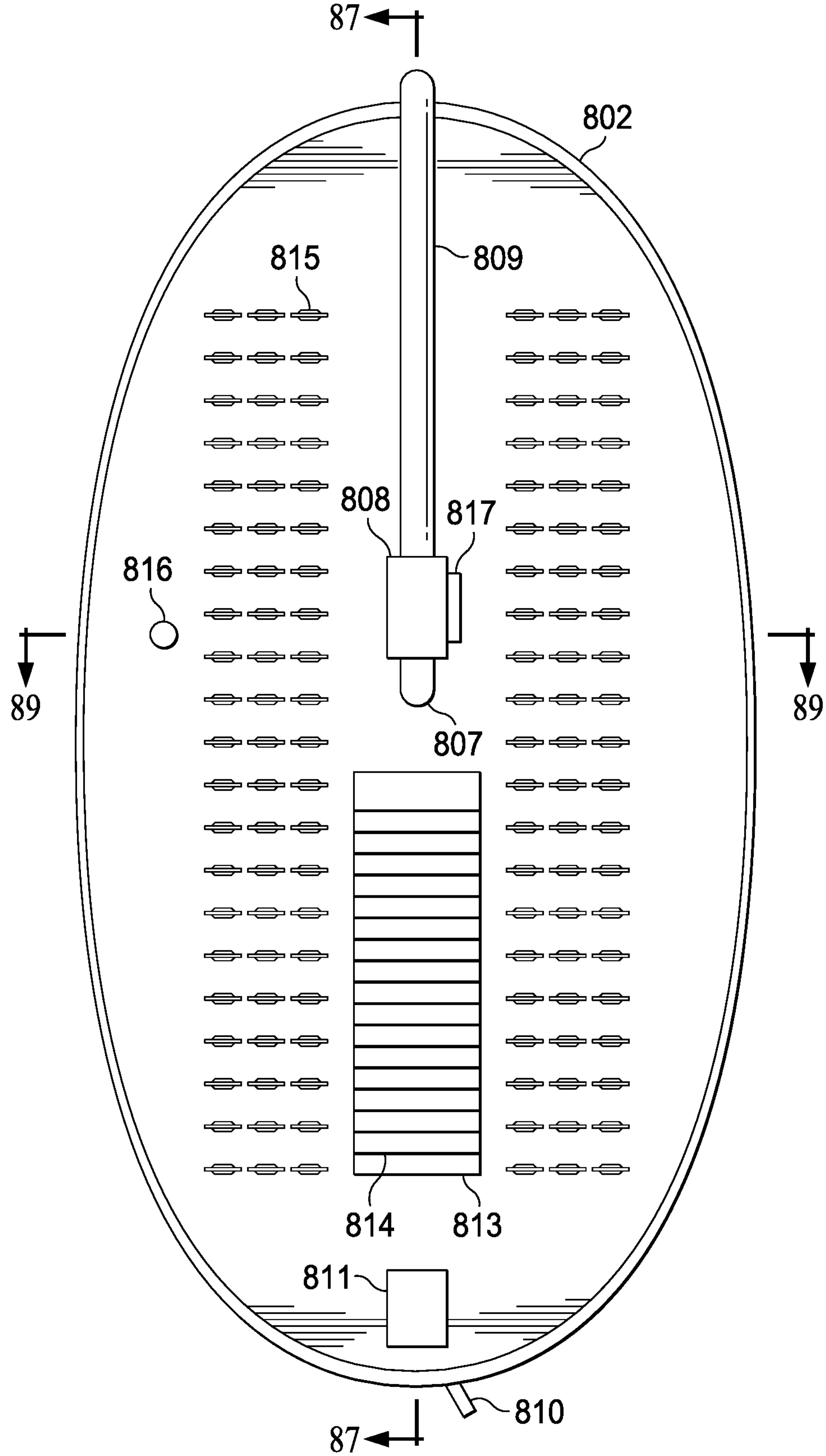
FIG. 85 is a top-down view of the embodiment of FIGS. 80-84.

FIG. 85 shows a top-down view of the same embodiment of the current disclosure that is illustrated in FIGS. 80-84.

Figure 86:
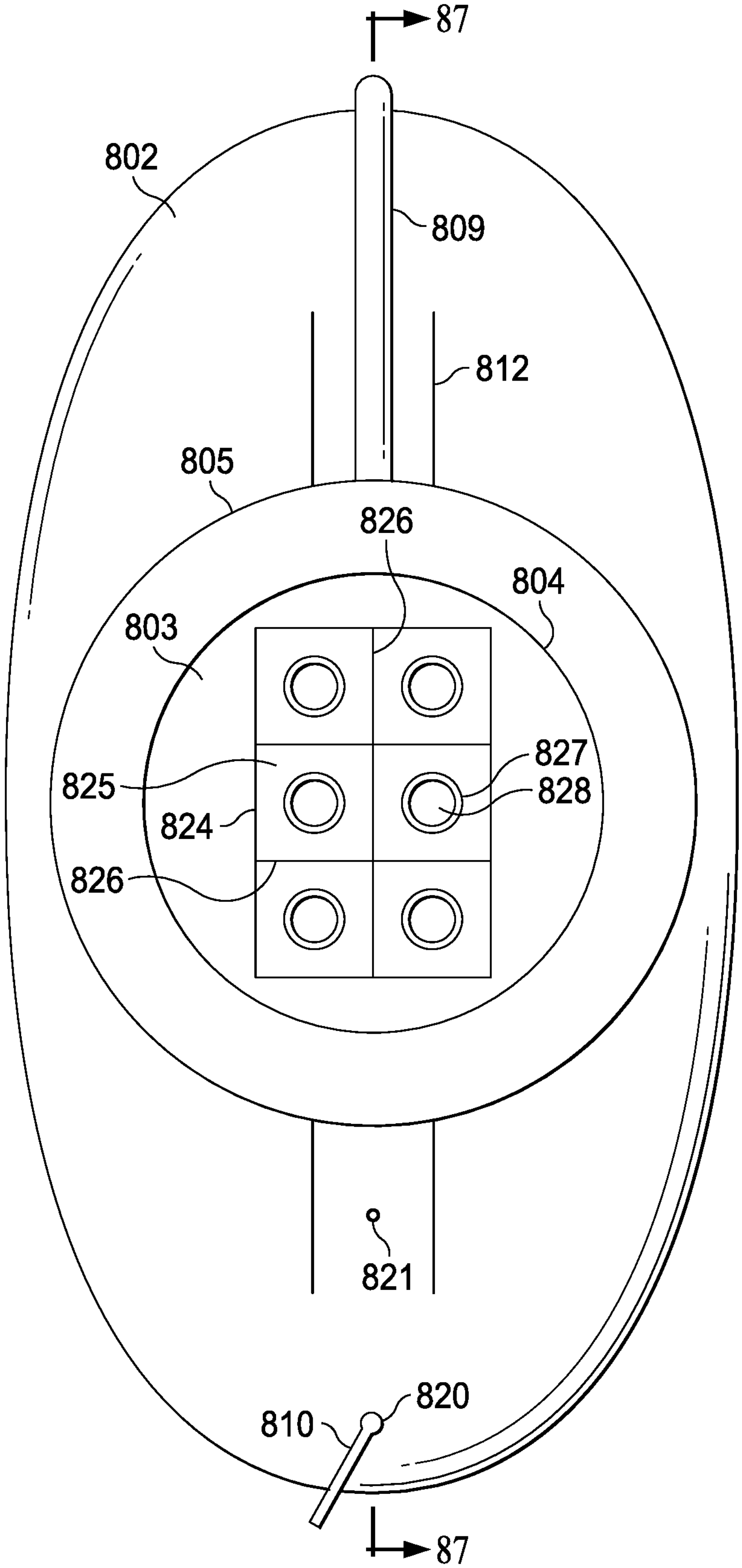
FIG. 86 is a bottom-up view of the embodiment of FIGS. 80-85.

FIG. 86 shows a bottom-up view of the same embodiment of the current disclosure that is illustrated in FIGS. 80-85.

At the center of the annular-ring shaped tube ballast chamber 805 is the lower mouth 804 of the approximately cylindrical bottom-most portion of the embodiment's inertial water tube 803. A middle portion 803 of that inertial water tube constricts with respect to an upward vertical direction, and the inertial water tube progressively alters its flow-normal and/or horizontal cross-sectional shape from the approximately circular cross-section 804 that characterizes the cylindrical bottom-most portion of that inertial water tube and the lower mouth 804 thereof, to the approximately rectangular flow-normal cross-section 824 that characterizes the middle portion 803 of the embodiment's inertial water tube.

(It should be noted that throughout this disclosure the term "ballast" does not necessarily refer to, and typically does not refer to, heavy material such as stone or gravel, but rather typically refers to a "water ballast" i.e. a volume of water that is constrained within an enclosure of the relevant embodiment so as to add a measure of effective inertia, mass, and stability to the embodiment. So, for instance, tube ballast chamber 805 of embodiment 800 is a hollow enclosure having walls made of a rigid material e.g. steel and having an interior void that, in operation, is flooded with water, e.g., seawater.)

At an upper end 824 of the middle rectangular portion 803 of the inertial water tube, the single, integral inertial water tube and/or its channel splits and forms and/or becomes six approximately conical tapered channels, segments and/or portions, e.g., 825, whose flow-normal and/or horizontal cross-sections morph from approximately square 826 adjacent to their bases, bottoms, and/or lower extents, to approximately circular 827. At the upper end of each conical tubular segment is an approximately circular mouth 827, at their tops, and/or upper extents. Above each upper mouth, e.g., 827, of each conical tapered channel, e.g., 825, is a respective approximately conical water diverter, e.g., 828. Each water diverter tending to cause water ejected upward from its respective conical tapered channel to be directed and/or sprayed laterally, thereby reducing the portion of that water that will fall back into the respective conical tapered channel through the channel's respective mouth, e.g., 827, after ejection. In other embodiments, the array of progressively more constricted tubes at the upper portion of the undivided portion 803 of the inertial water tube can be arrayed in other configurations besides the "2×3" rectangular/rectilinear configuration characterizing the embodiment illustrated in FIG. 86. In some embodiments, similar arrays of tapered channels are arrayed in a circular pattern (e.g. if there are seven constricted tubes, each tube can be hexagonal rather than square, and they can be arrayed in a hexagonal "honeycomb" pattern, i.e. seven same-sized hexagons tiled so that they form a near circle).

The scope of the present disclosure includes embodiments with any type, design, size, location, configuration, flow-normal cross-sectional profile, flow-parallel cross-sectional profile, and/or design, of tapered channel array.

The scope of the present disclosure includes embodiments including, incorporating, and/or utilizing, inertial water tubes possessing, incorporating, and/or manifesting, any number of separated channels, split channels, unique flow paths, sub-divided tubes and/or tube segments.

Figure 87:
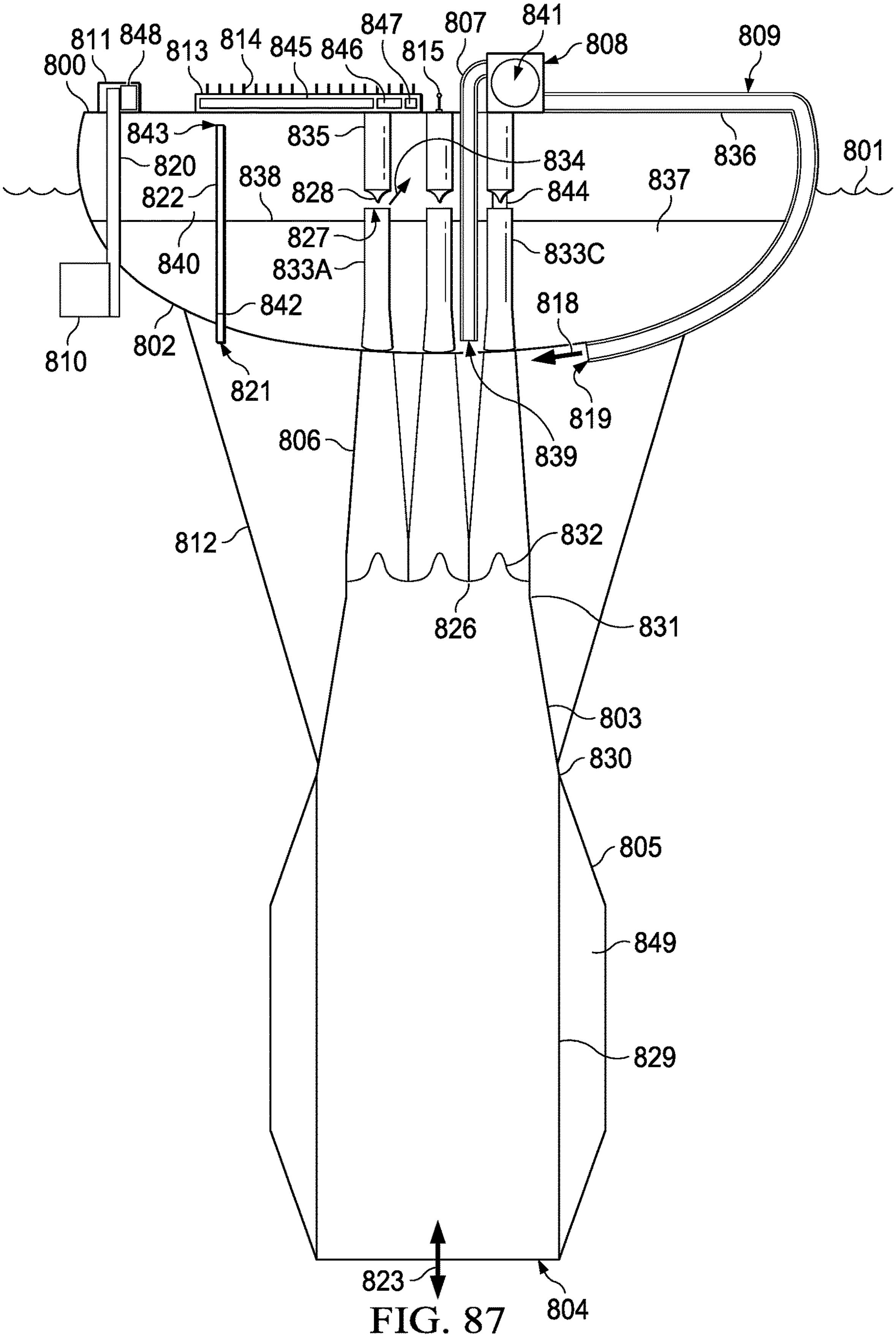
FIG. 87 is a side sectional view of the embodiment of FIGS. 80-86.

FIG. 87 shows a side sectional view of the same embodiment of the current disclosure that is illustrated in FIGS. 80-86, where the section is taken along the section line 87-87 specified in FIGS. 85 and 86.

As the embodiment 800 moves up and down in response to passing waves, and as its waterline and effective draft also change and/or oscillate in response to passing waves, water tends to rise and fall within the embodiment's inertial water tube 829, 803, and 806. The rising and falling of water within the embodiment's inertial water tube is associated with a concomitant flowing in and flowing out 823 of water through the inertial water tube's lower mouth 804. The lower cylindrical 829 and middle constricting 803 portions of the inertial water tube are joined together, and/or transition from one to the other, at seam and/or junction 830. Between seams 830 and 831, the inertial water tube's flow-normal horizontal cross-sectional area decreases (with respect to an upward direction) and its shape morphs from approximately circular to approximately rectangular.

Above seam 831, the inertial water tube splits into six separate channels, e.g., 806, whose flow-normal cross-sectional areas also decrease with respect to an upward direction. The sectional plane of the illustration in FIG. 87 passes through the three conical tubular segments, e.g., 806, behind the sectional plane, and the three conical tubular segments in front of the sectional plane. Because of the conical shapes of the conical tubular segments, the edge 832 revealed by the section is not linear.

At an uppermost end of each conical tubular segment is an approximately cylindrical tube segment 833 through which water is occasionally ejected, e.g., 834, from and/or through the upper mouth, e.g., 827, of each respective conical tubular segment, and diverted by each respective approximately conical water diverter, e.g., 828. Each water diverter, e.g., 828, is formed at the end of a structural element, e.g., 835, that depends from the upper wall 836 of the embodiment's hollow flotation module 802. (In some embodiments, the water diverters do not depend from the upper wall 836, but are rather supported by, and/or rigidly attached to, one or more of the conical tubular segments, e.g. 833A, e.g. by attachment to the upper mouths 827 of one or more conical tubular segments.) Water ejected from the conical tubular segments 806/833 collects in a water reservoir 837 positioned within a lower portion of the interior space of the embodiment's hollow flotation module 802, thereby forming a reservoir of water the height of whose surface 838 defines and/or creates a head pressure of the water at a bottom mouth 839 of the turbine ingress pipe 807. The pressure of the water at the bottom mouth 839 of the turbine ingress pipe 807 is increased by the pressure of the air within the upper portion 840 of the embodiment's hollow flotation module 802.

When the combined and/or total pressure of the water at the bottom mouth 839 of the turbine ingress pipe 807 (i.e. pressure due to both the weight of water and degree of air compression above that location) is sufficient, water enters that bottom mouth 839, travels upward through the turbine ingress pipe 807, enters the water turbine enclosure 808, and causes the rotation of the water turbine 841 therein. After passing through the water turbine 841, the water propelled out of the embodiment's water reservoir 837 then flows through effluent pipe 809 and flows 818 through mouth 819 back into the body of water 801 from which it was originally captured by the embodiment's inertial water tube 829.

The bottom mouth 821 of pressure-relief pipe 822 is at a depth beneath the embodiment's hollow flotation module 802 that varies in response to changes in the waterline and/or draft of the embodiment, but which is nominally within a relatively narrow range of depths. When the pressure of the pocket of air 840, trapped within the hollow flotation module 802, and positioned above the water reservoir 837, exceeds the hydrostatic pressure of the water at the bottom mouth 821 of the pressure-relief pipe 822, then pressurized air from the air pocket 840 will flow through that pipe 822 and exit the pipe's lower mouth 821 thereby escaping the embodiment and reducing the pressure of the air 840. When the pressure of the pocket of air 840 is less than the hydrostatic pressure of the water at the bottom mouth 821 of the pressure-relief pipe 822, then the surface 842 of the water within the pressure-relief pipe 822 will be above the pipe's bottom mouth 821, and air will remain trapped within the air pocket 840. Air from air pocket 840 enters the pressure-relief pipe 822 through upper mouth 843.

Instead of, or in addition to, the pressure relief pipe 822, a water pressure-relief pipe such as 611 in FIG. 63 can be used which allows water to exit upwardly from the interior void of the embodiment when the pressure in said void rises beyond a nominal threshold, and the scope of the present disclosure includes such embodiments. Instead of, or in addition to, the pressure relief pipe 822, a spring-loaded or gravity-loaded relief valve can be provided on the upper, lower, or side surface(s) of hollow flotation module 802, allowing water and/or air to exit the interior void of the embodiment when the pressure in said void rises beyond a nominal threshold pressure (e.g., the cracking pressure) of said valve.

Figure 88:
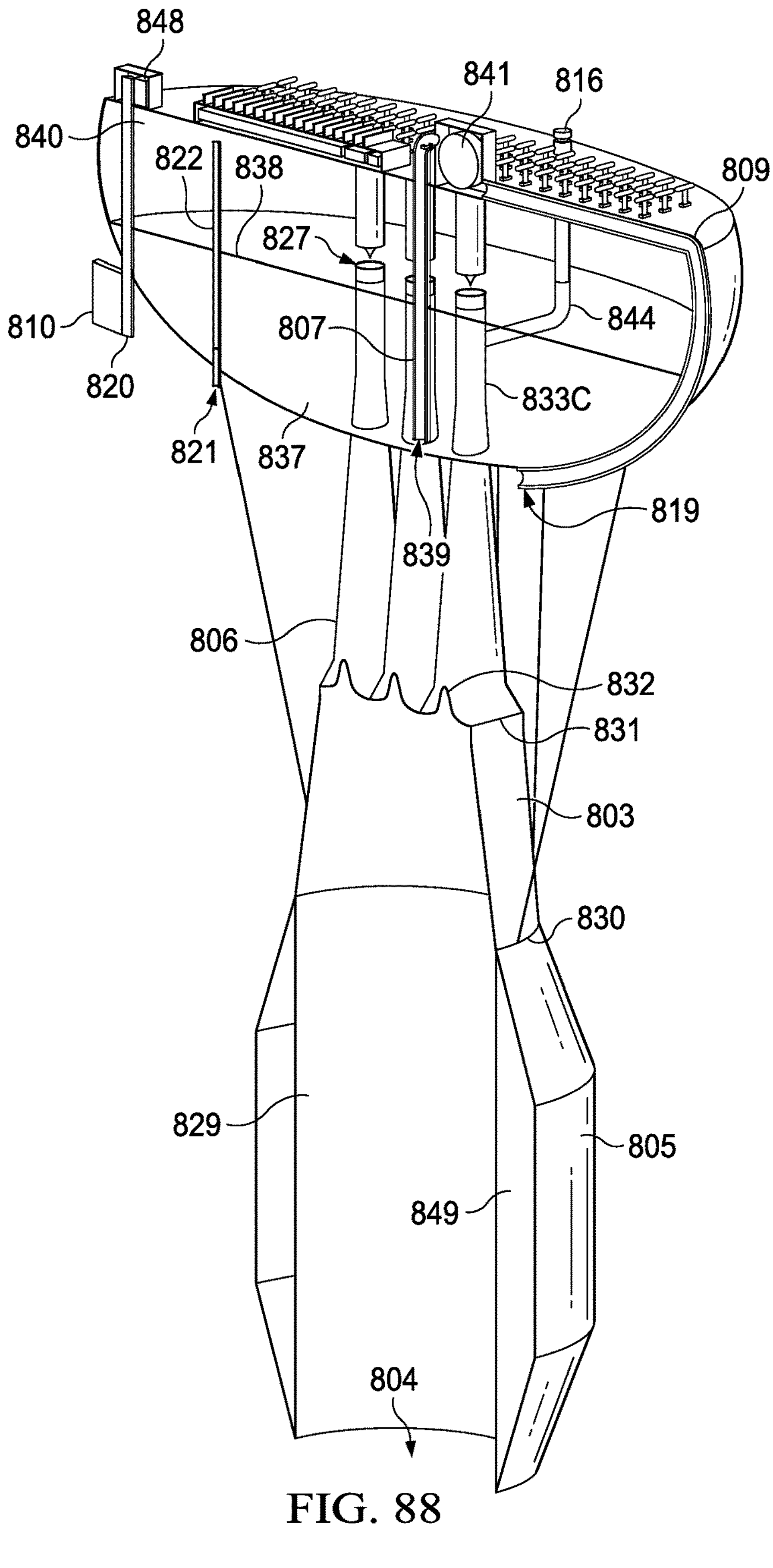
FIG. 88 is a side perspective of the same sectional view illustrated in FIG. 87.

When the air intake valve (816 in FIGS. 85 and 88) is open, air is periodically and/or occasionally drawn from the atmosphere outside the embodiment and into and through air intake pipe 844 (positioned behind, and partially obscured by, tapered channel 833C and its respective diverter, with respect to the illustration in FIG. 87, and more easily seen in FIG. 88) and thereafter drawn out of the air intake pipe and into the stream of water flowing upward within the upper portion of conical tubular segment 833C. The Venturi effect associated with the acceleration of water within the conical tubular segments 806 reduces the lateral and/or static pressure of that accelerated water, thereby facilitating its drawing in, and/or intake, of air from the atmosphere. The opening of the air intake valve (816 in FIGS. 85 and 88) allows the embodiment's control system to raise the pressure of the air within the embodiment's air pocket 840. If too much air is drawn in through the air intake valve, the excess air within the interior of the hollow flotation module 802 will vent to the body of water through pressure-relief pipe 822.

Within electronics enclosure 813 are included (without limitation): computing devices and circuits 845: energy storage devices 846: and radio communications devices, transceivers, navigational devices, and the embodiment's control system 847.

The orientation of the embodiment's rudder 810, and the shaft 820 to which it is affixed, are adjusted and controlled by the rudder control mechanism 811 and a motor 848 therein, which, in turn, are controlled by the embodiment's control system 847.

The annular tube ballast chamber 805 contains a sealed space 849 that is filled with water. Other embodiments of this disclosure utilize different materials, and/or different relative locations, to supplement the ballast, and/or to adjust the natural frequencies, of those embodiments.

In some embodiments of this disclosure, the tube ballast chamber 849 contains perforations in its walls 805, especially at uppermost and lowermost portions (e.g. near seam 830 and near mouth 804), to facilitate the flooding of the chamber during initial deployment. Said perforations can allow air trapped inside the tube ballast chamber to exit (e.g. from perforations at an uppermost portion of the chamber), and allow water to flood into the chamber (e.g. from perforations at a lowermost portion of the chamber). Similar perforations can be provided in all embodiments of this disclosure that utilize a water ballast.

An embodiment similar to the one illustrated in FIG. 87, includes an air pump positioned on or within embodiment's hollow flotation module 802. The air pump is connected to the tube ballast chamber (e.g., to an upper portion of the tube ballast chamber) by an airline and/or tube such that, when activated by the embodiment's control system, the air pump sends compressed air through the airline and into the tube ballast chamber where it displaces a portion of the water therein. This embodiment includes an aperture in a lower portion of the tube ballast chamber wall so that water displaced from the tube ballast chamber through the introduction of pressurized air can escape to the body of water on which the embodiment floats. After pumping a desired and/or requisite volume and/or mass of air into the chamber, a valve on the pump and/or airline is closed thereby preventing the air added to the tube ballast chamber from escaping. If additional ballast is desired, the valve on the pump and/or airline may be opened causing some or all of the air within the tube ballast chamber to escape back to the atmosphere, thereby drawing additional water back into the tube ballast chamber through the aperture in the lower portion of the tube ballast chamber wall. By venting some or all of the added air from the tube ballast chamber, and thereby drawing water back into that chamber, inertia is added to the ballast and to the embodiment.

FIG. 88 shows a side perspective of the same sectional view illustrated in FIG. 87.

Figure 89:
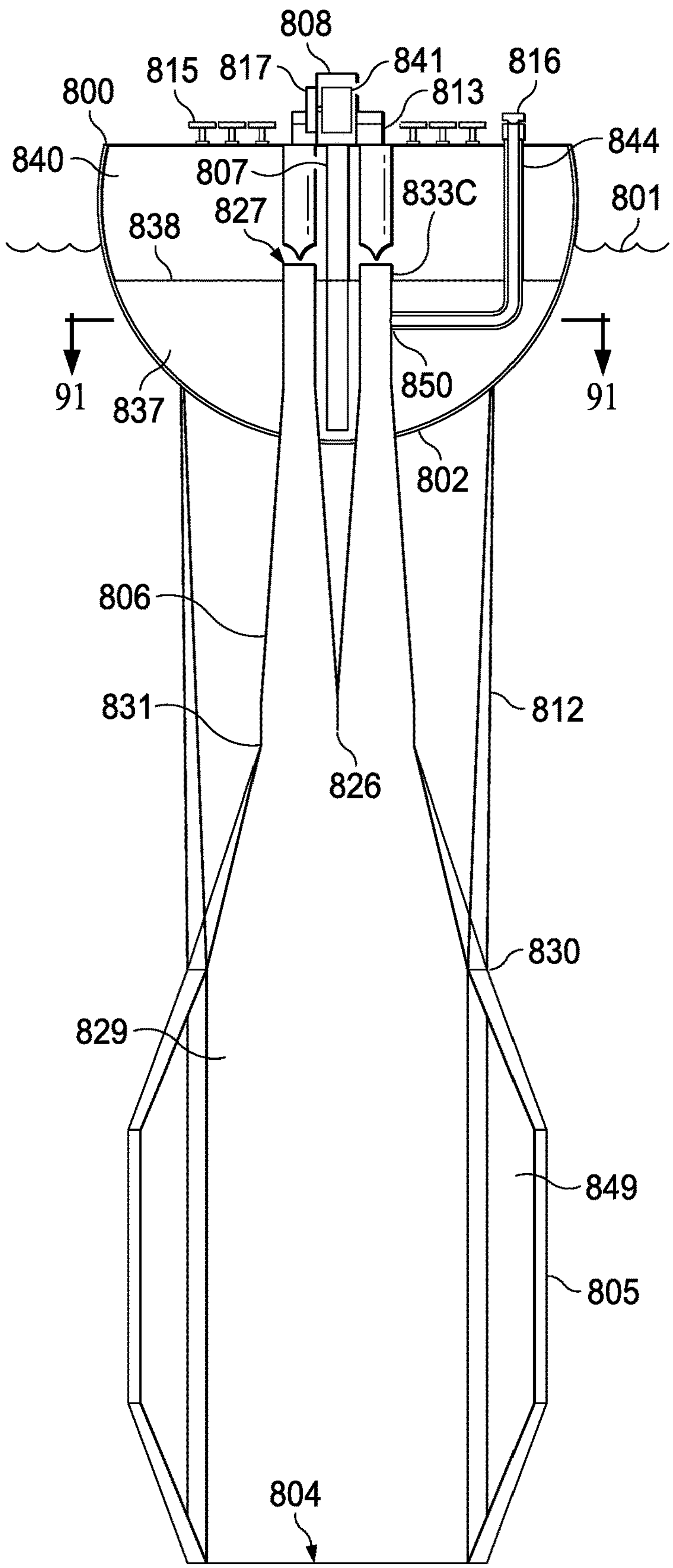
FIG. 89 is a side sectional view of the embodiment of FIGS. 80-88.

FIG. 89 shows a side sectional view of the same embodiment of the current disclosure that is illustrated in FIGS. 80-88, where the section is taken along the section line 89-89 specified in FIG. 85.

When air intake valve 816 is open, the suction created by a Venturi effect associated with the movement of water through constricting pipe 833C draws atmospheric air in through the air intake valve, and through the connected air intake pipe 844, after which a portion of the air passes through aperture 850 and into the stream of water flowing upward through conical tubular segment 833C. Air so drawn into the interior of the embodiment's hollow flotation module 802 will be trapped therein until and unless the pressure of that trapped air exceeds the level needed to overcome the hydrostatic pressure at the bottom mouth of the pressure-relief pipe (822 in FIG. 87) after and during which a portion of the air from within the embodiment's air pocket 840 will vent into the body of water 801 on which the embodiment floats, and thereafter will rejoin the atmosphere around and outside the embodiment.

Note that in this embodiment, there is little or no "permanent buoyancy" provided, i.e. there are no large hermetically sealed volumes whose average density is lower than that of water. Instead, the buoyancy of the embodiment is provided by a pocket of air 840 inside the hollow flotation module 802. In other words, the average internal water level 838 tends to be vertically lower than the average external water level 801.

Figure 90:
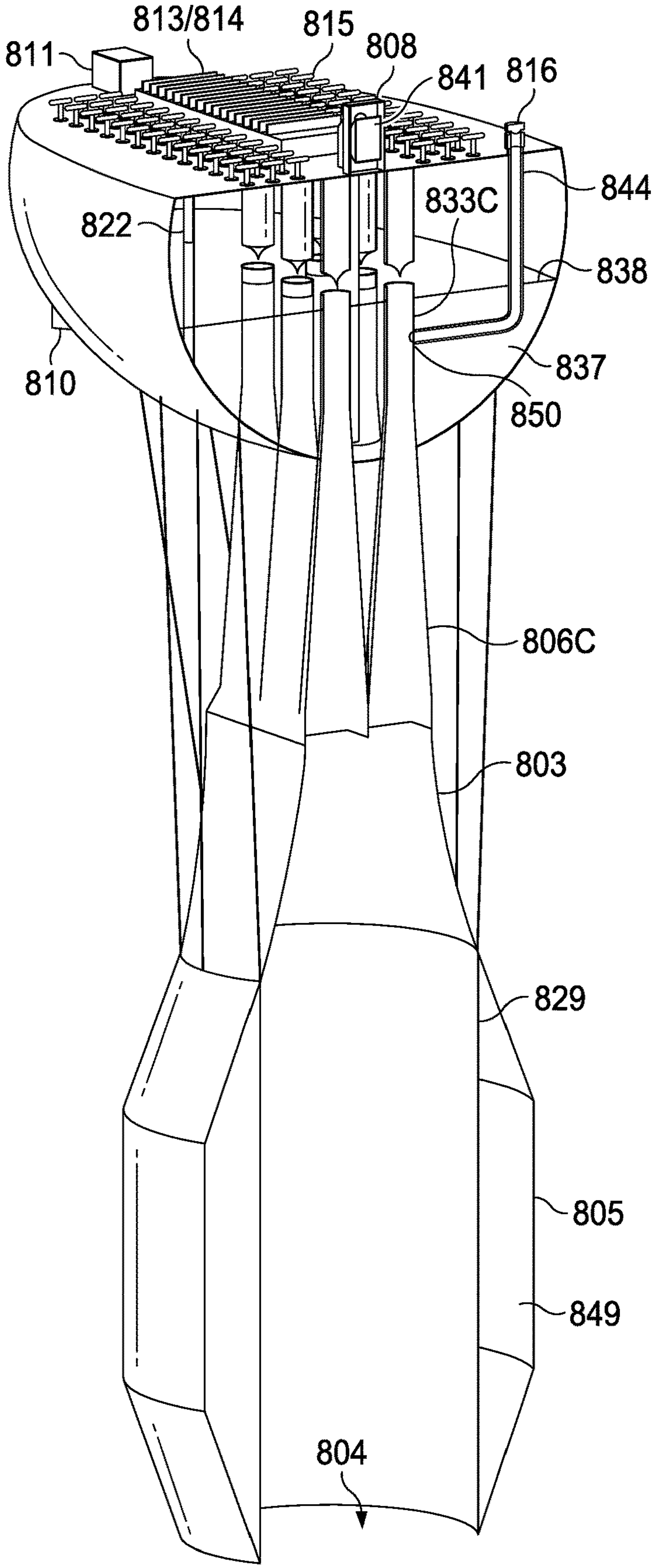
FIG. 90 is a side perspective of the same sectional view illustrated in FIG. 89 where water outside the embodiment and inside the embodiments inertial water tube has been omitted.

FIG. 90 shows a side perspective of the same sectional view illustrated in FIG. 89 where water outside the embodiment and inside the embodiment's inertial water tube has been omitted.

Figure 91:
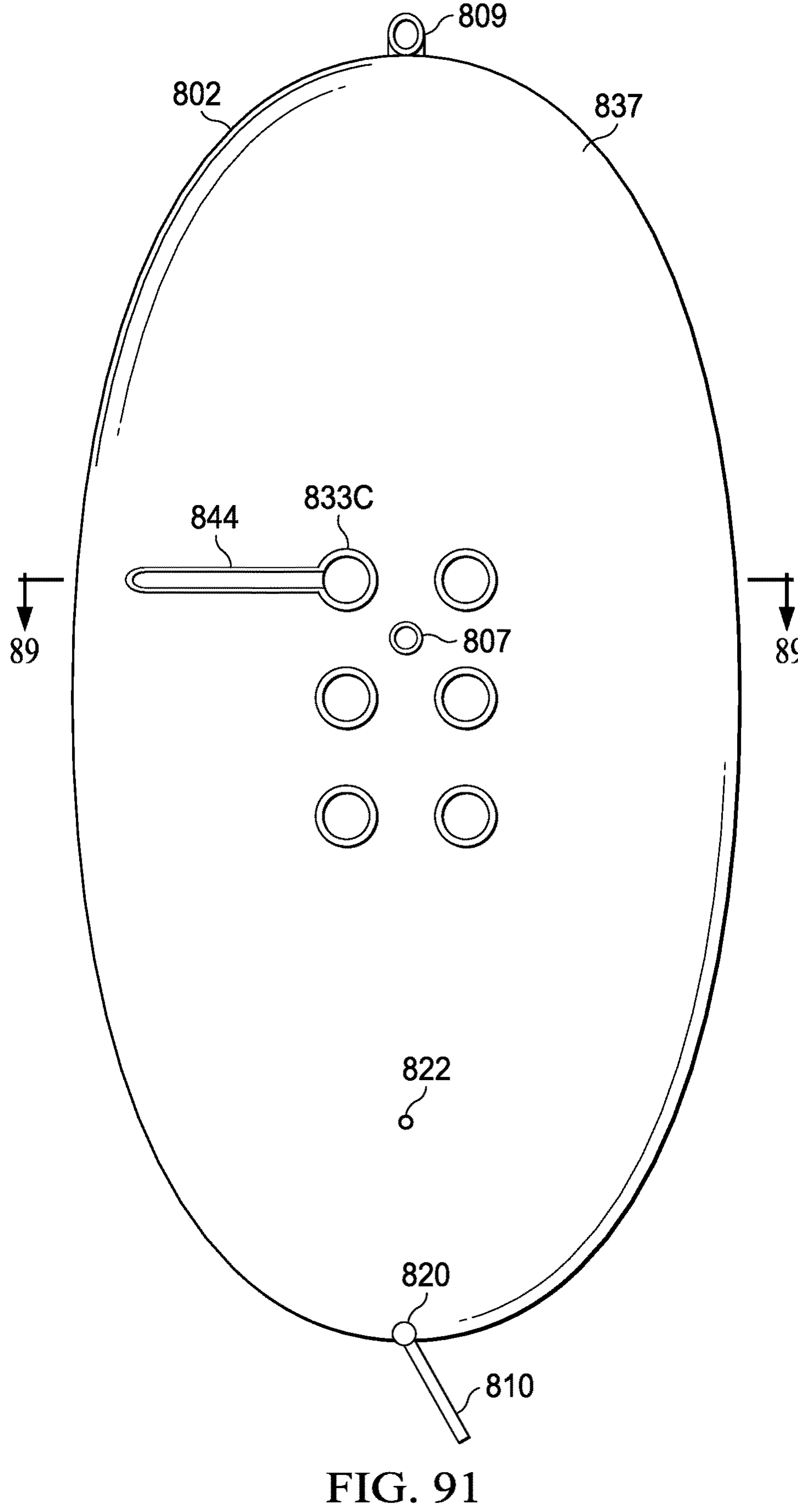
FIG. 91 is a top-down sectional view of the embodiment of FIGS. 80-90, where the section is taken along the section line 91-91 specified in FIG. 89.

FIG. 91 shows a top-down sectional view of the same embodiment of the current disclosure that is illustrated in FIGS. 80-90, where the section is taken along the section line 91-91 specified in FIG. 89.

Figure 92:
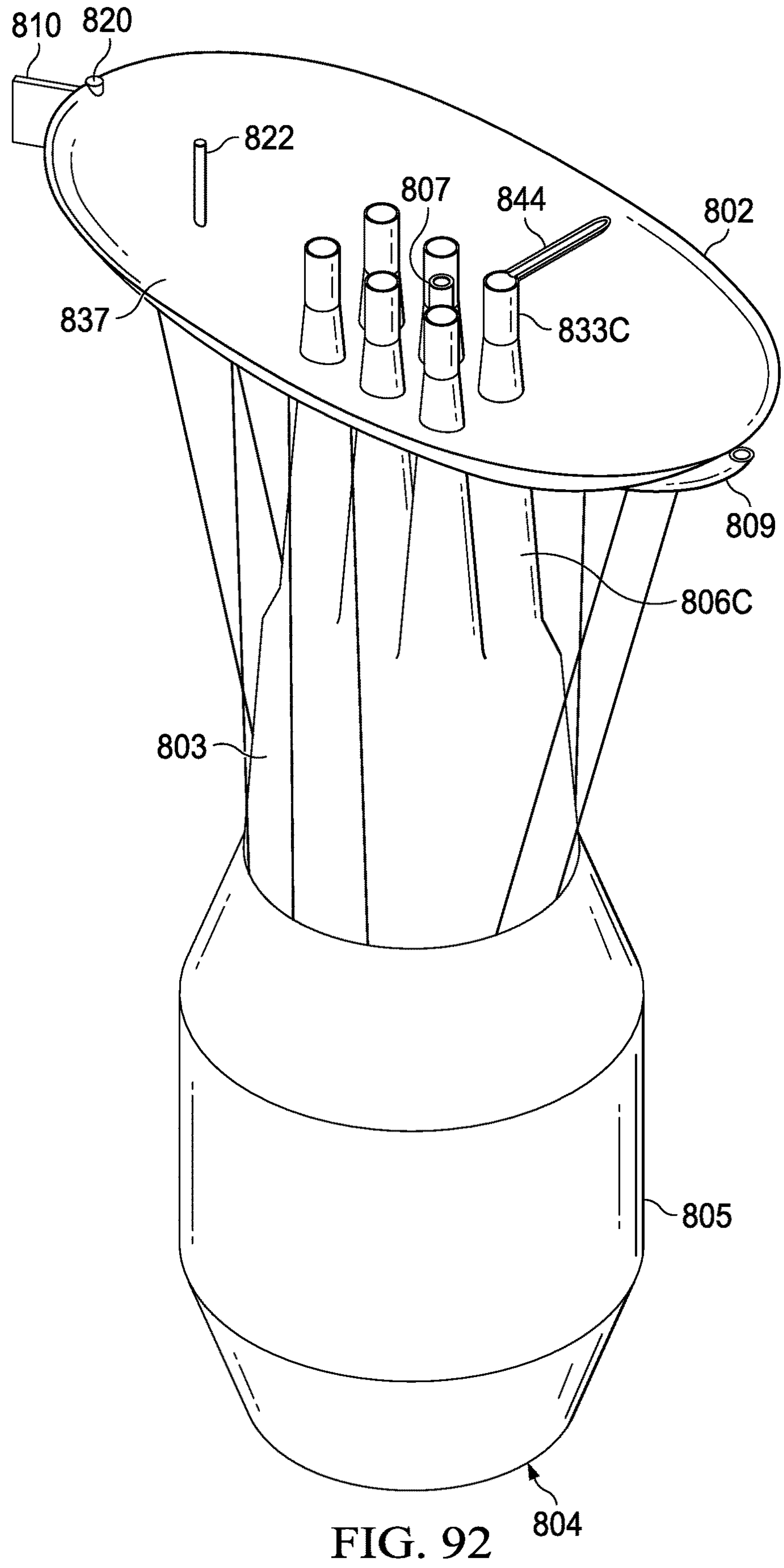
FIG. 92 is a side perspective of the same sectional view illustrated in FIG. 91 wherein the water inside and outside the embodiment has been omitted.

FIG. 92 shows a side perspective of the same sectional view illustrated in FIG. 91 wherein the water inside and outside the embodiment has been omitted.

Figure 93:
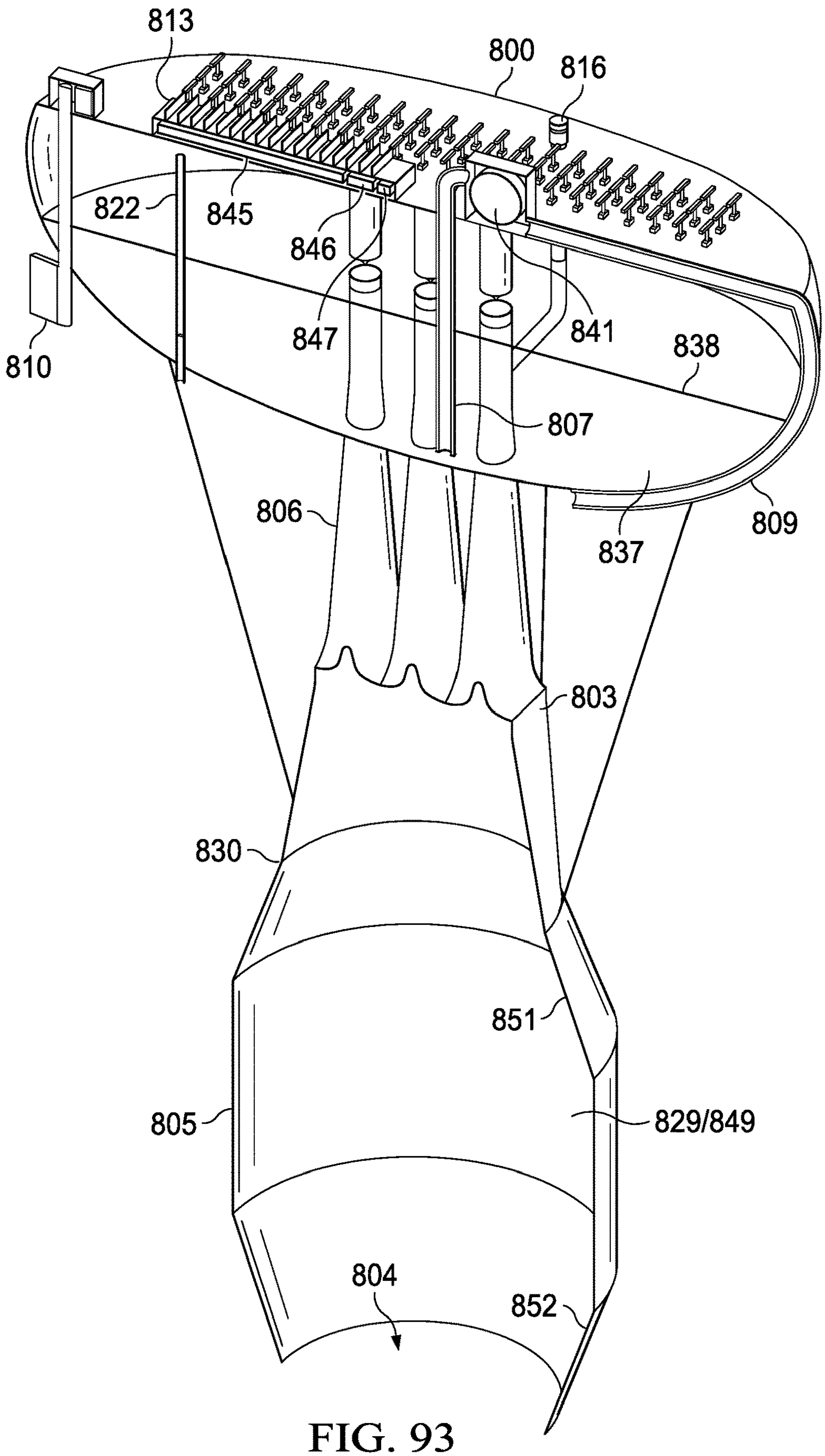
FIG. 93 is a same perspective sectional view illustrated in FIG. 88.

FIG. 93 shows the same perspective sectional view illustrated in FIG. 88, but of a modified configuration of that embodiment. The configuration of the modified embodiment illustrated in FIG. 93 has been altered (relative to the embodiment illustrated in FIGS. 80-92) so as to eliminate the internal cylindrical tube wall (829 in FIG. 88) that separates the lower portion (829 in FIG. 88) of the inertial water tube of the original embodiment from the sealed tube ballast chamber 805 of that embodiment, and from the entrained water-filled ballast (849 in FIG. 88) therein.

The altered embodiment configuration illustrated in FIG. 93 removes the wall (829 in FIG. 88) that separates the water flowing through the lower portion (829 in FIG. 88) of the inertial water tube from the water (849 in FIG. 88) trapped within the tube ballast chamber with respect to the embodiment configuration illustrated in FIG. 88. The altered embodiment configuration of FIG. 93 still encloses an equivalent volume and mass of water, as does the tube ballast of the embodiment configuration illustrated in FIG. 88, because, with respect to the configuration illustrated in FIG. 93, the upper 830 and lower 804 mouths of the expanded lower tube segment 805 have flow-normal cross-sectional areas corresponding to the tube channel 829 of the embodiment configuration illustrated in FIG. 88.

In other words, with respect to the embodiment configuration illustrated in FIG. 93, water may only flow into and out of the tube segment 805 through apertures or mouths 830 and 804, the flow-normal cross-sectional areas of which are unchanged, and therefore a portion of the water within the bulbous and non-cylindrical portion of the tube channel 829/849 is inhibited from freely flowing out of that tube segment, and is instead, at least to a degree, obstructed by the upper and lower frusto-conical walls 851 and 852, respectively, and must therefore accelerate, and/or be accelerated, in synchrony with the tube segment 805, thereby effectively adding its inertia to that of the embodiment, and effectively behaving as ballast, although not as effectively as the more completely enclosed tube ballast (849 in FIG. 88).

Figure 94:
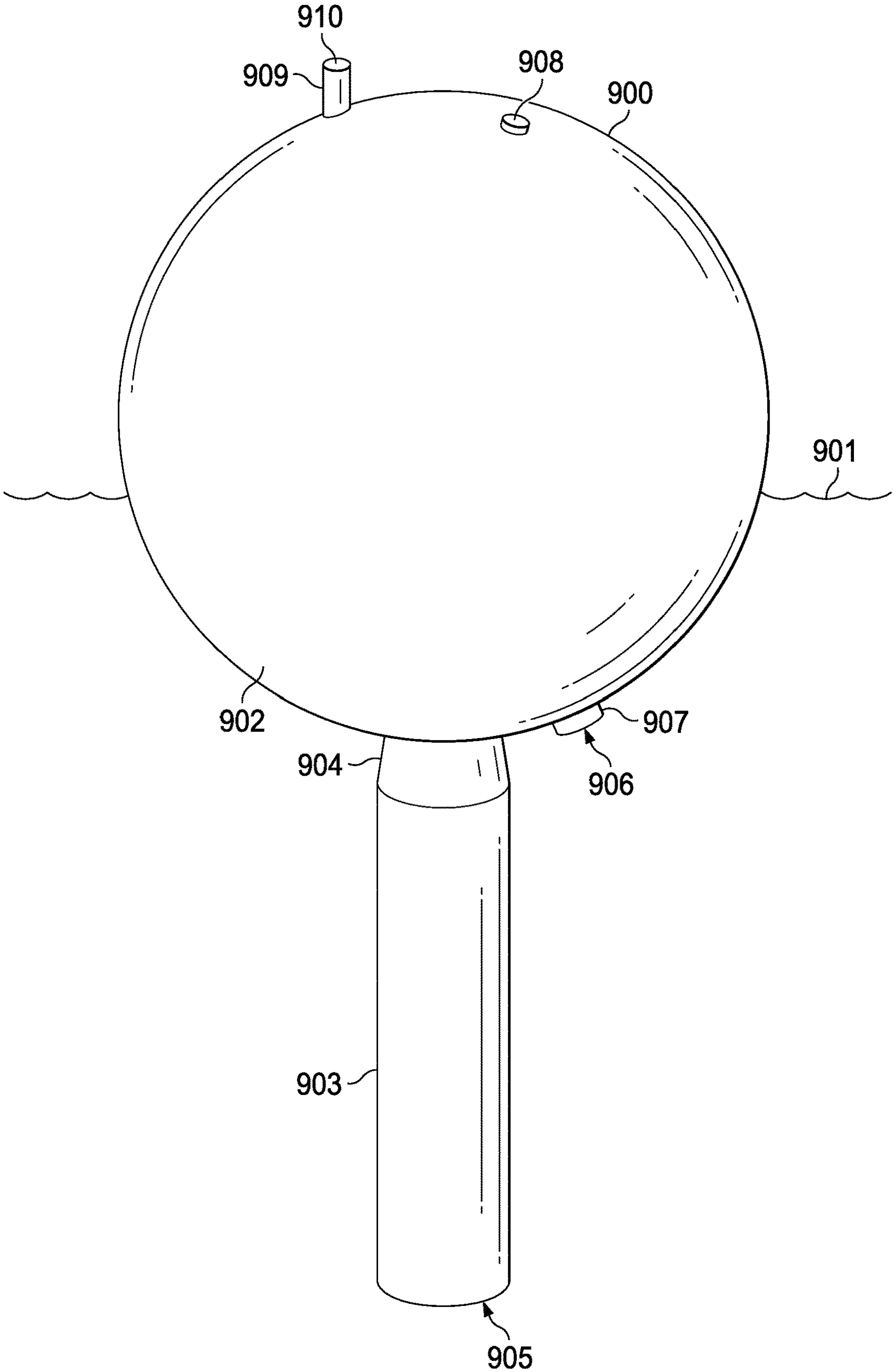
FIG. 94 is a side perspective view of another embodiment of the present invention.

FIG. 94 shows a side perspective view of an embodiment of the current disclosure.

The embodiment 900 floats adjacent to a surface 901 of a body of water. The embodiment 900 comprises a buoyant, and approximately spherical, buoy 902 that floats at the surface 901 of a body of water, and a depending hollow inertial water tube 903, an upper portion 904 of which is tapered and approximately frustoconical. As the embodiment moves up and down in response to passing waves, water within the depending tube 903-904 tends to move up and down relative to the embodiment and not in phase with the embodiment, due in part to excitation by the tapered upper portion 904 of water tube 903. As water within the inertial water tube 903-904 moves up and down relative to the embodiment, water tends to enter and exit the inertial water tube, through a lower mouth 905 at a lower end of the inertial water tube 903, in an oscillating fashion though with a net upward water transport. Moreover, as water within the inertial water tube 903-904 moves up and down relative to the embodiment, water from within the inertial water tube is periodically ejected from an upper mouth (not visible) of the inertial water tube and deposited within the hollow interior of the embodiment's buoy 902, at an average rate of ejection corresponding to the net upward water transport.

As water is deposited within the buoy 902, air therein is compressed. When the volume, height, and/or level of the water within the buoy 902 is sufficient, and/or the pressure of the air trapped within the buoy 902 is sufficient, the pressure of the water within a bottom part and/or portion of the buoy's hollow interior can reach and/or surpass a threshold pressure, and water from within the buoy 902 will be forced out of the buoy 902 through an aperture, mouth, conduit, and/or portal 906. In the embodiment illustrated in FIG. 94, the effluent aperture 906 is at the end of a short effluent pipe or conduit 907. In similar embodiments, the effluent aperture 906 is found directly within the wall of the buoy 902. In other similar embodiments, the effluent aperture 906 can be at the end of a conduit or pipe connecting an interior of the buoy to the surrounding body of water.

A water turbine (not visible) adjacent to the effluent aperture, and/or fully or partially within the channel defined by effluent pipe 907, is caused to rotate by the outflow of water through the respective effluent aperture 906 and/or effluent pipe 907. The water turbine is operatively connected to a generator (not visible), and outflowing-water-driven rotations of the water turbine cause the generator to generate electrical power.

In this manner, the pumping action of the embodiment creates a pressurized reservoir or accumulator within the buoy (upper hull enclosure) of the embodiment, which is drained in a relatively constant fashion to supply power to a turbine.

A portion of the electrical power generated by the embodiment's generator (not visible) may be used to energize radio communications equipment and/or circuits (not shown), including, but not limited to, phased array antennas. A portion of the electrical power generated by the embodiment's generator may be used to energize computing circuits (not shown) that perform, execute, and/or complete, computational tasks received by the embodiment through encoded radio transmissions, and/or by other means. A portion of the electrical power generated by the embodiment's generator may be used to energize propulsion devices (not shown) that may propel the embodiment in desired directions, and/or to desired locations.

An actuated valve 908 positioned at an upper portion of the buoy 902 can release air from within the buoy 902 so as to reduce the pressure therein. The valve 908 may be actuated directly in response to a sufficient pressure of the air within the buoy 902 being reached or exceeded, and/or it may be activated by the embodiment's electronic or fluidic control system (not shown) (i.e. the valve may be controlled as the result of analog or digital operations performed by fluidic logic gates and/or fluidic amplifiers).

A pressure relief pipe 909 ejects water from within the buoy 902 when the volume, height, level, and/or head pressure of that water, combined with the pressure of the air adjacent to that water, imparts to the water sufficient pressure to reach, exceed, and/or overcome the height of the upper mouth and/or aperture 910 of the pressure relief pipe 909.

Figure 95:
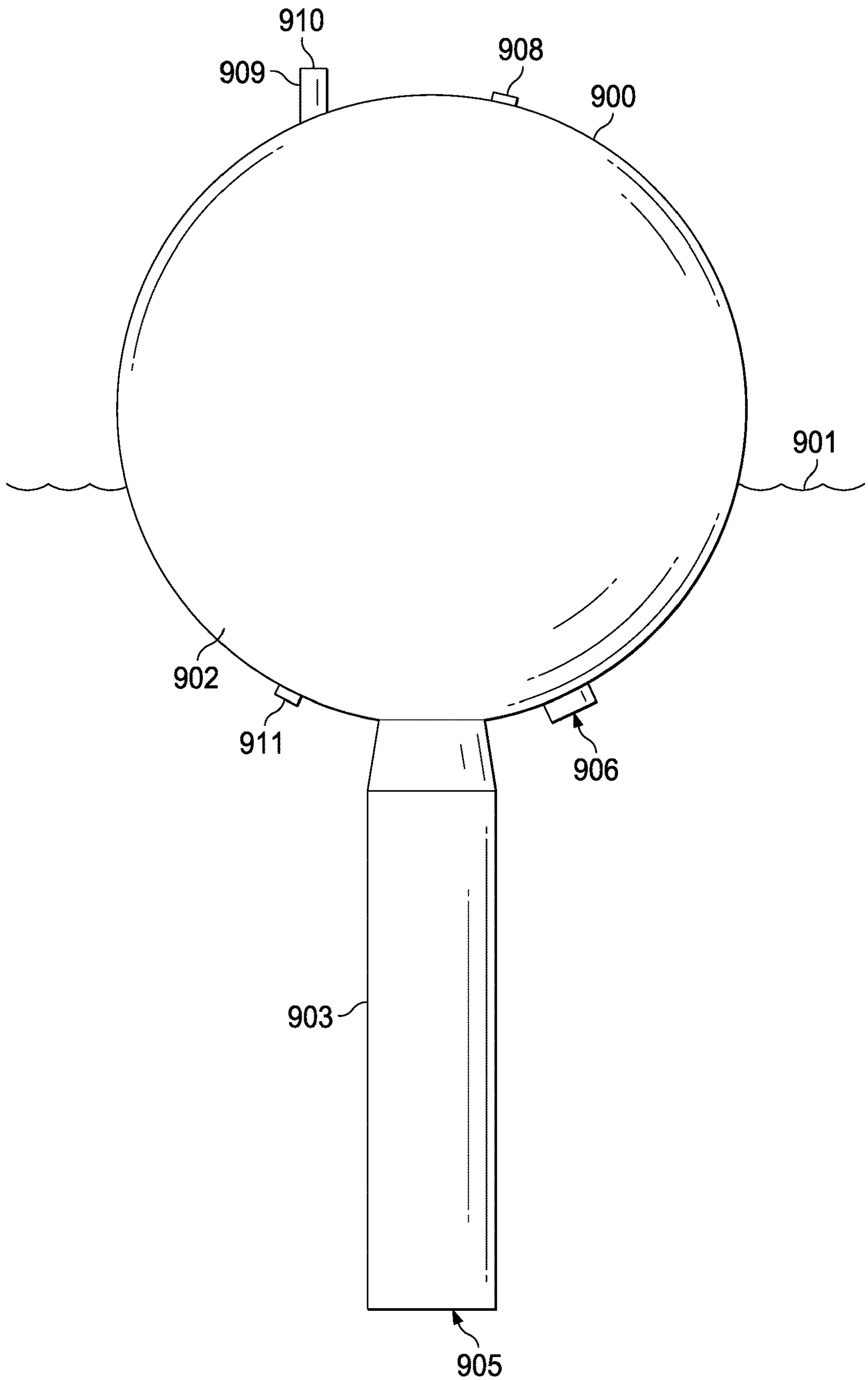
FIG. 95 is a left-side view of the embodiment of FIG. 94.

FIG. 95 shows a left-side view of the same embodiment of the current disclosure that is illustrated in FIG. 94.

An actuated valve 911 positioned at a lower portion of the buoy 902 can release water from the interior of the buoy so as to reduce the volume, height, level, and/or pressure of the air and/or water therein. The valve 911 may be actuated directly in response to a sufficient pressure of the water within the buoy 902 being reached and/or exceeded, and/or it may be activated by the embodiment's control system (not shown).

Figure 96:
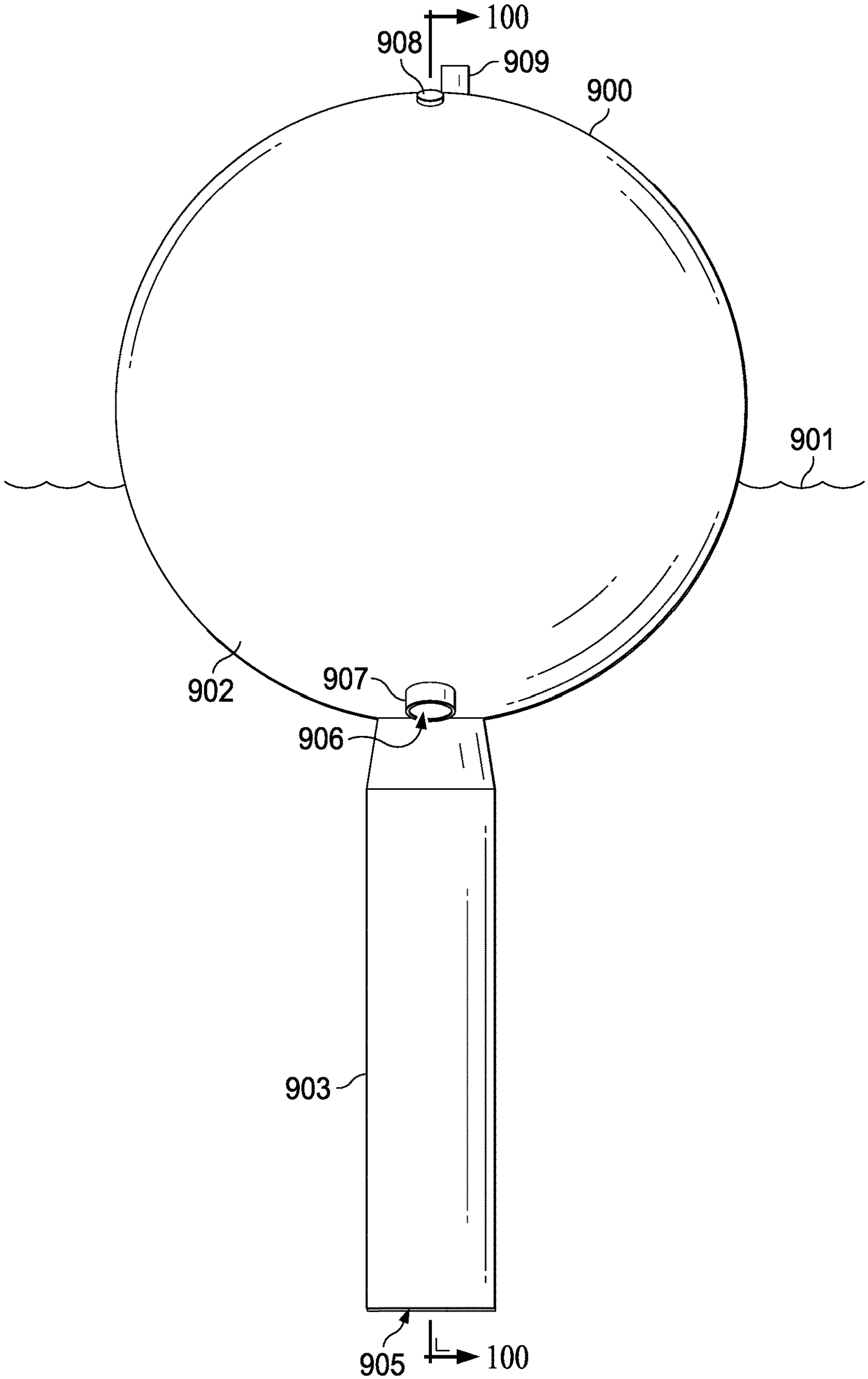
FIG. 96 is a back-side view of the embodiment of FIGS. 94 and 95.

FIG. 96 shows a back-side view of the same embodiment of the current disclosure that is illustrated in FIGS. 94 and 95.

Figure 97:
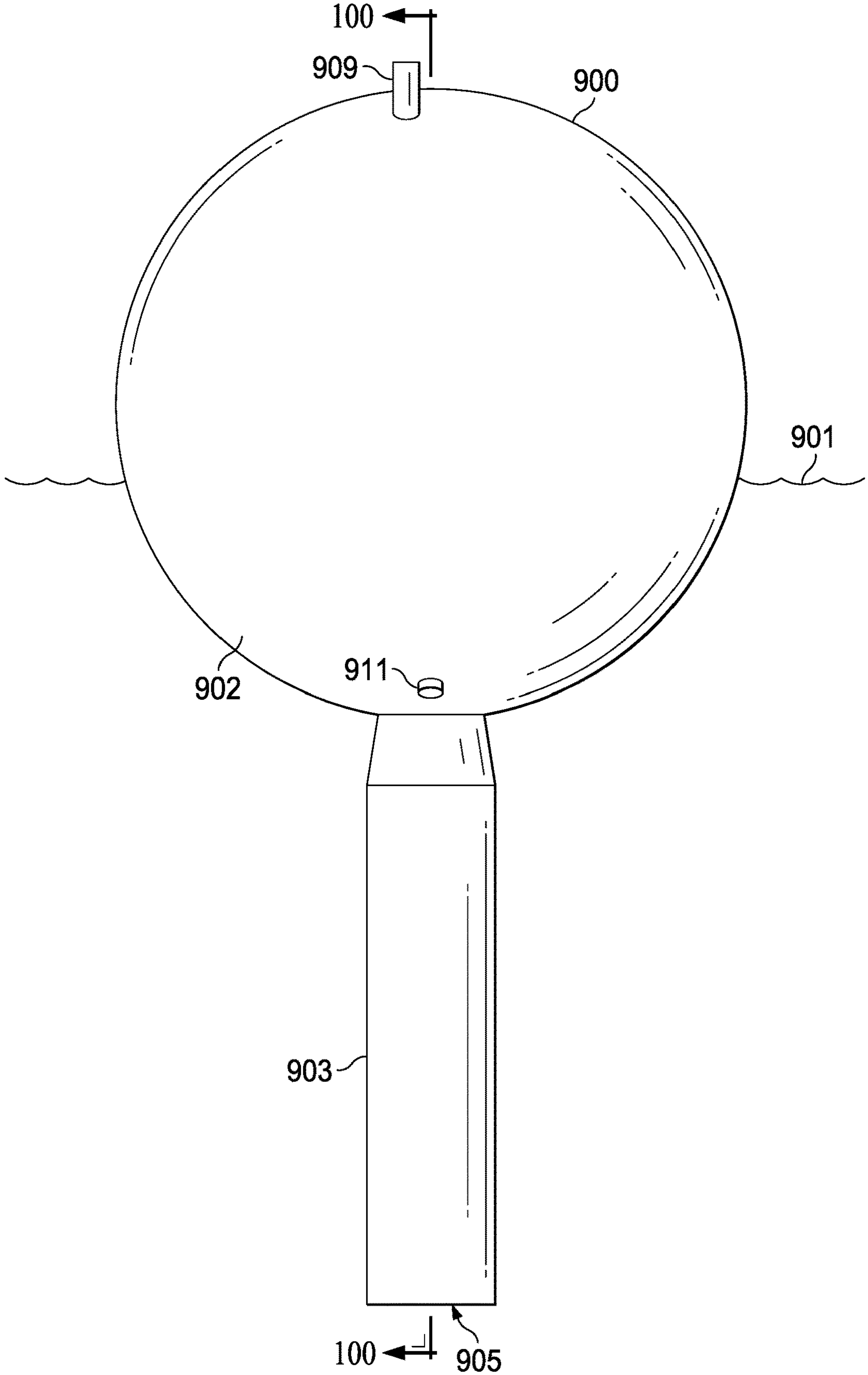
FIG. 97 is a front-side view of the embodiment of FIGS. 94-96.

FIG. 97 shows a front-side view of the same embodiment of the current disclosure that is illustrated in FIGS. 94-96.

Figure 98:
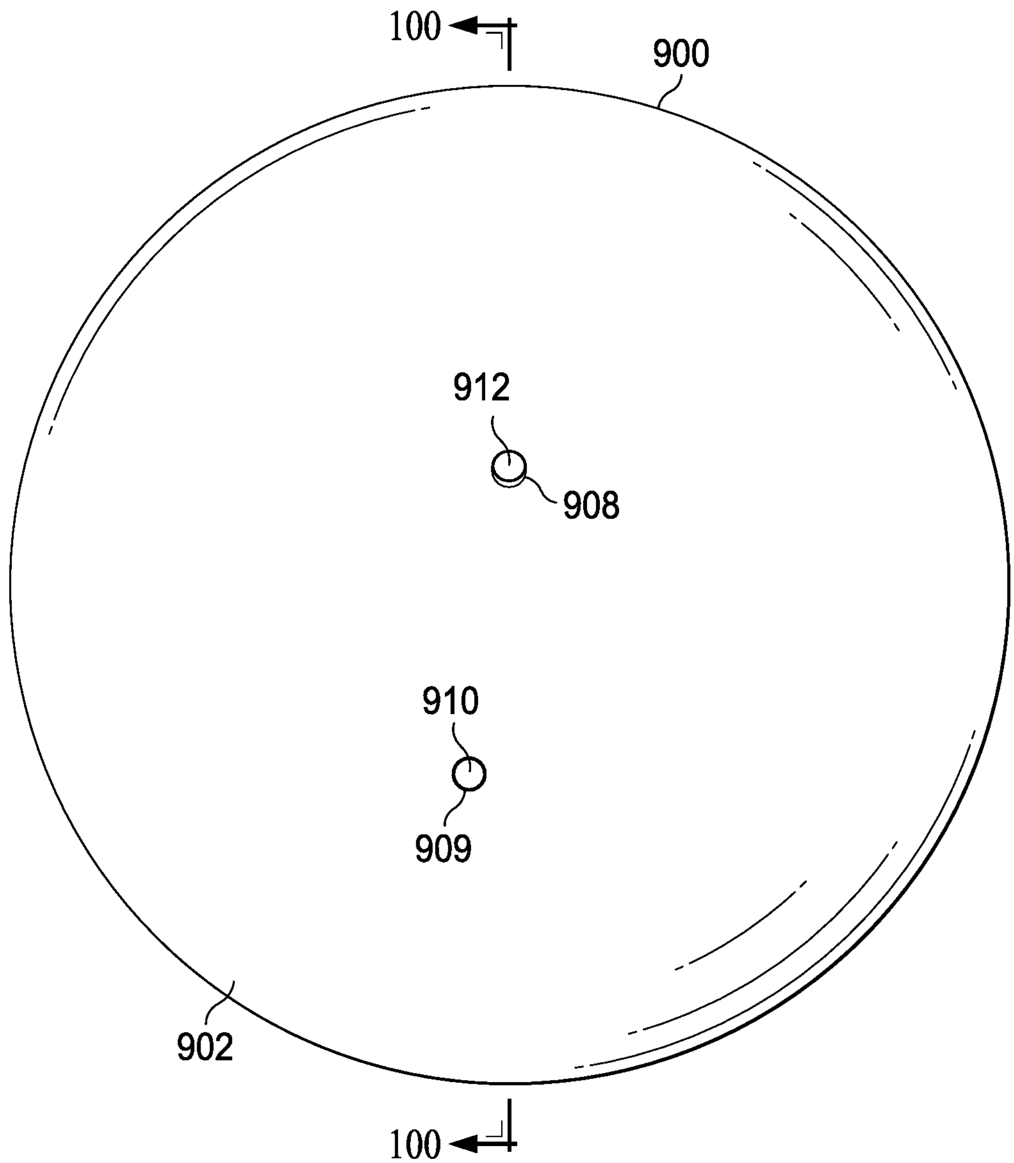
FIG. 98 is a top-down view of the embodiment of FIGS. 94-97.

FIG. 98 shows a top-down view of the same embodiment of the current disclosure that is illustrated in FIGS. 94-97.

Pressure-relief pipe 909 has an upper mouth and/or aperture 910 through which water flows out from the interior of the buoy 902 to the outside of the embodiment if and when the pressure of that water is sufficient to lift the water past the upper aperture 910.

Actuated pressure-relief valve 908 has an upper aperture 912 through which air flows out from the interior of the buoy 902 to the atmosphere outside the embodiment when activated by, and/or in response to, the air pressure within the buoy 902 reaching and/or exceeding a specific threshold pressure, a threshold pressure dynamically determined by the embodiment's control system (not shown), and/or by the embodiment's control system for another reason, such as to adjust the level, volume, and/or mass of the water within the buoy 902, and the inertia therein, thereby adjusting the embodiment's waterline and waterplane area, which in turn tends to adjust and/or alter the sensitivity of the embodiment to the ambient wave energy.

Figure 99:
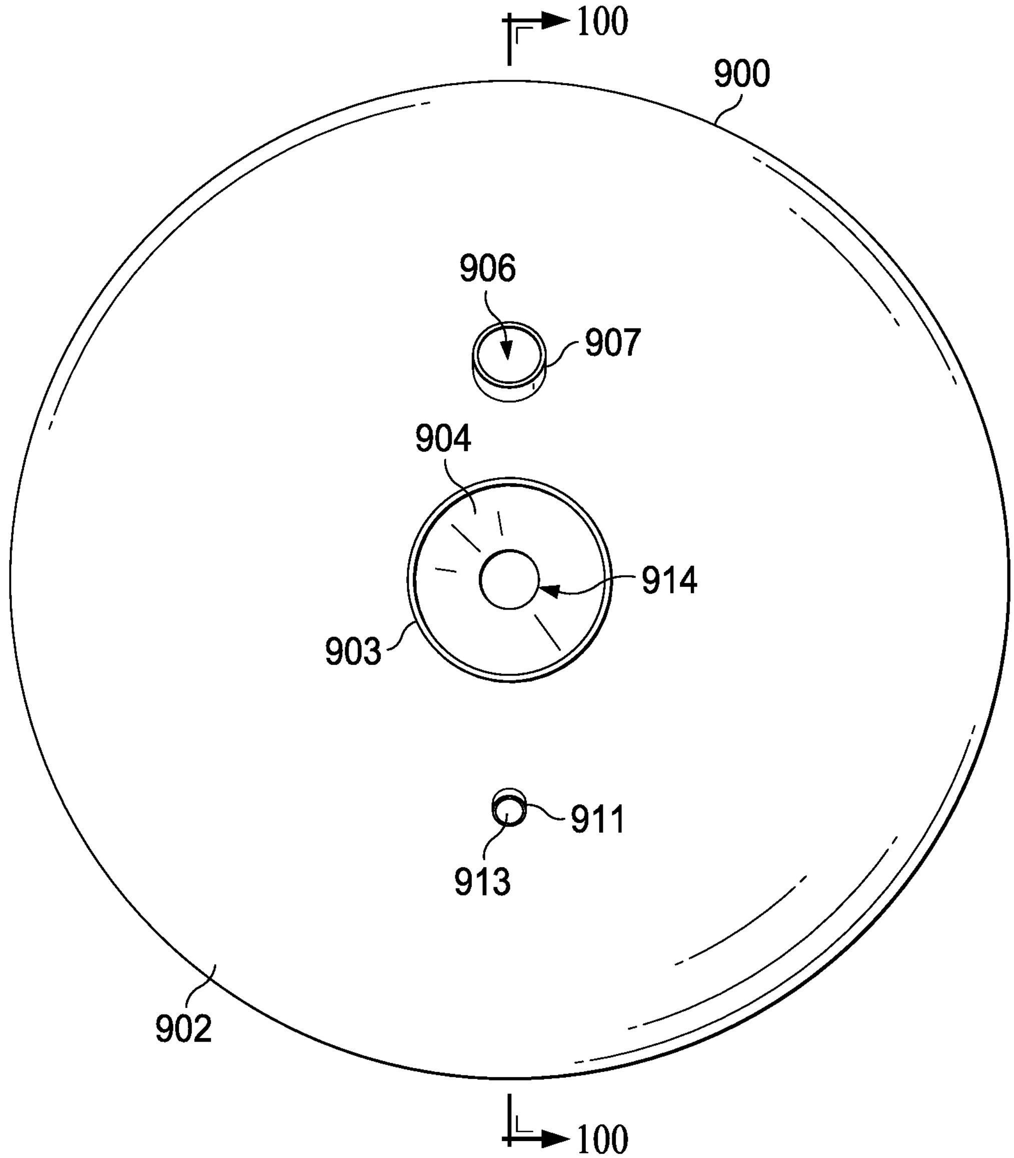
FIG. 99 is a bottom-up view of the embodiment of FIGS. 94-98.

FIG. 99 shows a bottom-up view of the same embodiment of the current disclosure that is illustrated in FIGS. 94-98.

Water within the buoy 902 flows out through effluent pipe 907 and/or effluent mouth 906 thereby causing a water turbine therein to rotate, and causing an operatively connected (not visible) generator to generate electrical power.

Actuated pressure-relief valve 911 has a lower aperture 913 through which water flows out from the interior of the buoy 902 to the body of water (901 in FIG. 94) on which the embodiment floats when that valve is activated and/or opened by the water pressure within the buoy 902 reaching and/or exceeding a threshold pressure, a threshold pressure dynamically determined by the embodiment's control system (not shown), and/or by the embodiment's control system for another reason, such as to adjust the level, volume, and/or mass of the water within the buoy 902, thereby adjusting the embodiment's waterline and waterplane area, which in turn tends to adjust and/or alter the sensitivity of the embodiment to the ambient wave energy.

Water moving up and down within inertial water tube 903 is periodically ejected from the tube's upper mouth 914 inside the buoy 902 and is thereafter deposited within the interior of the buoy 902. The constricting portion 904 of the inertial water tube tends to impart a pressure to and excite the water in the interior of the constricting portion when the embodiment is moving downwardly, and amplify the speed and momentum of the water rising up from the approximately cylindrical portion 903 of the inertial water tube, and thereby tends to cause the water ejected from the upper mouth 914 of the inertial water tube to achieve a height and/or head higher than the mean waterline of the embodiment with respect to the surface (901 in FIG. 94) of the body of water on which the embodiment floats before that ejected water falls within the buoy's interior and/or is added to the embodiment's water reservoir within the buoy's interior.

Figure 100:
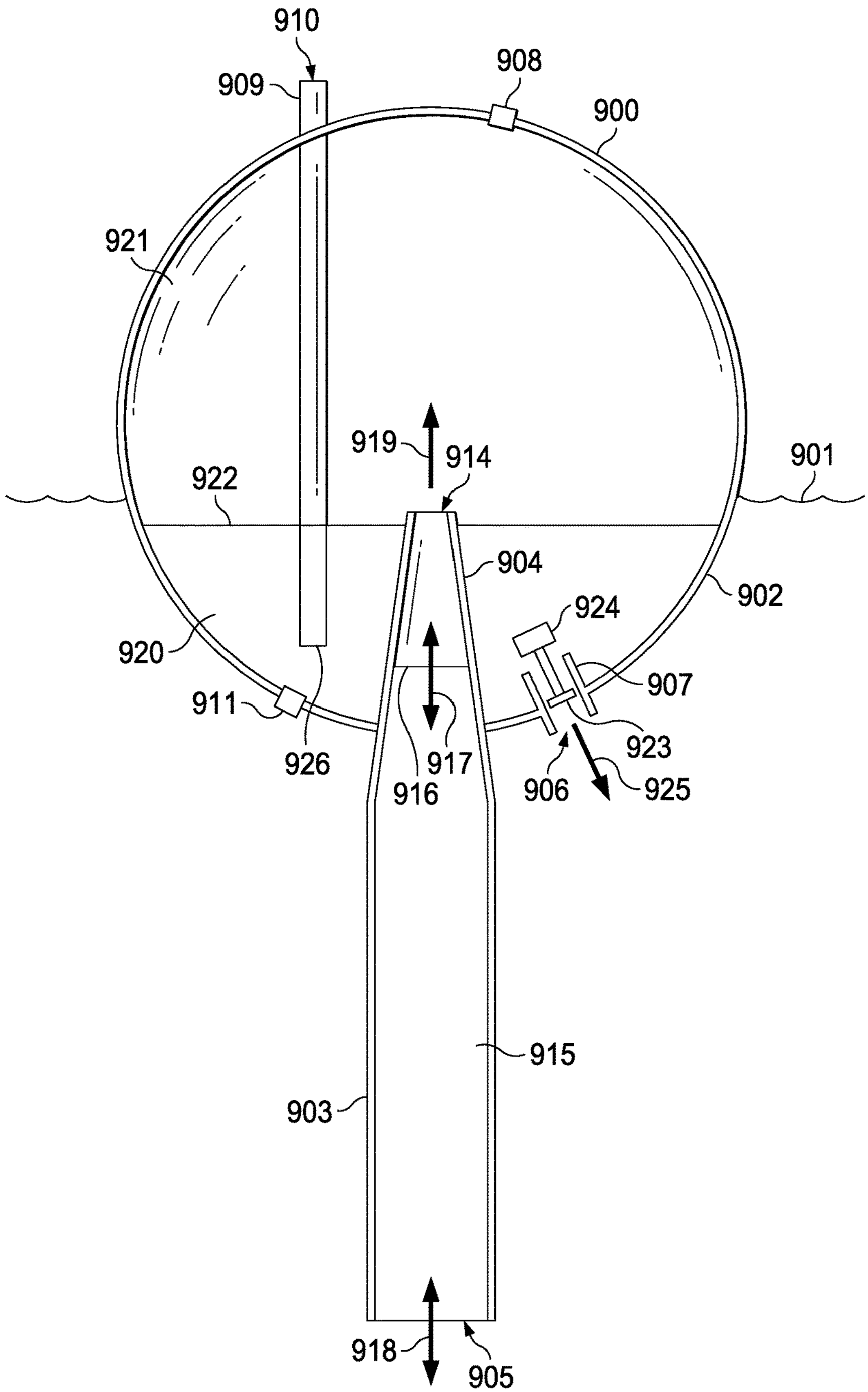
FIG. 100 is a side sectional view of the embodiment of FIGS. 94-99.

FIG. 100 shows a side sectional view of the same embodiment of the current disclosure that is illustrated in FIGS. 94-99, where the section is taken along the section line 100-100 specified in FIGS. 96-99.

As the embodiment 900 moves up and down in response to waves moving across the surface 901 of the body of water on which the embodiment floats, water 915 within the embodiment's inertial water tube 903, with an upper surface 916, tends to move 917 up and down relative to the tube's upper mouth 914, and it tends to move 918 up and down relative to the tube's lower mouth 905, with a net or average upward movement.

The interior of constricting portion 904 of inertial water tube 903 constitutes an interior wall defining a liquid pressurizing surface that can impinge upon and increase the pressure of water inside the tube (adjacent to that wall) when the embodiment moves downwardly relative to the water inside the water tube. The constricting portion 904 of inertial water tube 903 excites the water inside the inertial water tube, causing it to oscillate. Periodically, due in part to increases in pressure created by the constricting portion 904 and/or due to the oscillation of the water inside the tube excited by the constricting portion 904, a portion of the water within the inertial water tube rises above the inertial water tube's upper mouth 914 and is ejected 919 from the tube after which it falls into the hollow chamber 921 and/or interior within the buoy 902, and is thereby added to a reservoir and/or pool 920 of water within the hollow interior of the buoy 902. As water is added to the reservoir 920 the volume of the air 921 trapped within the buoy 902 is reduced, thereby compressing that air, and the pressure of that air 921 is increased. If the height, level, and/or upper surface 922 of the reservoir of water 920 within the buoy 902 rises to a height that exceeds the height of the tube's 903 upper mouth 914, then water from the water reservoir 920 will flow back into the tube 903 and be added to the water 915 therein until the upper surface 922 of the water reservoir is no greater than that of the tube's upper mouth 914. Although this embodiment does not have a feature that laterally diverts the water ejected from tube 903, the pitching and rolling motions of the embodiment can cause the water ejected from tube 903 to nonetheless fall into the reservoir of water 920 rather than to fall straight back down into the inertial water tube 903 and thereby rejoin the water 915 from which it was briefly separated.

The combination of the height, level 922, and/or head pressure of the water 920, and the pressure of the air 921, trapped within the buoy 902 tends to propel water from the water reservoir 920 through effluent pipe or conduit 907 where the flowing water engages and tends to rotate the water turbine 923, thereby energizing the generator 924. After flowing and/or passing through the water turbine 923, the water flows through effluent aperture 906, and thereby flows 925 back into the body of water 901 from which it was captured, and on which the embodiment floats.

Water from the reservoir 920 enters pressure-relief pipe 909 through its lower mouth 926. And if and when the pressure of the water within the water reservoir 920 is sufficient to force water high enough up and through pressure-relief pipe 909 such that it reaches and/or exceeds a the height of the pressure-relief pipe's upper mouth 910, then water from the buoy's reservoir 920 will flow out of, and/or exit, the interior of the embodiment through that upper mouth 910, thereby tending to reduce the pressure of both the water 920 and the air 921 within the buoy's hollow interior. During operation of the embodiment, the water surface inside pressure-relief pipe 909 will tend to be some distance above the upper surface of the water in water reservoir 920, due to the elevated pressure of the air 921 above that water, i.e., the combined water and air pressures will tend to exceed the atmospheric pressure of the air in the upper portion of the pressure-relief pipe 909.

Figure 101:
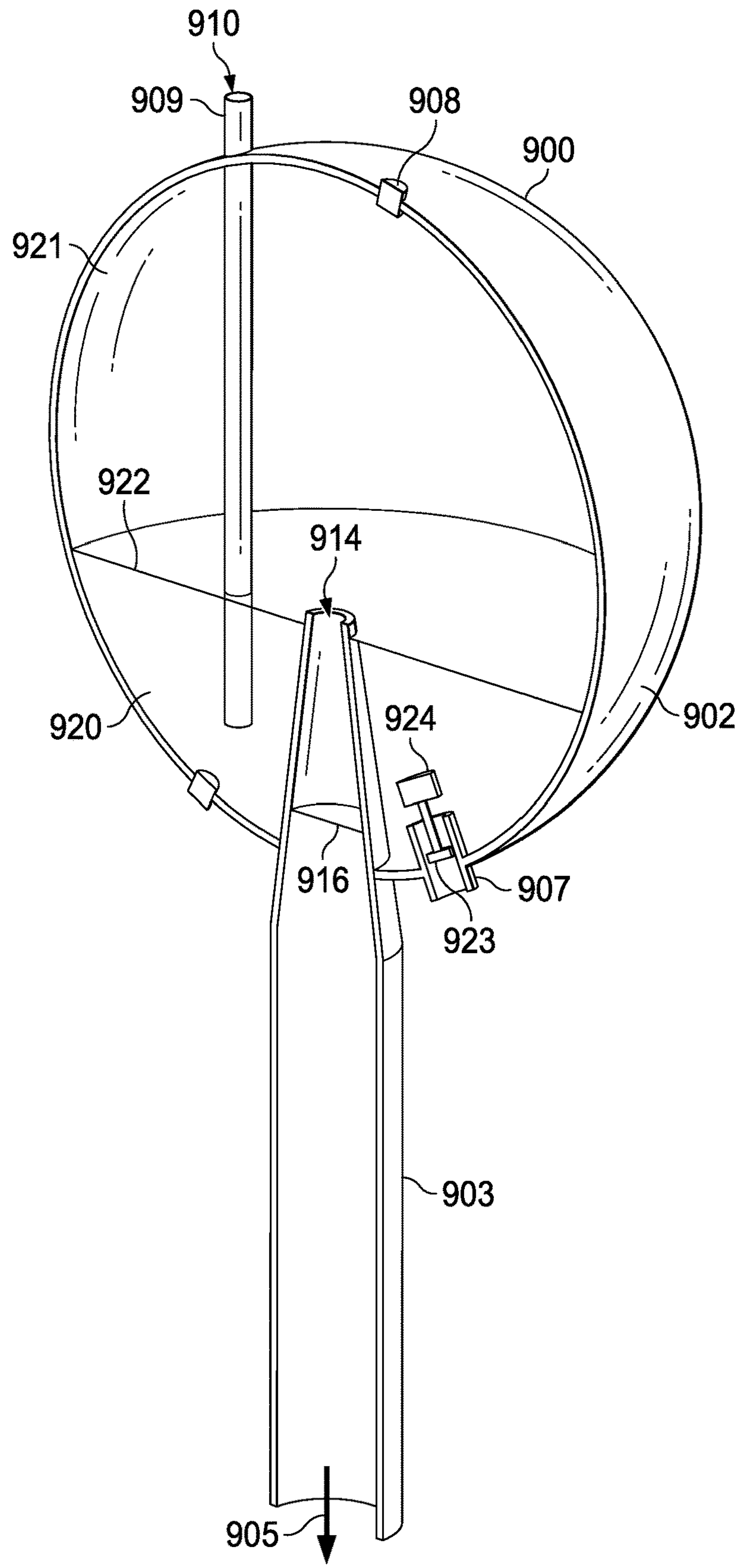
FIG. 101 is a side perspective of the same sectional view illustrated in FIG. 99.

FIG. 101 shows a side perspective of the same sectional view illustrated in FIG. 99.

Figure 102:
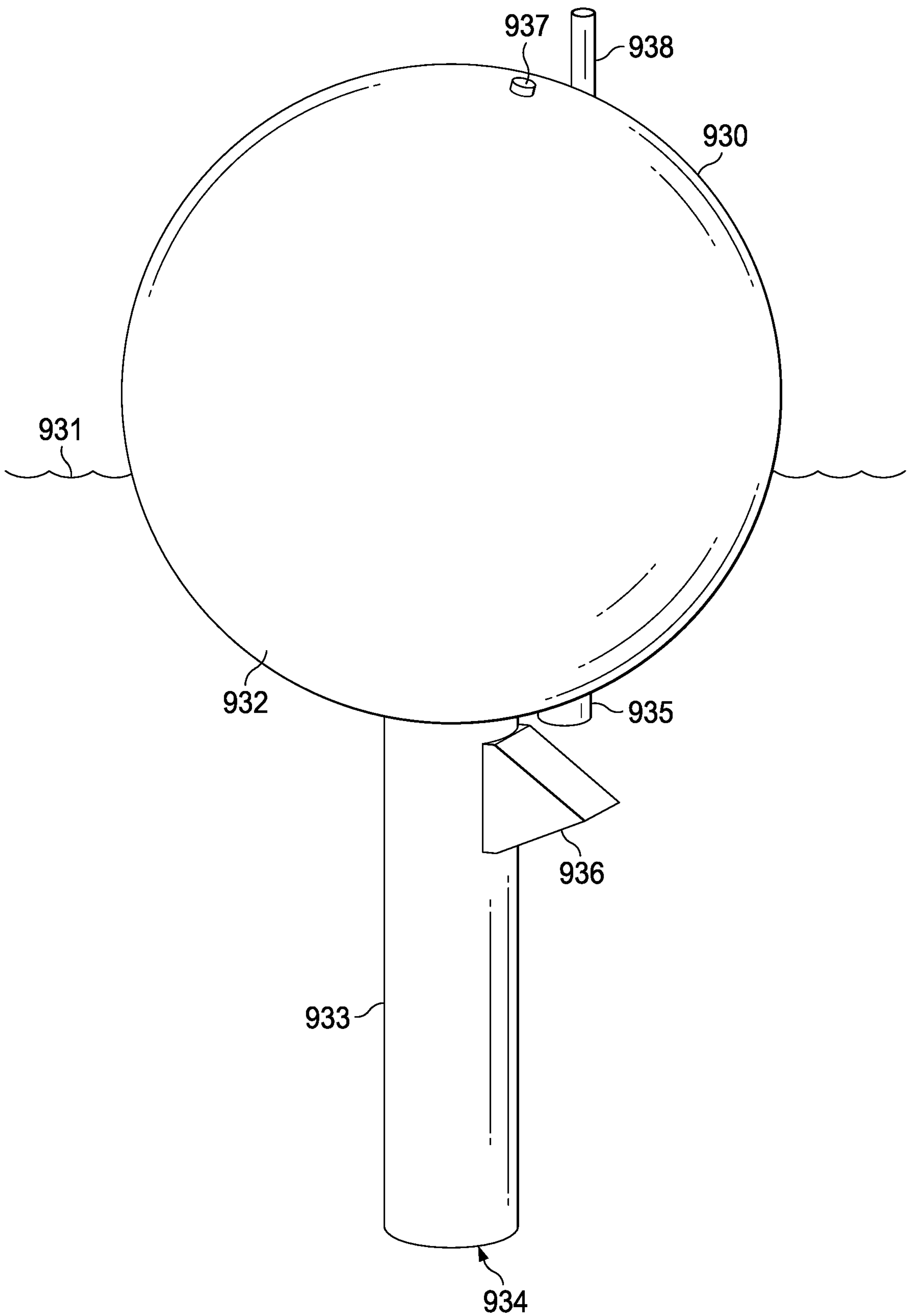
FIG. 102 is a side perspective view of another embodiment of the present invention.

FIG. 102 shows a side perspective view of an embodiment of the current disclosure.

A nominal deployment of the embodiment 930 positions it adjacent to an upper surface 931 of a body of water over which waves travel, at least periodically and/or occasionally. The embodiment 930 comprises an approximately spherical buoyant portion 932 and an approximately cylindrical depending tubular portion, i.e., an inertial water tube, 933 that possesses a lower 934 mouth through which water may freely enter and freely exit the interior of the inertial water tube 933, and an upper mouth (not visible) through which water may freely exit the interior of the inertial water tube.

As the embodiment 930 moves up and down in response to passing waves, water within the inertial water tube 933 tends to move up and down, at times moving out of phase with the wave-responsive movements of the embodiment 930. Periodically and/or occasionally water rises within the inertial water tube 933 to a sufficient height, and/or with sufficient speed, to escape the upper mouth of the inertial water tube 933 and thereafter be trapped, and/or deposited, within the interior of the hollow buoy 932, i.e. into the embodiment's water reservoir or internal water tank. As water is added to the reservoir of water within the buoy 932, the volume of the air trapped within the buoy is reduced and its pressure is thereby increased.

A portion of the pressurized water within the buoy tends to flow back to the body of water 931 from which it was captured through an effluent port, aperture, pipe, portal, and/or channel 935. As water from within the buoy 932 flows out through effluent portal 935 it engages and tends to cause to rotate a water turbine positioned therein and/or adjacent thereto. In response to rotations of the water turbine, a generator, operatively connected to the water turbine by a shaft, is energized, e.g., through rotations of the generator's rotor, thereby generating electrical power. In similar embodiments, the water turbines impart rotational power to hydraulic rams, accumulators, and motors and the water turbines are energized directly or indirectly by the hydraulic motors. In other similar embodiments, other power takeoffs are utilized.

The scope of the current disclosure is not limited to the type and/or number of power takeoff mechanisms utilized. In similar embodiments, no electricity is generated, but rather, high-pressure water is passed over, through, and/or into filtration and/or adsorption substances and/or mats configured to remove valuable elements and/or compounds from the water, e.g. an adsorption substance designed to extract dissolved lithium from the water.

As water leaves the effluent portal 935 the flow of at least a portion of that water, or of water moved by that water, tends to be obstructed by a surface 936 which tends to deflect at least a portion of that flow away from the embodiment along an approximately radial, lateral, horizontal, and/or flow-normal vector, thereby generating lateral thrust that tends to propel the embodiment in a direction opposite that of the deflected flow and across the surface of the body of water on which the embodiment floats.

An actuated valve 937 positioned at an upper portion of the buoy 932 can release air from the interior of the buoy 932 so as to reduce the pressure of the air and water within the buoy. The valve 937 may be actuated directly (e.g. passively) in response to a sufficient pressure of the air within the buoy 932 being reached and/or exceeded, and/or it may be activated (e.g. actively) by the embodiment's control system (not shown), e.g. when electrical sensors detect a threshold pressure within the embodiment.

A pressure relief pipe 938 ejects water from the interior of the buoy 932 when the volume, height, level, and/or head pressure of that water, combined with the pressure of the air adjacent to that water, imparts to that water sufficient pressure to reach, exceed, and/or overcome the height of the upper mouth and/or aperture of the pressure relief pipe 938.

Figure 103:
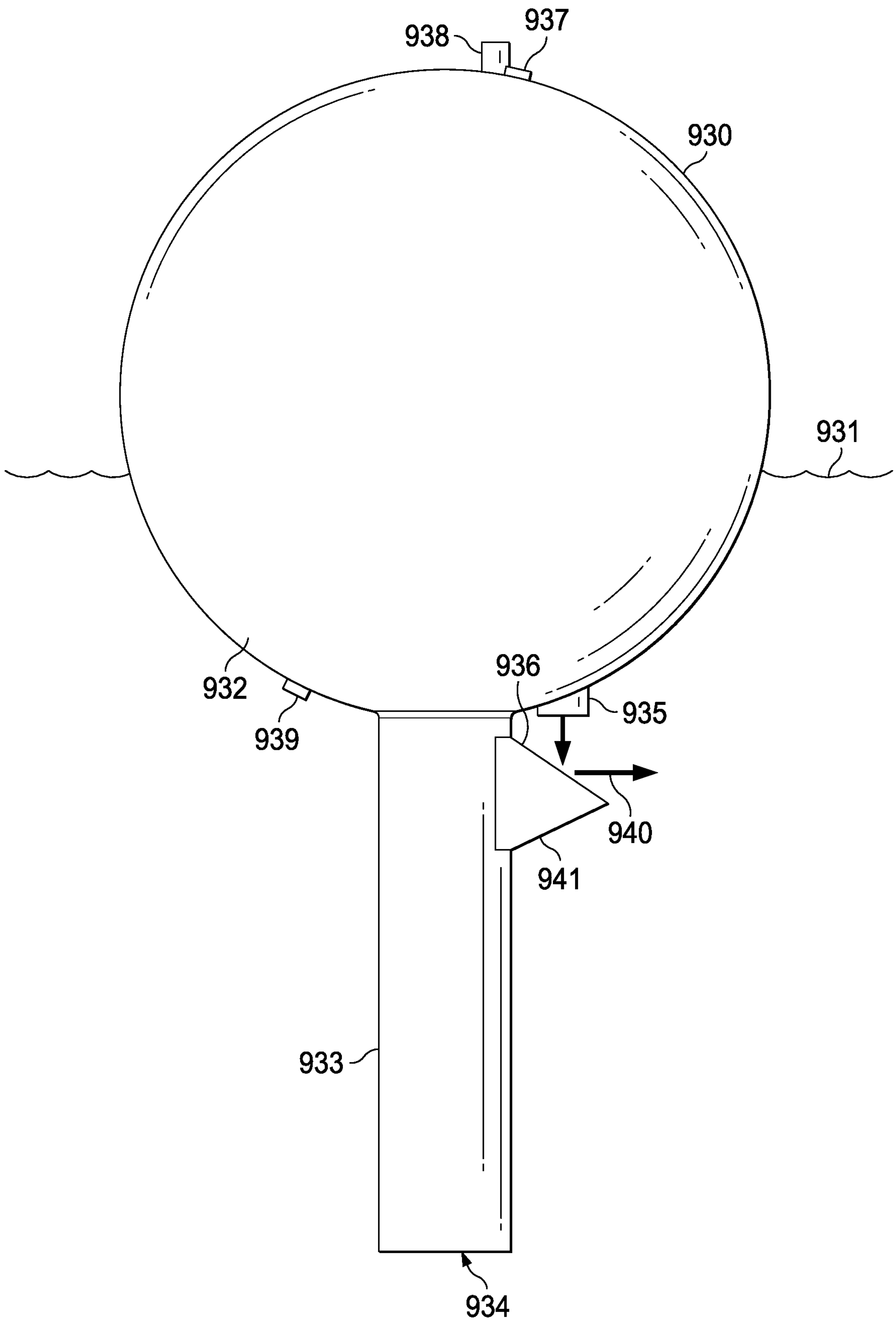
FIG. 103 is a left-side view of the embodiment of FIG. 102.

FIG. 103 shows a left-side view of the same embodiment of the current disclosure that is illustrated in FIG. 102.

An actuated valve 939 positioned at a lower portion of the buoy 932 can release water from the interior of the buoy 932 so as to reduce the pressure of the air and water therein. The valve 939 may be actuated directly in response to a sufficient pressure of the water within the buoy 932 being reached and/or exceeded, and/or it may be activated by the embodiment's control system (not shown).

Water flowing 940 over, and/or through, the embodiment's water turbine (not visible) and back to the body of water 931 on which the embodiment floats is deflected by a surface 936 of a structural element 941 attached to the embodiment's tube 933 thereby generating a lateral thrust useful in propelling the embodiment across the surface 931 of the body of water on which the embodiment floats.

Figure 104:
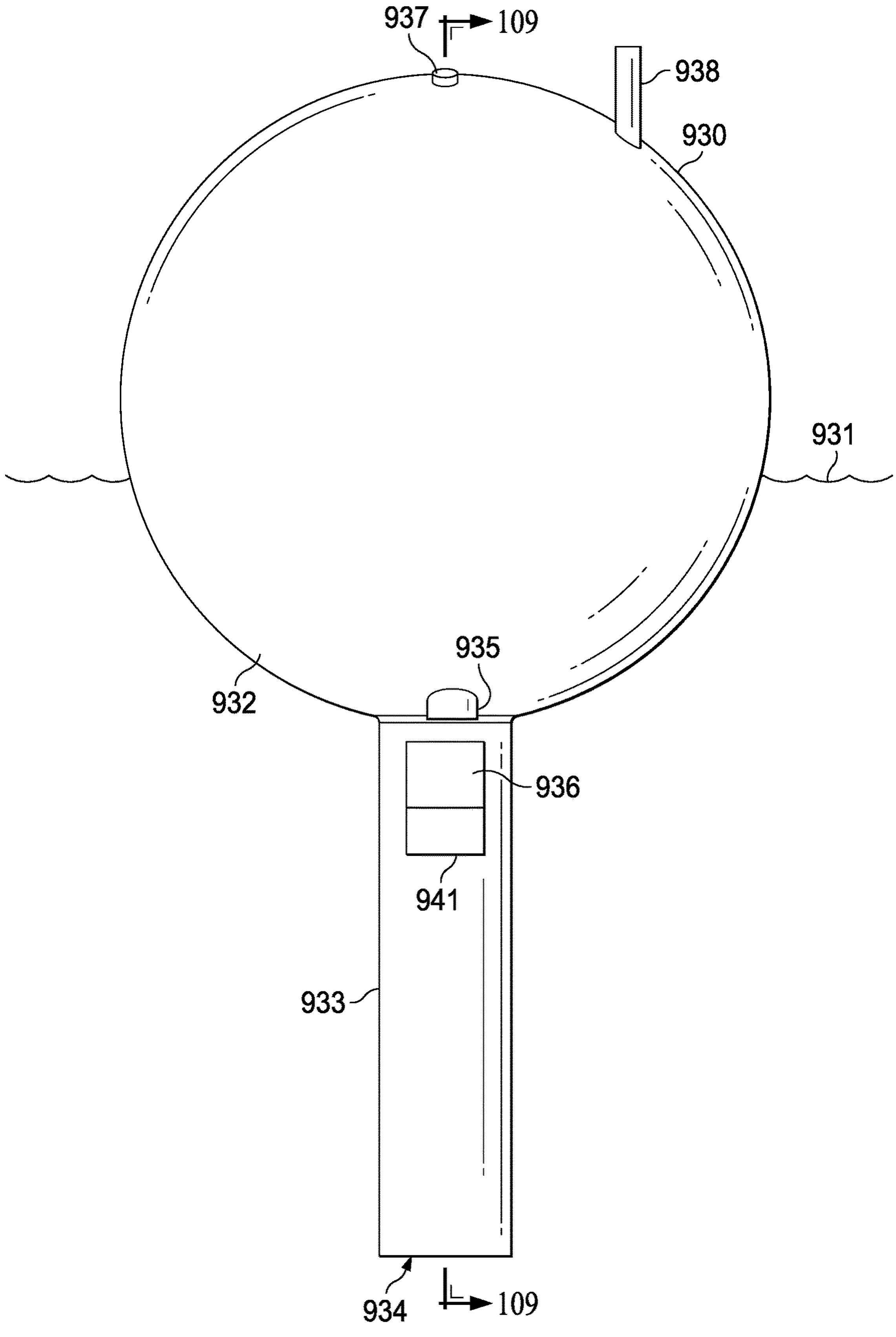
FIG. 104 is a back-side view of the embodiment of FIGS. 102 and 103.

FIG. 104 shows a back-side view of the same embodiment of the current disclosure that is illustrated in FIGS. 102 and 103.

Figure 105:
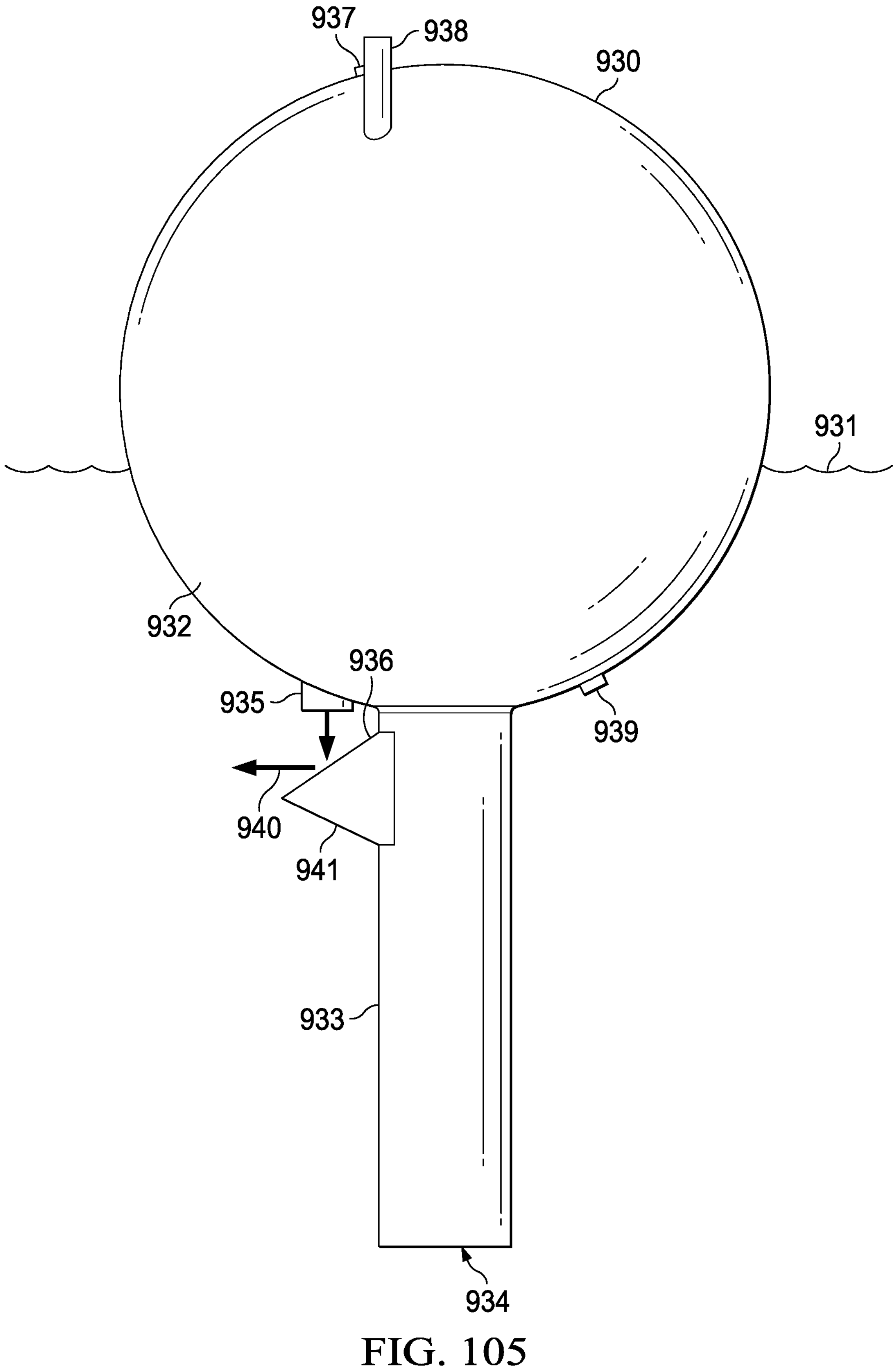
FIG. 105 is a right-side view of the embodiment of FIGS. 102-104.

FIG. 105 shows a right-side view of the same embodiment of the current disclosure that is illustrated in FIGS. 102-104.

Figure 106:
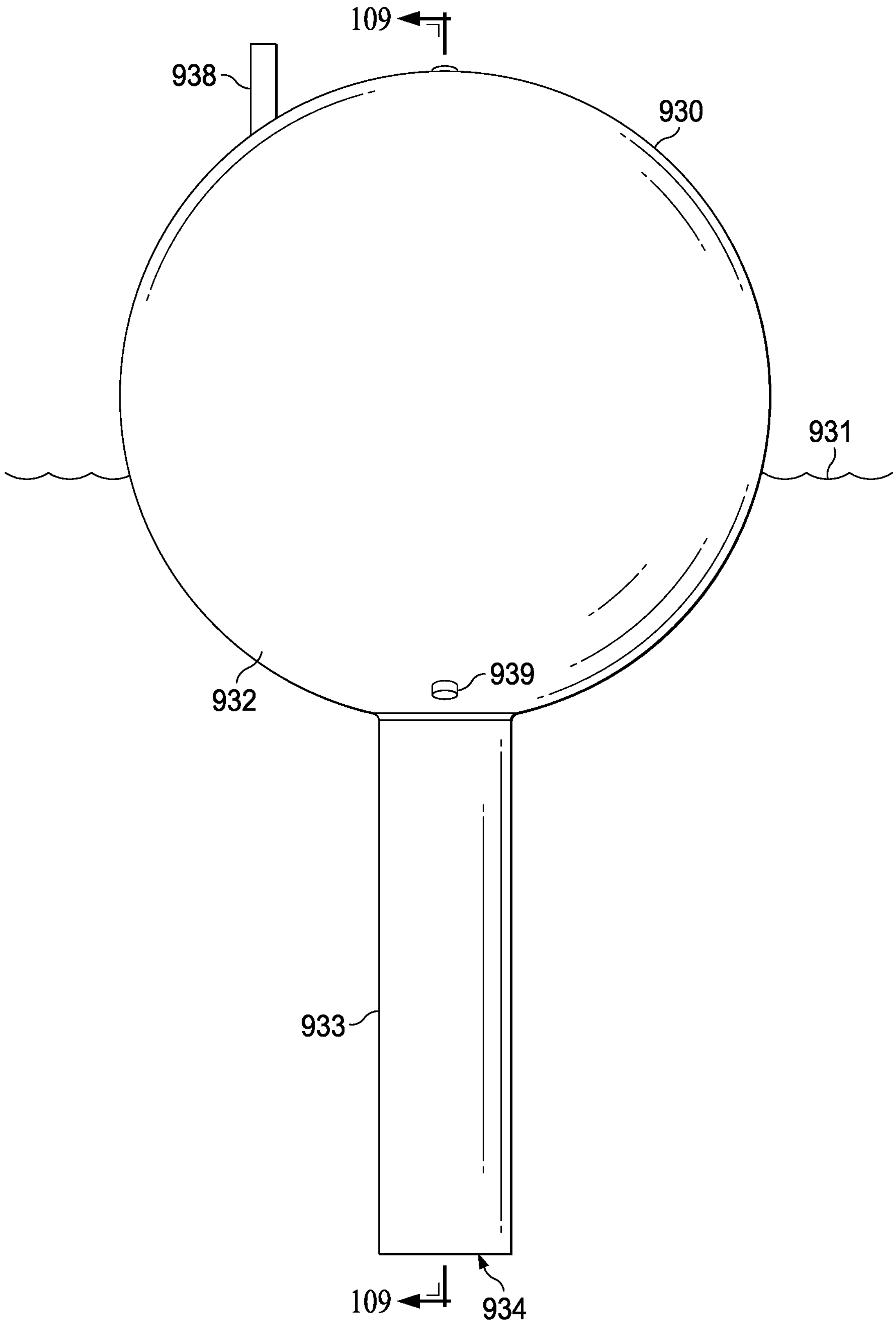
FIG. 106 is a front-side view of the embodiment of FIGS. 102-105.

FIG. 106 shows a front-side view of the same embodiment of the current disclosure that is illustrated in FIGS. 102-105.

Figure 107:
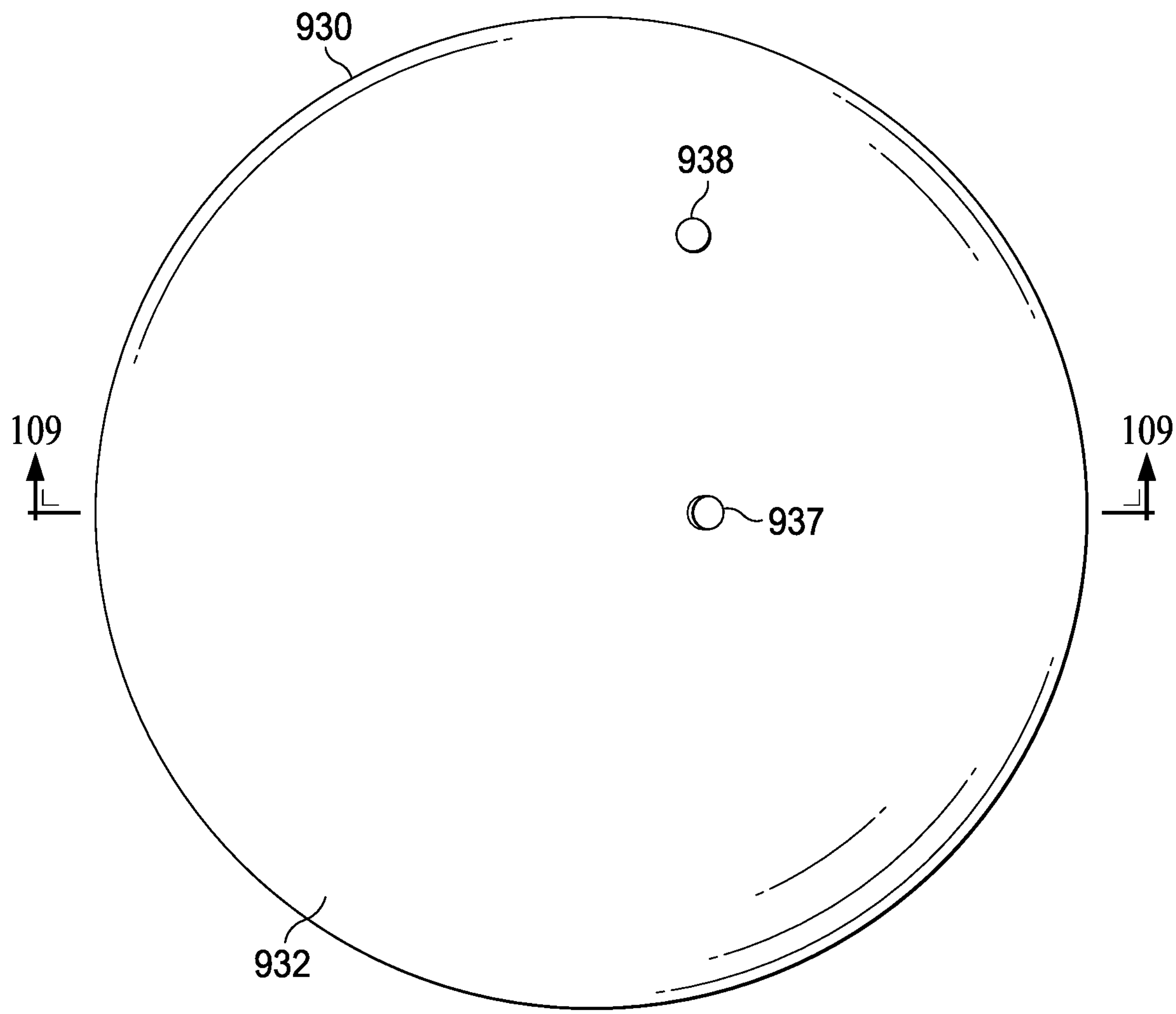
FIG. 107 is a top-down view of the embodiment of FIGS. 102-106.

FIG. 107 shows a top-down view of the same embodiment of the current disclosure that is illustrated in FIGS. 102-106.

Figure 108:
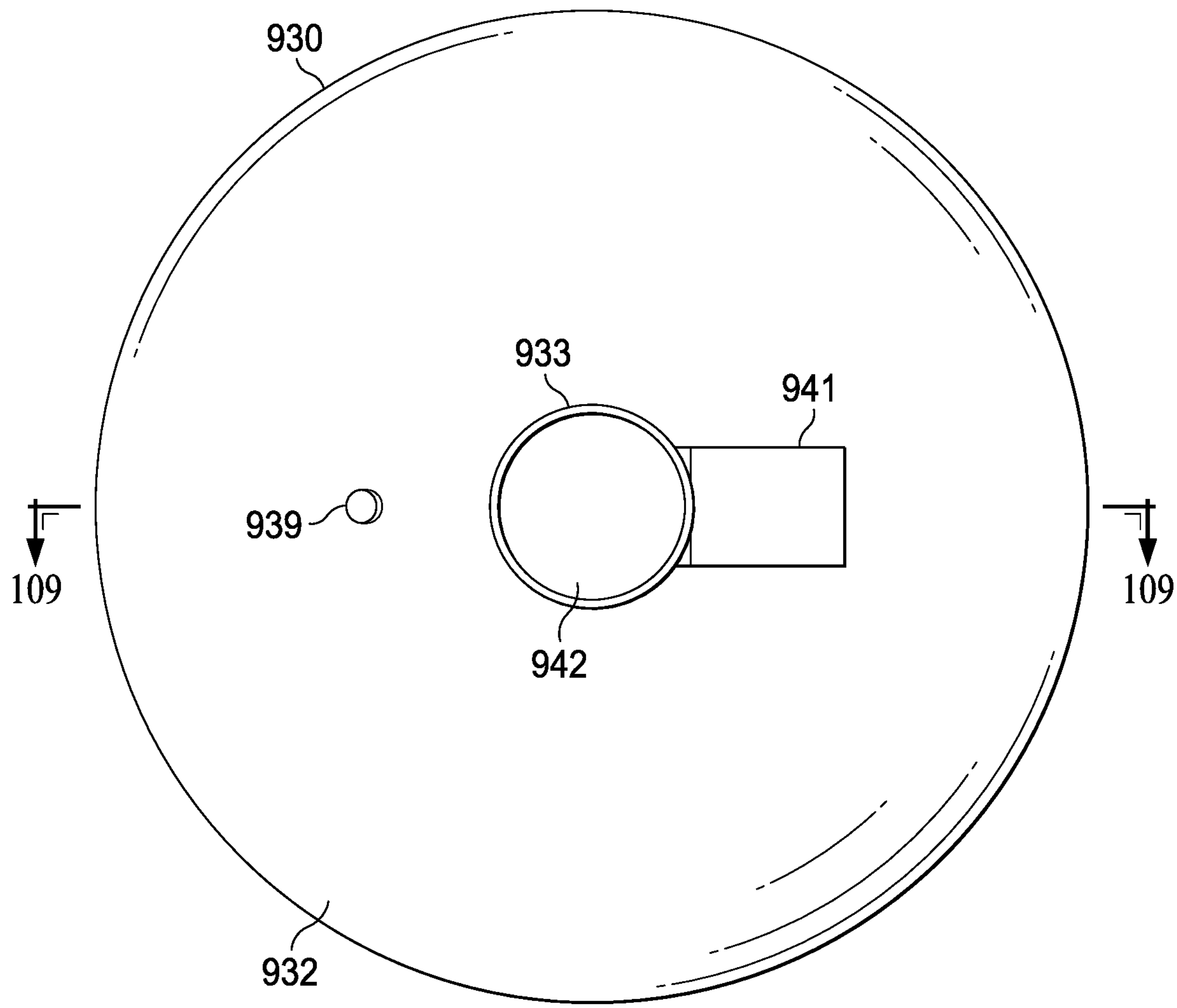
FIG. 108 is a bottom-up view of the embodiment of FIGS. 102-107.

FIG. 108 shows a bottom-up view of the same embodiment of the current disclosure that is illustrated in FIGS. 102-107.

The embodiment's 930 inertial water tube 933 is hollow, with upper (not visible due to a lateral bend in the upper portion of the inertial water tube) and lower 942 mouths, and tends to contain water within at least a portion of its internal channel.

Figure 109:
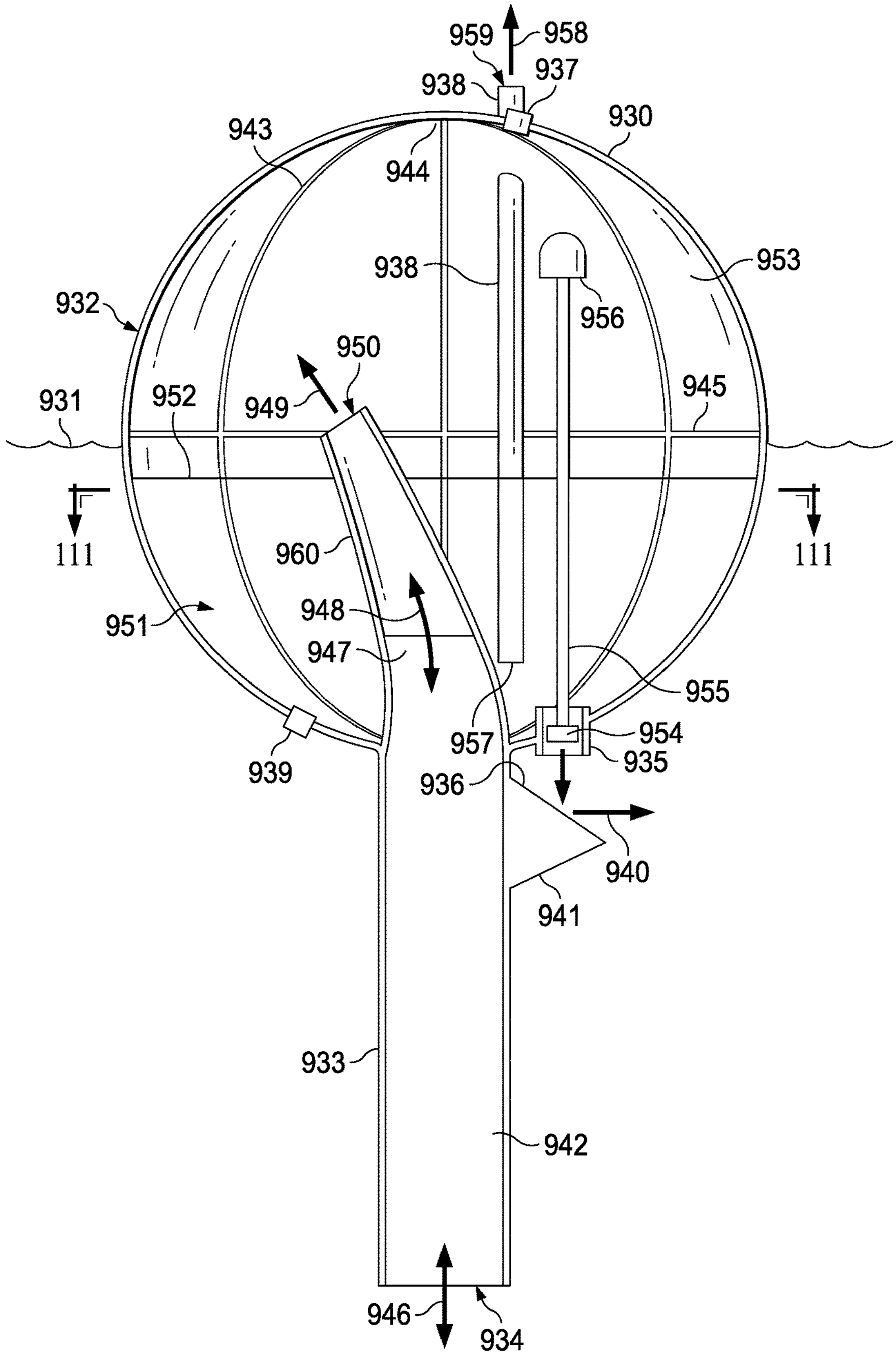
FIG. 109 is a side sectional view of the embodiment of FIGS. 102-108.

FIG. 109 shows a side sectional view of the same embodiment of the current disclosure that is illustrated in FIGS. 102-108, where the section is taken along the section line 109-109 specified in FIGS. 104 and 106-108.

The buoy portion 932 of embodiment 930 is comprised, at least in part, of a flexible cloth, sheet, panel, covering, material, and/or barrier that is held in an approximately spherical shape by an internal pressure of air and water that pushes outward against the inner surface(s) of the flexible material. The nominal spherical shape of the buoy 932 is preserved, e.g., in the case of a reduction in the buoy's internal pressure, by a set of vertical circumferential ribs, struts, tubes, pipes, beams, and/or rods, e.g., 943, that span the buoy adjacent to an inner surface of its outer flexible covering 932, radiating outward from an uppermost point 944 to a corresponding lowermost point (not visible) and arranged in a pattern similar to the arrangement of lines of longitude on a globe. One or more horizontal circumferential ribs, struts, tubes, pipes, beams, and/or rods, e.g., 945, that span the buoy adjacent to an inner surface of its outer flexible covering 932, radiating about the embodiment's nominally flow-normal and/or vertical longitudinal axis and arranged in a pattern similar to the arrangement of lines of latitude on a globe.

As the embodiment 930 moves up and down in response to waves passing across the surface 931 of the body of water 931 on which the embodiment floats, water 942 within the embodiment's inertial water tube 933 tends to move up and down, at times out of phase with, and/or with a greater amplitude than, the vertical movements of the embodiment. As water 942 within the inertial water tube 933 moves up and down, water enters and exits 946 through the inertial water tube's lower mouth 934. Likewise, the surface 947 of the water within the inertial water tube 933 moves 948 up and down, periodically moving high enough that a portion thereof is ejected 949 from the upper mouth 950 of the tube. A portion of the water ejected 949 from the upper mouth 950 of the inertial water tube falls to the bottom of the inner chamber and/or hollow of the buoy's 932 interior thereby adding to the volume of water 951 in a pool and/or reservoir of water in a lower portion of the buoy's interior, and likewise raising the level and/or upper surface 952 of that water reservoir 951. As the volume of water within the embodiment's water reservoir 951 is increased, the volume of air 953 trapped, and/or contained, within an upper portion of the buoy's interior is decreased, and its pressure is increased.

At least in part due to an increase in the pressure of the air and water within the buoy's 932 water reservoir 951, a portion of the water within the buoy's reservoir 951 tends to flow out of the buoy and back to the body of water 931 from which it was originally captured through effluent pipe 935. As water flows through effluent pipe 935 it flows over and/or through a water turbine 954 therein. As water flows through water turbine 954, the turbine tends to rotate, which causes the attached shaft 955 to rotate, which, in turn, causes the rotor of generator 956 to rotate, thereby causing generator 956 to generate electrical power.

Water flowing out of effluent pipe 935 tends to be obstructed and/or diverted by surface 936 which tends to cause that flow to move away from the embodiment 930 in a horizontal direction radially and laterally oriented away from the embodiment's nominal flow-normal and/or vertical longitudinal axis. The diverted flow of water tends to impart to the embodiment thrust in a direction opposite the flow's direction and radially oriented away from the embodiment's nominal flow-normal vertical longitudinal axis in the opposite direction, thereby tending to propel the embodiment across the surface 931 of the body of water on which the embodiment floats.

When the pressure of the water within the buoy's water reservoir 951 exceeds a threshold pressure, that pressure becomes sufficient to cause water entering the lower mouth and/or aperture 957 of pressure-relief pipe 938 to flow up to, and flow 958 out of, the upper mouth and/or aperture 959 of that pressure-relief pipe, thereby reducing and/or relieving the "excess" water pressure.

Notice that a substantial portion of the narrowing, tapered, and/or constricting upper portion 960 of the embodiment's tube 933 is arched, tilted, slanted, and/or bent so that its axis of flow tends to not be coaxial with a straight, and nominally vertical, longitudinal axis, and/or axis of radial symmetry, of the inertial water tube 933. This bending of the upper portion of the tube 933 tends to cause water ejected 949 from the inertial water tube's upper mouth 950 to be projected laterally as well as vertically.

A similar embodiment lacks an effluent pipe 935, and instead has an aperture in the wall of the buoy 932, in which aperture, or adjacent to which aperture, a water turbine is positioned and energized by the flow of water through that aperture.

Figure 110:
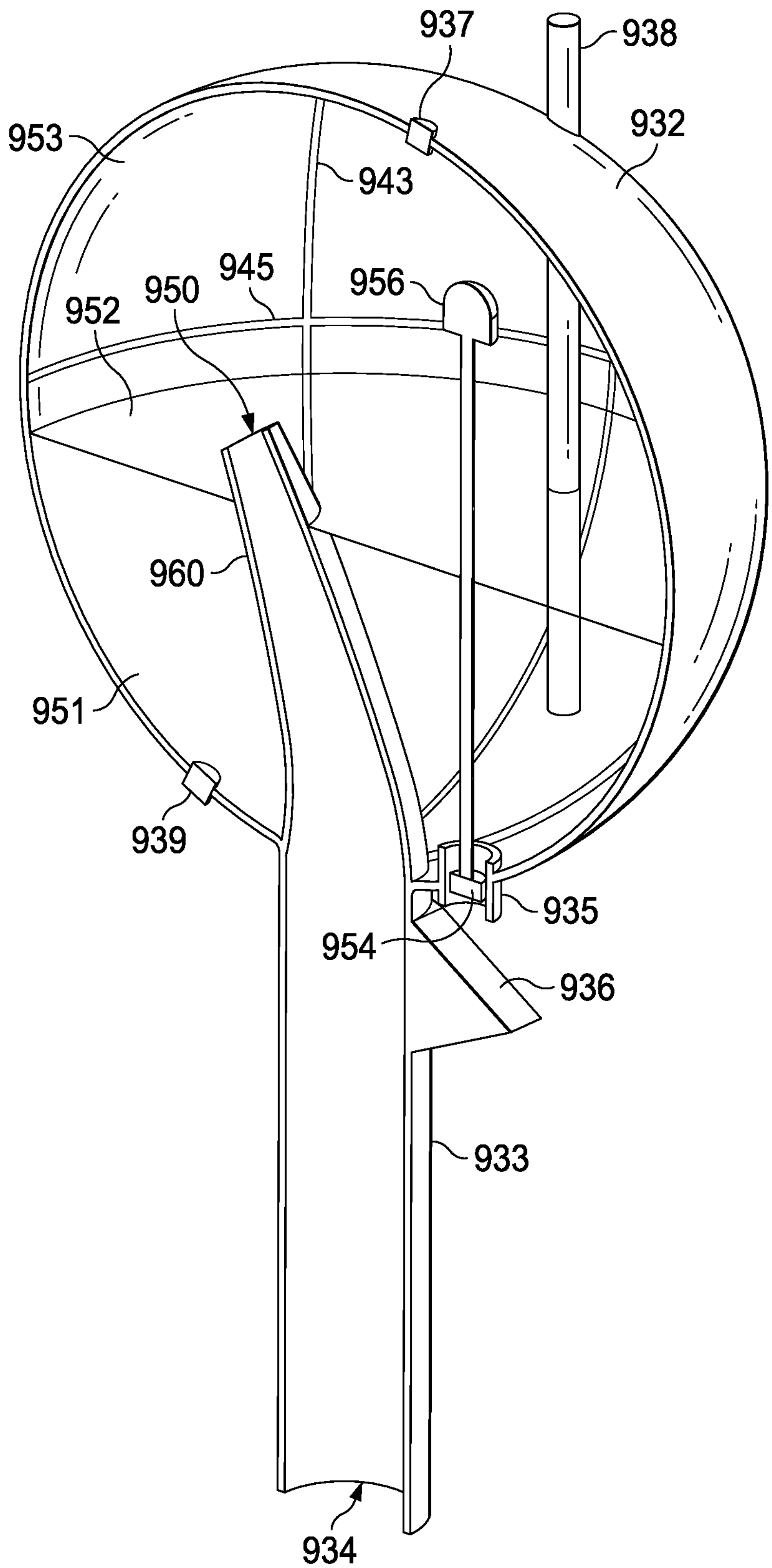
FIG. 110 is a side perspective of the same sectional view illustrated in FIG. 109.

FIG. 110 shows a side perspective of the same sectional view illustrated in FIG. 109.

Figure 111:
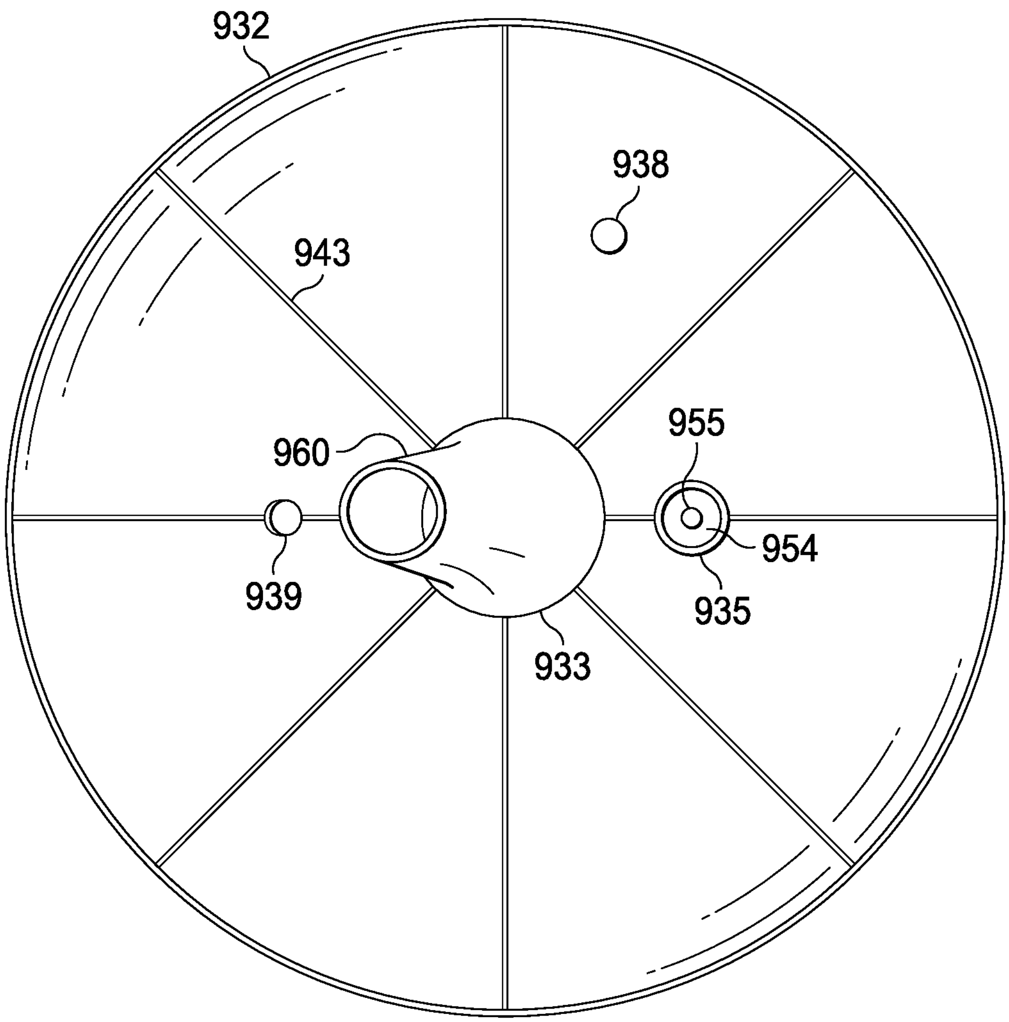
FIG. 111 is a horizontal sectional view of the embodiment of FIGS. 102-110.

FIG. 111 shows a horizontal sectional view of the same embodiment of the current disclosure that is illustrated in FIGS. 102-110, where the section is taken along the section line 111-111 specified in FIG. 109.

Figure 112:
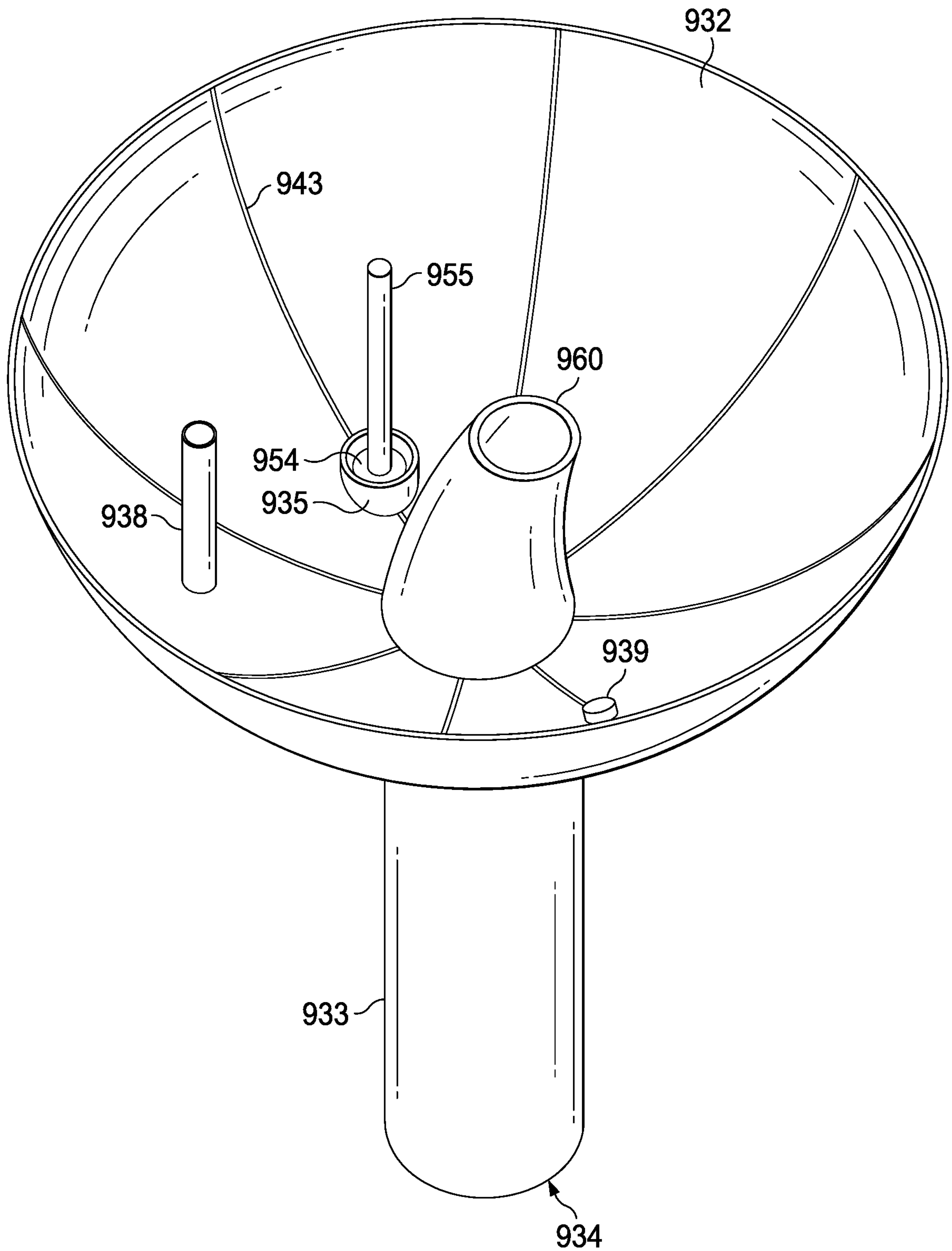
FIG. 112 is a top-down perspective of the same sectional view illustrated in FIG. 111.

FIG. 112 shows a top-down perspective of the same sectional view illustrated in FIG. 111.

Figure 113:
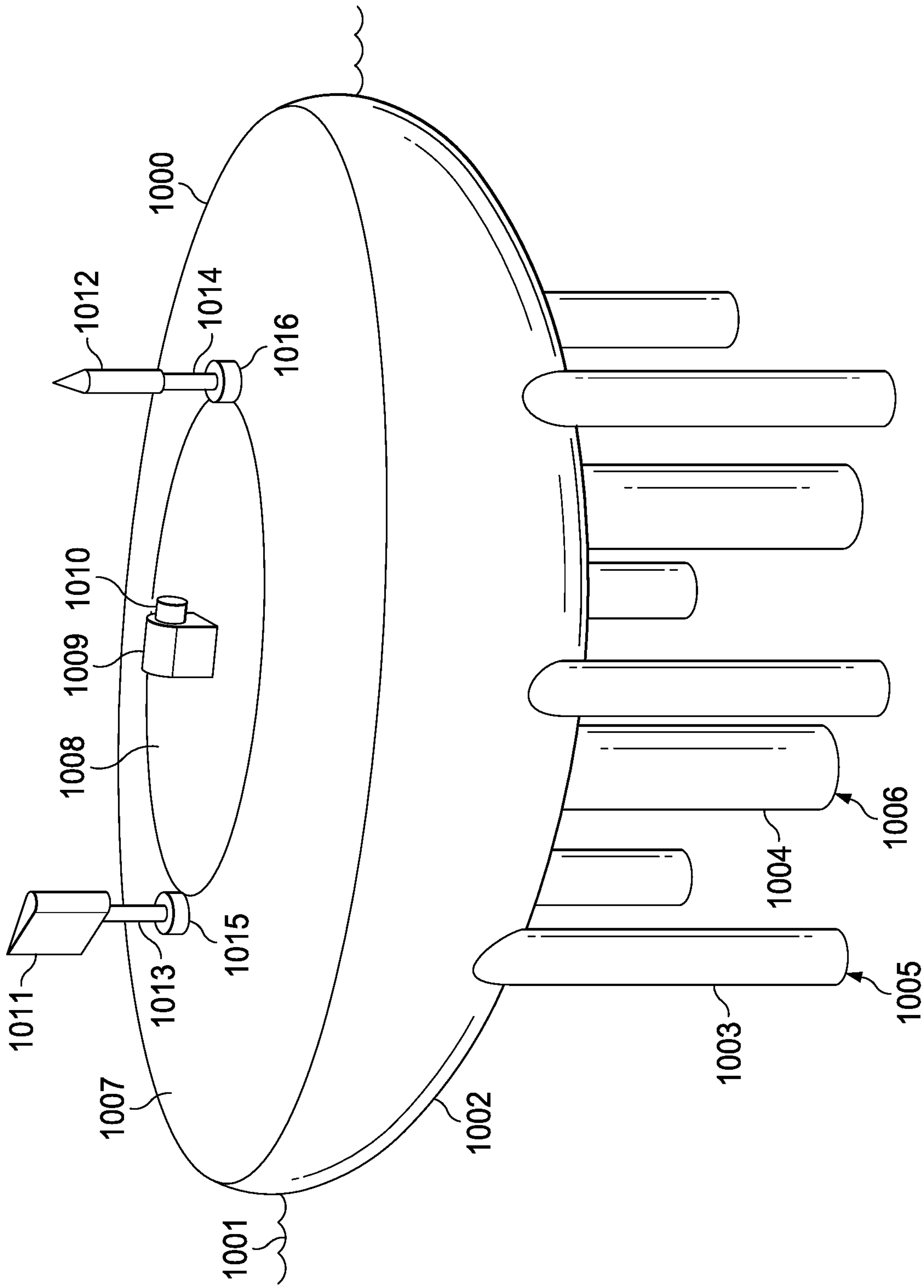
FIG. 113 is a side perspective view of another embodiment of the present invention.

FIG. 113 shows a side perspective view of an embodiment of the current disclosure.

The embodiment 1000, when nominally deployed in a body of water, tends to float adjacent to an upper surface 1001 of the body of water. The embodiment comprises a buoy portion 1002 with an approximately ellipsoidal hull, and a plurality of hollow, approximately cylindrical inertial water tubes, e.g., 1003, of which are positioned about a lateral and/or horizontal periphery of the buoy 1002 and have relatively small flow-normal cross-sectional areas, and two, e.g., 1004, of which are positioned adjacent to the lateral and/or horizontal center of the buoy 1002 and have relatively large flow-normal cross-sectional areas. Although not obvious from the illustration in FIG. 113, the central wider two inertial water tubes, e.g., 1004, are also longer and/or have a deeper draft than the six narrower inertial water tubes, e.g., 1003.

Each of the eight inertial water tubes, e.g., 1003 and 1004, has a lower mouth, e.g., 1005 and 1006, respectively, through which water may enter and leave each respective inertial water tube without significant impediment, obstruction, and/or resistance.

The top 1007 of the buoy 1002 is curved in a manner that might be characterized as being consistent with that of a partially flattened ellipsoid. A portion 1008 of the top surface of the buoy is flat, and attached thereto is a water turbine compartment 1009, in which is positioned a water turbine (not visible) that is operatively connected to a generator 1010.

Also attached to a top portion 1007 of the buoy 1002 are two rigid sails 1011 and 1012. Each rigid sail is connected to a respective sail shaft 1013 and 1014. And, each sail shaft is operatively connected to a respective shaft-rotation mechanism 1015 and 1016, e.g., a stepper motor. Note that the rigid sails in FIG. 113 are oriented such that their respective vertical planes of bilateral symmetry are not parallel. Each rigid sail is able to generate, and impart to the embodiment, thrust of a unique magnitude and/or oriented in a unique direction, thereby allowing the embodiment's control mechanism and/or system (not shown) to turn and propel the embodiment, and thereby to steer the embodiment in a desirable direction and/or to a desirable geospatial location on or at the surface 1001 of the body of water on which the embodiment floats.

Figure 114:
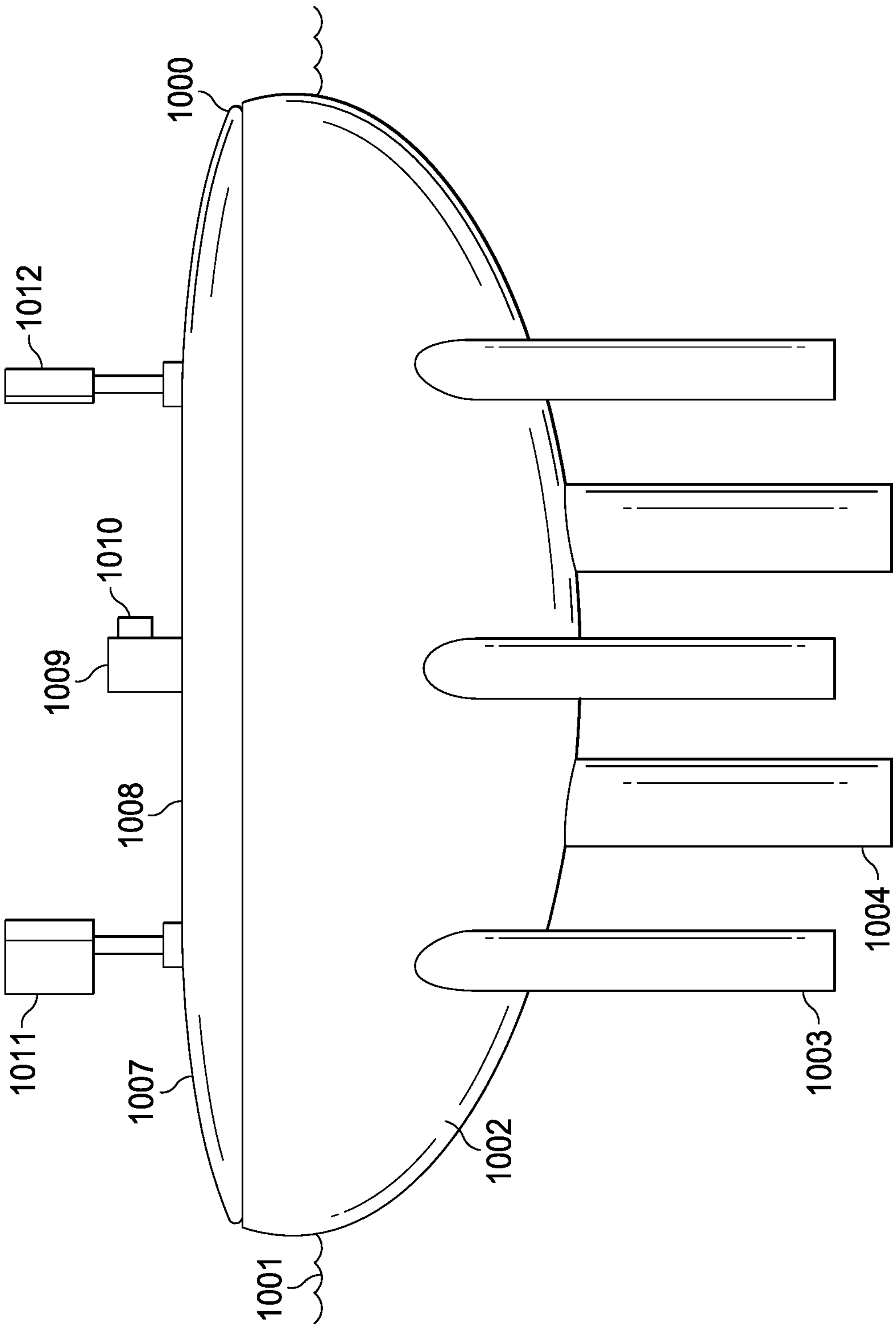
FIG. 114 is a side view of the embodiment of FIG. 113.

FIG. 114 shows a side view of the same embodiment of the current disclosure that is illustrated in FIG. 113.

Figure 115:
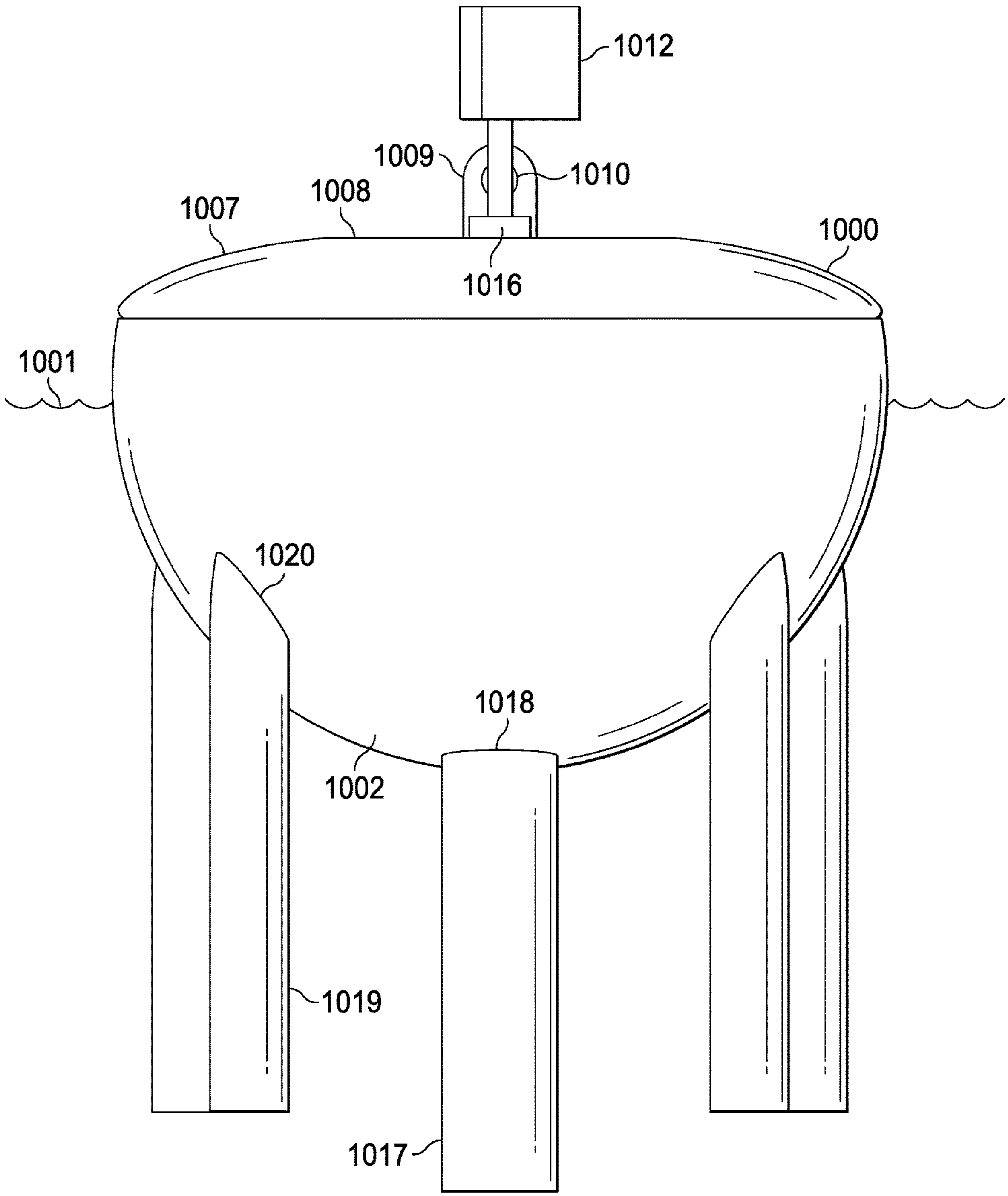
FIG. 115 is a side view of the embodiment of FIGS. 113 and 114.

FIG. 115 shows a side view of the same embodiment of the current disclosure that is illustrated in FIGS. 113 and 114.

Each of the two wider and longer inertial water tubes, e.g., 1017, penetrates the lowermost hull 1002 of the embodiment's buoy at a position, e.g., 1018, near the buoy's bottom and/or point of maximal draft. Each of the six more narrow and shorter tubes, e.g., 1019, penetrates the lowermost hull 1002 of the embodiment's buoy at a position, e.g., 1020, approximately midway between the buoy's top 1007 and its bottom 1002.

Figure 116:
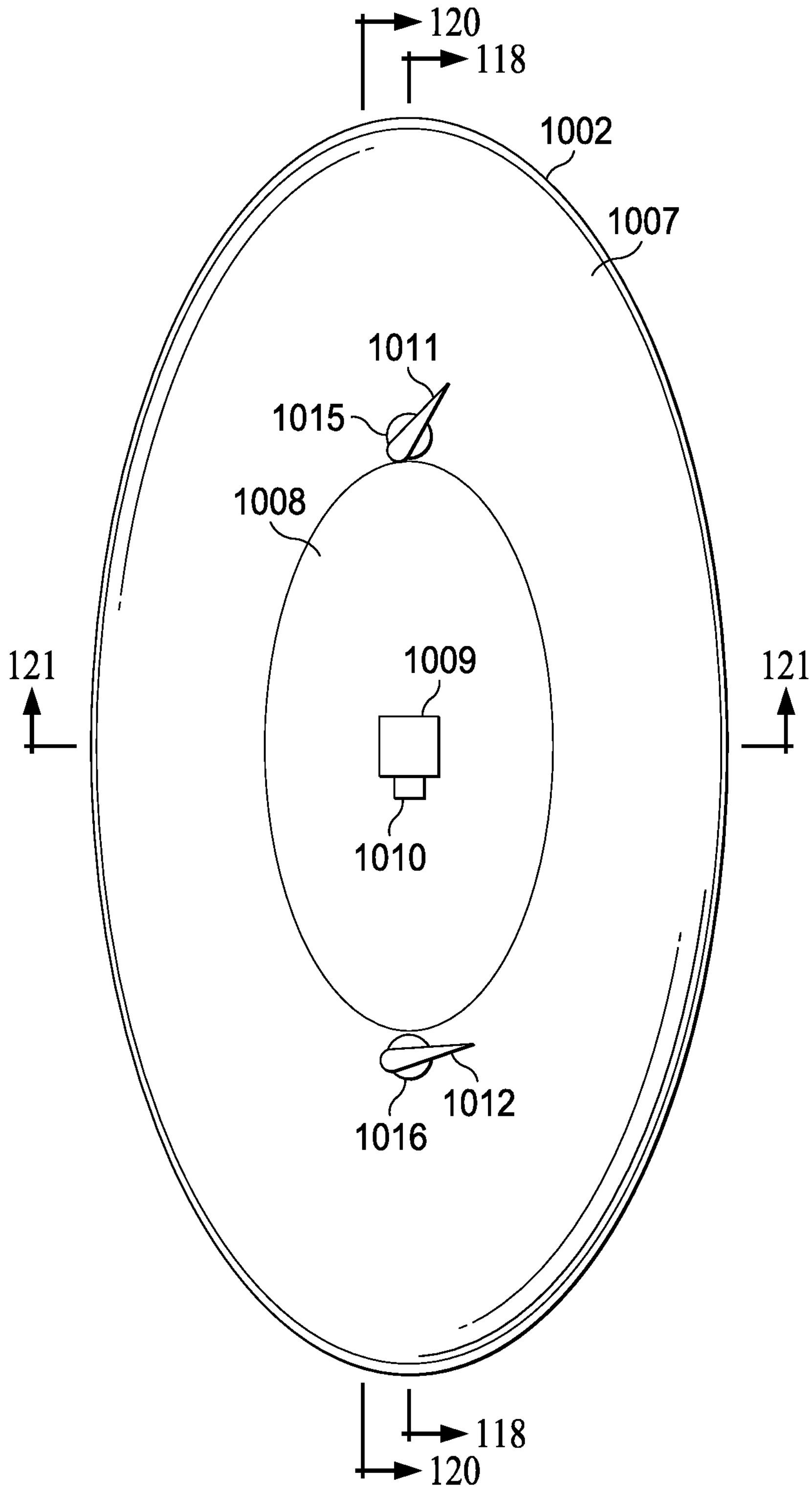
FIG. 116 is a top-down view of the embodiment of FIGS. 113-115.

FIG. 116 shows a top-down view of the same embodiment of the current disclosure that is illustrated in FIGS. 113-115.

Figure 117:
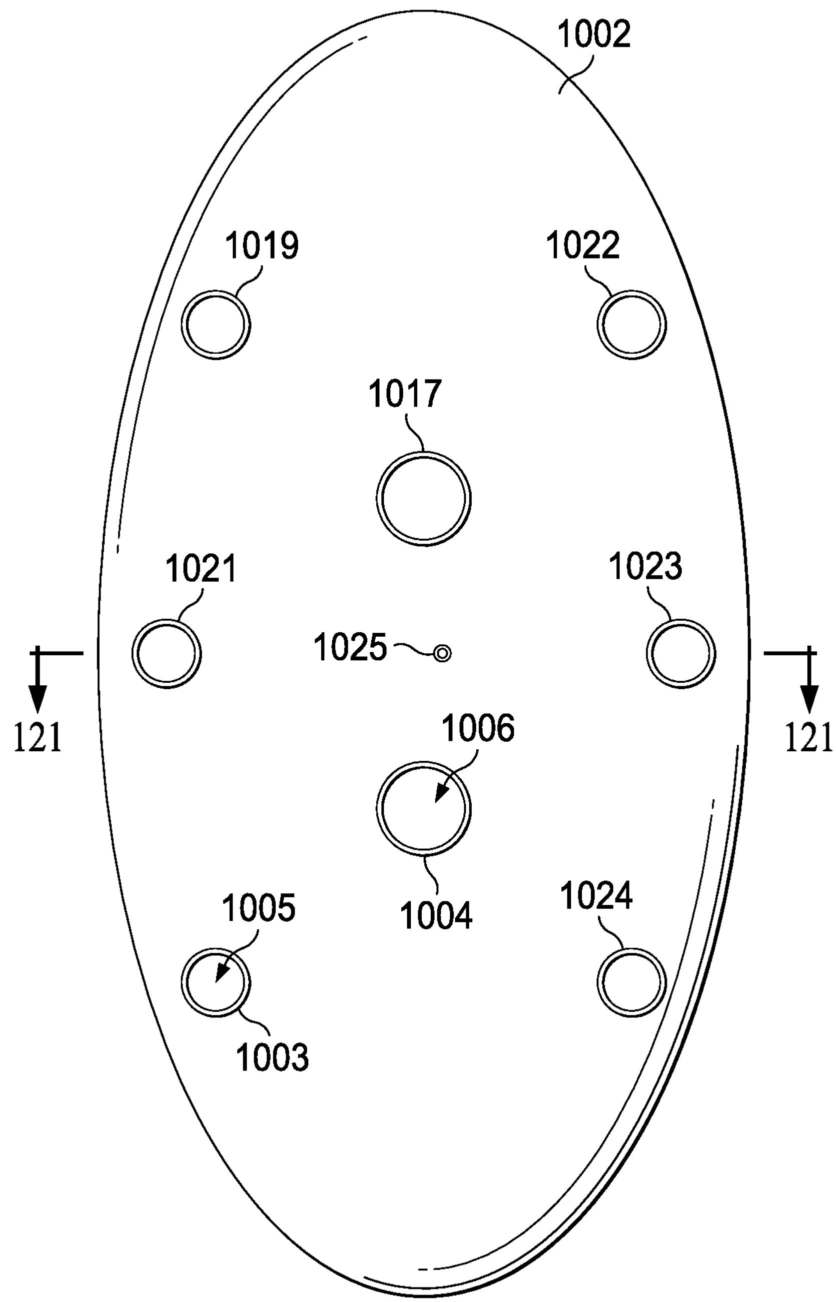
FIG. 117 is a bottom-up view of the embodiment of FIGS. 113-116.

FIG. 117 shows a bottom-up view of the same embodiment of the current disclosure that is illustrated in FIGS. 113-116.

The embodiment incorporates eight tubes oriented approximately vertically and each tube is hollow with a lower mouth, e.g., 1006, and an upper mouth (not visible). Six tubes 1003, 1019, and 1021-1024 have relatively small flow-normal cross-sectional areas. Two tubes 1004 and 1017 have relatively large flow-normal cross-sectional areas.

Water discharged from the embodiment's water turbine (not visible) is returned to the body of water on which the embodiment floats through effluent pipe 1025.

Figure 118:
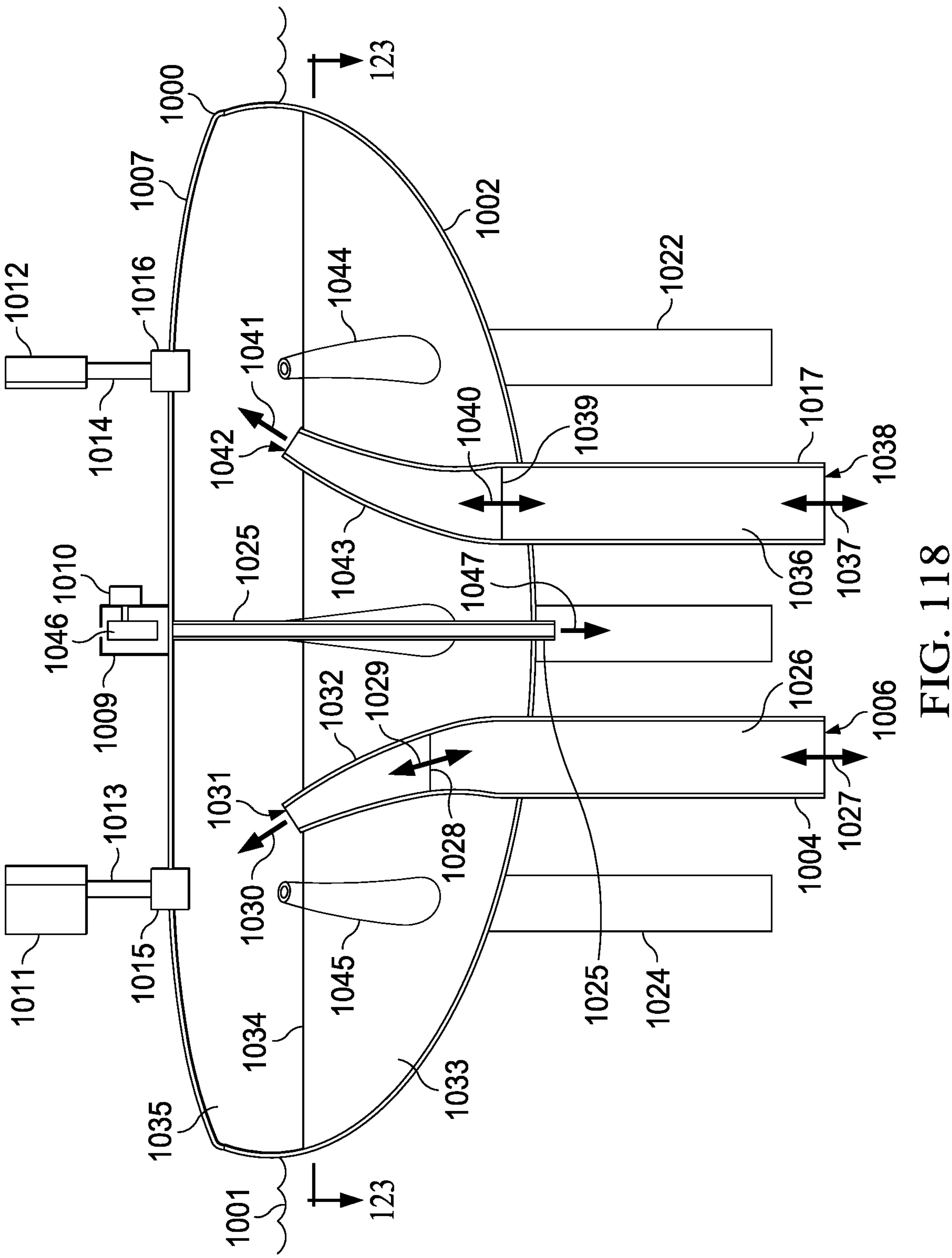
FIG. 118 is a side sectional view of the embodiment of FIGS. 113-117.

FIG. 118 shows a side sectional view of the same embodiment of the current disclosure that is illustrated in FIGS. 113-117, where the section is taken along the section line 118-118 specified in FIG. 116.

As the embodiment 1000 moves up and down in response to waves passing across the surface 1001 of the body of water on which the embodiment floats, water tends to move up and down within the embodiment's eight inertial water tubes, and be excited in its vertical oscillations by the constricting (pressurizing) surfaces or internal walls thereof. In the cross-sectional illustration of FIG. 118, the interiors of two of those inertial water tubes, i.e., 1004 and 1017, are shown.

As water 1026 within inertial water tube 1004 moves up and down, water is made to flow 1027 in and out of the tube through the tube's lower mouth 1006. The movement of water 1026 within the inertial water tube 1004 also causes the upper surface 1028 of that water to move 1029 up and down, occasionally causing a portion of that water to be ejected 1030 from the upper mouth 1031 of the inertial water tube 1004. There is a net upward transport of water up the tubes. The upper portion 1032 of inertial water tube 1004 is constricted and curved which tends to cause water rising through that upper portion 1032 of the inertial water tube to be accelerated and upon ejection to be directed laterally. After falling within the interior of the buoy, water ejected 1030 from inertial water tube 1004 joins, and increases the volume of, water pooled in a reservoir 1033 within the buoy 1002 thereby raising the level 1034 and/or surface of that water reservoir 1033. An increase in the volume of water within the embodiment's water reservoir 1033 results in a decrease in the volume of the air 1035 above the water reservoir, and trapped as an air pocket within the buoy's 1002 interior, thereby increasing the pressure of that air and providing a store of potential energy that enables water to be forced out of the reservoir of the embodiment, via a flow governor such as a turbine, at elevated pressure.

Similarly, as water 1036 within inertial water tube 1017 moves up and down water is made to flow 1037 in and out of the inertial water tube through the inertial water tube's lower mouth 1038. The movement of water 1036 within the inertial water tube 1017 also causes the upper surface 1039 of that water to move 1040 up and down, occasionally causing a portion of that water to be ejected 1041 from the upper mouth 1042 of the inertial water tube. The upper portion 1043 of inertial water tube 1017 is constricted and curved which tends to cause water rising through that upper portion 1043 of the inertial water tube to be accelerated and upon ejection to be directed laterally. After falling within the interior of the buoy, water ejected 1041 from inertial water tube 1017 joins, and increases the volume of, water pooled in a reservoir 1033, just as does water ejected 1030 from inertial water tube 1004 and water ejected from the embodiment's other six inertial water tubes, e.g., 1024.

The embodiment's narrower six inertial water tubes, e.g., 1022 and 1024, also possess upper portions, e.g., 1044 and 1045, respectively, that are constricted and curved.

When the pressure of the water in the embodiment's water reservoir 1033 is high enough, water rises up a turbine ingress pipe (not visible) and enters a water turbine compartment 1009 where it engages with, and tends to cause the rotation of, the embodiment's water turbine 1046, thereby causing the rotation of a turbine shaft which operatively connects the water turbine to the embodiment's generator 1010, thereby causing electrical energy to be produced. After passing through the water turbine 1046, the water that had risen through the turbine ingress pipe (not visible), then flows down through effluent pipe 1025 and therethrough flows 1047 back into the body of water 1001 on which the embodiment floats.

Figure 119:
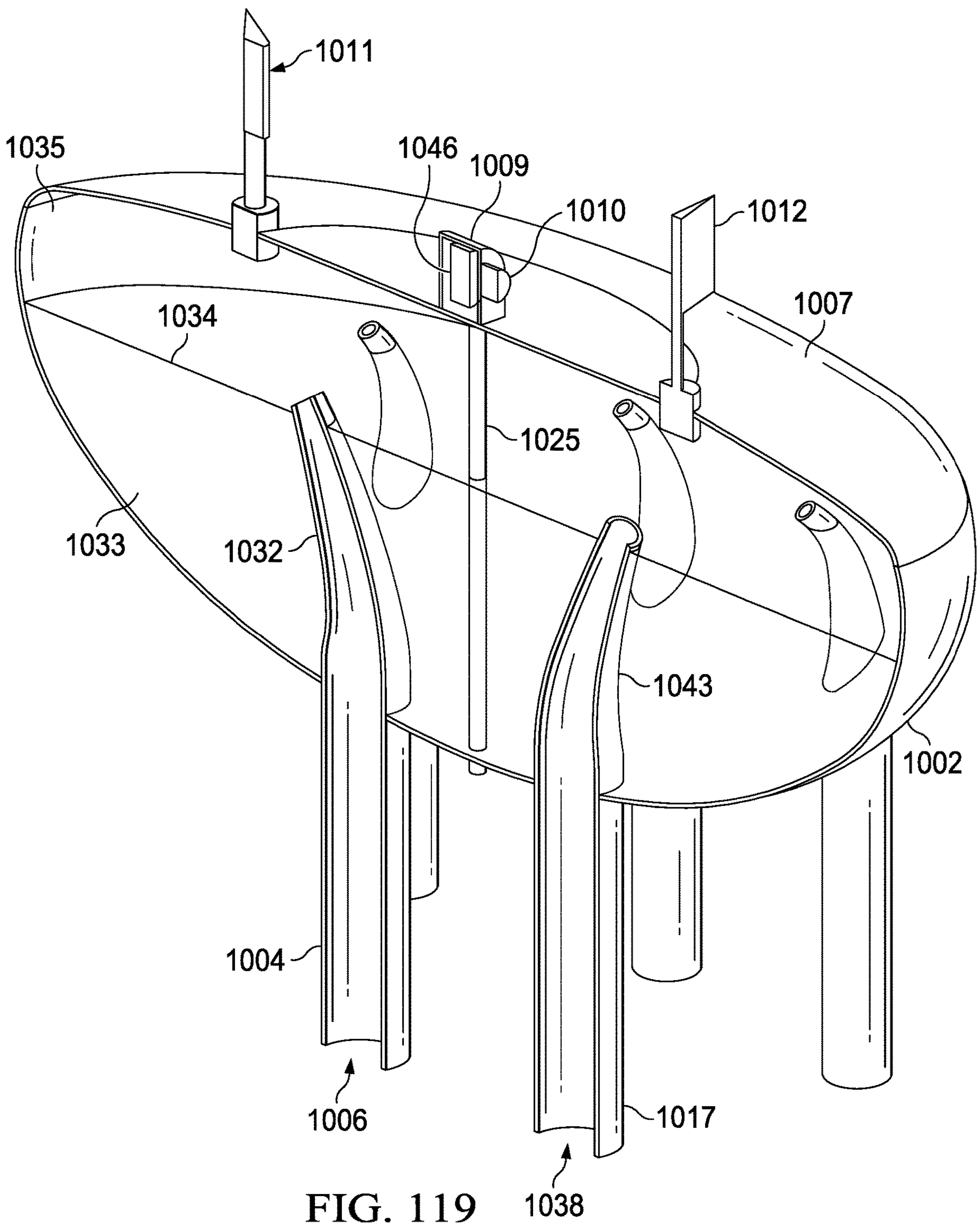
FIG. 119 is a side perspective of the same sectional view illustrated in FIG. 118.

FIG. 119 shows a side perspective of the same sectional view illustrated in FIG. 118.

Figure 120:
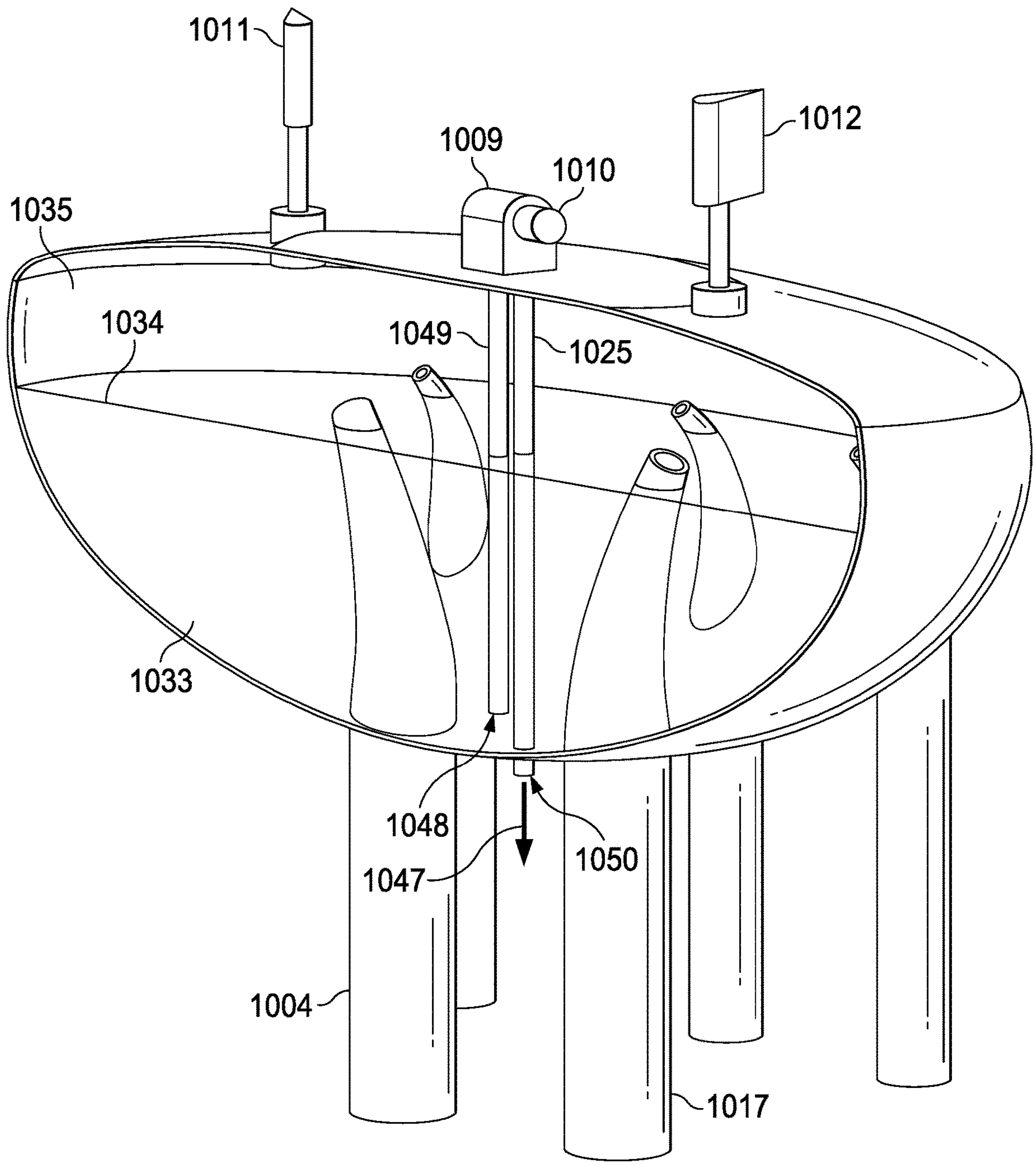

FIG. 120 shows a side sectional view of the same embodiment of the current disclosure that is illustrated in FIGS. 113-119, where the section is taken along the section line 120-120 specified in FIG. 116.

The sectional view illustrated in FIG. 120 provides a better view of the water cycle and/or flow that engages and rotates the embodiment's water turbine (not visible) inside water turbine compartment 1009. Due to an elevated pressure within the upper hull enclosure or buoy 1002, water within the embodiment's water reservoir 1033 enters a lower mouth 1048 of turbine ingress pipe 1049 and flows into the water turbine compartment 1009 where it passes over and/or through the water turbine (not visible) therein causing the water turbine to rotate and energize the operatively connected generator 1010 thereby causing the generator to generate electrical power. After passing through the water turbine, the water flows into and down effluent pipe 1025 and thereafter passes out of the lower mouth 1050 of the effluent pipe 1025 thereby returning to the body of water 1001 on which the embodiment floats.

Figure 121:
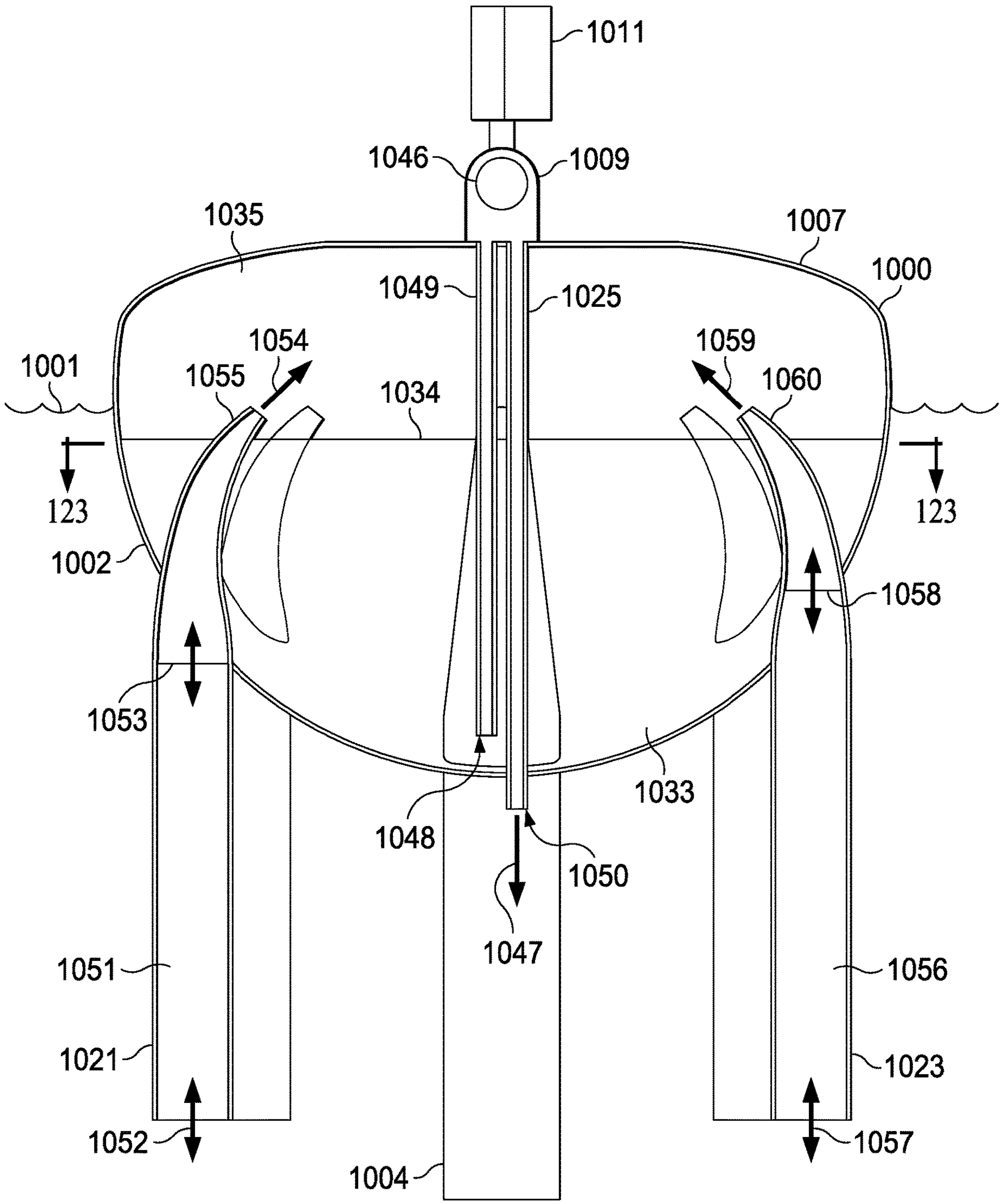

FIG. 121 shows a side sectional view of the same embodiment of the current disclosure that is illustrated in FIGS. 113-120, where the section is taken along the section line 121-121 specified in FIGS. 116 and 117.

The section plane of the illustration in FIG. 121 passes through two of the peripheral inertial water tubes 1021 and 1023 of relatively small flow-normal cross-sectional area. These inertial water tubes behave in exactly the same manner as was described with respect to FIG. 118 and the pair of sectioned relatively-large-cross-sectional-area inertial water tubes 1004 and 1017. However, because of the differing flow-normal cross-sectional areas of their cylindrical portions, and their differing lengths, the two inertial water tubes 1004 and 1017 (i.e., that possess relatively larger flow-normal cross-sectional areas and relatively greater lengths) would be expected to have a different natural frequency than would the six inertial water tubes 1003, 1019, and 1021-1024 that possess relatively smaller flow-normal cross-sectional areas and relatively shorter lengths.

Because the embodiment's two sets of inertial water tubes, i.e., those of relatively larger and those of relatively smaller flow-normal cross-sectional areas, and of relatively longer and relatively shorter lengths, respectively, will tend to have different natural frequencies, each set of inertial water tubes will tend to eject water into the water reservoir 1033 within the buoy 1002 at optimal and/or maximal rates of flow in response to, and/or with respect to, wave conditions of differing energies, significant wave heights, and/or dominant wave periods.

As water 1051 within inertial water tube 1021 moves up and down that water tends to flow 1052 in and out of the lower mouth of the inertial water tube. The movement of water 1051 within the inertial water tube 1021 also causes the upper surface 1053 of that water to move up and down, occasionally causing a portion of that water to be ejected 1054 from the inertial water tube's upper mouth. The upper portion 1055 of inertial water tube 1021 is constricted and curved which tends to cause water rising through that upper portion of the inertial water tube to be accelerated and upon ejection to be directed laterally. After falling within the interior of the buoy, water ejected 1054 from inertial water tube 1021 joins, and increases the volume of, water pooled in a water reservoir 1033 within the buoy 1002, thereby raising the level 1034 and/or surface of that water reservoir.

Similarly, as water 1056 within inertial water tube 1023 moves up and down water tends to flow 1057 in and out of the inertial water tube through the inertial water tube's lower mouth. The movement of water 1056 within the inertial water tube 1023 also causes the upper surface 1058 of that water to move up and down, occasionally causing a portion of that water to be ejected 1059 from the inertial water tube's upper mouth. The upper portion 1060 of inertial water tube 1023 is constricted and curved which tends to cause water rising through that upper portion of the inertial water tube to be accelerated and upon ejection to be directed laterally. After falling within the interior of the buoy, water ejected 1059 from inertial water tube 1023 joins, and increases the volume of, water pooled in a water reservoir 1033 thereby raising the level 1034 and/or surface of that water reservoir.

Figure 122:
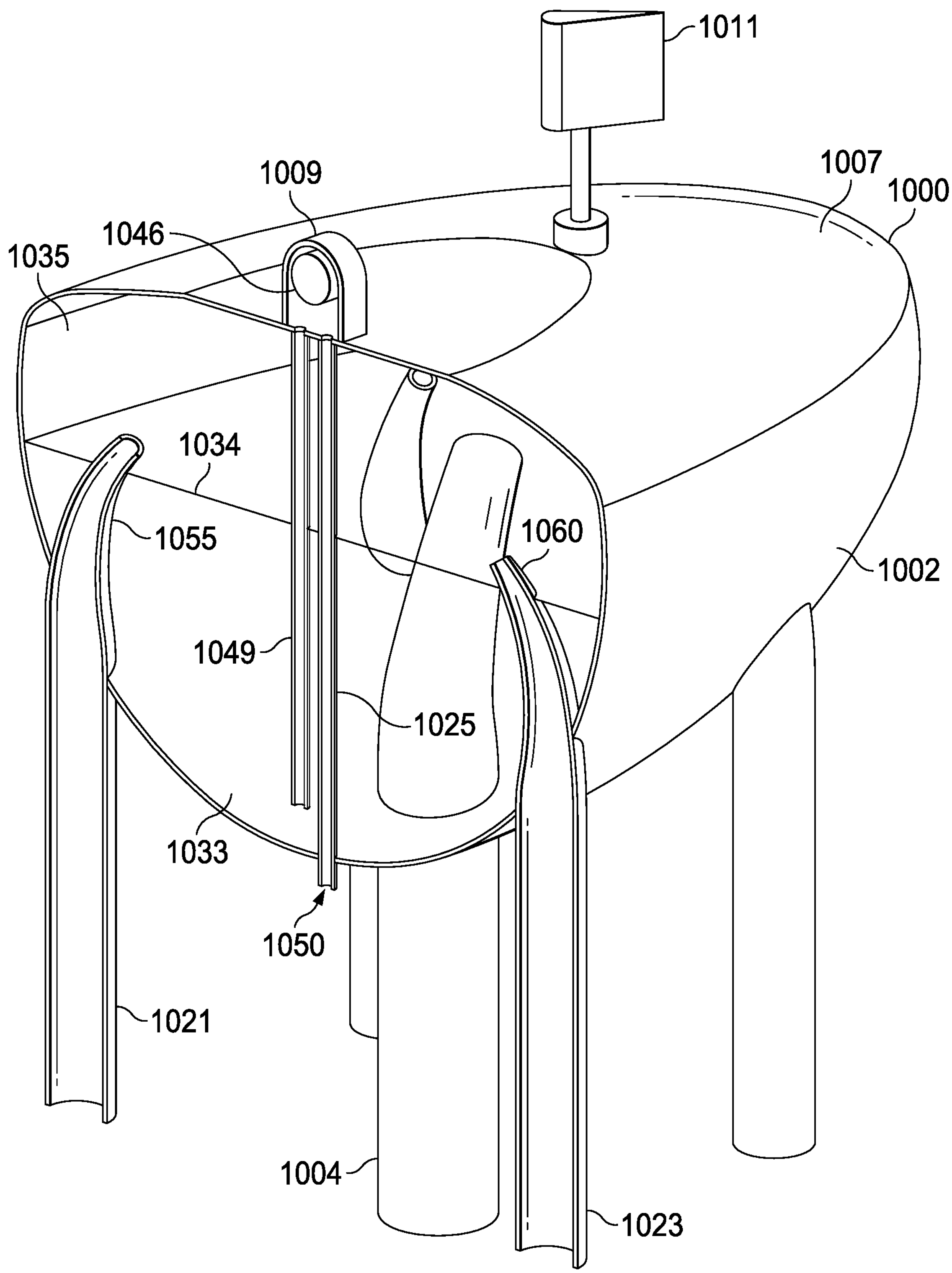

FIG. 122 shows a side perspective of the same sectional view illustrated in FIG. 121.

Figure 123:
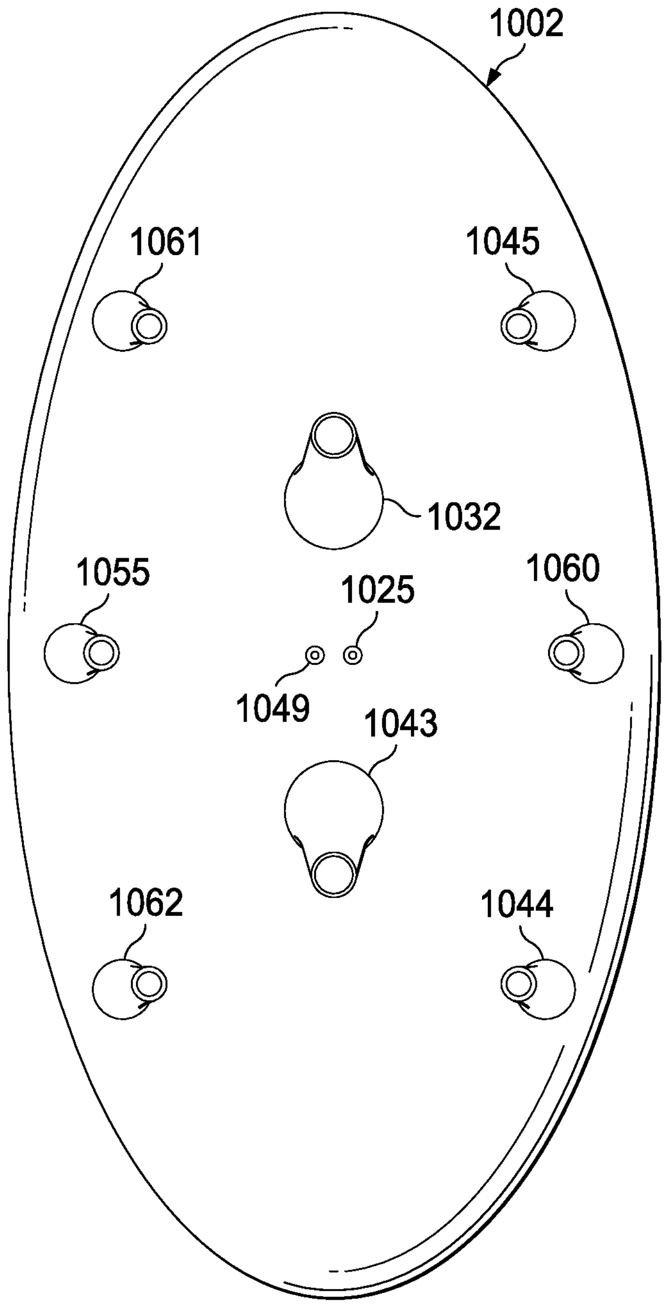

FIG. 123 shows a top-down sectional view of the same embodiment of the current disclosure that is illustrated in FIGS. 113-122, where the section is taken along the section line 123-123 specified in FIGS. 118 and 121.

The upper curved and constricted portions of the embodiment's inertial water tubes are visible within the hollow interior of the buoy 1002. Each inertial water tube tends to eject water periodically in response to wave motion at and/or against the embodiment. Pressurized water from within the embodiment's water reservoir 1033 rises through turbine ingress pipe 1049 after which it flows through the embodiment's water turbine (not visible). The discharge from the water turbine flows down through effluent pipe 1025 where it is deposited into the body of water on which the embodiment floats.

Figure 124:
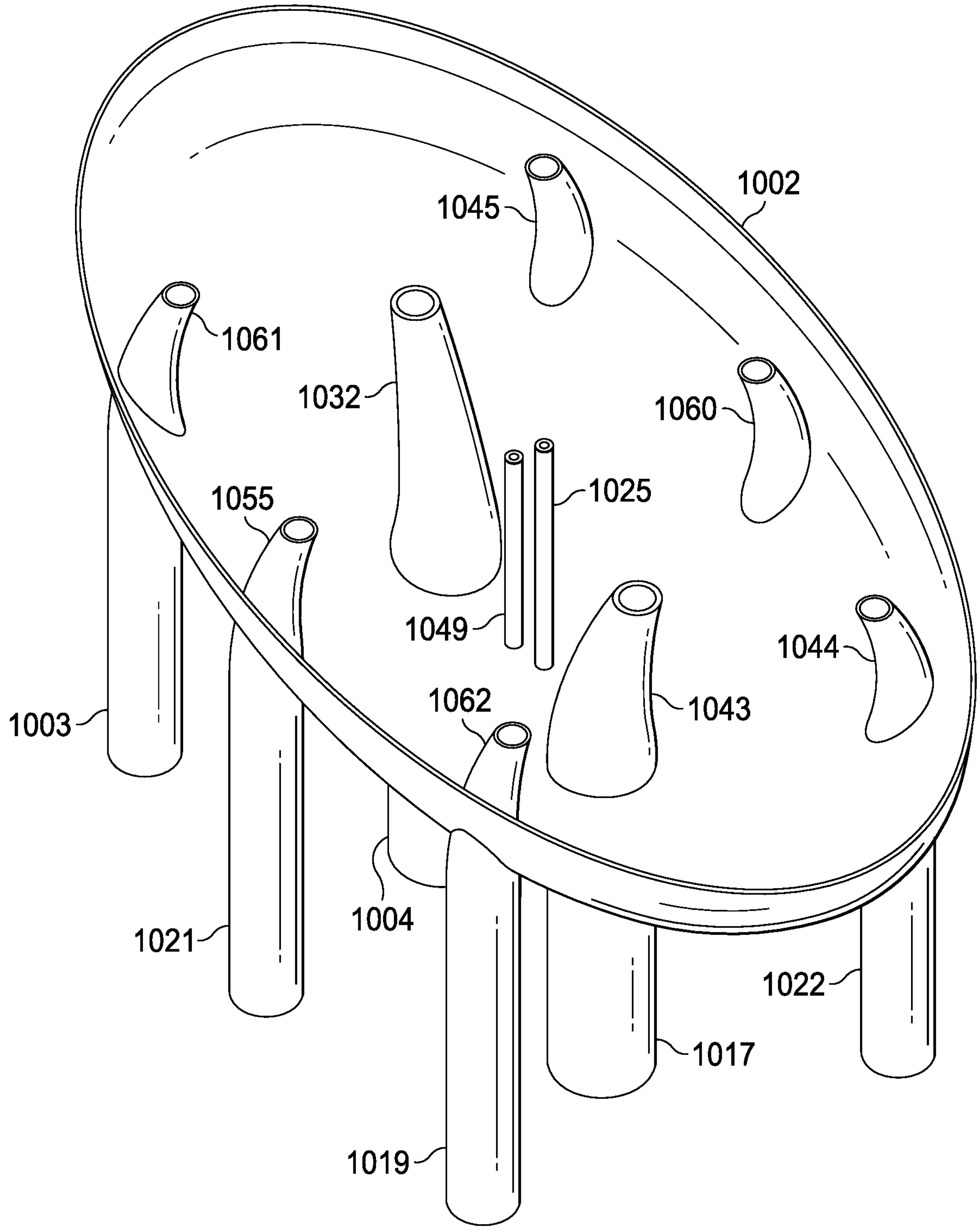

FIG. 124 shows a top-down perspective of the same sectional view illustrated in FIG. 123.

Figure 125:
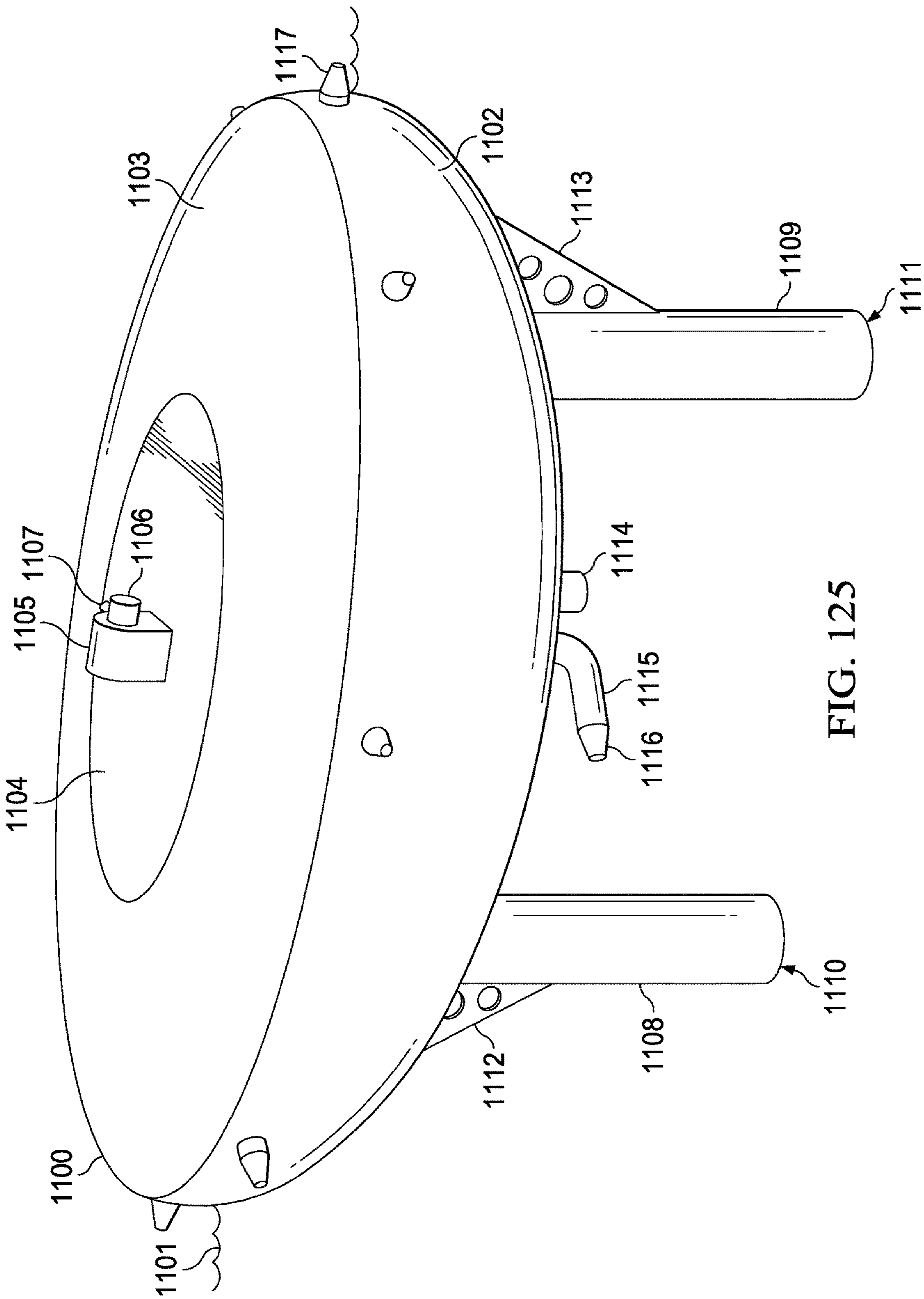

FIG. 125 shows a side perspective view of an embodiment of the current disclosure.

The embodiment 1100, after a nominal deployment and/or when positioned in a nominal operational configuration and a nominal operational environment, floats adjacent to an upper surface 1101 of a body of water over which waves at least occasionally pass. The embodiment possesses a buoy 1102-1104 comprised of three hull portions. A lower hull portion 1102 that is approximately ellipsoidal in shape. A middle hull portion 1103 that has the shape of a flattened ellipsoid. And, an upper portion 1104 which is approximately flat. Attached to the upper portion 1104 is a water turbine compartment 1105 and attached to that water turbine compartment is a generator 1106. Barely visible behind the water turbine compartment 1105 is a portion of an effluent pipe 1107 that carries away water discharged by the water turbine.

Depending from a lower portion 1102 of the buoy are two hollow tubes 1108 and 1109, each possessing a lower mouth 1110 and 1111, respectively. Providing structural stability to each tube 1108 and 1109 is a respective bracing panel 1112 and 1113. Protruding from a lower portion of the buoy hull 1102 is a water turbine pipe 1114 wherein is positioned a water turbine (160 in FIG. 130) and through which pressurized water from inside the buoy flows back to the outside and/or ambient water 1101.

Also protruding from a lower portion 1102 of the buoy hull is a water jet 1115 through which pressurized water from inside the buoy flows back to the outside and/or ambient water 1101 after first being accelerated by a nozzle 1116 positioned at an end of the jet 1115. The water jet 1115 can be rotated about an approximately vertical axis so as to generate thrust in and/or with any radial orientation and/or direction about the embodiment. The passage of water through the water jet 1115, and/or the rate at which water flows out from the water jet, is controlled by a valve that is actuated and/or controlled by the embodiment's control system (not shown).

Arrayed about the periphery of the buoy 1102-1104, and above the surface 1101 of the body of water on which the embodiment floats, are eight additional water jets, e.g., 1117, the orientations of each of which is fixed, and the passage of water through each of which, and/or the rate at which water flows out of each of which, is controlled by a respective valve that is actuated and/or controlled by the embodiment's control system (not shown). The thrust produced by the outflow of water from each peripheral water jet, e.g., 1117, tends to impart a radial and/or lateral thrust to the embodiment that tends to be normal to a vertical axis of the embodiment and/or approximately parallel to the resting surface 1101 of the body of water on which the embodiment floats and tends to push the embodiment across the surface 1101 of the body of water in a direction from each respective water jet that tends to pass through the center of the buoy, i.e., through the buoy's vertical longitudinal axis of radial symmetry.

Figure 126:
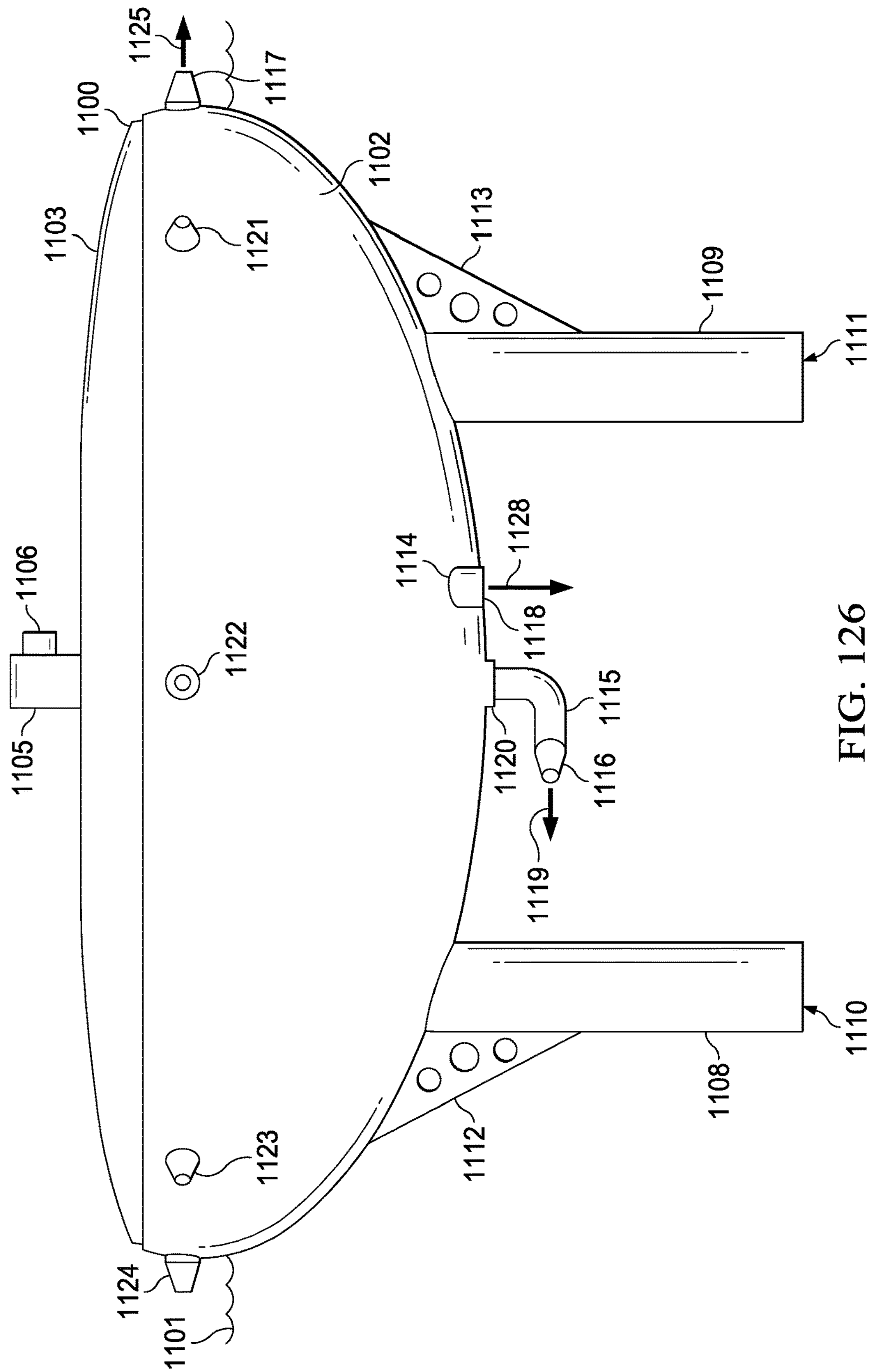

FIG. 126 shows a side view of the same embodiment of the current disclosure that is illustrated in FIG. 125.

Pressurized water within the embodiment's buoy 1102 flows 1128 through a lower mouth and/or aperture 1118 of water turbine pipe 1114 and a water turbine (not visible) therein and returns to the body of water 1101 from which it was originally captured.

In the embodiment configuration illustrated in FIG. 126, the valve regulating the flow of pressurized water originating within buoy 1102 through water jet 1115 is open thereby allowing pressurized water to flow 1119 out of the water jet's nozzle 1116, generating thrust as a result. The radial and/or directional orientation of the ejected water 1119, and the resulting direction of the resulting lateral thrust, is controlled by the embodiment's control system (not shown) through a rotational mechanism and/or motor 1120 that rotates the water jet about an approximately vertical axis approximately normal to the bottom hull 1102 of the embodiment's buoy.

Distributed about the periphery of the embodiment's buoy 1102 are eight peripheral water jets, e.g., 1117, and 1121-1124. The embodiment's peripheral water jets are fixed in position and orientation so as to always project water (when their respective flow-control valves are opened by the embodiment's control system) in a direction and/or along a vector that is substantially parallel to the resting surface 1101 of the body of water on which the embodiment 1100 floats, and is aligned in radial fashion outward from a vertical central longitudinal axis of the embodiment, and tending to generate thrust in the opposite direction.

In the embodiment configuration illustrated in FIG. 126, the valve regulating the flow of pressurized water originating within buoy 1102 through peripheral water jet 1117 is open thereby allowing pressurized water to flow 1125 out of the water jet and thereby to generate thrust pushing the embodiment in a direction opposite that of the flow and/or jet (i.e., pushing the embodiment to the left with respect to the embodiment orientation illustrated in FIG. 126).

Figure 127:
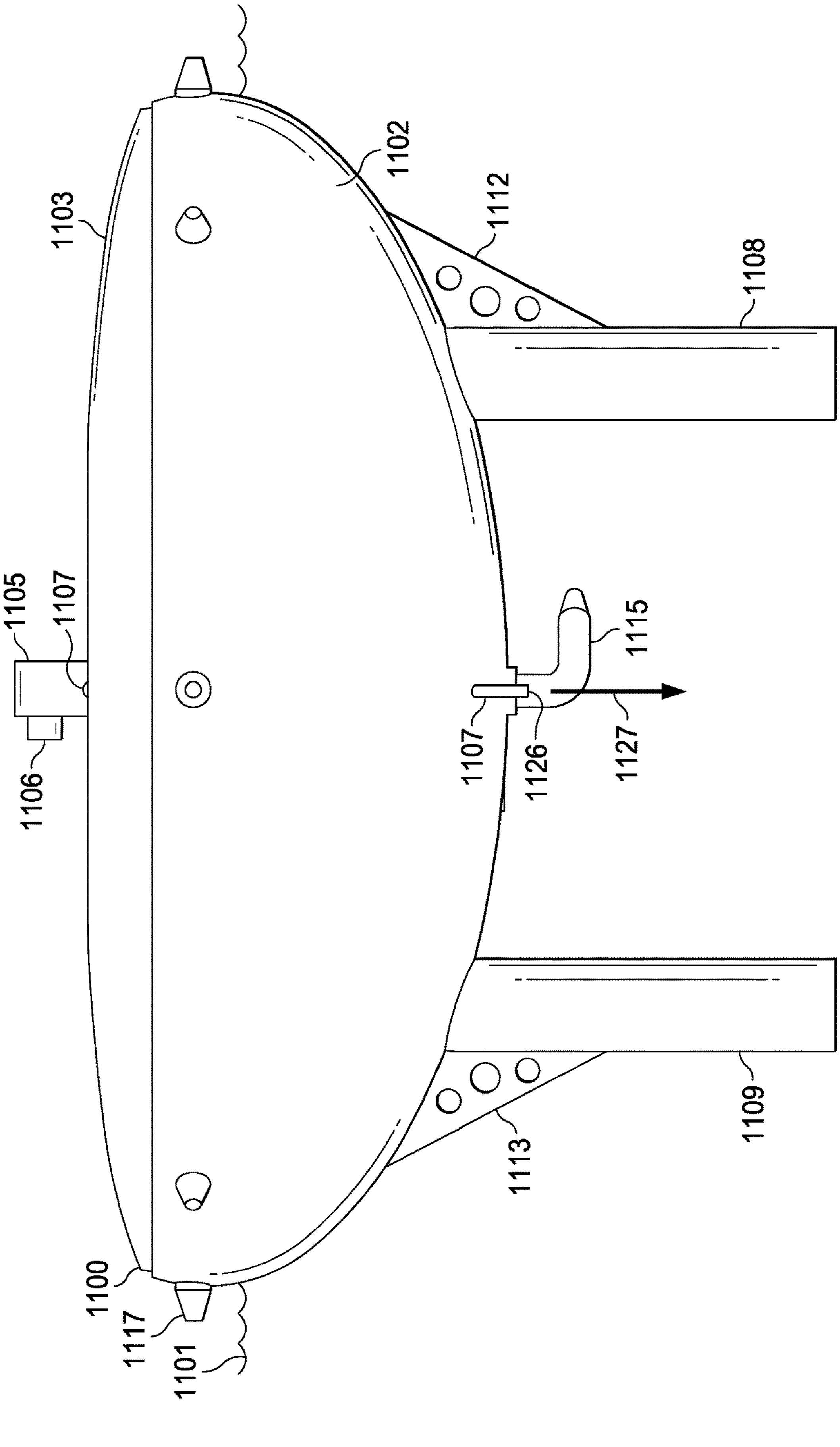

FIG. 127 shows a side view of the same embodiment of the current disclosure that is illustrated in FIGS. 125 and 126.

After pressurized water from within the embodiment's buoy 1102 flows up to and through the water turbine (not visible) within the water turbine compartment 1105, thereby causing the operatively connected generator 1106 to generate electrical power, it then flows out and down through effluent pipe 1107, passing out of the pipe through the pipe's lower mouth and/or aperture 1126 and flowing 1127 back into the body of water 1101 on which the embodiment floats.

Figure 128:
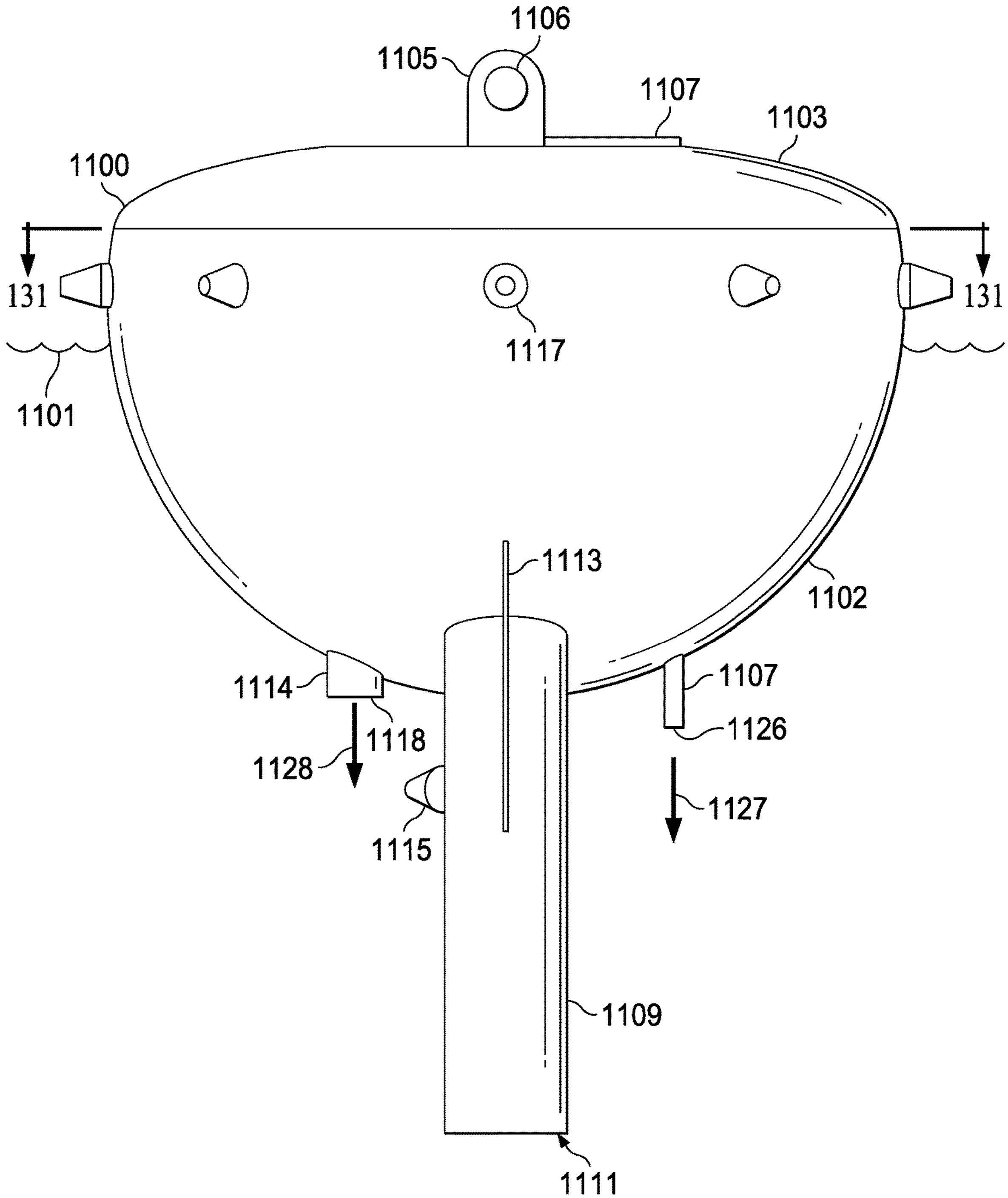

FIG. 128 shows a side view of the same embodiment of the current disclosure that is illustrated in FIGS. 125-127.

Figure 129:
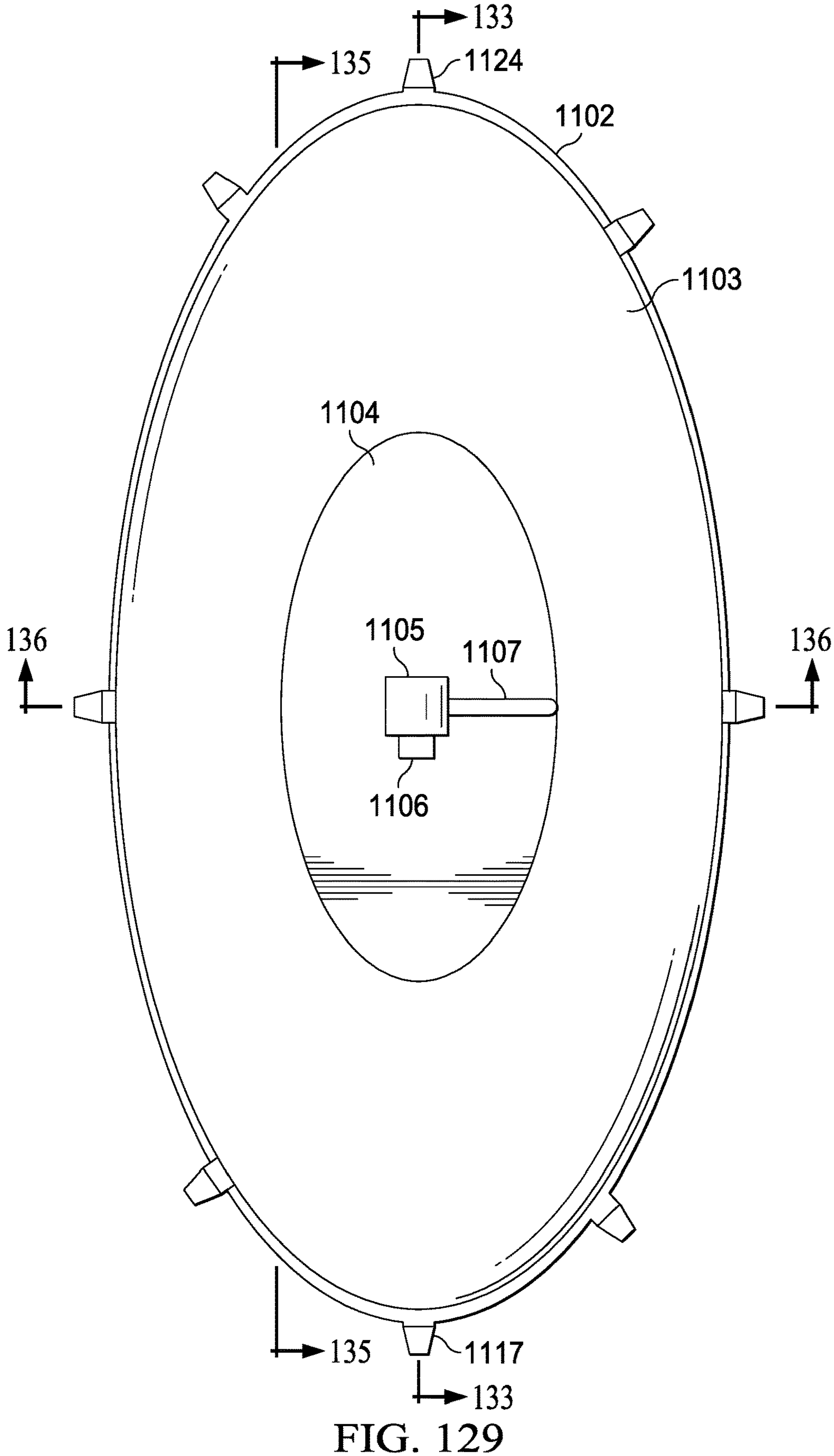

FIG. 129 shows a top-down view of the same embodiment of the current disclosure that is illustrated in FIGS. 125-128.

Figure 130:
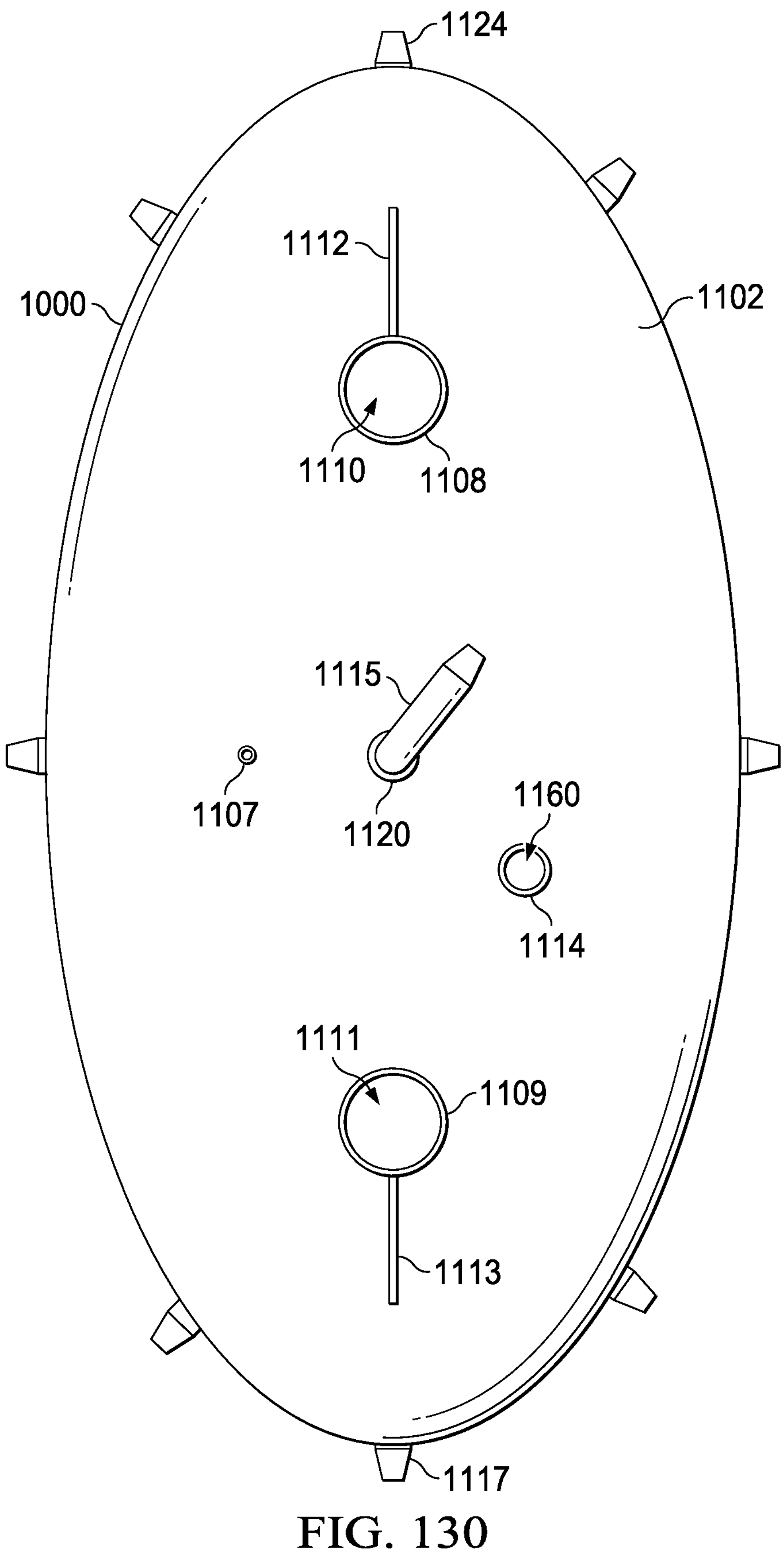

FIG. 130 shows a bottoms-up view of the same embodiment of the current disclosure that is illustrated in FIGS. 125-129.

Water turbine 1160 is positioned within water turbine pipe 1114 and is made to rotate when water flows out of the embodiment's low-energy water reservoir and into the body of water 1101 on which the embodiment floats. Rotations of the water turbine 1160 cause an operatively connected generator to generate electrical power.

FIG. 131 shows a top-down sectional view of the same embodiment of the current disclosure that is illustrated in FIGS. 125-130, where the section is taken along the section line 131-131 specified in FIG. 128.

The embodiment 1100 incorporates two hollow inertial water tubes 1108 and 1109, each of which has a bottom portion that is approximately cylindrical. However, the upper portion of each inertial water tube penetrates the bottom hull 1102 of the buoy after which each tube narrows and bends toward the lateral and/or horizontal center of the buoy. The bottom approximately half of each inertial water tube is removed above what is the nominal height of an internal reservoir of water that tends to be positioned in a lower portion 131 of the hollow interior of the embodiment's buoy 1102.

Water ejected 1151 from either tube with an abundance of speed will tend to follow the curving upper wall of the tube and thereafter be propelled laterally toward a central raised second water reservoir 1132 into which a portion of that water will tend to fall and join the water 1133 already contained within said raised reservoir 1132.

By contrast, water ejected from either inertial water tube with a paucity of speed, and/or with very little remaining kinetic energy, will tend to fall through and/or out of the missing bottom half of the curved upper portion of each respective inertial water tube. Such low-energy water will tend to fall into the bottom water reservoir 1131.

The use of a "split" curved upper portion within each inertial water tube allows the embodiment to collect water ejected with a relatively large amount of energy in a water reservoir 1132 that is raised and/or positioned so as preserve a substantial portion of that water's energy as gravitational potential energy and/or head pressure. The split curved upper portion within each inertial water tube also allows the embodiment to collect water ejected with a relatively small amount of energy in a substantially lower water reservoir 1131 positioned so as preserve in the ejected water a significantly lower amount of gravitational potential energy and/or head pressure.

The alternative to using inertial water tubes with split curved upper portions is to use inertial water tubes with integral lateral and/or outer tube walls and with flow-normal mouths. The lengths, orientations, and designs of such "one-mouth" inertial water tubes will tend to eject water possessing and/or manifesting at least a requisite level of energy (e.g., kinetic energy, speed, momentum, etc.). Water rising within the respective inertial water tubes that possesses less energy will not be ejected and will not add to the volume of water within the embodiment's water reservoir. Water rising with a level of energy (e.g., kinetic energy, speed, momentum, etc.) that is significantly greater than the level required to achieve ejection will add to, and/or increase, the volume of water within the embodiment's water reservoir, but the surplus energy available at the time of its ejection will be lost as that water falls into the water reservoir thereby sacrificing much of its available gravitational potential energy.

An embodiment of the present disclosure may include, incorporate, and/or utilize, any number of water reservoirs, positioned at different relative heights, and/or at different heights above the surface of the water on which the embodiment floats, and may utilize any type, design, and/or configuration of inertial water tube to direct ejected water of differing energies into the water reservoir that causes the least amount of gravitational potential energy to be wasted.

Water 1131 trapped, stored, captured, and/or cached, within the lower low-energy water reservoir 1131 flows out through a hole, pipe, aperture, and/or portal (1114 in FIG. 128) in a bottom-most portion of the buoy's hull 1102 where it tends to rotate a first water turbine positioned therein thereby causing a first operatively connected generator 1134 to generate electrical power.

Water 1133 within the higher, raised, and/or elevated, high-energy water reservoir 1132 flows into a mouth of a water turbine ingress pipe 1135 after which it flows upward and engages a second water turbine (not visible) positioned within the embodiment's water turbine compartment (1105 in FIG. 128) after which the water flows through effluent pipe 1107, which passes through the hull 1102, and releases the water by allowing it to flow (1127 in FIG. 128) back into the body of water (1101 in FIG. 128) on which the embodiment floats. The rotations of the embodiment's second water turbine cause a second operatively connected generator (1106 in FIG. 128) to generate electrical power.

By permitting both high- and low-energy water to be captured within separate water reservoirs within its buoy 1102, the embodiment 1100 increases the volume of water that it collects (e.g., by collecting low-energy water that would have otherwise failed to be ejected) as well as preserving and converting to electrical power both the greater and lesser potential energies of the captured waters.

Those skilled in the art will understand that there are a large number of configurations that enable the collection of water in two or more water reservoirs each having different water surface levels, all of which configurations are included within the scope of this disclosure.

FIG. 132 shows a side perspective of the same sectional view illustrated in FIG. 131.

Outside and/or below the lower hull 1102 of the embodiment's buoy, each of the embodiment's inertial water tubes, e.g., 1108, is approximately cylindrical. However, after entering and/or passing into the interior of the buoy, each inertial water tube narrows, which tends to accelerate water rising through the inertial water tube, and each inertial water tube bends toward the other inertial water tube and/or toward the middle of the buoy. For instance, outer cylindrical tube 1108 bends and narrows 1129 within the buoy's interior. Above the nominal surface 1131 of the low-energy water reservoir, and/or above the nominal waterline 1137 of the low-energy water reservoir 1131 against the upper portion 1129 of the inertial water tube, the upper half 1138 of that inertial water tube is present, but the lower half 1139 of that inertial water tube is removed and/or missing. Thus, high-speed, high-energy water rising through the tube 1129 will be guided by the curving upper half of the tube and a portion of that water may fall into the high-energy water reservoir 1132. And, low-speed, low-energy water rising through the inertial water tube 1129 will be able to "spill out of" the missing lower half 1139 of the upper portion of the inertial water tube, and will tend to fall into the low-energy water reservoir 1131.

The raised, high-energy water reservoir 1132 is supported, at least in part, by vertical struts, e.g., 1140.

Water from the high-energy water reservoir 1132 flows up through water turbine ingress pipe 1135 and imparts a portion of its energy to the embodiment's high-energy and/or second water turbine (not visible) and it then falls through effluent pipe 1107 through which it flows back into the water outside the embodiment. Water from the low-energy reservoir 1131 flows out into the water outside the embodiment through water turbine pipe and/or portal 1114, imparting a portion of its energy to the embodiment's low-energy and/or first water turbine therein, which imparts rotational kinetic energy to its attached shaft 1141, which, in turn, causes the operatively connected generator 1134 to generate electrical power.

FIG. 133 shows a side sectional view of the same embodiment of the current disclosure that is illustrated in FIGS. 125-132, where the section is taken along the section line 133-133 specified in FIG. 129.

As the embodiment 1100 moves up and down in response to waves passing at the surface 1101 of the body of water on which the embodiment floats, water 1142 and 1143 within each of the embodiment's respective two inertial water tubes 1108 and 1109 tends to move up and down, causing water to move 1144 and 1145, respectively, in and out of each inertial water tube's respective lower mouth 1110 and 1111, and causing the respective upper surfaces 1146 and 1147 of that water to move 1148 and 1149 up and down. As the upper surfaces 1146 and 1147 of the water 1142 and 1143, respectively, in each inertial water tube, moves up and down, a portion of that water tends to occasionally be ejected, e.g., 1150 and 1151, from an upper end of each inertial water tube. Because of the open channel created at the bottom of the upper portion of each inertial water tube, through the removal of the bottom halves of those respective uppermost inertial water tube portions, e.g., 1138, water can exit the end of each inertial water tube with a range of speeds, and can collide with the interior of the buoy 1102 at a range of distances and heights from each inertial water tube.

Water ejected from each inertial water tube, e.g. 1129, with a relatively small amount of energy and/or speed may exit its respective inertial water tube at a relatively low height, and/or with a relatively low speed, e.g., 1150, thereby tending to fall only a short distance from the inertial water tube, and likely falling into the low-energy water reservoir 1131. On the other hand, water ejected from each inertial water tube, e.g. 1129, with a relatively great amount of energy and/or speed may exit its respective inertial water tube at a high elevation and with significant speed, e.g., 1151, and a portion of that water will likely fall into the raised, high-energy water reservoir 1132, thereby preserving at least a portion of the relatively high energy of that ejected water as additional gravitational potential energy and/or head pressure, i.e., with respect to the amount of gravitational potential energy and/or head pressure preserved by the low-energy reservoir 1131.

Water 1133 contained, trapped, stored, and/or cached, within the high-energy water reservoir 1132 may enter a water turbine ingress pipe (not visible) and then pass through a second water turbine 1152, thereby causing an operatively connected generator 1106 to generate electrical power, and thereafter flowing through effluent pipe 1107 so as to return to the body of water 1101 outside the embodiment.

When the flow valve controlling the flow of water through a peripheral water jet, e.g., 1117, is opened by the embodiment's control system (not shown) a portion of the pressurized water in the embodiment's low-energy water reservoir 1131 enters 1153 the water jet and subsequently flows through the water jet's nozzle and is accelerated 1154, generating thrust in the process. When the flow valve controlling the flow of water through a peripheral water jet, e.g., 1124, is closed by the embodiment's control system (not shown), water is unable to flow through and/or out of the water jet's nozzle. When the embodiment's control system opens a water jet's flow valve to an intermediate degree, the amount and/or rate of water flow from the jet can be adjusted to create an intermediate degree of thrust.

FIG. 134 shows a side perspective of the same sectional view illustrated in FIG. 133.

FIG. 135 shows a side perspective sectional view of the same embodiment of the current disclosure that is illustrated in FIGS. 125-134, where the section is taken along the section line 135-135 specified in FIG. 129.

As water is added to either or both of the high- 1132 and/or low-energy 1131 water reservoirs, the air 1155 trapped within the buoy's 1102/1103 interior is compressed thereby increasing its pressure. The raised pressure of that air 1155 adds to the force propelling water into both the low-energy first water turbine (not visible, inside the water turbine pipe 1114) and the high-energy second water turbine (not visible, inside the water turbine compartment 1105).

The cutaway 1156, removed, and/or missing lower half of the inertial water tube 1109 is visible in the illustration of FIG. 135.

FIG. 136 shows a side sectional view of the same embodiment of the current disclosure that is illustrated in FIGS. 125-135, where the section is taken along the section line 136-136 specified in FIG. 129.

Water captured in the raised, high-energy water reservoir 1132, at least in part in response to the raised air pressure within the buoy 1102/1103, enters a lower mouth 1157 of water turbine ingress pipe 1135 after which it passes to and through the water turbine 1152 and imparts energy to it. After flowing through water turbine 1152, the water then flows through effluent pipe 1107 down into the body of water 1101 on which the embodiment 1100 floats.

FIG. 137 shows a side perspective of the same sectional view illustrated in FIG. 136.

FIG. 138 shows a side perspective view of an embodiment of the current disclosure.

This embodiment is comprised of two primary components, a nominally buoyant (i.e. prone to floating in a fluid) oblate spheroid structure 1200 and three (other embodiments may have more or less) hollow inertial water tubes, e.g. 1201. Flotation collar 1207 (also called buoyancy band 1207) imparts additional buoyancy to the structure and may be comprised of foam, encapsulated air (e.g. encapsulated in hollow steel structures), or any substance and/or structural element less dense than water.

Waves present in body of water 1206 impart a vertical force onto upper hull enclosure or flotation module 1200, causing it to oscillate and/or perturbate in a motion that is approximately perpendicular to the surface of body of water 1206. As 1206 oscillates, water from below inertial water tubes, e.g. 1201, enters and exits (1208) through open tube bottoms, e.g. 1202. The water preferentially moves upward, resulting in a net flow through the inertial water tubes, e.g. 1201, towards the structure 1200. The frustoconical bell shape of inertial water tubes, e.g. 1201, which has decreasing transverse and/or flow-normal cross-sectional area relative to an upward direction of water movement, helps to excite the oscillatory net flow in inertial water tubes, e.g. 1201. If the upward movement of the fluid in one or more of the inertial water tubes, e.g. 1201, is of sufficient amplitude, a portion of the fluid will pass above the surface 1206 of the body of water, through the curved portions of the inertial water tubes, e.g. 1203, and will enter the hollow structure and/or flotation module of 1200 where the inertial water tubes, e.g. 1203, enter that structure (e.g. at penetration location 1204).

The addition of water from the body of water 1206 to the interior chamber of the hollow flotation module 1200 will reduce the volume of, and/or compress, the air in that chamber, thereby increasing the pressure of that air. This additional air pressure allows the water inside the hollow flotation module to be released to the outside of the hollow flotation module with positive flow rate and pressure, thus providing power. This power may be used to drive a turbine, pump, motor, or can be sprayed in such a way as to provide thrust. The air can also be sprayed into the atmosphere (e.g. using aerosolization nozzles) to provide cloud nucleation sites thereby tending to increase cloud albedo. The following figures will indicate that the particular embodiment shown uses a turbine that is used to harness power from the embodiment's pressurized water and to generate electricity and also has a method for providing thrust to the embodiment.

Computer chamber 1209 contains electronics which may include power conditioning equipment, computers for controlling the functions of the embodiment, or networks of computers used for high performance computation, including processing computational tasks or instructions received by various remote communications means (such as radio signals). Computer chamber 1209 is nominally waterproof and/or hermetically sealed. Phased array antenna 1210 is used to wirelessly communicate (e.g. transmit and/or receive data and/or signals) with satellites, drones, airplanes, spaceplanes, helicopters, kites, balloons, blimps, boats, terrestrial/ocean based antennas through any of the various bands in the electromagnetic spectrum, but preferentially in the frequency ranges defined as radio, microwave, infrared, and/or visible light. Phased array antenna 1210 can contain additional radio antennas, LEDs, and/or any other means of producing electromagnetic radiation in the aforementioned frequency ranges.

FIG. 139 shows a side view of the same embodiment of the current disclosure that is illustrated in FIG. 138.

FIG. 140 shows a front view of the same embodiment of the current disclosure that is illustrated in FIGS. 138 and 139.

Water contained in hollow flotation module 1200 which is pressurized, at least in part, by compressed air, is forced to exit (1212) the interior of the hollow flotation module 1200 through water turbine 1211. If the compressed air exceeds a pre-determined threshold pressure, valve 1213 may actively open through a command from the embodiment's control system housed in 1209 or it may passively open in direct response to the excessive pressure. This action would allow pressurized air to escape until a desired and/or nominal pressure was restored to the interior of the hollow flotation module 1200.

FIG. 141 shows a top-down view of the same embodiment of the current disclosure that is illustrated in FIGS. 138-140.

FIG. 142 shows a bottom-up view of the same embodiment of the current disclosure that is illustrated in FIGS. 138-141.

Hollow inertial water tubes, e.g. 1201, are rigidly linked together by coupling 1215 proximate to their bottom ends and/or near their lower tube openings and/or mouths, e.g. 1202.

FIG. 143 shows a vertical cross section of the same embodiment illustrated in FIGS. 138-142, with the section plane taken across line 143-143 in FIG. 139.

The surface 1206 of water outside the embodiment, as well as the oscillating surface 1227 of the water within inertial water tube 1201 are illustrated in FIG. 143. Water which achieves sufficient oscillation amplitude, and/or upward speed and/or momentum will be ejected, e.g., 1221, from the upper mouths, e.g., 1205, of the respective inertial water tube openings, and then fall and/or flow into the interior of the hollow flotation module 1200 forming a water reservoir 1218 therein. Upper mouths, e.g. 1205, can be referred to as injection orifices. Note that they are spaced from a bottom wall, or floor, of the interior of the hollow flotation module 1200, so that the possibility of backflow is reduced or eliminated.

The surface 1218 of water accumulated within buoy 1200 is shown to be lower than that of the external body of water 1206. This configuration provides additional buoyancy to the embodiment, in addition to or instead of that provided by buoyancy band 1207. (In some embodiments, enough "permanent buoyancy" such as buoyancy band 1207 can be provided such that interior waterline 1218 will nominally be at approximately the same vertical level as mean external-body-of-water waterline 1206, or above mean external-body-of-water waterline 1206.) Water accumulated, stored, captured, cached, and/or trapped, within the embodiment's water reservoir 1218 will cause the gas (air, nitrogen, argon, etc.) within an upper portion of the interior chamber 1222 of the hollow flotation module to increase in pressure as more water enters the chamber and is added to the water reservoir. The pressurized air within the interior chamber 1222 of the hollow flotation module exerts a force on the water 1218, allowing and/or compelling it to pass through water turbine 1211 and back into the body of water 1206 on which the embodiment floats. The water turbine 1211 spins and causes an attached turbine shaft 1216 to rotate. This rotation energizes generator 1219, thereby causing the generator to generate electricity. Water turbine 1211 spins within an aperture and/or hole within a lower portion of the hollow flotation module's wall. Similarly and alternately, a magnetohydrodynamic generator can be employed in place of the water turbine 1211 and generator 1219, to generate electrical power from a flow of water 1212 forced out of the interior chamber 1222.

Generator 1219 is housed in a chamber 1217 that is watertight with respect to its lateral and upper walls, and which is filled with air, nitrogen, argon, or some other gas. The water within the embodiment's water reservoir 1218 is excluded from an upper portion of the generator chamber 1217 due to the trapped bubble of gas therein, and the water therefore forms a surface 1225 within the generator chamber at a position and/or level below the generator. The generator is thus surrounded by air and is protected from damage that might result from its immersion in water. Through the use of the air-filled generator chamber, a less-expensive generator (e.g., one not designed for submersion in water) may be used thereby reducing the cost of the embodiment.

The airtight chamber 1217 is supported by a spar 1220, which also contains power transmission cables which bring power up from the generator to equipment and computers contained in computer chamber 1209. This electricity also powers the phased array antenna 1210.

Valve 1223 can be actuated on command or passively, so as to allow and/or cause pressurized water to be ejected 1224 into the body of water 1206 on which the embodiment floats. Such an ejection of water from the water reservoir 1218 tends to lower the pressure and level 1218 of the water within the interior chamber 1222 of the hollow flotation module. The reaction force from the ejection 1224 of water from valve 1223 tends to impart an acceleration to the embodiment causing it to move laterally across the surface 1206 of the body of water on which the embodiment floats.

Note that some embodiments will include and/or incorporate a cylindrical tube at the bottom of each of the angled inertial water tubes, e.g., 1201, such that an upper portion of each of the inertial water tubes has a decreasing transverse and/or flow-normal cross-sectional area relative to water movement in an upward direction within the inertial water tubes, whereas a bottom portion of each of the inertial water tubes has a nondecreasing transverse and/or flow-normal cross-sectional area relative to water movement in an upward direction within the inertial water tubes.

FIG. 144 shows a perspective view of the vertical cross section illustrated in FIG. 143.

FIG. 145 shows a horizontal cross section of the same embodiment illustrated in FIGS. 138-144, with the section plane taken across line 145-145 in FIG. 139.

FIG. 146 shows a perspective view of the horizontal cross section illustrated in FIG. 145.

FIG. 147 shows a detail view of the same embodiment illustrated in FIGS. 138-146.

Individual antenna nodes (e.g., individual dipole antennas) of phased army antenna 1210 are resolved in this figure. In addition to facilitating the transmission and receipt of radio signals, each antenna node also includes, incorporates, and/or utilizes, one or more LEDs 1229 attached and/or connected to an upper end of each antenna node. The LEDs attached to the antenna nodes can be used individually or in harmony and/or synchrony for signaling, communication, data transmission, etc. The array of LEDs may also be used as or as part of an optical phased array whose coordinated flashing promotes the propagation of light signals preferentially in a chosen or dynamically computed direction, e.g. toward a moving satellite or aircraft.

FIG. 148 shows a side view of an embodiment of the current disclosure.

Embodiment 1300 includes an approximately spherical flotation module 1302 whose skin or outer surface is substantially impervious to water and gases. Depending from spherical flotation module 1302 is a hollow inertial water tube 1303/1304 whose top portion 1303 is tapered and/or constricted, and whose bottom portion 1304 is approximately cylindrical. The bottommost portion of bottom inertial water tube portion 1304 is open to the body of water forming an approximately circular lower mouth 1305 through which water can pass upwardly and downwardly, in and out of the interior of the inertial water tube 1304. The interior of hollow inertial water tube 1303/1304 is therefore open to the body of water at 1305, and is also open to the hollow interior of spherical flotation module 1302, except that a first one-way valve (not shown) is located in inertial water tube neck 1337 and tends to permit the flow of fluid from the inertial water tube into the interior of the spherical flotation module 1302, and tends to obstruct the flow of fluid from the interior of spherical flotation module 1302 into the inertial water tube 1303/1304.

The first one-way valve, positioned in neck 1337, is configured to allow fluid to pass preferentially in an upward direction, i.e., from the interior of inertial water tube 1303/1304 into the interior hollow cavity of spherical flotation module 1302. In some embodiments, the one-way valve allows approximately no fluid to pass in the reverse direction (from the interior of structure 1302 into the interior of inertial water tube 1303/1304). In some embodiments, the valve allows some fluid to pass in this reverse direction, although the valve is preferential to fluid passage in the upward direction.

Propeller 1308 is driven by a hydraulic motor or turbine (not shown) that is powered by the flow of pressurized water out from the interior of the spherical flotation module 1302 and back to the body of water 1301 via propeller effluent pipe 1309.

A second one-way valve 1306, positioned within an upper portion of the inertial water tube, allows water to pass from the body of water 1301 into the interior of hollow inertial water tube 1303/1304 and is configured to disallow water to pass in the reverse direction.

Embodiment 1300 floats on body of water 1301 when in its nominal operational configuration, and in the operational configuration shown, has a draft on its spherical hollow structure corresponding to approximately one radius of said structure.

FIG. 149 shows a side perspective of a sectional view of the embodiment illustrated in FIG. 148.

First one-way valve 1307 is shown at the neck, and/or junction, 1337 where the inertial water tube and the spherical flotation module 1302 connect and is of a flap type. It allows fluid to pass preferentially from inertial water tube 1303/1304 into the interior of spherical flotation module 1302, e.g. when the pressure of fluid inside said inertial water tube just below neck 1337 is greater than the pressure of fluid in the bottommost part of the hollow interior of spherical flotation module 1302.

When the embodiment oscillates vertically due to forces imparted by waves traversing the surface 1301 of body of water on which the embodiment floats, the inertia of the water inside the inertial water tube 1303/1304 tends to cause that water to lag the oscillations of the embodiment, and/or to oscillate out of phase with the oscillations of the embodiment.

Consequently, especially (but not exclusively) when the embodiment is accelerating upwardly, a low-pressure region can develop in an upper portion of the tapered portion 1303 of the inertial water tube, tending to cause the second one-way valve 1306 to crack and/or open, allowing water to flow from the body of water 1301 on which the embodiment floats into the upper tapered portion 1303 of the inertial water tube. Subsequently, especially (but not exclusively) when the embodiment is accelerating downwardly, a high-pressure region can develop in an upper portion 1303 of the inertial water tube, causing the first one-way valve 1307 to crack and/or open, thereby allowing water to flow from the upper tapered portion 1303 of the inertial water tube into the hollow interior of the spherical flotation module 1302.

Accordingly, the embodiment acts like a pump, pumping water into the hollow interior of its spherical flotation module 1302, and compressing the volume of gas 1315 therein, thereby raising the pressures of both the gas and the water 1313 within the spherical flotation module.

In some embodiments, first one-way valve 1307 is replaced with other kinds of one-way or check valves (e.g. ball check valves, swing check valves, Tesla valvular conduits, or fixed-geometry passive check valves other than the Tesla valvular conduit). In some embodiments, second one-way valve 1306 is replaced with other kinds of one-way or check valves (e.g. ball check valves, swing check valves, Tesla valvular conduits, or fixed-geometry passive check valves other than the Tesla valvular conduit).

When the water accumulated within the embodiment's water reservoir 1313 achieves an elevated pressure, it has a tendency to flow outwardly into the body of water 1301 via any apertures in spherical flotation module 1302 that are available to it. In this embodiment, two such apertures are provided.

First, the pressurized water within the embodiment's water reservoir 1313 can flow outwardly via propeller motor 1320, which is fed and/or energized with pressurized water via propeller inlet pipe 1321, exhausts effluent water to the body of water 1301 on which the embodiment floats via propeller effluent pipe 1309, and includes a hydraulic motor or water turbine that converts energy from the flow of water through it into shaft power that drives propeller 1308, thereby propelling the embodiment across the surface 1301 of the body of water on which it floats. In other words, propeller 1308 is powered using mechanical power drawn directly from a flow of pressurized water that originates from within the embodiment's spherical flotation module 1302.

Second, the pressurized water within the embodiment's water reservoir 1313 can flow outwardly via turbine assembly 1310, which consists of an open conduit through which water can pass from the interior of spherical flotation module 1302 to the body of water 1301 on which the embodiment floats. The conduit through turbine assembly 1310 that connects the interior of spherical flotation module 1302 to the body of water 1301 on which the embodiment floats is partially obstructed by a water turbine 1311 (not resolved in detail in FIG. 149), said water turbine being operatively connected to an electrical generator 1312 via a turbine shaft. Electrical generator 1312 generates electricity in response to a flow of water through turbine assembly 1310 which is used to power the integrated bank of computers, navigational system, and radio system all situated in computer chamber 1319.

FIG. 150 shows a close-up side sectional view of the embodiment illustrated in FIG. 149. Second one-way valve 1306 allows water to pass from the body of water on which the embodiment floats into the interior of the inertial water tube 1303 but does not allow (or does not allow to the same degree) water to pass in the reverse direction. When second one-way valve 1306 cracks and/or opens, water flows from the body of water through said valve, then through conduit 1322, before entering the interior of inertial water tube 1303 via conduit mouth 1323.

FIG. 151 shows a close-up perspective view of the sectional view of the embodiment illustrated in FIG. 150.

Figure 204:
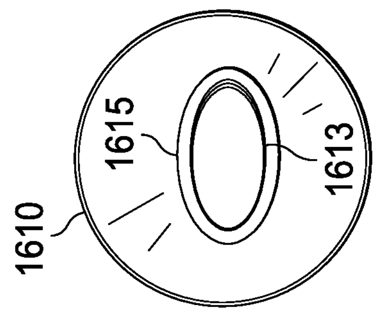

FIGS. 152-204 show a variety of types of "constricted tubes", "spouts", and/or inertial water tubes (particularly concentrating on the uppermost portions thereof), that can be included, incorporated, and/or utilized, within an embodiment of the current disclosure. These tubes, and others not shown, tend to accelerate water upwardly into an embodiment's pressurized or unpressurized water reservoir when used as part of, or in conjunction with, the embodiments of this disclosure (and/or as part of, or in conjunction with, other similar embodiments that are variants, combinations, and/or modifications of the embodiments of this disclosure). Embodiments including, incorporating, and/or utilizing, any type, design, size, location, and/or configuration, of inertial water tube are included within the scope of the present disclosure. Embodiments of the present disclosure may include, incorporate, and/or utilize, one or more inertial water tubes of any shapes, dimensions, designs, and/or geometrical configurations. An embodiment of the present disclosure may include, incorporate, and/or utilize, any structure, channel, aperture, mechanism, device, method, and/or means, to entrain, contain, and/or cache, a body of water that is relatively free to move up and down with substantial independence of the embodiment in and/or by which it is entrained, and to cause at least a portion of that entrained water to be lifted to, and/or ejected from, a mouth, orifice, aperture, and/or opening, positioned at a height that is nominally and/or usually above the surface of the body of water on which the embodiment floats.

The types of constricted tubes shown (and/or other similar types of constricted tubes that are not shown and are variants or modifications of the illustrated types of constricted tubes) can be used to replace (with appropriate modifications, including introducing one or more curvatures) the uppermost portion, and/or an upper portion, of the following components of the embodiments of this disclosure: (1) the inertial water tube 102 of the embodiment of FIG. 1, (2) the inertial water tube 202 of the embodiment of FIG. 14, (3) the inertial water tube 302 of the embodiment of FIG. 21, (4) either or both of tube channels 345 and 346 of inertial water tube 321 of the embodiment of FIG. 32. (5) any of the inertial water tubes 406, 407, etc., of the embodiment of FIG. 35, (6) the inertial water tube 526 of the embodiment of FIG. 51, (7) inertial water tube 645 of the embodiment of FIG. 60, (8) centrally positioned inertial water tube 720, 722 and 723 of the embodiment of FIG. 75, (9) any of the upper extents, segments, and/or portions, e.g. 806, of inertial water tube 803 of the embodiment of FIG. 87, (10) inertial water tube 903 of the embodiment of FIG. 100, and so forth with respect to other embodiments of this disclosure.

In each case, the decreasing horizontal cross-sectional area of the displayed inertial water tube (relative to water movement in an upward direction, i.e. relative to flow-normal and/or horizontal section planes of increasing elevation) causes upward-moving water within the inertial water tube to accelerate upward and to periodically "spill over" and/or out of an upper mouth of the inertial water tube so as to be trapped, and/or captured, within a respective water reservoir of a respective embodiment.

Most, if not all, of the types of inertial water tubes shown can be arrayed side-by-side with other different types of inertial water tubes to form a (heterogeneous) composite inertial water tubes likewise having more than one top mouth.

In the case of a composite inertial water tube, the constituent inertial water tubes of the composite inertial water tube can have geometries, constriction ratios, heights, diameters, etc., that differ from one another.

Most, if not all, of the types of inertial water tubes illustrated in FIGS. 152-204 can be arrayed side-by-side with other inertial water tubes so as to form a (homogeneous) composite inertial water tube having more than one upper mouth. Such a contiguous array of inertial water tubes might have a number of lower mouths equal to the number of upper mouths, or any lower number of lower mouths including having a single lower mouth. The current disclosure includes embodiments possessing, including, incorporating, and/or utilizing, any number of inertial water tubes, any number of inertial water tube upper mouths and/or apertures, and any number of inertial water tube lower mouths.

The inertial water tubes illustrated in FIGS. 152-204 are examples, and equally effective inertial water tubes can be created through variations, alterations, modifications, and/or combinations, of the tube shapes, dimensions, designs, and/or geometrical configurations, presented in those illustrations. Embodiments including, incorporating, and/or utilizing an inertial water tube of any type, design, size, location (within the embodiment), and/or geometrical configuration, is included within the scope of the present disclosure.

FIGS. 152-154 show an inertial water tube of a frustoconical type, in elevated perspective view (FIG. 152), side sectional view (FIG. 153), and side perspective sectional view (FIG. 154). Upper frustoconical wall 1400 extends to and/or from lower cylindrical wall 1403 and defines top mouth 1402, which is analogous to upper mouth 115 of the embodiment of FIG. 6. The upper portion 1400 of the inertial water tube has a decreasing flow-normal cross-sectional area relative to an upward direction of movement. Bottom lip 1405 can be continuous with a longer cylindrical wall or another tapered wall, with respect to an embodiment, e.g. the bottom-most third portion 104 of the embodiment of FIG. 6, or the tubular portion 803 of the embodiment of FIG. 93. In some embodiments, the cone half-angle of the frustoconical section 1400 is less than 10 degrees.

FIGS. 155-157 show an inertial water tube of a frustoconical type, in elevated perspective view (FIG. 155), side sectional view (FIG. 156), and side perspective sectional view (FIG. 157). Frustoconical wall 1411 extends down to and/or up from lower cylindrical wall 1412. Upper cylindrical wall 1410 extends down to and/or up from frustoconical wall 1411 and defines top mouth 1413. The middle portion 1411 of the inertial water tube has a decreasing flow-normal cross-sectional area relative to an upward direction of movement. In some embodiments, the cone half-angle of the frustoconical section 1411 is less than 10 degrees.

FIGS. 158-160 show an inertial water tube of a bell-shaped type, in elevated perspective view (FIG. 158), side sectional view (FIG. 159), and side perspective sectional view (FIG. 160). Curved annular wall 1422/1421/1420 forms a sloped and smooth constriction. The middle portion 1421 of the inertial water tube has a decreasing flow-normal cross-sectional area relative to an upward direction of movement. In some embodiments, the interior half-angle of the constriction is less than 10 degrees.

FIGS. 161-163 show an inertial water tube of an hourglass-shaped type, in elevated perspective view (FIG. 161), side sectional view (FIG. 162), and side perspective sectional view (FIG. 163). Curved annular wall 1431/1430/1432/1433 forms a region 1430 of decreasing flow-normal cross-sectional area and a region 1433 of increasing flow-normal cross-sectional area (relative to an upward direction of movement), separated by a neck 1432 of minimal flow-normal cross-sectional area. The flow-normal cross-sectional area at the upper mouth 1434 of the inertial water tube is smaller than the flow-normal cross-sectional area of a lower portion 1431 of the tube. In some embodiments, the interior half-angles of the constriction(s) are less than 10 degrees.

FIGS. 164-166 show an inertial water tube of a conical partial plug type, in elevated perspective view (FIG. 164), side sectional view (FIG. 165), and side perspective sectional view (FIG. 166). Inertial water tube wall 1440 forms an approximately cylindrical annulus. Solid conical plug 1441 is wholly or partially situated within a cylindrical vertical projection defined by tube wall 1440 and, together with inertial water tube wall 1440, forms an annular conduit 1443 of monotonically decreasing flow-normal cross-sectional area relative to an upward direction of movement, and hence form a kind of constricted or constricting tube even though wall 1440 is not itself constricting. Spar 1442 connects solid conical plug 1441 to a support structure (not shown) that is rigidly connected to the embodiment, e.g. to curved upper wall 119 of the embodiment of FIG. 6.

Note that the "tube" defined by tube wall 1440 of this type of inertial water tube is not itself constricted, but the partial introduction of conical plug 1441 into the inertial water tube effectively creates a constriction in the upward flow path of the water rising within the inertial water tube 1440, so that the combined apparatus can be called a constricted tube or tapered tube. Note too that the flow of water ejected from this constricted tube will tend to form an annular and/or conical sheet.

In some embodiments of the current disclosure, the spar 1442 can be lowered and raised, e.g. by a motor in response to signals generated by an embodiment's control system, so as to increase and decrease, respectively, the degree of tube constriction.

FIGS. 167-170 show an inertial water tube of a partial plug type, in elevated perspective view (FIG. 167), side sectional view (FIG. 168), side perspective sectional view (FIG. 169), and bottom-up view (FIG. 170). Inertial water tube wall 1450 forms an approximately cylindrical annulus. Solid plug 1451 is wholly or partially situated within vertical projection defined by tube wall 1450 and, together with tube wall 1450, forms an annular conduit of decreasing flow-normal cross-sectional area relative to an upward direction of movement and/or flow.

A lower portion 1453 of plug 1451 is approximately conical with its tip pointed downward. A middle portion 1451 of plug 1451 is cylindrical with its longitudinal axis oriented vertically and approximately coaxial with a longitudinal axis of the cylindrical wall 1450. An upper portion 1452 of plug 1451 forms a tapered water diverter than serves to direct a portion of an upward water flow laterally (i.e. radially outward from the inertial water tube).

The annular conduit defined by tube wall 1450 and solid plug 1451 is at first decreasing in flow-normal cross-sectional area in the region of the conical portion of the plug, relative to an upward direction of movement and/or flow, and then approximately constant in flow-normal cross-sectional area in the region of the cylindrical portion 1451 of the plug, relative to an upward direction of movement and/or flow. Five radial fins, e.g., 1454, rigidly connect the plug 1451 to the tube wall 1450.

FIGS. 171-173 show an inertial water tube of a conical partial plug type, in elevated perspective view (FIG. 171), side sectional view (FIG. 172), and side perspective sectional view (FIG. 173). Approximately cylindrical tube wall 1460 (which, like all inertial water tube configurations discussed herein, is continuous with a longer, straight or tapered, tube that extends downwardly from the bottom lip and/or mouth of the cylindrical tube wall 1460) forms a cylindrical channel through which water can flow upwardly and downwardly. Frustoconical annular tube wall 1461 is continuous with cylindrical tube wall 1460 and forms a conduit with an expanding diameter (relative to an upward direction of movement and/or flow). Inserted into this conduit is an approximately conical plug 1462. The annular conduit 1465 formed between the tube walls 1460/1461 and the conical plug 1462 has a flow-normal cross-sectional area that decreases relative to an upward direction of movement and/or flow. A water flow moving upwardly through this annular conduit 1465 will tend to have an outward radial (horizontal) component to its momentum as it exits the uppermost mouth and/or part of the conduit. Note that this inertial water tube forms a constricted or constricting tube even though walls 1460 and 1461, considered in isolation, form a diverging or expanding conduit relative to flow in an upward direction.

Spar 1463 connects the conical plug to a support structure that is continuous with the hull of the embodiment. Conical plug 1462 can thus be suspended from a "ceiling" of the embodiment. Spar 1463 has a screw feature and/or linear gear bar ("rack") feature 1464 which is inserted into, and operatively interfaces with, a motorized gear or pinion feature (not shown) affixed to the support structure from which the conical plug depends. This mechanism enables the conical plug to be raised and lowered according to the outputs of an electronic control system of the embodiment. Accordingly, the degree of constriction of the annular conduit 1465, and/or the flow-normal cross-sectional area of the annular conduit 1465, with respect to any particular flow-normal section within the portion of the inertial water tube into which the conical plug 1462 extends, can be altered. In other embodiments, other mechanisms can be used to raise or lower a plug feature so as to increase or decrease the constriction ratio of the relevant constricted inertial water tube.

FIGS. 174-176 show an inertial water tube of a conical partial plug type, in elevated perspective view (FIG. 174), side sectional view (FIG. 175), and side perspective sectional view (FIG. 176). This inertial water tube is nearly identical to inertial water tube illustrated in FIGS. 164-166, except that the top portion of this inertial water tube (i.e. frustoconical portion 1471) forms an outer conduit of decreasing diameter relative to an upward direction of movement and/or flow. Annular water conduit 1475 has relatively high constriction ratio and that constriction ratio changes at a relatively high rate with respect to distance travelled and/or flowed along a longitudinal axis of the conduit. As in the inertial water tube illustrated in FIGS. 164-166 and 171-173, conical plug 1472 can be raised or lowered by any number of mechanisms so as to increase or decrease the constriction ratio of the annular water conduit and/or of the inertial water tube.

FIGS. 177-180 show an inertial water tube of a multi-squirter plug type, in elevated perspective view (FIG. 177), side sectional view (FIG. 178), side perspective sectional view (FIG. 179), and bottom-up view (FIG. 180). Cylindrical pipe 1480 is continuous with a cylindrical or tapered tube of the relevant embodiment connected to, and/or continuous with, its bottommost portion and/or mouth. Inserted into, and mated with, cylindrical pipe 1480, is an approximately cylindrical squirter plug 1481. Squirter plug 1481 is solid in region 1481 and has four approximately conical channels, or conduits, cut into and/or from it, e.g. 1484. The approximately conical conduits meet at "knife-edge" junctions e.g. 1485, which do not tend to significantly impede or obstruct water flowing through the inertial water tube.

Viewed from the bottom (FIG. 180), each of the four approximately conical conduits, e.g. 1484, is seen to have a bottom-most horizontal flow-normal cross section which has the shape of a quadrant of a circle, and a top mouth, e.g., 1483, that is circular. In addition, each of the four approximately conical channels has a "head extension," e.g. 1482, that is approximately cylindrical in shape and continues upwardly from the broad upper surface of the squirter plug. Each of these four head extensions defines a top mouth, e.g., 1483, for the respective conduit. In some embodiments, cylindrical squirter plug 1481 is mated to cylindrical pipe 1480 using an adhesive. In some embodiments, cylindrical squirter plug 1481 is mated to cylindrical pipe 1480 using a "press fit" connection. In other embodiments, the cylindrical pipe 1480 and the outer cylindrical wall of squirter plug 1481 are the same wall and the tube is monolithic.

FIGS. 181-183 show a different embodiment of the approximately cylindrical squirter plug illustrated in FIGS. 177-180, in elevated perspective view (FIG. 181), side sectional view (FIG. 182), and side perspective sectional view (FIG. 183). This embodiment is very similar to the embodiment illustrated in FIGS. 177-180, except that the "head extension" pipes, e.g., 1491, are curved so that an upwardly flowing stream of water within them tends to be cast outwardly as it exits the respective top mouths e.g., 1492, of those head extension pipes.

FIGS. 184-186 show an inertial water tube of a rectilinear type, in elevated perspective view (FIG. 184), side sectional view (FIG. 185), and side perspective sectional view (FIG. 186). Flat walls, e.g., 1500 and 1501, form a "house" shape with a upper mouth 1502 of approximately rectangular shape. Bottommost portion 1504 is continuous with a rectangular pipe (not shown) extending downwardly into the body of water on which the embodiment floats and having a bottom mouth through which water may flow in and out. The flow-normal cross-sectional area of the inertial water tube decreases relative to an upward flow towards it upper mouth 1502. Wall 1503 (i.e., an extension of one 1501 of the two angled walls provides a diverting surface that pushes an upwardly flowing stream of water in a more lateral direction.

FIGS. 187-189 show an inertial water tube of an orifice plate type, in elevated perspective view (FIG. 187), side sectional view (FIG. 188), and side perspective sectional view (FIG. 189). The bottom of cylindrical pipe 1510 is continuous with a cylindrical pipe (not shown) extending downwardly into the body of water on which the respective embodiment floats and through which water may flow into and out of the pipe. Horizontal annular wall 1511 provides an orifice plate that constricts the flow, accelerating it upwardly into the upper cylindrical pipe defined by cylindrical wall 1512. Cylindrical wall 1512 defines and/or provides an upper mouth 1513 through which water may be ejected and flow outwardly and upwardly.

FIGS. 190-192 show an inertial water tube of a single-squirter plug type, in elevated perspective view (FIG. 190), side sectional view (FIG. 191), and side perspective sectional view (FIG. 192). This embodiment is nearly identical to the embodiment illustrated in FIGS. 177-180 except that only a single outlet conduit 1525 is provided, included, and/or utilized. The inertial water tube's single outlet conduit 1525 has a circular flow-normal and/or horizontal cross-section. Region 1521 is solid and conduit 1525 defines an upper mouth 1522.

FIGS. 193-195 show an inertial water tube of frustoconical type with a curved water diverter 1534, in elevated perspective view (FIG. 193), side sectional view (FIG. 194), and side perspective sectional view (FIG. 195). This embodiment is nearly identical to that of FIGS. 155-157 with the exception of the addition of water diverter 1534. Water diverter 1534 is essentially a "half-pipe" in which water projected and/or ejected out of upper mouth 1533 with sufficient speed, momentum, and/or energy, will tend to be guided along a curved path defined by the upper wall 1534 of the half-pipe diverter. However, water projected and/or ejected out of upper mouth 1533 with relatively little speed, momentum, and/or energy, remaining (e.g., after its ascent up the inertial water tube) will tend to fall over the edge of the upper mouth 1533 and not flow along and/or against any significant portion of the upper wall 1534 of the half-pipe diverter.

FIGS. 196-198 show an inertial water tube of plug type, in elevated perspective view (FIG. 196), side sectional view (FIG. 197), and side perspective sectional view (FIG. 198). This inertial water tube is nearly identical to the one illustrated in FIGS. 164-166. The bottommost portion of cylindrical pipe wall 1600 connects to, and/or is continuous with, a further downwardly extending cylindrical pipe (not shown) that extends downwardly into the body of water on which a respective embodiment floats. Plug 1602 projects into the interior cavity defined by the upper portion of the cylindrical pipe wall 1600. And plug 1602 has an approximately conical shape with a concave outer surface 1604, so that its bottommost point 1606 has a sharp "needle-like" profile whose circumferential surface is at a greater vertical angle (i.e., relative to a flow-parallel section plane) than the circumferential surface of the plug 1602 at higher locations e.g. 1604. The constricted passageway 1605 formed in the gap between cylindrical wall 1600 and plug 1602 has a flow-normal and/or horizontal cross-sectional area that decreases at an approximately constant rate from the bottommost point 1606 of the plug 1602 to the upper mouth of the constricted tube 1601.

Figure 202:
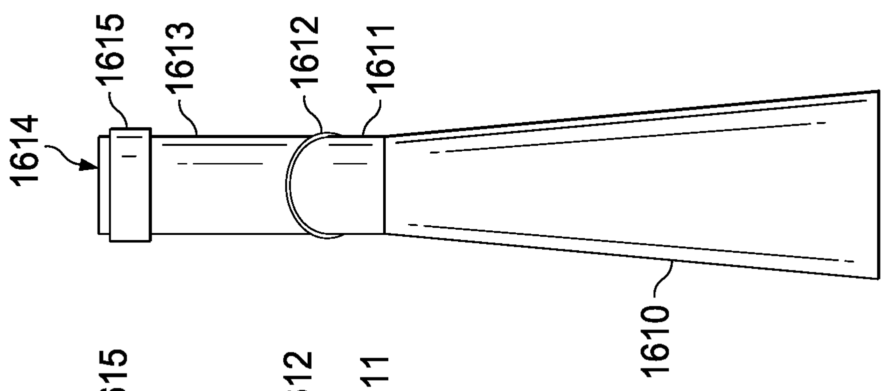
Figure 201:
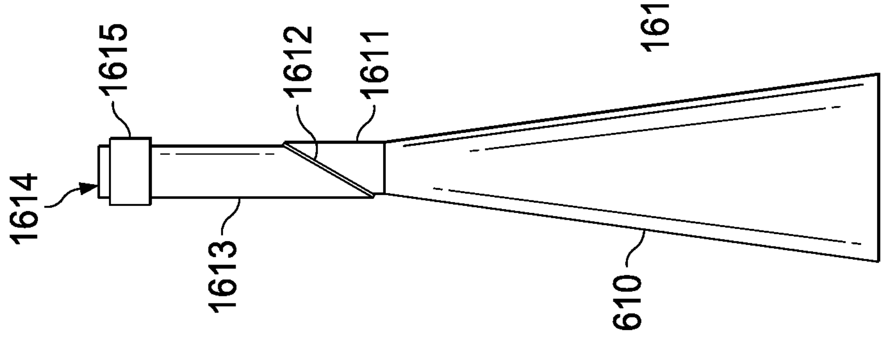
Figure 200:
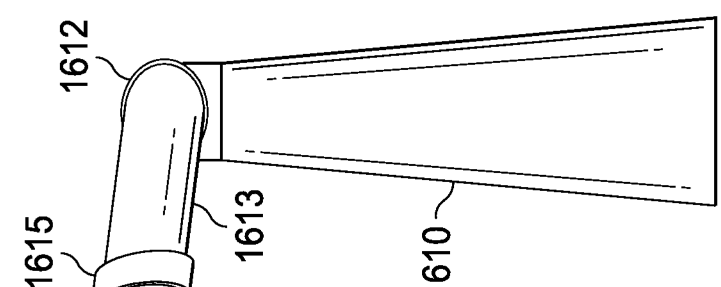
Figure 199:
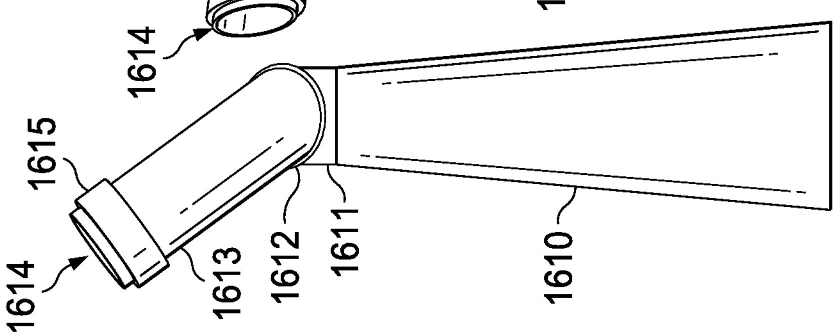

FIGS. 199-204 show an inertial water tube of swivel type, in four different side views (FIGS. 199-202), bottom-up view (FIG. 203), and top-down view (FIG. 204). The bottom of approximately frustoconical tapered tube portion 1610 is continuous with a longer (tapered or untampered) tube (not shown) that extends downwardly into the body of water on which the embodiment floats and which has a bottom mouth through which water may flow into and out of the inertial water tube. Approximately frustoconical tapered tube portion 1610 has a circular flow-normal cross-section at its bottommost portion. At a topmost portion 1611, approximately frustoconical tapered tube portion 1610 has an ovular flow-normal horizontal cross-section. Rotating sliding swivel joint 1612 connects ovular pipe 1611 to ovular pipe 1613 at a sliding and/or rotatable interface, such that ovular pipe 1613 can rotate through an angle that moves mouth 1614 from a relatively lower position (as shown in FIGS. 199 and 200) to a raised position (as shown in FIGS. 201 and 202), or to any intermediate position. Buoyant collar 1615 causes mouth 1614 to approximately track the level of the surface of the water within the reservoir into which the illustrated inertial water tube deposits water.

A similar alternate inertial water tube of swivel type has a tube channel, including both upper and lower tube segments, in which the flow-normal cross-sections (i.e., the sections in planes normal to a longitudinal axis of the tube) is approximately circular. However, the alternate tube configuration includes a bend in the tube proximate to the swivel. The upper and lower tubes are displaced by a bend in both the upper and lower tubes such that the top portion of the lower tube 1611 is bent so as to align the longitudinal axis of its channel with the axis of the swivel's rotation, and such that the lower portion of the upper tube 1613 is bent so as to also align the longitudinal axis of its channel with the axis of the swivel's rotation, thereby resulting in the longitudinal axes of the fully raised swivel inertial water tube not being coaxial, and thereby requiring water flowing upwardly through the inertial water tube to make a lateral diversion on its way to the upper mouth 1614.

Whereas, with respect to the swiveled tube configuration illustrated in FIGS. 199-204, the longitudinal axes of the upper and lower tubes are approximately coaxial. The bend about the swivel in the alternate swiveled tube configuration creates upper and lower tubes with approximately parallel, but not coaxial, longitudinal axes.

FIG. 205 shows a side perspective view of an embodiment of the current disclosure.

The buoyant embodiment 1650 floats adjacent to an upper surface of a body of water (not shown). A substantially hollow and approximately upper hull enclosure or buoy or spherical portion 1651 provides the embodiment with buoyancy. An approximately upper inner half of the buoy is filled with a gas (e.g., air, nitrogen, and/or hydrogen) that is compressed so as to exhibit a pressure that is greater than the pressure of the air outside the embodiment, i.e., greater than the atmospheric pressure at the upper surface of the body of water on which the embodiment floats. An approximately lower inner half of the buoy is filled with water, e.g., seawater, that has been injected, propelled, and/or added to the inside of the buoy as a result of wave action.

Connected to, and/or depending from, the buoy 1651 is a hollow inertial water tube 1652 through which water may rise and fall, e.g., in response to wave action, and through which water may enter the inside of the buoy 1651. An upper mouth and/or aperture (not visible) of the inertial water tube inside the buoy 1651 allows water to flow from the inside of the inertial water tube 1652 to the inside of the buoy 1651. A lower tube mouth and/or aperture and/or ingress orifice and/or ingress of 1653 of the inertial water tube allows water to flow between the inside of the tube 1652 and the body of water on which the embodiment floats.

Hollow inertial water tube 1652 is connected to hollow buoy 1651 by means of a connecting, curvaceous, concave, approximately frusto-conical annular collar 1654 that provides structural advantages.

FIG. 206 shows a front-side view of the same embodiment of the current disclosure that is illustrated in FIG. 205.

The embodiment 1650 floats adjacent to an upper surface 1655 of a body of water, e.g., seawater.

FIG. 207 shows a side view of the same embodiment of the current disclosure that is illustrated in FIGS. 205 and 206. With respect to the illustration in FIG. 207, the embodiment will tend to move from left to right in response to, and/or as a consequence of, effluent water discharged from the embodiment at least in part through an aperture 1656. Because of this preferred direction of movement, the left side of the illustrated embodiment is designated as being the "back" side, the right side of the illustrated embodiment is designated as being the "front" side, and the side of the illustrated embodiment facing the reader is designated as being the "right" side.

FIG. 208 shows a back-side view of the same embodiment of the current disclosure that is illustrated in FIGS. 205-207. At the back side of the embodiment 1650, three apertures 1656, 1657, and 1658, are connected to respective effluent tubes that provide a channel through which water within the buoy 1651 may exit, and/or flow out of, the interior hollow of buoy 1651, thereby tending to propel the embodiment 1650 into the page (with respect to the embodiment orientation illustrated in FIG. 208).

In response to wave action, water flows into and out of aperture 1653 at the bottom of inertial water tube 1652. The walls of an upper portion of inertial water tube 1652 are tapered relative to an upward direction of flow, and impart periodic excitation forces to the water tube inside said tube, causing periodic increases in pressure in the tapered portion and create an oscillatory water flow. Periodically, water rises within inertial water tube 1652 with enough speed, momentum, energy and/or power to cause a portion of that water to be ejected from an upper mouth (not visible) at the top of inertial water tube 1652 and into buoy 1651. The water ejected into, and thereby added to, the inner cavity of buoy 1651 must overcome the pressure of the gas trapped therein in order to be ejected into the interior of buoy 1651, and when ejected from the inertial water tube into the interior of buoy 1651 will tend to further compress the gas trapped therein, thereby further increasing the pressure of that gas.

When the level of the water within the buoy 1651 rises to a requisite first threshold level, a portion of that water will tend to flow into left and/or right turbine ingress tubes (not visible) inside the buoy thereby energizing respective water turbines therein and respective generators operatively connected to those water turbines. After passing through the respective water turbines, the effluent water flows out of the embodiment through respective left and right effluent apertures 1657 and 1656. The effluent from left and right effluent apertures 1657 and 1656 tends to generate a lateral thrust that tends to propel the embodiment across the surface 1655 of the body of water on which the embodiment floats in the direction of its front side (i.e., into the page with respect to the embodiment orientation illustrated in FIG. 208).

If water is added to the inner cavity of buoy 1651 at a sufficient rate and/or to a sufficient degree, e.g., in response to vigorous wave action, then the level of the water within the buoy may rise to a vertical level that exceeds a second threshold level that is higher than the first threshold level. When the level of the water within the buoy 1651 reaches and/or exceeds the second threshold level, then a portion of that water will tend to flow into a central "overflow" effluent tube through which it will subsequently flow out of the embodiment and into the body of water 1655 on which the embodiment floats through overflow aperture 1658, thereby tending to add to the forward thrust generated by water flowing out of effluent apertures 1656 and 1657.

FIG. 209 shows a top-down view of the same embodiment of the current disclosure that is illustrated in FIGS. 205-208.

FIG. 210 shows a bottom-up view of the same embodiment of the current disclosure that is illustrated in FIGS. 205-209.

In response to wave action, the embodiment tends to oscillate vertically at the surface of the body of water on which it floats, and additionally the level of the water on and/or in which it floats tends to oscillate both which respect to its distance above the ground. e.g., the seafloor, beneath it and with respect to the top and bottom ends of the embodiment. These oscillations tend to cause water within the embodiment's inertial water tube 1652 to oscillate in directions approximately parallel to the longitudinal (and nominally vertical) axis of the inertial water tube. As a consequence of these oscillations, water from outside and/or below the embodiment tends to enter the inertial water tube through its lower mouth and/or aperture 1653, and sometimes flows out of the tube and returns to the body of water on which the embodiment floats through that same lower mouth and/or aperture 1653.

Similarly, as a consequence of these oscillations of water within inertial water tube 1652, and as a consequence of the narrowing, i.e., the reduction in the tube's flow-normal cross-sectional area, of that inertial water tube near an upper end of that tube, water sometimes exits and/or is ejected through an upper mouth and/or aperture and/or injection orifice 1659 of the inertial water tube. Water ejected from the upper mouth 1659 of the inertial water tube 1652 tends to collide with a conical water dispersion plug or "diverter" positioned above the tube's upper mouth and/or aperture 1659.

When the level of the water within the embodiment's buoy 1651 exceeds a first threshold level, a portion of the water trapped within the embodiment's buoy 1651, and pressurized by the displaced gas trapped therein, flows out of the buoy through left and right turbine effluent tubes (not visible). Water flowing out of the left and right turbine effluent tubes, exits the embodiment through respective left 1657 and right 1656 effluent apertures.

Water flowing 1661 out of the left effluent aperture 1657 tends to generate a thrust that in addition to propelling the embodiment laterally in a forward direction (i.e., down with respect to the bottom-up embodiment orientation illustrated in FIG. 210) also tends to generate a first torque about a central nominally vertical longitudinal axis of the embodiment, thereby tending to cause the embodiment to rotate in a counterclockwise direction 1662 with respect to the bottom-up embodiment orientation illustrated in FIG. 210.

Water flowing 1663 out of the right effluent aperture 1656 tends to generate a thrust that in addition to propelling the embodiment laterally in a forward direction (i.e., down with respect to the bottom-up embodiment orientation illustrated in FIG. 210) also tends to generate a second torque about a central nominally vertical longitudinal axis of the embodiment, thereby tending to cause the embodiment to rotate in a clockwise direction 1664 with respect to the bottom-up embodiment orientation illustrated in FIG. 210.

By adjusting, controlling, and/or regulating, the relative rates at which water flows out of the embodiment's left 1657 and right 1656 effluent apertures, e.g., as through the adjustment, control, and/or regulation, of the resistive torque of each effluent tube's respective water turbine, the embodiment's angular orientation at the surface of the body of water on which it floats may be adjusted, controlled, and/or regulated (i.e. yawed) relative to the embodiment's nominally vertical longitudinal axis, thereby permitting the embodiment to be steered such that the combination of that steering and the nominally forward thrusts and/or propulsion created, at least in part, by the water discharged through the embodiment's left 1657 and right 1656 effluent apertures can be used to cause the embodiment to travel in a desired and/or desirable direction, and/or toward and/or to a desired and/or desirable destination, e.g., towards and/or to a particular longitude and latitude, e.g., where waves are more energetic.

When the level of the water within the embodiment's buoy 1651 exceeds a second and/or "overflow" threshold level, a portion of the water trapped within the embodiment's buoy 1651, e.g., a portion of the water at or above the second threshold level within the embodiment's water reservoir, and pressurized by the gas trapped therein, flows out of the buoy through an overflow effluent tube, therethrough exiting 1665, and/or flowing out of, the embodiment through overflow aperture 1658. Such outflows tend to add to, and/or increase, the nominally forward thrust propelling the embodiment in a forward direction (i.e., downward with respect to the embodiment orientation illustrated in FIG. 210).

FIG. 211 shows a side perspective view of the same embodiment of the current disclosure that is illustrated in FIGS. 205-210.

FIG. 212 shows a top-down cross-sectional view of the same embodiment of the current disclosure that is illustrated in FIGS. 205-211, where the section is taken along the section line 212-212 specified in FIG. 207.

The embodiment's buoy 1651 has a hollow interior chamber or hollow flotation capsule 1666 wherein a lower portion is nominally filled with water (thus constituting a water reservoir or water tank portion of the hollow interior chamber) and an upper portion is nominally filled with a pressurized gas (thus constituting a pressurized air enclosure portion of the hollow interior chamber). An annular upper portion of the wall of the embodiment's inertial water tube (1652 in FIG. 207) is attached to an annular lower portion of the wall (1654 in FIG. 207) adjacent to an aperture within and/or at a lower portion of the buoy, and the annular band comprised of fused buoy and inertial water tube walls delineates the inertial water tube into an exterior portion (1652 in FIG. 207), the outer surface of which is in direct contact with the body of water (1655 in FIG. 207) on which the embodiment floats, and an interior portion 1667 the outer surface of which is in direct contact with the water trapped inside the interior 1666 of the buoy 1651. The inner surface of the inertial water tube is in direct contact with water that tends to oscillate up and down within the inertial water tube in response to wave action, and has a constricting section that can apply a pressurizing force to the water inside the inertial water tube when the embodiment oscillates.

Water ejected from the upper mouth (1659 in FIG. 210) of the tube (1652 in FIG. 207) collides with a conical water dispersion plug that is positioned above the upper mouth (1659 in FIG. 210) of the tube, and that is positioned such an axis of radial symmetry in the plug is coaxial with the nominally vertical longitudinal axis of the inertial water tube (i.e. coaxial with the inertial water tube's axis of radial symmetry). The collision of the vertically ejected water with the water dispersion plug tends to disperse the ejected water across and/or over the upper surface of the water trapped within a lower portion of the interior 1666 of the embodiment's buoy 1651.

Water whose free surface has risen to or above a first water level that is at the vertical height of the upper edges 1669 and 1667 of the respective left 1671 and right 1672 turbine ingress tubes will tend to flow into those turbine ingress tubes therein encountering, engaging, and/or flowing through, respective left 1673 and right 1674 water turbines, positioned within constricted portions, 1675 and 1676 respectively, of those turbine ingress tubes. These turbines are one type of flow governor that helps retain a certain amount of water within the embodiment's reservoir, maintaining its waterline and certain of its hydrodynamic properties. When caused to rotate by water flowing through their respective turbine ingress tubes, water turbines 1673 and 1674 impart rotational kinetic energy and/or power to their respective operatively connected turbine shafts 1677 and 1678, which transmit a portion of that rotational kinetic energy to respective (not shown) left and right generators, thereby causing those generators to generate electrical power.

The left 1671 and right 1672 turbine effluent tubes (which are the continuations of the left and right turbine ingress tubes past the point at which the water therein flows through the respective left and right water turbines) pass through the wall of the buoy 1651 at positions 1679 and 1680 respectively. And, water discharged from the left 1671 and right 1672 turbine effluent tubes passes out of the embodiment through the respective external apertures (1657 and 1656 in FIG. 208) thereby generating propulsive thrust that tends to move the embodiment laterally across the surface of the body of water on which the embodiment floats in a forward direction (i.e., to the right with respect to the embodiment orientation illustrated in FIG. 212).

By varying the amounts of resistive torque and/or braking force applied to the left and right water turbines by their respective generators (e.g., alternators) the degrees to which the left 1673 and right 1674 water turbines retard, limit, reduce, inhibit, slow, and/or throttle, the rate at which water flows through the respective left 1671 and right 1672 turbine effluent tubes, and thereby the degrees to which the left 1673 and right 1674 water turbines retard, limit, reduce, inhibit, slow, and/or throttle, the rate at which water is discharged from, and/or flows out of, the respective left 1657 and right 1656 external apertures, the embodiment's control system (not shown) can adjust, control, and/or regulate, the magnitude of the propulsive thrust generated by the effluent of each water turbine. When the propulsive thrust generated by the water discharged from one external aperture is unequal to the propulsive thrust generated by the water discharged from the other external aperture, then a torque is applied to the embodiment about a vertical longitudinal axis thereby tending to cause the embodiment to turn. Thus, by controlling, adjusting, altering, and/or regulating, the amount of resistive torque applied to the left and right water turbines, the direction in which the embodiment moves and/or travels in response to the propulsive thrusts generated by the water flowing out of the embodiment can be controlled, adjusted, altered, and/or regulated, i.e., the embodiment can be steered in a direction across the surface of the body of water on which the embodiment floats.

Water whose free surface has risen to or above a second water level that is at the vertical height of the upper edge (not visible beneath the water dispersion plug 1668) of an overflow effluent tube 1681 will tend to flow into the overflow effluent tube and therethrough flow out of the embodiment. The upper edge of the overflow effluent tube defines the second "overflow" threshold water level. The overflow effluent tube 1681 passes through the wall of the buoy 1651 at position 1682. And, effluent water discharged from the overflow tube 1681 passes out of the embodiment through the respective external aperture (1658 in FIG. 208) thereby generating propulsive thrust that tends to move the embodiment laterally across the surface of the body of water on which the embodiment floats in a forward direction (i.e., to the right with respect to the embodiment orientation illustrated in FIG. 212).

FIG. 213 shows a top-down perspective view of the same cross-sectional view illustrated in FIG. 212. FIG. 213 shows a perspective cross-sectional view of the same embodiment of the current disclosure that is illustrated in FIGS. 205-212, where the section is taken along the section line 212-212 specified in FIG. 207. However, unlike the sectional illustration of FIG. 212, the illustration of FIG. 213 includes the generators which are found above and/or in front of the section plane 212-212 specified in FIG. 207.

Operatively connected to the shafts 1677 and 1678 of the respective left and right water turbines (1673 and 1674 in FIG. 212) are respective left 1683 and right 1684 generators.

When water within a lower portion of the interior 1666 of the embodiment's buoy 1651 rises above the upper mouths, apertures, and/or edges 1669 and 1670 of the respective left and right turbine ingress tubes 1671 and 1672, then a portion of that water may flow into those respective turbine ingress tubes. However, if the level of the water within the lower portion of the interior 1666 of the embodiment's buoy 1651 rises even further, and exceeds the height and/or level of the upper mouth, aperture, and/or edge 1685 of the overflow effluent tube 1681, then a portion of that water may flow into the overflow effluent tube and therethrough flow out of the interior 1666 of the buoy 1651, thereby relieving and/or reducing the excessive water level and/or water volume to a nominal level and/or volume.

A lower wall 1686 of the embodiment's buoy 1651 is attached to, and/or fused with, an upper portion 1667 of the embodiment's inertial water tube 1652/1667 thereby sealing the interior 1666 of the buoy with a contiguous, continuous, and/or unbroken wall that is formed in part by a portion 1667 of the inertial water tube's wall. Adjacent to and/or above the annular junction and/or seam of the tube 1652/1667 and the buoy 1651, the tube 1667 constricts thereby tending to propel water rising within, and/or relative to, the inertial water tube 1652/1667 up to, and against, the embodiment's water dispersion plug 1668.

Because of the elevated pressure (i.e., above and/or greater than the pressure of the atmosphere outside the embodiment) the average, typical, and/or resting surface of the water within the embodiment's inertial water tube 1652/1667 will tend to be lower than the average, typical, and/or resting surface (1655 in FIG. 207) of the water on which the embodiment floats. Moreover, because this embodiment lacks supplemental buoyancy and/or buoyant materials (e.g., foam), the average, typical, and/or resting surface of the water within the interior 1666 of the buoy 1651 will tend to be lower than the average, typical, and/or resting surface (1655 in FIG. 207) of the water on which the embodiment floats.

FIG. 214 shows a side cross-sectional view of the same embodiment of the current disclosure that is illustrated in FIGS. 205-213, where the section is taken along the section line 214-214 specified in FIG. 210. While the embodiment illustrated in FIG. 214 shares the same features and design as the illustrations of FIGS. 205-213, the embodiment illustrated in FIG. 214 has been configured so as to use a portion of the electrical energy that it produces in order to grow marine organisms and/or conduct aquaculture. By using at least a portion of the electrical energy that it produces and/or generates to energize lights, e.g., 1687, the growth of marine algae (micro- and/or macro-algae) may be supported, promoted, stimulated, and/or accelerated.

In response to waves traveling across the surface 1655 of the body of water on which the embodiment (1650 in FIG. 207) floats, the level, velocity, and/or volume, of water within the embodiment's inertial water tube 1652/1667 changes. As a result, the upper surface 1688 of the water within the embodiment's inertial water tube 1652/1667 tends to oscillate up and down 1689, particularly in response to a driving pressurization of the water in an upper portion of that inertial water tube that is caused by the rising and falling of the constricting, approximately frustoconical walls 1667 of said tube. Occasionally, the level 1688 of the water within the inertial water tube 1652/1667 is propelled high enough that a portion of that water escapes the upper mouth 1659 of the inertial water tube 1667, thereafter tending to collide with a lower surface of the embodiment's water dispersion plug 1668, and to thereby be dispersed, e.g., 1690, across the breadth of the reservoir of water 1666B trapped within a lower portion of the interior 1666 of the buoy 1651.

As water flows from the upper mouth of the inertial water tube 1667 into the water reservoir 1666B within the interior of the buoy 1651, the level 1691 of the water in the reservoir 1666B will tend to rise, and the volume of the pocket of air 1666A trapped within the buoy and nominally above the level 1691 of the water 1666B trapped therein tends to be reduced and/or compressed, tending to increase the pressure of both the air 1666A and water 1666B. Conversely, and in complementary fashion, as water flows out of the water reservoir 1666B through the left 1671 and/or right (not visible) turbine ingress tubes, or through the overflow effluent tube 1681, the pressure of both the pocket of air 1666A and the water 1666B trapped within the buoy tend to be reduced.

If the level 1691 of the water 1666B trapped within the water reservoir 1666B within the buoy 1651 exceeds the level 1692 of the upper mouth and/or aperture of the overflow effluent tube 1681, then water will tend to flow out of the water reservoir 1666B and into the overflow effluent tube 1681, and therethrough flow 1661 out of the embodiment, thereby tending to generate a forward thrust. Water flowing out of the water reservoir 1666B through the left turbine effluent tube 1671 will likewise flow 1665 out of the embodiment, thereby tending to generate a forward thrust. (While not visible in the sectional illustration of FIG. 214, water flowing out of the water reservoir 1666B through the right turbine effluent tube will also flow out of the embodiment, thereby tending to generate an additional forward thrust.)

A portion of the electrical power generated by the left 1683 and right (not visible) generators is provided to, and consumed by, a plurality of lights and/or lamps, e.g. 1687, that are attached and/or connected to an inner surface of the buoy beneath the surface 1691 of the water within the water reservoir 1666B positioned inside the buoy 1651. In other embodiments, lights or lamps are positioned on upper interior walls of buoy 1651 or elsewhere within the hollow interior of buoy 1651, in such a manner as to illuminate a large portion of, if not all of, that volume. In still other embodiments, lights or lamps are positioned on, and/or attached to, both upper and lower interior walls of buoy 1651, i.e., positioned both above the water 1666B and submerged within the water 1666B. The scope of the present disclosure includes embodiments with lights and/or lamps positioned on, and/or attached to, any location on, in, and/or within the embodiment. The scope of the present disclosure includes embodiments with lights and/or lamps positioned on, and/or attached to, any location on an exterior surface and/or wall of the embodiment (e.g., such that that light produced radiates into the water outside and/or around the embodiment). The scope of the present disclosure includes embodiments with lights and/or lamps that are suspended by cables (e.g., electrical cables) at various locations throughout the embodiment, e.g., within the water reservoir and/or within the inertial water tube. Such suspended lights and/or lamps might depend from any surface, wall, and/or structural member within the embodiment.

The electromagnetic radiation, e.g. 1693, emitted by the embodiment's lamps, e.g. 1687, may be consumed by micro or macro algae growing within the water reservoir 1666B, or plants of any type. Such algae or plants may be suspended in the water of the water reservoir of the embodiment, or may be attached to ropes, fabrics, or other substrates contained within the water reservoir of the embodiment.

In one embodiment, designed to promote the growth of macroalgae, an approximately circular net 1694 spans, and/or is adjacent to, an approximately flow-normal and/or horizontal cross-section of the water reservoir 1666B, adjacent to the surface 1691 of the water reservoir. Net 1694 entrains macroalgae within the lower portion of the water reservoir 1666B thereby tending to reduce, if not prevent, the outflow and/or loss of that macroalgae through the turbine tubes, e.g. 1671, and/or overflow tube 1681. In other embodiments, other means (e.g. a sieve, catchment, mesh, or grating) are positioned in the path of water flow to the turbine in order to prevent outflow or loss of macroalgae and/or other organisms such as fish.

Periodically, algae may be removed from the reservoir 1666B by a ship, platform, or other vessel. A ship may insert a suction tube into and through the upper mouth 1695 of an algae access tube 1696. Such a suction tube may be extended through the algae access tube until an end of the suction tube passes through the lower mouth 1697 thereof and therethrough into the reservoir 1666B.

Once inserted into and through the algae access tube 1696, the lower mouth of an inserted suction tube can be positioned near the bottom of the embodiment's reservoir 1666B and suck out a portion of the algae therein. A complementary algae access tube (not shown), and/or a complementary channel within a single algae access suction tube, can return water to the reservoir while algae, and/or algae and water, are being removed from the reservoir, thereby maintaining and/or preserving the original level 1691 of the water in the water reservoir 1666B.

The algae access tube allows algae, water, nutrients, and/or other materials, to be added to, and/or withdrawn from, 1698 the water reservoir 1666B when that reservoir is otherwise sealed inside the buoy 1651. Because the algae access tube 1696 is open to the atmosphere at its upper mouth 1695, and open to the water and algae in the reservoir 1666B at its lower mouth 1697, water from the reservoir is free to rise up within the algae access tube 1696. Because of the pressure of the air trapped within the upper portion 1666A of the interior of the buoy 1651, and the corresponding pressure of the water 1666B, the surface 1699 of the water within the algae access tube 1696 tends to rise to a height 1700 above the surface of the water within the water reservoir 1666B whose head pressure approximately corresponds to the pressure of the air within buoy 1651.

In addition to growing algae, especially macroalgae, within the reservoir 1666B inside the buoy 1651, algae, especially macroalgae, may be grown inside the embodiment's inertial water tube 1652. An upper barrier net 1701 spanning an upper portion, and/or at an upper position, of the inertial water tube 1652 prevents at least a portion of the algae within the inertial water tube from too closely approaching the upper constricted portion 1667 of the inertial water tube which, if not prevented, could potentially clog the inertial water tube at that location.

Macroalgae is grown within a net enclosure and/or algae containment bag 1702 that forms a porous bag entraining most, if not all, of the algae. An upper end of the algae containment bag 1702 is pulled upward by a float 1703, tending to position the upper end of the bag proximate to the lower side of the barrier net 1701. The algae within the algae containment bag 1702 are encouraged to grow through the embodiment's provision of light, e.g. 1704, emitted by lamps, e.g. 1705, positioned along the interior wall and/or surface of the inertial water tube 1652. The tube lamps, e.g. 1705, are similar or identical to the lamps, e.g. 1687, positioned within the inside of the buoy 1651, although each set of lamps, i.e. those within the buoy 1651 and those within the embodiment's inertial water tube 1652, may emit light(s) of differing frequencies and/or wavelengths so as to more optimally encourage the growths of differing species of algae.

A lower end of the algae containment bag 1702 is pulled downward by a weight 1706 connected to the bag by a tether, chain, rope, linkage, and/or cable 1707. Also connected to the weight 1706, and therethrough to the algae containment bag 1702, is a tether, chain, rope, linkage, and/or cable 1708 an upper end of which is connected to a float 1709 that tends to float at the surface 1655 of the body of water on which the embodiment floats.

Periodically, algae may be removed from the embodiment's inertial water tube 1652 by a ship or other vessel. A ship may attach a secondary cable to cable 1708 and then lower a secondary weight to increase the total weight tending to pull the algae containment bag 1702 down and out of the tube 1652. After the algae containment bag has been pulled down and become free of the inertial water tube 1652, the algae containment bag may be pulled up by the secondary cable and therewith lifted onto and/or into the ship where its algal contents may be harvested. The same algae containment bag that was removed may be reinserted into the inertial water tube using the same second cable, using an underwater autonomous vehicle, and/or using another method, mechanism, and/or system. If the same algae containment bag is reinserted into the embodiment's inertial water tube, it will tend to be so reinserted after most, but not all, of its entrained algae has been harvested and/or removed. By leaving a portion of the algae in the algae containment bag, the residual algae can grow and give rise to another harvest. If a "new" second algae containment bag is inserted into the embodiment's inertial water tube 1652 to replace the removed algae containment bag, then it is advantageous to first "seed" that algae containment bag with algal stock so that a new crop of a preferred species of algae can be grown.

The scope of the present disclosure includes a complementary ship to periodically harvest the algal crops grown within the embodiment, as well as the facilities on a shore, floating platform, and/or other ship where the harvested algae are processed and/or stored, as well as a method for harvesting algae wherein:

- a wave energy converter of a type herein disclosed is deployed on a body of water;
- electrical energy produced by said wave energy converter operating in waves is used to power LEDs, or other lamps, or other sources of light emissions, that are mounted on, within, inside, or outside, of said wave energy converter, and/or LEDs, or other lamps, or other sources of light emissions, that are suspended from walls, surfaces, and/or structural members, within, inside, or outside, of said wave energy converter;
- algae are permitted to grow in an enclosure, cavity, or vicinity of said wave energy converter using light from said lamps as a source of metabolic energy;
- said algae (or products or byproducts produced therefrom, e.g. algal oil) is transferred to a ship or other floating vessel: and,
- said ship or floating vessel transfers said algae (or products or byproducts produced therefrom, e.g. algal oil) to a shore facility for processing and/or storage.

The embodiment aquaculture configuration illustrated in FIG. 214 may also include fish within either or both of the water reservoir 1666B and/or the algal containment bag 1702. If one or more species of fish that are able to eat and/or consume the type(s) of algae being grown within the embodiment are selected and included within the respective growth areas prior to each growth cycle, then a portion of those fish may be harvested along with whatever algae remains uneaten. The scope of the present disclosure includes a method for harvesting fish wherein:

- a wave energy converter of a type herein disclosed is deployed on a body of water;
- electrical energy produced by said wave energy converter is used to power LEDs, or other lamps, or other sources of light emissions, that are mounted on, within, inside, or outside, of said wave energy converter, as well as LEDs, or other lamps, or other sources of light emissions, that are suspended from walls, surfaces, and/or structural members, within, inside, or outside, of said wave energy converter;
- algae are permitted to grow in an enclosure, cavity, or vicinity of said wave energy converter using light from said lamps as a source of metabolic energy;
- fish or other marine organisms are permitted to grow in an enclosure, cavity, or vicinity of said wave energy converter, feeding, at least in part, on said algae as a source of metabolic energy;
- said fish or other marine organisms are transferred to a ship or other floating vessel; and,
- said ship or floating vessel transfers said fish and/or other marine organisms (or products or byproducts produced therefrom, e.g. fish meal or fish oil) to a shore facility for processing and/or storage.

The scope of the present disclosure includes, but is not limited to, the growth and/or harvesting of any and every kind of microalgae, macroalgae, fish, crustacean. Fish that do not eat the varieties of algae grown may nonetheless receive nutrition, e.g. plankton and phytoplankton, from the water that is regularly introduced to the reservoir 1666B and inertial water tube 1652 as a result of wave action. In addition to introducing potentially nutrient-rich water from outside the embodiment into the water reservoir 1666B and inertial water tube 1652 as a result of wave action, the embodiment also tends to remove waste-containing and/or nutrient-depleted, water from the water reservoir and inertial water tube as a result of the same water cycle (i.e. water enters tube 1652, and therefrom enters the water reservoir 166B, and thereafter flows out of the water reservoir through the turbine ingress and effluent tubes and/or through the overflow effluent tube).

The scope of the present disclosure includes embodiments utilizing water reservoir lamps and/or inertial water tube lamps emitting light of any single wavelength, any range of wavelengths, and/or any combinations of wavelengths or ranges of wavelengths.

The scope of the present disclosure includes embodiments in which lamps are attached to the inner surface of the upper portion of the buoy 1651, i.e. within the air pocket 1666A.

The scope of the present disclosure includes embodiments in which lamps are attached to the outer surfaces of the buoy and/or tube thereby encouraging algal growth, and the establishment of communities of fish, outside the embodiment, but in the vicinity of the embodiment.

The scope of the present disclosure includes embodiments utilizing their wave-generated energy to create high-pressure water suitable for the desalination of seawater, and/or for the extraction of minerals from seawater.

The scope of the present disclosure includes embodiments which utilize and/or consume a portion of the electrical power that they generate to electrolyze water, e.g. seawater, so as to produce hydrogen gas. The scope of the present disclosure includes embodiments that store at least a portion of the hydrogen gas that they produce within the air pocket 1666A inside their respective buoys.

The scope of the present disclosure includes embodiments comprised of buoys of any size, dimension, diameter, volume, 3D volumetric shape, 2D cross-sectional shape(s).

The scope of the present disclosure includes embodiments comprised of tubes (1652) of any size, dimension, diameter, length, volume, 3D volumetric shape, 2D cross-sectional shape(s).

The scope of the present disclosure includes embodiments whose buoys and/or tubes (and/or other structural components) are fabricated of, and/or incorporate, any and all materials, including, but not limited to, steel and/or other metals, cementitious substances, and/or plastics.

The scope of the present disclosure includes embodiments that incorporate any number, shape, position, orientation, of turbine ingress tube and/or effluent tube. For instance, an embodiment draws water into a turbine through a ingress tube, and/or pipe, whose inlet mouth is positioned at a lower position and/or relative height of its water reservoir 1666B relative to the surface of the water reservoir.

The scope of the present disclosure includes embodiments that utilize any and every type of water turbine, and any and every type of generator and/or alternator.

FIG. 215 shows a side view of a modified version of the same embodiment of the current disclosure that is illustrated in FIGS. 205-213. The embodiment 1650 is floating at the surface 1655 of a body of water and is similar in form, function, and behavior to the version and/or configuration of the embodiment illustrated and discussed in FIGS. 205-213.

The primary difference between the modified embodiment illustrated in FIG. 215 and the embodiment illustrated in FIGS. 205-213 is that inertial water tube 1750 of the modified embodiment is comprised of a flexible central tube 1751 (e.g. constructed from an elastomer, polymer, fabric, net, etc.) which is kept round (i.e., kept from collapsing, especially in response to internal pressures less than the corresponding outer pressures) by stiffening rings 1752. The stiffening rings 1752 prevent the flexible tube from collapsing inward or exploding outward due to pressure differentials between the inside and outside of inertial water tube, e.g., reductions in the pressure of water and/or air within the inertial water tube 1750 and the water 1655, e.g., seawater, outside the inertial water tube. Stiffening rings may be constructed of a stiff material such as steel, aluminum, PEEK, etc. Constructing the inertial water tube from flexible materials reinforced with sectional stiffeners allows the inertial water tube 1750 to bend conformally when its upper portion and hollow flotation module 1651 are accelerated translationally by wave forces.

The scope of the present disclosure includes embodiments including, incorporating, and/or utilizing, flexible inertial water tubes comprised of any material or combination of materials, of any diameter or flow-normal cross-sectional area, of any length, of any tube wall thickness, etc. The scope of the present disclosure includes embodiments including, incorporating, and/or utilizing, stiffening rings comprised of any material or combination of materials, of any width, height, length, and/or other dimension, and including both solid rings and hollow rings.

FIG. 216 shows a side view of a modified version of the same embodiment of the current disclosure that is illustrated in FIGS. 205-213. The embodiment 1650 is floating at the surface 1655 of a body of water and is similar in form, function, and behavior to the version and/or configuration of the embodiment illustrated and discussed in FIGS. 205-213.

The primary difference between the modified embodiment illustrated in FIG. 216 and the embodiment illustrated in FIGS. 205-213 is that inertial water tube 1760 of the modified embodiment is comprised of a plurality of rigid tubes, e.g., 1761, connected to one another by a plurality of elastomeric links 1762. This sectional construction allows the inertial water tube 1760 to bend conformally when its upper sections and hollow flotation module 1651 are accelerated translationally and/or horizontally by wave forces.

The scope of the present disclosure includes embodiments including, incorporating, and/or utilizing, rigid inertial water tube segments comprised of any material or combination of materials, of any diameter or flow-normal cross-sectional area, of any length, of any tube wall thickness, etc. The scope of the present disclosure includes embodiments including, incorporating, and/or utilizing, elastomeric links comprised of any material or combination of materials, of any width, height, length, and/or other dimension.

FIG. 217 shows a side perspective view of an embodiment of the current disclosure.

A buoyant embodiment 1800, buoy, and/or hollow flotation module, floats adjacent to an upper surface 1801 of a body of water. A substantially hollow and approximately spherical portion 1800 and/or buoy provides the embodiment with buoyancy. An approximately upper inner half of the buoy is filled with a gas (e.g., air, nitrogen, and/or hydrogen) that is compressed so as to exhibit a pressure that is greater than the pressure of the air outside the embodiment, i.e., the atmospheric pressure at the upper surface of the body of water on which the embodiment floats. The gas occupying this approximately upper half of the buoy can be pressurized by the device's own pumping action in waves, or by an external source of pressurized gas (such as a hose connected to the embodiment to pressurize it prior to deployment). An approximately lower inner half of the buoy is filled with water, e.g., seawater, that has been injected, propelled, and/or added to the inside of the buoy as a result of wave action.

Connected to, and/or depending from, the buoy 1800 is a hollow inertial water tube 1802 through which water may rise and fall, e.g., in response to wave action, and through which water may enter the inside of the buoy 1800. An upper mouth and/or aperture (not visible) of the inertial water tube inside the buoy 1800 allows water to flow from the inside of the inertial water tube 1802 to the inside of the buoy 1800. A lower tube mouth and/or aperture 1803 of the inertial water tube allows water to flow 1804 between the inside of the inertial water tube 1802 and the body of water 1801 on which the embodiment floats.

Hollow inertial water tube 1802 is connected to hollow buoy 1800 by means of a connecting, curvaceous, concave, approximately frustoconical annular collar 1805. An effluent pipe, tube, and/or channel 1806 connected to and embedded in the annular collar 1805 allows water, e.g., seawater, as well as any sediments, detritus, fish waste, and/or other non-fluid materials that drift down within the water that tends to fill the approximately lower inner half of the buoy, to be discharged 1807 from the embodiment through effluent mouth and/or aperture 1808. The effluent discharged 1807 through the mouth 1808 of effluent pipe 1806 tends to generate a lateral thrust which tends to propel the embodiment across the surface 1801 of the body of water on which the embodiment floats in a direction substantially opposite the direction of the discharge. Mouth 1808 (also referred to as an external effluent port) is in this embodiment a form of nozzle or constriction that creates a pressure drop or pressure gradient between the interior reservoir of the inside of buoy 1800 and the external seawater at or in the vicinity of mouth/external effluent port 1808. In this manner, the nozzle formed by mouth 1808 is a flow governor and serves a flow governing function, limiting the rate at which water can leave the interior of the embodiment. The nozzling effect created by mouth 1801 also accelerates the flow being discharged from effluent pipe 1806 and therefore increases the thrust capacity of the embodiment.

Excessive water pressure inside the embodiment's interior water reservoir (not visible inside the buoy 1800) causes water from inside the embodiment to push up through water pressure-relief pipe 1809 with enough force, and to a sufficient height, to be discharged 1810 from the embodiment thereby relieving and/or reducing the pressure inside the embodiment. Similarly, excessive air pressure inside the embodiment's interior, i.e., pressure within the pocket of air trapped above the water reservoir (not visible inside the buoy 1800) causes air from inside the embodiment to push down through air pressure-relief pipe 1811 with enough force, and to a sufficient depth, to be discharged 1812 from the embodiment (e.g., creating bubbles rising from the lower aperture of the air pressure-relief pipe 1811) thereby relieving and/or reducing the pressure inside the embodiment.

Attached to an upper surface and/or wall of the embodiment's buoy 1800 is a control chamber 1813 containing, housing, and/or protecting, within, an air pressure control system (not shown). Attached to an upper surface and/or wall of the control chamber 1813 is a photovoltaic generator 1814 comprising four crossed vertical walls mounted atop a lower horizontal wall. On both broad surfaces, e.g., front and back, of each vertical wall, and on the upper broad surface of the lower horizontal wall, are mounted, attached, connected, and/or incorporated, solar cells and/or another conversion mechanism, circuit, device, technology, and/or solar receptor, that tends to generate electrical power in response to incident solar illumination 1815 and/or radiation. A storage cell, module, device, and/or element, e.g., a capacitor, battery, switched induction coil, and/or other energy storage device, is incorporated, included, and/or positioned, within the control chamber 1813 and stores electrical power generated by the photovoltaic generator 1814 so that it can be available at any time (e.g., when the sun isn't shining on the embodiment).

The air pressure control system controls, activates, energizes, adjusts, and/or utilizes, an air pump 1816 to pump air 1817 (or to not pump air, e.g., when deactivated) from the atmosphere into the interior of, and/or into the air pocket within, the buoy 1800 through an air injection pipe 1818, thereby tending to raise the pressure of the air within the buoy. The air pressure control system controls and energizes the air pump 1816 via a cable 1819.

The air pressure control system controls, activates, energizes, adjusts, opens, closes, and/or utilizes, an air valve 1820 to release pressurized air 1817 from inside the air pocket (not visible) within the buoy 1800 to the atmosphere by opening the air valve (or to not release pressurized air, e.g., when the air valve is closed), thereby tending to reduce the pressure of the air within the buoy (i.e., when the valve is open). The air pressure control system opens and closes the air valve 1820 via a cable 1822.

FIG. 218 shows a side view of the same embodiment of the current disclosure that is illustrated in FIG. 217.

FIG. 219 shows a side cross-sectional view of the same embodiment of the current disclosure that is illustrated in FIGS. 217 and 218, where the section is taken along the section line 219-219 specified in FIG. 218. The embodiment illustrated in FIGS. 217-219 has an approximate radial symmetry about a flow-parallel and/or nominally vertical longitudinal axis passing through the center of the embodiment's inertial water tube 1802.

As the embodiment is moved up and down by waves passing across the surface 1801 of the body of water on which the embodiment floats, water entrained within its inertial water tube 1802 tends to oscillate. The water 1823 within the inertial water tube 1802 is shielded from a substantial portion of the wave motion outside the inertial water tube. And, the lower mouth 1803 of the inertial water tube tends to be at a depth near, at, or below, a wave base of the water 1801 on which the embodiment floats. As the water 1823 within the inertial water tube 1802 oscillates and/or moves up and down in response to wave action at the embodiment, water tends to move 1804 in and out of the lower mouth 1803 of the inertial water tube 1802, and the surface 1824 of the water within the inertial water tube 1802 tends to move 1825 up and down. Occasionally, water within the inertial water tube 1802 moves upward within the inertial water tube fast enough, and to a great enough height, that a portion of it escapes 1826 the upper mouth 1827 of the inertial water tube, thereby tending to fall into, and/or be deposited within, a water reservoir 1827, and thereby tending to increase the volume of water therein, and the height 1828 of its upper surface within the buoy 1800.

Water oscillating within a lower portion of inertial water tube 1823 will tend to have a first amplitude (e.g., flow-parallel and/or longitudinal distance traveled during an oscillation). However, water oscillating within an upper portion 1828 of the inertial water tube will experience a narrowing, constricting, and/or constriction, in the flow-normal cross-sectional area of the tube and/or channel as it rises, and/or travels upward, within the tube. The narrowing of the inertial water tube proximate to the upper mouth 1827 of the inertial water causes water rising therein to be accelerated upward which is useful in increasing, raising, optimizing, and/or maximizing, the rate at which water is ejected 1826 from the upper mouth 1827 of the inertial water tube 1802.

An uppermost portion 1829 of the inertial water tube has an approximately constant flow-normal cross-sectional area and tends to permit upwardly-accelerated water to be ejected from an upper inertial water tube mouth 1827 that is positioned above the nominal surface 1828 of the water reservoir into which its ejections of water are captured, collected, cached, stored, and/or saved. With respect to a particular wave climate, the illustrated embodiment 1800 might achieve an optimal rate of water ejection 1826 when its narrowed, constricted, and/or frustoconical portion 1828 is positioned such that the nominal, average, modal, typical, and/or resting, upper surface 1824 of the water 1823 within its inertial water tube 1802 is adjacent to, and slightly below, the seam, junction, and/or boundary, 1830 at which the uppermost and narrowest portion of the frustoconical portion 1828 joins the lowermost portion of the cylindrical portion 1829. In the absence of the upper cylindrical portion 1829 of the inertial water tube, the inertial water tube would need to eject water at, or even below, the surface 1828 of the water reservoir 1827—which would tend to allow water from the water reservoir to spill back into the inertial water tube and be "wasted". And, in the absence of the upper cylindrical portion 1829 of the inertial water tube, if the potential for spillage from the water reservoir 1827 back into the upper mouth 1827 of the inertial water tube was to be avoided, then the constricting of the upper portion 1828 of the inertial water tube would need to be continued so as to position the upper mouth 1827 further above the surface 1828 of the water reservoir. Such additional constriction might reduce the rate at which water was ejected 1826 from the upper mouth 1827 of the inertial water tube and/or otherwise impair the efficiency of the embodiment.

The inclusion of an uppermost portion of inertial water tube in which the flow-normal cross-sectional area is relatively and/or approximately constant can be useful in permitting, and/or making practical, an embodiment design in which a constricted portion of optimal design (e.g., a frustoconical portion of optimal included angle, length, and lower diameter) is placed at an optimal depth relative to the resting surface 1801 of the outside water. The embodiment illustrated in FIGS. 217-219 includes a pocket of compressed air 1831 within the buoy 1800 and that compressed air tends to cause the resting surface 1824 of the water 1823 within the embodiment's inertial water tube 1802 to be lower, and/or at a greater depth, than the resting surface 1801 of the water on which the embodiment floats.

The embodiment includes, incorporates, and/or utilizes, an air pressure control system (not visible within a control chamber 1813 attached to an outer upper surface of the buoy 1800) that is able to pump air from 1817 the atmosphere into 1832 the pressurized air pocket 1831 within the buoy when it is necessary or advantageous to raise the pressure of the air within that air pocket. The embodiment's air pressure control system that is also able to release air from 1833 within the pressurized air pocket 1831 within the buoy and into 1821 the atmosphere when it is necessary or advantageous to reduce the pressure of the air within that air pocket.

The embodiment also has a water pressure-relief pipe 1809 that is fluidly connected to the water reservoir through a lower mouth 1834. The pressure of the water 1827 within the water reservoir tends to force a portion of that water up and into the water pressure-relief pipe, where the level 1835 to which that water rises tends to be determined by, and/or a consequence of, the difference and/or delta of pressure of the air 1831 above the water reservoir and the pressure of the atmosphere outside the embodiment. If and when the pressure difference is "too high" then water from the water reservoir 1827 will tend to be raised past the height of the upper mouth of the water pressure-relief pipe 1809 and then be discharged 1810 outside the embodiment, thereby relieving and/or reducing the surplus pressure within the buoy 1800.

The embodiment also has an air pressure-relief pipe 1811 that is fluidly connected to the air pocket 1831 through an upper mouth 1836 and to the water 1801 outside the embodiment through a lower mouth. The pressure of the air within the air pocket 1831 tends to force a portion of that air into and down the air pressure-relief pipe, thereby tending to push down the water that would otherwise rise within the air pressure-relief pipe, e.g., until it reached the height of the surface 1828 of the water reservoir. The level 1837 to which the water within the air pressure-relief pipe is pushed down tends to be determined by, and/or a consequence of, the difference and/or delta of pressure of the air 1831 above the water reservoir and the pressure of the water 1801 outside the embodiment at the depth of the lower mouth of the air pressure-relief pipe. If and when the pressure of the air within the embodiment's air pocket 1831 exceeds the pressure of the water outside the lower mouth of that pipe then air from the air pocket 1831 will tend to be pushed down and out (perhaps tending to create bubbles as illustrated in FIG. 219) of the lower mouth of the air pressure-relief pipe 1811, thereby relieving and/or reducing the surplus air pressure within the buoy 1800.

The water 1823 within the embodiment's inertial water tube 1802 tends to move up and down and/or to oscillate in directions approximately parallel to a flow-parallel longitudinal axis of the inertial water tube. However, when the embodiment is buffeted by a sufficiently vigorous wave climate, then with respect to a period and/or interval of three or more wave periods, there is nominally, and/or tends to be, a net flow of water from the body of water 1801 on which the embodiment floats into the inertial water tube 1802 through the lower mouth 1803 of the inertial water tube. Similarly, when the embodiment is buffeted by a sufficiently vigorous wave climate, then with respect to a period and/or interval of three or more wave periods, there is nominally, and/or tends to be, a net flow of water 1823 from the interior of the inertial water tube 1802 through the upper mouth 1827 of the inertial water tube and into the water reservoir 1827.

As the embodiment moves up and down in response to waves at the surface 1801 of the body of water on which it floats, and the water within its inertial water tube 1802 moves up and down, and the embodiment's movements and the movements of the water within the embodiment's inertial water tube are often out of phase. These out of phase movements of the embodiment and the water 1823 within the embodiment's inertial water tube occasionally and/or periodically cause water within the inertial water tube to be ejected 1826 from the upper mouth 1827 of the inertial water tube, thereby adding water to the water reservoir 1827 within the buoy 1800 and compressing the air within the air pocket 1831 above that water reservoir.

This influx of water from inside the inertial water tube 1802 into the water reservoir 1827 is nominally balanced, at least to an approximate degree, by an outflow 1807 of water from the water reservoir and back into the body of water 1801 at approximately the same average rate of flow. Water within the embodiment's water reservoir 1827 tends to flow downward and pass through 1838 a grating, mesh 1839, screen, and/or porous sheet of material, with the approximate shape of a flat annular disk. After flowing and/or passing through the annular-disk-shaped grating 1839, water from the embodiment's water reservoir 1827 flows through, and/or within, the annular space and/or void between the inner inertial water tube 1828 and the outer annular collar 1805, therethrough flowing out 1807 of the embodiment through the effluent mouth 1808 of effluent pipe 1806.

Because water from this embodiment's water reservoir flows through a grating positioned at a bottommost portion and/or end of the water reservoir, and thereafter through an effluent pipe positioned below that grating, this embodiment is well suited for the cultivation of fish, as the fish would tend to be retained within the water reservoir, i.e., by the gratings 1839 covering the effluent channel 1805/1806 at the bottom of the water reservoir, even as water flows through the water reservoir and is returned to the body of water 1801 from which it was captured.

An embodiment similar to the one illustrated in FIGS. 217-219 includes lights within the interior of the buoy 1800, wherein at least some of those lights are positioned on, and/or attached to, an interior surface of that portion of the buoy wall nominally in contact with the air pocket 1831. Another embodiment similar to the one illustrated in FIGS. 217-219 includes lights within the interior of the buoy 1800, wherein at least some of those lights are positioned on, and/or attached to, an interior surface of that portion of the buoy wall nominally in contact with the water reservoir 1827. And another embodiment similar to the one illustrated in FIGS. 217-219 includes lights within the interior of the buoy 1800, wherein at least some of those lights are positioned on, and/or attached to, an interior surface of portions of the buoy wall nominally in contact with both the air pocket 1831 and the water reservoir 1827. The lights might be powered by the photovoltaic generator 1814, and/or by other sources of electrical power, e.g., wind turbines. Such a lighted embodiment can be used to cultivate macroalgae only, or to cultivate macroalgae in addition to fish that might feed upon the macroalgae.

Fish and/or macroalgae grown within such an embodiment might be harvested by a ship, platform, or other non-rigidly connected object through the connection of a hose to the upper mouth of water pressure-relief pipe 1809, after which at least a portion of the contents of the buoy's water reservoir 1827 could be collected, harvested, and/or removed, from the embodiment by a low-pressure "sucking" mechanism positioned on, and/or controlled by, the harvesting ship, platform, or other object. Such a sucking of the water, fish, and/or macroalgae from the water reservoir 1827 of such an embodiment would tend to draw water from the body of water 1801 on which the embodiment floats into the effluent mouth 1808 of the effluent pipe 1806 and therethrough into the water reservoir 1827 so as to replace at least a portion of the water removed by the sucking.

The embodiment illustrated in FIGS. 217-219 includes, incorporates, and/or utilizes, a navigational control system that is contained, housed, and/or protected, within the embodiment's control chamber 1813 along with the air pressure control system. The embodiment's navigational control system steers the embodiment by adjusting the pressure of the air within air pocket 1831.

When the navigational control system causes and/or signals the air pressure control system to increase the pressure of the air within the air pocket 1831, the resulting increase in air pressure tends to cause the mean, modal, and/or resting, upper surface 1824 of the water 1823 within the embodiment's inertial water tube 1802 to move further down the inertial water tube (i.e., towards its lower mouth 1803). Such a repositioning of the upper surface of the water within the inertial water tube tends to reduce the average rate at which water flows out of, and/or is ejected from, the upper mouth 1827 of the inertial water tube. That reduction in the rate at which water flows out of, and/or is ejected from, the upper mouth 1827 of the inertial water tube, tends to cause a related reduction in the rate at which water is discharged 1807 from the embodiment through effluent pipe 1806, although the water may be at higher pressure.

By contrast, when the navigational control system causes and/or signals the air pressure control system to decrease and/or reduce the pressure of the air within the air pocket 1831, the resulting decrease in air pressure tends to cause the mean, modal, and/or resting, upper surface 1824 of the water 1823 within the embodiment's inertial water tube 1802 to move further up the inertial water tube (i.e., towards its upper mouth 1827). Such a repositioning of the upper surface of the water within the inertial water tube tends to increase the rate at which water flows out of, and/or is ejected from, the upper mouth 1827 of the inertial water tube. That increase in the rate at which water flows out of, and/or is ejected from, the upper mouth 1827 of the inertial water tube, tends to cause a related increase in the rate at which water is discharged 1807 from the embodiment through effluent pipe 1806, which in turn tends to increase the thrust generated by that discharge.

The embodiment's navigational control system enables the embodiment to steer an approximate course across the surface of the water 1655 on which the embodiment floats. It also enables the embodiment to adjust the embodiment's sensitivity to the ambient wave environment so as to maintain, to an approximate degree, and within certain limits, a constant rate of electrical power production, e.g., by the embodiment's generators if a turbine and generator are positioned in the effluent pipe 1806.

When the embodiment's navigational control system detects that the angular and/or radial orientation of embodiment's effluent pipe 1806, and the corresponding angular and/or radial orientation of the thrust resulting from the discharge of water through that effluent pipe, is favorable relative to a course and/or direction in which the navigational control system would opt to send and/or direct the embodiment, then the navigational control system can and/or may signal the air pressure control system to reduce the pressure of the air within the air pocket 1831 and thereby increase the magnitude of the thrust generated by the water discharge through effluent pipe 1806.

When the embodiment's navigational control system detects that the angular and/or radial orientation of embodiment's effluent pipe 1806, and the corresponding angular and/or radial orientation of the thrust resulting from the discharge of water through that effluent pipe, is not favorable relative to a course and/or direction in which the navigational control system would opt to send and/or direct the embodiment, then the navigational control system can and/or may signal the air pressure control system to increase the pressure of the air within the air pocket 1831 and thereby reduce the magnitude of the thrust generated by the water discharge through effluent pipe 1806.

The embodiment's navigational control system monitors the, at least in part stochastic, wave, current, wind, and tidal, induced orientations and/or changes in orientation of the embodiment, and adjusts the embodiment's thrust to move the embodiment forward more quickly when the embodiment happens to be oriented (relative to a nominally vertical and/or flow-parallel longitudinal axis of the embodiment) in a favorable direction, and to move the embodiment forward more slowly when the embodiment happens to be oriented (relative to a nominally vertical and/or flow-parallel longitudinal axis of the embodiment) in an unfavorable direction.

An embodiment of the present disclosure that is similar to the one illustrated in FIGS. 217-219 includes a rudder whose angular orientation (about a vertical longitudinal axis) is adjusted and/or set by a motor that is controlled, adjusted, and/or energized, by the embodiment's navigational control system. An embodiment of the present disclosure that is similar to the one illustrated in FIGS. 217-219 includes a turbine and electrical generator positioned and configured to draw power from the flow of water outward through the effluent pipe.

In embodiments with a generator, when the embodiment's navigational control system detects that the amount of electrical power being generated is too great, or when it detects that the amount of resistive torque being applied to a turbine is too low, e.g., in order to promote a maximal outflow of water from the embodiment's water reservoir and into the body of water 1655 on which the embodiment floats, thereby creating a risk that the resistive torque may be eliminated entirely and thereby expose the water turbine(s) to a "runaway" condition that might damage them, or when it detects, e.g., via onboard accelerometers, that the motions and/or movements of the embodiment are too vigorous, e.g., thereby threatening the structural integrity of the embodiment, then the embodiment's navigational control system can and/or may signal the air pressure control system to increase the pressure of the air within the air pocket 1831 and thereby tend to increase the volume of the air pocket within the hollow flotation module by displacing a portion of the water within the embodiment's water reservoir, which would tend to decrease the depth of the embodiment, lower the embodiment's waterline, and decrease the embodiment's waterplane area.

Such a lifting of the embodiment a distance out of and/or above the surface 1655 of the water would tend to decrease the relative and absolute amounts of energy imparted to it by the passing waves, and to decrease the relative and absolute rate at which water flows into the embodiment's water reservoir through the upper mouth of the inertial water tube. The reduced inflow of water from the inertial water tube into the water reservoir will tend to allow the amount of resistive torque being applied to the respective left and right water turbines to be increased (i.e., to slow the outflow of water from the water reservoir and to get relatively more power from that slower outflow). The reduced mass and inertia of the embodiment, as well as its reduced displacement volume, would tend to reduce the magnitude of the motions and/or movements to which the embodiment is subjected by passing waves, e.g., as the embodiment would tend to be floating higher above those wave and obstructing them to a lesser degree.

When the embodiment's navigational control system detects that the amount of electrical power being generated by its respective left and right generators is too low, or when it detects, e.g., via onboard accelerometers, that the motions and/or movements of the embodiment are lacking sufficient vigor, e.g., thereby suggesting that the embodiment is floating in a portion of a body of water 1655 characterized by a weak, poor, and/or feeble, wave climate, then the embodiment's navigational control system can and/or may signal the air pressure control system to decrease the pressure of the air within the air pocket 1831 and thereby tend to decrease the volume of the air pocket within the hollow flotation module and encourage an increase in the volume of the embodiment's water reservoir, which would tend to increase the depth of the embodiment, raise the embodiment's waterline, and increase the embodiment's waterplane area.

Such a lowering of the embodiment further below the surface 1655 of the water would tend to increase the relative and absolute amounts of energy imparted to it by the passing waves, and to increase the relative and absolute rate at which water flows into the embodiment's water reservoir through the upper mouth of the inertial water tube. The increased inflow of water from the inertial water tube into the water reservoir will tend to allow the embodiment's generators to generate a greater amount of electrical power.

FIG. 220 shows a side perspective view of an embodiment of the current disclosure.

The illustrated embodiment 1850 is very similar to the embodiment illustrated in FIGS. 217-219. A buoyant embodiment 1850, buoy, and/or hollow flotation module, floats adjacent to an upper surface 1851 of a body of water. A substantially hollow and approximately spherical portion 1850 and/or buoy provides the embodiment with buoyancy.

Connected to, and/or depending from, the buoy 1800 is a hollow inertial water tube 1852 through which water may rise and fall, e.g., in response to wave action, and through which water may enter the inside of the buoy 1850. An upper mouth and/or aperture (not visible) of the inertial water tube inside the buoy 1850 allows water to flow from the inside of the inertial water tube 1852 to the inside of the buoy 1850. A lower tube mouth and/or aperture 1853 of the inertial water tube allows water to flow 1854 between the inside of the inertial water tube 1852 and the body of water 1851 on which the embodiment floats.

Hollow inertial water tube 1852 is connected to hollow buoy 1850 by means of a connecting, curvaceous, concave, approximately frustoconical annular collar 1855. An effluent pipe, tube, and/or channel 1856 fluidly connected to the annular collar 1855 allows water, e.g., seawater, to be discharged 1857 from the embodiment through effluent mouth and/or aperture 1858. The effluent discharged 1857 through the mouth 1858 of effluent pipe 1856 tends to generate a lateral thrust which tends to propel the embodiment across the surface 1851 of the body of water on which the embodiment floats in a direction substantially opposite the direction of the discharge.

Excessive air pressure inside the embodiment's interior, i.e., pressure within the pocket of air trapped above the water reservoir (not visible inside the buoy 1850) causes air from inside the embodiment to push down through air pressure-relief pipe 1859 with enough force, and to a sufficient depth, to be discharged 1860 from the embodiment (e.g., creating bubbles rising from the lower aperture of the air pressure-relief pipe 1859) thereby relieving and/or reducing the pressure inside the embodiment.

Attached to an upper surface and/or wall of the embodiment's buoy 1850 is a control chamber 1861 containing, housing, and/or protecting, within, an air pressure control system (not shown). Attached to an upper surface and/or wall of the control chamber 1861 is a photovoltaic generator 1862 comprising four crossed vertical walls mounted atop a lower horizontal wall. On both broad surfaces, e.g., front and back, of each vertical wall, and on the upper broad surface of the lower horizontal wall, are mounted, attached, connected, and/or incorporated, solar cells and/or another conversion mechanism, circuit, device, technology, and/or solar receptor, that tends to generate electrical power in response to incident solar illumination 1863 and/or radiation. A storage cell, module, device, and/or element, e.g., a capacitor, battery, switched induction coil, and/or other energy storage device, is incorporated, included, and/or positioned, within the control chamber 1861 and stores electrical power generated by the photovoltaic generator 1862 so that it can be available at any time (e.g., when the sun isn't shining on the embodiment).

The air pressure control system controls, activates, energizes, adjusts, and/or utilizes, an air pump 1864 to pump air 1865 (or to not pump air, e.g., when deactivated) from the atmosphere into the interior of, and/or into the air pocket within, the buoy 1850 through an air injection pipe 1866, thereby tending to raise the pressure of the air within the buoy. The air pressure control system controls and energizes the air pump 1864 via a cable 1867.

The air pressure control system controls, activates, energizes, adjusts, opens, closes, and/or utilizes, an air valve 1868 to release pressurized air 1869 from inside the air pocket (not visible) within the buoy 1850 to the atmosphere by opening the air valve (or to not release pressurized air, e.g., when the air valve is closed), thereby tending to reduce the pressure of the air within the buoy (i.e., when the valve is open). The air pressure control system opens and closes the air valve 1868 via a cable 1870.

FIG. 221 shows a side view of the same embodiment of the current disclosure that is illustrated in FIG. 220.

FIG. 222 shows a side cross-sectional view of the same embodiment of the current disclosure that is illustrated in FIGS. 220 and 221, where the section is taken along the section line 222-222 specified in FIG. 221. The embodiment illustrated in FIGS. 220-222 has an approximate radial symmetry about a flow-parallel and/or nominally vertical longitudinal axis passing through the center of the embodiment's inertial water tube 1852.

The illustrated embodiment 1850 is very similar to the embodiment illustrated in FIGS. 217-219. However, whereas the embodiment illustrated in FIGS. 217-219 includes, incorporates, and/or utilizes, a water reservoir (1827 in FIG. 219) well-suited to the cultivation of fish and/or macroalgae, the embodiment illustrated in FIG. 220 includes, incorporates, and/or utilizes, a water reservoir 1873 that is well-suited to the extraction, collection, acquisition, removal, harvesting, and/or gathering, of minerals and/or other dissolved solutes and/or particulates within a body of water through its inclusion of a filter 1871 therein, which filter can be absorbent, adsorbent, or of some other type. The filter can include or be comprised of a metal-organic framework substance or a membrane such as a dialysis membrane.

Such solutes might include, but are not limited to, potentially useful elemental substances such as gold, magnesium, lithium, and uranium. Such solutes might include carbon compounds such as carbon dioxide and carbonic acid. Such solutes might include, but are not limited to, potential elemental pollutants and/or toxins such as cesium, thorium, arsenic, and mercury.

Such solutes might include, but are not limited to, potentially useful chemical substances such as minerals, nitrates, lithium hydroxides, carbonates, and phosphates. Such solutes might include, but are not limited to, potential chemical pollutants and/or toxins such as petrochemicals, plastics, and pharmaceuticals.

Such solutes might include, but are not limited to, potentially useful particulates (e.g., suspensions of particles) such as plankton and phytoplankton (e.g., which might then be fed to a population of fish, crustaceans, and/or other animals or organisms). Such solutes might include, but are not limited to, potential particulate pollutants and/or toxins such as diesel exhaust, and microplastics.

Within a lower portion of the embodiment's buoy 1850, the embodiment illustrated in FIGS. 220-222 is a filter 1871 that includes, incorporates, and/or utilizes, a plenitude, abundance, quantity, and/or store, of an absorbent, adsorbent, porous, and/or spongy material.

The components, constituents, elements, substances, and/or materials, of which the filter material is comprised include, but is not limited to, fibers, filaments, microfibers, threads, strings, cords, granules, grains, particles, bits, nuggets, motes, fragments, chips, flakes, shards, clippings, and/or shavings. The filter material might be macroscopically organized and/or structured in various manners, forms, and/or strategies, that include, but are not limited to, loose aggregates, one or more adjacent mats, one or more adjacent tubes (including, but not limited to, those stacked horizontally, vertically, and/or randomly), one or more approximately spherical balls, and a plurality of interlocking bricks.

Water-reservoir access pipe 1872 has an upper mouth that is fluidly connected to the embodiment's water reservoir 1873 and the filter 1871 therein. Water, absorbent or adsorbent materials, and/or solutions and/or suspensions of absorbent and/or adsorbent materials, may be added to, or removed from, 1874 the interior of the embodiment's buoy 1850 through, and/or via, the upper mouth of water-reservoir access pipe 1872.

Water-reservoir access pipe 1872 has a lower mouth that fluidly connects the embodiment's water reservoir 1873 and the filter 1871 therein to the atmosphere outside the embodiment. Water, absorbent materials, and/or solutions and/or suspensions of absorbent and/or adsorbent materials, may be added to, or removed from, 1875 the interior of the embodiment's buoy 1850 through, and/or via, the lower mouth of water-reservoir access pipe 1872.

The pressure of an air pocket 1876 nominally exceeds the pressure of the atmosphere outside the embodiment, thereby tending to cause a portion of the water within the embodiment's water reservoir 1873 to enter and flow up the water-reservoir access pipe 1872 to a height 1877 that is a consequence of the difference in the pressures of the air inside 1876 and outside the embodiment.

The absorbent and/or adsorbent material may be extracted, removed, and/or harvested, from the embodiment through, and/or via, a water-reservoir access pipe 1872. A ship, platform, and/or other object, vessel, conveyance, and/or vehicle, can insert a hose, tube, and/or pipe, into and through water-reservoir access pipe 1872, or, alternately, can attach and/or connect a hose to the upper and exterior mouth of water-reservoir access pipe 1872, and thereafter and therethrough remove, e.g., by suction within the hose, a portion, if not all, of the filter material 1871 within the embodiment 1850. Nominally, typically, and/or presumably, the filter material extracted will have absorbed and/or adsorbed a quantity of minerals, elements, molecules, chemicals, and/or particulates, from the body of water 1851 on which the embodiment floats. And, after extracting the original, and nominally mineral-rich filter material 1871 from the embodiment, the ship may then refill the lower portion of the interior of the embodiment's buoy 1850 with new, recycled, and/or the same, filter material, e.g., the same filter material might be reinserted into the embodiment's buoy following the extraction of any targeted minerals from the extracted filter material.

As the embodiment is moved up and down by waves passing across the surface 1851 of the body of water on which the embodiment floats, water entrained within its inertial water tube 1852 tends to oscillate. The water 1877 within the inertial water tube 1852 is shielded from a substantial portion of the wave motion outside the inertial water tube. And, the lower mouth 1853 of the inertial water tube tends to be at a depth near, at, or below, a wave base of the water 1851 on which the embodiment floats. As the water 1877 within the inertial water tube 1852 oscillates and/or moves up and down in response to wave action at the embodiment, water tends to move 1854 in and out of the lower mouth 1853 of the inertial water tube 1852, and the surface 1878 of the water within the inertial water tube 1852 tends to move 1879 up and down. Occasionally, water within the inertial water tube 1852 moves upward within the inertial water tube fast enough, and to a great enough height, that a portion of it escapes 1880 the upper mouth 1881 of the inertial water tube, thereby tending to fall into, and/or be deposited within, an upper portion of the water reservoir 1873, e.g., a portion of the water reservoir above an upper surface 1885, extent, and/or portion, of the filter 1871, and thereby tending to increase the volume of water therein, and tending to compress the air within the air pocket 1876.

As the water 1877 within the embodiment's inertial water tube 1852 moves up and down, and/or oscillates, there tends to be a net flow up the inertial water tube, through the upper mouth 1881 of the inertial water tube, and into the water reservoir 1873. There also tends to be a net flow of the water within the water reservoir 1873 down, through the filter 1871 therein, and out of effluent pipe 1856. Thus, though the motion of the water within the inertial water tube 1852 tends to be oscillatory, there tends to be a net flow into the embodiment's water reservoir 1873, and then back out of the embodiment. The circular flow of the water (into and then out of the embodiment) tends to be energized, and/or driven, by the energy, motion, and/or action, of the waves that move the embodiment.

The water 1877 within the embodiment's inertial water tube 1852 tends to move up and down and/or to oscillate in directions approximately parallel to a flow-parallel longitudinal axis of the inertial water tube. However, when the embodiment is buffeted by a sufficiently vigorous wave climate, then with respect to a period and/or interval of three or more wave periods, there is nominally, and/or tends to be, a net flow of water from the body of water 1851 on which the embodiment floats into the inertial water tube 1852 through the lower mouth 1853 of the inertial water tube. Similarly, when the embodiment is buffeted by a sufficiently vigorous wave climate, then with respect to a period and/or interval of three or more wave periods, there is nominally, and/or tends to be, a net flow of water 1877 from the interior of the inertial water tube 1852 through the upper mouth 1881 of the inertial water tube and into the water reservoir 1873.

The pressure of the air pocket 1876 above the water reservoir 1873 tends to push and/or force water near the upper surface 1873 of the water reservoir to flow 1882 downward and into and through the filter 1871. As the water is forced to flow down through the filter 1871, the filter tends to absorb and/or adsorb one or more specific, desirable, and/or targeted, species, varieties, types, and/or categories, of solutes, elements, molecules, chemicals, and/or particulates, within the water, thereby tending to trap those solutes within the filter 1871.

After flowing through the filter 1871, water flowing down through the water reservoir 1873, flows 1883 through a grating 1884, screen, permeable and/or porous barrier, and/or filter, and thereinto the hollow annular chamber, tank, and/or enclosure inside the annular collar 1855, after which it flows 1857 out through the mouth 1858 of effluent pipe 1856 thereby tending to generate a lateral thrust which tends to propel the embodiment across the surface 1851 of the body of water on which the embodiment floats and in a direction substantially opposite the direction of the effluent discharge 1857.

The embodiment includes, incorporates, and/or utilizes, an air pressure control system (not visible within a control chamber 1861 attached to an outer upper surface of the buoy 1850) that is able to pump air from 1865 the atmosphere into 1886 the pressurized air pocket 1876 within the buoy when it is necessary or advantageous to raise the pressure of the air within that air pocket. The embodiment's air pressure control system is also able to release air from 1887 within the pressurized air pocket 1876 within the buoy and into 1869 the atmosphere when it is necessary or advantageous to reduce the pressure of the air within that air pocket.

The embodiment also has an air pressure-relief pipe 1859 that is fluidly connected to the air pocket 1876 through an upper mouth and to the water 1851 outside the embodiment through a lower mouth. The pressure of the air within the air pocket 1876 tends to force a portion of that air to flow 1889 into and down the air pressure-relief pipe, thereby tending to push down the water that would otherwise rise within the air pressure-relief pipe, e.g., until it reached the height of the surface 1873 of the water reservoir. The level 1888 to which the water within the air pressure-relief pipe is pushed down tends to be determined by, and/or a consequence of, the difference and/or delta of pressure of the air 1876 in the air pocket above the water reservoir, and the pressure of the water 1851 outside the embodiment at the depth of the lower mouth of the air pressure-relief pipe. If and when the pressure of the air within the embodiment's air pocket 1876 exceeds the pressure of the water outside the lower mouth of that pipe then air from the air pocket 1876 will tend to be pushed down, and will tend to flow 1860 out (perhaps tending to create bubbles as illustrated in FIG. 222) of the lower mouth of the air pressure-relief pipe 1859, thereby relieving and/or reducing the surplus air pressure within the buoy 1850.

An embodiment of the present disclosure similar to the one illustrated in FIGS. 220-222 includes, incorporates, and/or utilizes, a filter that tends to absorb, adsorb, extract, capture, sequester, and/or harvest, dissolved elemental solutes on the basis of their atomic size, structure, charge (i.e., degree of ionization), valency, etc. For example, an embodiment of the present disclosure includes, incorporates, and/or utilizes, a filter that tends to absorb, and/or adsorb, only magnesium ions.

An embodiment of the present disclosure similar to the one illustrated in FIGS. 220-222 includes, incorporates, and/or utilizes, a filter that tends to absorb, adsorb, extract, capture, sequester, and/or harvest, a variety of solutes on the basis of their molecular size, structure, shape, charge (i.e., degree of ionization), valency, etc.

An embodiment of the present disclosure similar to the one illustrated in FIGS. 220-222 includes, incorporates, and/or utilizes, a filter that tends to absorb, adsorb, extract, capture, sequester, and/or harvest, a variety of solutes on the basis of their particle size, shape, and/or structure.

An embodiment of the present disclosure similar to the one illustrated in FIGS. 220-222 includes, incorporates, and/or utilizes, a filter that tends to absorb, adsorb, extract, capture, sequester, and/or harvest, a variety of solutes on the basis of their degree of ionization and/or electrical charge.

An embodiment of the present disclosure similar to the one illustrated in FIGS. 220-222 includes, incorporates, and/or utilizes, a filter that tends to absorb, adsorb, extract, capture, sequester, and/or harvest, a variety of solutes on the basis of their degree of hydrophilicity and/or their hydrophobicity.

FIG. 223 shows a side perspective view of an embodiment of the current disclosure.

The illustrated embodiment 1900 is buoyant and floats adjacent to an upper surface 1901 of a body of water. The embodiment has an approximately radially symmetrical bowl-shaped buoy portion 1902, 1903 at an upper end of the embodiment. An upper end and/or portion of the buoy is comprised of, and/or incorporates, an annular ring of buoyant material, which provides a substantial portion of the embodiment's buoyancy. A lower end and/or portion of the buoy is comprised of, and/or incorporates, a frustoconical wall that separates a substantially hollow interior from the body of water 1901 on which the embodiment floats.

Affixed, attached, included, and/or incorporated within the radial center of the buoy portion is a hollow inertial water tube 1904 with upper 1905 and lower 1906 mouths and/or apertures through which water may move into and out of the inertial water tube 1904.

In response to the passage of waves across the surface 1901 of the body of water on which the embodiment floats at, and/or proximate to, the embodiment, the embodiment tends to move up and down, and water partially trapped, entrained, sequestered, and/or confined, within the embodiment's inertial water tube 1904 tends to move up and down as well, often moving up and down out of phase with, and/or relative to, the embodiment and its inertial water tube. In other words, waves interacting with the embodiment tend to cause the water within the embodiment's inertial water tube 1904 to move and down relative to the embodiment (even while the embodiment is moving up and down).

Occasionally, water moving up and down within the inertial water tube 1904 moves up with enough momentum, energy, speed, and/or to a great enough height, that a portion of that water escapes 1907, and/or is ejected from, the upper mouth 1905 of the inertial water tube. At a first upper constricted portion 1908 of the inertial water tube, the flow-normal cross-sectional area of the tube narrows with respect to a first included angle of the tube wall, thereby becoming increasingly smaller than the flow-normal cross-sectional area of the lower mouth 1906 of the inertial water tube. The narrowing and/or constricted first upper constricted portion 1908 of the inertial water tube has an approximately frustoconical shape.

Above the first upper constricted portion 1908 of the inertial water tube, is a second upper constricted portion 1909, in and/or over which the flow-normal cross-sectional area decreases at a greater rate than that characterizing the first upper constricted portion 1908. The second included angle by and/or at which the second upper constricted portion of the inertial water tube narrows is greater than the first included angle.

The second upper constricted portion 1909 constitutes a nozzle through which ejected water (e.g., seawater) tends to be aerosolized and/or sprayed into the air.

FIG. 224 shows a side cross-sectional view of the same embodiment of the current disclosure that is illustrated in FIG. 223, where the section is taken along the section line 224-224 specified in FIG. 223.

As the embodiment moves up and down in response to the passage of waves, water 1910 within the inertial water tube 1904 moves up and down typically out of phase with the movements of the embodiment. As the water 1910 within the inertial water tube 1904 moves up and down, water tends to flow 1911 into and out of the lower mouth 1906 of the inertial water tube 1904. As the water 1910 within the inertial water tube 1904 moves up and down, an upper surface 1912 of that water 1910 tends to move 1913 up and down. Occasionally, the water 1910 within the inertial water tube 1904 will move up fast enough, with enough momentum, force, and/or energy, to reach and exit the upper mouth 1905 of the inertial water tube, thereby creating an aerosolized spray of water (e.g., seawater).

Buoyancy is provided to the embodiment through an annular ring of buoyant material 1914, e.g., contained within, and/or attached to, the outer wall 1902 of the buoy. Included, incorporated, positioned, stored, encased, and/or trapped, within the interior of the buoy 1902/1903 is a water ballast 1916. And that water 1916, and/or portions thereof, are free to splash out of an annular opening 1915 in the upper surface of the buoy.

Because there is no upper wall covering water ballast 1916, that water ballast, and/or the hollow, chamber, and/or tank, in which the water ballast is positioned, is open to the atmosphere above the embodiment. The level 1917 and/or volume of the water within the water ballast 1916 may be increased by overtopping waves, and ejections of water from the upper mouth 1905 of the inertial water tube 1904. The level 1917 and/or volume of the water within the water ballast 1916 may be decreased as a result of water spilling out during and/or as a consequence of wave induced tilting, as well as due to evaporation.

An embodiment of the present disclosure similar to the one illustrated in FIG. 224 includes, incorporates, and/or utilizes, a sealed, encased, and/or watertight space 1914 comprised of surrounding walls of a rigid material. Such a space may contain any gas or combination of gases, e.g., air, any liquid with a density less than that of the water 1901 on which the embodiment floats, and/or any solid with a density less than that of the water 1901 on which the embodiment floats, e.g., a porous solid the buoyancy of which depends upon its separation from water and/or other fluids.

An embodiment of the present disclosure similar to the one illustrated in FIG. 224 includes, incorporates, and/or utilizes, an upper buoy wall (e.g., at 1915) that covers the entire upper part of the buoy thereby preventing any change in the volume of the water therein.

An embodiment of the present disclosure similar to the one illustrated in FIG. 224 includes, incorporates, and/or utilizes, a ballast comprised, at least in part, of another fluid.

An embodiment of the present disclosure similar to the one illustrated in FIG. 224 includes, incorporates, and/or utilizes, a ballast comprised, at least in part, of one or more solid objects, materials, and/or elements, including, but not limited to, rocks, sand, other aggregates, metal pellets, iron bars, and other pieces of metal (e.g., discarded parts of automobiles).

FIG. 225 shows a right-side view of a modified version of the same embodiment of the current disclosure that is illustrated in FIGS. 205-213. While the embodiment illustrated in FIG. 225 is characterized by many, if not most, of the same features and design elements as the embodiment illustrated in FIGS. 205-213, the embodiment illustrated in FIG. 225 has been modified so as to embed its inertial water tube 1652 within an airfoil-shaped enclosure 1920/1921, shroud, and/or casing. The airfoil-shaped enclosure does not obstruct the channel within, nor the flow of water through, the inertial water tube 1652, nor through the lower mouth 1653 of the inertial water tube.

Airfoil-shaped enclosure 1920/1921 has a flow-normal cross-sectional shape that is similar to that of a wing, i.e., it has aerodynamic qualities that facilitate its movement through water in directions that are approximately parallel to the surface 1655 of the body of water on which the embodiment floats.

Airfoil-shaped enclosure 1920/1921 has a trailing edge 1921 that is approximately positioned beneath the embodiment's overflow aperture 1658, and approximately positioned between the left and right effluent apertures 1656 and 1657. The more bulbous and/or rounded leading edge 1920 of the airfoil-shaped enclosure is oriented toward the direction in which the embodiment would tend to be pushed by the thrust produced by the effluent discharged from the left 1657, right 1856, and overflow 1658, apertures.

The wall, casing, and/or barrier, that defines the shape of the airfoil-shaped enclosure 1920/1921 includes an upper portion comprised, at least in part, of upper walls 1923 and 1924 which prevent the contents of the airfoil-shaped enclosure from escaping the enclosure through the top of the enclosure. Similarly, the wall, casing, and/or barrier, that defines the shape of the airfoil-shaped enclosure 1920/1921 includes a lower portion comprised, at least in part, of lower walls 1925 and 1926 which prevent the contents of the airfoil-shaped enclosure from escaping the enclosure through the bottom of the enclosure.

FIG. 226 shows a back-side view of the same modified embodiment that is illustrated in FIG. 225, which is a modified version of the embodiment of the current disclosure that is illustrated in FIGS. 205-213.

FIG. 227 shows a horizontal cross-sectional view of the same modified embodiment of the current disclosure that is illustrated in FIGS. 225 and 226, where the section is taken along the section line 227-227 specified in FIGS. 225 and 226.

The inertial water tube has an unobstructed lower mouth 1653 and an unobstructed upper mouth 1659. In response to waves acting at and/or against the embodiment, water 1655 from outside the embodiment enters the inertial water tube 1652 through its lower mouth 1653, moves upward through the channel within the inertial water tube, is ejected from the inertial water tube through its upper mouth 1659, and enters into the water reservoir within the embodiment's hollow flotation module 1651. Thereafter, water from the water reservoir flows out through the embodiment's left or right effluent pipes and respective water turbines, generating electrical power, and returns to the body of water 1655 from whence it came.

The airfoil-shaped enclosure 1920/1921 is attached to, connected to, and/or integrated with, a portion of the wall of the inertial water tube 1652/1667/1660 positioned between the lower mouth 1653 of the inertial water tube and the embodiment's annular collar 1654.

A forward chamber 1927, void, and/or space, is formed at the leading side of the airfoil-shaped enclosure 1920/1921 and is positioned, bounded, and/or enclosed, at least in part, by the leading (blunt) side 1920 of the airfoil-shaped enclosure and the leading side ("leading" with respect to the nominal direction of the embodiment's motion through the body of water on which it floats) of the inertial water tube 1652.

A trailing chamber 1928, void, and/or space, is formed at the trailing side of the airfoil-shaped enclosure 1920/1921 and is positioned, bounded, and/or enclosed, at least in part, by the trailing (edged and/or shape) side 1921/1922 of the airfoil-shaped enclosure and the trailing side ("trailing" with respect to the nominal direction of the embodiment's motion through the body of water on which it floats) of the inertial water tube 1652.

The forward 1927 and trailing 1928 chambers are filled with water so that they are substantially neutrally buoyant.

An embodiment of the present disclosure that is similar to the embodiment illustrated in FIGS. 225-227 includes, incorporates, encases, traps, stores, fills, and/or utilizes, buoyant material within the forward 1927 and trailing 1928 chambers.

An embodiment of the present disclosure that is similar to the embodiment illustrated in FIGS. 225-227 includes, incorporates, encases, traps, stores, fills, and/or utilizes, relatively heavy, and/or negatively buoyant, material within the forward 1927 and trailing 1928 chambers. Such material might include, but is not limited to, rocks, gravel, sand, cement, cementitious materials, pieces of metal (e.g., scrap metals).

An embodiment of the present disclosure that is similar to the embodiment illustrated in FIGS. 225-227 includes, incorporates, encases, traps, stores, fills, and/or utilizes, a combination, mixture, and/or aggregate, of materials within the forward 1927 and trailing 1928 chambers, at least some of which differ in their buoyancies.

FIG. 228 shows a right-side view of a modified version of the same embodiment of the current disclosure that is illustrated in FIGS. 205-213. The modified embodiment illustrated in FIG. 228 is similar to the modified version illustrated in FIGS. 225-227, except that the version illustrated in FIG. 228 does not include, incorporate, nor utilize, upper or lower walls on, in, and/or as a part of, the airfoil-shaped enclosure 1920/1921.

The modified version illustrated in FIG. 228 has apertures at the upper 1929 and lower 1930 ends of the leading side 1920 of the airfoil-shaped enclosure. These openings and/or apertures allow water 1655 from the body of water on which the embodiment floats to flow 1931, and/or move, relatively freely through the forward chamber 1927 in directions approximately parallel to the nominally vertical and/or flow-parallel longitudinal axis of the embodiment's inertial water tube 1652. The ability of water 1655 to flow freely through the forward chamber of the airfoil-shaped enclosure means that neither the forward chamber, nor its contents (e.g., water), significantly alter the inertia, mass, and/or center of gravity, of the embodiment, with respect to the unmodified version illustrated in FIGS. 205-213.

The modified version illustrated in FIG. 228 has apertures at the upper 1932 and lower 1933 ends of the trailing side 1921/1922 of the airfoil-shaped enclosure. These openings and/or apertures allow water 1655 from the body of water on which the embodiment floats to flow 1934, and/or move, relatively freely through the trailing chamber 1928 in directions approximately parallel to the nominally vertical and/or flow-parallel longitudinal axis of the embodiment's inertial water tube 1652. The ability of water 1655 to flow freely through the trailing chamber of the airfoil-shaped enclosure means that neither the trailing chamber, nor its contents (e.g., water), significantly alter the inertia, mass, and/or center of gravity, of the embodiment, with respect to the unmodified version illustrated in FIGS. 205-213.

FIG. 229 shows a side perspective view of an embodiment of the current disclosure.

The embodiment includes, incorporates, and/or utilizes, a substantially hollow, buoyant capsule, and/or flotation module 1950 that tends to float adjacent to an upper surface of a body of water (not shown). Depending from the buoyant capsule 1950 is an inertial water tube 1951 that possesses upper (not visible) and lower 1952 mouths through which water may enter and exit the inertial water tube. Water tends to move into the inertial water tube through its lower mouth 1952 and then flow up the tube and thereafter flow out of, and/or be ejected from, the upper mouth (not visible) of the inertial water tube, thereby entering a water reservoir (not visible) within the buoyant capsule 1950. Also depending from the buoyant capsule 1950 is an effluent pipe 1953 that directs water exiting the embodiment's water reservoir (not visible) through a water turbine (not visible) into the interior of the inertial water tube 1951, with one consequence being that at least a portion of the effluent is likely to again flow up and out of the inertial water tube 1951, and again enter the embodiment's water reservoir.

FIG. 230 shows a side view of the same embodiment of the current disclosure that is illustrated in FIG. 229.

The embodiment 1950 floats adjacent to an upper surface 1954 of a body of water over which waves tend to pass. As a consequence of, and/or in response to, wave action at and/or against the embodiment water tends to flow 1955 in and out of a lower mouth 1952 of the embodiment's inertial water tube 1951.

FIG. 231 shows a side view of the same embodiment of the current disclosure that is illustrated in FIGS. 229 and 230.

FIG. 232 shows a vertical cross-sectional view of the same embodiment of the current disclosure that is illustrated in FIGS. 229-231, where the section is taken along the section line 232-232 specified in FIG. 231.

A pocket of air, and/or an air pocket, 1956 is trapped within an upper portion of the interior of the embodiment's buoyant capsule 1950, and that air pocket tends to be compressed and/or at a greater pressure than the air outside the embodiment. A pool and/or reservoir, and/or a water reservoir, 1957 is trapped, held, cached, positioned, stored, contained, and/or encased, within a lower portion of the interior of the embodiment's buoyant capsule 1950.

As the embodiment, and the surface 1954 of the water outside and surrounding the embodiment, move up and down in response to the action, impact, passage, and/or movement of waves across the surface 1954 of the body of water on which the embodiment floats, water 1958 inside the embodiment's inertial water tube 1951 tends to move and/or oscillate, e.g., 1959, in directions that tend to be approximately parallel to a nominally vertical longitudinal axis of the inertial water tube. Even though the water 1958 within the inertial water tube 1951 tends to oscillate, there also tends to be a net and/or average flow of water upwards within the inertial water tube.

Oscillations of the water 1958 within the inertial water tube tend to frequently, regularly, periodically, and/or occasionally, cause water from within the inertial water tube to be ejected 1960 from the upper mouth 1961 of the inertial water tube 1951, trapping that water in the embodiment's water reservoir 1957 and thereby preventing that water from reentering and flowing back into the inertial water tube. The frequent, regular, periodic, and/or occasional, ejections of water from, and/or out of, the upper mouth 1961 of the inertial water tube 1951, remove water from the inertial water tube 1951, and water from outside 1954 the embodiment tends to flow into the inertial water tube through its lower mouth 1952 thereby replacing the water ejected from the upper mouth 1961. The frequent, regular, periodic, and/or occasional, ejections of water from, and/or out of, the upper mouth 1961 of the inertial water tube 1951, and the replacement of that water with additional water from outside 1954 the embodiment, results in a net and/or average upward flow of water 1958 within the inertial water tube.

Water flowing 1960 into the water reservoir 1957 tends to raise the surface 1962 of the water reservoir and thereby compress and/or pressurize the air pocket 1956 located above the water reservoir. Water 1957 from the water reservoir, pressurized by the air within the air pocket 1956, tends to flow into an upper mouth and/or aperture 1963 of a water turbine housing and/or pipe 1964 in which a water turbine 1965 rotates in response to the influx of water into the water turbine housing 1964. After flowing through the water turbine 1965 water from the water turbine housing 1964 continues flowing 1966 down and through effluent pipe 1953.

Water 1967 flowing 1966/1968 through effluent pipe 1953 eventually flows 1969 through a lower mouth and/or aperture 1970 of effluent pipe 1953 and flows into the inertial water tube 1951. A portion of water flowing out of the effluent pipe 1953 and into the inertial water tube 1951 will tend to join the water 1958 in its wave-induced oscillations. A portion of water flowing out of the effluent pipe 1953 and into the inertial water tube 1951 might tend to remain, at least for a moment, localized within a portion and/or part of the inertial water tube 1951 adjacent to the lower mouth 1970 of the effluent pipe 1953, and thereabout move up and down, and/or oscillate, 1971 in unison with the rest of the water 1958 within the inertial water tube.

As water is ejected 1960 from the upper mouth 1961 of the inertial water tube 1951, and the water within the inertial water tube 1951 is pulled upward, the ejected water is replaced by both water drawn through the lower mouth 1952 of the inertial water tube 1951 and water discharged by the water turbine 1965 and guided into the inertial water tube through effluent pipe 1953, and the net and/or average upward flow of water within the inertial water tube continues. A portion of effluent water flowing out of the effluent pipe 1953 and into the inertial water tube 1951 will tend to initially become localized, e.g., in the region of 1971, adjacent to the lower mouth 1970 of the effluent pipe 1953, and, as the net and/or average flow of the water 1958 within the inertial water tubes moves upward in response to ejections 1960 from the upper mouth of the inertial water tube, the portion of effluent water originally localized in the region of 1971 will tend to move upward, e.g., 1959, within the inertial water tube until it is proximate 1972 to the upper mouth 1961 of the inertial water tube, and thereafter is once again ejected 1960 from that upper mouth 1961 and back into the water reservoir 1957.

As water flows over the lip and/or edge of the upper mouth 1963 of the water turbine housing 1964 and to and through the water turbine 1965, the water turbine is made, caused, and/or induced, to rotate about the longitudinal axis of its turbine shaft 1973, thereby rotating that turbine shaft and energizing the operatively connected generator 1974, thereby generating electrical power.

Positioned above the upper mouth 1961 of the inertial water tube 1951 is a conical water diverter 1975 that tends to, at least to a degree, laterally disperse water ejected in a nominally vertical and/or upward direction from the upper mouth of the inertial water tube.

This embodiment is well suited for various aquaculture applications, e.g., the raising of microalgae, macroalgae, and fish, because many of the organisms that escape the embodiment's water reservoir 1957 will tend to flow up the inertial water tube 1951 and to be ejected 1960 back into the water reservoir.

An embodiment of the present disclosure similar to the one illustrated in FIGS. 229-232 includes, incorporates, and/or utilizes, electricity-consuming lights attached to inner surfaces of the interior of the buoyant capsule 1950. And, electrical power generated by the embodiment's generator 1974 energizes at least a portion of those lights thereby illuminating the interior of the buoyant capsule and thereby promoting the growth of microalgae therein. This embodiment also includes, incorporates, and/or utilizes, an access tube similar to the algae access tube 1696 of the embodiment illustrated in FIG. 214, and the water-reservoir access pipe 1872 of the embodiment illustrated in FIGS. 220-222 which permits microalgae grown within the embodiment's water reservoir 1957 to be managed, assessed, evaluated, monitored, provided with nutritional supplements, and/or harvested.

FIG. 233 shows a perspective view of the same vertical cross-section of the embodiment of the current disclosure that is illustrated in FIG. 232, which is the same embodiment illustrated in FIGS. 229-231, and where the section is taken along the section line 232-232 specified in FIG. 231.

Water ejected 1960 from the upper mouth of the inertial water tube 1951 collects in the embodiment's water reservoir 1957. Portions of that water flow 1976 into the upper mouth and/or aperture of the water turbine housing 1964, thereafter flowing through the water turbine 1965, and energizing the operatively connected generator 1974 thereby resulting in the generation of electrical power. Water flowing out of the water turbine 1965 flows down, e.g., 1966 and 1968, through effluent pipe 1953 whereafter it flows 1969 into the inertial water tube 1951.

Portions of water that flow 1969 out of the effluent pipe 1953 and into the inertial water tube 1951 tend to remain, collect, mingle, and/or oscillate 1971 with water proximate and/or adjacent to the lower mouth (1970 in FIG. 232) of the inertial water tube. As ejections 1960 of water from the upper mouth (1961 in FIG. 232) of the inertial water tube remove water from the inertial water tube, that water tends to be replaced by effluent water 1967 flowing 1969 out of the effluent pipe and into the inertial water tube, and by water outside the embodiment flowing 1955 into the inertial water tube through the lower mouth (1952 in FIG. 232) of the inertial water tube.

A portion of the water discharged by the water turbine 1965 tends to be recaptured within the inertial water tube 1951 and returned to the water reservoir 1957 to again pass through the water turbine 1951.

FIG. 234 shows a close-up cut-away side view of a water turbine, turbine shaft, generator, and effluent pipe, of an embodiment of the current disclosure.

When an upper surface 2009 of the water 2000 within the embodiment's water reservoir, spills over 2001, and/or flows into, the upper mouth 2002 of the embodiment's effluent pipe 2003 (which is shown vertically sectioned so as to reveal the water turbine inside). As water flows 2001 into the mouth 2002, and/or into the upper portion, of the effluent pipe 2003 its flow is obstructed, at least to a degree, by water turbine 2004. The flowing water imparts rotational kinetic energy to the water turbine 2004 causing it to rotate 2010, which causes the water turbine's turbine shaft 2005 to rotate, which, in turn, causes the operatively connected generator 2006 to generate electrical power, at least a portion of which is then transmitted through electrical cable 2007 to another part of the embodiment, e.g., to a network of computing devices or light-emitting devices.

After passing through and energizing the water turbine, the water that flowed 2001 into the effluent pipe's upper mouth 2002, continues flowing 2008 through the effluent pipe 2003 until it is discharged from, and/or out of, the embodiment, e.g., returning to the body of water on which the embodiment floats.

An embodiment of the current disclosure similar to the embodiment illustrated in FIGS. 1-7 includes, incorporates, and/or utilizes, a water turbine 127, turbine shaft 109, generator 110, and effluent pipe 108 of the type, kind, design, and/or configuration, that is illustrated in FIG. 234.

An embodiment of the current disclosure similar to the embodiment illustrated in FIGS. 8-18 includes, incorporates, and/or utilizes, a water turbine 228, turbine shaft 229, generator 207, and effluent pipe 217 of the type, kind, design, and/or configuration, that is illustrated in FIG. 234.

An embodiment of the current disclosure similar to the embodiment illustrated in FIGS. 21-29 includes, incorporates, and/or utilizes, assemblies each of which is comprised of respective water turbines (e.g., 332), turbine shafts (e.g., 331), generators (e.g., 310), and effluent pipes (e.g., 319) of the type, kind, design, and/or configuration, that is illustrated in FIG. 234.

An embodiment of the current disclosure similar to the embodiment illustrated in FIGS. 35-43 includes, incorporates, and/or utilizes, a water turbine 435, turbine shaft 443, generator 419, and effluent pipe 434 of the type, kind, design, and/or configuration, that is illustrated in FIG. 234.

An embodiment of the current disclosure similar to the embodiment illustrated in FIGS. 44-54 includes, incorporates, and/or utilizes, a water turbine 532, turbine shaft 533, generator 511, and effluent pipe 523 of the type, kind, design, and/or configuration, that is illustrated in FIG. 234.

An embodiment of the current disclosure similar to the embodiment illustrated in FIGS. 94-101 includes, incorporates, and/or utilizes, a water turbine 923, turbine shaft, generator 924, and effluent pipe 907 of the type, kind, design, and/or configuration, that is illustrated in FIG. 234. However, with respect to the embodiment illustrated in FIGS. 94-101, the generator 924 and the upper mouth of the effluent pipe 907 are both fully submerged within a lower portion of the embodiment's water reservoir 920.

An embodiment of the current disclosure similar to the embodiment illustrated in FIGS. 102-112 includes, incorporates, and/or utilizes, a water turbine 954, turbine shaft 955, generator 956, and effluent pipe 935 of the type, kind, design, and/or configuration, that is illustrated in FIG. 234. However, with respect to the embodiment illustrated in FIGS. 102-112, the upper mouth of the effluent pipe 935 is fully submerged within a lower portion of the embodiment's water reservoir 951.

An embodiment of the current disclosure similar to the embodiment illustrated in FIGS. 125-137 includes, incorporates, and/or utilizes, a water turbine 1160, turbine shaft 1141, generator 1134, and effluent pipe 1114 of the type, kind, design, and/or configuration, that is illustrated in FIG. 234. However, with respect to the embodiment illustrated in FIGS. 125-137, the upper mouth of the effluent pipe 1114 is fully submerged within a lower portion of the embodiment's low-energy water reservoir 1131.

An embodiment of the current disclosure similar to the embodiment illustrated in FIGS. 205-213 includes, incorporates, and/or utilizes, a pair of water turbine assemblies, each of which includes, incorporates, and/or utilizes, a water turbine (1673 and 1674, respectively), a turbine shaft (1677 and 1678, respectively), a generator (1683 and 1684, respectively), and an effluent pipe (1671 and 1672, respectively) of the type, kind, design, and/or configuration, that is illustrated in FIG. 234.

An embodiment of the current disclosure similar to the embodiment illustrated in FIGS. 229-233 includes, incorporates, and/or utilizes, a water turbine 1965, turbine shaft 1973, generator 1974, and effluent pipe 1964/1953 of the type, kind, design, and/or configuration, that is illustrated in FIG. 234.

In any of the above cases, the conduit or effluent pipe upstream of the turbine can include a converging (e.g. Venturi) section, and in any of the above cases, the conduit or effluent pipe downstream of the turbine can include a diverging/expanding (e.g. Venturi) section.

FIG. 235 shows a perspective view of the same water turbine, turbine shaft, generator, and effluent pipe, illustrated in FIG. 234.

FIG. 236 shows a close-up cut-away side view of a water turbine, generator, and effluent pipe assembly of an embodiment of the current disclosure. Water turbine 2020 is positioned adjacent to the inlet mouth of effluent pipe 2022 through which water drains from the embodiment's water reservoir 2023 and which is shown vertically sectioned so as to better reveal the water turbine 2020. Arrayed about the inlet mouth of the effluent pipe is a plurality of water diverting fins, e.g., 2021, which cause water flowing 2033 from the surface 2025 of the embodiment's water reservoir

2023 to flow into the effluent pipe 2022 in a direction that is not entirely radial (with respect to a flow-parallel and/or longitudinal axis of the effluent pipe) but also contains a tangential component, which tends to induce a swirling motion to the water flowing toward and through the water turbine 2020.

The water turbine 2020 is operatively connected to a generator 2026 by a shaft 2027, and rotation of the water turbine causes rotation 2031 of the turbine shaft 2027 which, in turn, causes the generator to generate electrical power, and/or an electrical voltage, a portion of which is then transmitted to another part of the embodiment by electrical cable 2028. In a similar embodiment, electrical cable 2028 also permits the embodiment's control system to adjust, control, set, change, and/or alter, the magnitude of the resistive torque applied by the generator 2026 to the water turbine 2020, thereby altering both the amount of electrical power that generator 2026 generates (with respect to a given rate of water turbine rotation), and the degree to which the water turbine inhibits the flow of water into 2033 and through 2029 the effluent pipe 2022 and/or the rate at which the water reservoir 2023 drains.

FIG. 237 shows a perspective view of the same water turbine, turbine shaft, generator, and effluent pipe, illustrated in FIG. 236. The only path by which water may flow into the upper mouth of the effluent pipe 2022 is through and/or between the circular array of wicket gates as the upper wicket plate 2024 prevents water from entering that upper mouth by any other path.

An embodiment of the current disclosure similar to the embodiment illustrated in FIGS. 8-18 includes, incorporates, and/or utilizes, a water turbine 228, turbine shaft 229, generator 207, and effluent pipe 217 of the type, kind, design, and/or configuration, that is illustrated in FIGS. 236 and 237.

An embodiment of the current disclosure similar to the embodiment illustrated in FIGS. 44-54 includes, incorporates, and/or utilizes, a water turbine 532, turbine shaft 533, generator 511, and effluent pipe 523 of the type, kind, design, and/or configuration, that is illustrated in FIGS. 236 and 237.

An embodiment of the current disclosure similar to the embodiment illustrated in FIGS. 55-69 includes, incorporates, and/or utilizes, a water turbine, turbine shaft, generator, and effluent pipe of the type, kind, design, and/or configuration, that is illustrated in FIGS. 236 and 237. However, this embodiment, unlike the embodiment illustrated in FIGS. 55-69 directs the water flowing through turbine ingress pipe 608 into a chamber surrounding a wicket gate and/or guide vane assembly of the kind illustrated in FIGS. 236 and 237, after which the water flows onto and through a water turbine 2020. Water discharged by the water turbine 2020 then flows into the embodiment's cooling chamber 637, and then into effluent pipe 609.

An embodiment of the current disclosure similar to the embodiment illustrated in FIGS. 70-79 includes, incorporates, and/or utilizes, a water turbine, turbine shaft, generator, and effluent pipe of the type, kind, design, and/or configuration, that is illustrated in FIGS. 236 and 237. However, this embodiment, unlike the embodiment illustrated in FIGS. 70-79 directs the water flowing through turbine ingress pipe 702 into a chamber surrounding a wicket gate and/or guide vane assembly of the kind illustrated in FIGS. 236 and 237, after which the water flows onto and through a water turbine 2020. Water discharged by the water turbine 2020 then flows into the embodiment's effluent pipe 705/707.

An embodiment of the current disclosure similar to the embodiment illustrated in FIGS. 80-93 includes, incorporates, and/or utilizes, a water turbine, turbine shaft, generator, and effluent pipe of the type, kind, design, and/or configuration, that is illustrated in FIGS. 236 and 237. However, this embodiment, unlike the embodiment illustrated in FIGS. 80-93 directs the water flowing through turbine ingress pipe 807 into a chamber surrounding a wicket gate and/or guide vane assembly of the kind illustrated in FIGS. 236 and 237, after which the water flows onto and through a water turbine 2020. Water discharged by the water turbine 2020 then flows into the embodiment's effluent pipe 809.

An embodiment of the current disclosure similar to the embodiment illustrated in FIGS. 94-101 includes, incorporates, and/or utilizes, a water turbine, turbine shaft, generator, and effluent pipe of the type, kind, design, and/or configuration, that is illustrated in FIGS. 236 and 237. However, with respect to the embodiment illustrated in FIGS. 94-101, the generator 924 and the upper mouth of the effluent pipe 907 are both fully submerged within a lower portion of the embodiment's water reservoir 920. The upper wicket plate 2024 forces water to flow through the wicket gates (even though the wicket gates and upper mouth of the effluent pipe are submerged).

An embodiment of the current disclosure similar to the embodiment illustrated in FIGS. 102-112 includes, incorporates, and/or utilizes, a water turbine, turbine shaft, generator, and effluent pipe of the type, kind, design, and/or configuration, that is illustrated in FIGS. 236 and 237. However, with respect to the embodiment illustrated in FIGS. 102-112, the upper mouth of the effluent pipe 935 is fully submerged within a lower portion of the embodiment's water reservoir 951. The upper wicket plate 2024 forces water to flow through the wicket gates (even though the wicket gates and upper mouth of the effluent pipe are submerged).

An embodiment of the current disclosure similar to the embodiment illustrated in FIGS. 113-124 includes, incorporates, and/or utilizes, a water turbine, turbine shaft, generator, and effluent pipe of the type, kind, design, and/or configuration, that is illustrated in FIGS. 236 and 237. However, this embodiment, unlike the embodiment illustrated in FIGS. 113-124 directs the water flowing through turbine ingress pipe 1049 into a chamber surrounding a wicket gate and/or guide vane assembly of the kind illustrated in FIGS. 236 and 237, after which the water flows onto and through a water turbine 2020. Water discharged by the water turbine 2020 then flows into the embodiment's effluent pipe 1025.

An embodiment of the current disclosure similar to the embodiment illustrated in FIGS. 125-137 includes, incorporates, and/or utilizes, two assemblies each comprised of a water turbine, turbine shaft, generator, and effluent pipe of the type, kind, design, and/or configuration, that is illustrated in FIGS. 236 and 237. With respect to a high-energy turbine assembly (i.e., one through which flows water from the embodiment's high-energy water reservoir 1133), this embodiment, unlike the embodiment illustrated in FIGS. 125-137 directs the water flowing through turbine ingress pipe 1135 into a chamber surrounding a wicket gate and/or guide vane assembly of the kind illustrated in FIGS. 236 and 237, after which the water flows onto and through a water turbine 2020. Water discharged by the water turbine 2020 then flows into the embodiment's effluent pipe 1107. And, with respect to a low-energy turbine assembly (i.e., one through which flows water from the embodiment's low-energy water reservoir 1131), this embodiment, unlike the embodiment illustrated in FIGS. 125-137, compels the water flowing into the effluent pipe 1114 to flow through an array of wicket gates even though the upper mouth of the effluent pipe 1114 is fully submerged within a lower portion of the embodiment's low-energy water reservoir 1131. The upper wicket plate 2024 forces water to flow through the wicket gates (even though the wicket gates and upper mouth of the effluent pipe are submerged).

An embodiment of the current disclosure similar to the embodiment illustrated in FIGS. 148-151 includes, incorporates, and/or utilizes, a water turbine, turbine shaft, generator, and effluent pipe of the type, kind, design, and/or configuration, that is illustrated in FIGS. 236 and 237. However, with respect to the embodiment illustrated in FIGS. 148-151, the generator 1312 and the upper mouth of the effluent pipe 1310 are both fully submerged within a lower portion of the embodiment's water reservoir 1313. The upper wicket plate 2024 forces water to flow through the wicket gates (even though the wicket gates and upper mouth of the effluent pipe are submerged).

An embodiment of the current disclosure similar to the embodiment illustrated in FIGS. 205-213 includes, incorporates, and/or utilizes, a pair of water turbine assemblies, each of which includes, incorporates, and/or utilizes, a water turbine (1673 and 1674, respectively), a turbine shaft (1677 and 1678, respectively), a generator (1683 and 1684, respectively), and an effluent pipe (1671 and 1672, respectively) of the type, kind, design, and/or configuration, that is illustrated in FIGS. 236 and 237.

An embodiment of the current disclosure similar to the embodiment illustrated in FIGS. 229-233 includes, incorporates, and/or utilizes, a water turbine 1965, turbine shaft 1973, generator 1974, and effluent pipe 1964/1953 of the type, kind, design, and/or configuration, that is illustrated in FIGS. 236 and 237.

FIG. 238 shows a perspective cut-away view of the same water turbine, turbine shaft, generator, and effluent pipe, illustrated in FIGS. 236 and 237.

An embodiment of the current disclosure includes, incorporates, and/or utilizes a water turbine that is similar in design, function, operation, behavior, and performance, to that of a Kaplan turbine.

An embodiment of the current disclosure includes, incorporates, and/or utilizes a water turbine that is similar in design, function, operation, behavior, and performance, to that of a Francis turbine.

An embodiment of the current disclosure includes, incorporates, and/or utilizes a water turbine that is similar in design, function, operation, behavior, and performance, to that of a crossflow turbine.

An embodiment of the current disclosure includes, incorporates, and/or utilizes a water turbine that is similar in design, function, operation, behavior, and performance, to that of a Turgo turbine.

An embodiment of the current disclosure includes, incorporates, and/or utilizes a water turbine may be characterized as a fixed-pitch propeller.

The scope of the present disclosure includes embodiments that include, incorporate, and/or utilize, any type, variety, class, category, and/or style of water turbine. The scope of the present disclosure includes embodiments that include, incorporate, and/or utilize, water turbines of any size, orientation, and/or relative position within the embodiment, as well as water turbines fabricated of any materials.

FIG. 239 shows a side perspective view of an embodiment of the current disclosure.

The embodiment includes, incorporates, and/or utilizes, a substantially hollow bowl 2050 to which is attached and/or incorporated an annular buoyancy ring 2051 comprised of buoyant material. The hollow bowl 2050 has a bowl lip 2052 that defines a bowl mouth and/or aperture through which the interior of the bowl is fluidly connected to the exterior of the embodiment and through which water ejected by an intra-bowl mouth (not visible) of the embodiment's inertial water tube 2053 can flow 2054 through the bowl mouth and escape the embodiment, at least for a moment.

The bowl lip 2052 of the embodiment is formed by, and/or constitutes, an open and/or distal edge of a concave portion 2055 of the wall and/or hull of the bowl. Below the concave portion 2055 of the bowl is a convex portion 2050 about which the annular buoyancy ring is attached, connected, and/or incorporated. And below the convex portion 2050 is an approximately frustoconical portion 2056. The nominally upper concave portion, the nominally middle convex portion, and the nominally lower frustoconical portion, together constitute the hollow bowl 2050, 2055, 2056.

Effluent from the inertial water tube's water discharges flows 2057 out of the embodiment through effluent pipe 2058.

As the embodiment is moved by passing waves, water tends to move and/or flow 2059 in and out of an extra-bowl mouth positioned at an end of the inertial water tube 2053 that is opposite that of the intra-bowl mouth (not visible).

FIG. 240 shows a side view of the same embodiment of the current disclosure that is illustrated in FIG. 239. The embodiment tends to float adjacent to an upper surface 2060 of a body of water over which waves tend to pass.

FIG. 241 shows a side view of the same embodiment of the current disclosure that is illustrated in FIGS. 239 and 240.

FIG. 242 shows a top-down view of the same embodiment of the current disclosure that is illustrated in FIGS. 239-241.

An upper mouth is defined by bowl lip 2052 said bowl lip being at an upper end of concave bowl portion 2055. Inside the hollow, void, chamber, space, and/or compartment within the interior of the hollow bowl 2050/2052 is a first constricted portion 2061 of the embodiment's inertial water tube. And, at the uppermost end of the inertial water tube is a second constricted portion 2062, and at the upper end of that second constricted portion is an upper, and/or intra-bowl, mouth 2063 through which water is occasionally ejected from the inertial water tube.

Adjacent to the bottom of the interior of the hollow bowl 2050/2052 is a flat bottom wall and/or surface 2064 and penetrating that flat bottom wall is the upper mouth of an effluent pipe 2058.

FIG. 243 shows a bottom-up view of the same embodiment of the current disclosure that is illustrated in FIGS. 239-242.

FIG. 244 shows a vertical cross-sectional view of the same embodiment of the current disclosure that is illustrated in FIGS. 239-243, where the section is taken along the section line 244-244 specified in FIGS. 242 and 243.

As the embodiment is moved up and down by waves passing along the surface 2060 of the body of water on which the embodiment floats, water 2065 within the embodiment's inertial water tube 2053 tends to move up and down relative to that tube, tending to cause water to move 2059 into and out of the lower mouth 2066 of the inertial water tube, and also tending to cause an upper surface 2067 of the water 2065 within the inertial water tube to move up and down, and occasionally causing that surface to be projected 2054, lifted, elevated, and/or ejected, beyond and/or outside of the upper mouth 2063 of the inertial water tube. A portion of the ejected water tends to fall back into, and become trapped within, the interior of the hollow bowl 2050/2056, wherein the body of such trapped discharges of water form a water reservoir 2068 having an upper surface 2069. A portion of the ejected water may travel outside and/or above the upper mouth 2075 of the hollow bowl 2055/2050, thereby potentially escaping the embodiment and returning to the environment outside the embodiment.

Water moving upward within the inertial water tube 2053 from the tube's lower mouth 2066, initially flows through a lower tube portion 2053 characterized by an approximately constant flow-normal cross-sectional area, e.g., an approximately cylindrical portion. The water then flows through a lower constricting portion 2061 where the progressively decreasing flow-normal cross-sectional area tends to increase the speed at which the water flows upward, e.g., through that portion of the inertial water tube and relative to the speed at which it flowed upward through the lower cylindrical portion 2053. The water then flows through a relatively short tube portion 2070 that is, like the lower tube portion 2053, also characterized by an approximately constant flow-normal cross-sectional area, e.g., an approximately cylindrical portion. And, finally, the water flows through an upper constricting portion 2062 where the progressively decreasing flow-normal cross-sectional area tends to further increase the speed at which the water flows upward, e.g., through that portion of the inertial water tube and relative to the speed at which it flowed upward through the both the lower cylindrical portion 2053 and the middle cylindrical portion 2070.

Because the interior of the hollow bowl 2050/2055 is open to the atmosphere, and not pressurized beyond that of the atmosphere, the average height of the upper surface 2067 of the water 2065 within the embodiment's inertial water tube 2053/2061/2070/2062 will tend to be at least approximately equal to the height of the water 2060 on which the embodiment floats.

At least a portion of the water ejected 2054 from the upper mouth 2063 of the inertial water tube 2053 tends to fall into, and be captured within, the water reservoir 2068. Water from the water reservoir 2068 tends to flow 2057 into an upper mouth 2071 of effluent pipe 2058, flow through the effluent pipe, and then flow 2057 out of a lower mouth 2072 of the effluent pipe, thereby returning to the body of water 2060 on which the embodiment floats.

The upper mouth 2071 of effluent pipe 2058 is and/or constitutes an aperture within a bottom plate 2064. If the embodiment illustrated in FIGS. 239-244 is used to cultivate fish, shrimp, crabs, lobsters, and/or other marine animals, then a mesh, grid, screen, and/or porous barrier (not shown) across the upper mouth 2071 of the effluent pipe 2058 will prevent many, if not all, of those marine animals from being discharged from the embodiment, and lost, through the effluent pipe. However, any waste products produced by those marine animals will tend to collect on an upper surface of the bottom plate 2064 and be drawn into the effluent pipe 2058 through its upper mouth 2071 and thereby eliminated from the water reservoir 2068, thereby tending to promote the good health of those marine animals.

The interior of the embodiment's annular void 2073 beneath bottom plate 2064 may be filled with water, e.g., in order to add mass to the embodiment. It may be filled with a buoyant material (e.g., foam, air, or wood) in order to promote the buoyancy of the embodiment. It may be filled with a negatively buoyant material in order to decrease the buoyancy of the embodiment.

The interior 2074 of the embodiment's annular buoyancy ring 2051 is comprised, at least in part, of a structural foam that is buoyant. An embodiment of the present disclosure that is similar to the one illustrated in FIGS. 239-244 includes, incorporates, and/or utilizes, an annular buoyancy ring 2051 comprised of an outer and/or exterior wall inside of which is trapped and/or sealed a volume of a gas, e.g., of air.

FIG. 245 shows a perspective view of the same vertical cross-sectional view that is illustrated in FIG. 244, where the section is taken along the section line 244-244 as specified in FIGS. 242 and 243.

FIG. 246 shows a side view of an embodiment of the present disclosure.

The embodiment 2100 floats adjacent to an upper surface 2101 of a body of water over which waves tend to pass. The embodiment 2100 is the same embodiment illustrated in FIGS. 205-213, with the exception that the embodiment 2100 has been augmented with a computer enclosure 2103, attached to an upper platform 2104 of the embodiment, which contains and/or houses electronic circuits and mechanisms, which include, but are not limited to: computers, routers, memory modules, encryption and decryption circuits, an embodiment-specific control system, radio transmission and receiving circuits, navigation circuits. The embodiment's computer enclosure 2103 also includes energy storage devices and mechanisms, which include, but are not limited to: batteries, capacitors, inductors, fly wheels, and fuel cells.

Also attached to the embodiment's upper platform 2104 is a phased army antenna 2105 that facilitates the exchange of encoded radio transmissions 2126/2127 between the embodiment and antennas connected to, and/or controlled by, other objects, including, but not limited to: satellites 2128, ships, planes, balloon-suspended transceivers, and/or terrestrial transceivers, computers and networks.

At least a portion of the electrical power generated by the embodiment, and/or extracted by the embodiment from the ambient wave environment, is used to energize at least a portion of the electronic circuits positioned, stored, and/or protected within, the computer enclosure 2103 and the embodiment's phased array antenna 2105.

At least a portion of the electrical power generated by the embodiment, and/or extracted by the embodiment from the ambient wave environment, is used to energize autonomous underwater vehicles (AUV), e.g., 2106.

A tether 2107, cable, conduit, and/or circuit, connects the embodiment 2100 at connector 2108 to a submerged, and approximately neutrally buoyant AUV hub 2109, and is supported, at least in part, by a plurality of floats, e.g., 2110. Tether 2107 transmits electrical power to the AUV hub 2109 which is shared with AUVs when those AUVs, e.g., 2106, couple and/or dock with the AUV hub. Tether 2107 also transmits data between the embodiment's computing devices and/or control system (not shown) and docked AUVs.

AUV hub 2109 is connected to a weight 2111 that promotes the stability of its orientation. AUV hub 2109 contains a number, e.g., 4, docking ports, e.g., 2112-2114, each of which contains acoustic, visual, and magnetic signals and/or guides, e.g., a speaker and microphone 2115 that emits a click of a specific frequency in response to a click of generated by the speaker 2116 of an AUV, e.g., 2117. The clicks exchanged between the AUV hub 2109 and the various AUVs that it supports, e.g., 2106, are simulations of clicks generated by whales and/or other marine cetaceans.

Each AUV cooperating and/or interacting with the illustrated embodiment 2100 is propelled by a propeller, e.g., 2118 and 2119 on AUVs 2106 and 2117, respectively. The orientation and direction of each AUV cooperating and/or interacting with the illustrated embodiment 2100 is controlled by a plurality of fins, e.g., 2120 and 2121 on AUVs 2106 and 2116, respectively. Each AUV cooperating and/or interacting with the illustrated embodiment 2100 contains a camera, light, and acoustic generator (speaker), e.g., 2122 on AUV 2116.

Each AUV's acoustic generator is able to generate a simulated whale click (or other sound), e.g., 2123, that can be directed to reflect off the seafloor 2123, e.g., at 2125, or another surface, and thereafter be received, heard, and/or detected, by the respective AUV's microphone 2116 (2116 is a microphone and speaker). By determining the time required for the generated acoustic signal 2123 to be reflected and subsequently detected by microphone 2116, the AUV can determine the approximate distance between the AUV's speaker 2122 and the portion of the seafloor, e.g., 2125, that gave rise to the reflection. When combined with measurement of the depth-related water pressure of the AUV, the depth of the seafloor, e.g., at 2125, may be determined, at least to an approximate degree, thereby permitting a mapping of the terrain, depth elevations, etc. of those portions of the seafloor so surveyed.

Analysis of the reflected AUV acoustic signal may also signify information about the composition and/or density of the material at the reflecting surface(s). The AUV's camera and light 2122 can potentially produce images of the seafloor, and/or other objects of interest, e.g., of the same portion of the seafloor 2125 depth-ranged by the AUV's acoustic generator and microphone.

Though the illustrated embodiment 2100 generates electrical power solely in response to wave motion, the scope of the present disclosure includes embodiments similar to the one illustrated in FIG. 246 that extract energy from wind, waves, solar radiation, thermal differences, salinity differences, pressure differences, and/or any other source of energy accessible and/or available to a floating, drifting, and/or self-propelled embodiment. The scope of the present disclosure includes embodiments similar to the one illustrated in FIG. 246 that utilize any type of energy production mechanism, machine, device, technology, design, and/or apparatus. The scope of the present disclosure includes embodiments similar to the one illustrated in FIG. 246 that provide energy to, and/or exchange data with, any type of fully or partially submerged autonomous, semi-autonomous, and/or remote-controlled, vessel, vehicle, device, mechanism, and/or craft, including, but not limited to: autonomous underwater vehicles (AUVs), remotely-operated vehicles (ROVs), and/or autonomous surface vessels (e.g., that tend to float adjacent to the surface 2101 of a body of water. The scope of the present disclosure includes embodiments similar to the one illustrated in FIG. 246 that provide energy to, and/or exchange data with, subordinate vessels (e.g., AUVs) that are self-propelled and untethered to the embodiment, as well as those that are continuously tethered to the embodiment.

FIG. 247 shows a side view of an embodiment of the present disclosure.

The embodiment 2150 floats adjacent to an upper surface 2151 of a body of water over which waves tend to pass. The embodiment 2150 is the same embodiment illustrated in FIGS. 205-213, with the exception that the embodiment 2150 has been augmented with a computer enclosure 2153, attached to an upper platform 2154 of the embodiment, which contains and/or houses electronic circuits and mechanisms, which include, but an: not limited to: computers, routers, memory modules, encryption and decryption circuits, an embodiment-specific control system, radio transmission and receiving circuits, navigation circuits. The embodiment's computer enclosure 2153 also includes energy storage devices and mechanisms, which include, but are not limited to: batteries, capacitors, inductors, fly wheels, and fuel cells.

Also attached to the embodiment's upper platform 2154 is a phased array antenna 2155 that facilitates the exchange of encoded radio transmissions between the embodiment and antennas connected to, and/or controlled by, other objects, including, but not limited to: satellites 2156, ships, planes, balloon-suspended transceivers, and/or terrestrial transceivers, computers and networks.

Also attached to the embodiment is an autonomous underwater vehicle (AUV) 2157.

At least a portion of the electrical power generated by the embodiment, and/or extracted by the embodiment from the ambient wave environment, is used to energize at least a portion of the electronic circuits positioned, stored, and/or protected within, the computer enclosure 2153 and the embodiment's phased array antenna 2155.

At least a portion of the electrical power generated by the embodiment, and/or extracted by the embodiment from the ambient wave environment, is used to energize autonomous underwater vehicles (AUV), e.g., 2157.

Attached to a lower portion of the embodiment 2150, e.g., to a lower portion of the embodiment's inertial water tube 2158, at 2159, is a tether 2160, cable, conduit, tube, and/or multi-stranded wire, that is, at least in part, supported and/or suspended within the body of water 2151 by a plurality of floats, e.g., 2161, that offset the positive wet and/or specific weight of the tether and tend to impart to the tether an approximately neutral buoyancy.

Directly connected to a lower end of the tether 2160, at connector 2162, is a remotely-operated vehicle (ROV) 2157. The embodiment's ROV 2157 is propelled by four propeller-thrusters, three 2163-2165 are visible in the illustration of FIG. 247. All but the backmost thruster 2163 are able to rotate about the rod that rotatably connects them to the body 2157 of the ROV, thereby allowing the ROV to turn and maneuver. Note that the orientations of thrusters 2164 and 2165 are different with respect to a longitudinal axis of the ROV, and the thrust that they would produce in such an orientation would not tend to be parallel, aligned, or in the same directions.

The embodiment's ROV 2157 has two cameras 2166 and 2167 with overlapping fields of view allowing stereoscopic analysis of the images taken which may then permit, at least partial, 3D models to be constructed of the objects and/or surfaces so imaged. The embodiment's ROV 2157 also has an upper 2168 and a lower 2169 acoustic sensors, each capable of generating, and receiving and/or detecting, sounds (e.g., simulated whale clicks). These acoustic sensors provide the ROV 2157 with the ability to detect distances to other objects and/or surfaces.

The embodiment's ROV, among other uses, may provide sufficient information and/or data to permit the embodiment to map the depths of the seafloor 2170, and/or its surface contours. The lower acoustic sensor 2169 on the embodiment's ROV 2157 can generate a sound 2171 and thereafter detect its reflected echo, thereby allowing the ROV 2157 to gauge the distance between that sensor and the seafloor 2170 beneath the ROV, allowing that distance to be calculated, at least to an approximate degree. The ROV also incorporates a pressure and/or depth sensor that allows it to determine its depth, at least to an approximate degree. By combining these two distances, i.e., the distance between the ROV's lower acoustic sensor 2169 and the seafloor 2170, and the depth of the ROV, and the distance between the surface 2151 of the body of water on which the embodiment floats and the seafloor 2170 can be calculated, at least to an approximate degree, thereby permitting, as the embodiment moves across the surface 2151 of the body of water and the seafloor below, the mapping of the elevations and/or depths of portions of the seafloor overpassed by the embodiment and/or its ROV.

A tube-mounted acoustic sensor 2172, attached to the embodiment's inertial water tube 2158, is capable of generating sounds 2173 that can reach 2174 the ROV 2157 and be detected by its upper acoustic sensor, e.g., 2168. Since the embodiment's control system (not shown) knows the time at which the sound was emitted, as well as the time at which it was received by the ROV, the embodiment can calculate, at least to an approximate degree, an "acoustic distance" between the embodiment's tube-mounted acoustic sensor 2172 and the ROV's 2168 upper acoustic sensor. The embodiment's tube-mounted acoustic sensor can be a combination of a speaker and hydrophone.

The embodiment possesses stereoscopic cameras, and other sensors, mounted to an upper portion of the buoy 2150 that allow it to calculate the height of its own waterline, and/or the draft or depth of its inertial water tube 2158. Subtracting this tube depth from the ROV depth determined by the ROV's pressure and/or depth sensor (not shown) permits the embodiment to determine the "tube-relative depth" of the ROV relative to the bottom of its inertial water tube 2158 and/or to the tube-mounted acoustic sensor 2172 mounted thereto.

If the value of the tube-relative depth equals the acoustic distance, then the ROV must, at least to an approximate degree, be directly beneath the tube 2158 and/or the tube-mounted acoustic sensor 2172. However, if the value of the tube-relative depth is greater than the acoustic distance, then the ROV's position must be within a horizontal plane (i.e., within a plane parallel to the resting surface 2151 of the body of water on which the embodiment floats), and on a circle centered about a projection of a vertical axis passing through the tube-mounted acoustic sensor 2172. Thus, the position of the ROV must be, at least to an approximate degree, on such a circular path. This enables the embodiment's control system (not shown) to make adjustments to the ROV's position (e.g., through commands to the ROV 2157 causing the ROV to execute specific thrust vectors relative to its own longitudinal axis and/or geometry) and note the corresponding changes in the diameter of the circular path on which the ROV must be positioned.

Through trial and error, and/or in combination with data from accelerometers on the buoy 2150 and ROV 2157, GPS receiver(s) on the buoy 2150 and/or within its computer enclosure 2153, differential times at which ambient underwater noises are detected by the tube-mounted acoustic sensor 2172 and one or both of the ROV's acoustic sensors 2168 and 2169, and/or other position-sensing instruments, mechanisms, devices, and/or sensors, the embodiment's control system can steer its ROV with thrusts of magnitudes and orientations that cause the ROV to follow the movement of the embodiment's buoy 2150 across the surface 2151 of the body of water on which the embodiment floats (regardless of whether that movement is passive, i.e., drifting, or directed, e.g., via self-propulsion) and/or to stay beneath the embodiment's inertial water tube 2158, at least to an approximate degree.

While the embodiment illustrated in FIG. 247 includes a single tether-connected ROV 2157, the scope of the present disclosure includes embodiments with any number of such tethered ROVs, and/or with any number of untethered ROVs, and/or with any number of ROV docking ports from which energy may be obtained and/or replenished. While the embodiment's ROV illustrated in FIG. 247 includes and utilizes cameras and acoustic sensors, the scope of the present disclosure includes embodiments with ROVs incorporating any kind, type, and/or number of sensors.

FIG. 248 shows a side view of an embodiment of the present disclosure.

The embodiment 2200 floats adjacent to an upper surface 2201 of a body of water over which waves pass. The embodiment contains a buoyant, and/or buoy, portion 2200 and a depending tubular portion 2202, i.e., an inertial water tube, and is the same embodiment illustrated in FIGS. 205-213, with the exception that the embodiment 2200 has been augmented with a computer enclosure 2203, attached to an upper platform 2204 of the embodiment, which contains and/or houses electronic circuits and mechanisms, which include, but are not limited to: computers, routers, memory modules, encryption and decryption circuits, an embodiment-specific control system, radio transmission and receiving circuits, navigation circuits. The embodiment's computer enclosure 2203 also includes energy storage devices and mechanisms, which include, but are not limited to: batteries, capacitors, inductors, fly wheels, and fuel cells.

Also attached to the embodiment's upper platform 2204 is a phased array antenna 2205 that facilitates the exchange of encoded radio transmissions 2206/2207 between the embodiment and antennas connected to, and/or controlled by, other objects, including, but not limited to: satellites 2208, ships, planes, balloon-suspended transceivers, and/or terrestrial transceivers, computers and networks. The phased array 2205 is able to both transmit 2206 and receive 2207 encoded electromagnetic (e.g., radio) signals.

At least a portion of the electrical power generated by the embodiment, and/or extracted by the embodiment from the ambient wave environment, is used to energize at least a portion of the electronic circuits positioned, stored, and/or protected within, the computer enclosure 2203 and the embodiment's phased array antenna 2205.

At least a portion of the electrical power generated by the embodiment, and/or extracted by the embodiment from the ambient wave environment, is used to energize autonomous underwater vehicles (AUV), e.g., 2209 and 2210, via and/or by means of a hub 2211.

Connected by cable, chain, linkages, rope, and/or another flexible connector 2212, is a spar buoy 2213. Discordant motions between the buoy 2200 and the spar buoy 2213 are smoothed, buffered, and/or absorbed, by an elastic mooring device 2214, comprised of a pair of floats, e.g., 2214, beneath which is suspended between the floats a weight 2215. Separations of buoy 2200 and the spar buoy 2213 cause the floats, e.g., 2214 to separate, which, in turn, causes the suspended weight 2215 to be raised, thereby storing potential energy. The stored potential energy pulls back together the buoy 2200 and the spar buoy 2213 when the, presumably wave-driven, forces separating the buoys is sufficiently diminished.

Cable 2212 transmits power and data between computers in computing enclosure 2203 and spar buoy 2213, and cable 2216 in turn transmits at least a portion of that power and data between spar buoy 2213 and an autonomous-underwater-vehicle (AUV) hub 2211. Thus, power and data are exchanged between the embodiment 2200 and/or the electronic circuits within computing enclosure 2203 and the AUV hub 2211. A plurality of floats, e.g., 2217, help to support the weight of the cable and allow it to achieve approximate neutral buoyancy.

The AUV hub 2211 has a number of thrusters, including a fixed horizontal-thrust thruster 2218, four circumferential thrusters, e.g., 2219, that are arrayed about the long horizontal axis of the AUV hub 2211, and are able to be rotated about the rods that rotatably-connect them to the hub. The AUV hub 2211 also includes a single thruster that ejects water 2220 vertically through one of an upper 2221 or lower 2222 mouth (while pulling water through the opposing mouth).

The AUV hub 2211 has three docking ports, e.g., 2223 and 2224, positioned circumferentially about a horizontal plane passing through the center of the AUV hub. At the center back wall of each docking port is a light and acoustic sensor, e.g., 2225, that provides guidance information and/or signals to the AUVs that dock therein.

The AUV hub includes a camera and light 2226 that can provide images of the seafloor 2227 and/or AUVs, e.g., 2228.

Each AUV, e.g., 2228, of the embodiment 2200, has four cameras, and associated lights. Two cameras and lights, e.g., 2229 and 2230, are mounted on back-facing struts, and tend to provide useful information to an AUV when it attempts to insert its back end, e.g., 2210, into a docking port, e.g., 2224, on the AUV hub 2211. The back-facing cameras of an AUV provide it with stereoscopic images, which, in combination with the homing signals emitted by the light and acoustic sensor, e.g., 2225, at the back inside of each docking port, can facilitate the insertion of an AUV, e.g., 2211 into a docking port, e.g., 2224.

Two cameras and lights, e.g., 2231 and 2232, are mounted on front-facing struts, and tend to provide useful information to an AUV when it attempts to survey, inspect, and/or gather information about the seafloor 2227, objects thereon, e.g., 2233, and/or other objects, creatures, and/or surfaces. The AUV 2228 is attempting to pick up a geological sample 2233 from the seafloor 2227. After obtaining a sample, e.g., 2233, from the environment, an AUV 2210 and/or the embodiment's central control system (e.g., positioned within the embodiment's computing enclosure 2203), may elect to store that sample 2234 for later examination by a human, and/or within a ship- or shore-based laboratory, by placing it within a receptacle, e.g., 2235, and logging the time and geospatial location at which the sample was obtained, along with any photos taken by the AUV's cameras, e.g., 2231 and 2232, of the sample prior to and/or after its retrieval, and the identifier of the receptacle in which the sample was stored.

A set of sample receptacles, e.g., 2236, are suspended by a cable 2237 that depends from a spar buoy 2238 that is flexibly connected to the embodiment 2200 by a cable 2239, wherein said cable includes an elastic mooring device 2240 to more flexibly connect the embodiment 2200 and spar buoy 2238 when the positions of both are buffeted by passing waves. Each sample receptacle, e.g., 2236, contains an aperture, e.g., 2241, through which an AUV may place a sample therein.

Each AUV, e.g., 2209, contains an articulating arm, e.g., 2241, rigid segments of which rotate about rotating joints so as to allow the orientation and position of a grasping claw and/or gripper, e.g., 2242, to be adjusted through a range of such orientations and positions. Each AUV, e.g., 2209, also contains four thrusters, e.g., 2243-2245, the thrusts of which may be adjusted through the rotation of each thruster about the longitudinal axis of the respective rod that connects each thruster to the main body of the AUV.

After docking with a docking port, e.g., 2224, on the AUV hub 2211, an AUV may obtain electrical power from the embodiment 2200, the electronic circuits (which may include energy storage devices) inside the embodiment's computing enclosure 2203, and/or from the embodiment's generators (not shown) and/or energy storage devices (not shown), thereby enabling it to recharge its own energy storage devices and/or mechanisms (not shown).

FIG. 249 shows a perspective view of a modified configuration of the same embodiment that is illustrated in FIGS. 239-245. Whereas the embodiment that is illustrated in FIGS. 239-245 has an inertial water tube 2053 with an open lower mouth that permits the unobstructed flow 2059 of water in and out of that lower mouth 2066 in a vertical direction, the modified configuration illustrated in FIG. 249 includes a flow diverter 2076 positioned adjacent to and below the lower mouth 2066 which causes water flowing into and out of the lower mouth of the inertial water tube 2053 to follow a non-linear and/or circuitous path, where the water must flow around the flow diverter in order to flow vertically. The flow diverter 2076 is held in place by a plurality of struts, bars, rods, pipes, tubes, and/or other narrow vertical structural elements, e.g., 2077. In effect, the flow diverter creates an inertial water tube comprising a lower mouth oriented laterally (radially) rather than downwardly.

Embodiments similar to the modified embodiment illustrated in FIG. 249, suspend their respective flow diverters 2076 from the bottoms of their respective inertial water tubes 2053 by flexible connectors including, but not limited to chains, ropes, cables, linkages, and/or fibers.

FIG. 250 shows a perspective vertical cross-sectional side view of the same modified embodiment configuration illustrated in FIG. 249. The view illustrated in FIG. 250 is the same view as is illustrated in FIG. 245 with respect to the unmodified embodiment configuration, where the section of the unmodified embodiment configuration is taken along the section line 244-244 as specified in FIGS. 242 and 243.

As the embodiment 2050 moves up and down in response to passing waves, water 2065 within its inertial water tube 2053 tends to move up and down relative to the embodiment and the inertial water tube. As the water 2065 within the inertial water tube 2053 moves up and down, water moves 2059 in and out of the lower mouth (2066 in FIG. 244) of the inertial tube, thereby flowing over and around the flow diverter 2076. When water 2065 within the inertial water tube moves down it is directed laterally by the top 2080 of the flow diverter. And, when water from outside the lower mouth of the inertial water tube is drawn into the lower mouth, it must flow around the bottom 2081 of the flow diverter.

Water flows 2059 in and out of the lower mouth of the inertial water tube through the gaps, e.g., 2078, between the structs, e.g., 2077, by which the flow diverter is attached and/or connected to a lower end of the inertial water tube.

Flow diverter 2076 can be filled with a material more dense than the water on which the embodiment floats, and that material includes, but is not limited to, cement, iron, gravel, sand, rocks, and other cementitious materials. An embodiment similar to the one illustrated in FIGS. 249-250 includes, incorporates, and/or utilizes, a flow diverter 2076 that is filled with water so as to be approximately neutrally buoyant while increasing the embodiment's mass.

Flow diverter 2076 tends to provide the illustrated embodiment with additional ballast that tends to help it to remain vertically oriented. Flow diverter 2076 also tends to buffer the impact of vertical oscillations of the embodiment, e.g., during storms, on the vertical oscillations of the water 2065 within the inertial water tube 2053, thereby helping to protect the structural integrity of the embodiment, e.g., during storms.

FIG. 251 shows a perspective side view of an embodiment of the current disclosure.

The embodiment comprises a hollow bulbous chamber, container, enclosure, canister, buoy, and/or portion 2300 configured to contain pressurized fluids and gases.

In a first configuration and/or operational modality, the embodiment 2300 floats adjacent to an upper surface 2301 of a body of water over which waves tends to pass and converts a portion of the wave energy that impinges upon it into electrical power.

In a second configuration and/or operational modality (not shown), the embodiment 2300 submerges below the upper surface 2301 of the body of water on which it has floated and descends to a desirable depth.

In a third configuration and/or operational modality (not shown), the embodiment 2300 adjusts, controls, modifies, and/or changes, its orientation and propels itself within and/or through the body of water 2301 in which it is submerged. While submerged (or while floating adjacent to the surface 2301) the embodiment is adapted to permit it to dock with another submerged vessel, e.g., transferring to the other vessel energy and/or data.

In a fourth configuration and/or operational modality (not shown), the embodiment 2300 rises from beneath the surface 2301 of the body of water in which is suspended until it becomes adjacent to, and/or penetrates, an upper surface 2301 of the body of water after which it restores sufficient air (or other gas) to the inside of its water and air reservoir 2300 and returns to the first configuration and/or operational modality wherein it generates electrical power in response to the passage of waves across the surface of the body of water, e.g., in order to recharge its energy storage device (not visible).

When the embodiment's hollow chamber 2300 contains a volume of gas (e.g. air, nominally positioned in an upper and/or upward-oriented portion of the chamber 2300, i.e. a portion distal to the embodiment's lower mouth 2303) and a volume of fluid (e.g. seawater, nominally positioned in a lower and/or downward-oriented portion of the chamber 2300, i.e. a portion proximate to the embodiment's lower mouth 2303), the embodiment will tend to float adjacent to an upper surface 2301 of a body of water. As passing waves move the embodiment up and down, water tends to move 2302 in and out of a lower mouth (not visible) and/or aperture 2303 in the embodiment's inertial water tube 2304.

The embodiment includes, incorporates, and/or utilizes, a snorkel, tube, and/or pipe 2305 operatively connected to an air pump 2306. The air pump includes, incorporates, and/or utilizes, a valve (not visible). When open, the valve operatively connects the snorkel 2305 and the air pump 2306 to an interior of the hollow chamber 2300 and permits the air pump to pump air from the atmosphere outside the embodiment into the interior of the hollow chamber, thereby forming and/or restoring a pocket of air within the hollow chamber.

The embodiment includes, incorporates, and/or utilizes, a fuel cell 2307 that consumes hydrogen and oxygen stored within the hollow chamber 2300 (if any) and produces electrical energy that the embodiment stores within its energy storage device, module, mechanism, and/or apparatus (not visible).

The embodiment includes, incorporates, and/or utilizes, four hollow water-jet tubes, e.g., 2308, each of which is open at both its upper and lower ends. The upper ends of the tubes are tapered so as to form nozzles, and the upper mouth and/or aperture of each water-jet tube has a lesser cross-sectional area than the respective lower mouth and/or aperture of each water-jet tube, which tends to be useful in generating thrust in response to an outflow of pressurized water from the hollow chamber 2300 and through each respective water-jet tube, especially when the embodiment is operating in its third configuration and/or operational modality (not shown).

The embodiment includes, incorporates, and/or utilizes, a phased array antenna 2309 through which radio and/or other electromagnetic signals may be transmitted to, and received from, remote sources, e.g., to and from satellites. The embodiment's phased array antenna may be configured as an approximately circular apparatus, and/or spherical ring, although other configurations are possible.

The embodiment includes, incorporates, and/or utilizes, a turbine, and/or propeller, (not visible) positioned within a hollow effluent tube 2310. The turbine is operatively connected to a generator (not visible) which may also operate as a motor (e.g., an induction motor/generator). Pressurized water within the embodiment's hollow chamber 2300 flows out of, and/or through, the effluent tube 2310 thereby engaging, rotating, and energizing, the turbine therein, and thereby resulting in the generation of electrical power by the operatively connected generator. When operating in its third configuration and/or operational modality (not shown), the embodiment can expend stored electrical energy to cause the generator/motor to rotate the turbine/propeller in a first direction, thereby drawing water into the interior of the embodiment's hollow chamber 2300, or, when so directed by the embodiment's control system (not shown), the generator/motor may cause the turbine/propeller to rotate in a second (e.g., an opposite) direction thereby expelling and/or pulling water out of the interior of the embodiment's hollow chamber.

The embodiment includes, incorporates, and/or utilizes, four longitudinal thrusters, ducted propellers, and/or water pumps, e.g., 2311, that tend to propel the embodiment in a forward direction (i.e., upward with respect to the orientation of the embodiment as illustrated in FIG. 251) when so activated by the embodiment's control system (not shown), and in a backward direction (i.e., downward with respect to the orientation of the embodiment as illustrated in FIG. 251) when so activated by the embodiment's control system. Through a combination of thrust polarities (directions of thrust, e.g., up or down) and thrust magnitudes (i.e., forces of thrust), the embodiment's control system can achieve any desired pitch or yaw (relative to the embodiment's longitudinal axis, which is vertical with respect to the orientation of the embodiment as illustrated in FIG. 251).

The embodiment includes, incorporates, and/or utilizes, four roll thrusters, ducted propellers, and/or water pumps, e.g., 2312, that tend to generate thrusts which the embodiment's control system (not shown) can use to achieve any desired roll (relative to, and about, the embodiment's longitudinal axis, which is vertical with respect to the orientation of the embodiment as illustrated in FIG. 251). Also, by using opposing pairs of roll thrusters to produce equal thrusts in the same direction, the embodiment's control system can swing, move, orient, and/or rotate, the lower and/or trailing end (i.e., the end distal to the embodiment's hollow chamber 2300) so as the rotate the embodiment about an axis normal to the embodiment's longitudinal axis and passing through, at least to an approximate degree, the embodiment's center of gravity, center of mass, and/or center of buoyancy.

The embodiment includes, incorporates, and/or utilizes, an electrolyzer 2313 which the embodiment's control system (now shown) can activate in order to generate gas (e.g., hydrogen and oxygen) that tends to remain trapped within the electrolyzer's enclosure, until the control system opens a gas-release valve 2314 to therethrough release it. Water (e.g., seawater) tends to be drawn in to the electrolyzer through a water-inflow valve 2315 when that valve is opened by the control system. When the control system determines that a sufficient volume, amount, and/or number of moles, of gas has been generated by and within the electrolyzer, then the control system will close the water-inflow valve 2315, and avoid opening the gas-release valve 2314, thereby trapping the gas within the electrolyzer chamber and preventing a change in its volume and buoyancy in response to changes in depth and ambient water pressure. Such a stable source of buoyancy is useful when the embodiment is operating in its third configuration and/or operational modality by providing a stable amount of buoyancy to offset an approximately constant amount of weight and/or torque within a submerged embodiment, e.g., to prevent a relatively heavy lower and/or trailing end 2303 from inhibiting, and/or interfering with, the embodiment when and as it attempts to achieve a horizontal orientation (e.g., as opposed to the vertical orientation illustrated in FIG. 251).

When the embodiment is operating in its third configuration and/or operational modality, the buoyancy provided by and within the electrolyzer can help to stabilize the roll, and/or rotational orientation, of the embodiment about its longitudinal axis, e.g., the electrolyzer will tend to pull the embodiment into a roll-, and/or radial-orientation in which the electrolyzer is positioned at an uppermost side of the embodiment's inertial water tube 2304.

FIG. 252 shows a side view of the same embodiment of the current disclosure that is illustrated in FIG. 251.

Visible inside the effluent tube 2310 is a water turbine 2316 that is rotated by an outflow of water from the inside of the embodiment's hollow chamber 2300 through the effluent tube 2310 and into the body of water 2301 outside the embodiment.

Visible inside the thruster 2312 is propeller, turbine, and/or pump assembly 2317. When activated by the embodiment's control system (not shown), the propeller 2317 is made to rotate by means of a respective operatively-connected motor.

FIG. 253 shows another side view of the same embodiment of the current disclosure that is illustrated in FIGS. 251 and 252.

Each of the embodiment's eight thrusters (four longitudinal thrusters, e.g., 2311, and four roll thrusters, e.g., 2318) includes, incorporates, and/or utilizes, a respective propeller, turbine, and/or pump assembly, e.g., 2319, that is energized, rotated, actuated, and/or driven, by a respective motor, e.g., 2320.

FIG. 254 shows a top-down view of the same embodiment of the current disclosure that is illustrated in FIGS. 251-253.

Each of the embodiment's four hollow water-jet tubes, e.g., 2308, has an upper aperture or mouth, e.g., 2321, through which pressurized water may be ejected from the interior of the embodiment 2300, especially when the embodiment is operating in its third configuration and/or operational modality and the embodiment's control system (not visible) can use the water-jet tubes to provide the embodiment with backward thrust.

FIG. 255 shows a bottom-up view of the same embodiment of the current disclosure that is illustrated in FIGS. 251-254.

Each of the embodiment's four roll thrusters, e.g., 2312, is attached to the embodiment's inertial water tube 2304 by a respective structural support and/or foundation, e.g., 2322.

Each of the embodiment's eight thrusters (four longitudinal thrusters, e.g., 2311, and four roll thrusters, e.g., 2312 and 2318) tends to produce a thrust that is parallel to a longitudinal axis of the thruster. Each of the eight thrusters can be actuated, controlled, configured, and/or operated, by the embodiment's control system (not visible), so as to draw in, e.g., 2323, water in a first water-flow direction and eject, e.g., 2324, a portion of that drawn-in water in that same water-flow direction, thereby tending to produce a thrust in a first thrust direction (e.g. a direction opposite the respective first water-flow direction) that would propel the thruster in that same first thrust direction. Each of the eight thrusters can be actuated, controlled, configured, and/or operated, by the embodiment's control system, so as to draw in, and eject water in a second water-flow direction, opposite the first water-flow direction, and thereby tending to produce thrust in a second thrust direction (e.g. a direction opposite the second water-flow direction), which is opposite the first thrust direction, that would tend to propel the thruster in that same second thrust direction.

By adjusting, controlling, reversing, and/or combining, the thrusts produced by the embodiment's eight thrusters, the embodiment's control system (not visible) can adjust, control, set, change, and/or modify, the spatial orientation of the embodiment when the embodiment is submerged.

The embodiment's inertial water tube 2304 is hollow, having a lower mouth or aperture (2303 in FIG. 253). At an upper end of the embodiment's inertial water tube is an upper mouth or aperture 2325 through which water may be ejected into the interior of the embodiment's hollow chamber 2300, thereby facilitating and/or enabling the embodiment to capture pressurized hydraulic fluid potential energy, and therewith to produce electrical power by means of the embodiment's water turbine and operatively connected generator, in response to wave-induced vertical oscillations of the embodiment at the surface of a body of water.

FIG. 256 shows a side sectional view of the same embodiment of the current disclosure that is illustrated in FIGS. 251-255, where the section is along line 256-256 specified in FIGS. 254 and 255.

The embodiment 2300 includes, incorporates, and/or utilizes, a buoyant mass, volume, measure, portion, and/or element, 2326, e.g., comprised of polyurethane foam, positioned within the hollow chamber 2300, which provides a portion of the buoyancy that keeps the embodiment floating at the surface of the body of water 2301.

Attached to an exterior surface of the embodiment's inertial water tube 2304, and partially surrounded by the buoyant element 2326, is an energy storage and electronics module 2327, e.g., comprised of lithium-ion batteries, computers, and a radio transceiver. A portion of any heat generated by the energy storage module is conductively transmitted to and through the wall of the inertial water tube 2304 where it tends to be conductively transmitted to the water 2331 therein.

The embodiment's inertial water tube 2304 has lower 2303 and upper 2325 mouths through which water, e.g., seawater, may pass freely, e.g., 2302 and 2328. Lower 2304 and upper 2329 portions of the inertial water tube are characterized by approximately constant cross-sectional areas, e.g., they are cylindrical. However, a middle portion

2330 narrows with respect to an upward direction of fluid flow, and/or is constricted, such that the cross-sectional area of the lower mouth 2303 and tube portion 2304 is less than the cross-sectional area of the upper mouth 2325 and tube portion 2329.

As the embodiment moves up and down in response to a nearby passage of waves across the surface 2301 of the body of water on which the embodiment floats, water 2331 inside the inertial water tube 2304 tends to move 2332 up and down, thereby drawing water in, and pushing water out, 2302 of the inertial water tube's lower mouth 2303, and likewise raising and lowering 2333 an upper surface 2334 of the water 2331 inside the inertial water tube.

Occasionally, the upper surface 2334 of the water 2331 inside the inertial water tube rises high enough that a portion of the water 2331 inside the inertial water tube 2329 collides with a water diverter 2335 (e.g. a downward pointing conical structure and/or surface) and is diverted laterally into the interior of the hollow chamber 2300 whereafter that water falls onto an upper surface 2336 of a water reservoir 2337 nominally positioned in a lower portion of the interior of the hollow chamber 2300 (with respect to a nominal vertical orientation of an embodiment floating adjacent to an upper surface 2301 of a body of water), thereby increasing the volume and mass of water within the water reservoir 2337, and thereby compressing the gas, e.g., air, trapped in an air pocket 2338 nominally positioned in an upper portion of the interior of the hollow chamber above and adjacent to the water reservoir below.

In the preferred embodiment illustrated in FIG. 256, the gas within the air pocket 2338 (and therefore the water below the air pocket in the water reservoir 2337) is pressurized to a nominal absolute pressure of approximately 1.3 atmospheres. Embodiments similar to the one illustrated in FIG. 256 maintain, and/or operate at, a nominal absolute air-pocket gas pressure ranging from 1.1 atmosphere to 5 atmospheres. Other embodiments similar to the one illustrated in FIG. 256 maintain, and/or operate at, a nominal absolute air-pocket gas pressure ranging from 1 atmosphere to 1.1 atmosphere.

The scope of the present disclosure includes embodiments that are characterized by, and/or configured so as to manifest, air pockets and water reservoirs pressurized to any pressure or range of pressures, including, but not limited to those which dynamically, reactively, and/or prophylactically, alter their air-pocket operating pressures, especially in response to changing wave conditions and/or other operational parameters so as to optimize energy production. Some embodiments may increase the pressures of their respective air pockets in order to increase energy production, e.g., when waves are relatively weak, and/or decrease the pressures of their air pockets in order to decrease energy production, e.g., when wave are excessively powerful and the structural integrity of the embodiment, and/or one of its parts (such as its turbine 2316 assembly), might be at risk of damage.

The position of the embodiment's water diverter 2335 is controlled, and/or adjusted, by a diverter lift mechanism 2339 which is attached to an upper portion 2329 of the inertial water tube 2304 by a plurality of vertical and/or longitudinal struts, e.g., 2340. The diverter lift mechanism 2339 raises and lowers the water diverter 2335 by raising and lowering, respectively, the shaft, strut, pole, and/or tube, 2341 to which the water diverter is attached.

The pressurized water within the embodiment's water reservoir 2337 tends to flow out of the hollow chamber 2300 through effluent tube 2310. Water 2337 within the water reservoir tends to flow 2342 into an inlet mouth 2343 of the effluent tube 2310 wherein the flowing water engages, energizes, and/or rotates, a water turbine 2316 positioned therein. After flowing through the water turbine, and thereby tending to cause the water turbine to rotate, the water tends to flow 2344 out of the outlet mouth 2345 of the effluent tube, and therethrough (back) into the body of water 2301. Rotations of the water turbine 2316 causes an operatively-connected generator 2346 to produce electrical power, at least a portion of which is nominally stored within the embodiment's energy storage and electronics module 2327.

An air pump 2347 pumps air from the embodiment's air pocket 2338 and into a high-pressure air line 2348 through which the compressed air tends to flow into a compressed gas canister, bottle, chamber, tank, and/or container, 2349 when the embodiment's control system (not visible, but positioned within the energy storage and electronics module 2327) determines, e.g., via a pressure sensor, that the pressure of the gas, e.g., air, within the compressed gas canister is below a threshold pressure. Prior to pumping compressed air into the compressed gas canister, the embodiment's control system opens at least one valve (not shown) to permit the pumped gas to enter the canister. Following the pumping, the embodiment's control system closes the at least one valve to trap the pressurized and/or compressed gas within the compressed gas canister.

Because they are open at their upper and lower ends, water from the embodiment's water reservoir 2337, as well as air from the atmosphere outside the embodiment, are able to freely flow in and out of the embodiment's four hollow water-jet tubes, e.g., 2350. Due to the pressure of the air pocket 2338 and water reservoir 2337, which, with respect to the illustrated embodiment, nominally exceed 1 atmosphere of absolute pressure, water from the water reservoir 2337 tends to flow, e.g., 2351, into each water-jet tube, and the upper surface, e.g., 2352, of the water within each water-jet tube tends to be raised to a height, e.g., 2353, above the average, mean, and/or resting, surface 2301 of the body of water on which the embodiment floats, which causes the head pressure of that water within each water-jet tube to approximately equal and/or counterbalance the pressure of the air and water within the interior of the hollow chamber 2300.

Each of the embodiment's eight thrusters (four longitudinal thrusters, e.g., 2311, and four roll thrusters, e.g., 2318) include, incorporate, and/or utilize, a turbine, propeller, and/or water pumping mechanism, e.g., 2354 and 2319, that is rotated by a pair of motors, e.g., induction motors, e.g., 2355 and 2320.

Positioned at an uppermost end of the embodiment, with respect to the embodiment orientation illustrated in FIG. 256, is an umbrella- and/or approximately frustoconically-shaped electrolyzer shroud 2356. The lowermost end and/or portion of the electrolyzer shroud is open and air within the embodiment's air pocket 2338 moves freely in and out of the electrolyzer shroud. Attached to a lower edge and/or portion of the electrolyzer shroud is an electrolyzer 2357, which, when operated in a hollow chamber interior 2338/2337 that is almost, if not fully, flooded and/or filled with water, is configured to electrolyze water and produce hydrogen and oxygen at positions on the electrolyzer 2357 that tend to cause the generated hydrogen gas to accumulate at the top of the hollow chamber's interior and outside the electrolyzer shroud and tend to cause the generated oxygen gas to accumulate at the top of the hollow chamber's interior and inside the electrolyzer shroud (i.e., adjacent to and/or around the longitudinal axis of the shroud).

FIG. 257 shows a perspective view of the sectional illustration of FIG. 256. The sectional illustrations of FIGS. 256 and 257 are both of the same embodiment of the current disclosure that is illustrated in FIGS. 251-255, where the section is along line 256-256 specified in FIGS. 254 and 255.

FIG. 257 includes representative bodies, portions, and/or pools, of water within the embodiment to help illustrate the operation of the embodiment 2300 when the embodiment is in a first configuration and/or operational modality, wherein the embodiment floats adjacent to an upper surface 2301 of a body of water. When in its first configuration and/or operational modality, the embodiment tends to have water 2331 within its nominally vertical inertial water tube 2304, as well as a water reservoir 2337 within its hollow bulbous chamber 2300.

FIG. 258 shows a side view illustrating the four configuration and/or operational modalities of the apparatus, device, mechanism, and/or autonomous vessel (2300 in FIG. 258), as well as illustrative transitions between those modalities, of the embodiment illustrated in FIGS. 251-257.

In its first configuration and/or operational modality, the embodiment and/or vessel 2358 floats adjacent to an upper surface 2301 of a body of water over which waves tend to pass. As the vessel moves up and down in response to wave motion, water tends to move 2302 in and out of the vessel's inertial water tube 2304 occasionally ejecting a portion of that water from the tube's upper mouth and depositing it within the interior of the vessel's hollow chamber 2300 and the water reservoir therein. Water flows 2344 from the vessel's water reservoir back to the body of water 2301 through effluent pipe 2310 and the water turbine therein, thereby causing the water turbine's operatively connected generator to produce electrical power, at least a portion of which is used to charge and/or recharge the vessel's energy storage module (not visible).

In its second configuration and/or operational modality, the embodiment and/or vessel 2359 submerges below the upper surface 2301 of the body of water on which it has floated and descends into the body of water. In response to control signals generated by the vessel's control system (not shown), located within the embodiment's energy storage and electronics module (2327 in FIG. 256), the vessel's air pump (2306 in FIG. 256) opens a valve which, when open, operatively connects the vessel's snorkel (2305 in FIG. 256) to the interior of the hollow chamber 2300.

After the air-pump valve has been opened, the control system (not shown) may expedite the evacuation of air from the air pocket (2338 in FIG. 256) by activating the air pump (2306 in FIG. 256) so as to pump air from that air pocket to the atmosphere. Otherwise, the control system may permit the air from the air pocket to evacuate passively through the snorkel (2305 in FIG. 256). In either case, air from the vessel's air pocket flows 2360 through the snorkel to the atmosphere thereby reducing, if not eliminating, the buoyancy imparted to the vessel by the air pocket.

The control system may also expedite the evacuation of the air from the air pocket (2338 in FIG. 256) by activating the generator (e.g., an induction generator/motor 2346 in FIG. 256) such that it actively rotates the water turbine 2316 in a second direction that is opposite the first direction in which it tends to rotate when being driven, energized, and/or moved, by an outflow of water from the vessel's water reservoir (2337 in FIG. 256). When rotating in the second direction, the water turbine will tend to pump water from the body of water 2301 in which the embodiment is suspended and into the interior of the vessel's hollow chamber 2300, thereby tending to pressurize the air within the air pocket and thereby tending to hasten the evacuation 2360 of that air into the atmosphere. A portion of the water pumped into the vessel's hollow chamber will flow, e.g., 2351, out of the vessel's four hollow water-jet tubes, e.g., 2350, thereby tending to generate downward thrust that will tend to hasten the vessel's descent.

An embodiment similar to the ones illustrated in FIGS. 251-258 has a valve within each of its hollow water-jet tubes, and that embodiment closes those valves when pumping 2361 water into its hollow chamber, unless and until its control system opens one or more of those valves (while pumping water into its hollow chamber) so as to create a thrust that will tend to propel the vessel in a backward direction (i.e., downward and/or toward the lower mouth, 2303 in FIG. 251, of its inertial water tube).

While descending, the vessel's control system (not shown), located within the embodiment's energy storage and electronics module (2327 in FIG. 256), will, e.g., if the control system is preparing to propel itself laterally within the body of water 2301, use one or more of its roll thrusters, e.g., 2312, to pump 2365 water in a downward direction (i.e., in a direction oriented away from the surface 2301 of the body of water in which the vessel is suspended) thereby producing a thrust that will tend to lift (i.e., toward the surface 2301) the lower end (i.e., the end proximate to the lower mouth, 2303 of FIG. 251) of the vessel's inertial water tube (2304 in FIG. 251).

While descending, the vessel's control system may also activate the electrolyzer 2313 such that it generates gas (e.g., hydrogen and oxygen) that remains trapped within the electrolyzer's enclosure, until the control system opens a gas-release valve (2314 in FIG. 251) to release it. The gas created by the electrolyzer, and trapped within its enclosure, will tend to add buoyancy, and/or an upward buoyant force 2367, to the lower end of the vessel's inertial water tube, thereby promoting the reorientation of the vessel from a principally vertical one (e.g., as when the vessel 2358 is floating adjacent to the surface 2301) to a principally horizontal one, which may be more conducive to submerged propulsion and navigation of the vessel.

In its third configuration and/or operational modality, when the embodiment and/or vessel 2368 has submerged to a depth selected and/or determined by the vessel's control system (not shown), located within the embodiment's energy storage and electronics module (2327 in FIG. 256), the control system activates, energizes, and/or operates, the vessel's four longitudinal thrusters, e.g., 2311, so as to pump, e.g., 2369, water toward the lower and/or back end (i.e., the end proximate to the lower mouth, 2303 of FIG. 251) of the vessel's inertial water tube (2304 of FIG. 251), thereby tending to propel 2370 the vessel through the water in the direction of the vessel's upper end (i.e., the end proximate to the vessel's snorkel 2305).

Through adjustments to the relative rates at which each of the vessel's four longitudinal thrusters, e.g., 2311, pumps, e.g., 2369, water, the vessel's control system (not shown) can not only propel the vessel forward, it can also steer the vessel. When tight turns, i.e., turns of relative small radii, are required, the control system can also activate one or more of the vessel's roll thrusters, e.g., 2312, to hasten and/or reduce the radii of such turns.

When the vessel 2371 reaches its underwater and/or geospatial destination, and/or when its control system (not shown, and located within the embodiment's energy storage and electronics module, 2327 in FIG. 256), decides to surface the vessel for some other reason, e.g., because the amount of energy remaining in the vessel's energy storage module (2327 in FIG. 256) has fallen to or below a threshold level, or the control system needs to transmit data to, and/or receive data from, a remote computer and/or network, then the control system may deactivate the vessel's thrusters, e.g., 2311, and the vessel will tend to come to a rest and drift in concert with ambient currents.

While submerged (or while floating adjacent to the surface 2301) the embodiment is adapted to permit it to dock with another submerged vessel, e.g., transferring to the other vessel energy and/or data.

In a fourth configuration and/or operational modality, the embodiment 2372 rises from beneath the surface 2301 of the body of water in which is suspended until it becomes adjacent to, and/or penetrates, an upper surface 2301 of the body of water.

In preparation for surfacing, the control system (not shown) of the vessel 2372 will release the electrolysis-generated gases (e.g., hydrogen and oxygen) trapped within the vessel's electrolyzer 2313 by opening the electrolyzer's gas-release valve 2314 thereby permitting the gas trapped within the electrolyzer to escape, e.g., as bubbles 2373.

In order to facilitate the vessel's return to a vertical orientation, the vessel's control system (not shown) may activate one or more of the vessel's roll thrusters, e.g., 2312, in order to pump 2374 water toward the surface 2301 and thereby create a downward thrust that will tend to push the lower end (i.e., the end proximate to the lower mouth, 2303 of FIG. 251) of the vessel's inertial water tube (2304 of FIG. 251), to a relative position beneath the vessel's hollow chamber, thereby tending to situate the embodiment in an approximately vertical orientation (e.g. in which the lower mouth (2303 of FIG. 251) of the embodiment's inertial water tube (2304 of FIG. 251) is positioned approximately below the upper mouth (2325 of FIG. 256) of the inertial water tube).

In order to expedite, if not achieve, the surfacing of the vessel 2375, the vessel's control system (not shown) activates an electrolyzer (2357 in FIG. 256) that tends to produce hydrogen gas (which tends to collect and/or be trapped around the outside of the conical shroud 2356 in FIG. 256) and oxygen gas (which tends to collect and/or be trapped within that conical shroud). The gases thus produced and trapped within the vessel's hollow chamber tend to create a buoyant force 2376 that tends to pull the vessel toward and/or to the surface 2301.

When the vessel 2377 reaches the surface, the vessel's control system (not shown) initiates actions intended to restore an air pocket (2338 in FIG. 256) within the interior of the vessel's hollow chamber (2300 in FIG. 256). To that end, the control system opens the valve (if it is not already open) within the vessel's air pump (2306 in FIG. 256) that, when open, operatively connects the vessel's snorkel (2305 in FIG. 256) to the interior of the hollow chamber 2300, thereby permitting air from the atmosphere to enter the vessel's hollow chamber. The control system then activates the air pump so as to forcibly draw 2380 air from the atmosphere into the vessel's hollow chamber thereby creating and/or restoring an air pocket therein, while at the same time activating the generator/motor (e.g., an induction motor) so as to cause the water turbine to rotate in a direction which tends to expel 2378 water from the interior of the vessel's hollow chamber and facilitate the entry of air through the snorkel.

While the control system (not shown) is orchestrating the restoration of an air pocket (2338 in FIG. 256) within an interior of the vessel's hollow chamber (2300 in FIG. 256) it may also (constantly or intermittently) activate the vessel's longitudinal thrusters, e.g., 2362, such that those thrusters pump, e.g., 2379, water in a downward direction (i.e., away from the surface 2301 of the body of water in which the vessel is operating) thereby generating thrust which will tend to keep the vessel's snorkel 2305 protruding through and/or above the surface 2301 of the water.

When the vessel has captured, entrained, and/or recaptured, enough air within the interior of its upper hollow chamber (2300 in FIG. 256) so as to recreate an operational air pocket (2338 in FIG. 256), then the vessel 2358 returns to the first configuration and/or operational modality.

FIG. 259 shows a side sectional view of the same embodiment of the current disclosure that is illustrated in FIGS. 251-258, where the section is along line 256-256 specified in FIGS. 254 and 255. The embodiment illustrated in FIG. 259 is in the third configuration and/or operational modality illustrated by vessel 2368 in FIG. 258.

In the illustrated configuration, the vessel lacks an air pocket (2338 in FIG. 256) and is, to an approximate degree, entirely filled with water (i.e., is entirely a water reservoir 2337 although the water within the vessel is not compressed as it is with respect to the embodiment's first configuration, illustrated in FIG. 256).

The vessel's electrolyzer 2313 is partially filled with a gas 2381, that provides a buoyant force 2367 to the lower and/or back end of the vessel. Additional water remains in the lower portion 2382 of the electrolyzer permitting the generation of additional gas if the control system (not shown) so activates the electrolyzer.

FIG. 260 shows a side sectional view of the same embodiment of the current disclosure that is illustrated in FIGS. 251-259, where the section is along line 256-256 specified in FIGS. 254 and 255. The embodiment illustrated in FIG. 260 is in the fourth configuration and/or operational modality illustrated by vessel 2377 in FIG. 258.

The control system (not shown) activates one or more of the vessel's longitudinal thrusters, e.g. 2362, (intermittently or constantly) in order to extend the vessel's snorkel 2305 above the surface 2301 of the body of water in which the vessel is suspended. As it surfaces, or in preparation for surfacing, the vessel's control system activates the electrolyzer 2357 so as to generate gases to provide buoyancy to the vessel. With respect to the configuration illustrated in FIG. 260, the electrolyzer has produced hydrogen gas, stored, trapped, and/or captured, in an annular pocket 2383 surrounding the uppermost portion of the conical shroud 2356. The electrolyzer has produced oxygen gas, stored, trapped, and/or captured, within the uppermost portion 2384 of the conical shroud.

The vessel's control system (not shown) has opened a valve within the air pump 2306 and has activated the air pump such that the air pump pulls 2380 air from the atmosphere into the interior of the vessel's hollow chamber. The indrawn air initially mixes with the oxygen already trapped at the top 2384 of the conical shroud. As the air pump adds air to the conical shroud (and to the interior of the hollow chamber), a fuel cell 2307 consumes the hydrogen gas 2383 as well as a portion of the oxygen and air 2384 trapped within the conical shroud 2356 thereby recovering some of the energy used to electrolyze those gases.

As the air pump adds air to the interior of the hollow chamber, the vessel's control system (not shown) activates the generator/motor (e.g., an induction motor) so as to rotate the water turbine within the effluent pipe 2310 such that the water turbine tends to pull water from the interior of the hollow chamber and expel it into the body of water 2301, thereby facilitating the air pump's (re)inflation of the vessel.

After reinflating the vessel's hollow chamber, the vessel returns to the first configuration and/or operational modality (i.e. to vessel configuration 2358 in FIG. 258), after which the control system (not shown) signals the air pump to close its valve thereby permitting the air pocket and water reservoir within the vessel to pressurize and resume electrical power generation.

FIG. 261 shows a perspective side view of an embodiment of the current disclosure. In first and fourth configurations and/or operational modalities, the embodiment 2400 floats adjacent to an upper surface 2401 of a body of water over which waves tend to pass. In second and third configurations and/or operational modalities, the embodiment 2400 tends to be approximately neutrally buoyant and tends to float, hover, be submerged, and/or to be suspended, at a depth below the surface 2401 of the body of water in which it is suspended (i.e. without having a strong tendency to rise to the surface or fall to the seafloor).

The embodiment comprises a hollow chamber, container, enclosure, canister, buoy, and/or portion 2400/2402 configured to contain pressurized fluids and gases.

In its first configuration and/or operational modality, the embodiment 2400 floats adjacent to an upper surface 2401 of a body of water over which waves tends to pass, where it tends to convert a portion of the wave energy that impinges upon it into electrical power.

As the embodiment 2400/2402 moves up and down in response to passing waves, water tends to move 2403 in and out of a lower mouth and/or aperture 2404 (not visible) of an approximately cylindrical tube and/or inertial water tube (not visible) incorporated, included, utilized, and/or embedded, within the embodiment.

Water moving and/or oscillating within the embodiment's inertial water tube tends to occasionally rise within that tube fast enough, and/or far enough, so as to be discharged and/or ejected from an upper tube mouth and/or aperture (not visible) of that inertial water tube at a position within the embodiment and located proximate to the embodiment's upper, hemispherical, and/or bulbous, end 2400. Water discharged from the upper mouth of the inertial water tube tends to be deposited within a water reservoir (not visible) within the embodiment's bulbous end 2400 and then flow back to the body of water 2401 through an effluent pipe, mouth, aperture, channel, and/or opening, 2405, passing and/or flowing therethrough, and energizing, and/or causing to rotate, a water turbine 2406 positioned therein. A generator operatively connected to the water turbine tends to generate electrical power in response to the outflow of water from the embodiment, and the consequential rotations of the water turbine. In alternate embodiments, a magnetohydrodynamic generator or other means of converting a flow and pressure drop of a water (e.g. seawater) stream into electricity is utilized.

The embodiment incorporates, includes, and/or utilizes, eleven water nozzle jets used to propel the embodiment when it is submerged, and to adjust, control, change, alter, and/or stabilize, its orientation when submerged.

Four upper jets, e.g., 2407, eject water in directions away from, and normal to, the longitudinal and/or long axis of the embodiment (i.e. the central vertical axis of the embodiment with respect to the embodiment orientation illustrated in FIG. 261) and tend to apply thrusting forces to the embodiment which change its pitch and yaw (relative to its long and/or longitudinal axis) when moving approximately parallel to that longitudinal axis.

Two "clockwise-rolling" middle jets, e.g., 2408, (clockwise with respect to a bottom-up perspective with respect to the embodiment orientation illustrated in FIG. 261) positioned on opposite sides of the embodiment, eject water along vectors approximately normal to the longitudinal and/or long axis of the embodiment and approximately tangential to a circular arc centered on the longitudinal axis and tend to apply thrusting forces to the embodiment which change its roll (relative to, and about, its long and/or longitudinal axis).

Two "counterclockwise-rolling" middle jets, e.g., 2409, (counterclockwise with respect to a bottom-up perspective with respect to the embodiment orientation illustrated in FIG. 261) positioned on opposite sides of the embodiment, eject water in directions within planes normal to the longitudinal and/or long axis of the embodiment and approximately tangential to a circular arc centered on and/or about the longitudinal axis and tend to apply thrusting forces to the embodiment which change its roll (relative to, and about, its long and/or longitudinal axis). And, the thrusting forces applied to the embodiment by the "counterclockwise-rolling" middle jets tend to cause the embodiment to roll in an opposite angular direction than do the "clockwise-rolling" middle jets.

Three lower jets, e.g., 2410, eject water in directions parallel to the longitudinal and/or long axis of the embodiment and tend to apply thrusting forces to the embodiment which tend to propel the embodiment forward (upward with respect to the orientation of the embodiment illustrated in FIG. 261).

A hollow lower buoyancy chamber 2411 is positioned along one side of a lower portion of the embodiment, and is approximately bilaterally symmetrical with respect to a plane passing through the hollow chamber and a long and/or longitudinal axis of the embodiment, and also passing through an axis of rotation of the water turbine 2406. When the embodiment is floating adjacent to the surface 2401 of the body of water, the hollow chamber tends to be filled with a liquid (e.g., oil or water). And, when the embodiment is submerged and is suspended and/or floating beneath the surface 2401, the hollow chamber tends to be filled or partially filled, with air or another gas.

A snorkel 2412, and/or air-pocket adjustment pipe, attached to an upper surface of the bulbous end 2400 of the embodiment permits the embodiment to release air from an interior of its hollow chamber 2400/2402 and thereby reduce its buoyancy before and/or when it initiates a dive. It also permits the embodiment to ingest and/or capture air from the atmosphere and direct that air back into the interior of its hollow chamber 2400/2402 to thereby restore its buoyancy when it initiates a return to the surface (e.g., so as to (again) become buoyant in order to (again) extract power from passing waves and thereby recharge its batteries). The snorkel also allows the embodiment's control system (not shown) to adjust the volume and pressure of the air within the interior of the embodiment's hollow chamber 2400/2402 in order to change the embodiment's waterline and/or in order to alter or optimize its extraction of energy from the passing waves.

The shape of the embodiment's outer hull 2400/2402 is designed to reduce drag when the embodiment is submerged and is being propelled in a direction parallel to its longitudinal axis and toward its hemispherical end 2400, and away from the lower mouth 2404 of its inertial water tube (not visible).

FIG. 262 shows a side view of the same embodiment of the current disclosure that is illustrated in FIG. 261.

FIG. 263 shows another side view of the same embodiment of the current disclosure that is illustrated in FIGS. 261 and 262.

Visible in FIG. 263 are two of the embodiment's four upper jets, e.g., 2413, as well as one each of the embodiment's two "clockwise-rolling" middle jets, e.g., 2408, (clockwise with respect to a bottom-up perspective with respect to the embodiment orientation illustrated in FIG. 263) and two "counterclockwise-rolling" middle jets, e.g., 2414, (counterclockwise with respect to a bottom-up perspective with respect to the embodiment orientation illustrated in FIG. 263).

FIG. 264 shows a top-down view of the same embodiment of the current disclosure that is illustrated in FIGS. 261-263.

FIG. 265 shows a bottom-up view of the same embodiment of the current disclosure that is illustrated in FIGS. 261-264.

The pair of "counterclockwise-rolling" middle jets 2409 and 2414, (counterclockwise with respect to the embodiment orientation illustrated in FIG. 265) tend to apply tangential thrusts and/or torques to the embodiment, about the longitudinal axis of the embodiment, from opposite sides of the embodiment thereby tending to produce a smooth rolling action in a counterclockwise direction (relative to the embodiment orientation illustrated in FIG. 265).

The pair of "clockwise-rolling" middle jets 2408 and 2415, (clockwise with respect to the embodiment orientation illustrated in FIG. 265) tend to apply tangential thrusts and/or torques to the embodiment, about the longitudinal axis of the embodiment, from opposite sides of the embodiment thereby tending to produce a smooth rolling action in a clockwise direction (relative to the embodiment orientation illustrated in FIG. 265).

Water tends to oscillate back-and-forth within the embodiment's inertial water tube 2416, often moving into and out of the inertial water tube through the tube's lower mouth 2404, and occasionally moving out of, and/or being ejected from, the tube's upper mouth 2417, thereby being deposited within the interior of the embodiment.

FIG. 266 shows a side sectional view of the same embodiment of the current disclosure that is illustrated in FIGS. 261-265 where the section is taken across line 266-266 in FIGS. 264 and 265.

In its first and fourth configurations and/or operational modalities, the embodiment floats adjacent to an upper surface 2401 of a body of water over which waves tend to pass. Waves passing by, under, past, and/or adjacent to, the embodiment, tend to cause the embodiment to move up and down (approximately normal to the water's upper surface 2401). The passing waves also tend to change the effective depth and pressure of any location above the wave base (not shown), when the location is at a fixed distance from the seafloor. The vertical movements and/or oscillations of the embodiment, and the changes in the pressure of the water about the embodiment, tend to promote the vertical movement and/or oscillation of water 2418 partially and/or laterally entrained within the embodiment's inertial water tube 2419.

As the water 2418 within the embodiment's inertial water tube 2419 moves up and down, relative to the embodiment and the inertial water tube, water tends to move 2403 in and out of the inertial water tube's lower mouth 2404. And as the water 2418 within the embodiment's inertial water tube 2419 moves up and down, an upper surface 2420 of that water 2418 also tends to move up and down. However, as that upper surface 2420 moves up and down, it tends to do so through a constriction 2416, and/or through a constricted portion of the tube, which tends to narrow with respect to an upward flow of water within and/or through the inertial water tube. As the upper surface of water moves through the constricted portion of the inertial water tube, the water 2418 adjacent to the upper surface 2420 of that water tends to accelerate 2421 upward, typically then passing through an uppermost cylindrical portion 2422 of the inertial water tube, occasionally causing an upper portion of the water 2418 to be ejected 2423 from the upper mouth 2417 of the inertial water tube, whereupon that ejected water tends to be diverted laterally by an exterior surface of a bottommost portion (i.e., a pointy end) of a conical upper hollow buoyancy chamber 2424 and to thereby be deposited in, and/or directed into, a reservoir of water 2425 accumulated, entrained, captured, and/or stored, within the embodiment's outer hull 2400/2402.

Above an upper surface 2426 of the water reservoir 2425 is a volume and/or pocket 2427 of air (or another gas). The gas within the air pocket 2427, and therefore the water within the water reservoir 2425, are pressurized to a pressure greater than that of the atmosphere outside and/or above the embodiment. Because the gas 2427 within the interior of the embodiment's upper bulbous end 2400 is pressurized, the resting level of the upper surface 2420 of the water 2418 within the embodiment's inertial water tube tends to be lower than and/or below the resting level of the upper surface 2426 of the water reservoir into which water is periodically and/or occasionally, ejected from the inertial water tube's upper mouth 2417, as well as tending to be lower than and/or below the resting level of the upper surface 2401 of the water on which the embodiment floats.

The gas and water within another embodiment of the present disclosure, that is similar to the one illustrated in FIGS. 261-266, are not pressurized above atmospheric pressure.

Water within the embodiment's pressurized water reservoir 2425 tends to flow 2428 into the internal aperture and/or mouth of an effluent pipe 2405 and then flow through and energize, and/or cause to rotate, a water turbine 2406 therein, after which it flows 2474 out of the embodiment and into the body of water 2401 on which the embodiment floats. The water turbine is operatively connected to a generator 2429 such that the rotations of the water turbine tend to cause the generator to produce electrical power, at least a portion of which can be stored within the embodiment's energy storage module 2430. The energy storage module is comprised of batteries (e.g., lithium-ion batteries), capacitors, inductors, and/or other components that tend to store electrical energy.

The energy storage modules of some similar embodiments are comprised, at least in part, of water electrolyzers, operatively connected gas storage chambers for capturing and storing the resulting hydrogen and oxygen gases, and fuel cells for recombining the hydrogen and oxygen gases and so as to produce electrical power. The energy storage modules of some similar embodiments are comprised, at least in part, of flywheels. The scope of the present disclosure is not limited by the manner, device, mechanism, system, technology, and/or method, by which energy is stored, buffered, and/or cached within the embodiment.

The flow of water out of each of the embodiment's four upper jets, e.g., 2407, is controlled by a respective valve (illustrated as a cylindrical base portion of each jet and positioned inside the embodiment's outer hull 2402 and adjacent to an interior surface of that outer hull) that when opened by the embodiment's control system (included within the energy storage module 2430 as a subsystem and communicating with and powering the respective valves by electrical wires) allows pressurized water from the embodiment's water reservoir 2425 to flow, under pressure, directly into the body of water 2401 on which the embodiment floats, thereby generating thrust that tends help the control system manage, adjust, control, alter, and/or stabilize, the pitch and yaw of the embodiment when it is submerged.

The flow of water out of each of the embodiment's four middle jets, e.g., 2415, is controlled by a respective valve (illustrated as a cylindrical base portion of each jet and positioned inside the embodiment's outer hull 2402 and adjacent to an interior surface of that outer hull) that when opened by the embodiment's control system (included within the energy storage module 2430 as a subsystem and communicating with and powering the respective valves by electrical wires) allows pressurized water from the embodiment's water reservoir 2425 to flow, under pressure, directly into the body of water 2401 on which the embodiment floats, thereby generating thrust that tends help the control system manage, adjust, control, alter, and/or stabilize, the roll, and/or radial orientation about the embodiment's longitudinal and/or long axis of symmetry, of the embodiment when it is submerged.

The flow of water out of each of the embodiment's three lower jets, e.g., 2432, is controlled by a respective valve 2433 (illustrated as a cylindrical base portion of each jet and positioned inside the embodiment's outer hull 2402) that when opened by the embodiment's control system (included within the energy storage module 2430 as a subsystem and communicating with and powering the respective valves by electrical wires) allows pressurized water from the embodiment's water reservoir 2425 to flow, under pressure, directly into the body of water 2401 on which the embodiment floats, thereby generating thrust that tends propel the embodiment in a forward direction (i.e., upward with respect to the orientation of the embodiment in FIG. 266, and approximately parallel to the longitudinal and/or long axis of symmetry of the embodiment) and help the control system manage, adjust, control, alter, and/or stabilize, the forward speed, direction, and/or motion of the embodiment when it is submerged.

The embodiment illustrated in FIGS. 261-266 incorporates, includes, and/or utilizes, a variable trim system which allows the embodiment's control system to move the embodiment's center of gravity (CG) from one position within the embodiment, to another, and/or to any position along a curve and/or line connecting the two.

The embodiment illustrated in FIGS. 261-266 incorporates, includes, and/or utilizes, a lower hollow buoyancy chamber 2411 and an upper hollow buoyancy chamber 2424. Fluidly connecting an upper interior volume of the lower buoyancy chamber to an upper interior volume of the upper buoyancy chamber is a buoyancy air-relief pipe 2434/2435 through which the contents of one buoyancy chamber may flow to the other buoyancy chamber. Also connecting the interiors of both chambers is a buoyancy fluid-transfer pipe 2436 extending from, and fluidly connected to and/or through a buoyancy pump 2437.

When activated by the embodiment's control system, the buoyancy pump 2437 is able to pump fluid from the lower buoyancy chamber 2411 to the upper buoyancy chamber 2424 through the buoyancy fluid-transfer pipe 2436, thereby tending to shift the embodiment's CG upward i.e. toward the upper buoyancy chamber.

When activated by the embodiment's control system, the buoyancy pump 2437 is also able to open a valve within the buoyancy pump, which tends to permit fluid 2438 within the upper buoyancy chamber 2424 to flow, under the influence of gravity, out of the upper buoyancy chamber, thereby lowering 2439 the surface and/or volume of the fluid therein, and flow 2440 into the lower buoyancy chamber 2411, thereby tending to shift the embodiment's CG downward.

As the volume and/or level of fluid 2441 within the lower buoyancy chamber 2411 increases, a portion of the pocket of air 2442 (if any) within the upper portion of the interior of the lower buoyancy chamber is forced to flow 2443 into the buoyancy air-relief pipe 2434/2435, and therethrough to flow 2444 into the upper portion of the upper buoyancy chamber 2424 thereby tending to equilibrate the pressures within the upper 2424 and lower 2411 buoyancy chambers.

When the buoyancy pump 2437 pumps fluid from the lower 2411 to the upper 2424 buoyancy chamber, through the buoyancy fluid-transfer pipe 2436, the volume and/or level 2439 of fluid 2438 within the upper buoyancy chamber increases, and a portion of the pocket of air (if any) within the upper portion of the interior of the upper buoyancy chamber is forced to flow into (opposite of 2444) the buoyancy air-relief pipe 2434/2435, and therethrough to flow into the upper portion 2442 of the lower buoyancy chamber thereby tending to equilibrate the pressures within the upper 2424 and lower 2411 buoyancy chambers.

An air-pocket adjustment pipe 2412, or "snorkel," fluidly connects an air pump 2445 to the air pocket 2427 inside the bulbous end 2400 of the embodiment and to the atmosphere outside and above the embodiment. The air pump incorporates, includes, and/or utilizes, a valve that, when closed, seals and/or obstructs the pipe and prevents any flow of air through the snorkel. By opening the valve within the air pump, the embodiment's control system can allow air to move freely and passively between the air pocket 2427 and the atmosphere. And, by activating the pump in a first configuration, the embodiment's control system can suck 2446 air from the air pocket, or blow 2446 air into it, thereby causing the complementary and respective actions of blowing 2447 air from the air pocket into the atmosphere, or sucking 2447 air from the atmosphere into the interior 2427 of the embodiment.

Attached and/or connected to the uppermost portion 2422 of the inertial water tube is a gate valve 2460, knife gate valve, knife valve, and/or blade valve, which, when closed by the embodiment's control system (incorporated within energy storage module 2430), will prevent any fluid (e.g., water 2418 and air) from flowing between the interior of the inertial water tube 2419 and the interior 2427/2425 of the embodiment (i.e. the interior entrained between the outer embodiment hull 2400/2402 and the inner inertial water tube 2419 wall). When opened by the embodiment's control system (as illustrated in FIG. 266), the gate valve permits the free flow 2421/2423 of water and/or air between the inertial water tube and the interior 2427 of the embodiment.

FIG. 267 shows a perspective side sectional view of the same embodiment of the current disclosure that is illustrated in FIGS. 261-266 where the section is taken across line 266-266 in FIGS. 264 and 265. FIG. 267 is a perspective view of the same sectional view illustrated in FIG. 266.

FIG. 268 shows a top-down sectional view of the same embodiment of the current disclosure that is illustrated in FIGS. 261-267 where the section is taken across line 268-268 in FIGS. 263 and 266.

The embodiment incorporates, includes, and/or utilizes, four valve-controlled pressurized-water-jet thrusters 2407, 2413, 2448 and 2449. When their respective valves are opened by the embodiment's control system (by electrical or other means, e.g. by electrically powering a valve-control motor and/or solenoid), these jets allow pressurized water from within the hull 2402 of the embodiment to flow outward in directions that are approximately normal to the longitudinal and/or long axis (in the center of tube 2422 and approximately normal to the page of the illustration) of the embodiment. In the illustration of FIG. 268, the control system has opened the valves of jets 2407 and 2448, causing pressurized water from within the embodiment's hull to flow 2451 and 2452 into the jets 2407 and 2448, respectively, and therethrough to flow 2453 and 2454, respectively, out of the embodiment, and/or to be ejected from the embodiment, producing the respective jets 2453 and 2454 of water and the associated, consequential, and/or resulting, thrust. The control system has not opened, and/or has closed, the valves of jets 2413 and 2449, thereby preventing pressurized water within the embodiment's hull 2402 from escaping through those jets. Each of these four pressurized-water-jet thrusters are nozzled, i.e. the water passing through them accelerates due to a constriction in the flow path, which tends to increase the thrust produced with respect to a given water outflow.

The embodiment illustrated in FIG. 268 incorporates, includes, and/or utilizes, four additional valve-controlled pressurized-water-jet thrusters 2408, 2409, 2414, and 2415. When their respective valves are opened by the embodiment's control system, these jets allow pressurized water from within the hull 2402 of the embodiment to flow outward in directions that are approximately tangential to the embodiment, i.e. tangential with respect to a circular arc within a plane approximately normal to and concentric with a longitudinal and/or long axis (in the center of tube 2422 and approximately normal to the page of the illustration) of the embodiment. These four pressurized-water-jet thrusters are nozzled, i.e. the water passing through them accelerates due to a constriction in the flow path.

The embodiment illustrated in FIG. 268 incorporates, includes, and/or utilizes, three additional valve-controlled pressurized-water-jet thrusters, two of which are visible within the illustration provided in FIG. 268. The upper valves of two 2450 and 2461 of the embodiment's three valve-controlled pressurized-water-jet thrusters are visible within the illustration of FIG. 268, and one of the three is obscured behind and/or beneath the embodiment's energy storage module 2430. When their respective valves are opened by the embodiment's control system, these jets allow pressurized water from within the hull 2402 of the embodiment to flow outward in directions that are approximately parallel to a longitudinal and/or long axis (in the center of tube 2422 and approximately normal to the page of the illustration) of the embodiment. These pressurized-water-jet thrusters are nozzled, i.e. the water passing through them accelerates due to a constriction in the flow path.

When the device is at the surface and water is being periodically added to the embodiment's internal reservoir in response to wave action at the embodiment, pressurized water within the embodiment's hull 2402 tends to flow out through effluent pipe and/or aperture 2405 thereby causing a water turbine therein to rotate which in turn energizes an operatively connected generator 2429 (e.g., an induction generator/motor), thereby causing that generator to produce electrical power. By contrast, when the device is not generating power, but instead is, for instance, submerged below the surface of the water in a transiting mode (its third configuration and/or operational modality), then when the embodiment's control system directs, emits, issues, and/or actuates, appropriate control signals, as well as electrical energy from the energy storage module 2430, to the generator, that generator operates and/or behaves as a motor, and draws water from outside the embodiment into the embodiment's hull 2402, so that, when so actuated, the turbine and its operatively connected generator act in a manner similar to a "pumped hydro" system, i.e. the generator (now motor) consumes electrical power in order to force rotation of the water turbine, thereby tending to impel water into the hull 2402. Such drawn-in or impelled water tends to pressurize the water within the embodiment's hull thereby providing the various valve-actuated water jets with the ability to generate thrust, and/or to generate an increased level of thrust.

FIG. 269 shows a top-down sectional view of the same embodiment of the current disclosure that is illustrated in FIGS. 261-268 where the section is taken across line 269-269 in FIGS. 263 and 266.

The embodiment incorporates, includes, and/or utilizes, three valve-controlled pressurized-water-jet thrusters (e.g. 2410 in FIG. 261). When their respective valves 2433, 2450, and 2461 are opened by the embodiment's control system, these jets allow pressurized water from within the hull 2402 of the embodiment to flow outward in directions that are approximately parallel to a longitudinal and/or long axis (in the center of tube 2419 and approximately normal to the page of the illustration) of the embodiment.

The embodiment incorporates, includes, and/or utilizes, four additional valve-controlled pressurized-water-jet thrusters 2408, 2409, 2414, and 2415. When their respective valves are opened by the embodiment's control system, these jets allow pressurized water from within the hull 2402 of the embodiment to flow outward in directions that are approximately tangential with respect to a circular arc within a plane approximately normal to the longitudinal and/or long axis (in the center of tube 2419 and approximately normal to the page of the illustration) of the embodiment. In the illustration of FIG. 269, the control system has opened the valves of jets 2409 and 2414, causing pressurized water from within the embodiment's hull to flow 2456 and 2457 into the jets 2409 and 2414, respectively, and therethrough to flow 2458 and 2459, respectively, out of the embodiment, and/or to be ejected from the embodiment, producing the respective jets 2458 and 2459 of water and the associated, resultant, and/or consequential, tangential thrust (opposite in direction to the jets 2458 and 2459). The control system has not opened, and/or has closed, the valves of jets 2408 and 2415, thereby preventing pressurized water within the embodiment's hull 2402 from escaping through those pressurized-water-jet thrusters.

FIG. 270 shows a side view of the same embodiment of the current disclosure that is illustrated in FIGS. 261-269.

The orientation and configuration of the embodiment illustrated in FIG. 270 corresponds to the third configuration and/or operational modality of the embodiment which is implemented and/or manifested after the embodiment has submerged. In its third configuration and/or operational modality, the embodiment 2400 propels itself forward (e.g. upward with respect to the embodiment orientation illustrated in FIG. 270) within and/or through the body of water in which it is submerged, while it adjusts, controls, modifies, and/or changes, its orientation in order to facilitate its steering, navigation, and/or movement to a location, and/or position, determined by the embodiment's control system.

In response to control signals issued by the embodiment's control system (not shown), the embodiment opens valves, e.g., 2433 in FIG. 266, atop, and/or at the bases of, forward-thrusting (backward-pointing) water jets, e.g., 2432, thereby allowing pressurized water to escape, e.g., 2462 and 2463, those jets, e.g., 2432 and 2463, tend to result in the generation of forward thrust and motion 2464.

In response to control signals issued by the embodiment's control system, the embodiment can open the valves atop, and/or at the bases of, one or more roll-thrusting water jets, e.g., 2408, thereby allowing pressurized water to escape, e.g., 2465, the respective jet(s), which tends to result in the generation of rolling thrust that tends to rotate the embodiment about its longitudinal and/or long axis 2466.

In response to control signals issued by the embodiment's control system, the embodiment can open the valves atop, and/or at the bases of, one or more pitch- and yaw-thrusting water jets, e.g., 2413, thereby allowing pressurized water to escape, e.g., 2467, the jet(s), which tends to result in the generation of pitching and/or yawing thrust that tends to rotate the embodiment about an axis normal to its longitudinal and/or long axis 2466.

While submerged, the pressure of water within the hull 2400/2402 of the embodiment is increased and/or maintained, while jets of water, e.g., 2462, are causing the embodiment to move, by the embodiment's drawing 2468 of water into the effluent pipe 2405 and/or aperture and impelling it at pressure into the hull 2400/2402. Water is drawn 2468 into the embodiment in response to the embodiment's control system causing the water turbine (not visible, and positioned within the effluent pipe 2405) to be actively run in a rotational direction opposite the direction in which it rotates in response to emission of pressurized water from the embodiment when and/or while generating electrical power at the surface of the body of water in which it is submerged. The water turbine is caused to rotate so as to draw water into the embodiment when the embodiment's control system causes the generator operatively connected to the water turbine to consume energy and operate as a motor and rotate the water turbine in a "backward" direction. This is analogous to the use of energy to pump water into the reservoir of a hydroelectric dam in "pumped hydro" energy-storage mode. In other, alternate embodiments different from the one illustrated here, a separate pump and/or turbine (separate from the generator and turbine used for generating power) is used to impel water into the hull of the embodiment.

FIG. 271 shows a side sectional view of the same embodiment of the current disclosure that is illustrated in FIGS. 261-270 where the section is taken across line 266-266 in FIGS. 264 and 265.

Whereas the side views of the embodiment illustrated in FIGS. 261-263, 266 and 267, are views corresponding to a first configuration and/or operational modality of the embodiment, i.e., where the embodiment is floating adjacent to an upper surface of a body of water (2401 in FIG. 261), the side views of the embodiment illustrated in FIGS. 270 and 271, illustrate the embodiment in a third configuration and/or operational modality of the embodiment, i.e., where the embodiment is submerged. In its third configuration and/or operational modality, the embodiment 2400 propels itself within and/or through the body of water in which it is submerged, while it adjusts, controls, modifies, and/or changes, its orientation, direction, and speed, in order to facilitate its steering, navigation, and/or movement to a location, and/or position, determined by the embodiment's control system.

In response to control signals issued by the embodiment's control system (incorporated within energy storage module 2430), water turbine 2406 is actively rotated in an opposite direction (with respect to its direction of rotation when rotated by the outflow of water from within the embodiment's hull 2400/2402 through effluent tube 2405) through the application of electrical energy stored in the embodiment's energy storage module 2430 to the generator/motor 2429 operatively connected to the water turbine. Water turbine 2406 sucks 2470 and/or draws in water from outside the embodiment, forcing that water to flow 2471 into the embodiment's hull 2400/2402 thereby tending to increase the pressure of the water 2425 therein.

The embodiment's control system has extended the gate 2460B and/or blade of the gate valve assembly 2460A, thereby closing the constricted, narrow, uppermost, and/or forwardmost, end of the embodiment's inertial water tube 2419. The closing of the gate valve prevents relatively high-pressure water 2425 within the embodiment's hull 2400/2402 from flowing through the upper mouth 2417 of the inertial water tube, and therethrough flowing into the inertial water tube and joining the water 2418 therein. Gate valve 2460 helps, when closed, to maintain an elevated pressure of the water introduced 2470/2471 into the interior 2425 of the embodiment's hull 2400/2402 by the powered. "pumped-hydro"-like rotations of the water turbine 2406.

In response to an opening of a valve, e.g., 2433, atop, and/or at a base of, a water jet, e.g., 2432, a portion of the relatively highly pressurized water inside the embodiment's hull 2400/2402 is allowed to flow 2472 into the water jet and therethrough to flow through the nozzle at the distal end of the water jet, and to then flow 2462 into the body of water outside the embodiment, thereby tending to generate a thrusting force that tends to move, e.g., 2464, the embodiment. On the other hand, when the control system closes, or leaves closed, the valve of a water jet, e.g., 2469, then water does not tend to flow out of that water jet, nor does a thrusting force tend to be generated.

When the embodiment is in its third configuration and/or operational modality, the water (and/or other fluids) stored within the lower buoyancy chamber 2411 when the embodiment is in its first configuration and/or operational modality, is exchanged with the air (and/or other gases) stored within the upper buoyancy chamber 2424 when the embodiment is in its first configuration and/or operational modality. Therefore, when the embodiment is in its third configuration and/or operational modality, as illustrated in FIG. 271, the lower buoyancy chamber 2411 tends to contain, and/or be filled with, air (and/or other gases), while the upper buoyancy chamber 2424 tends to contain, and/or be filled with, water 2438 (and/or other fluids). This "trimming" results in the device being either stable in an orientation as shown in FIG. 271, or else close to unstable so that its orientation can be altered easily using control thrusts.

In the embodiment configuration illustrated in FIG. 271, the upper buoyancy chamber 2424 is filled with water 2438, with the exception of a relatively small pocket of air 2473.

The embodiment illustrated in FIGS. 261-271 is designed, configured, and/or equipped, to generate electrical power while floating at the surface of a body of water over which waves pass; to there charge batteries and/or other energy storage systems, e.g. 2430; to submerge to an arbitrary depth: to operate its water turbine in reverse so as to pressurize water within its hull and to then to expel portions of that pressurized water through a variety of water jets so as to change the speed, direction, position and/or orientation of the embodiment while submerged; and, to ascend to the surface and again generate electrical power, and to charge batteries and/or other energy storage systems while floating there.

It should be recognized that the precise shape of the outer hull of the embodiment 2400/2402 is by no means limited to the shape shown here. For instance, the approximately frustoconical section of the outer hull is shown here as slightly concave; but in alternate embodiments, the frustoconical section of the outer hull is more concave, or is convex. The scope of the present disclosure is not limited to embodiments possessing and/or characterized by hulls of a particular shape, size, geometry, design, and/or configuration.

FIGS. 261-263 and 266-267 illustrate the first configuration and/or operational modality of the embodiment wherein it floats at and/or adjacent to the surface (2401 in FIG. 261) of a body of water over which waves pass. As the embodiment moves up and down in response to ambient wave motion, water (2418 in FIG. 266) within its inertial water tube (2419 in FIG. 266) oscillates, occasionally causing a portion of that water to be ejected into the air pocket (2427 in FIG. 266) at an upper portion of the interior of the embodiment's hull 2400/2402. The air (2427 in FIG. 266) and the water (2425 in FIG. 266) within the interior of the embodiment's hull is more highly pressurized than the atmosphere outside the embodiment. Because of the relatively high pressure of the water 2425 within the interior of the embodiment's hull, water tends to flow (2428 in FIG. 266) into and to flow (2474 in FIG. 266) out through the effluent pipe (2405 in FIG. 266), thereby tending to cause the water turbine (2406 in FIG. 266) within the effluent pipe to rotate, which tends to energize the operatively connected generator (2429 in FIG. 266) thereby producing electrical power, a portion of which is stored within, and/or used to recharge, the energy storage module (2430 in FIG. 266).

In response to a series of actions, control signals, and/or configuration changes, that are orchestrated by the embodiment's control system (and can be commanded and/or controlled by a remote operator or executed autonomously as a response to one or more observed stimuli), the valve within the air pump (2445 in FIG. 266) is opened thereby tending to allow air (2427 in FIG. 266) within the air pocket trapped within an upper portion of the embodiment's interior to escape to the atmosphere outside the embodiment through the air-pocket adjustment pipe (2412 in FIG. 266). If the control system determines that a rapid evacuation of that air is required or useful, then the air pump can be activated in a manner that causes it to suck air out of the embodiment and blow it into the atmosphere outside the embodiment. This action tends to remove the air pocket from the embodiment and replace that space with additional water, thereby increasing the volume of the water (2425 in FIG. 266) trapped within the embodiment. Alternately or at the same time, the turbine 2406 of the embodiment can be operated in "pumped hydro" or "reversed" mode so as to drive water into the embodiment, which likewise serves the purpose of accelerating the evacuation of air from the upper portion of the embodiment's interior.

Following the evacuation of the air pocket, the valve within the air pump (2445 in FIG. 266) is closed (so as to prevent water from escaping the interior of the embodiment's hull 2400/2402) and without the buoyancy provided by the air pocket (2427 in FIG. 266) the embodiment will tend to exhibit a negative buoyancy that will tend to cause it to sink.

Typically, as the embodiment sinks (although in some cases prior to its sinking, or in some other cases after having sunk), the pocket of air trapped within the upper buoyancy chamber (2424 in FIG. 266) tends to promote, preserve, and/or cause, a vertical submerged embodiment orientation similar to the orientation it exhibits when floating at the surface of the body of water (e.g. the orientation illustrated in FIG. 266). However, if the control system or a remote operator determines that one or more alternate orientations are required or useful. e.g., a horizontal orientation in which the longitudinal and/or long axis (2466 in FIG. 270) of the embodiment is parallel to the resting surface of the body of water in which the embodiment is suspended, then the buoyancy pump (2437 in FIG. 266) is activated after which it tends to pump the fluid (2441 in FIG. 266) trapped within the lower buoyancy chamber (2411 in FIG. 266) through the buoyancy fluid-transfer pipe (2436 in FIG. 266) and cause it to flow into a lower portion ("lower" when the embodiment is in an approximately vertical orientation similar to its orientation when floating at the surface of the body of water in which it is suspended as illustrated in FIG. 266) of the upper buoyancy chamber (2424 in FIG. 266) thereby tending to increase the volume or level (2439 in FIG. 266) of water (2438 in FIG. 266) trapped therein, while tending to decrease the volume of water (2441 in FIG. 266) trapped within the lower buoyancy chamber. As water is pumped from the lower to the upper buoyancy chamber, air tends to flow from the upper buoyancy chamber into the buoyancy air-relief pipe 2434/2435 and therethrough into the lower buoyancy chamber.

The movement and/or transfer of the liquid and air between the lower and upper buoyancy chambers (2411 and 2424, respectively, in FIG. 266) tends to cause the embodiment's center of mass to move upward (with respect to an approximately vertical orientation similar to its orientation when floating at the surface of the body of water in which it is suspended as illustrated in FIG. 266), while the embodiment's center of buoyancy and/or displacement tends to remain unchanged.

When the embodiment is floating in an approximately vertical orientation at the surface of a body of water, it is helpful to have a center of mass that is below the embodiment's center of buoyancy and/or displacement, as this will tend to increase the vertical and/or orientational stability of the embodiment when moving in response to passing waves. However, when the embodiment is submerged and its ability to change its orientation flexibly and with minimal expenditure of energy is useful, then it can be helpful to have a center of mass that is positioned more proximate to the embodiment's center of buoyancy and/or displacement. Thus, by transferring fluid upward into the upper buoyancy chamber (2424 in FIG. 266) (where it remains trapped) and air downward into the lower buoyancy chamber (2411 in FIG. 266) (where it remains trapped) within the buoyancy fluid-transfer pipe and buoyancy chambers, the embodiment's center of mass can be moved so as to be positioned more closely to the center of buoyancy and/or displacement.

After the embodiment has submerged, the blade 2460B is extended by the gate valve 2460A so as to obstruct the passage and/or flow of water between the embodiment's interior 2425 and the inertial water tube 2419. And, while the embodiment is submerged, as pressurized water is needed in order to produce jets of water (e.g., through water jets like 2432) electrical power is provided to the generator/motor 2429 by the energy storage module 2430, causing the water turbine 2406 to be driven in an opposite rotational direction to that which characterizes its rotations when extracting energy from water flowing out of the embodiment's hull 2400/2402, thereby causing the water turbine to draw 2470 water into the embodiment's interior.

Because of the radial offset of the lower buoyancy chamber from the embodiment's longitudinal and/or long axis (2466 in FIG. 270), the air within that chamber, and the buoyancy created by it, tends to promote a rotational orientation of the embodiment (about its longitudinal axis)

wherein the embodiment's roll and/or rotational orientation tends to minimize the distance between the lower buoyancy chamber and the surface of the body of water above the embodiment. Because of this, the water turbine's 2406 drawing in 2470 of water from above the embodiment tends to provide a lifting force to the embodiment, that tends to pull it or at least its bulbous portion toward the surface.

FIGS. 270 and 271 illustrate the thin: configuration and/or operational modality of the embodiment wherein it is suspended within a body of water and able to move about within that body of water, well beneath the surface and the wave motion found them.

Emissions of water through one or more of the embodiment's eleven water jets, as well as adjustments to the relative strength of those emissions (through differential, incremental, and/or partial, openings of the respective valves), allows the embodiment's control system to propel the embodiment in a forward direction 2464 while also adjusting its pitch, yaw, and roll orientations. The exchange of air and water between the lower 2411 and upper 2424 buoyancy chambers also allows the control system to trim the embodiment's buoyancy in order to facilitate the manifestation of any desired embodiment orientation.

The provision of pressurized water that is used to energize the water jets is provided by the active, electrically-powered, rotations of the water turbine 2406 by its operatively connected motor 2429. And, the motor is powered by energy provided by, and/or drawn from, the embodiment's energy storage module 2430. It is preferred that the embodiment rise to the surface and resume the generation of electrical power before the energy within the energy storage module is depleted.

In response to a series of actions, control signals, and/or configuration changes, that are orchestrated by the embodiment's control system, most if not all of the water 2438 within the upper buoyancy chamber 2424 is pumped, by the buoyancy pump (2437 in FIG. 266), into the lower buoyancy chamber 2411. As the orientation of the embodiment progressively assumes a more and more vertical, and/or nominal surface orientation, water 2438 remaining within the upper buoyancy chamber will tend to collect near the bottom and/or conical end of the upper buoyancy chamber thereby facilitating its transfer to the lower buoyancy chamber through the buoyancy fluid-transfer pipe 2436.

The embodiment uses its water jets, especially its three forward-thrust producing water jets, 2410, 2432, and 2469, to generate an upward ("upward" now that the embodiment is in a vertical, and upward pointing orientation, similar to its nominal orientation at the surface of a body of water) thrust that will propel the embodiment toward the surface. When the embodiment's proximity to the surface is sufficient, the upper end of the embodiment's air-pocket adjustment pipe 2412 will typically be positioned above the surface of the water (at least intermittently). At such a time, the air pump (2445 in FIG. 266) is activated in a manner that causes it to suck and/or draw air (and perhaps water) from the distal end of the air-pocket adjustment pipe and force that air into the interior of the embodiment thereby creating, restoring, and/or augmenting, an air pocket (2427 in FIG. 266) therein. Alternately or at the same time, the turbine can be driven by electrical power in a manner that tends to cause water to be ejected (a flow opposite that of flow direction 2470) from the interior of the embodiment, aiding in, promoting, facilitating, and/or accelerating, the ingestion of air through air-pocket adjustment pipe 2412.

Over time, a sufficient amount of air is drawn into the interior of the embodiment so as to recreate and/or reconstitute the air pocket (2427 in FIG. 266), after which the blade 2460B of the gate valve 2460A is withdrawn thereby permitting wave-driven oscillations of the water 2418 within the embodiment's inertial water tube 2419 to be oscillated therein, and to again be periodically and/or occasionally be ejected from the upper mouth 2417 of the inertial water tube into the upper interior of the embodiment, and into the air pocket positioned therein, thereby forcing pressurized water to once again passively flow out of the effluent pipe 2405, thereby rotating the water turbine 2406 therein, and thereby causing the operatively connected generator 2429 to again produce electrical power.

At least a portion of the electrical power generated by the generator 2429 is used to recharge the embodiment's energy storage module 2430, e.g., in anticipation of the next submergence and/or submerged cruising.

It will be understood by and obvious to one skilled in the art that, depending upon the densities of the materials of construction used for the walls and other components of an embodiment, it may be necessary to add modules and/or layers of syntactic foam and/or other buoyant materials at various parts of and/or at various locations around the interior and/or exterior of the embodiment so as to cause the embodiment to be approximately neutrally buoyant when in its third configuration and/or operational modality, as is desirable.

It will be also be understood and obvious that the locations at which any permanent buoyancy materials and/or modules are added will be important for determining whether the embodiment can achieve a horizontal configuration (as shown in e.g. FIG. 271) under the control of the disclosed trim-control system comprising lower 2411 and upper 2424 buoyancy chambers, as is desirable. The precise materials of construction chosen must govern the choice and placement of permanent buoyancy, since they determine the overall buoyancy of the embodiment and the locations of its center of mass and center of buoyancy.

Many varieties of embodiments have been disclosed as examples and illustrations of the present disclosure, and some of those embodiments incorporate features, components, elements, designs, and/or attributes, that are illustrated only for a single or very few of the embodiments. The scope of the present invention includes any and all combinations, recombinations, arrangements, variations, permutations, and alterations, of the features, components, elements, designs, and/or attributes, of the illustrated embodiments regardless of the relative numbers of illustrated embodiments for which those features, components, elements, designs, and/or attributes, were included.

We claim:

1. An autonomous wave-energy-powered vessel, comprising:

a chamber configured to contain a quantity of air and water having a pressure of more than one atmosphere;

a water tube having an open first end outside of the chamber, and an open second end inside of the chamber, and further having a reduced inner cross-sectional area adjacent the second end;

an air management system configured at a first opening in the chamber for controlling a quantity of air within the chamber;

a water management system configured at a second opening in the chamber for controlling a quantity of water in the chamber;

an energy recovery system for converting and storing electrical energy from water exiting the chamber;

a plurality of thrust generators mounted to the vessel and configured to move at least a portion of the vessel in water;

a first control system cooperating with the plurality of thrust generators to establish a position and an orientation of the vessel; and a second control system for operating the air management system and water management system to establish a preferred buoyancy of the vessel.

2. The vessel of claim 1, wherein the preferred buoyancy of the vessel is selected to optimize the energy control system.

3. The vessel of claim 1, wherein the preferred buoyancy of the vessel is selected to optimize maneuverability of the vessel.

4. The vessel of claim 1, wherein at least one of the plurality of thrust generators is powered by said stored electrical energy.

5. The vessel of claim 1, wherein at least one of the plurality of thrust generators is powered by pressurized water flowing out of the chamber.

6. The vessel of claim 1, wherein the at least one of the plurality of thrust generators includes an open pipe extending from the chamber, and a valve selectively fluidly coupling a first end of the open pipe with the chamber, and a nozzle at a second end of the open pipe.

7. The vessel of claim 1, wherein the air management system includes a pump.

8. The vessel of claim 1, wherein the air management system includes an open pipe extending from the chamber, and a valve selectively fluidly coupling the open pipe with the chamber.

9. The vessel of claim 8, further comprising a turbine in the open pipe.

10. The vessel of claim 1, wherein the water management system includes an effluent pipe, and a turbine in the effluent pipe.

11. The vessel of claim 10, wherein the turbine is a two direction turbine.

12. The vessel of claim 1, further comprising a valve selectively fluidly coupling the water tube with the chamber.

13. The vessel of claim 1, further comprising a battery for storing the electrical energy, said battery at least partially powering at least one of the plurality of thrust generators.

14. The vessel of claim 1, further comprising a fuel cell adapted to produce electrical energy from hydrogen and oxygen within the chamber.

15. The vessel of claim 1, further comprising an electrolyzer adapted to synthesize hydrogen and oxygen from water in the vessel.

16. The vessel of claim 1, further comprising a phased array antenna disposed on an upper surface of the chamber.

17. The vessel of claim 1, wherein the energy recovery system operates when a pressure of a gas within the chamber is above one atmosphere.

18. The vessel of claim 1, wherein the first control system is adapted to position the vessel at any desired pitch angle and roll angle relative to a longitudinal axis of the water tube.

19. The vessel of claim 1, wherein the plurality of thrust generators comprises at least one of a longitudinal thruster and a roll thruster.

20. The vessel of claim 1, further comprising at least one of a buoyant foam and a structure of permanent positive buoyancy within the chamber.

21. The vessel of claim 1, further comprising an electronics module comprising batteries, a computing system, and an electronic signal tranceiving device.

22. The vessel of claim 1, further comprising a water diverting member within the chamber and configured to laterally deflect water vertically exiting the open second end of the water tube.

23. The vessel of claim 22, wherein a position of the water diverting member is longitudinally adjustable using a lift mechanism so as to selectively fluidly couple the water tube with the chamber.

24. The vessel of claim 1, wherein a nominal absolute pressure of a gas in the chamber is between 1.1 and 5 atmospheres.

25. The vessel of claim 1, further comprising a canister for collecting and releasing compressed gas in the chamber.

26. The vessel of claim 1, further comprising a water jet tube having an inlet within the chamber and an outlet outside the chamber and having a valve for selectively fluidly coupling the water jet tube with the chamber.

27. The vessel of claim 1, further comprising a gas partition within the chamber operating as an electrolyzer shroud to separate oxygen and hydrogen inside the chamber.

28. A submersible repositionable wave engine, comprising:

a buoy configured to rise and fall under an influence of a body of water;

a hollow tube depending from the buoy and having a water ingress/egress mouth at a lower end and a water discharge spout at an upper end, and further comprising an interior including a wall defining a water accelerating surface adapted to eject water through the water discharge spout in response to an increasing hydrodynamic pressure within the interior of the hollow tube;

a water collection reservoir in fluid communication with the water discharge spout;

an air pocket compartment in fluid communication with the water collection reservoir;

a first effluent pipe extending from the water collection reservoir to the body of water for diverting at least a portion of water collected in the water collection reservoir to the body of water;

a first electrical energy generator for converting an energy of a portion of water in the first effluent pipe into electrical energy;

an air release valve for releasing air from the air pocket compartment;

a submergence control system configured to open the air release valve;

a thruster for adjusting an underwater position of the submersible wave engine;

a battery adapted to actuate the thruster;

wherein the first electrical energy generator is configured to charge the battery when the submersible repositionable wage engine rises and falls under the influence of waves; and wherein the submersible repositionable wave engine is adapted to submerge underwater when air is released from the air pocket compartment.

* * * * *